US011906927B2

(12) United States Patent
Fujino et al.

(10) Patent No.: US 11,906,927 B2
(45) Date of Patent: Feb. 20, 2024

(54) CARTRIDGE, DRUM UNIT AND IMAGE FORMING APPARATUS

(71) Applicant: CANON KABUSHIKI KAISHA, Tokyo (JP)

(72) Inventors: Toshiki Fujino, Kanagawa (JP); Akinobu Hirayama, Shizuoka (JP); Teruhiko Sasaki, Shizuoka (JP); Tachio Kawai, Tokyo (JP); Daisuke Abe, Shizuoka (JP); Masanari Morioka, Kanagawa (JP); Takeo Kawanami, Kanagawa (JP); Yu Fukasawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/988,057

(22) Filed: Nov. 16, 2022

(65) Prior Publication Data

US 2023/0176519 A1 Jun. 8, 2023

Related U.S. Application Data

(60) Division of application No. 17/986,997, filed on Nov. 15, 2022, which is a continuation of application No. PCT/JP2021/035213, filed on Sep. 16, 2021.

(30) Foreign Application Priority Data

Sep. 17, 2020 (JP) ................................ 2020-156549

(51) Int. Cl.
*G03G 21/18* (2006.01)
*G03G 15/00* (2006.01)

(52) U.S. Cl.
CPC ....... *G03G 21/1814* (2013.01); *G03G 15/757* (2013.01); *G03G 21/186* (2013.01)

(58) Field of Classification Search
CPC ............. G03G 21/1814; G03G 15/757; G03G 21/186; G03G 2221/1657; G03G 21/1647
See application file for complete search history.

(56) References Cited

U.S. PATENT DOCUMENTS 5,903,803 A 5/1999 Kawai et al.
5,926,673 A 7/1999 Foster et al.
(Continued)

FOREIGN PATENT DOCUMENTS

CN 207992696 U 10/2018
CN 108762015 A 11/2018
(Continued)

OTHER PUBLICATIONS

International Search Report and Written Opinion for International Patent Application No. PCT/JP2021/035213.
(Continued)

*Primary Examiner* — Francis C Gray
(74) *Attorney, Agent, or Firm* — Venable LLP

(57) ABSTRACT

[TASK] To further develop prior art technique.
[SOLUTION] A cartridge includes a photosensitive drum and a coupling. the coupling includes a main body and a movable member movable relative to the main body. The movable member includes an engaging portion which is capable of entering between a driving force application member and a braking force application member by the movement relative to the main body. The movable member receives a driving force for rotating the photosensitive drum, from the driving force application member and also receives a braking force applying a load against rotation of the photosensitive drum, from the braking force application member.

24 Claims, 150 Drawing Sheets

(56) References Cited

U.S. PATENT DOCUMENTS

| | | | | |
|---|---|---|---|---|
| 9,588,478 | B1 * | 3/2017 | Fan | G03G 21/1676 |
| 9,651,915 | B2 * | 5/2017 | Morgan | G03G 21/181 |
| 10,162,290 | B2 * | 12/2018 | Imaizumi | G03G 15/757 |
| 10,534,308 | B2 * | 1/2020 | Ikeda | G03G 15/757 |
| 2002/0057924 | A1 | 5/2002 | Ueno et al. | |
| 2014/0270845 | A1 | 9/2014 | Kawakami et al. | |
| 2015/0030353 | A1 * | 1/2015 | Wang | F16D 3/06 464/169 |
| 2015/0050048 | A1 | 2/2015 | Huang | |
| 2015/0185693 | A1 * | 7/2015 | Wang | G03G 15/757 464/169 |
| 2015/0346671 | A1 | 12/2015 | Ikeda | |
| 2016/0124383 | A1 | 5/2016 | Ikeda et al. | |
| 2016/0370750 | A1 | 12/2016 | Ikeda et al. | |
| 2017/0115613 | A1 | 4/2017 | Fahmy et al. | |
| 2017/0261926 | A1 | 9/2017 | Kashiide et al. | |
| 2017/0351214 | A1 | 12/2017 | Uesugi et al. | |
| 2019/0129356 | A1 | 5/2019 | Murakami et al. | |
| 2019/0187608 | A1 | 6/2019 | Uesugi et al. | |
| 2020/0301356 | A1 * | 9/2020 | Hu | G03G 21/1857 |
| 2021/0382434 | A1 | 12/2021 | Morioka et al. | |

FOREIGN PATENT DOCUMENTS

| | | | |
|---|---|---|---|
| EP | 2 957 959 | A1 | 12/2015 |
| EP | 3 015 919 | A1 | 5/2016 |
| EP | 3 264 185 | A1 | 1/2018 |
| EP | 3 506 023 | A1 | 7/2019 |
| EP | 3 944 024 | A1 | 1/2022 |
| JP | H08-328449 | A | 12/1996 |
| JP | 2002-202690 | A | 7/2002 |
| JP | 2002-525657 | A | 8/2002 |
| JP | 2013-122537 | A | 6/2013 |
| JP | 2015-022186 | A | 2/2015 |
| JP | 2020-154313 | A | 9/2020 |
| TW | 201337477 | A | 9/2013 |
| TW | 201621484 | A | 6/2016 |
| TW | 201809923 | A | 3/2018 |
| WO | 2015/043043 | A1 | 4/2015 |

OTHER PUBLICATIONS

Apr. 13, 2023 Extended Search Report in European Patent Application No. 22 216 718.1.

Apr. 19, 2023 Extended Search Report in European Patent Application No. 22 216 720.7.

Apr. 19, 2023 Extended Search Report in European Patent Application No. 22 216 717.3.

May 2, 2023 Extended Search Report in European Patent Application No. 22 216 722.3.

Nov. 6, 2023 Examination Report in Australian Patent Application No. 2021345939.

Nov. 8, 2023 Office Action in Taiwanese Patent Application No. 110134837.

* cited by examiner (a)

(b)

(a)

(b)

(a)

(b)

(c)

(a)

(b)

(a)

(b)

(a)

(b)

(a)

(b)

(a)

(b)

(a)

(b)

(a)

(b)

(a)

(b)

(c)

(d)

(a)

(b)

(a)

(b)

(a)

(b)

(a)

(b)

(a)

(b)

(c)

(a)

(b)

(a)

(b)

(c)

(a)

(b)

(a)

(b)

CARTRIDGE, DRUM UNIT AND IMAGE FORMING APPARATUS

FIELD OF THE INVENTION

The present invention relates to an electrophotographic image forming apparatus such as a copying machine or a printer which employs an electrophotographic method, and a cartridge usable with the electrophotographic image forming apparatus. The present invention also relates to a drum unit usable with the electrophotographic image forming apparatus and the cartridge.

Here, the electrophotographic image forming apparatus (hereinafter, also referred to as an "image forming apparatus") is an apparatus which forms an image on a recording material by using the electrophotographic image forming method. Examples of the image forming apparatus include a copying machine, a facsimile machine, a printer (laser beam printer, LED printer, and so on), a multifunction printer of them, and the like.

The cartridge is dismountable from the main assembly of the image forming apparatus (apparatus main assembly). Examples of the cartridge include a process cartridge in which a photosensitive member and at least one of the process means acting on the photosensitive member is integrally formed into a cartridge.

The drum unit is a unit including a photosensitive drum, and is used for the cartridge or the image forming apparatus.

BACKGROUND ART

Conventionally, in the field of the image forming apparatus using the electrophotographic forming process, it is known that an electrophotographic photosensitive member (hereinafter referred to as a photosensitive drum) and a process means acting on the photosensitive drum are integrally formed into a cartridge. Such a cartridge is dismountable from the main assembly of the image forming apparatus.

According to this cartridge method, the maintenance of the image forming apparatus can be performed by the user himself/herself without relying on a service person, so that the maintainability can be remarkably improved. Therefore, this cartridge type is widely used in an image forming apparatus.

In a structure in which the cartridge can be mounted to and dismounted from the image forming apparatus main assembly (device main assembly), there is a structure in which the main assembly and the cartridge are connected by using a coupling to input a driving force from the device main assembly to the cartridge (JP H8-328449).

The amount of torque required to drive the cartridge varies depending on the structure of the cartridge.

JP 2002-202690 proposes a structure of a cartridge including a load generating member which applies a load to the rotation of the photosensitive drum. The load generating member stabilizes the rotation of the photosensitive drum by increasing the torque of the photosensitive drum (JP 2002-202690).

SUMMARY OF THE INVENTION

Problem to be Solved

The object of the present invention is to further develop the above-mentioned conventional technology.

Means for Solving the Problem

An exemplary structure disclosed here is a cartridge detachably mountable to a main assembly of an image forming apparatus, the main assembly including a driving force application member a braking force application member, the cartridge comprising:

a photosensitive drum; and a coupling operatively connected to the photosensitive drum so as to be capable of transmitting a driving force toward the photosensitive drum, wherein the coupling includes, a main body, and a movable member movable relative to the main body of the coupling, wherein the movable member is provided with an engaging portion configured to be entered between the driving force application member and the braking force application member by movement thereof relative to the main body of the coupling, and wherein the movable member is configured to receive the driving force from the driving force application member and to receive a braking force for applying a load against rotation of the coupling, from the braking force application member.

Another exemplary structure disclosed here is a cartridge detachably mountable to a main assembly of an image forming apparatus, the main assembly including a driving force application member, and a braking force application member movable relative to the driving force application member and configured to apply a load against rotation of the driving force application member, the cartridge comprising:

a photosensitive drum; and a coupling operatively connected to the photosensitive drum so as to be capable of transmitting a driving force toward the photosensitive drum, wherein the coupling is provided with an engaging portion configured to engage with the braking force application member to receive the driving force from the driving force application member by way of the braking force application member.

A further exemplary structure disclosed here is a cartridge comprising:

a photosensitive drum;

a casing having a first end portion and a second end portion opposite from the first end portion in an axial direction of the photosensitive drum, the casing rotatably supporting the photosensitive drum; and a coupling operatively connected to the photosensitive drum so as to be capable of transmitting a driving force toward the photosensitive drum, wherein the coupling includes, a main body, a movable portion movable relative to the main body of the coupling between a first position and a second position, wherein the movable portion is closer to the second end portion of the casing in the axial direction of the photosensitive drum when the movable portion is in the second position than when the movable portion is in the first position, and a projection configured to move in a circumferential direction of the coupling relative to the main body of the coupling in response to movement of the movable portion from the first position to the second position.

A further exemplary structure disclosed here is a cartridge comprising:

a photosensitive drum;

a casing having a first end portion and a second end portion opposite from the first end portion in an axial direction of the photosensitive drum, the casing rotatably supporting the photosensitive drum; and a coupling operatively connected to the photosensitive drum so as to be capable of transmitting a driving force toward the photosensitive drum, wherein the coupling includes, a main body, a movable portion movable relative to the main body of the coupling between a first position and a second position, wherein the movable portion is closer to the second end portion of the casing in the axial direction of the photosensitive drum when the movable portion is in the second position than when the movable portion is in the first position, and a projection configured to move away from an axis of the coupling relative to the main body of the coupling in response to movement of the movable portion from the first position to the second position.

A further exemplary structure disclosed here is a cartridge comprising:

a photosensitive drum;

a casing having a first end portion and a second end portion opposite from the first end portion in an axial direction of the photosensitive drum, the casing rotatably supporting the photosensitive drum; and a coupling operatively connected to the photosensitive drum so as to be capable of transmitting a driving force toward the photosensitive drum, wherein the coupling includes, a first wall, a second wall provided inside the first wall in a radial direction of the coupling, a groove portion defined by the first wall and the second wall, a recessed portion provided in the second wall, and an inclined portion adjacent the recessed portion, wherein at least a part of the inclined portion is more remote from an axis of the coupling than the recessed portion, wherein one of the sides of the recessed portion in a circumferential direction of the coupling is opened, and on the other side of the recessed portion in the circumferential direction, at lease a part of the inclined portion is provided, and wherein the inclined portion is inclined so as to go away from the second end portion of the casing in the axial direction of the photosensitive drum as goes away from the recessed portion in the circumferential direction.

A further exemplary structure disclosed here is a cartridge comprising:

a photosensitive drum;

a casing having a first end portion and a second end portion opposite from the first end portion in an axial direction of the photosensitive drum, the casing rotatably supporting the photosensitive drum; and a coupling operatively connected to the photosensitive drum so as to be capable of transmitting a driving force toward the photosensitive drum, wherein the coupling includes, a base portion extending in the axial direction of the coupling, a first projection having a circular column shape and projecting outwardly from the base portion in a radial direction of the coupling, and a second projection having a circular column shape and projecting outwardly from the base portion in a radial direction of the coupling, wherein in the radial direction of the coupling, a distance from an axis of the coupling to an outermost edge portion of the first projection is shorter than a distance from the axis of the coupling to an outermost edge portion of the second projection, wherein as viewed in the axial direction of the coupling, a direction in which the first projection projects from the base portion is different from a direction in which the second projection extends from the base portion, and wherein in axial direction axial direction of the coupling, the first projection is disposed at a position more remote from the second end portion of the casing than the second projection.

A further exemplary structure disclosed here is an is an image forming apparatus including the apparatus main assembly of the image forming apparatus and, any one of the above-mentioned cartridges.

A further exemplary structure disclosed here is a drum unit usable for a cartridge which is detachably mountable to a main assembly of an image forming apparatus, the main assembly including a driving force application member and a braking force application member, the drum unit comprising:

a photosensitive drum; and a coupling operatively connected to the photosensitive drum so as to be capable of transmitting a driving force toward the photosensitive drum, wherein the coupling includes, a main body, and a movable member movable relative to the main body of the coupling, wherein the movable member is provided with an engaging portion configured to be entered between the driving force application member and the braking force application member by movement thereof relative to the main body of the coupling, and wherein the movable member is configured to receive the driving force from the driving force application member and to receive a braking force for applying a load against rotation of the coupling, from the braking force application member.

A further exemplary structure disclosed here is a drum unit usable for a cartridge detachably mountable to a main assembly of an image forming apparatus, the main assembly including a driving force application member, and a braking force application member movable relative to the driving force application member and configured to apply a load against rotation of the driving force application member, the drum unit comprising:

a photosensitive drum; and a coupling operatively connected to the photosensitive drum so as to be capable of transmitting a driving force toward the photosensitive drum, wherein the coupling is provided with an engaging portion configured to engage with the braking force application member to receive the driving force from the driving force application member by way of the braking force application member.

A further exemplary structure disclosed here is a drum unit usable for a cartridge, the drum unit comprising:

a photosensitive drum having a first end portion and a second end portion opposite from the first end portion; and a coupling operatively connected to the photosensitive drum so as to be capable of transmitting a driving force toward the photosensitive drum, wherein the coupling includes, a main body, a movable portion movable relative to the main body of the coupling between a first position and a second position, wherein the movable portion is closer to the second end portion of the photosensitive drum in the axial direction of the photosensitive drum when the movable portion is in the second position than when the movable portion is in the first position, and a projection configured to move in a circumferential direction of the coupling relative to the main body of the coupling in response to movement of the movable portion from the first position to the second position.

A further exemplary structure disclosed here is a drum unit usable for a cartridge, the drum unit comprising:

a photosensitive drum having a first end portion and a second end portion opposite from the first end portion; and a coupling operatively connected to the photosensitive drum so as to be capable of transmitting a driving force toward the photosensitive drum, wherein the coupling includes, a main body, a movable portion movable relative to the main body of the coupling between a first position and a second position, wherein the movable portion is closer to the second end portion of the photosensitive drum in the axial direction of the photosensitive drum when the movable portion is in the second position than when the movable portion is in the first position, and a projection configured to move away from an axis of the coupling relative to the main body of the coupling in response to movement of the movable portion from the first position to the second position.

A further exemplary structure disclosed here is a drum unit usable for a cartridge, the drum unit comprising:

a photosensitive drum having a first end portion and a second end portion opposite from the first end portion; and a coupling operatively connected to the photosensitive drum so as to be capable of transmitting a driving force toward the photosensitive drum, wherein the coupling includes, a first wall, a second wall provided inside the first wall in a radial direction of the coupling, a groove portion defined by the first wall and the second wall, a recessed portion provided in the second wall, and an inclined portion adjacent the recessed portion, wherein at least a part of the inclined portion is more remote from an axis of the coupling than the recessed portion, wherein one of the sides of the recessed portion in a circumferential direction of the coupling is opened, and on the other side of the recessed portion in the circumferential direction, at lease a part of the inclined portion is provided, and wherein the inclined portion is inclined so as to go away from the second end portion of the photosensitive drum in the axial direction of the photosensitive drum as goes away from the recessed portion in the circumferential direction.

A further exemplary structure disclosed here is a drum unit usable for a cartridge, the drum unit comprising:

a photosensitive drum having a first end portion and a second end portion opposite from the first end portion; and a coupling operatively connected to the photosensitive drum so as to be capable of transmitting a driving force toward the photosensitive drum, wherein the coupling includes, a base portion extending in the axial direction of the coupling, a first projection having a circular column shape and projecting outwardly from the base portion in a radial direction of the coupling, and a second projection having a circular column shape and projecting outwardly from the base portion in a radial direction of the coupling, wherein in the radial direction of the coupling, a distance from an axis of the coupling to an outermost edge portion of the first projection is shorter than a distance from the axis of the coupling to an outermost edge portion of the second projection, wherein as viewed in the axial direction of the coupling, a direction in which the first projection projects from the base portion is different from a direction in which the second projection extends from the base portion, and wherein in axial direction axial direction of the coupling, the first projection is disposed at a position more remote from the second end portion of the photosensitive drum than the second projection.

Effect of the Invention

Conventional technology can be developed.

BRIEF DESCRIPTION OF THE DRAWINGS

FIG. 120 is perspective views and sectional views illustrating the operation of the drum coupling 1206.

FIG. 121 is perspective views and exploded perspective views of the drive transmission unit 203.

FIG. 122 is a cross-sectional view and a side view of the drive transmission unit 203.

FIG. 123 is exploded perspective views of the drum coupling 1342.

FIG. 124 is front views and perspective views of the drum coupling 1342.

FIG. 125 is perspective views illustrating an engagement operation between the drum coupling and the drive transmission unit 203.

FIG. 126 is sectional views illustrating an engagement operation between the drum coupling 1342 and the drive transmission unit 203.

FIG. 127 is cross-sectional views illustrating an engagement operation between the drum coupling 1342 and the drive transmission unit 203.

FIG. 128 is perspective views illustrating an engagement operation between the drum coupling and the drive transmission unit 203.

FIG. 129 is cross-sectional views illustrating an engagement operation between the drum coupling 1342 and the drive transmission unit 203.

FIG. 130 is cross-sectional views illustrating an engagement operation between the drum coupling 1342 and the drive transmission unit 203.

FIG. 131 is front views of the drum coupling 1342.

Figure 132:
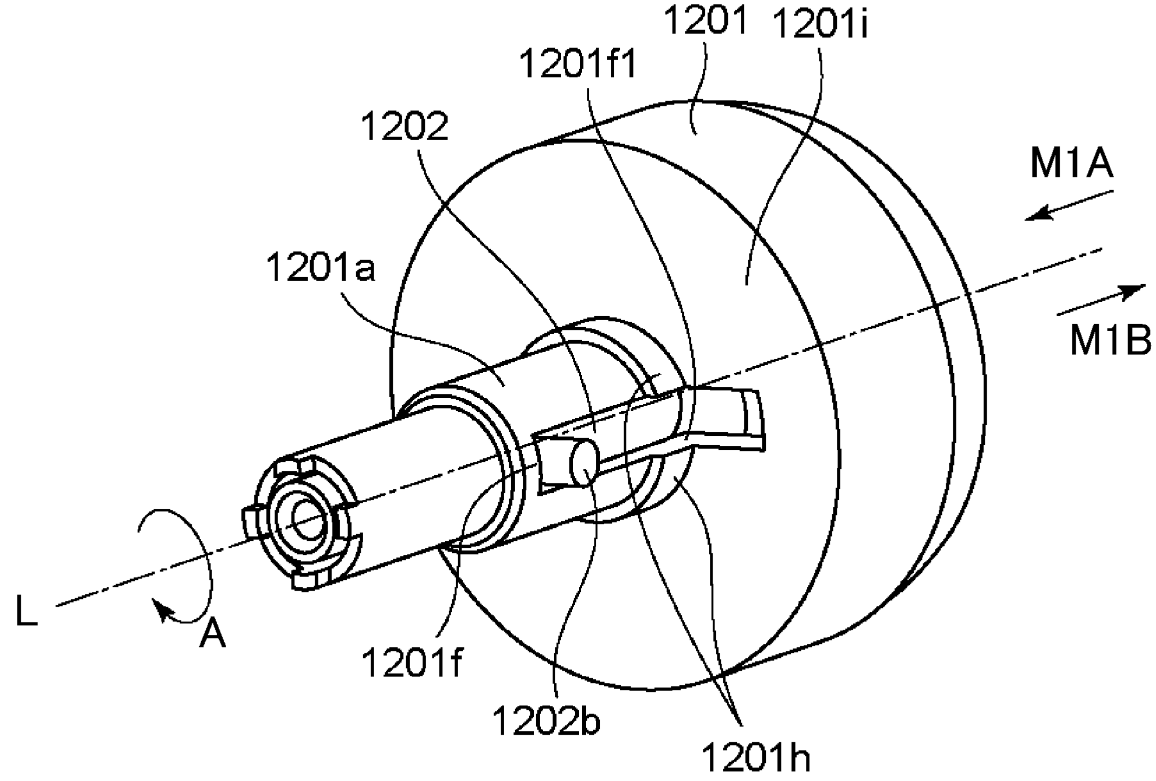

FIG. 132 is a perspective view illustrating the internal structure of the drum coupling 1206.

Figure 133:
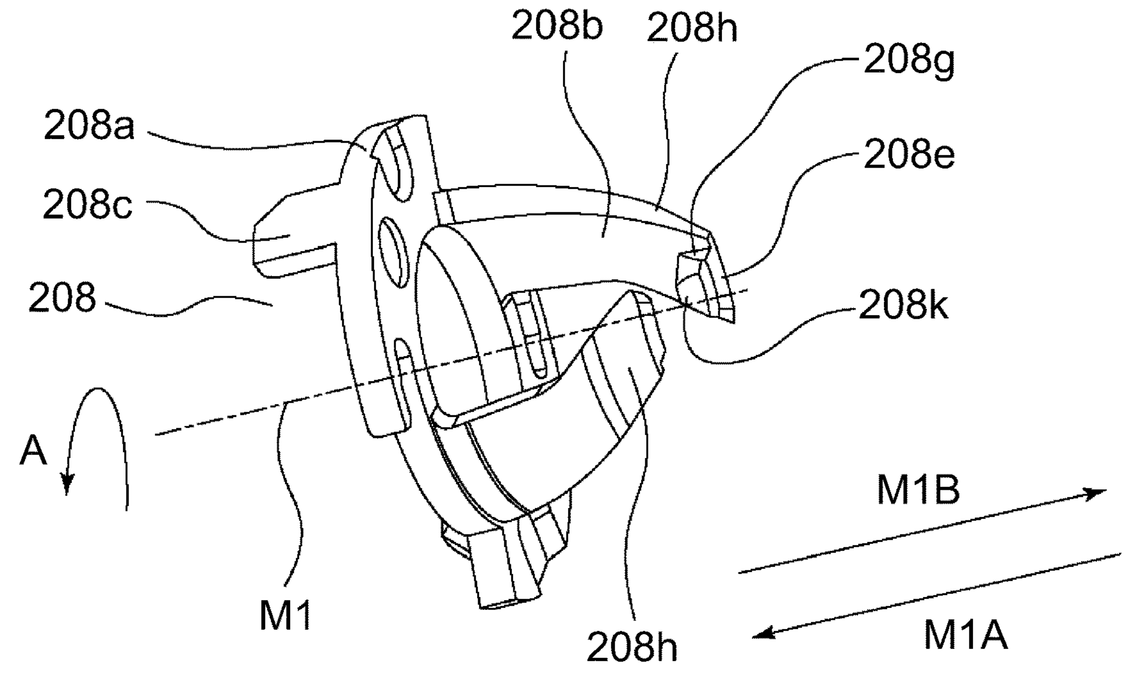
Figure 133:
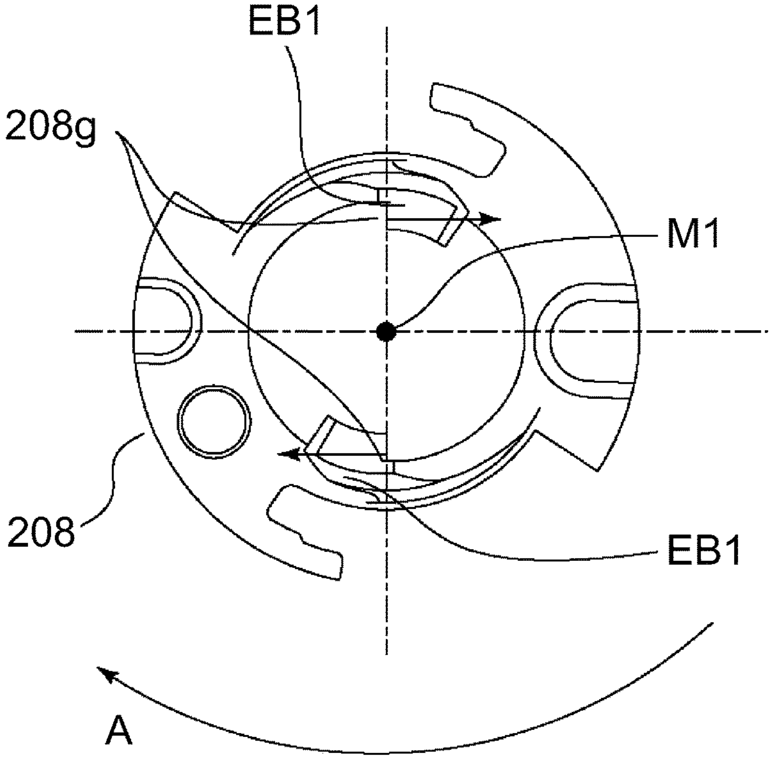

FIG. 133 is a perspective view and a front view of a second brake engaging member 208.

Figure 134:
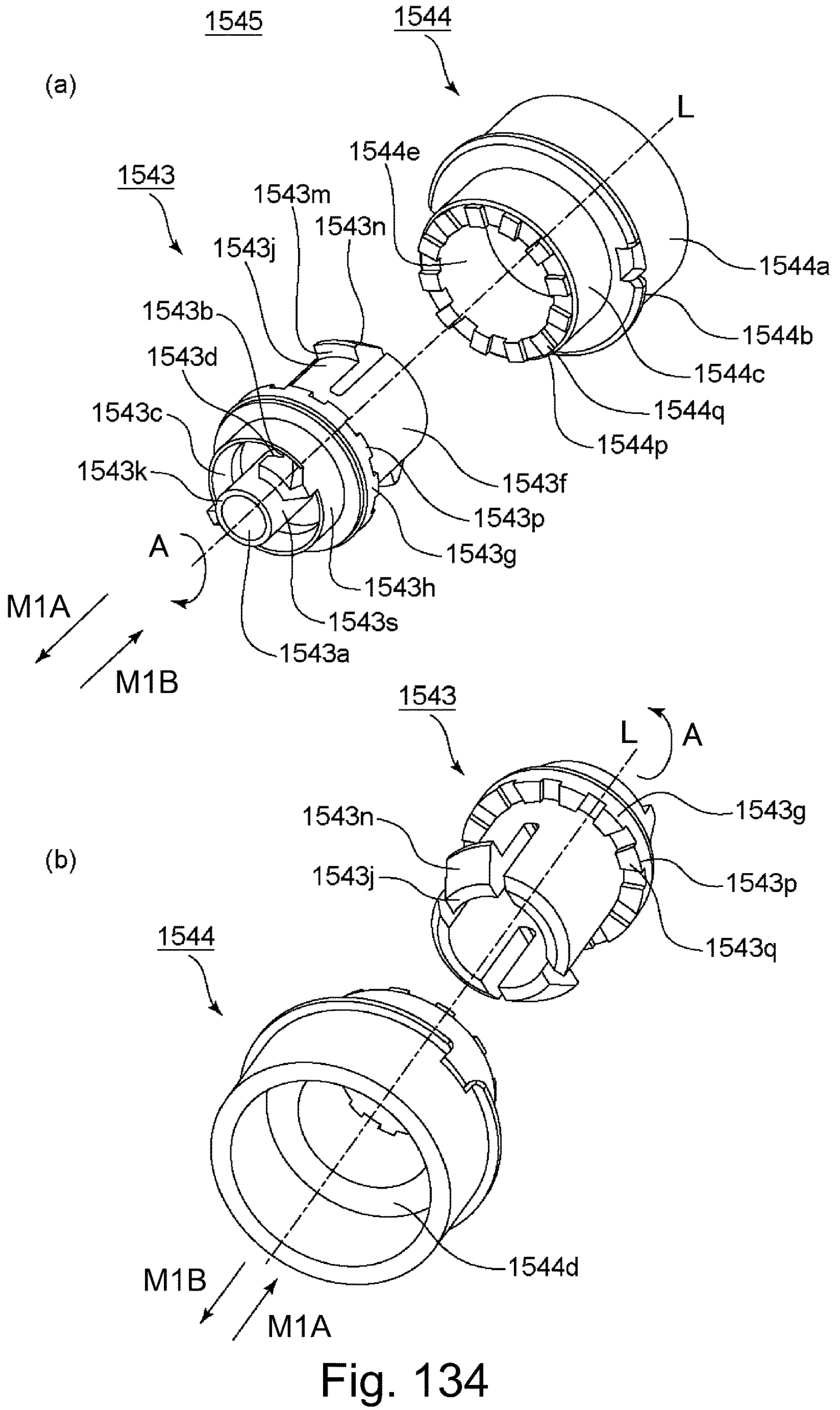

FIG. 134 is exploded perspective views of the drum coupling 1545.

Figure 135:
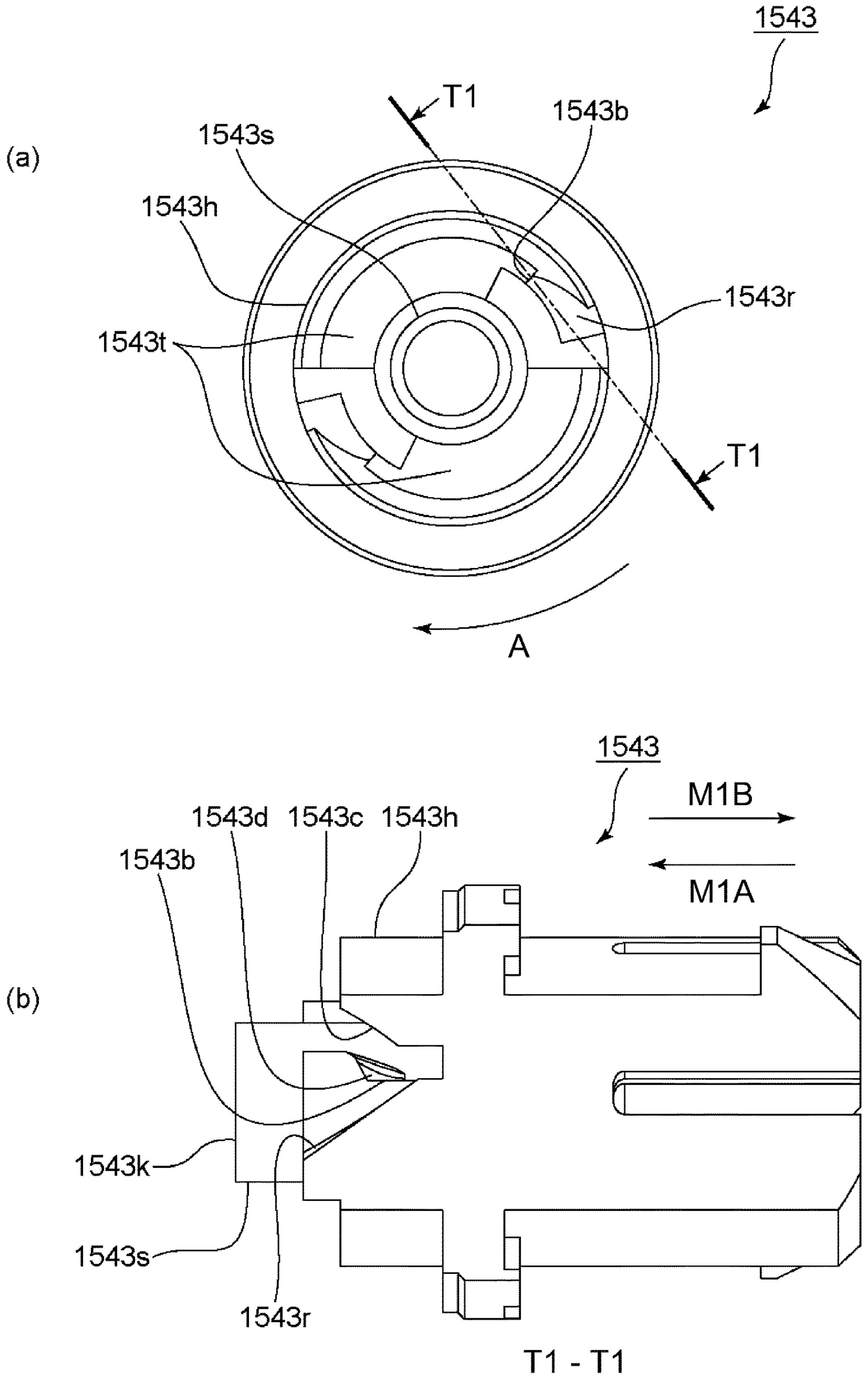

FIG. 135 is a front view and a sectional view of the engaging member 1543 as viewed from the driving side.

Figure 136:
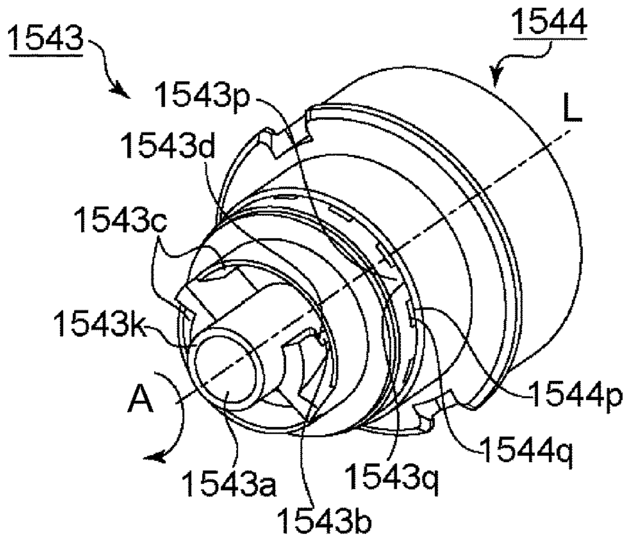
Figure 136:
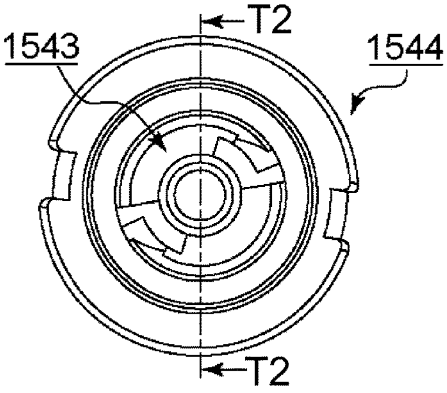
Figure 136:
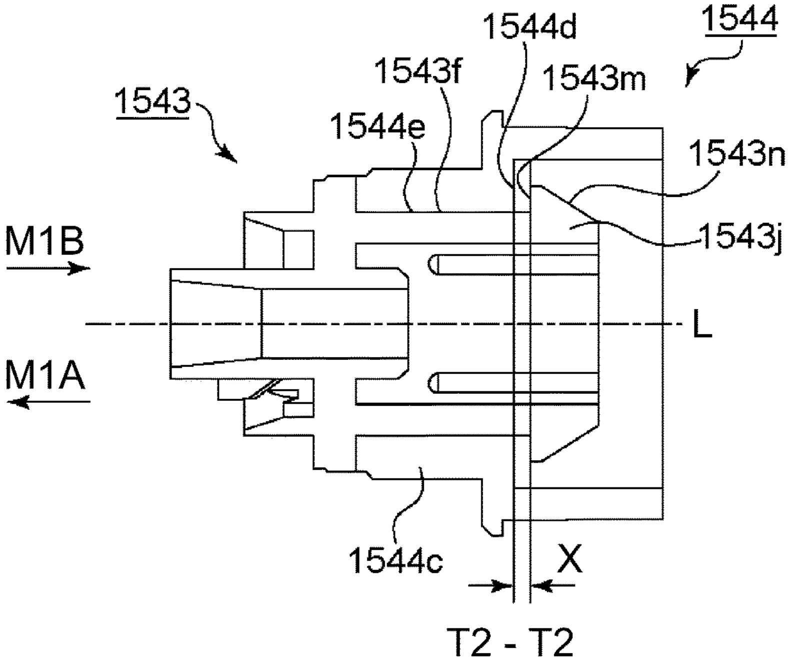

FIG. 136 is a perspective view, a front view, and a sectional view illustrating the engagement between the engaging member 1543 and the flange member 1544.

Figure 137:
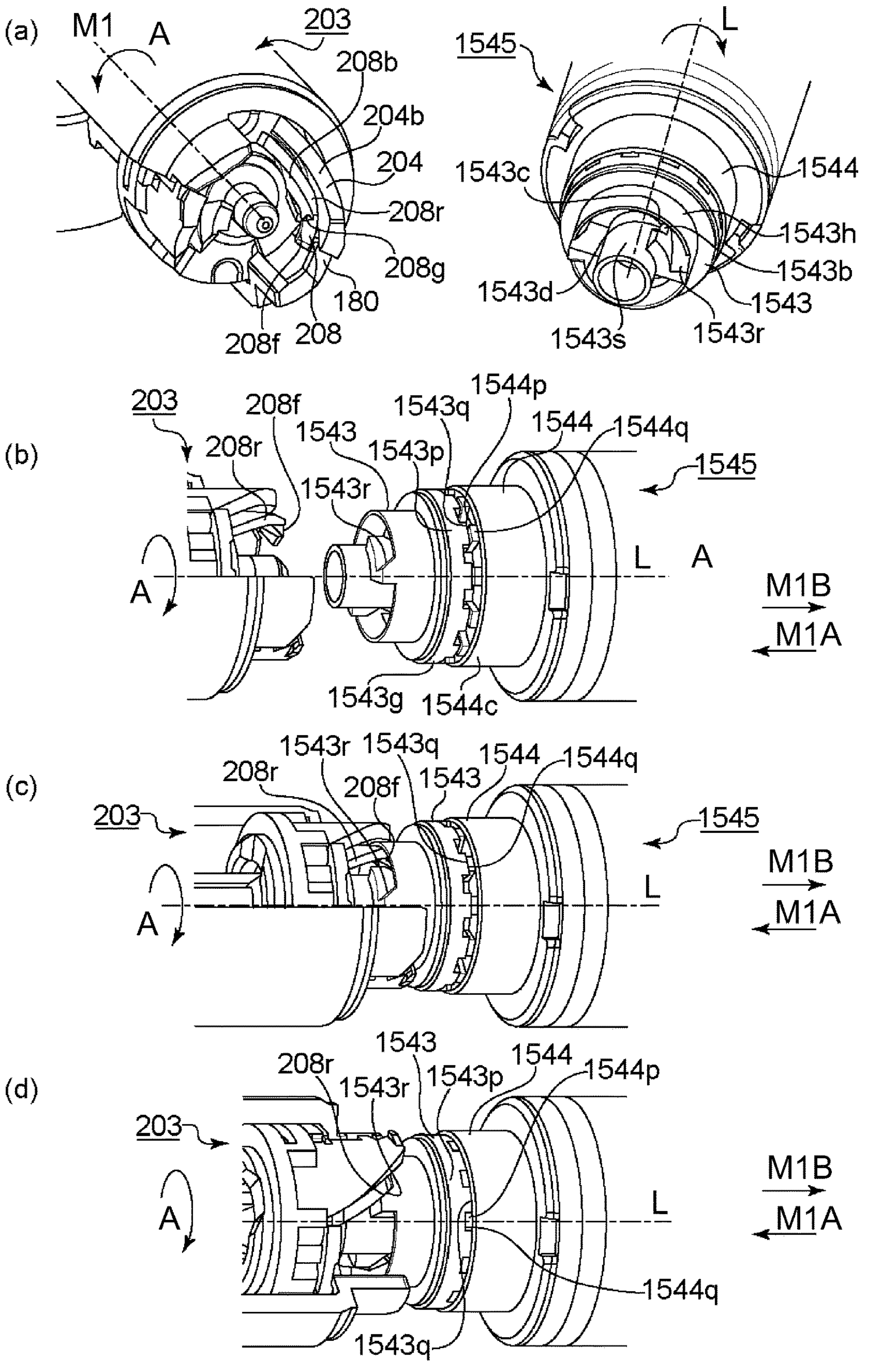

FIG. 137 is front perspective views and an engagement illustration of the drum coupling 1545 and the drive transmission unit 203.

Figure 138:
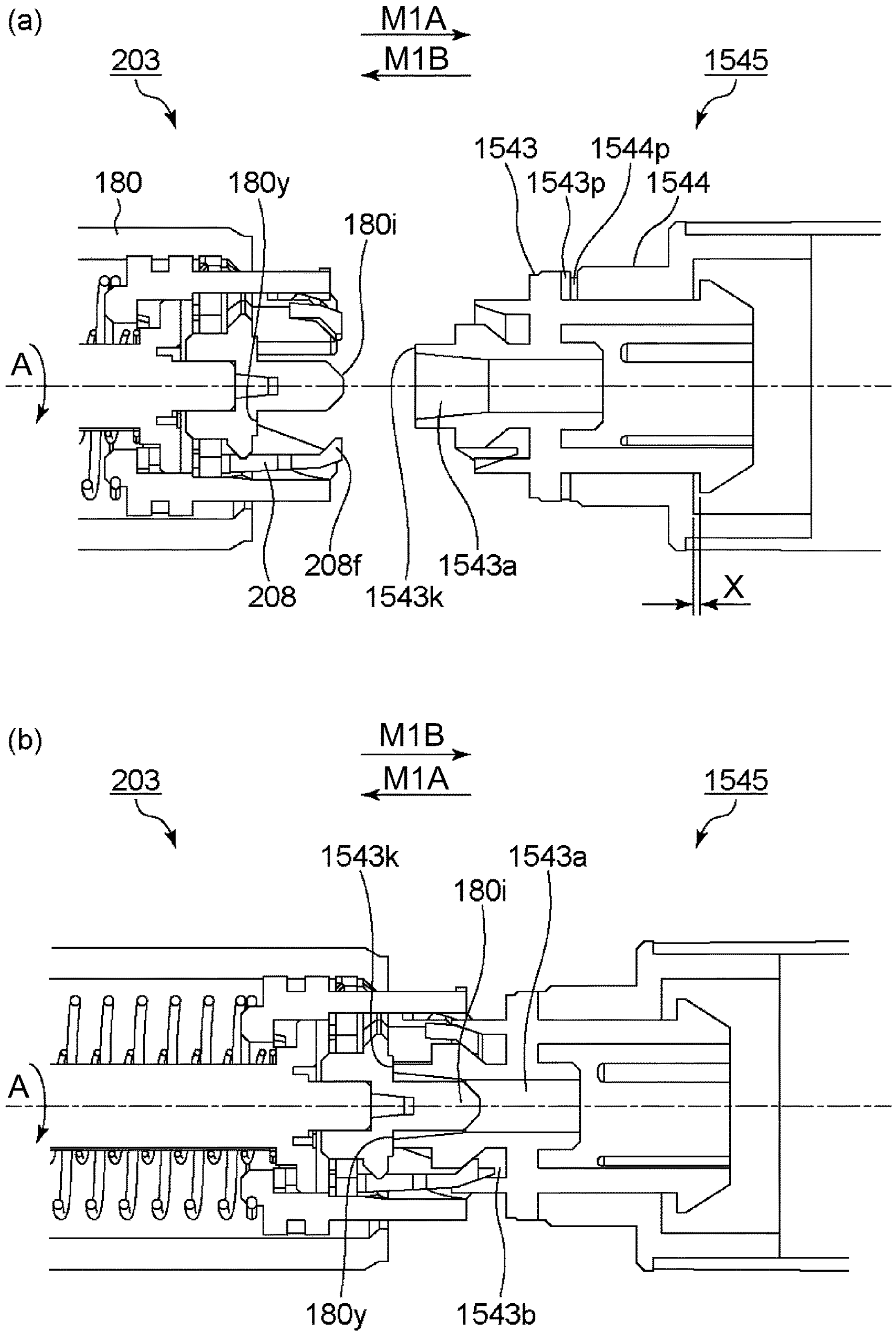

FIG. 138 is cross-sectional views of the drum coupling 1545 and the drive transmission unit before and after engagement, respectively.

Figure 139:
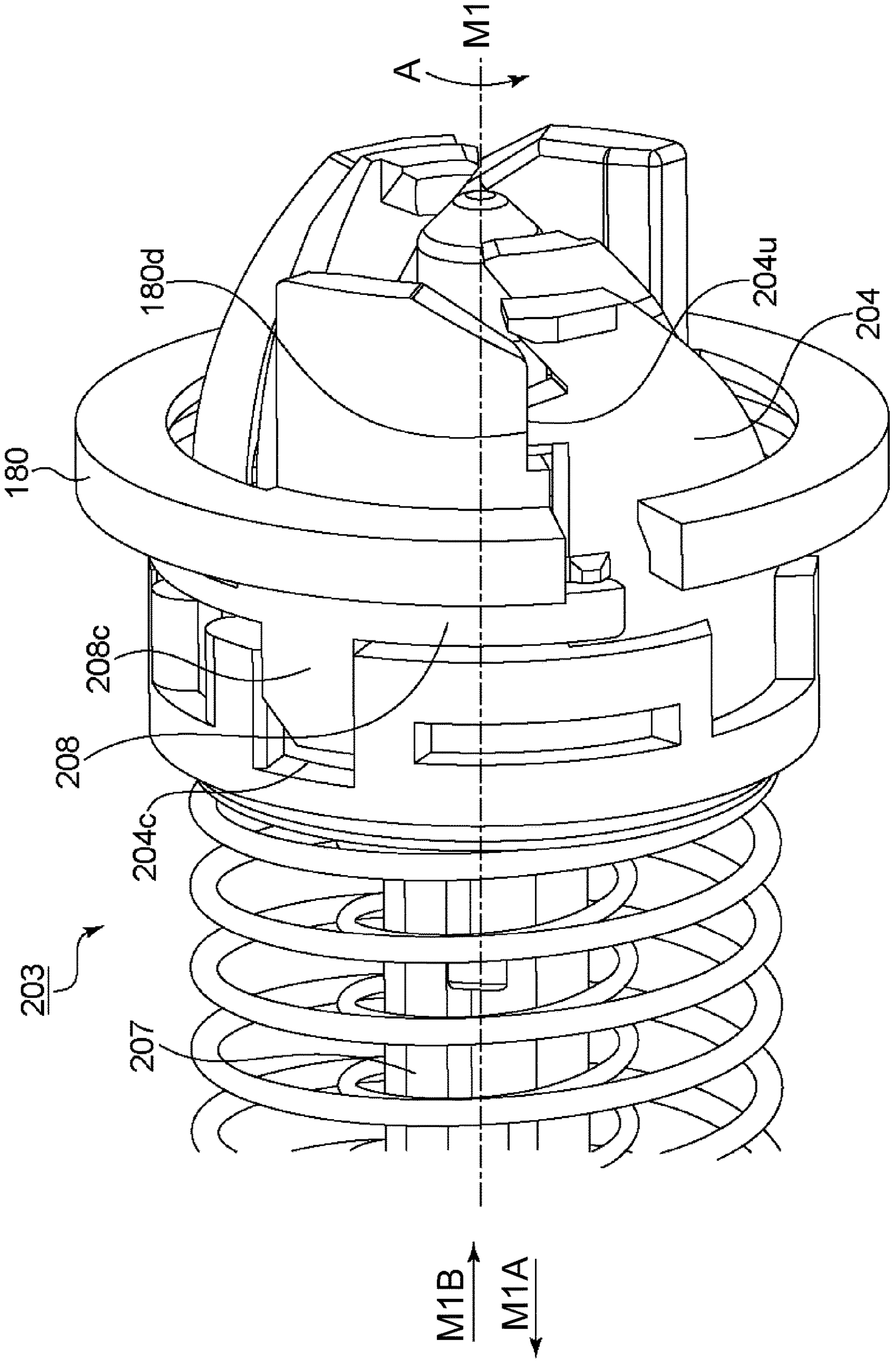

FIG. 139 is a perspective view illustrating the drive transmission of the second brake engaging member 208 and a drum drive coupling 180.

Figure 140:
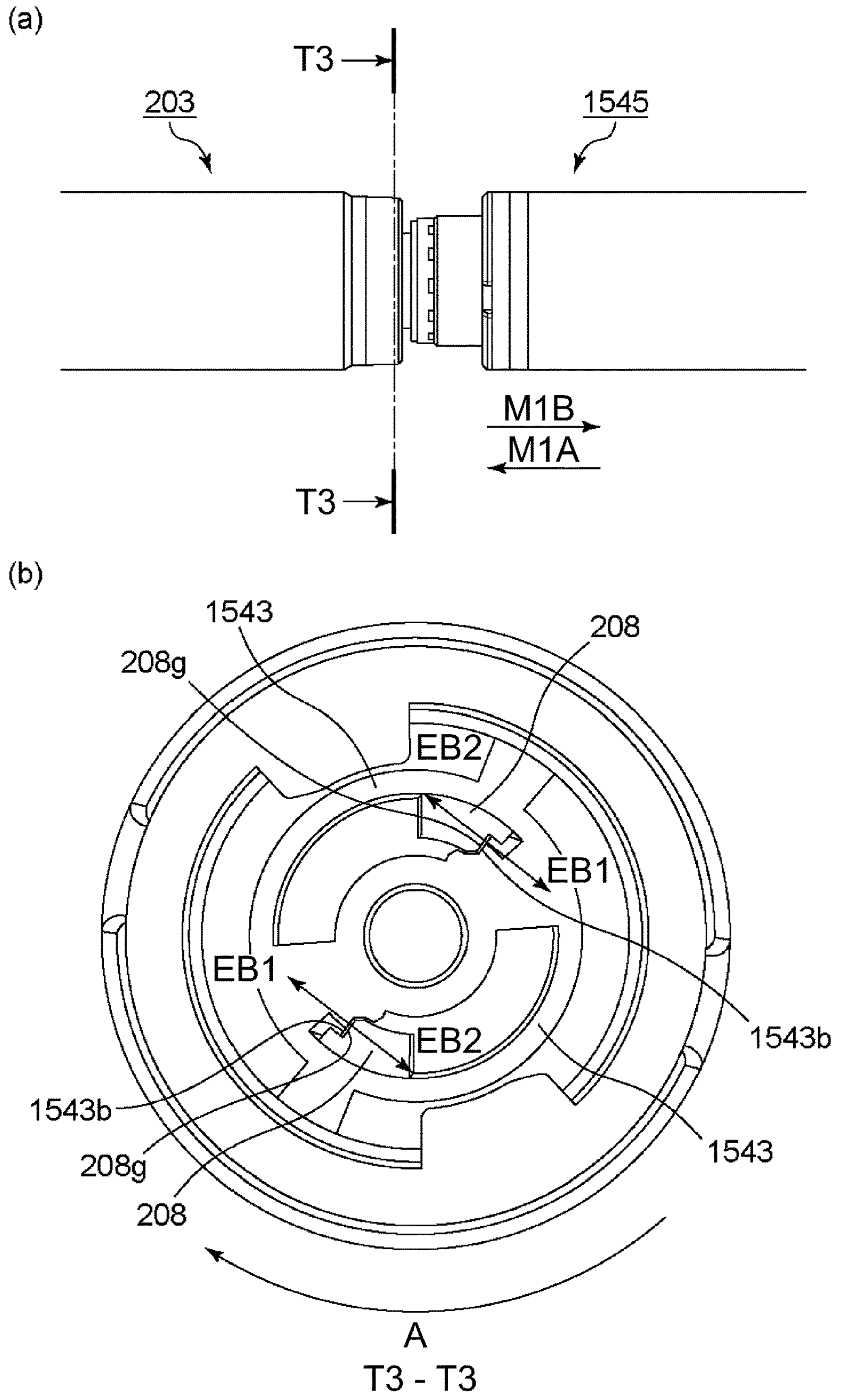

FIG. 140 is a side view and a cross-sectional view of the second brake engaging member 208 and the drive transmission unit 203.

Figure 141:
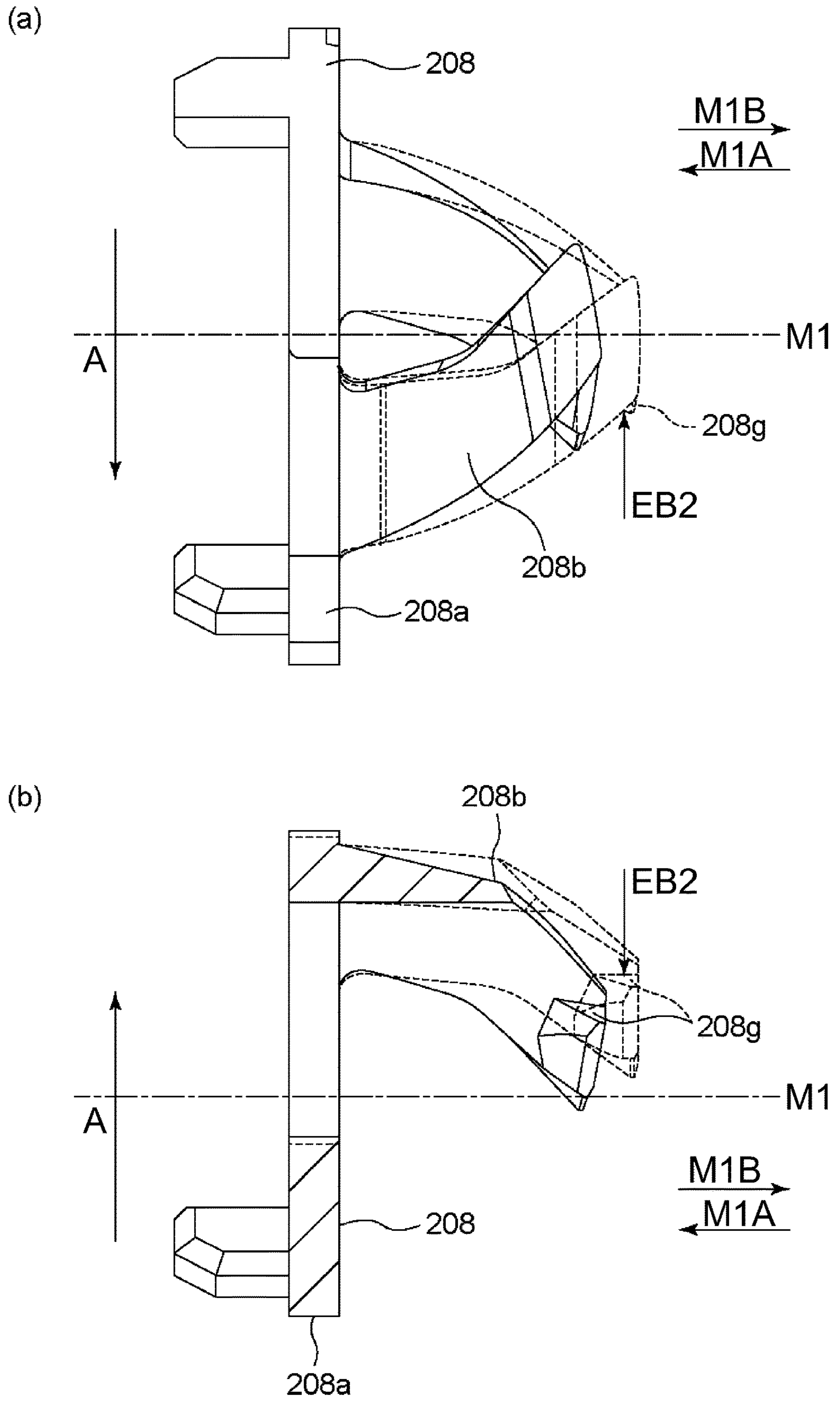

FIG. 141 is illustration showing a deformed state of the second brake engaging member 208.

Figure 142:
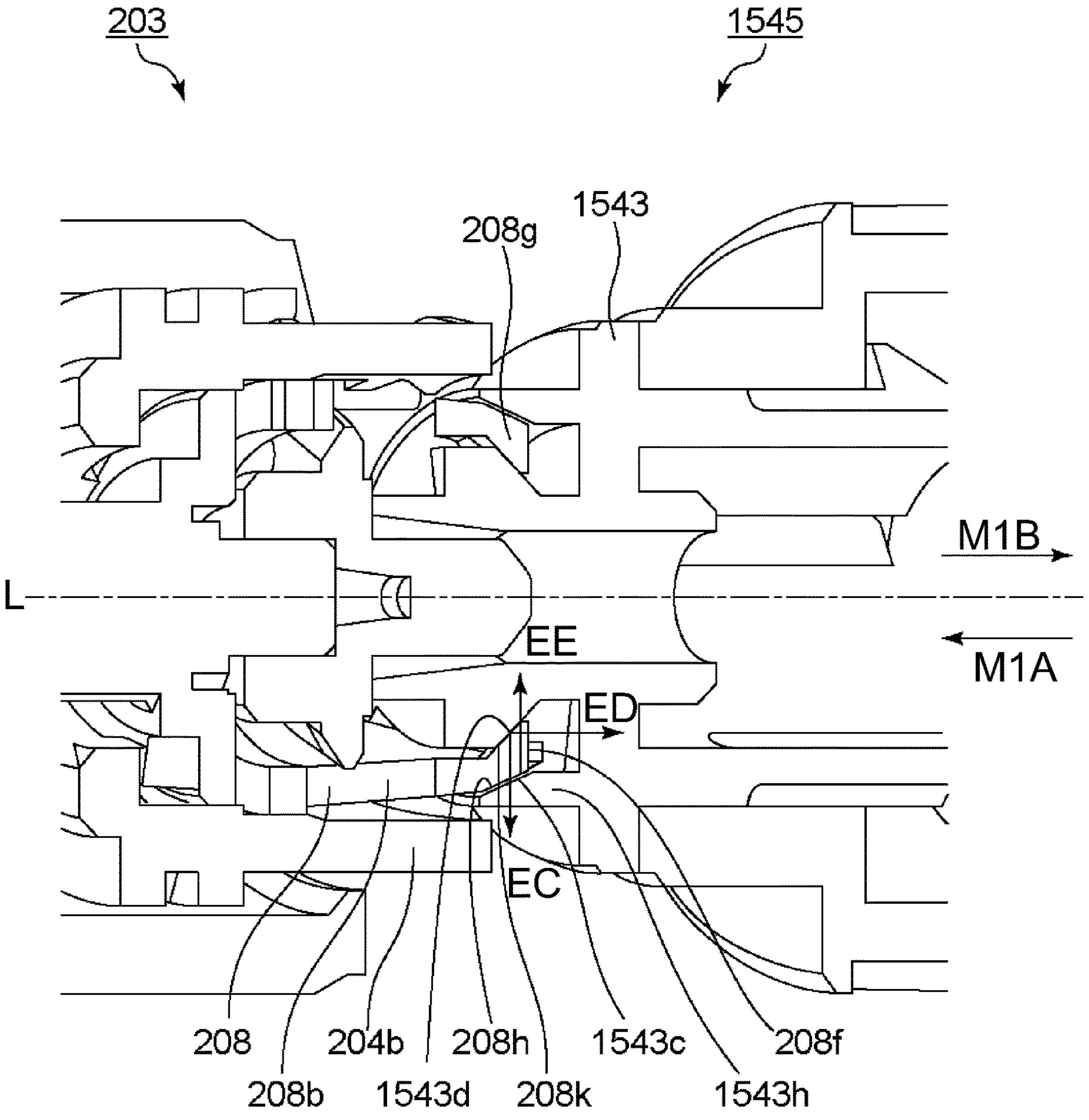

FIG. 142 is a sectional perspective view of the drum coupling 1545 and the drive transmission unit 203.

Figure 143:
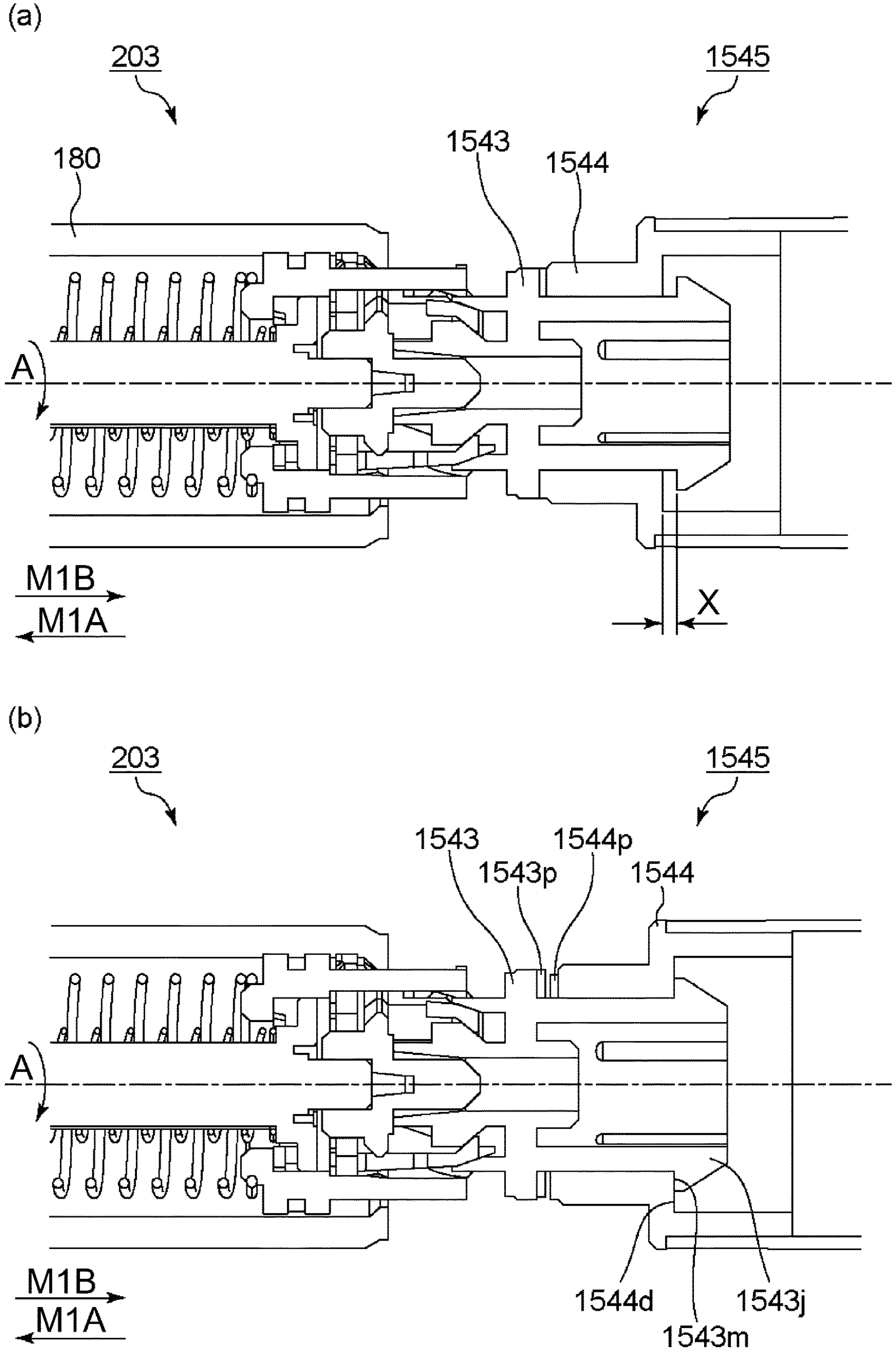

FIG. 143 is sectional views of the drum coupling 1545 and the drive transmission unit 203.

Figure 144:
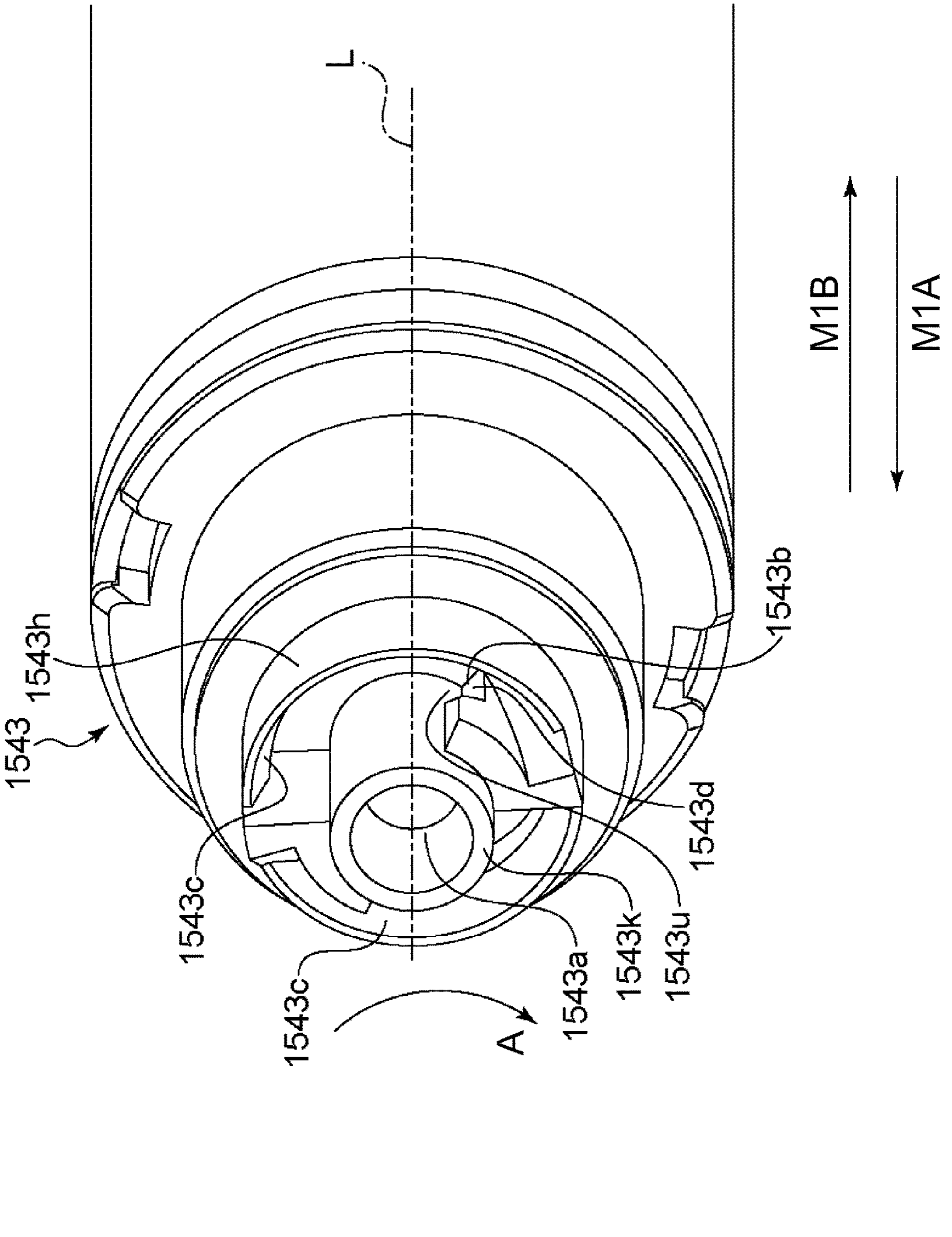

FIG. 144 is a perspective view of another form of drum coupling 1546.

Figure 145:
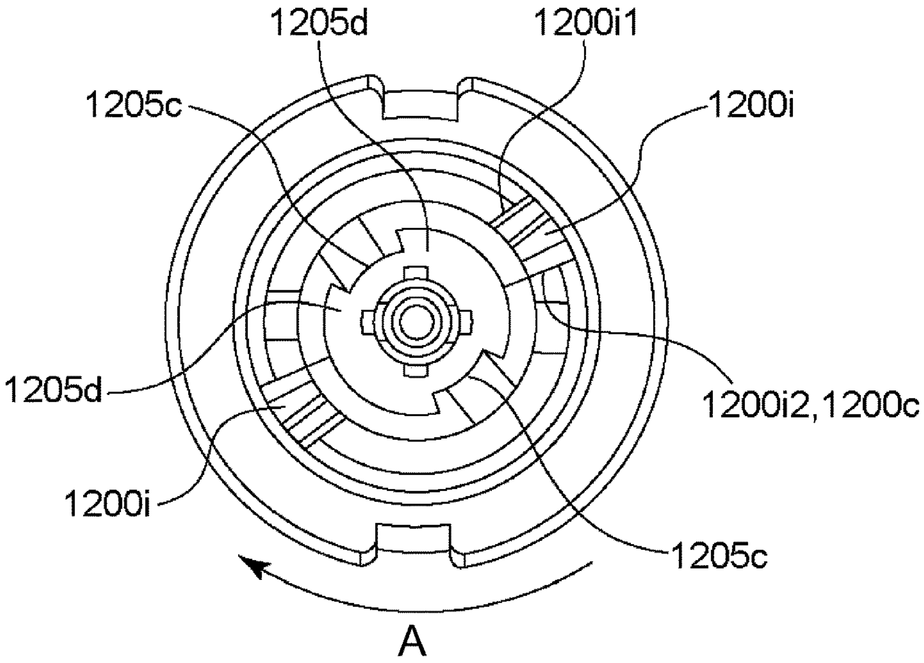
Figure 145:
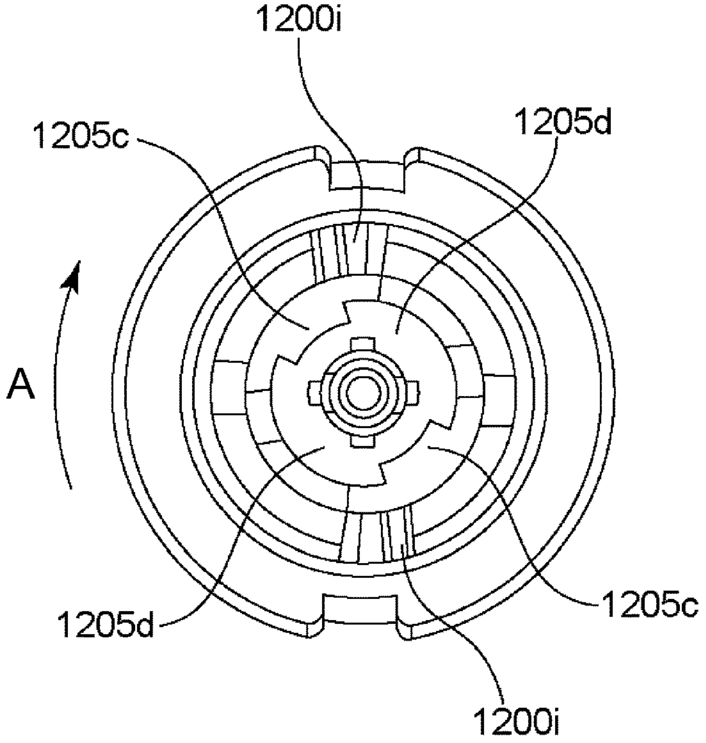

FIG. 145 is front views of the drum coupling.

Figure 146:
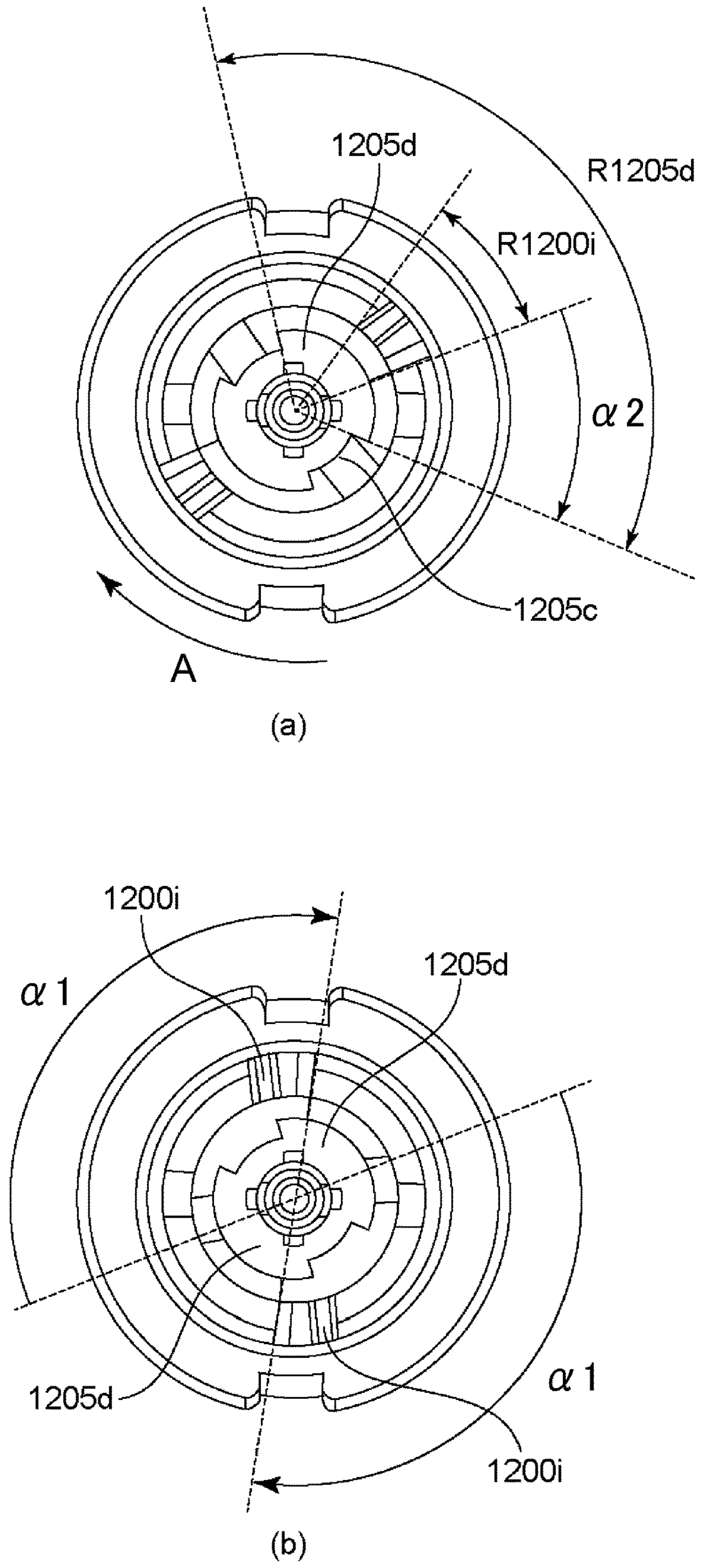

FIG. 146 is front views of the drum coupling.

Figure 147:
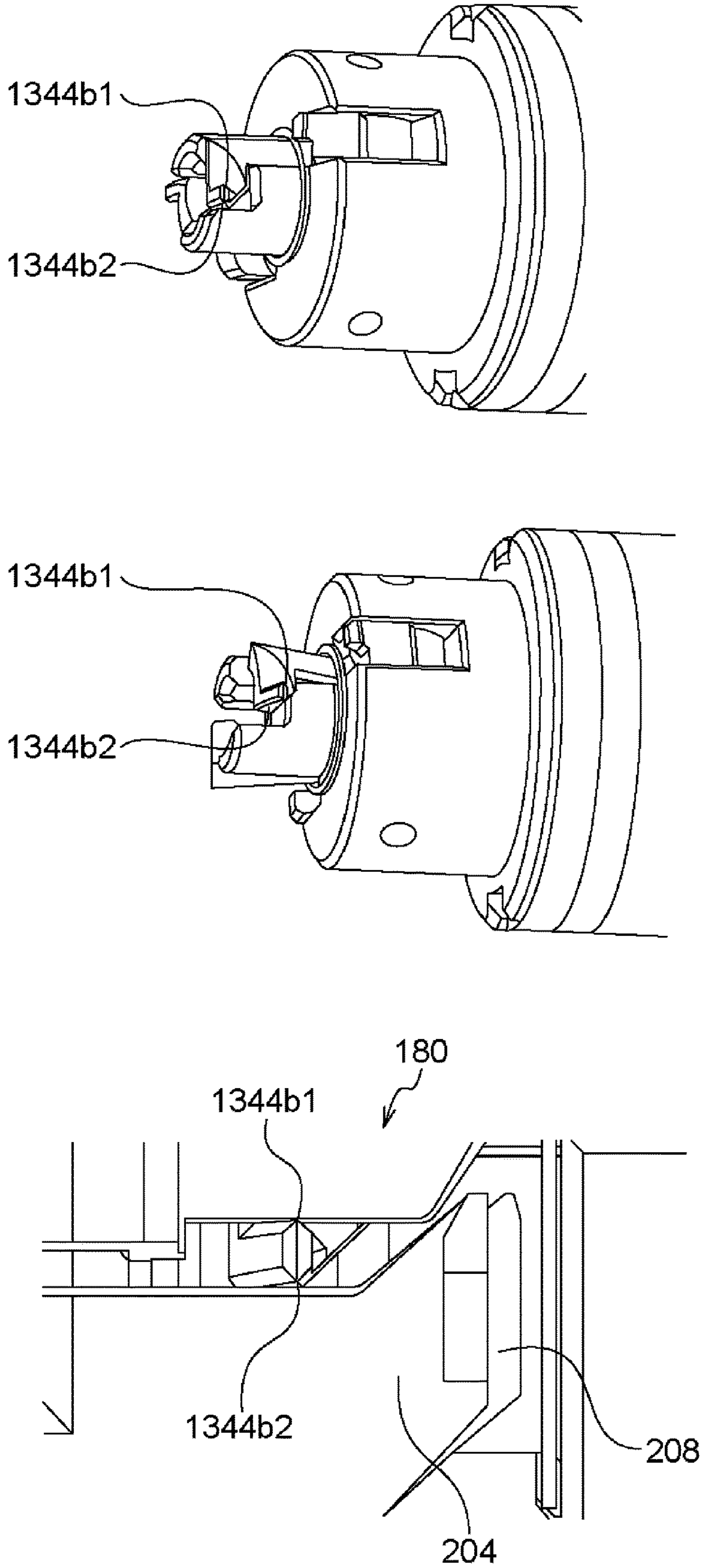

Part (a) of FIG. 147 and part (b) of FIG. 147 are perspective views of the drum coupling. Part (c) of FIG. 147 is illustrations showing the engagement states of the drive transmission unit and the engaging member.

Figure 148:
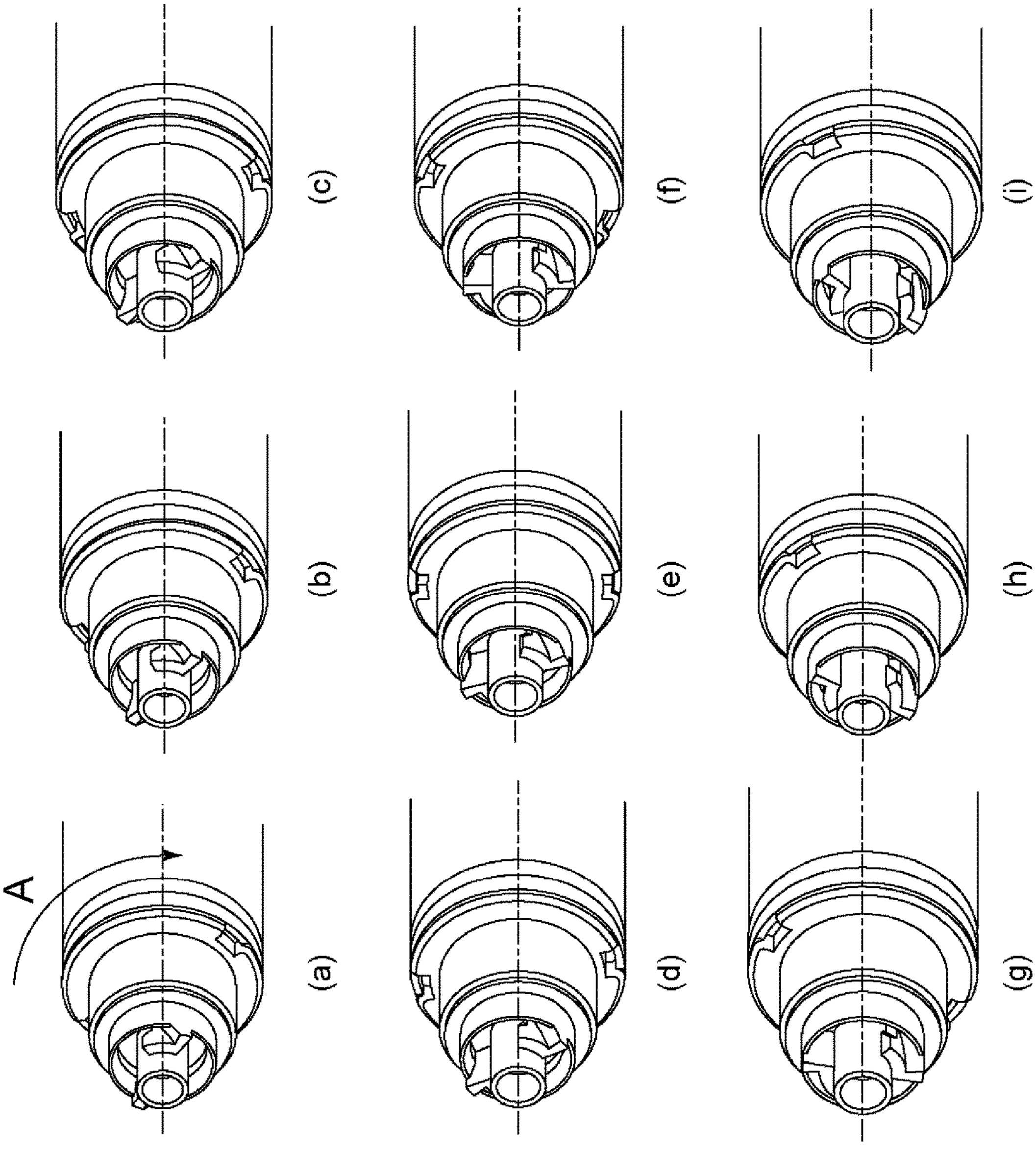

FIG. 148 is perspective views of the drum coupling.

Figure 149:
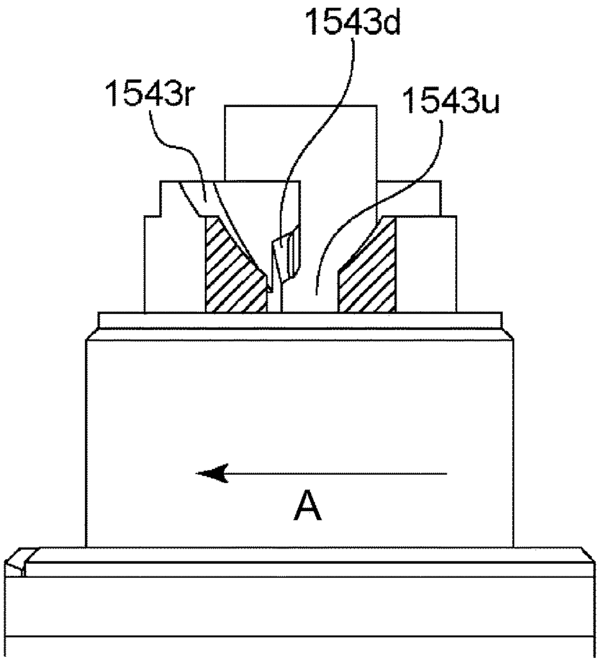
Figure 149:
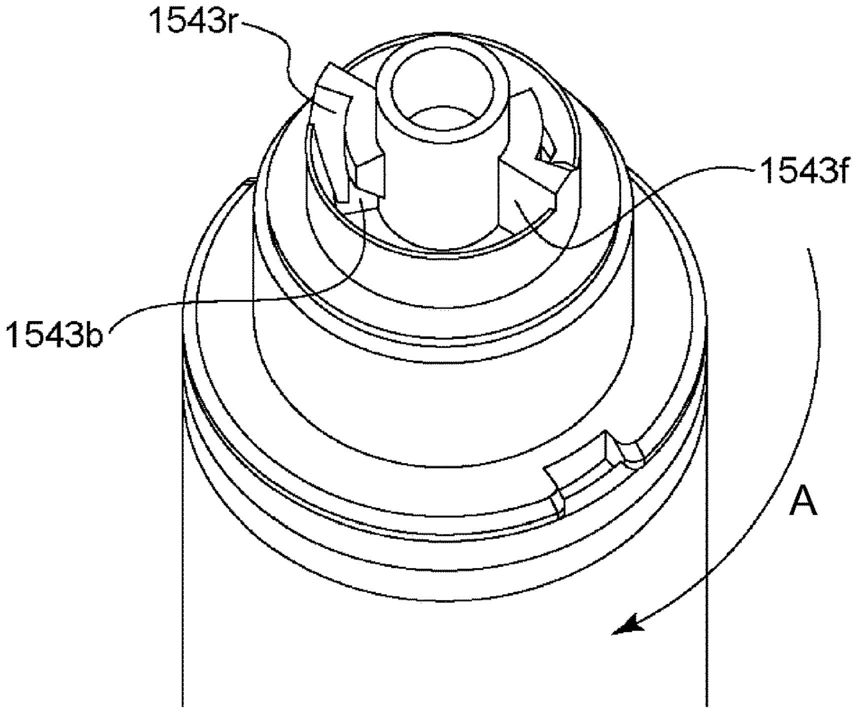

Part (a) of FIG. 149 is a side view of the drum coupling. Part (b) of FIG. 149 is a perspective view of the drum coupling.

Figure 150:
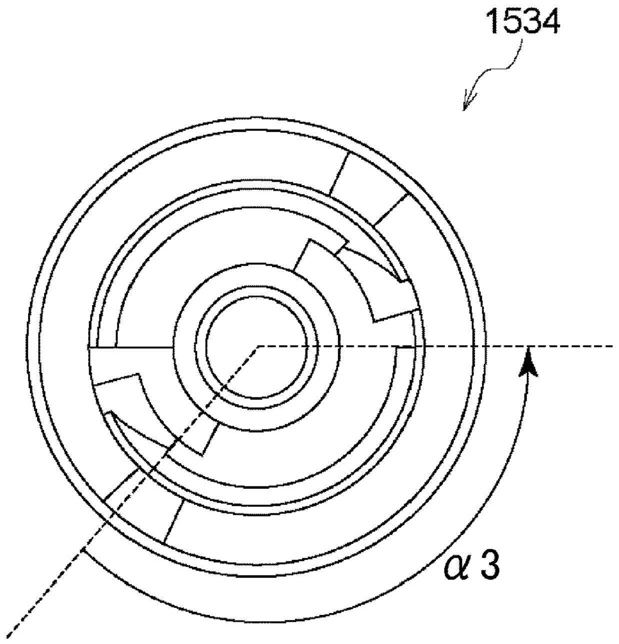
Figure 150:
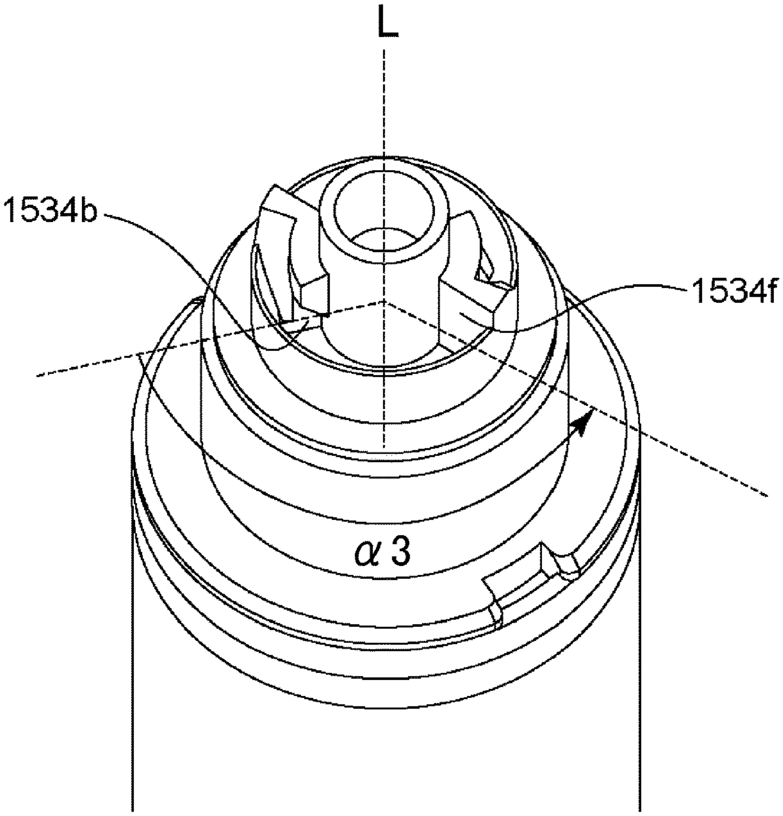

Part (a) of FIG. 150 is a front view of the drum coupling. Part (b) of FIG. 150 is a perspective view of the drum coupling.

DESCRIPTION OF THE EMBODIMENTS

Embodiment 1

Hereinafter, a mode for carrying out the present invention will be described in detail exemplarily with reference to the drawings and examples. However, the functions, materials, shapes, relative arrangements, and the like of the components described in this embodiment are not intended to limit the scope of the present invention to those, unless otherwise specified.

Hereinafter, the Embodiment 1 will be described with reference to the drawings.

In the following embodiment, as the image forming apparatus, an image forming apparatus which four process cartridges can be mounted to and dismounted from is illustrated.

The number of process cartridges mounted on the image forming apparatus is not limited to this example. It is selected appropriately as needed.

Further, in the embodiment described below, a laser beam printer is exemplified as one aspect of the image forming apparatus.

[Outline Structure of Image Forming Apparatus]

Figure 2:
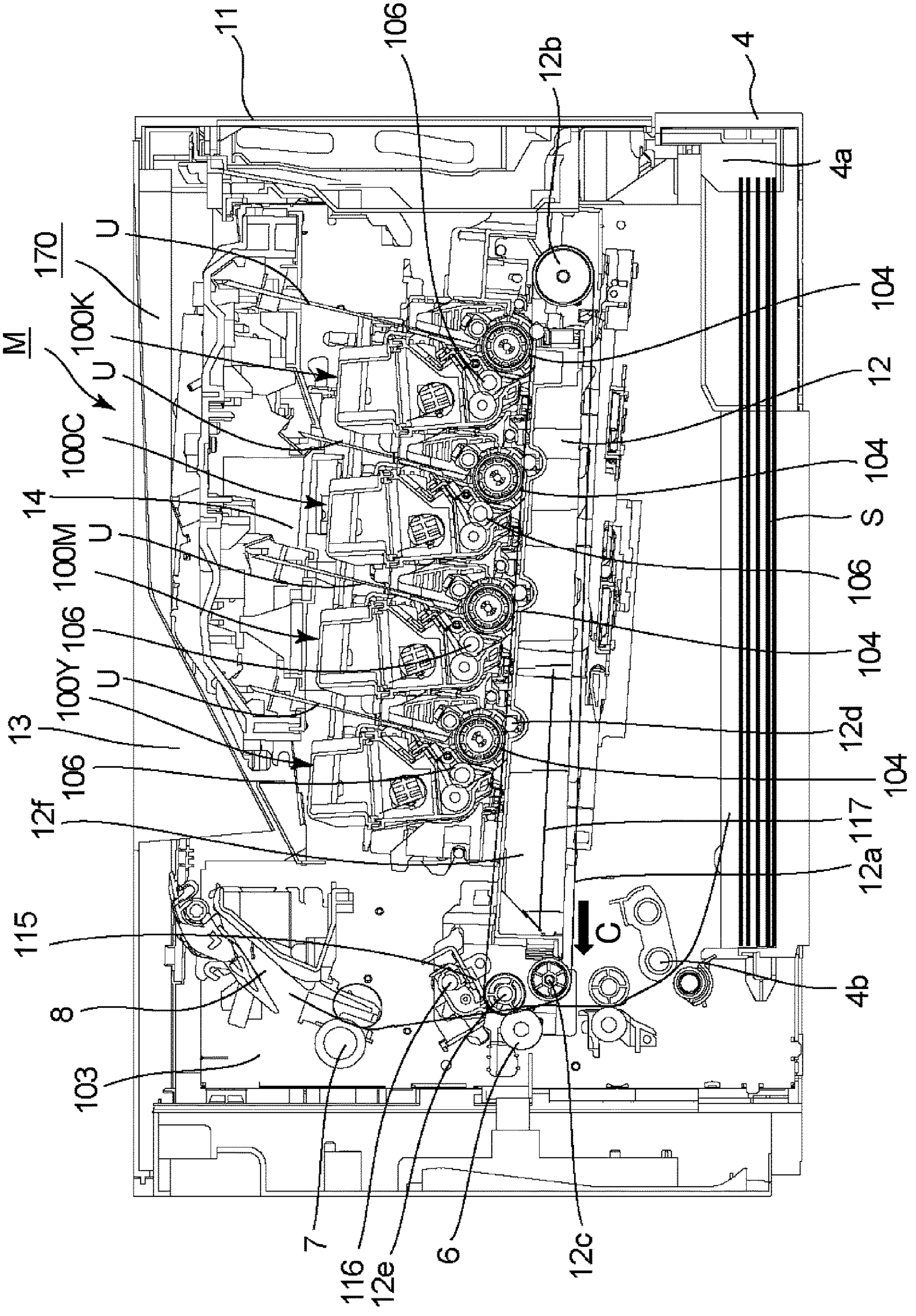
FIG. 2 is a schematic sectional view of an image forming apparatus.
Figure 3:
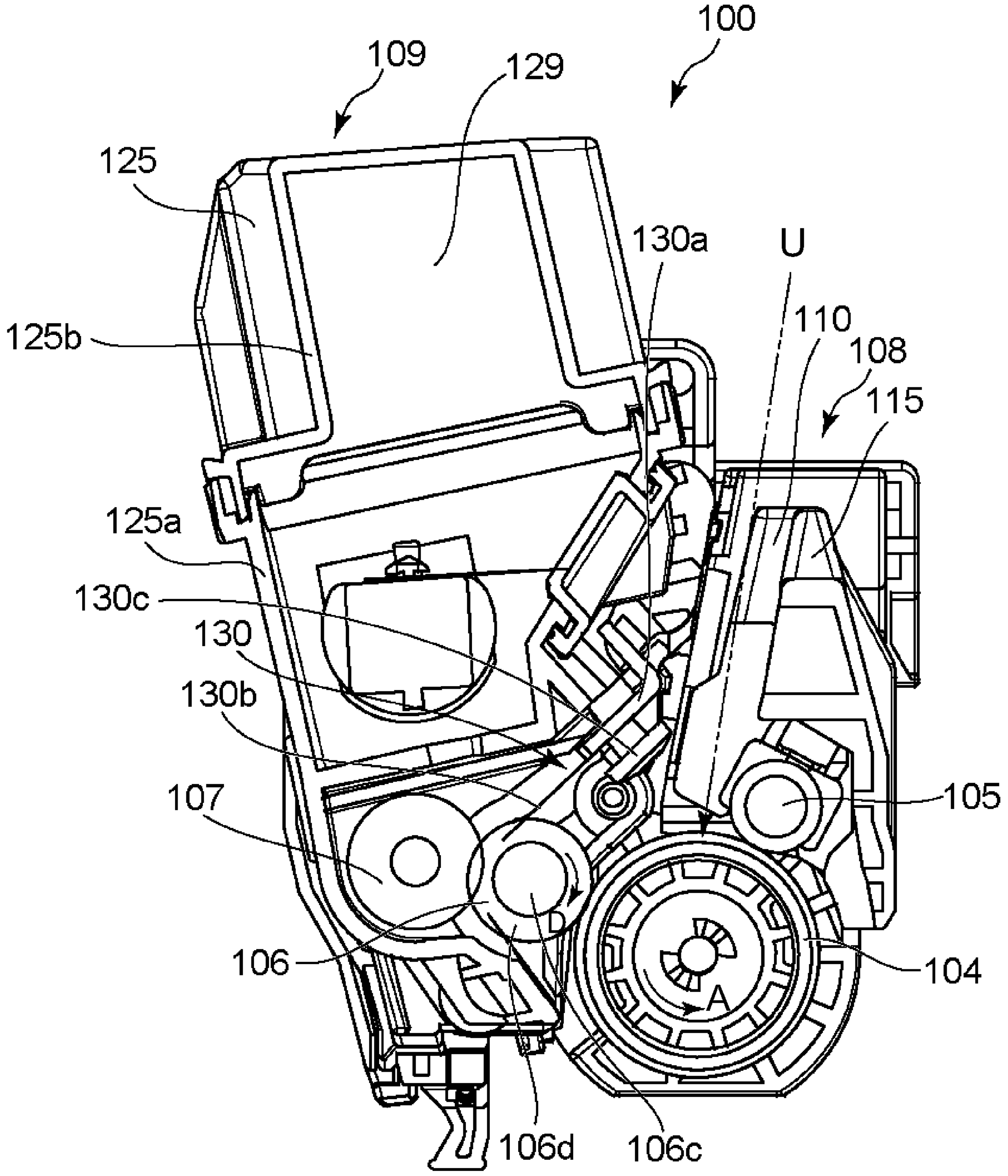
FIG. 3 is a sectional view of a process cartridge.

FIG. 2 is a schematic sectional view of the image forming apparatus M. Further, FIG. 3 is a sectional view of the process cartridge 100.

The image forming apparatus M is a four-color full-color laser printer using an electrophotographic process, and forms a color image on the recording material S. The image forming apparatus M is a process cartridge type, and a process cartridge is dismountably mounted to the image forming apparatus main assembly (apparatus main assembly, electrophotographic image forming apparatus main assembly) 170 to form a color image on the recording material S.

Here, regarding the image forming apparatus M, the side where the front door 11 is provided is the front surface (front surface), and the surface opposite to the front surface is the back surface (rear surface). Further, the right side of the image forming apparatus M as viewed from the front is referred to as a driving side, and the left side is referred to as a non-driving side.

Further, as the image forming apparatus M is viewed from the front side, the upper side is the upper surface and the lower side is the lower surface. FIG. 2 is a sectional view of the image forming apparatus M as viewed from the non-driving side; the front side of the sheet of the drawing is the non-driving side of the image forming apparatus M; the right side of the sheet of the drawing is the front side; and the rear side of the sheet of the drawing is the driving side of the image forming apparatus.

The driving side of the process cartridge 100 is the side on which the drum coupling (photosensitive member coupling) which will be described hereinafter is disposed in the axial direction of the photosensitive drum. Further, the driving side of the process cartridge 100 is also the side on which the development coupling described hereinafter is arranged in the axial direction of the developing roller (developing member).

The axial direction of the photosensitive drum is a direction parallel to the rotation axis of the photosensitive drum, which will be described hereinafter. Similarly, the axial direction of the developing roller is a direction parallel to the rotation axis of the developing roller, which will be described hereinafter. In this embodiment, the axis of the photosensitive drum and the axis of the developing roller are substantially parallel, and therefore, the axial direction of the photosensitive drum and the axial direction of the developing roller are considered to be substantially the same.

The image forming apparatus main assembly 170 has four process cartridges 100 (100Y, 100M, 100C, 100K), namely a first process cartridge 100Y, a second process cartridge 100M, a third process cartridge 100C, and a fourth process cartridge 100K, which are arranged almost horizontally.

Each of the first to fourth process cartridges 100 (100Y, 100M, 100C, 100K) has the same electrophotographic process mechanism, and the colors of the developer (hereinafter referred to as toner) are different. Rotational driving force is transmitted to the first to fourth process cartridges 100 (100Y, 100M, 100C, 100K) from a drive output portion (details will be described hereinafter) of the image forming apparatus main assembly 170.

Further, bias voltages (charging bias, development bias, and so on) are supplied from the image forming apparatus main assembly 170 to each of the first to fourth process cartridges 100 (100Y, 100M, 100C, 100K) (not shown).

As shown in FIG. 3, each of the first to fourth process cartridges 100 (100Y, 100M, 100C, 100K) of this embodiment includes a photosensitive drum 104 and a drum holding unit 108 which is provided with charging means functioning as a process means acting on the photosensitive drum 104. Further, each of the first to fourth process cartridges 100 (100Y, 100M, 100C, 100K) includes a developing unit 109 provided with a developing means for developing an electrostatic latent image on the photosensitive drum 104.

The drum holding unit 108 and the developing unit 109 are coupled to each other. A more specific structure of the process cartridge 100 will be described hereinafter.

The first process cartridge 100Y contains yellow (Y) toner in a development frame 125, and forms a yellow-color toner image on the surface of the photosensitive drum 104.

The second process cartridge 100M contains magenta (M) toner in a development frame 125, and forms a magenta-color toner image on the surface of the photosensitive drum 104.

The third process cartridge 100C contains cyan (C) toner in a development frame 125, and forms a cyan-color toner image on the surface of the photosensitive drum 104.

The fourth process cartridge 100K contains black (K) toner in a development frame 125, and forms a black toner image on the surface of the photosensitive drum 104. A laser scanner unit 14 as an exposure means is provided above the first to fourth process cartridges 100 (100Y, 100M, 100C, 100K). The laser scanner unit 14 outputs a laser beam U corresponding to the image information. The laser beam U passes through the exposure window 110 of the process cartridge 100 and scans so that the surface of the photosensitive drum 104 is exposed to the laser beam U.

Below the first to fourth process cartridges 100 (100Y, 100M, 100C, 100K), an intermediary transfer unit 12 as a transfer member is provided. The intermediary transfer unit 12 includes a drive roller 12*e*, a turn roller 12*c*, and a tension roller 12*b*, and a flexible transfer belt 12*a* is extended around these rollers.

The lower surface of the photosensitive drum 104 of each of the first to fourth process cartridges 100 (100Y, 100M, 100C, 100K) is in contact with the upper surface of the transfer belt 12*a*. The contact portion is the primary transfer portion. Inside the transfer belt 12*a*, a primary transfer roller 12*d* is provided so as to oppose the photosensitive drum 104.

The secondary transfer roller 6 is brought into contact with the turn roller 12*c* by way of the transfer belt 12*a*. The contact portion between the transfer belt 12*a* and the secondary transfer roller 6 is the secondary transfer portion.

A feeding unit 4 is provided below the intermediary transfer unit 12. The feeding unit 4 includes a sheet feed tray 4*a* on which the recording material S is loaded and accommodated, and a sheet feeding roller 4*b*.

A fixing device 7 and a paper discharge ion device 8 are provided on the upper left side of the image forming apparatus main assembly 170 in FIG. 2. The upper surface of the image forming apparatus main assembly 170 functions as a paper discharge tray 13.

The toner image is fixed on the recording material S by a fixing means provided in the fixing device 7, and the recording material is discharged to the paper discharge tray 13.

[Image Forming Operation]

The operation for forming a full-color image is as follows.

The photosensitive drum 104 of each of the first to fourth process cartridges 100 (100Y, 100M, 100C, 100K) is rotationally driven at a predetermined speed (in the direction of arrow A in FIG. 3).

The transfer belt 12*a* is also rotationally driven in the forward direction (direction of arrow C in FIG. 2) codirectionally with the rotation of the photosensitive drum at a speed corresponding to the speed of the photosensitive drum 104.

The laser scanner unit 14 is also driven. In synchronization with the drive of the laser scanner unit 14, the charging roller 105 uniformly charges the surface of the photosensitive drum 104 to a predetermined polarity and potential in each process cartridge. The laser scanner unit 14 scans and exposes the surface of each photosensitive drum 104 with laser beam U in accordance with the image signals of each color.

By this, an electrostatic latent image corresponding to the image signal of the corresponding color is formed on the surface of each photosensitive drum 104. The formed electrostatic latent image is developed by a developing roller 106 which is rotationally driven at a predetermined speed. More specifically, the developing roller 106 is in contact with the photosensitive drum 104, and the toner moves from the developing roller 106 to the latent image of the photosensitive drum 104, so that the latent image is developed into a toner image. In this embodiment, the contact developing method is employed, and the developing roller 106 and the photosensitive drum 104 are in contact with each other. However, there a non-contact development method may be employed in which toner jumps from the developing roller 106 to the photosensitive drum 104 through a small gap between the developing roller 106 and the photosensitive drum 104.

Through the electrophotographic image forming process operation as described above, a yellow toner image corresponding to the yellow component of the full-color image is formed on the photosensitive drum 104 of the first process cartridge 100Y. Then, the toner image is primary-transferred onto the transfer belt 12*a*. A part of the photosensitive drum 104 is exposed to the outside of the cartridge and is in contact with the transfer belt 12*a*. At this contact portion, the toner image on the surface of the photosensitive drum 104 transferred onto the transfer belt 12*a*.

Similarly, a magenta color toner image corresponding to the magenta component of the full color image is formed on the photosensitive drum 104 of the second process cartridge 100M. Then, the toner image is superimposedly transferred onto the yellow toner image already transferred on the transfer belt 12*a*.

Similarly, a cyan toner image corresponding to the cyan component of the full-color image is formed on the photosensitive drum 104 of the third process cartridge 100C. Then, the toner image is superimposedly primary-transferred onto the yellow-colored and magenta-colored toner images already transferred on the transfer belt 12*a*.

Similarly, a black toner image corresponding to the black component of the full-color image is formed on the photosensitive drum 104 of the fourth process cartridge 100K. Then, the toner image is superimposedly primary-transferred onto the yellow, magenta, and cyan toner images already transferred on the transfer belt 12*a*.

In this manner, a four-color full-color unfixed toner image of yellow, magenta, cyan, and black is formed on the transfer belt 12*a*.

On the other hand, the recording materials S are separated and fed one by one at a predetermined controlled timing. The recording material S is introduced then into the secondary transfer portion, which is the contact portion between the secondary transfer roller 6 and the transfer belt 12*a*, at a predetermined control timing.

By this, in the process of feeding the recording material S to the secondary transfer unit, the four-color superimposed toner images on the transfer belt 12*a* are sequentially and collectively transferred onto the surface of the recording material S.

In more detail, the structure of the image forming apparatus main assembly will be described below.

[Outline of Process Cartridge Mounting/Dismounting Structure]

Figure 4:
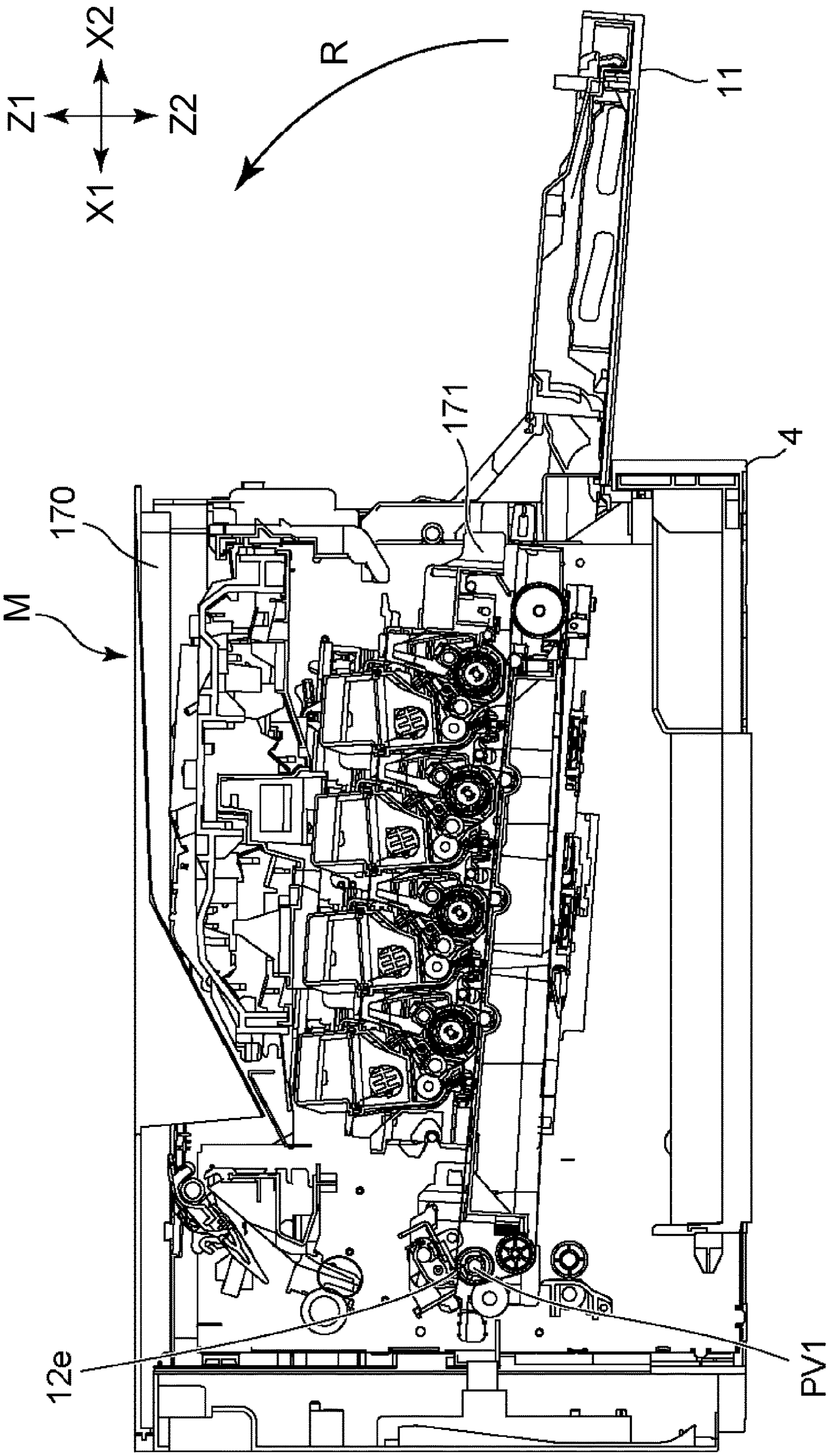
FIG. 4 is a sectional view of the image forming apparatus.
Figure 5:
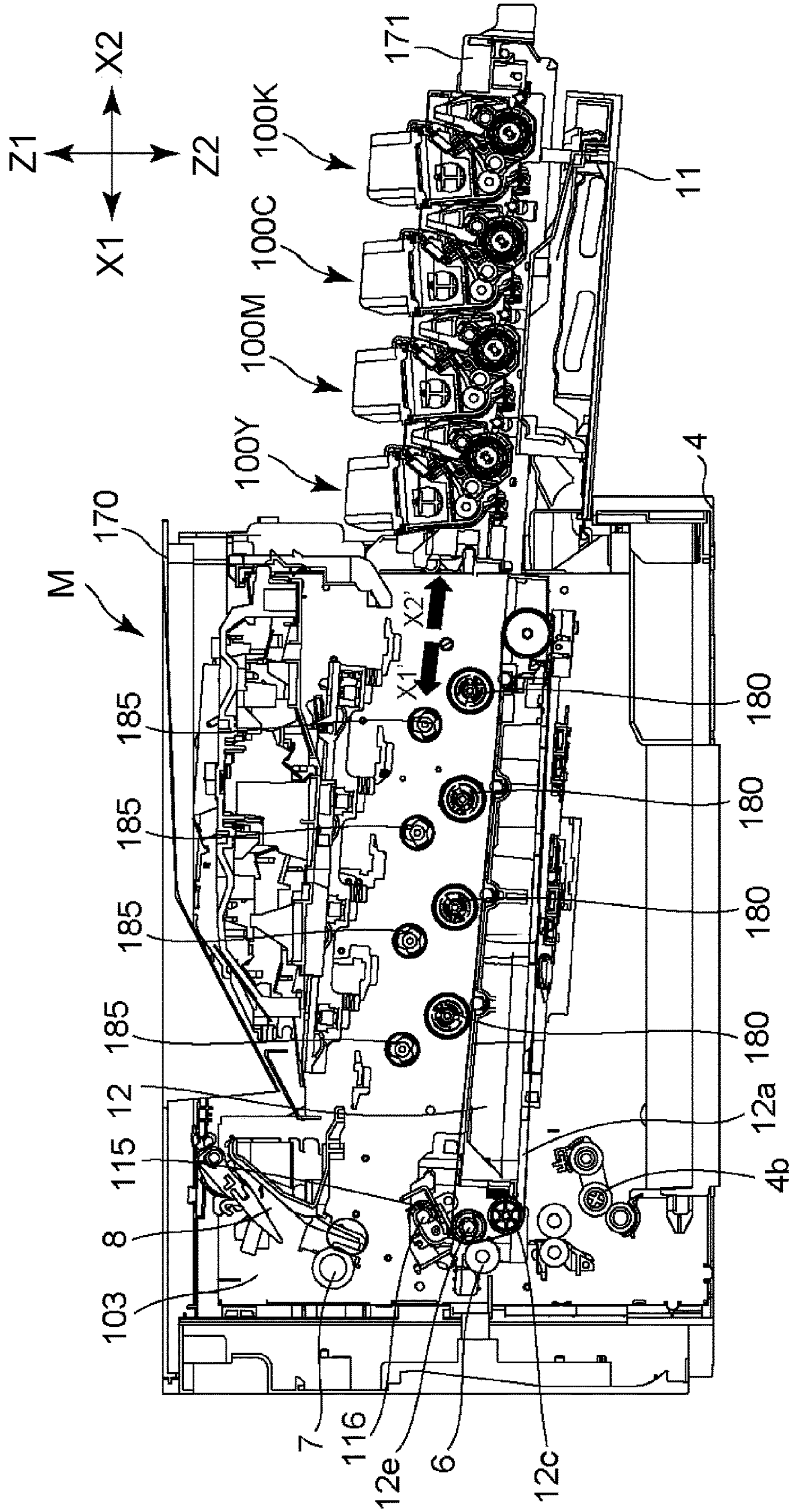
FIG. 5 is a sectional view of the image forming apparatus.
Figure 6:
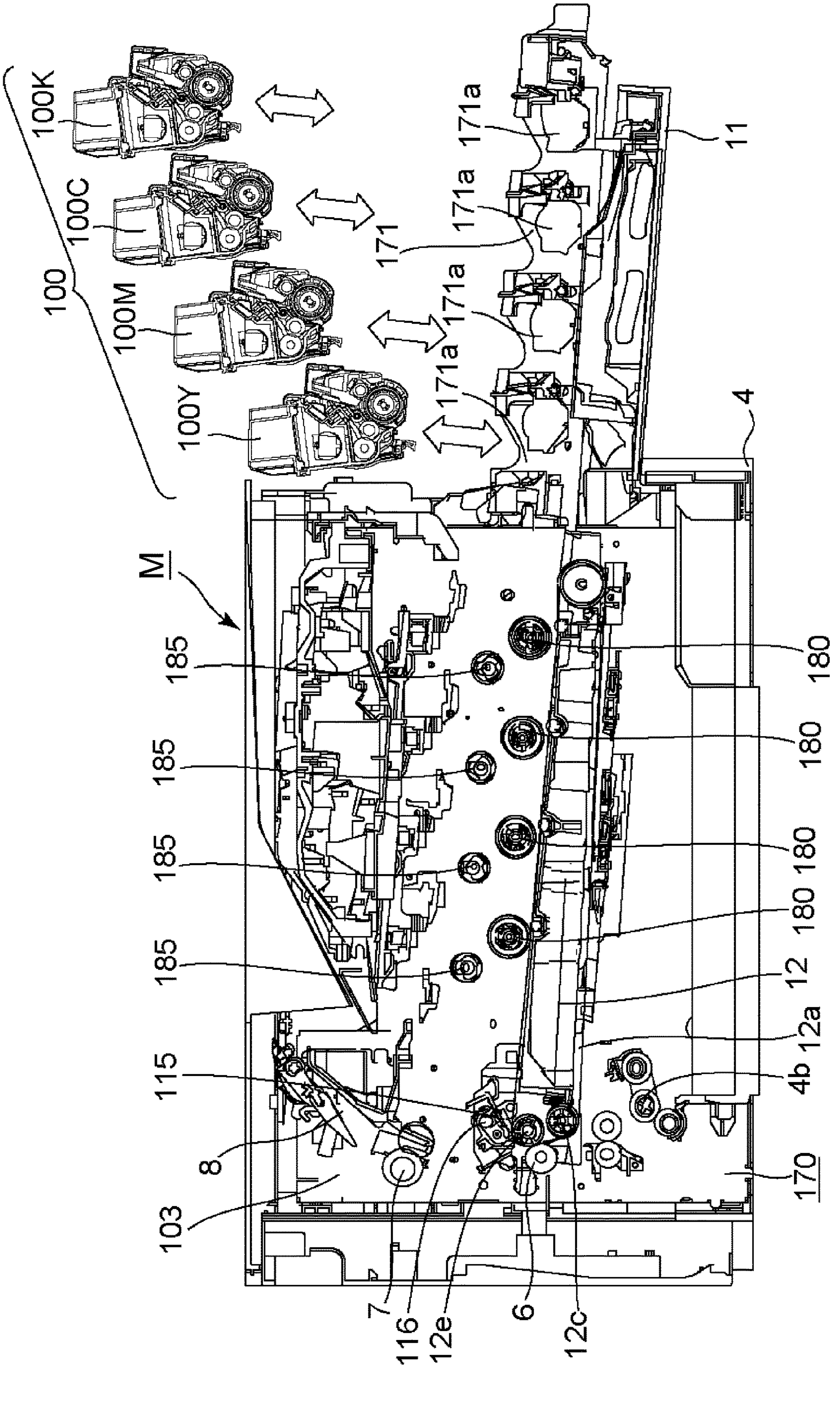
FIG. 6 is a sectional view of the image forming apparatus.
Figure 7:
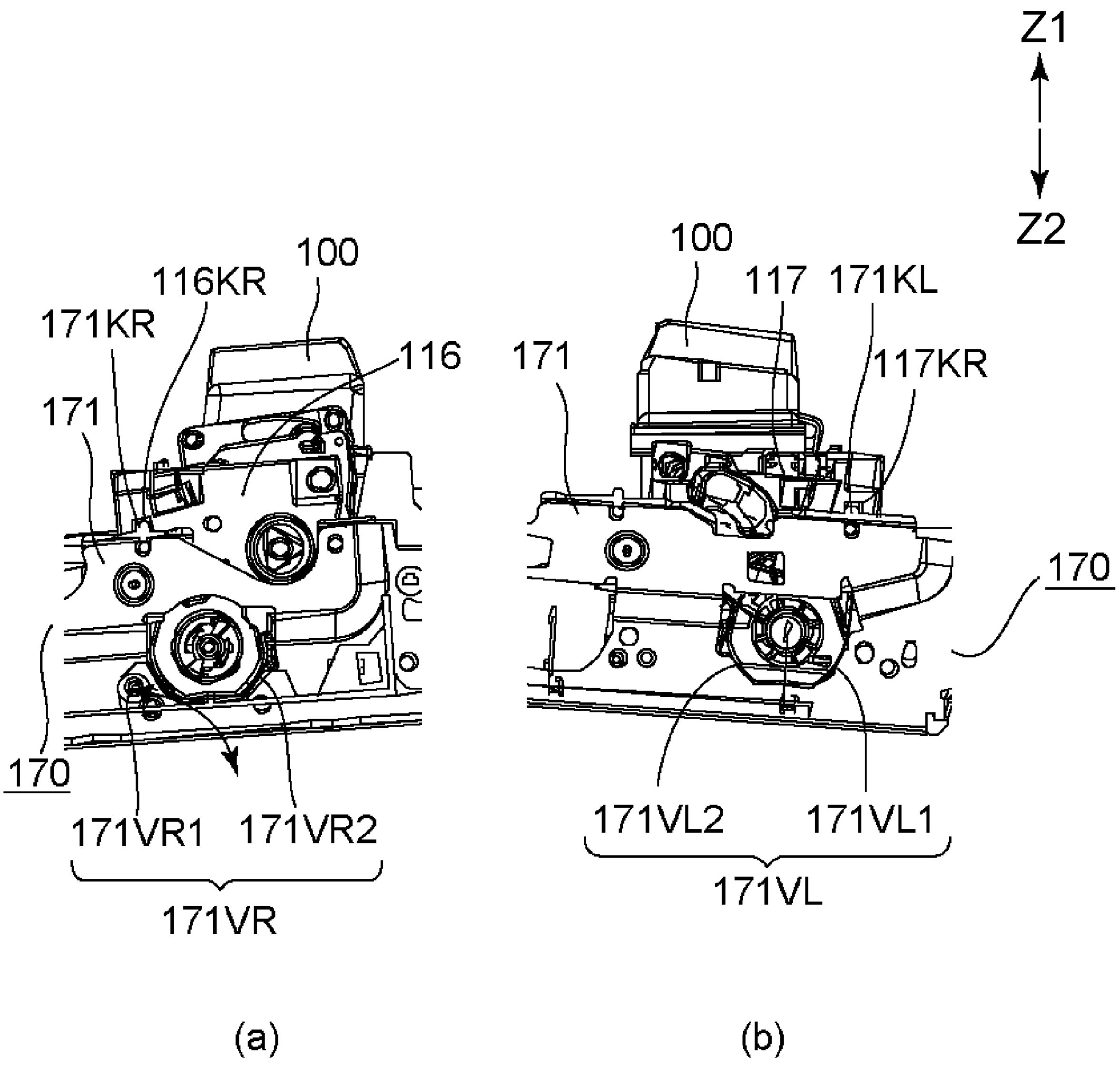
FIG. 7 is a partial detailed view of the tray.

Referring to FIGS. 42 and 4 to 7, the tray 171 which supports the process cartridge will be described in more detail. FIG. 4 is a sectional view of the image forming apparatus M in which the tray 171 is located inside the image forming apparatus main assembly 170 with the front door 11 open. FIG. 5 is a sectional view of the image forming apparatus M in a state in which the tray 171 is located outside the image forming apparatus main assembly 170 with the front door 11 open and the process cartridges 100 accommodated in the tray. FIG. 6 is a sectional view of the image forming apparatus M in a state in which the tray 171 is located outside the image forming apparatus main assembly 170 with the front door 11 open and the process cartridge 100 having been removed from the tray. Part (a) of FIG. 7 is a partial detailed view of the tray 171 as viewed from the driving side in the state shown in FIG. 4. Part (b) of FIG. 7 is a partial detailed view of the tray 171 as viewed from the non-driving side in the state of FIG. 4.

As shown in FIGS. 4 and 5, the tray 171 can be moved in the arrow X1 direction (pushing direction) and the arrow X2 direction (pulling direction) relative to the image forming apparatus main assembly 170. That is, the tray 171 is provided so as to be retractable from and insert able into the image forming apparatus main assembly 170, and the tray 171 is structured to be movable in a substantially horizontal direction in a state where the image forming apparatus main assembly 170 is installed on a horizontal floor. Here, the state in which the tray 171 is located outside the image forming apparatus main assembly 170 (the state shown in FIG. 5) is referred to as an outside position. Further, a state in which the tray is placed inside the image forming apparatus main assembly 170 with the front door 11 open and the photosensitive drum 104 and the transfer belt 12*a* are separated from each other (state in FIG. 4) is referred to as an inner position.

Further, the tray 171 has a mounting portion 171*a* in which the process cartridges 100 can be dismountably mounted as shown in FIG. 6 in the outer position. Then, each process cartridge 100 mounted on the mounting portion 171*a* in the outer position of the tray 171 is supported by the tray 171 by the driving side cartridge cover member 116 and the immovable side cartridge cover member 117 as shown in FIG. 7. Then, the process cartridge moves inside the image forming apparatus main assembly 170 with the movement of the tray 171 in a state of being placed in the mounting portion 171*a*. At this time, in the movement, a gap is kept between the transfer belt 12*a* and the photosensitive drum 104. The tray 171 can carry the process cartridge 100 into the image forming apparatus main assembly 170 without the photosensitive drum 104 contacting with the transfer belt 12*a* (details will be described hereinafter).

As described above, by using the tray 171, a plurality of process cartridges 100 can be collectively moved to a position where image formation is possible inside the image forming apparatus main assembly 170, and is collectively moved to the outside of the image forming apparatus main assembly 170.

[Positioning of Process Cartridge Relative to Electrophotographic Image Forming Apparatus Main Assembly]

Referring to FIG. 7, the positioning of the process cartridge 100 relative to the image forming apparatus main assembly 170 will be described more specifically.

As shown in FIG. 7, the tray 171 is provided with positioning portions 171VR and 171VL for holding the cartridge 100. The positioning portion 171VR has straight portions 171VR1 and 171VR2, respectively. The center of the photosensitive drum is determined by the arc portions 116VR1 and 116VR2 of the cartridge cover member 116 shown in FIG. 7 contacting with the straight portions 171VR1 and 171VR2.

Further, the tray 171 shown in FIG. 7 is provided with a rotation-determining projection 171KR. The attitude of the process cartridge 100 is determined relative to the apparatus main assembly by fitting it with the rotation determining recess 116KR of the cartridge cover member 116 shown in FIG. 7.

The positioning portion 171VL and the rotation determining projection 171KL are arranged at positions (non-driving side) so as to oppose each other across the intermediary transfer belt 12*a* in the longitudinal direction of the positioning portion 171VR and the process cartridge 100. That is, on the non-driving side as well, the position of the process cartridge is determined by engagement of the arc portions 117VL1 and 117VL2 of the cartridge cover member 117 with the positioning portion 171VL and engagement of the rotation determining recess 117KL with the rotation determining projection 171KL.

By doing so, the position of the process cartridge 100 relative to the tray 171 is correctly determined.

Then, as shown in FIG. 5, the process cartridge 100 integrated with the tray 171 is moved in the direction of the arrow X1 and inserted to the position shown in FIG. 5.

Then, by closing the front door 11 in the direction of the arrow R, the process carriage 100 is pressed by a cartridge pressing mechanism (not shown) which will be described hereinafter, and is fixed to the image forming apparatus main assembly 170 together with the tray 171. Further, the transfer belt 12*a* comes into contact with the photosensitive member 104 in interrelation with the operation of the cartridge pressing mechanism. In this state, an image formation is enabled (FIG. 2).

In this embodiment, the positioning portion 171VR and the positioning portion 171V also serve as reinforcements for maintaining the rigidity in the pull-out operation of the tray 171, and for this reason, the use is made with metal sheet, but the present invention is not limited to this.

[Cartridge Pressing Mechanism]

Next, referring to FIG. 8, the details of the cartridge pressing mechanism will be described.

Figure 8:
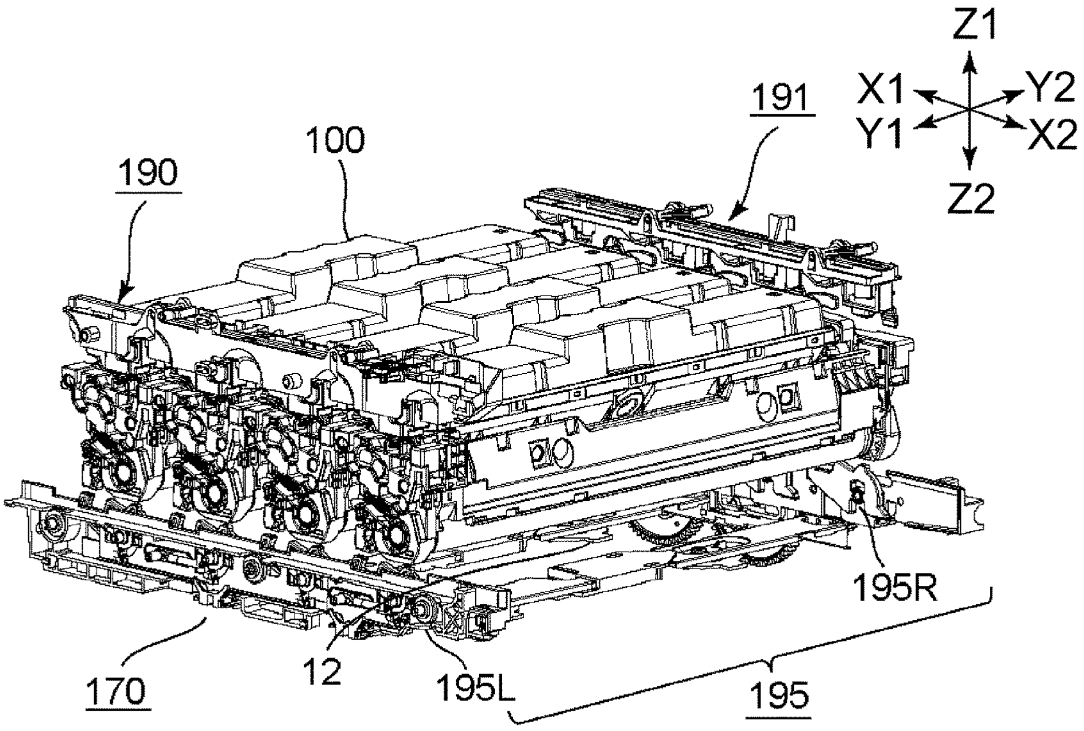
FIG. 8 is a perspective view of the storing element pressing unit and the cartridge pressing unit.
Figure 8:
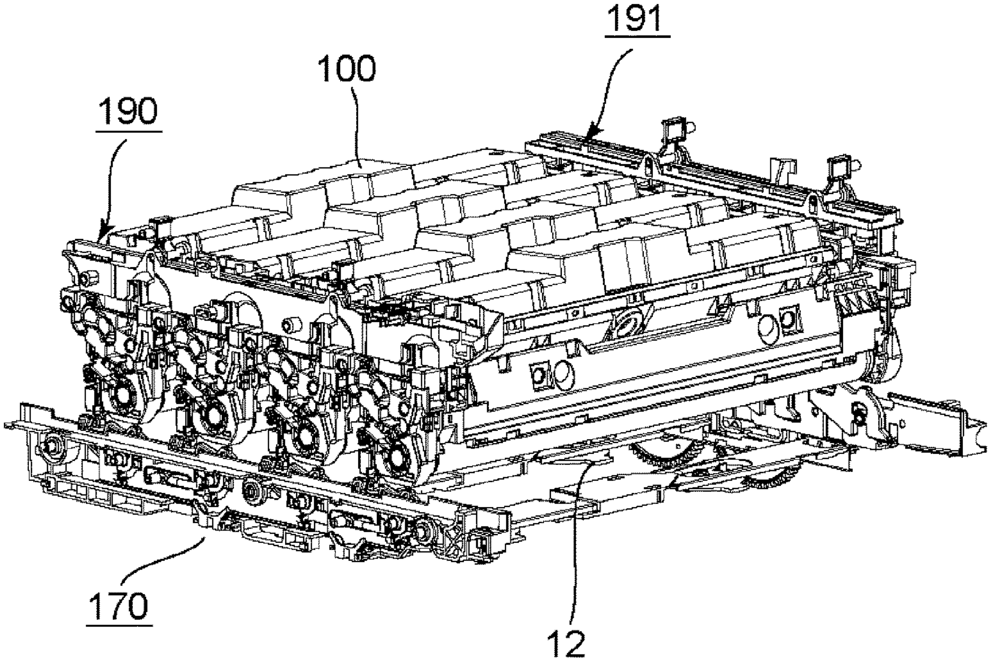

Part (a) of FIG. 8 shows only the process cartridge 100, the tray 171, the cartridge pressing mechanisms 190 and 191 and the intermediary transfer unit 12 in the state of FIG. 4. Part (b) of FIG. 8 shows only the process cartridge 100, the tray 171, the cartridge pressing mechanisms and 191 and the intermediary transfer unit 12 in the state of FIG. 2.

The process cartridge 100 receives a driving force during image formation, and further receives a reaction force from the primary transfer roller 12*d* (FIG. 2) in the direction of arrow Z1. Therefore, it is necessary to press the process cartridge in the Z2 direction in order to maintain a stable attitude without the process cartridge spacing from the positioning portions 171VR and 171VL during the image forming operation.

In order to achieve these, in this embodiment, the image forming apparatus main assembly 170 is provided with cartridge pressing mechanisms (190, 191).

As for the cartridge pressing mechanism (190, 191), the storing element pressing unit 190 works for the non-driving side, and the cartridge pressing unit 191 works for the driving side. This will be described in more detail below.

By closing the front door 11 shown in FIG. 4, the storing element pressing unit 190 and the cartridge pressing unit 191 shown in FIG. 8 lowers in the direction of arrow Z2.

The storing element pressing unit 190 is provided with a main assembly side electric contact (not shown) which mainly contacts with the electric contact of the storing element (not shown) provided in the process cartridge 100. By interlocking with the front door 11 by a link mechanism (not shown), the storing element 140 and the electric contact on the main assembly side can be brought into and out of contact with each other.

That is, the contacts are brought into contact with each other by closing the front door 11, and the contacts are separated by opening the front door 11.

By such a structure, when the process cartridge 100 moves inside the image forming apparatus main assembly together with the tray 171, the electric contacts are not rubbed and the contacts are retracted from the insertion/removal locus of the process cartridge 100, whereby insertion and removal operations of the tray 171 are not hindered.

The storing element pressing unit 190 also functions to press the process cartridge against the positioning portion 171VR described above.

Further, similarly to the storing element pressing unit 190, the cartridge pressing unit 121 also lowers in the direction of arrow Z2 in interrelation with the operation of closing the front door 11 and functions to press the process cartridge 100 against the above-mentioned positioning portion 171VL.

Further, although the details will be described hereinafter, the cartridge pressing mechanism (190, 191) also functions to press down the force applying members 152L and 152R of the process cartridge 100 as will be described hereinafter.

[Drive Transmission Mechanism]

Next, referring to FIGS. 9 and 10 (for better illustration, the tray 171 is omitted), the drive transmission mechanism of the main assembly in this embodiment will be described.

Figure 9:
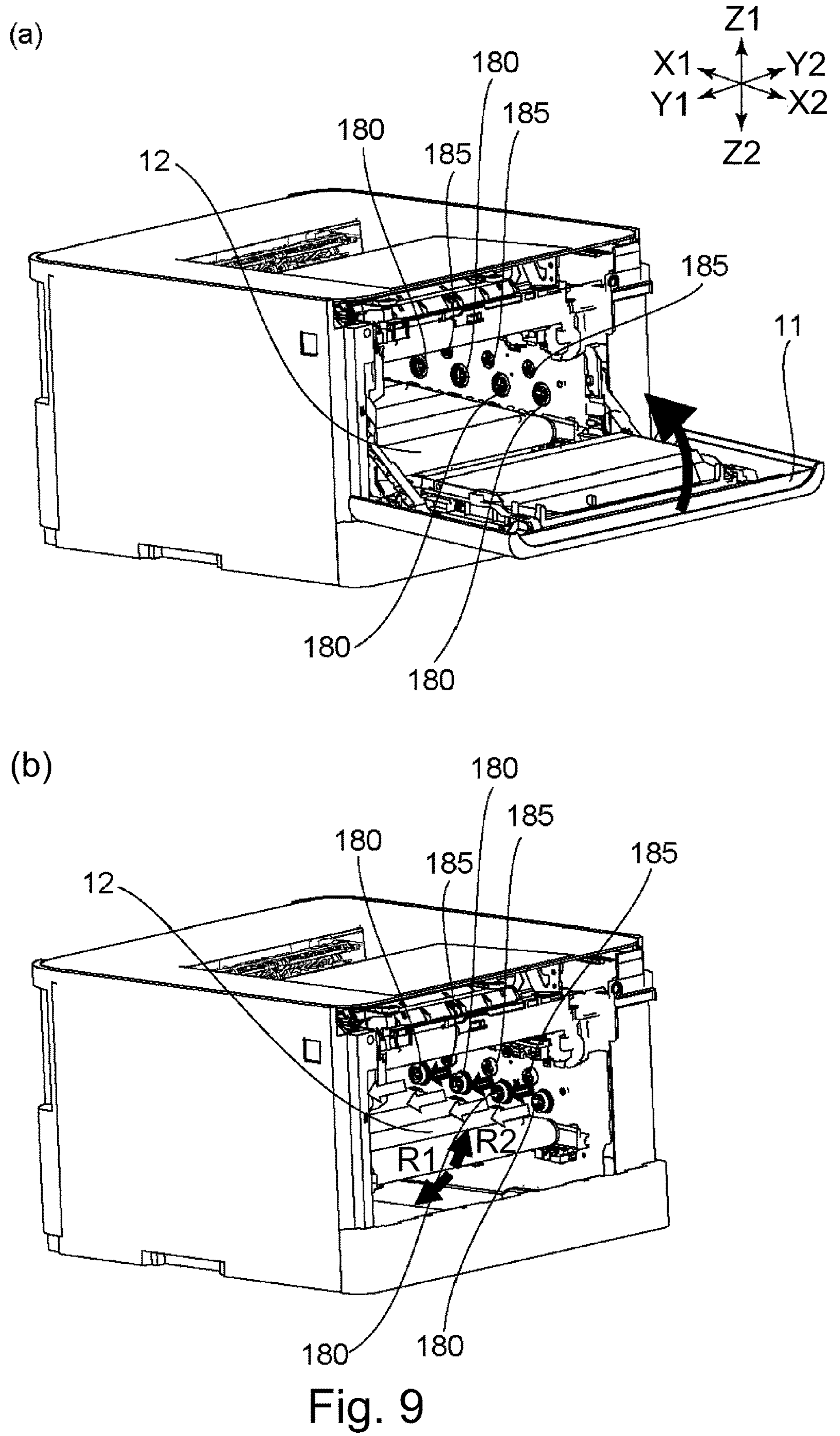
FIG. 9 is a partial perspective view of the image forming apparatus.

Part (a) of FIG. 9 is a perspective view in which the process cartridge 100 and the tray 171 are omitted in the state of FIG. 4 or FIG. 5. FIG. 9B is a perspective view in which the process cartridge 100, the front door 11 and the tray 171 are omitted.

Figure 10:
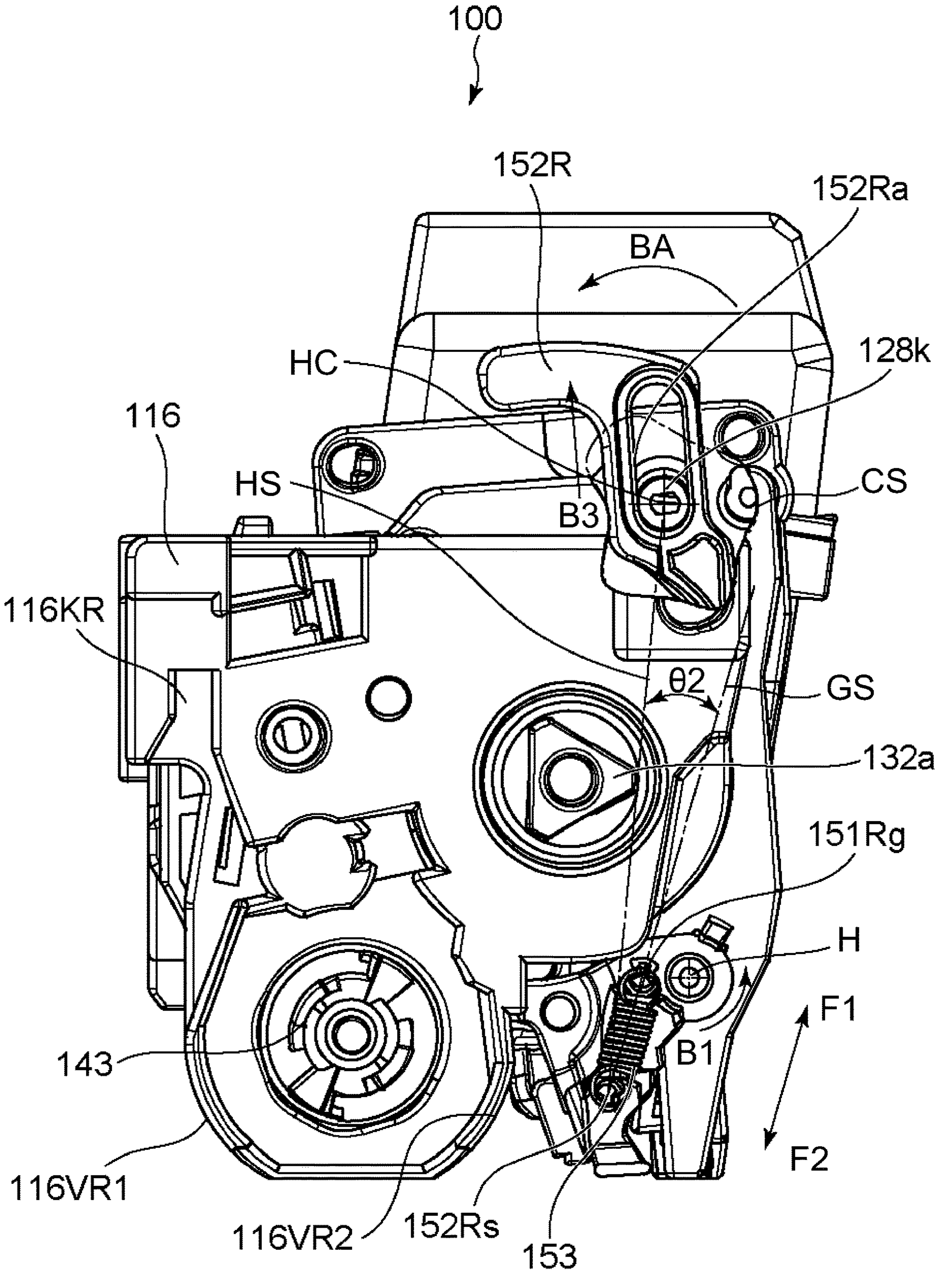
FIG. 10 is a side view (partial sectional view) of the process cartridge.

FIG. 10 is a side view of the process cartridge 100 as viewed from the driving side.

As shown in FIG. 10, the process cartridge in this embodiment includes a development coupling portion 32*a* and a drum coupling (photosensitive member coupling) 143.

The structure is such that by closing the front door 11 (state of part (b) of FIG. 9, the main assembly side drum drive coupling and the main assembly side development drive coupling 185 which drive and transmit the driving forces to the process cartridge 100 are projected in the arrow Y1 direction by a link mechanism (not shown).

Further, by opening the front door 11 (state of part (a) of FIG. 9, the drum drive coupling 180 and the development drive coupling 185 are retracted in the direction of arrow Y2.

By retracting each coupling from the insertion/removal locus of the process cartridge (X1 direction, X2 direction), the insertion/removal of the tray 171 is not hindered.

By closing the front door 11 and starting the driving of the image forming apparatus main assembly, the drum drive coupling 180 described above engages with the drum coupling (coupling member, cartridge side coupling) 143. Along with this, the development drive coupling 185 on the main assembly side engages with the development coupling portion 32*a*. As a result, the drive is transmitted to the process cartridge 100. The drive transmission to the process cartridge 100 is not limited to the structure described above, and a mechanism which inputs the drive only to the drum coupling and transmits the drive to the developing roller may be provided.

[Intermediary Transfer Unit Structure]

Next, referring to FIG. 9, the intermediary transfer unit 12 of the image forming apparatus main assembly in this embodiment will be described.

In this embodiment, the structure is such that the intermediary transfer unit 12 is raised in the direction of arrow R2 by a link mechanism (not shown) by closing the front door 11, and moves to the position for the image forming operation (photosensitive drum 104 and intermediary transfer belt 12*a* are in contact with each other).

Further, by opening the front door 11, the intermediary transfer unit 12 lowers in the direction of arrow R1, and the photosensitive drum 2 and the intermediary transfer belt 12*a* are separated from each other.

That is, in a state in which the process cartridge 100 is set in the tray 171, the photosensitive drum 104 and the intermediary transfer belt 12*a* come into and out of contact with each other depending on the opening/closing operation of the front door 11.

The structure is such that in the contact/separation operation, the intermediary transfer unit rises and falls while drawing a rotation locus about the center point PV1 shown in FIG. 4.

The intermediary transfer belt 12*a* is driven by receiving a force from a gear (not shown) provided coaxially with the PVI. Therefore, by setting the above-mentioned position PV1 as the rotation center, the intermediary transfer unit 12 can be raised and lowered without moving the gear center. By doing so, it is not necessary to move the center of the gear, and the position of the gear can be maintained with high accuracy.

With the above-described structure, in the state that the process cartridge 100 is set in the tray 171, when the tray 11 is inserted or removed, the photosensitive drum 104 and the intermediary transfer belt 12*a* do not rub relative to each of, and therefore, damage of the photosensitive drum 104 and deterioration of the image by charge memory are prevented.

[Development Separation Control Unit]

Next, referring to FIGS. 8, 11 and 12, the separation mechanism of the image forming apparatus main assembly in this embodiment will be described.

Figure 11:
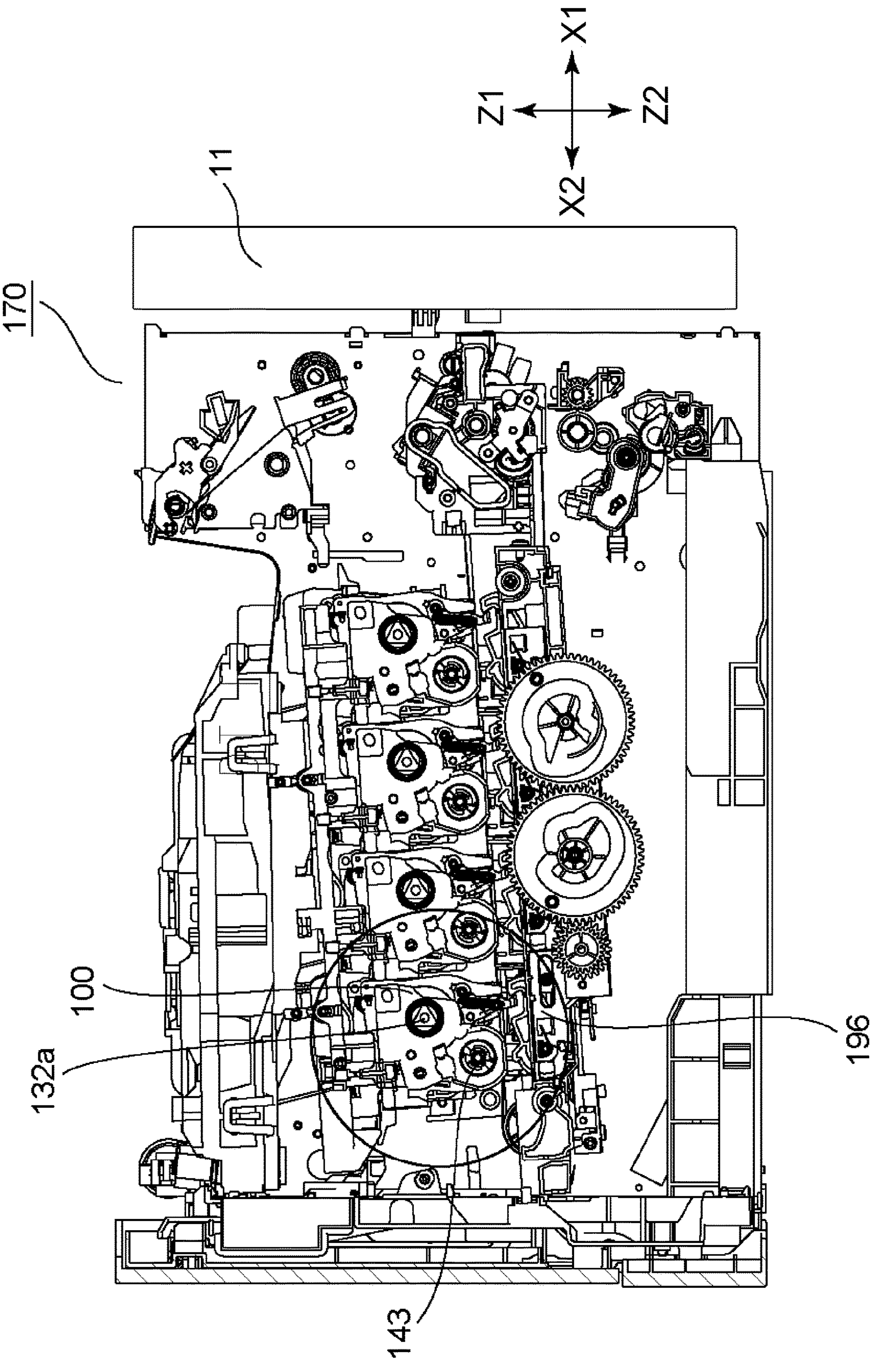
FIG. 11 is a sectional view of the image forming apparatus.
Figure 12:
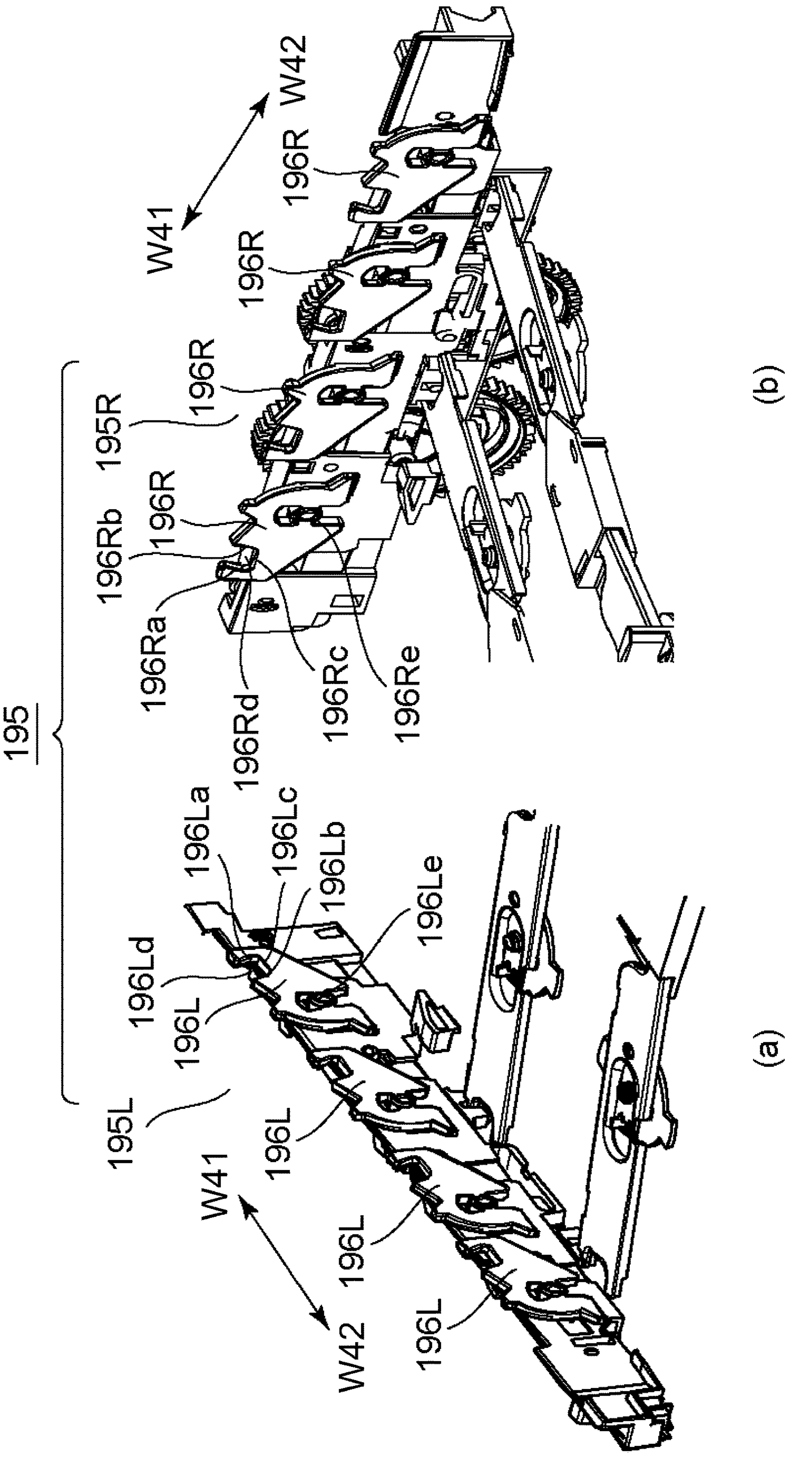
FIG. 12 is a perspective view of a development separation control unit.

FIG. 11 is a sectional view of the image forming apparatus M taken along the driving side end of the process cartridge 100. FIG. 12 is a perspective view of the development separation control unit as viewed obliquely from above.

In this embodiment, the development separation control unit 195 controls the separation contact operation of the developing unit 109 relative to the photosensitive drum 104 by engaging with a portion of the developing unit 109. The development separation control unit 195 is disposed in a lower portion the image forming apparatus main assembly 170 as shown in FIG. 8.

Specifically, the development separation control unit 195 is placed below the development input coupling portion 32*a* and the drum coupling 143 in the vertical direction (downward in the arrow Z2 direction).

Further, the development separation control unit 195 is placed in the longitudinal direction (Y1, Y2 direction) of the photosensitive drum 104 of the intermediary transfer belt 12. That is, the development separation control unit 195 includes a development separation control unit 195R on the driving side and a development separation control unit 195L on the non-driving side.

By disposing the development separation control unit 195 in the dead space of the image forming apparatus main assembly 170 as described above, the main assembly can be downsized.

The development separation control unit 195R has four separation control members 196R corresponding to the process cartridges 100 (100Y, 100M, 100C, 100K), respectively. The four separation control members have substantially the same shape. The development separation control unit 195R is always fixed to the image forming apparatus main assembly. However, the separation control member 196R is structured to be movable in the W41 and W42 directions by a control mechanism (not shown). The detailed structure will be described hereinafter.

The development separation control unit 195L has four separation control members 196L corresponding to the process cartridge 100 (100Y, 100M, 100C, 100K). The four separation control members have substantially the same shape. The development separation control unit 195L is always fixed to the image forming apparatus main assembly.

However, the separation control member 196L is structured to be movable in the W41 and W42 directions by a control mechanism (not shown). The detailed structure will be described hereinafter.

Further, in order for the development separation control unit 195 to engage with a portion of the developing unit 109 and control the separation contact operation of the developing unit 109, a portion of the development control unit 196 and a portion of the developing unit are required to overlap in the vertical direction (Z1, Z2 direction).

Therefore, for the overlapping in the vertical direction (Z1 and Z2 directions) as described above after the developing unit 109 of the process cartridge 100 is inserted in the X1 direction, a part of the developing unit (in the case of this embodiment, the force applying member 152) is required to project. Details will be described hereinafter.

In the case that the development separation control unit 195 itself is raised in the same manner as in the case of the intermediary transfer unit 12 for the engagement, there are problems such as an increase in the operating force of the interlocked front door 11 and complication of the drive train.

In this embodiment, a method is employed in which the development separation control unit 195 is fixed to the image forming apparatus main assembly 170, and a part of the developing unit 109 (force applying member 152) is projected downward (Z2) in the image forming apparatus main assembly 170, and one of the reasons for this arrangement is to address this problem. Further, the mechanism for projecting the force applying member 152 utilized the mechanisms of the storing element pressing unit 190 and the cartridge pressing unit described above, and therefore, there is no above-described problem and an increase in the cost of the device main assembly can be suppressed.

The entire unit of the development separation control unit 195 is fixed to the image forming apparatus main assembly 170. However, as will be described hereinafter, a part of the developing unit is movable in order to engage with the force applying member 152 to cause an operation so that the developing unit 109 is in a separated state and a contacted state relative to the photosensitive drum 104. Details will be described hereinafter.

[Overall Structure of Process Cartridge]

Figure 13:
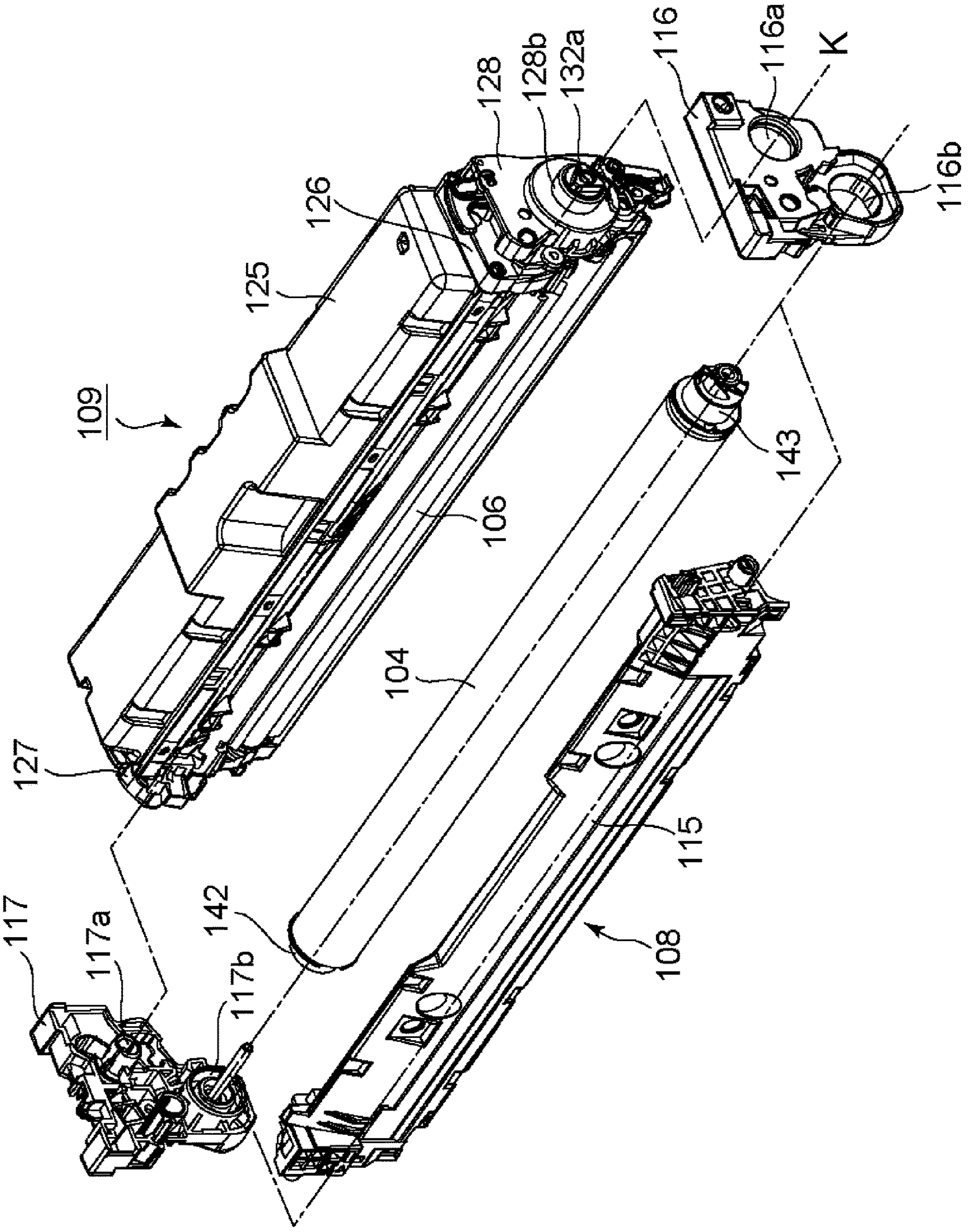
FIG. 13 is an assembly perspective view of the process cartridge.
Figure 14:
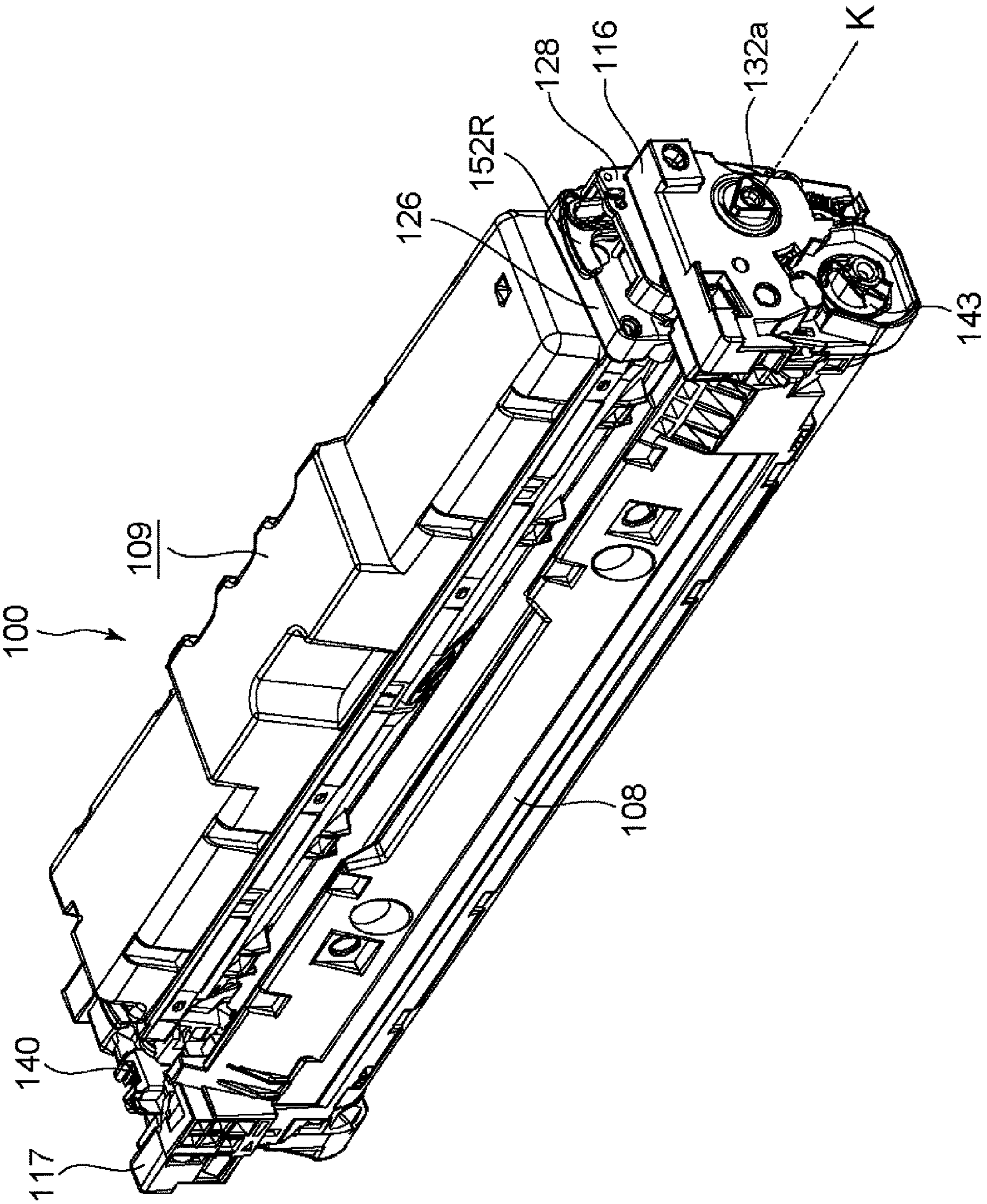
FIG. 14 is a perspective view of the process cartridge.

Referring to FIGS. 3, 13 and 14, the structure of the process cartridge will be described.

FIG. 13 is an assembly perspective view of the process cartridge 100 as viewed from the driving side, which is one side in the axial direction of the photosensitive drum 104. FIG. 14 is a perspective view of the process cartridge 100 as viewed from the driving side.

In this embodiment, the first to fourth process cartridges 100 (100Y, 100M, 100C, 100K) have the same electrophotographic process mechanism, but the color of the contained toner and the filling amount of the toner are different from each other.

The process cartridge 100 includes a photosensitive drum 104 (4Y, 4M, 4C, 4K) and process means which act on the photosensitive drum 104. The cartridge 100 includes a charging roller 105 as a process means, which is a charging means (charging member) for charging the photosensitive drum 104. Further, the cartridge 100 includes a developing roller 106 which is a developing means (developing member) for developing the latent image formed on the photosensitive drum 104 as another process means.

In addition, as an example of the process means, there is a cleaning means (, for example, a cleaning blade or the like) for removing residual toner remaining on the surface of the photosensitive drum 104 can be considered. However, the image forming apparatus of this embodiment employs a structure in which the cleaning means contacting the photosensitive drum 104 is not provided.

The process cartridge 100 is divided into a drum holding unit 108 (108Y, 108M, 108C, 108K) and a developing unit 109 (109Y, 109M, 109C, 109K).

[Drum Holding Unit Structure]

As shown in FIGS. 3 and 13, the drum holding unit 108 comprises a photosensitive drum 104, a charging roller 105, and a drum frame 115 which is a first frame, and so on. The photosensitive drum 104 unified together with the coupling 143 and the drum flange 142 to provide the drum unit 103 (see part (a) of FIG. 1, the details will be described hereinafter).

The drum unit 103 is rotatably supported by a driving side cartridge cover member 116 and a non-driving side cartridge cover member 117 provided at the opposite ends in the longitudinal direction of the process cartridge 100. The driving side cartridge cover member 116 and the non-driving side cartridge cover member 117 will be described hereinafter.

Further, as shown in FIGS. 13 and 14, a drum coupling 143 for transmitting a driving force to the photosensitive drum 104 is provided in the neighborhood of one end in the longitudinal direction of the photosensitive drum 104. As described above, the coupling 143 engages with the main assembly side drum drive coupling 180 (see FIG. 9) as the drum drive output unit of the image forming apparatus main assembly 170. The driving force of the driving motor (not shown) of the image forming apparatus main assembly 170 is transmitted to the photosensitive drum 104 to rotate it in the direction of arrow A. Further, the photosensitive drum 104 is provided with a drum flange 142 in the neighborhood of the other end (second end portion) in the longitudinal direction.

The shaft portion 143*j* (see FIG. 1) of the coupling 143 is supported by the driving side cartridge cover 116, and the drum flange 142 is supported by the shaft fixed to the non-driving side cartridge cover 117. By this, the drum unit 103 is rotatably supported in the cartridge. That is, the ends of the photosensitive drum 104 are rotatably supported by the ends of the casing of the cartridge (that is, the cartridge covers 116 and 117) by way of the coupling 143 and the drum flange 142.

The charging roller 105 is supported by the drum frame 115 in contact with the photosensitive drum 104 so that it can be rotationally driven by the photosensitive drum 104.

Figure 80:
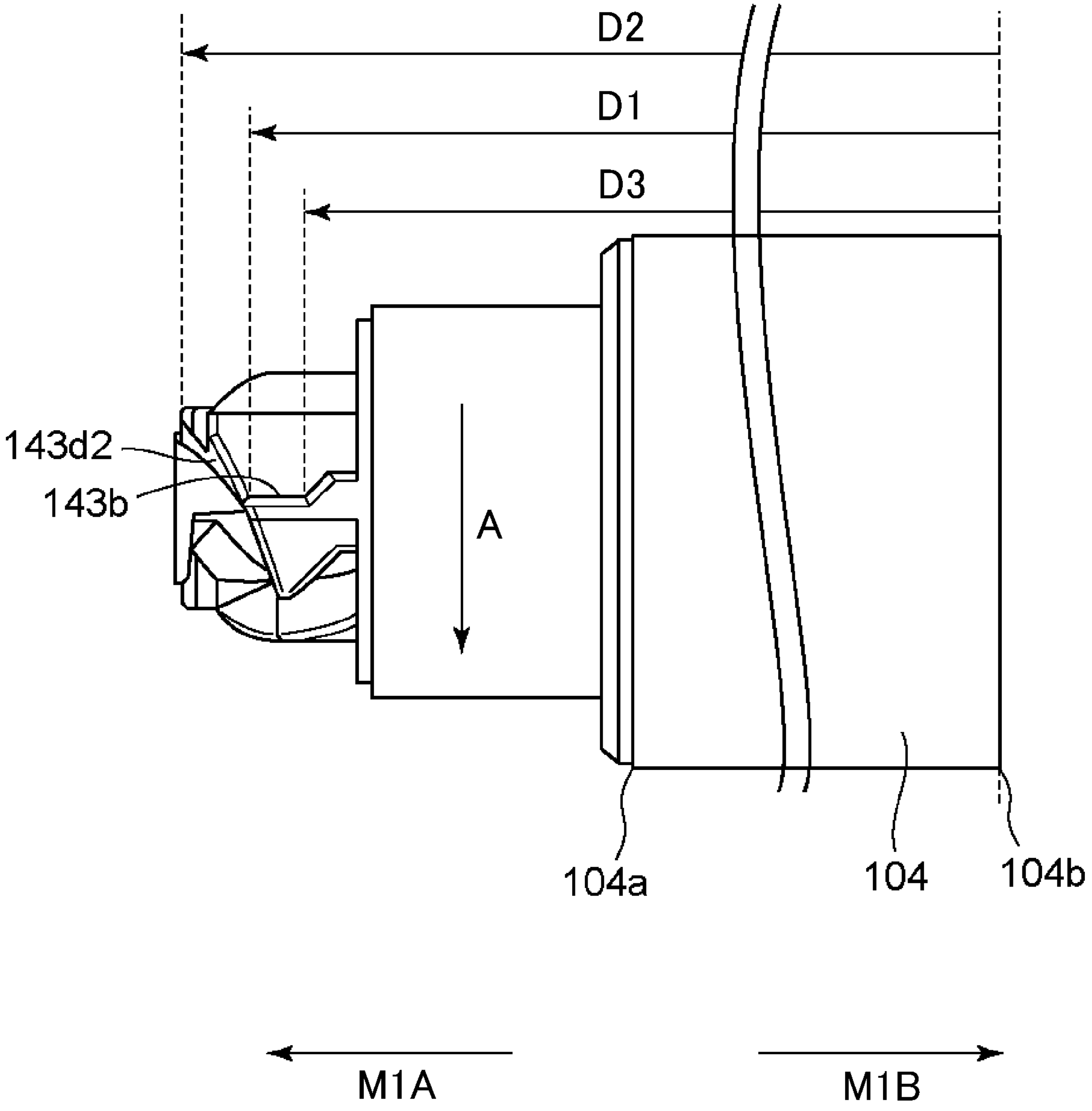
FIG. 80 is a side view of the coupling.

Of the opposite sides of the drum unit 103 in the longitudinal direction (axial direction), the side on which the coupling 143 is provided is the driving side, and the side on which the drum flange 142 is placed is the non-driving side. That is, of the opposite ends of the photosensitive drum 104 in the axial direction, the coupling 143 is fixed in the neighborhood of the end on the driving side, and the drum flange 142 is fixed in the neighborhood of the end on the opposite side to the driving side. Of opposite ends of the photosensitive drum 104, one may be referred to as a first end and the other may be referred to as a second end. FIG. 80 shows the end portion 104*a* on the drum driving side and the end portion 104*b* on the non-driving side of the photosensitive drum.

Figure 16:
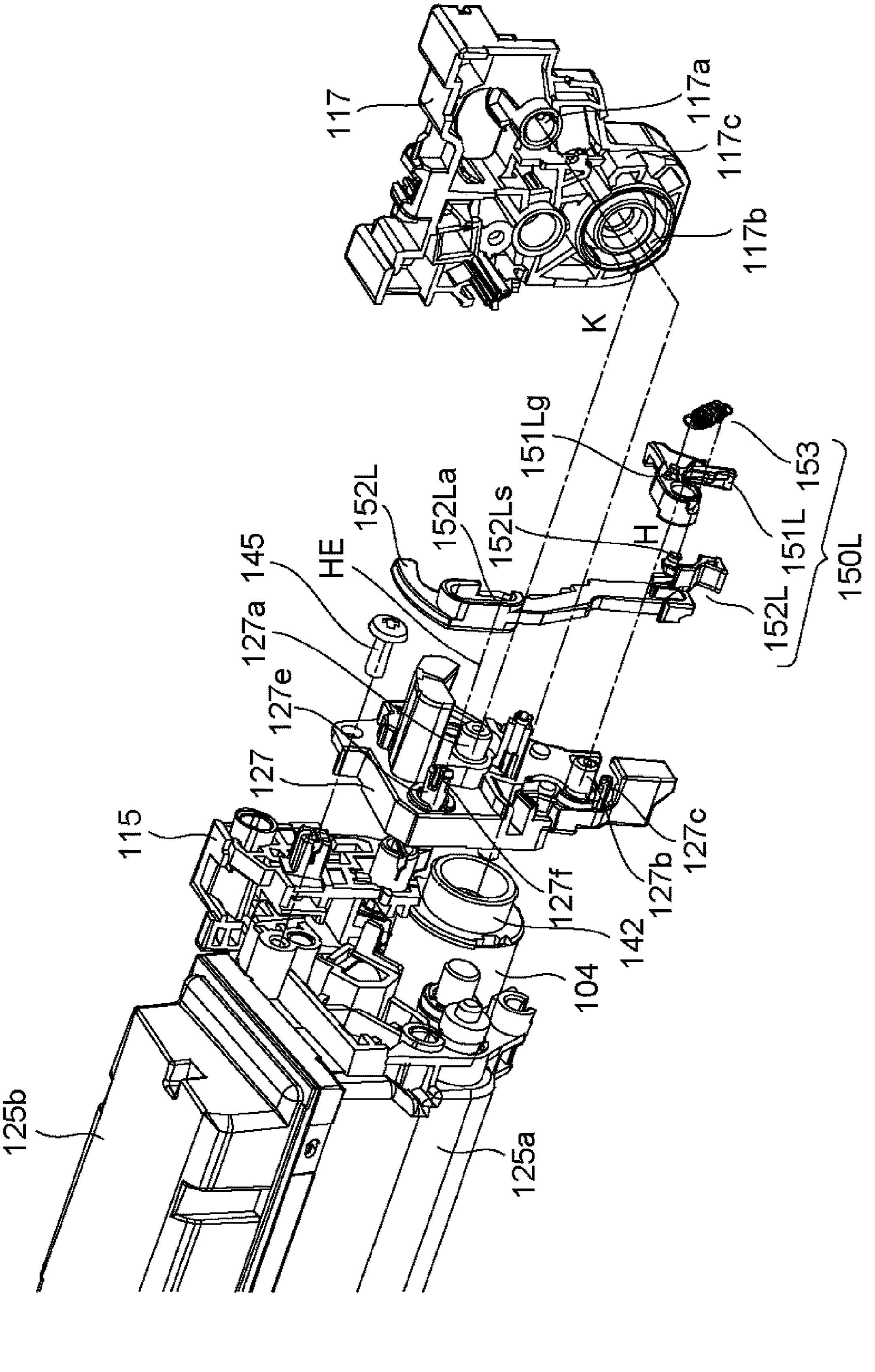
FIG. 16 is an assembly perspective view of the process cartridge.
Figure 19:
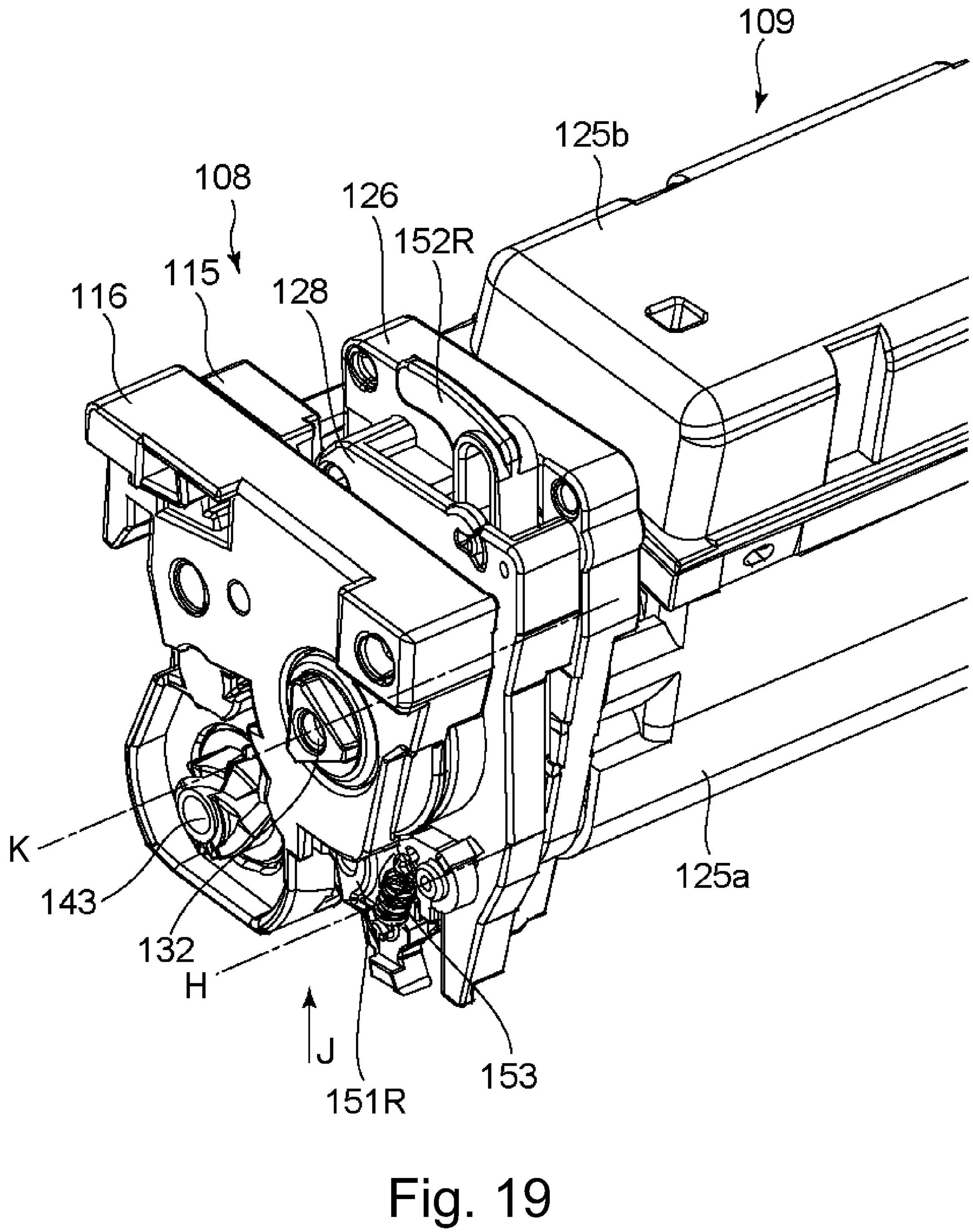
FIG. 19 is a partial sectional view of the separation holding member R after assembly.

Similarly to the drum unit 103, of the opposite sides of the cartridge 100, the side on which the coupling 143 is placed is referred to as the driving side, and the side opposite to the driving side is referred to as the non-driving side. For example, FIGS. 10 and 19 are illustrations showing the driving side of the cartridge. Further, FIG. 16 is an illustration showing the non-driving side of the cartridge.

As shown in FIGS. 13 and 14, the driving side cartridge cover 116 is a component provided at the driving side end of the casing of the cartridge 100, and the non-driving side cartridge cover is a component provided at the non-driving side end of the casing. The drum coupling 143 supported by the driving side cartridge cover 116 can be considered to be located in the neighborhood of the non-driving side end of the casing of the cartridge 100. Of the opposite ends of the cartridge 100, one may be referred to as a first end and the other may be referred to as a second end.

[Development Unit Structure]

As shown in FIGS. 3 and 13, the developing unit 109 includes a developing roller 106, a toner feeding roller (toner supply roller) 107, a developing blade 130, a developing unit frame 125, and the like. The developing unit frame 125 comprises a lower frame 125*a* and a lid member 125*b*. The lower frame 125*a* and the lid member 125*b* are connected by ultrasonic welding or the like.

The development frame 125, which is the second frame (second casing), includes a toner accommodating portion 129 for accommodating toner to be supplied to the developing roller 106. Further, the development frame 125 rotatably supports the developing roller 106 and the toner feeding roller 107 by way of the driving side bearing 126 and the non-driving side bearing 127, which will be described hereinafter, and holds the developing blade 130 for regulating a layer thickness of the toner on the peripheral surface of the developing roller 106.

The developing blade 130 is formed by mounting an elastic member 130*b*, which is a sheet-like metal having a thickness of about 0.1 mm, on a support member 130*a*, which is a metal material having an L-shaped cross-section, by welding or the like. The developing blade 130 is mounted to the development frame 125 with fixing screws 130*c* at two locations, one in the neighborhood of one end and the other in the neighborhood of the other end in the longitudinal direction. The developing roller 106 comprises a core metal 106*c* and a rubber portion 106*d*.

The developing roller 106 is rotatably supported by a driving side bearing 126 and a non-driving side bearing 127 mounted to the opposite ends in the longitudinal direction of the development frame 125, respectively. The development frame 125, the driving side bearing 126, and the non-driving side bearing 127 are a part of the frame (casing) of the cartridge. In a broad sense, the bearings 126 and 127 may be regarded as a part of the development frame 125, and the bearings 126 and 127 and the development frame 125 may be collectively referred to as a development frame.

The toner feeding roller 107 conveys and supplies the toner contained in the toner accommodating portion 129 toward the developing roller 106 to develop the latent image on the photosensitive drum 104. The toner feeding roller 107 is in contact with the developing roller 106.

Further, as shown in FIGS. 13 and 14, a development input coupling portion (development coupling) 32*a* for transmitting a driving force to the developing unit 109 is provided on one side of the developing unit 109 in the longitudinal direction. The development input coupling portion 32*a* engages with the development drive coupling 185 (see FIG. 9) on the main assembly side as the development drive output portion of the image forming apparatus main assembly 170, and the driving force of the drive motor (not shown) of the image forming apparatus main assembly 170 is input to the developing unit 109.

The driving force inputted to the developing unit 109 is transmitted by a driving train (not shown) provided in the developing unit 109, so that the developing roller 106 can be rotated in the direction of arrow D in FIG. 3. Similarly, the driving force received by the development input coupling portion 32*a* also rotates the toner feeding roller 107 to supply toner to the developing roller 106.

On one side of the developing unit 109 in the longitudinal direction, a development cover member 128 which supports and covers a developing input coupling portion 32*a* and a drive train (not shown) is provided. The outer diameter of the developing roller 106 is selected to be smaller than the outer diameter of the photosensitive drum 104. The outer diameter of the photosensitive drum 104 of this embodiment is selected to be in the range of Φ18 to Φ22 (*mm*), and the outer diameter of the developing roller 106 is selected to be in the range of Φ8 to Φ14. By the selections of such outer diameters, efficient arrangement is possible.

[Assembling of Drum Holding Unit and Developing Unit]

Referring to Figure, the assembly of the drum holding unit 108 and the developing unit 109 will be described The drum holding unit 108 and the developing unit 109 are connected by a driving side cartridge cover member 116 and a non-driving side cartridge cover member 117 provided at respective ends in the longitudinal direction of the process cartridge 100.

The driving side cartridge cover member 116 provided on one side (driving side) of the process cartridge 100 in the longitudinal direction is provided with a developing unit support hole 116*a* for supporting the developing unit so as to be swingable (movable). Similarly, the non-driving side cartridge cover member 117 provided on the other side (non-driving side) of the process cartridge 100 in the longitudinal direction is provided with a developing unit support hole 117*a* for swingably supporting the developing unit 109.

Further, the driving side cartridge cover member 116 and the non-driving side cartridge cover member 117 are provided with drum support holes 116*b* and 117*b* for rotatably supporting the photosensitive drum 104. Here, on the driving side, the outer diameter portion of the cylindrical portion 128*b* of the development cover member 128 is fitted into the developing unit support hole 116*a* of the driving side cartridge cover member 116. On the non-driving side, the outer diameter portion of the cylindrical portion (not shown) of the non-driving side bearing 127 is fitted into the developing unit support hole 117*a* of the non-moving side cartridge cover member 117.

Further, the opposite ends of the photosensitive drum 104 in the longitudinal direction are fitted into the drum support holes 116*b* of the driving side cartridge cover member 116 and the drum support holes 117*b* of the non-driving side cartridge cover member 117, respectively. Then, the driving side cartridge cover member 116 and the non-driving side cartridge cover member are fixed to the drum frame 115 of the drum holding unit 108 with screws or adhesives (not shown). By this, the developing unit 109 is rotatably supported by the driving side cartridge cover member 116 and the non-driving side cartridge cover member 117. The developing unit 109 can be moved (rotated) relative to the drum holding unit 108, and the developing roller 106 can be moved with respect to the photosensitive drum by this movement. At the time of image formation, the developing roller 106 can be placed at the position acting on the photosensitive drum 104.

The drum frame 115 and the cover members 116 and 117 are a part of the cartridge frame (casing). More specifically, they are frames of the drum holding unit 108. Further, since the cover members 116 and 117 are fixed to one end and the other end of the drum frame 115, respectively, the cover members 116 and 117 may be regarded as a part of the drum frame 115. Or, the cover members 116 and 117 and the drum frame 115 may be collectively referred to as a drum frame.

Further, one of the frame (115, 116, 117) of the drum holding unit 108 and the frame (125, 126, 127) of the developing unit may be called a first frame (first casing), and the other may be called a second frame (second casing) or the like. Further, the frame (115, 116, 117) of the drum holding unit 108 and the frame (125, 126, 127) of the developing unit may be collectively referred to as a frame of the cartridge (casing of the cartridge), without particular distinction between them.

FIG. 14 shows a state in which the drum holding unit 108 and the developing unit 109 are assembled by the above-described steps to provide an integral process cartridge 100.

The axis connecting the center of the developing unit support hole 116*a* of the driving side cartridge cover member 116 and the center of the developing unit support hole 117*a* of the non-moving side cartridge cover member 117 is referred to as a swing axis K. Here, the cylindrical portion 128*b* of the development cover member 128 on the driving side is coaxial with the development input coupling 74. That is, the developing unit 109 has a structure in which a driving force is transmitted from the image forming apparatus main assembly 170 on the swing axis K. Further, the developing unit 109 is rotatably supported about the swing axis K.

[Structure of Separation/Contact Mechanism]

Figure 15:
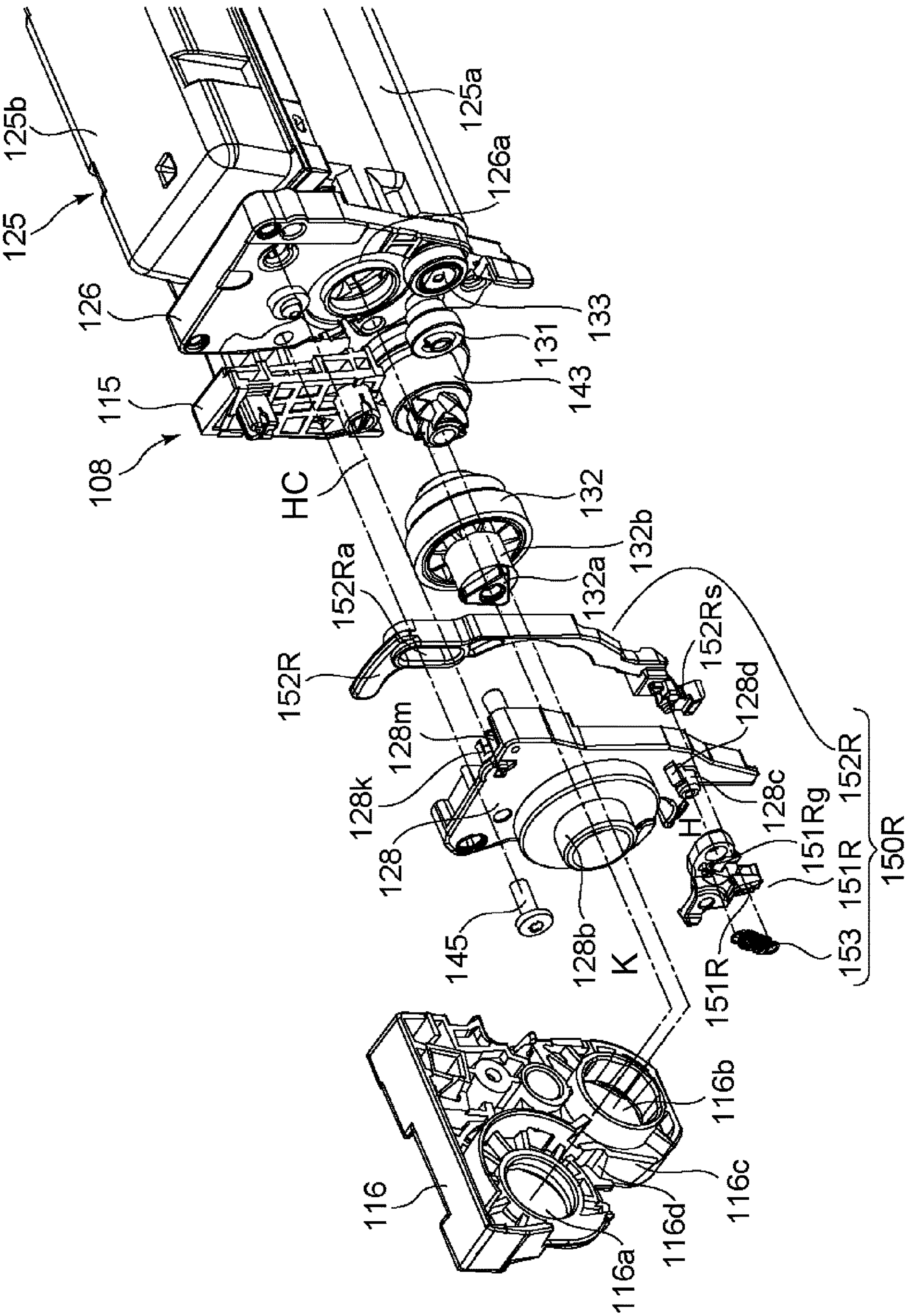
FIG. 15 is an assembly perspective view of the process cartridge.

The structure in which the photosensitive drum 104 of the process cartridge 100 and the developing roller 106 of the developing unit 109 are separated from and contacted with each other in this embodiment will be described in detail. The process cartridge includes a separation contact mechanism 150R on the driving side and a separation contact mechanism 150L on the non-driving side. FIG. 15 shows an assembly perspective view of the driving side of the developing unit 109 including the separation contact mechanism 150R. FIG. 16 shows an assembly perspective view of the developing unit including the separation contact mechanism 150L on the non-driving side. Regarding the separation contact mechanism, the details of the separation contact mechanism 150R on the driving side will first be described, and then the separation contact mechanism 150L on the non-driving side will be described.

Since the separation contact mechanisms on the driving side and the non-driving side have almost the same functions, the same reference numerals are used for both sides with the exception that R is added at the end for the driving side, and L is added for the non-driving side.

The separation contact mechanism 150R includes a separation holding member 151R which is a restriction member, a force applying member 152R which is a pressing member, and a tension spring 153.

The separation contact mechanism 150L includes a separation holding member 151L which is a restriction member, a force applying member 152L which is a pressing member, and a tension spring 153.

[Detailed Description of Separation Holding Member R]

Figure 17:
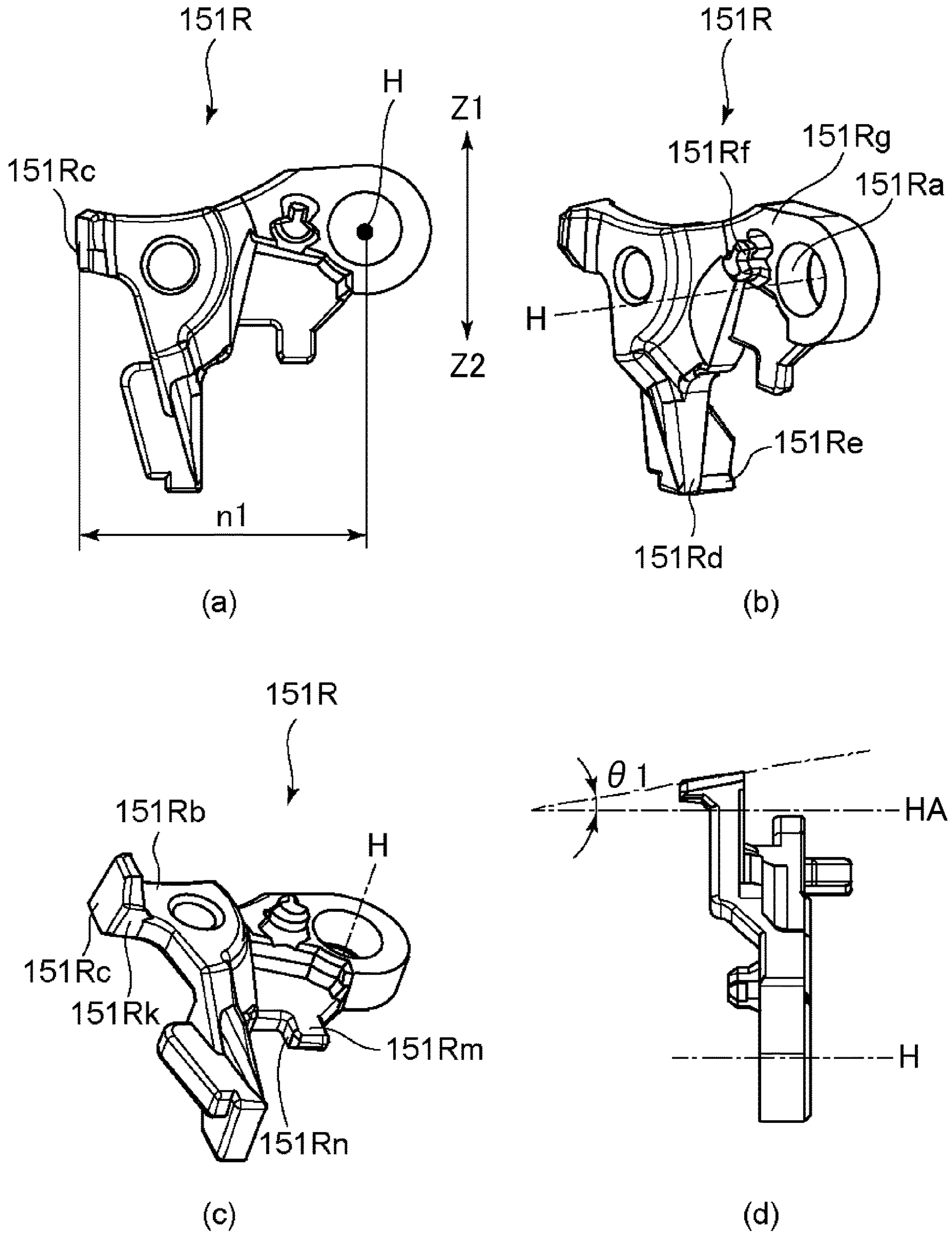
FIG. 17 is a view of a separation holding member R per se.

Referring to FIG. 17, the separation holding member 151R will be described in detail.

Part (a) of FIG. 17 is a front view of the separation holding member 151R per se of the process cartridge 100 as viewed from the driving side longitudinal direction. Parts (b) and (c) of FIG. 17 are perspective views of the separation holding member 151R per se. Part (d) of FIG. 17 is a view of the separation holding member 151R as viewed in the direction of arrow Z2 in part (a) of FIG. 17 (vertically upward in the image forming state). The separation holding member 151R includes an annular support receiving portion 151Ra, and includes a separation holding portion 151Rb projecting from the support receiving portion 151Ra in the radial direction of the support receiving portion 151Ra. The free end of the separation holding portion 151Rb has a separation holding surface 151Rc having an arc shape having a center on the separation holding member swing axis H and inclined by an angle θ1 with respect to the line HA parallel to the separation holding member swing axis H. The angle θ1 is selected so as to satisfy the equation (1).

$$0° \leq \theta 1 \leq 45° \quad (1)$$

Further, the separation holding member 151R has a second restricted surface 151Rk adjacent to the separation holding surface 151Rc. Further, the separation holding member 151R is provided with a second pressed portion 151Rd projecting in the Z2 beyond the support receiving portion 151Ra, and an arc-shaped second pressed surface 151Re projecting from the second pressed portion 151Rd in the direction of the separation holding member swing axis H of the support receiving portion 151Ra.

Furthermore, the separation holding member 151R includes a main body portion 151Rf connected to the support receiving portion 151Ra, and the main body portion 151Rf is provided with a spring hooked portion 151Rg projecting in the direction of the separation holding member swing axis H of the support receiving portion 151Ra. Further, the main body portion 151Rf is provided with a rotation (on its own axis) prevention portion 151Rm projecting in the Z2 direction, and the rotation prevention surface 151Rn is provided in a direction facing the second pressed surface 151Re.

[Detailed Description of Force Applying Member R]

Figure 18:
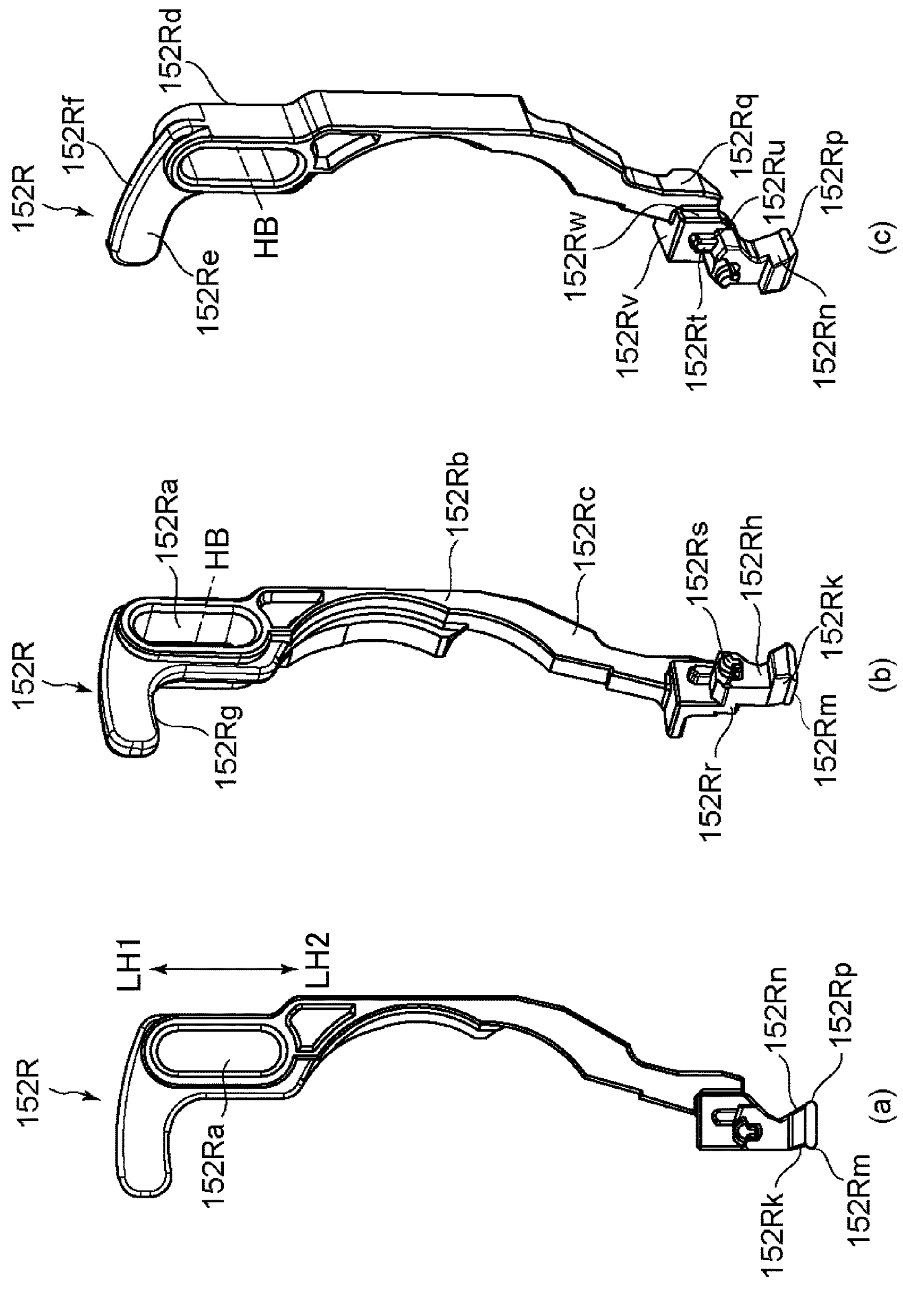
FIG. 18 is a view of a force applying member R per se.

Referring to FIG. 18, the force applying member 152R will be described in detail.

Part (a) of FIG. 18 is a front view of the force applying member 152R per se as viewed from the longitudinal direction of the process cartridge 100, and FIGS. 18B and 18C are perspective views of the force applying member 152R per se.

The force applying member 152R is provided with an oblong-shaped oblong support receiving portion 152Ra. Here, the longitudinal direction of the oblong shape of the oblong support receiving portion 152Ra is indicated by an arrow LH, the upward direction is indicated by an arrow LH1, and the downward direction is indicated by an arrow LH2. Further, the direction in which the oblong support receiving portion 152Ra is formed is indicated by as HB. The force applying member 152R has a projecting portion 152Rh formed on the downstream side in the arrow LH2 direction of the oblong support receiving portion 152Ra. The oblong support receiving portion 152Ra and the projecting portion 152Rh are connected by a main body portion 152Rb. On the other hand, the force applying member 152R includes a pressed portion 152Re projecting in the arrow LH1 direction and substantially perpendicular to the arrow LH1 direction, and has an arc-shaped pressed surface 152Rf on the downstream side in the arrow LH1 direction and has a pushing restriction surface 152Rg on the upstream side. Further, the force applying member 152R has a first at-accommodation restriction surface 152Rv extending from the main body portion 152Rb on the upstream side in the arrow LH2 direction, and a second at-accommodation restricting surface 152Rw which is adjacent to the first at-accommodation restriction surface 152Rv and which is substantially parallel to the first pressing surface 152Rq.

The projecting portion 152Rh includes a first force receiving portion 152Rk and a second force receiving portion 152Rn which are arranged so as to be opposite from each other in a direction substantially perpendicular to the arrow LH2 direction at an end portion in the arrow LH2 direction. The first force receiving portion 152Rk and the second force receiving portion 152Rn have a first force receiving surface 152Rm and a second force receiving surface 152Rp extending in the HB direction and having arc shapes, respectively. Further, the projecting portion 152Rh has a spring hooked portion 152Rs projecting in the HL direction and a locking portion 152Rt, and the locking portion 152Rt has a locking surface 152Ru facing in the same direction as the first force receiving surface 152Rp.

Further, the force applying member 152R is a part of the main body portion 152Rb, and is arranged on the upstream side of the second force receiving portion 152Rn in the arrow LH2 direction, and has a first pressing surface 152Rq facing in the same direction as the second force receiving surface 152Rp. Further, the force applying member 152R has a second pressing surface 152Rr which is perpendicular to the first at-accommodation restriction surface 152Rv and which is opposite from the first pressing surface 152Rq.

When the process cartridge 100 is mounted on the image forming apparatus main assembly 170, the LH1 direction is substantially the same as the Z1 direction, and the LH2 direction is substantially the same as the Z2 direction. Further, the HB direction is substantially the same as the longitudinal direction of the process cartridge 100.

[Assembling of Separation/Contact Mechanism R]

Next, referring to FIGS. 10 and 15 to 19, the assembly of the separation contact mechanism will be described. FIG. 19 is a perspective view of the process cartridge 100 after being assembled with the separation holding member 151R, as viewed from the driving side.

As shown in FIG. 15 described above, in the developing unit 109, the outer diameter portion of the cylindrical portion 128*b* of the development cover member 128 is fitted into the developing unit support hole portion 116*a* of the driving side cartridge cover member 116. By this, the developing unit 109 is rotatably supported relative to the photosensitive drum 104 about the swing axis K. Further, the development cover member 128 includes a cylindrical first support portion 128*c* and a second support portion 128*k* projecting in the direction of the swing axis K.

The outer diameter of the first support portion 128*c* fits with the inner diameter of the support receiving portion 151Ra of the separation holding member 151R, to rotatably support the separation holding member 151R. Here, the swing center of the separation holding member 151R assembled to the development cover member 128 is the separation holding member swing axis H. The development cover member includes a first retaining portion 128*d* which projects in the direction of the separation holding member swing axis H. As shown in FIG. 15, the movement of the separation holding member 151R assembled to the development cover member 128 in the swing axis H direction is restricted by abutment of the first retaining portion 128*d* to the separation holding member 151R.

Further, the outer diameter of the second support portion 128*k* fits with the inner wall of the oblong support receiving portion 152Ra of the force applying member 152R, to support the force applying member 152R so as to be rotatable and movable in the oblong direction. Here, the swing center of the force applying member 152R assembled to the development cover member 128 is a force applying member swing axis HC. As shown in FIG. 15, the movement of the force applying member 152R assembled to the development cover member 128 in the swing axis HC direction is restricted by abutment of the second retaining portion 128*m* to the separation holding member 151R.

FIG. 10 is a sectional view taken along a line CS with a part of the driving side cartridge cover member 116 and a part of the development cover member 128 omitted such that the fitting portion between the oblong support receiving portion 151Ra of the force applying member 152R and the cylindrical portion 128*b* of the development cover member 128 can be seen. The separation contact mechanism 150R is provided with a tension spring 153, as an urging means, for urging the separation holding member 151R to rotate in the direction of arrow B1 in the drawing about the separation holding member swing axis H and for urging the force applying member 152R in the direction of arrow B3.

The arrow B3 direction is a direction substantially parallel to the oblong direction LH2 (see FIG. 18) of the oblong support receiving portion 152Ra of the force applying member 152R. The tension spring 153 is assembled between the spring hooked portion 151Rg provided on the separation holding member 151R and the spring hooked portion 152Rs provided on the force applying member 152R. The tension spring 153 applies a force to the spring hooked portion 151Rg of the separation holding member 151R in the direction of arrow F2 in FIG. 10 to apply an urging force for rotating the separation holding member 151R in the direction of arrow B1. Further, the tension spring 153 applies a force to the spring hooked portion 152Rs of the force applying member 152R in the direction of the arrow F1 to apply an urging force for moving the force applying member 152R in the direction of the arrow B3.

The line connecting the spring hooked portion 151Rg of the separation holding member 151R and the spring hooked portion 152Rs of the force holding member 152R is GS. The line connecting the spring hooked portion 152Rs of the force applying member 152R and the force applying member swing axis HC is HS. Here, a angle θ2 formed by the line GS and the line HS is selected to satisfy the following equation (2) with the clockwise direction about the spring hooked portion 152Rs of the force applying member 152R being positive. By this, the force applying member 152R is urged to rotate in the direction of arrow BA about the force applying member swing axis HC.

$$0° \le \theta 2 \le 90° \quad (2)$$

As shown in FIG. 15, in the development drive input gear 132, the inner diameter portion of the cylindrical portion 128*b* of the development cover member 128 and the outer diameter portion of the cylindrical portion 32*b* of the development drive input gear 132 are fitted, and in addition, the support portion 126*a* of the driving side bearing 126 is fitted and the cylindrical portion (not shown) of the development drive input gear are fitted. By this, the driving force can be transmitted to the developing roller gear 131, the toner feeding roller gear 133, and other gears.

In this embodiment, the mounting positions of the separation holding member 151R and the force applying member 152R are as follows. As shown in FIG. 15, in the direction of the swing axis K, the separation holding member 151R is disposed on the side (outside in the longitudinal direction) where the driving side cartridge cover member 116 is provided, with the development cover member 128 interposed therebetween. The force applying member 152R is disposed on the side (inside in the longitudinal direction)

where the development drive input gear 13 is arranged. However, the position thereof is not limited to this, and the positions of the separation holding member 151R and the force applying member 152R may be interchanged, and the separation holding member 151R and the force applying member 152R may be disposed in one side in the swing axis K direction with respect to the development cover member 128. Further, the arrangement order of the separation holding member 151R and the force applying member 152R may be exchanged.

The development cover member 128 is fixed to the development frame 125 by way of the driving side bearing 126 to form the developing unit 109. As shown in FIG. 15, the fixing method in this embodiment uses a fixing screw 145 and an adhesive (not shown), but the fixing method is not limited to this example, and welding such as welding by heating or pouring and hardening of resin material, for example, may be used.

Figure 20:
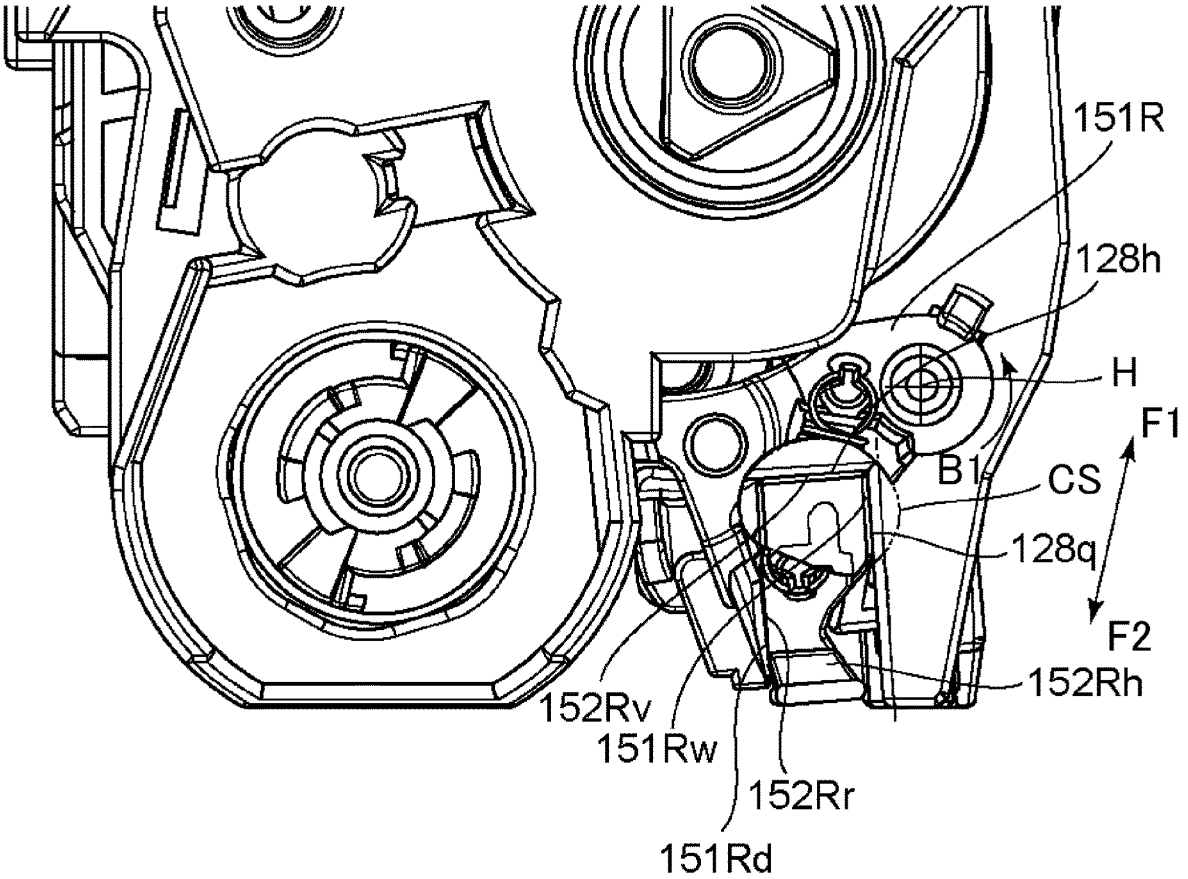
FIG. 20 is an enlarged view of the periphery of the separation holding member R.

Here, FIG. 20 is a sectional view in which the periphery of the separation holding portion 151R in FIG. 10 is enlarged and a part of the tension spring 153 and the separation holding member 151R is partially omitted by the partial sectional line CS4 for the sake of illustration. In the force applying member 152R, the first restriction surface 152Rv of the force applying member 152R comes into contact with the first restriction surface 128*h* of the development cover member 128 by the urging force of the tension spring 153 in the F1 direction in the drawing, as described above. Further, the second restriction surface 152Rw of the force applying member 152R comes into contact with the second restriction surface 128*q* of the development cover member 128 and is positioned thereby. This position is referred to as an accommodation position (reference position) of the force applying member 152R. Further, the separation holding member 151R is rotated in the B1 direction about the swing axis H of the separation holding member by the urging force of the tension spring 153 in the F2 direction, and the second pressed portion 151Rd of the separation holding member 151R comes into contact with the second pressing surface 152Rr of the force applying member 152R, by which the rotation is stopped. This position is referred to as a separation holding position (restriction position) of the separation holding member 151R.

Figure 21:
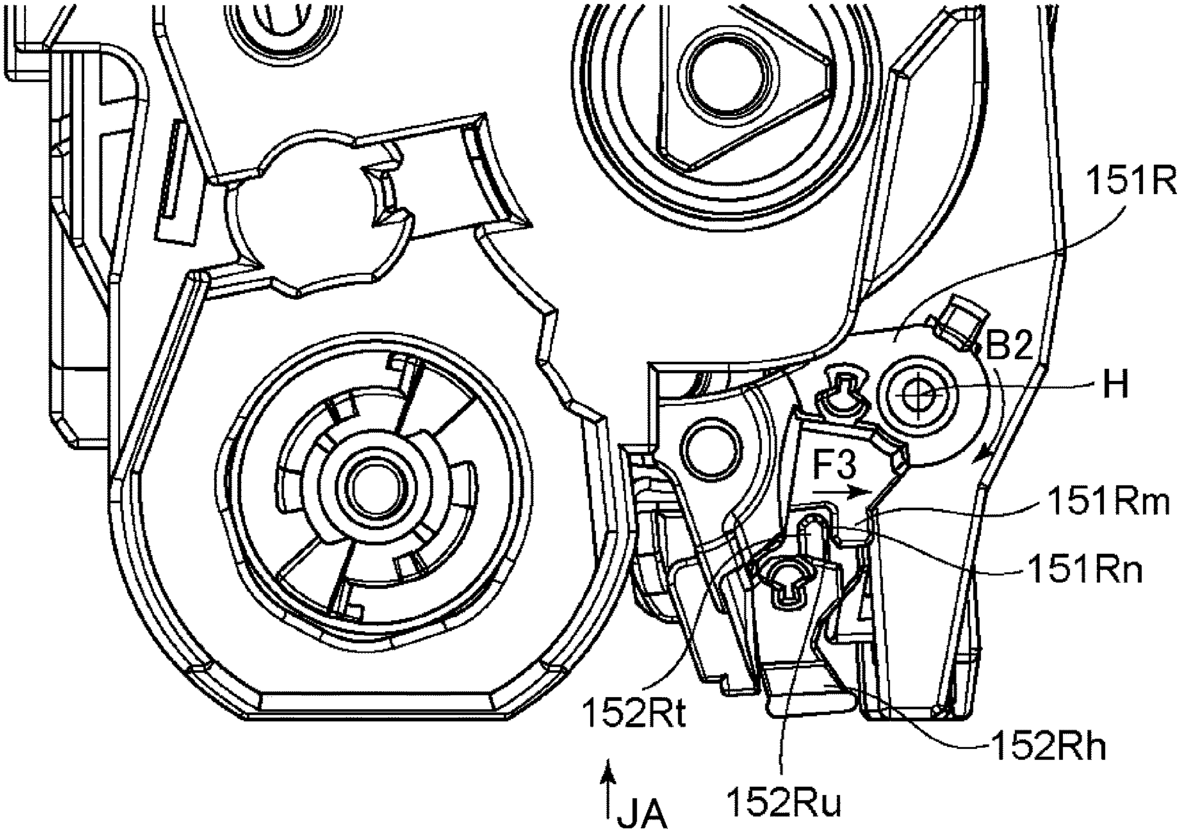
FIG. 21 is an enlarged view of the periphery of the separation holding member R.

Further, FIG. 21 is an illustration in which the periphery of the separation holding portion 151R in FIG. 10 is enlarged, and the tension spring 153 is omitted, for the sake of illustration. Here, the case is considered in which the process cartridge 100 including the separation contact mechanism 150R according to this embodiment is dropped in the JA direction of FIG. 21 when the process cartridge 100 is transported. At this time, the separation holding member 151R receives a force of rotating in the direction of arrow B2 by its own weight about the separation holding swing axis H. For this reason, when the rotation in the B2 direction occurs starts, the rotation prevention surface 151Rn of the separation holding member 151R comes into contact with the locking surface 152Ru of the force applying member 152R, and the separation holding member 151R receives the force in the F3 direction in the drawing so as to suppress the rotation in the B2 direction. By this, it is possible to prevent the separation holding member 151R from rotating in the B2 direction during transportation, and it is possible to prevent the state of separation between the photosensitive drum 104 and the developing unit 109 from being impaired.

In this embodiment, the tension spring 153 is mentioned as an urging means for urging the separation holding member 151R to the separation holding position and for urging the force applying member 152R to the accommodating position, but the urging means is not limited to this example. For example, a torsion coil spring, a leaf spring, or the like may be used as an urging means to urge the force applying member 152R to the accommodating position and to urge the separation holding member 151R to the separation holding position. Further, the material of the urging means may be metal, a mold, or the like, which has elasticity and can urge the separation holding member 151R and the force applying member 152R.

As described above, the developing unit 109 provided with the separation contact mechanism 150R is integrally coupled with the drum holding unit 108 by the driving side cartridge cover member 116 as described above (state in FIG. 19).

Figure 22:
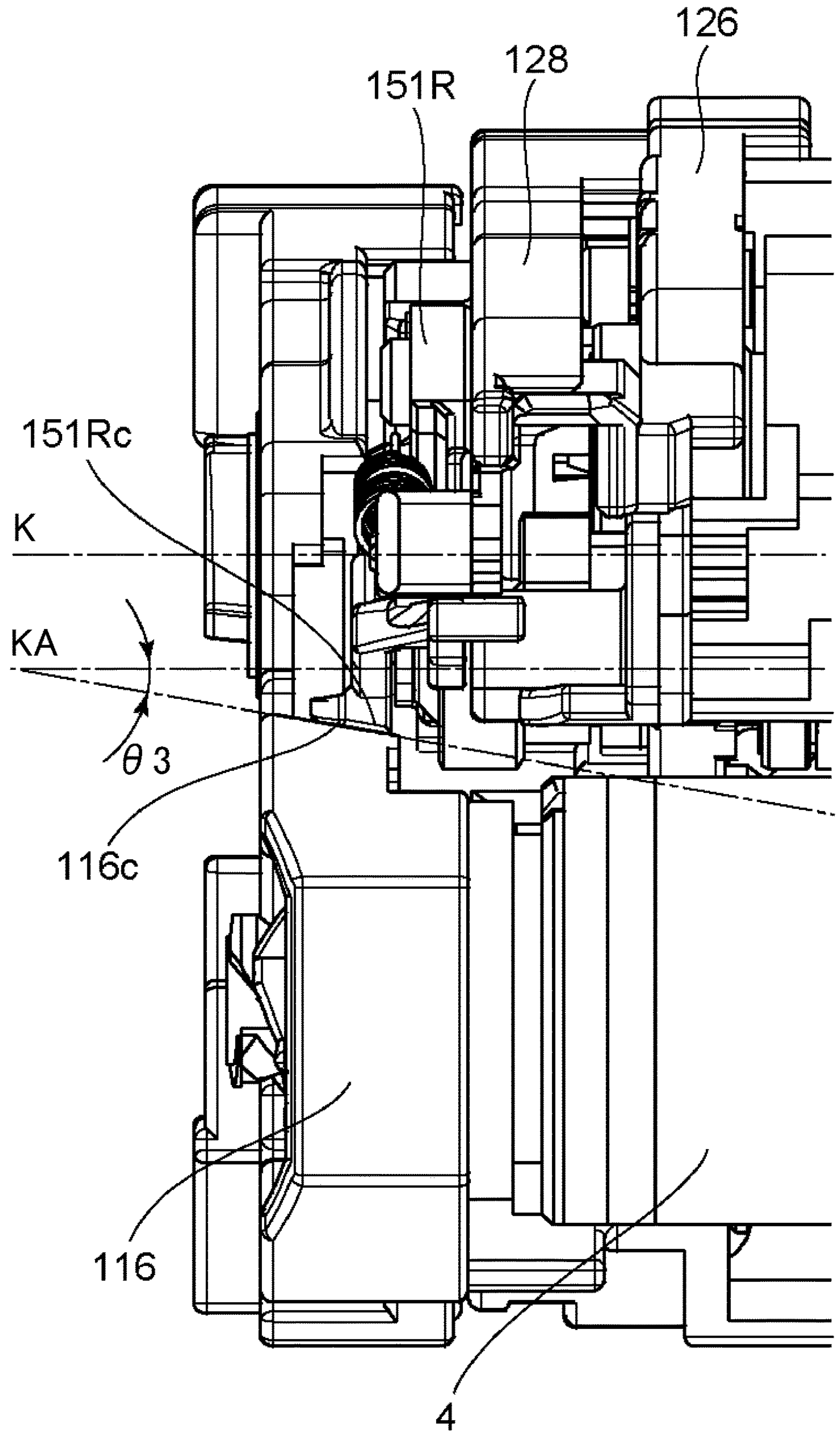
FIG. 22 is a bottom view of a driving side of the process cartridge.

FIG. 22 is a view as seen in the direction of arrow J in part (a) of FIG. 19*s* shown in FIG. 15, the driving side cartridge cover 116 of this embodiment has a contact surface 116*c*. As shown in FIG. 22, the contact surface 116*c* is slanted with an inclination of an angle θ3 relative to the swing axis K. It is desirable that the angle θ3 is the same as the angle θ1 forming the separation holding surface 151Rc of the separation holding member 151R, but the angle θ3 is not limited to this example. Further, as shown in FIGS. 15 and 19 when the driving side cartridge cover member 116 is assembled to the developing unit 109 and the drum holding unit 108, the contact surface 116*c* faces the separation holding surface 151Rc of the separation holding member 151R placed at a separation holding position. The contact surface 116*c* contacts the separation holding surface 151Rc by the urging force of the development pressure spring 134 which will be described hereinafter. The structure is such that when the engaging surface 116Rc and the separation holding surface 151Rc contact each other, the attitude of the developing unit 109 is positioned so that the developing roller 106 of the developing unit 109 and the photosensitive drum 104 are separated by a gap P1. The state in which the developing roller 106 (developing member) is separated from the photosensitive drum 104 by the gap P1 by the separation holding member 151R is referred to as a separation position (retraction position) of the developing unit 109 (see part (a) of FIG. 42).

Here, referring to FIG. 42, the separated state and the contact state of the process cartridge 100 will be described in detail.

Figure 42:
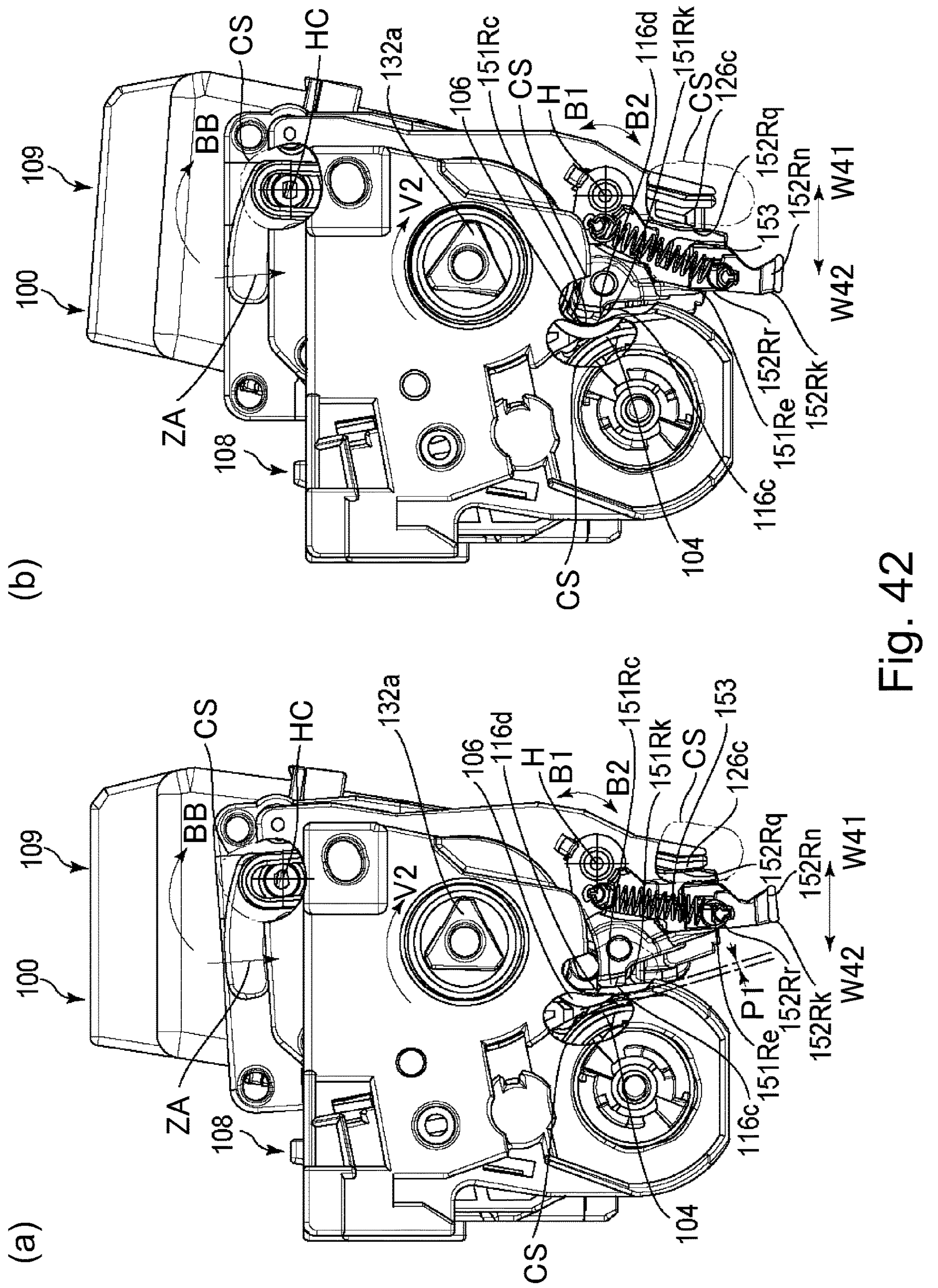
FIG. 42 is a side view as viewed from the driving side with the process cartridge 100 mounted inside the image forming apparatus main assembly.

FIG. 42 is a side view of the process cartridge 100 as viewed from the driving side with the process cartridge 100 mounted inside the image forming apparatus main assembly 170. Part (a) of FIG. 42 shows a state in which the developing unit 109 is separated from the photosensitive drum 104. Part (b) of FIG. 42 shows a state in which the developing unit 109 is in contact with the photosensitive drum 104.

First, in a state where the separation holding member 151R is placed at the separation holding position and the developing unit 109 is located at the separation position, the pressed portion 152Re of the force applying member 152R is pushed in the ZA direction. By this, the projecting portion 152Rh of the force applying member 152R projects from the process cartridge 100. The second pressed surface 151Re of the separation holding member 151R is in contact with the second pressing surface 152Rr of the force applying member 152R by the tension spring 153 as described above. Therefore, when the second force receiving portion 152Rn is pressed in the direction of the arrow W42, the force applying member 152R rotates in the direction of the arrow BB about the force applying member swing axis HC to rotate the separation holding member 151R in the direction of the arrow B2. When the separation holding member 151R rotates in the direction of arrow B2, the separation holding surface 151Rc separates from the contact surface 116*c*, by which the developing unit 109 can rotate from the separation position in the direction of arrow V2 about the swing axis K. That is, the developing unit 109 rotates in the V2 direction from the separated position, and the developing roller 106 of the developing unit 109 comes into contact with the photosensitive drum 104. Here, the position of the developing unit 109 in which the developing roller 106 and the photosensitive drum 104 contact each other is referred to as a contact position (development position) (state of part (b) of FIG. 42. The position where the separation holding surface 151Rc of the separation holding member 151R is separated from the contact surface 116*c* is referred to as a separation permission position (permission position). When the developing unit 109 is located at the contact position, the second restriction surface 151Rk of the separation holding member 151R contacts the second restriction surface 116*d* of the driving side cartridge cover 116, so that the separation holding member 151R is maintained at the separation release position.

Further, the driving side bearing 126 has a first pressed surface 126*c* which is a surface perpendicular to the swing axis K. Since the driving side bearing 126 is fixed to the developing unit 109, the developing unit 109 presses the first force receiving portion 152Rk of the force applying member 152R in the direction of the arrow 41 in the state that the developing unit is in the contact position. Then, by the first pressing surface 152Rq being brought into contact with the first pressed surface 126*c*, the developing unit 109 rotates about the swing axis K in the direction of arrow V1 to move to a separated position (state shown in part (a) of FIG. 42). Here, the direction in which the first force receiving surface 126*c* moves when the developing unit 109 moves from the contact position to the separated position is shown by arrows W41 in part (a) of FIGS. 42 and 42(*b*). Further, the direction opposite to the arrow W41 is depicted by an arrow W42, and the arrow W41 direction and the arrow W42 direction are substantially horizontal (X1, X2 directions). The second force receiving surface 152Rp of the force applying member 152R assembled to the developing unit 109 as described above is on the upstream side of the first force receiving surface 126*c* of the driving side bearing 126 in the direction of the arrow W41. Further, the first force receiving surface 126*c* and the second force receiving surface 151Re of the separation holding member 151R are disposed at positions where they overlap at least partly in the W1 and W2 direction.

The detailed description of the operation of the separation contact mechanism 150R in the image forming apparatus main assembly 170 will be made below.

[Mounting of Process Cartridge to Image Forming Apparatus Main Assembly]

Next, referring to FIGS. 12, 23, and 24 the description will be made as to the engaging operation of 195 between the separation contact mechanism 150R of the process cartridge 100 and the development separation control unit of the image forming apparatus main assembly 170 when the process cartridge 100 is mounted to the image forming apparatus main assembly 170. For the sake of illustration, these Figures are sectional views in which a part of the development cover member 128 and a part of the driving side cartridge cover member 116 are omitted along the partial sectional lines CS1 and CS2, respectively.

Figure 23:
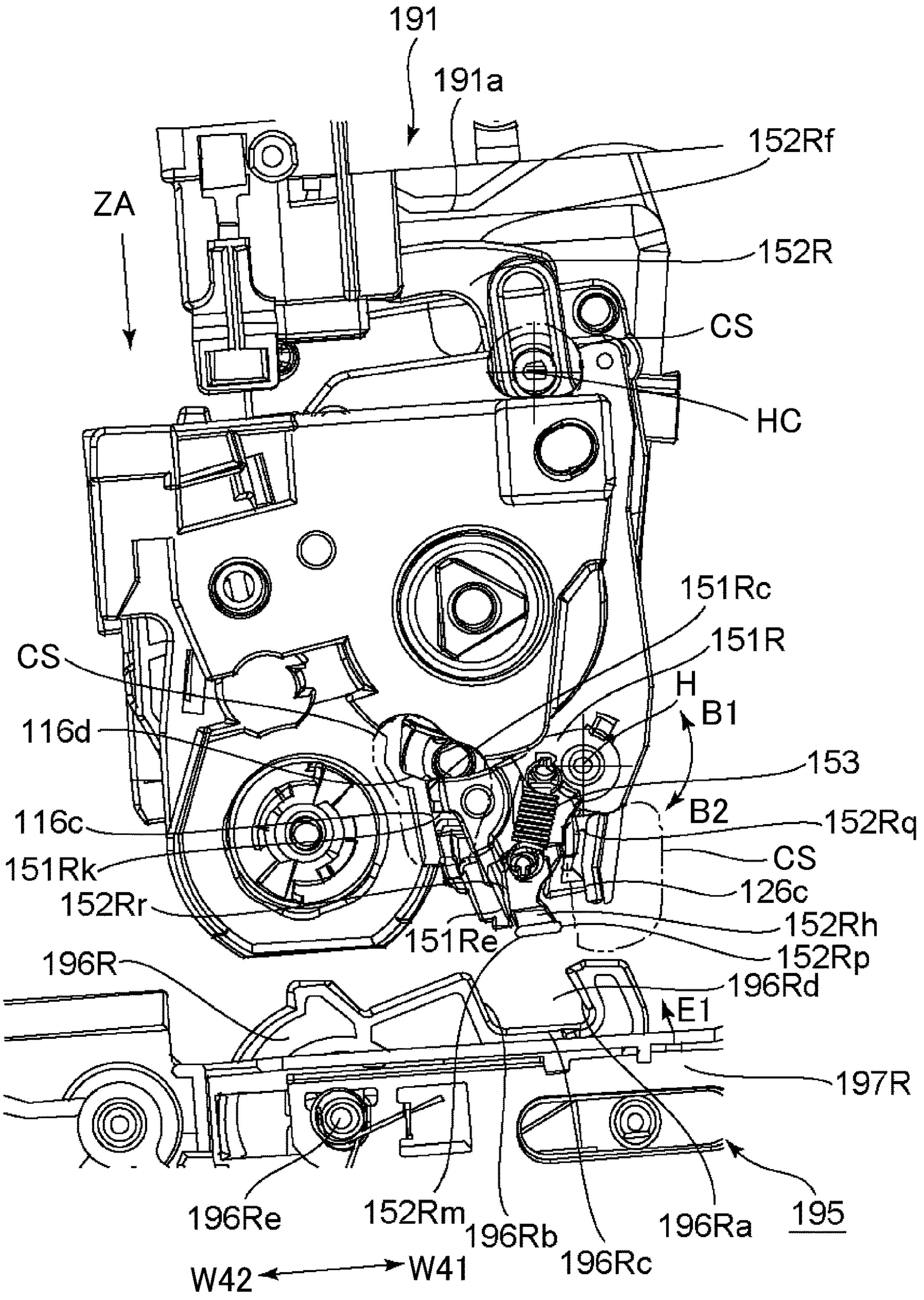
FIG. 23 is an illustration showing operation of a developing unit in the main assembly of the image forming apparatus.

FIG. 23 is a view as seen from the driving side of the process cartridge 100 when the process cartridge 100 is mounted on the cartridge tray 171 (not shown) of the image forming apparatus M and the cartridge tray 171 is inserted into the first mounting position. In this Figure, except for the process cartridge 100, the cartridge pressing unit 121, and the separation control member 196R are omitted.

As described above, the image forming apparatus main assembly 170 of this embodiment includes the separation control member 196R corresponding to each process cartridge 100 as described above. The separation control members 196R are arranged on the lower side of the image forming apparatus main assembly 170 below the separation holding member 151R when the process cartridge 100 is placed at the first inner position and the second inner position. The separation control member 196R has a first force applying surface 196Ra and a second force applying surface 196Rb which project toward the process cartridge 100 and face each other across the space 196Rd. The first force applying surface 196Ra and the second force applying surface 196Rb are connected with each other by way of a connecting portion 196Rc in the lower side of the image forming apparatus main assembly 170. Further, the separation control member 196R is supported by the control sheet metal 197 rotatably about a rotation center 196Re. The separating member 196R is normally urged in an E1 direction by an urging spring. Further, the control sheet metal 197 is structured to be movable in the W41 and W42 directions by a control mechanism (not shown), so that the separation control member 196R is structured to be movable in the W41 and W42 directions.

As described above, in interrelation with the transition of the front door 11 of the image forming apparatus main assembly 170 from the open state to the closed state, the cartridge pressing unit 121 lowers in the direction of arrow ZA, and the first force applying portion 121*a* is brought into contact with the pressed surface 152Rf of the force applying member 152R. After that, when the cartridge pressing unit 121 is lowered to a predetermined position which is the second mounting position, the projecting portion 152Rh of the force applying member 152R projects downward in the Z2 direction of the process cartridge 100 (state in FIG. 24). This position is referred to as a projecting position of the force applying member 152R. When this operation is completed, as shown in FIG. 24, a gap T4 is formed between the first force applying surface 196Ra of the separation control member 196R and the first force receiving surface 152Rp of the force applying member 152R, and a gap T3 is formed between the second force applying surface 196Rb and the second force receiving surface 152Rp. Then, it is placed at the second mounting position where the separation control member 196R does not act on the force applying member 152R. This position of the separation control member 196R is referred to as a home position. The arrangement is such that at this time, the first force receiving surface 152Rp of the force applying member 152R and the first force applying surface 196Ra of the separation control member 196R are partly overlapped in the W1 and W2 direction. Similarly, the arrangement is such that the second force receiving surface 152Rp of the force applying member 152R and the second force applying surface 196Rb of the separation control member 196R are partly overlapped in the W1 and W2 direction.

[Contact Operation of Developing Unit]

Next, referring to FIGS. 24 to 26, the detailed description will be made as to the operation of contacting between the photosensitive drum 104 and the developing roller 106 by the separation contact mechanism 150R. For the sake of illustration, these Figures are sectional views of a part of the development cover member 128, a part of the driving side cartridge cover member 116, and a part of the driving side bearing 126, taken along lines CS1, CS2 and CS3, respectively.

Figure 24:
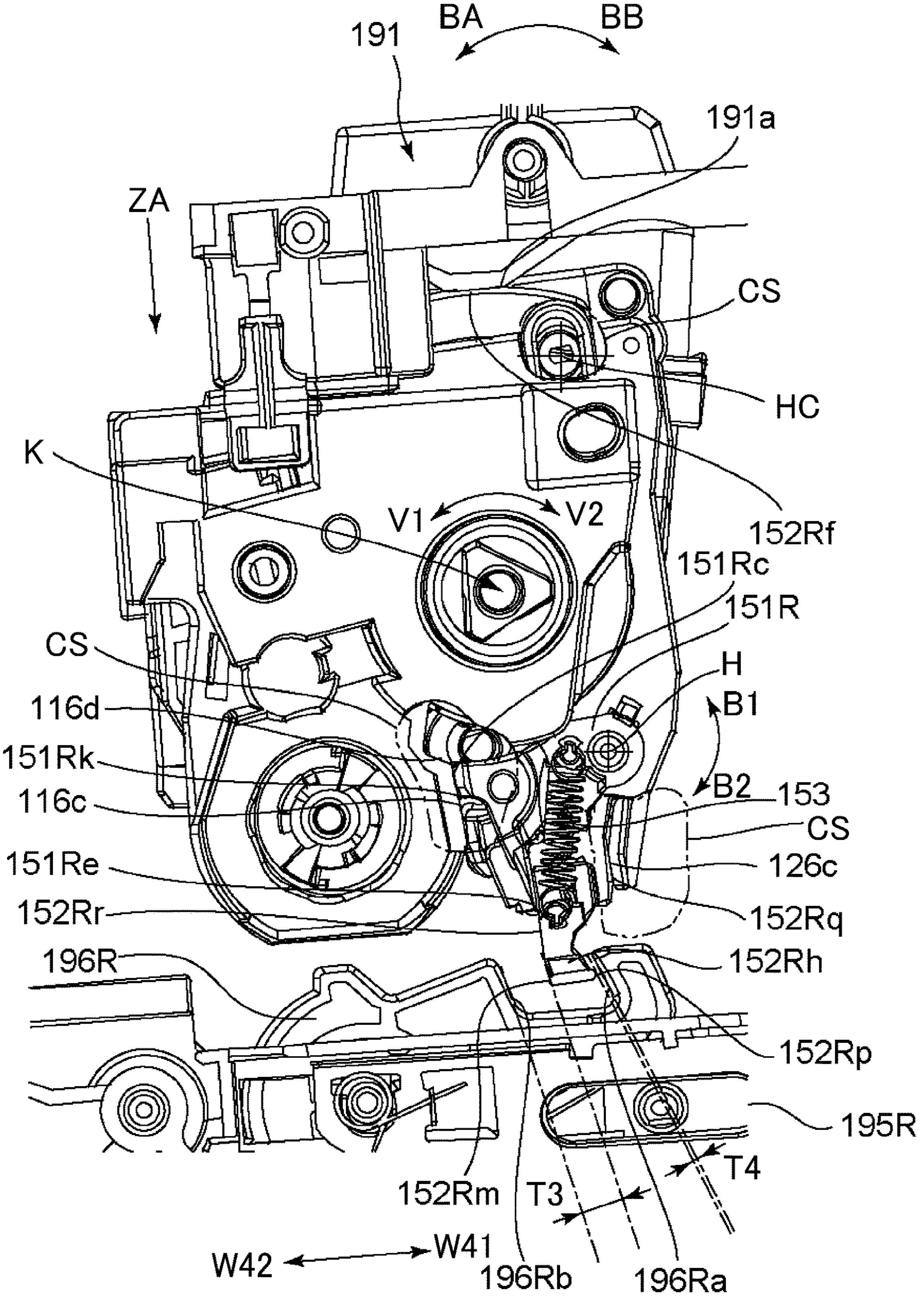
FIG. 24 is an illustration showing operation of the developing unit in the main assembly of the image forming apparatus.
Figure 25:
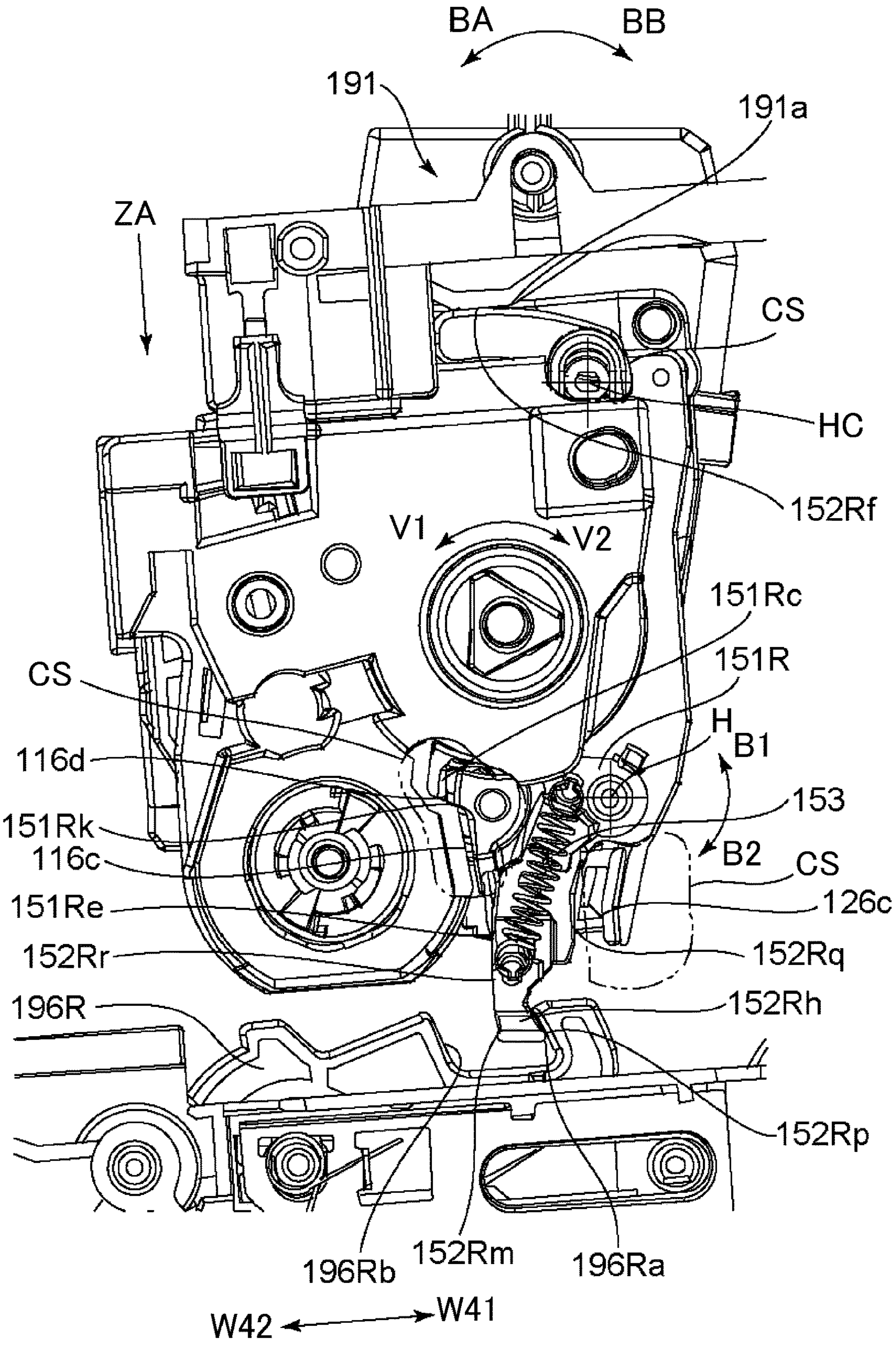
FIG. 25 is an illustration showing the operation of the developing unit in the main assembly of the image forming apparatus.

In the structure of this embodiment, the development input coupling 32 receives a driving force from the image forming apparatus main assembly 170 in the direction of arrow V2 in FIG. 24, so that the developing roller 106 rotates. That is, the developing unit 109 including the developing input coupling 32 receives torque in the arrow V2 direction about the swing axis K from the image forming apparatus main assembly 170. As shown in FIG. 24, when the developing unit 109 is in the separated position and the separation holding member 151R is in the separation holding position, the developing unit 109 receives this torque and an urging force by the development pressure spring 134 as will be described hereinafter. Even in this case, the separation holding surface 151Rc of the separation holding member 151R contacts the contact surface 116*c* of the driving side cartridge cover member 116, and therefore, the attitude of the developing unit 109 is maintained at the separation position.

The separation control member 196R of this embodiment is structured to be movable in the direction of arrow W42 in FIG. 24 from the home position. When the separation control member 196R moves in the W42 direction, the second force applying surface 196Rb of the separation control member 196R and the second force receiving surface 152Rp of the force applying member 152R come into contact with each other, so that the force applying member 152R rotates about the swing axis HC of the force applying member 152R in the BB direction. Further, as the force applying member 152R rotates further, the separation holding member 151R is rotated in the B2 direction, while the second pressing surface 152Rr of the force applying member 152R contacts the second pressed surface 151Re of the separation holding member 151R. Then, the separation holding member 151R is rotated by the force applying member 152R to the separation permission position where the separation holding surface 151Rc and the contact surface 116*c* are separated from each other. Here, the position of the separation control member 196R for moving the separation holding member 151R to the separation permission position shown in FIG. 25 is referred to as a first position.

In this manner, the separation control member 196R moves the separation holding member 151R to the separation permission position. Then, the developing unit 109 is rotated in the V2 direction by the torque received from the image forming apparatus main assembly 170 and the development pressure spring 134 which will be described hereinafter, and moves to the contact position where the developing roller 106 and the photosensitive drum 104 are in contact with each other (state shown in FIG. 25). At this time, the separation holding member 151R urged in the direction of arrow B1 by the tension spring 153 is maintained at the separation permission position by the second restricted surface 151Rk coming into contact with the second restriction surface 116*d* of the driving side cartridge cover member 116. Thereafter, the separation control member 196R moves in the direction of W41 and returns to the home position. At this time, the force applying member 152R is rotated in the BA direction by the tension spring 153, and the first pressing surface 152Rq of the force applying member 152R and the first pressing surface 126*c* of the driving side bearing 126 become in contact with each other (state shown in FIG. 26).

By this, the above-mentioned gaps T3 and T4 are formed again, and are placed at positions where the separation control member 196R does not act on the force applying member 152R. The transition from the state of FIG. 25 to the state of FIG. 26 is performed without a delay.

As described above, in the structure of this embodiment, by the separation control member 196R moving from the home position to the first position, the force applying member 152R can be rotated and the separation holding member 151R is moved from the separation holding position to the separation permission position. By this, the developing unit 109 can move from the separated position to the contacting position where the developing roller 9 and the photosensitive drum 104 are in contact with each other. The position of the separation control member 196R in FIG. 26 is the same as that in FIG. 24.

[Separation Operation of Developing Unit]

Next, referring to FIGS. 26 and 27, the operation of moving the developing unit 109 from the contact position to the distance position by the separation contact mechanism 150R will be described in detail. For the sake of better illustration, these Figures are cross-sectional views taken along the line CS, in which a part of the development cover member 128, a part of the driving side cartridge cover member 116, and a part of the driving side bearing 126 are partially omitted.

Figure 26:
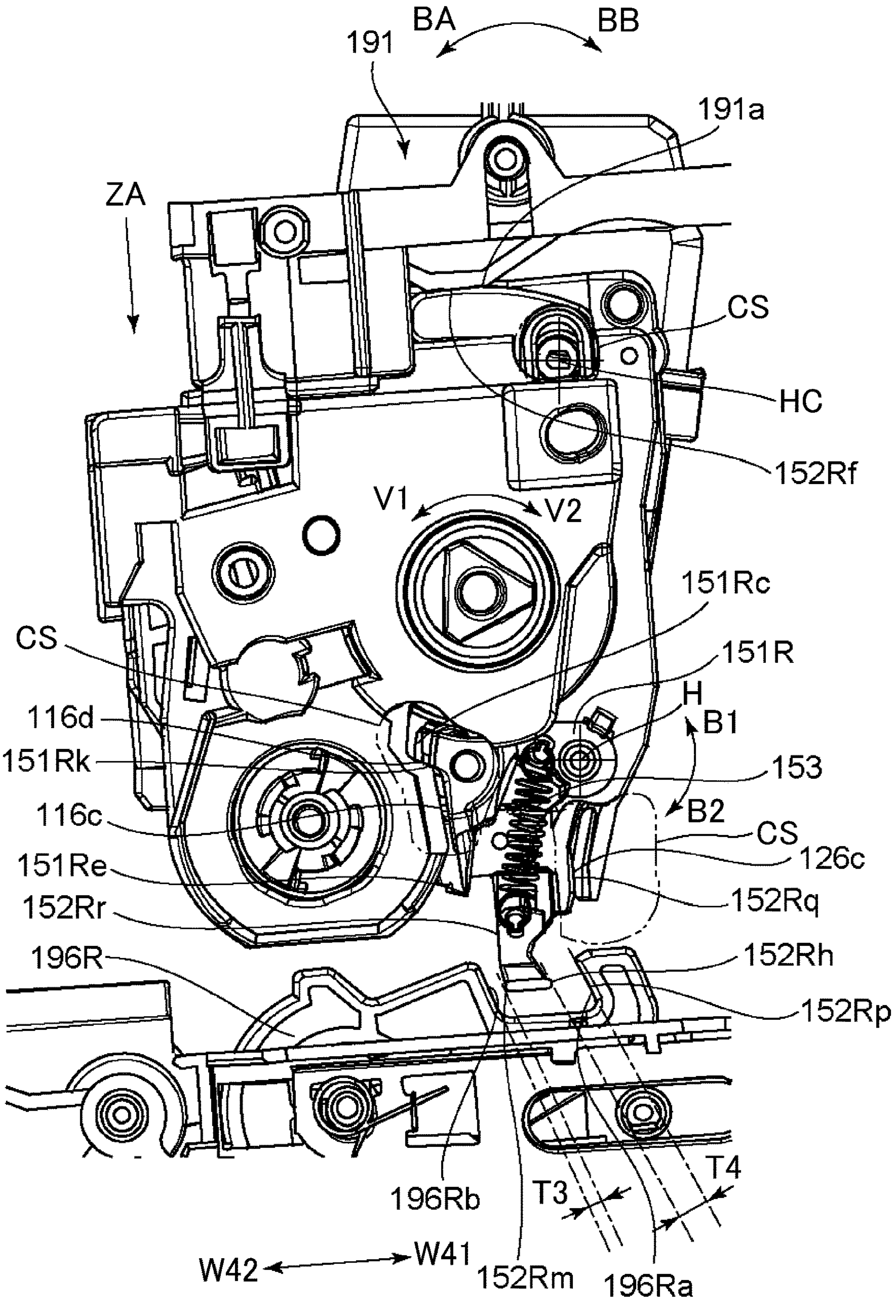
FIG. 26 is an illustration showing the operation of the developing unit in the main assembly of the image forming apparatus.
Figure 27:
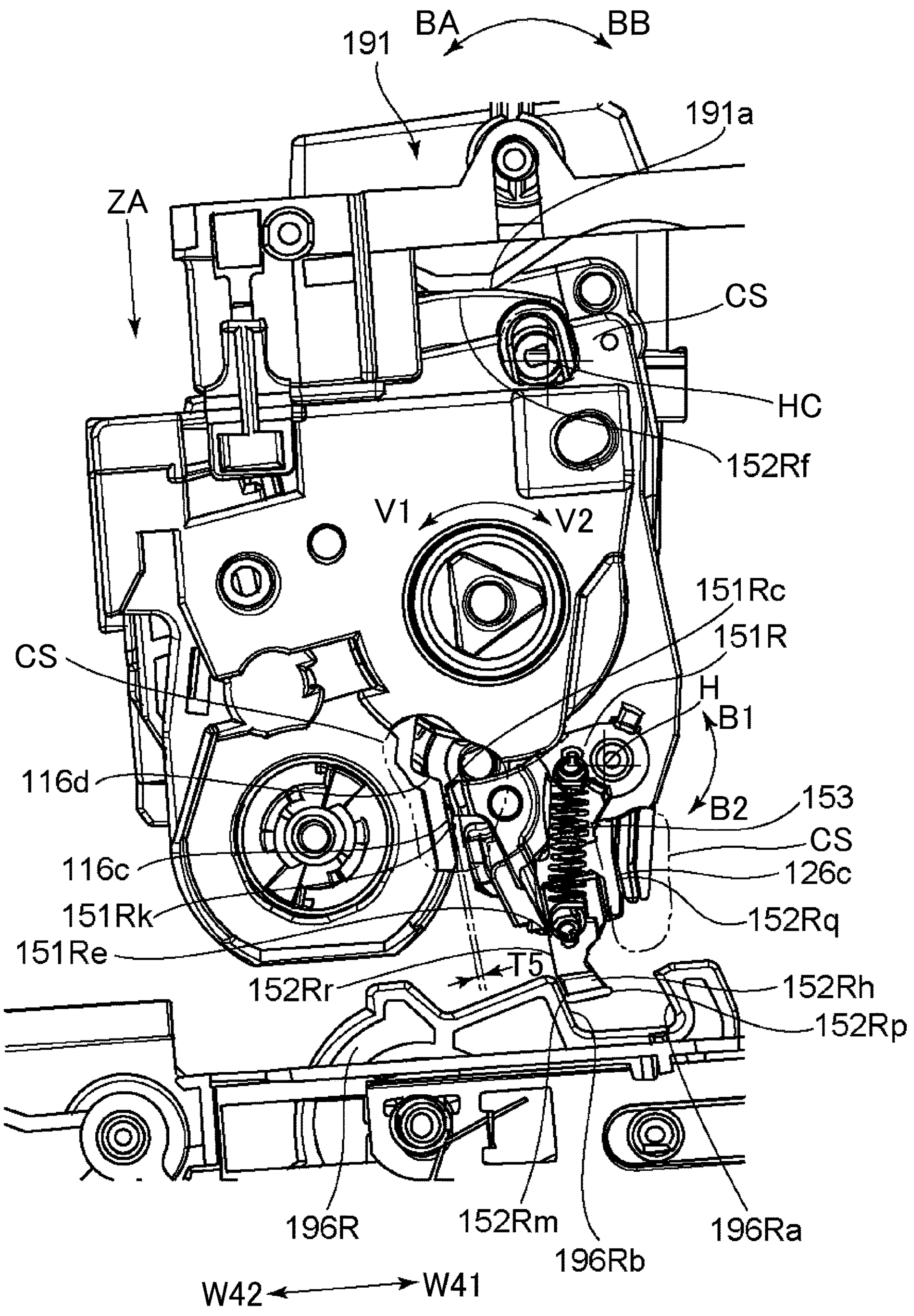
FIG. 27 is an illustration showing the operation of the developing unit in the main assembly of the image forming apparatus.

The separation control member 196R in this embodiment is structured to be movable from the home position in the direction of arrow W41 in FIG. 26. When the separation control member 196R moves in the W41 direction, the first force applying surface 196Rb and the first force receiving surface 152Rm of the force applying member 152R are brought into contact with each other, and the force applying member 152R rotates about the force applying member swing axis HC in the direction indicated by the arrow BB. Rotate in the direction. Then, the developing unit 109 rotates from the contact position in the direction of the arrow V1 about the swing axis K, by the first pressing surface 152Rq of the force applying member 152R being brought into contact with the first pressed surface 126*c* of the driving side bearing 126 (State shown in FIG. 27). Here, the pressed surface 152Rf of the force applying member 152R has the arc shape, and the center of the arc is placed so as to coincide with the swing axis K. By this, when the developing unit 109 moves from the contact position to the separated position, the force received by the pressed surface 152Rf of the force applying member 152R from the cartridge pressing unit 121 is directed in the swing axis K direction. Therefore, the developing unit 109 can be operated so as not to hinder the rotation in the arrow V1 direction. In the separation holding member 151R, the second restricted surface 151Rk of the separation holding member 151R and the second restriction surface 116*d* of the driving side cartridge cover member 116 are separated from each other, and the separation holding member 151R is rotated in the arrow B1 direction by the urging force of the tension spring 153. By this, the separation holding member 151R rotates until the second pressed surface 151Re comes into contact with the second pressing surface 152Rr of the force applying member 152R, and by the contacts, the separation holding member 151R shifts to the separation holding position. When the developing unit 109 is moved from the contact position to the separation position by the separation control member 196R and the separation holding member 151R is in the separation holding position, the gap T5 is formed between the separation holding surface 151Rc and the contact surface 116*c* as shown in FIG. 27. Here, the position shown in FIG. 27 in which the developing unit 109 is rotated from the contact position toward the separation position and the separation holding member 151 can move to the separation holding position is referred to as a second position of the separation control member 196R.

Thereafter, the separation control member 196R moves in the direction of the arrow W42 and returns from the second position to the home position. Then, while the separation holding member 151R is maintained in the separation holding position, the developing unit is rotated in the arrow V2 direction by the torque received from the image forming apparatus main assembly 170 and the development pressure spring 134 which will be described hereinafter, and the separation holding surface 151Rc is contacted to the contact surface 116*c*. That is, the developing unit 109 is in a state where the separation position is maintained by the separation holding member 151R, and the developing roller 106 and the photosensitive drum 104 are in a state where they are separated by a gap P1 (states shown in FIG. 24 and part (a) of FIG. 42. By this, the above-mentioned gaps T3 and T4 are formed again, and the separation control member 196R is placed at a position not acting on the force applying member 152R (state in FIG. 24). The transition from the state of FIG. 27 to the state of FIG. 24 is executed without a delay.

As described above, in this embodiment, the separation control member 196R moves from the home position to the second position, so that the separation holding member 151R moves from the separation permission position to the separation holding position. Then, by the separation control member 196R returning from the second position to the home position, the developing unit 109 becomes in a state of maintaining the separation position by the separation holding member 151R.

[Detailed Description of Separation Holding Member L]

Here, referring to FIG. 28, the separation holding member 151L will be described in detail.

Figure 28:
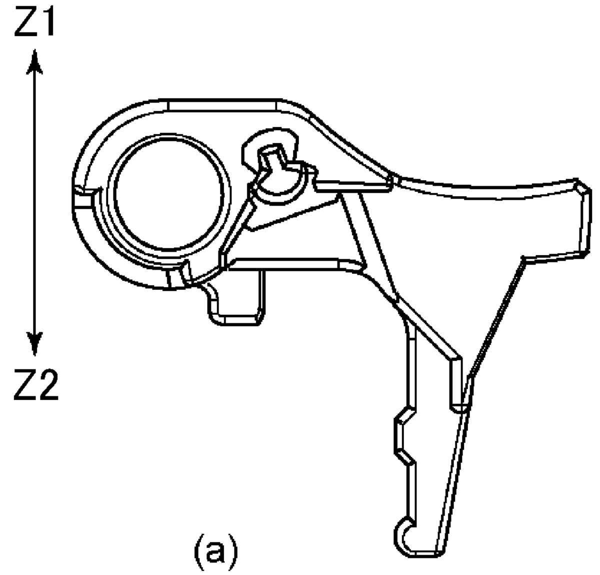
FIG. 28 is a view of the separation holding member L per se.
Figure 28:
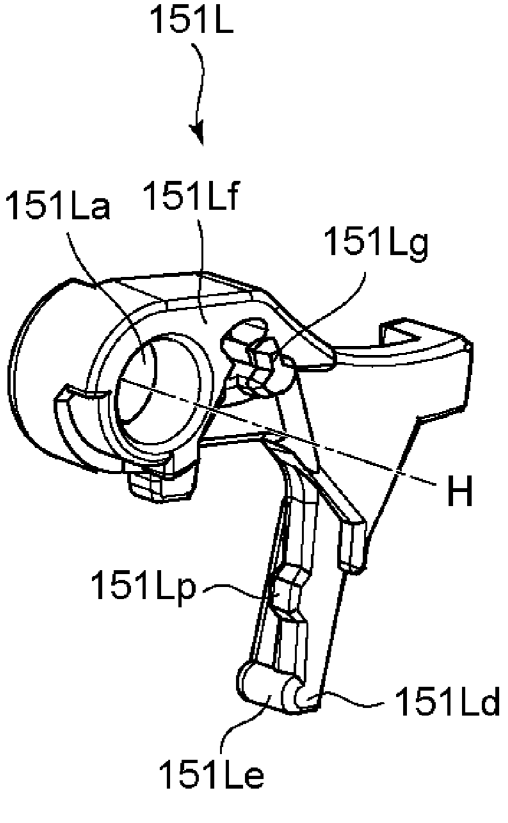
Figure 28:
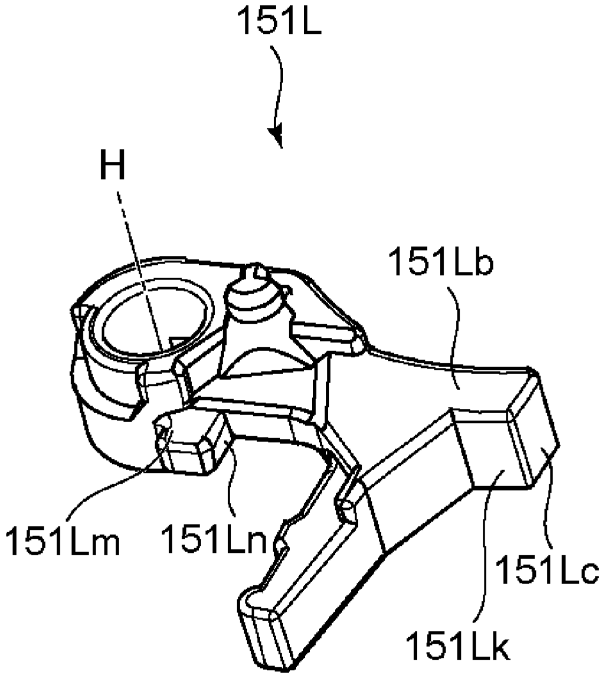

Part (a) of FIG. 28 is a front view of the process cartridge 100 per se of the separation holding member 151L as viewed in the longitudinal direction of the driving side, and FIGS. 28B and 28C are perspective views of the separation holding member 151L per se. The separation holding member 151L includes an annular support receiving portion 151La, and includes a separation holding portion 151Lb projecting from the support receiving portion 151La in the radial direction of the support receiving portion 151La. The free end of the separation holding portion 151Lb has an arc-shaped separation holding surface 151Lc extending about the separation holding member swing axis H.

Further, the separation holding member 151L has a second regulated surface 151Lk adjacent to the separation holding surface 151Lc. Further, the separation holding member 151L includes a second pressed portion 151Ld projecting from the support receiving portion 151La in the Z2 direction, and includes a arc-shaped second pressed surface 151Le projecting from the second pressed portion 151Ld in the direction of the separation holding member swing axis H of the support receiving portion 151La.

Further, the separation holding member 151L is provided with a main body portion 151Lf connected with the support receiving portion 151La, and the main body portion 151Lf is provided with a spring hooked portion 151Lg projecting in the direction of the separation holding member swing axis H of the support receiving portion 151La. Further, the main body portion 151Lf is provided with a rotation prevention portion 151*m* projecting in the Z2 direction, and a rotation prevention surface 151Ln is provided in a direction facing the second pressed surface 151Le.

[Detailed Description of Force Applying Member L]

Figure 29:
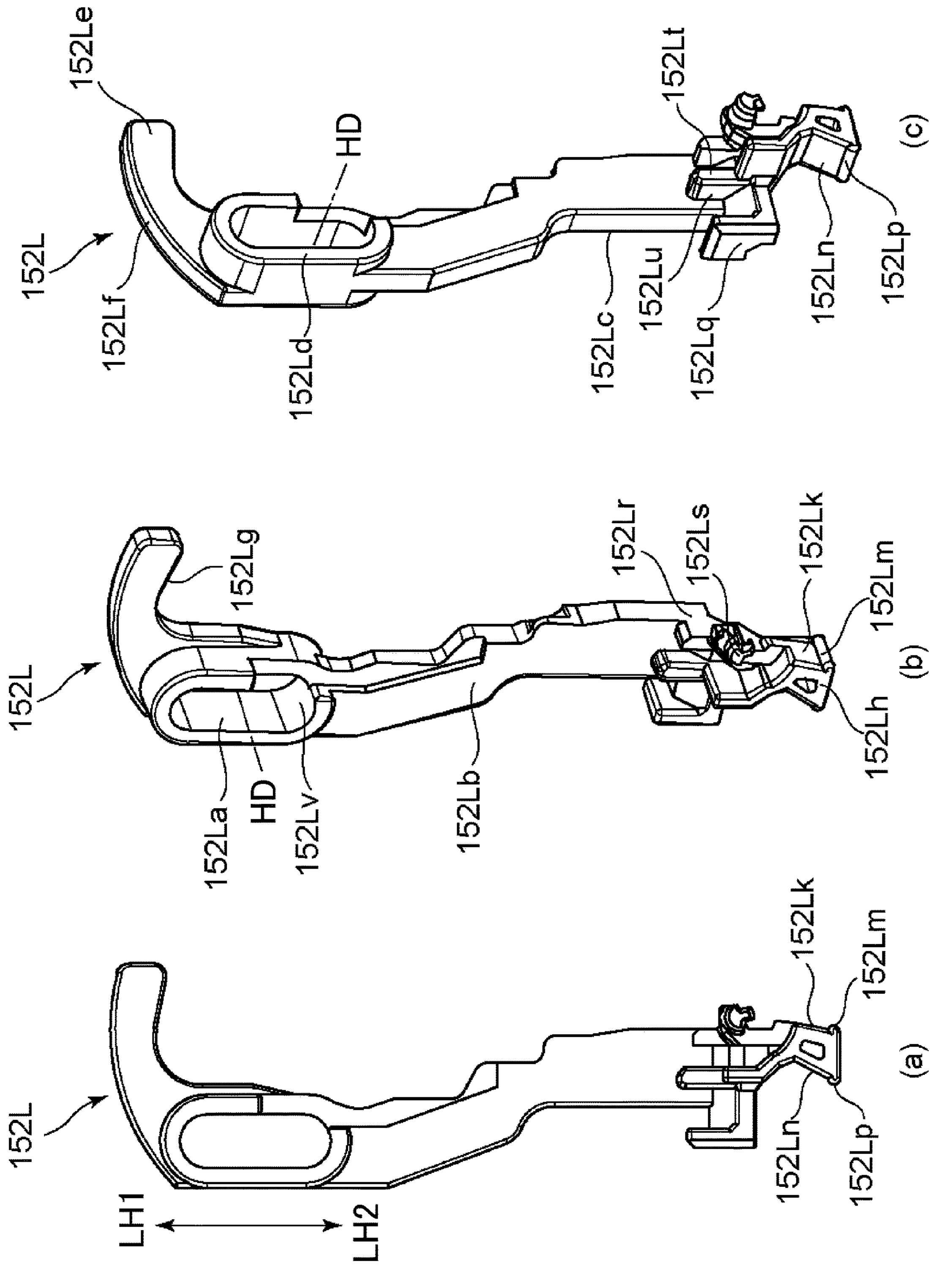
FIG. 29 is a view of the force applying member L per se.

Referring to FIG. 29, the force applying member 152L will be described in detail.

Part (a) of FIG. 29 is a front view of the force applying member 152L as viewed in the longitudinal direction of the process cartridge 100, and parts (b) and (c) of FIG. 29 are perspective views of the force applying member 152L.

The force applying member 152L is provided with an oblong-shaped oblong support receiving portion 152La. Here, the longitudinal direction of the oblong shape of the oblong support receiving portion 152La is depicted by an arrow LH, the upward direction is depicted by an arrow LH1, and the downward direction is depicted by an arrow LH2. Further, the direction in which the oblong support receiving portion 152La is extended is depicted by HD. The force applying member 152L is provided with a projecting portion 152Lh formed on the downstream side in the arrow LH2 direction of the oblong support receiving portion 152La. The oblong support receiving portion 152La and the projecting portion 152Lh are connected by a main body portion 152Lb with each other. On the other hand, the force applying member 152L includes a pushed portion 152Le projecting in the direction of arrow LH1 and in the direction substantially perpendicular to the direction of arrow LH1, and is provided with an arc-shaped pressed surface 152Lf on the downstream side in the arrow LH1 direction and is further provided with a pushing restriction surface of 152Lg on the upstream side. Further, the force applying member 152L has a first at-accommodation restriction surface 152Lv which is a part of the oblong support receiving portion 152La and which is provided on the downstream side in the arrow LH2 direction.

The projecting portion 152Lh includes a first force receiving portion 152Lk and a second force receiving portion 152Ln which are arranged so as to oppose each other in a direction substantially perpendicular to the arrow LH2 direction and a terminal portion in the arrow LH2 direction. The first force receiving portion 152Lk and the second force receiving portion 152Ln have a first force receiving surface 152Lm and a second force receiving surface 152Lp extending in the 1113 direction and having an arc shape, respectively. In addition, the projecting portion 152Lh is provided with a spring hooked portion 152Ls and a locking portion 152Lt projecting in the HB direction, and the locking portion 152Lt is provided with a locking surface 152Lu facing in the same direction as the second force receiving surface 152Lp.

Further, the force applying member 152L is a part of the main body portion 152Lb, is placed on the upstream side of the second force receiving portion 152Ln in the arrow LH2 direction, and has a first pressing surface 152Lq facing in the same direction as the second force receiving surface 152Lp. Further, the force applying member 152L is a part of the main body portion 152Lb, is placed on upstream side of the first force receiving portion 152Lk in the arrow LH2 direction, and has a first pressing surface 152Lr facing in the same direction as the first force receiving surface 152Lm.

In the state that the process cartridge 100 is mounted to the image forming apparatus main assembly 170, the LH1 direction is substantially the same as the Z1 direction, and the LH2 direction is substantially the same as the Z2 direction. Further, the HB direction is substantially the same as the longitudinal direction of the process cartridge 100.

[Assembling of Separation/Contact Mechanism L]

Figure 30:
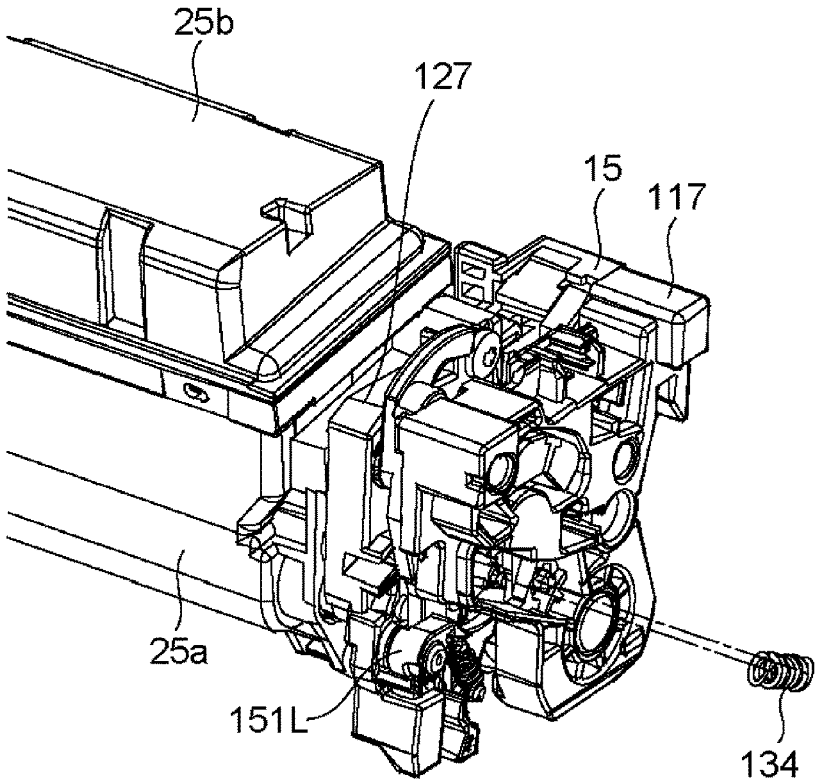
FIG. 30 is an assembly perspective view after assembling the development pressure spring and assembling the separation holding member L.
Figure 30:
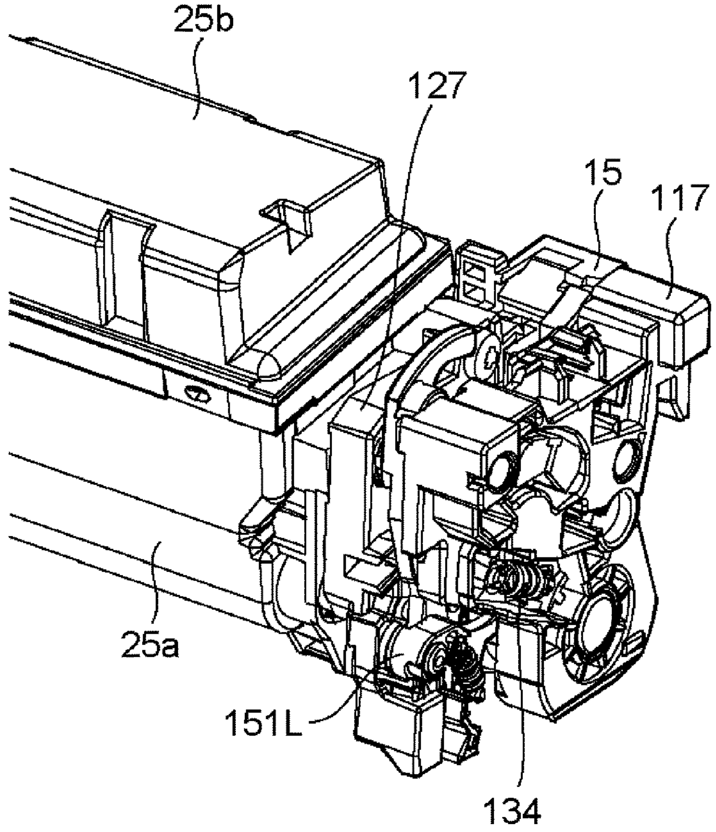

Next, referring to FIGS. 16 and 29 to 35, the assembly of the separation mechanism will be described. FIG. 30 is a perspective view of the process cartridge 100 after assembling the separation holding member therewith, as viewed from the driving side. As described above, as shown in FIG. 16, in the developing unit 109, the outer diameter portion of the cylindrical portion 127*a* of the non-driving side bearing 127 is fitted into the developing unit support hole portion 117*a* of the non-driving side cartridge cover member 117. By this, the developing unit 109 is supported so as to be rotatable relative to the photosensitive drum 104 about the swing axis K. Further, the non-driving side bearing 127 includes a cylindrical first support portion 127*b* and a second support portion 127*e* projecting in the direction of the swing axis K.

The outer diameter of the first support portion 127*b* fits with the inner diameter of the support receiving portion 151La of the separation holding member 151L, to rotatably support the separation holding member 151L. Here, the swing center of the separation holding member 151L assembled to the non-driving side bearing 127 is the separation holding member swing axis H. The non-driving side bearing 127 includes a first retaining portion 127*c* projecting in the direction of the separation holding member swing axis H. As shown in FIG. 16, the movement of the separation holding member 151L assembled to the non-driving side bearing 127 in the swing axis H direction is restricted by the first retaining portion 127*c* coming into contact with the separation holding member 151L.

Further, the outer diameter of the second support portion 127*e* fits with the inner wall of the oblong support receiving portion 152La of the force applying member 152L, to support the force applying member 152L so as to be rotatable and movable in the oblong direction. Here, the swing center of the force applying member 152L assembled to the non-driving side bearing 127 is the force applying member swing axis HC. As shown in FIG. 16, the movement of the force applying member 152L assembled to the non-driving side bearing 127 in the direction of the swing axis HE is restricted by the second retaining portion 127*f* coming into contact with the separation holding member 151L.

Figure 31:
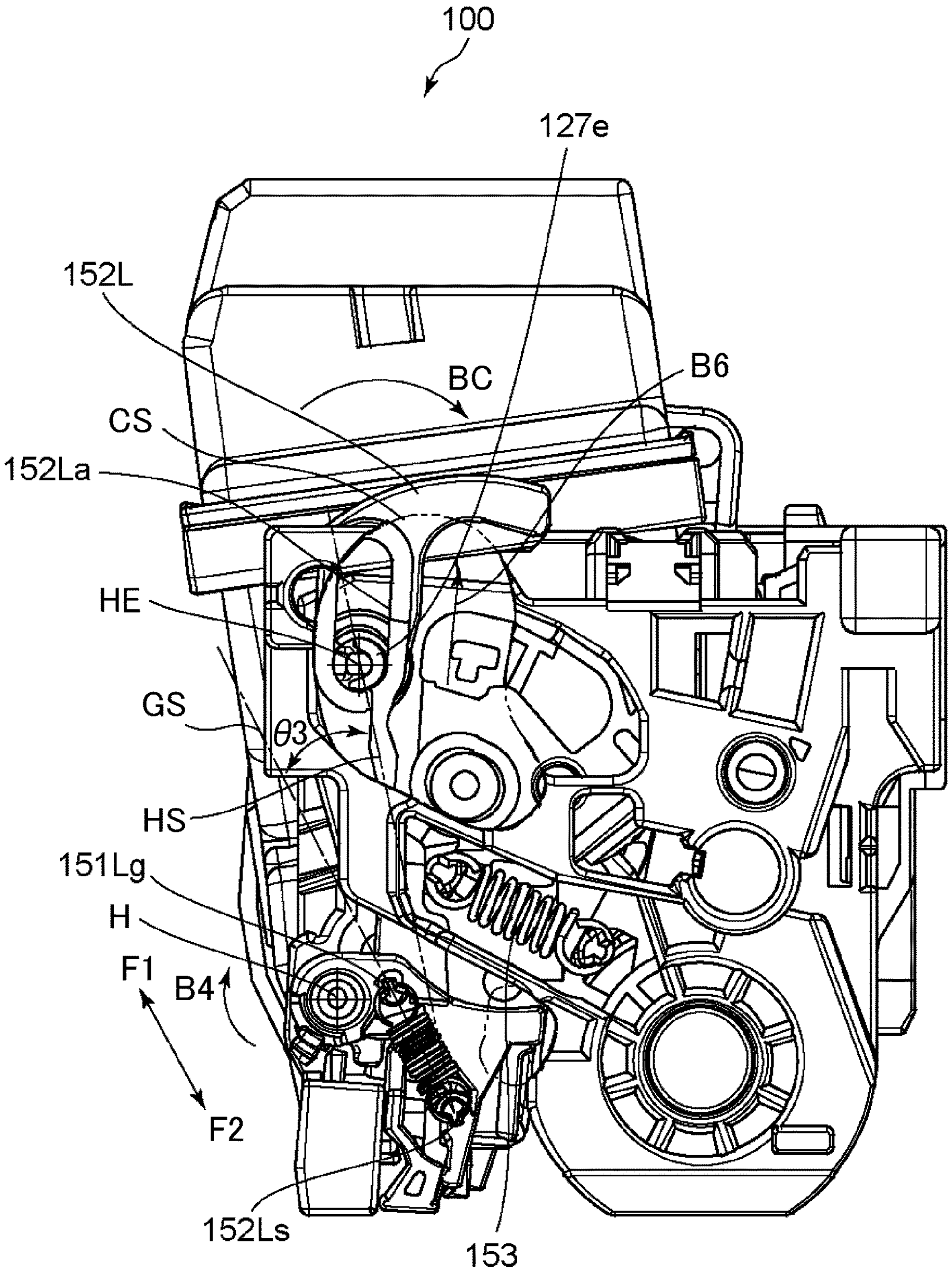
FIG. 31 is a partial sectional view of the separation holding member L after assembly.

FIG. 31 is a view of the process cartridge 100 after being assembled with the separation holding member 151L as viewed in the developing unit swing axis H direction. It is a view taken along a line CS with a part of the non-driving side cartridge cover member 117 omitted so that the fitting portion between the oblong support receiving portion 151La of the force applying member 152L and the cylindrical portion 127*e* of the non-driving side bearing 127 can be seen. Here, the separation contact mechanism 150L is provided with a tension spring 153 for urging the separation holding member 151L to rotate in the direction of arrow B1 about the separation holding member swing axis H and for urging the force applying member 152L in the direction of arrow B3. The arrow B3 direction is a direction substantially parallel to the longitudinal direction LH2 (see FIG. 29) of the oblong support receiving portion 152La of the force applying member 152L. The tension spring 153 is assembled between the spring hooked portion 151Lg provided on the separation holding member 151L and the spring hooked portion 152Ls provided on the force applying member 152L. The tension spring 153 applies a force to the spring hooked portion 151Lg of the separation holding member 151L in the direction of arrow F2 in FIG. 31 to apply an urging force for rotating the separation holding member in the direction of arrow B1. Further, the tension spring 153 applies a force to the spring hooked portion 152Ls of the force applying member 152L in the direction of the arrow F1 to apply an urging force for moving the force applying member 152L in the direction of the arrow B3.

The line connecting the spring hooked portion 151Lg of the separation holding member 151L and the spring hooked portion 152Ls of the force holding member 152L is GS. The line connecting the spring hooked portion 152Ls of the force applying member 152L and the force applying member swing axis HE is HS. A angle θ3 formed by the line GS and the line HE is selected to satisfy the following inequity (3) with the counterclockwise direction being positive about the spring hooked portion 152Ls of the force applying member 152L. By this, the force applying member 152L is urged to rotate in the BA direction in the drawing about the force applying member swing axis HE.

$$0° \leq \theta 3 \leq 90° \quad (3)$$

In this embodiment, the mounting positions of the separation holding member 151L and the force applying member 152L are as follows. As shown in FIG. 29, in the direction of the swing axis K, the separation holding member 151L and the force applying member 152L are disposed on the side (longitudinal outside) where the non-driving side cartridge cover member 117 of the non-driving side bearing 127 is placed. However, the positions to be arranged are not limited to the examples, and they may be provided on the development frame 125 side (inside in the longitudinal direction) of the non-driving side bearing 127, and the separation holding member 151L and the force applying member 152L may be provided with the non-driving side bearing 127 interposed therebetween. Further, the arrangement order of the separation holding member 151L and the force applying member 152L may be interchanged.

The non-driving side bearing 127 is fixed to the development frame 125 to form the developing unit 109. As shown in FIG. 16, in the fixing method in this embodiment, a fixing screw 145 and an adhesive (not shown), but the fixing method is not limited to this example, and welding such as welding by heating or pouring and hardening of resin can be employed.

Figure 32:
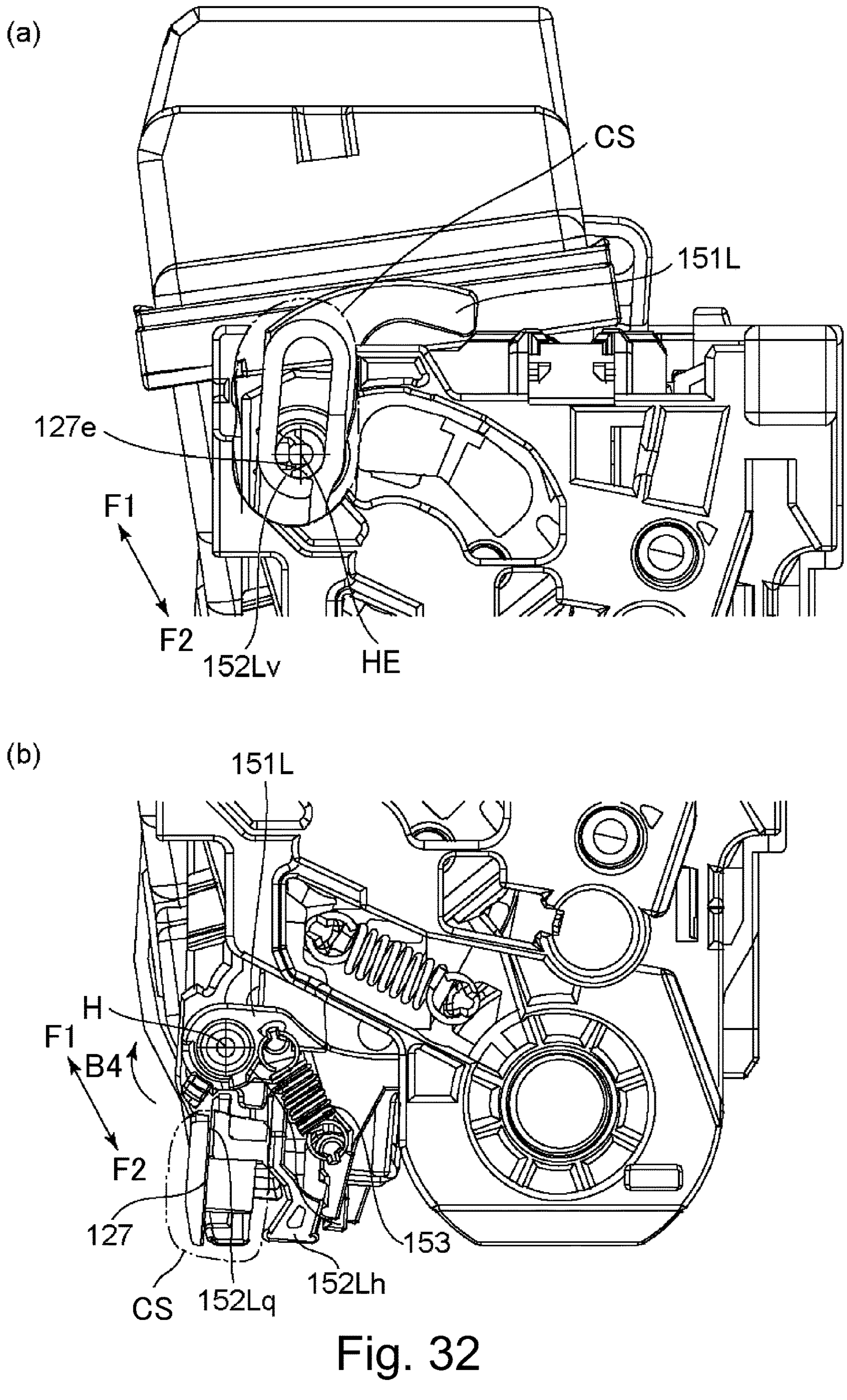
FIG. 32 is an enlarged view of the peripheries of the separation holding member L and the force applying member L.

Part (a) of FIG. 32 and part (b) of FIG. 32 are sectional views in which a portion of the non-driving side cartridge cover member 117, the tension spring 153, and the separation holding member 151L is partially omitted by the partial sectional line CS. For the sake of explanation, in part (a) of FIG. 32 and part (b) of FIG. 32 the parts around the force applying member swing axis HE and the separation holding portion 151L of the force applying member 152L shown in FIG. 31 is enlarged.

In the force applying member 152L, the first restriction surface 152Lv of the force applying member 152L comes into contact with the second support portion 127*e* of the non-driving side bearing 127 by the urging force of the tension spring 153 in the arrow F1 direction. Further, as shown in part (b) of FIG. 32, the first pressing surface 152Lq of the force applying member 152L contacts the first pressed surface 127*h* of the non-driving side bearing 127 to be positioned in place. This position is referred to as an accommodation position (reference position) of the force applying member 152L. Further, the separation holding member 151L is rotated in the direction of the arrow B1 about the swing axis H of the separation holding member by the urging force of the tension spring 153 in the arrow F2 direction, and the contact surface 151Lp of the separation holding member 151L is brought into contact with the second pressing surface 152Lr of the force applying member 152L, by which it is positioned in place. This position is referred to as a separation holding position (restricted position) of the separation holding member 151L. When the force applying member 152L moves to the projecting position which will be described hereinafter, the second pressed surface 151Le of the separation holding member 151L contacts the second pressing surface 152Lr of the force applying member 152L to be positioned at the separation holding position.

Figure 33:
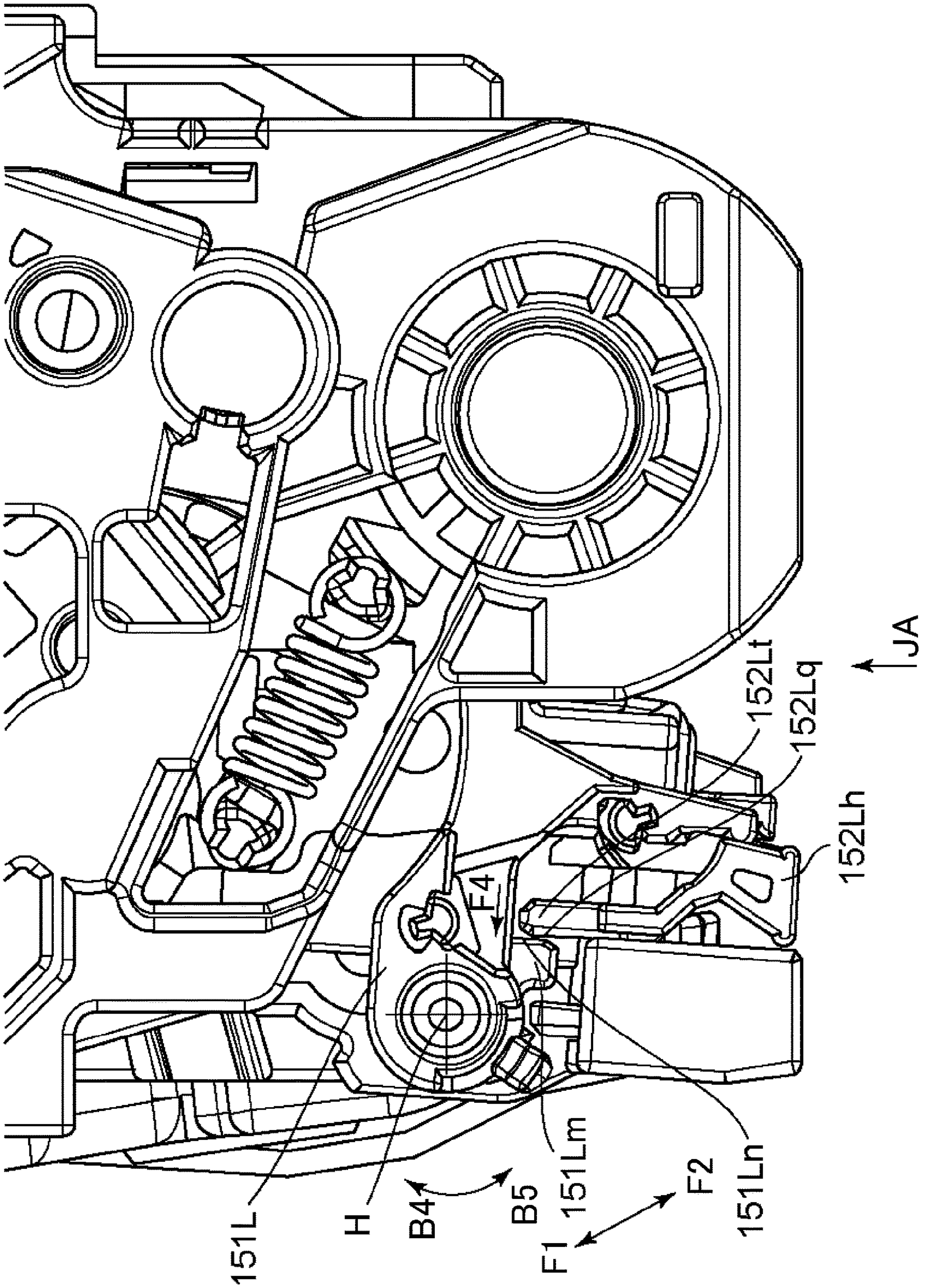
FIG. 33 is an enlarged view of the periphery of the separation holding member.
Figure 34:
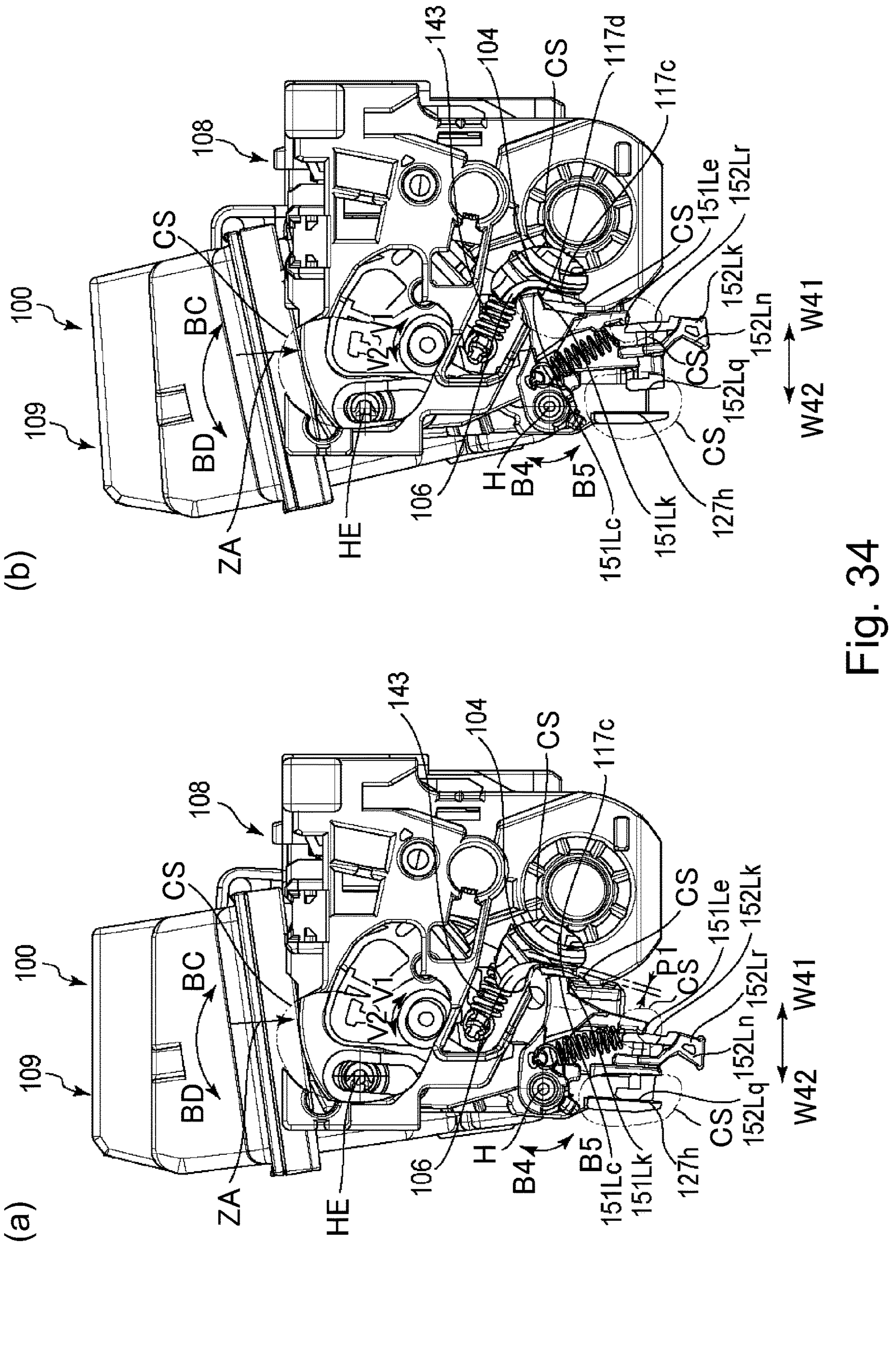
FIG. 34 is a side view as viewed from the driving side with the process cartridge mounted inside the image forming apparatus main assembly.

Further, FIG. 33 is an illustration in which the periphery of the separation holding portion 151L in FIG. 31 is enlarged for the sake of illustration, and the tension spring 153 is omitted. Here, the consideration will be made as to the case where the process cartridge 100 including the separation contact mechanism 150L is dropped in the direction of arrow JA in FIG. 33 when the process cartridge 100 is transported. At this time, the separation holding member 151L receives a force of rotating in the direction of arrow B2 due to its own weight around the separation holding swing axis H. When the separation holding member 151L starts to rotate in the arrow B2 direction, for the above reason, the rotation prevention surface 151Ln of the separation holding member 151L comes into contact with the locking surface 152Lu of the force applying member 152L, and the separation holding member 151L receives the force in the direction F4 of suppressing the rotation in the arrow B2 direction. By this, it is possible to prevent the separation holding member 151L from rotating in the direction of the arrow B2 during transportation, and it is possible to prevent impairment of the state of separation between the photosensitive drum 104 and the developing unit 109.

In this embodiment, the tension spring 153 is mentioned as an urging means for urging the separation holding member 151L to the separation holding position and the force applying member 152L to the accommodation position, but the urging means is limited to this example. For example, a torsion coil spring, a leaf spring, or the like may be used as an urging means to urge the force applying member 152L to the accommodation position and to urge the separation holding member 151L to the separation holding position. Further, the material of the urging means may be metal, a mold, or the like, which has elasticity and can urge the separation holding member 151L and the force applying member 152L.

As described above, the developing unit 109 provided with the separation contact mechanism 150L is integrally coupled with the drum holding unit 108 by the non-driving side cartridge cover member 117 as described above (state in FIG. 30). As shown in FIG. 16, the non-driving side cartridge cover 117 of this embodiment has a contact surface 117*c*. The contact surface 117*c* is a surface parallel to the swing axis K. Further, as shown in FIGS. 16 and 30 when the non-driving side cartridge cover member 117 is assembled to the developing unit 109 and the drum holding unit 108, the contact surface 117*c* faces the separation holding surface 151Lc of the separation holding member 151L placed at a separation holding position.

Here, the process cartridge 100 includes a development pressure spring 134 as an urging member for bringing the developing roller 106 into contact with the photosensitive drum 104. The development pressure spring 134 is assembled between the spring hooked portion 117*e* of the non-driving side cartridge cover member 117 and the spring hooked portion 127*k* of the non-driving side bearing 127. The urging force of the development pressure spring 134 causes the separation holding surface 151Lc of the separation holding member 151L and the contact surface 117*c* of the non-driving side cartridge cover member 117 to contact each other. Then, when the contact surface 117*cc* and the separation holding surface 151Lc contact each other, the attitude of the developing unit 109 is positioned so that the developing roller 106 of the developing unit 109 and the photosensitive drum 104 are spaced by a gap P1. The state in which the developing roller 106 is spaced from the photosensitive drum 104 by the gap P1 by the separation holding member 151L is referred to as a separation position (retracted position) of the developing unit 109 (see part (a) of FIG. 35.

Figure 35:
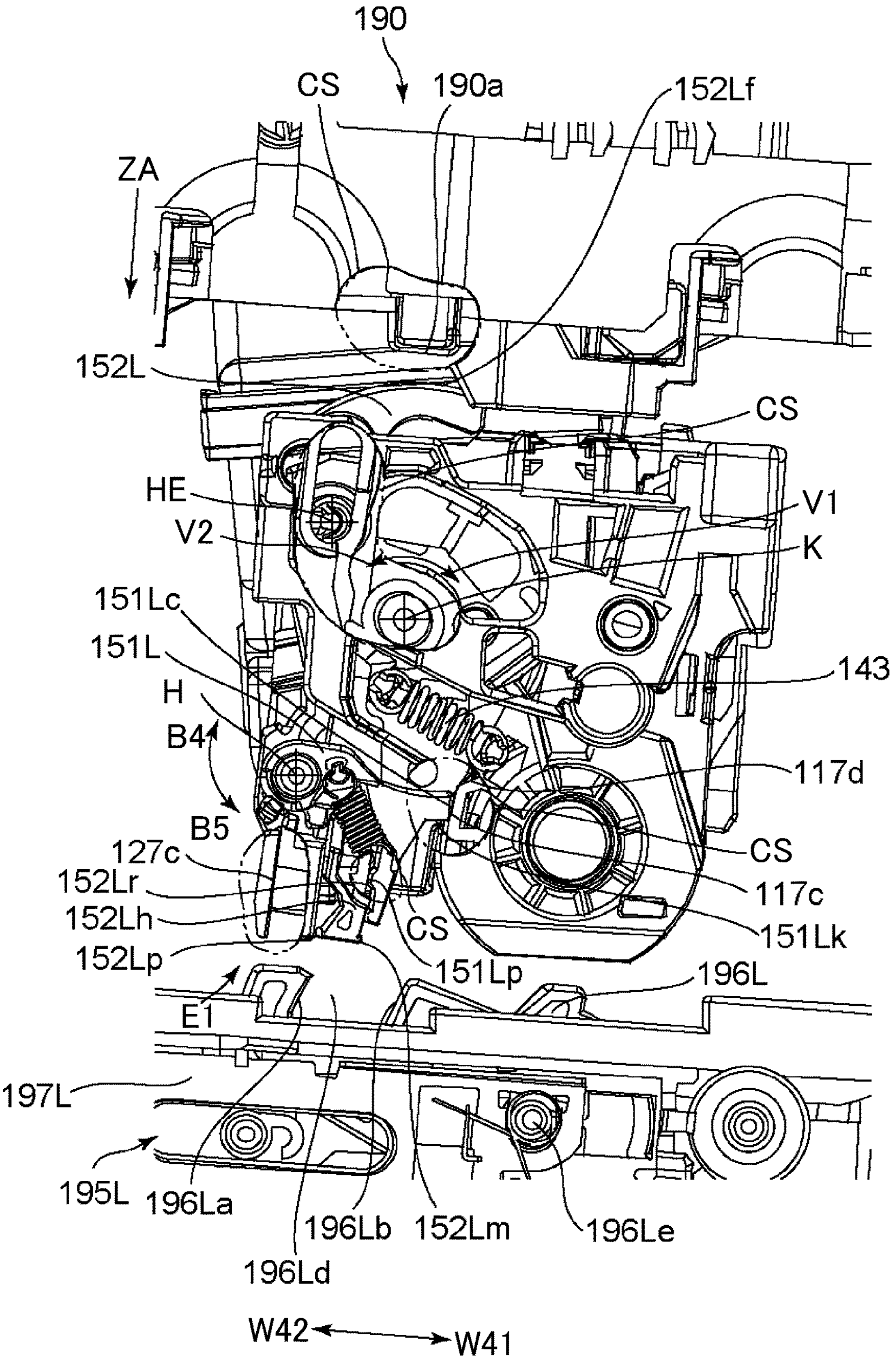
FIG. 35 is an illustration showing a process cartridge in the main assembly of the image forming apparatus.

Here, referring to FIG. 35, the separated state and the contact state of the process cartridge 100 will be described in detail. FIG. 35 is a side view of the process cartridge 100 as viewed from the non-driving side with the process cartridge 100 mounted inside the image forming apparatus main assembly 170. Part (a) of FIG. 35 shows a state in which the developing unit is separated from the photosensitive drum 104. Part (b) of FIG. 35 shows a state in which the developing unit 109 is in contact with the photosensitive drum 104.

First, in a state in which the separation holding member 151L is placed at the separation holding position and the developing unit 109 is placed at the separation position, the pushed portion 152Le of the force applying member 152L is pushed in the direction of arrow ZA. By this, the projecting portion 152Lh of the force applying member 152L projects from the process cartridge 100 (state of part (a) of FIG. 34. This position is referred to as a projecting position of the force applying member 152L. The second pressed surface 151Le of the separation holding member 151L is in contact with the second pressing surface 152Lr of the force applying member 152L by the tension spring 153 as described above. Therefore, when the second force receiving portion 152Ln is pressed in the direction of the arrow W42, the force applying member 152L rotates in the direction of the arrow BD about the force applying member swing axis HE to rotate the separation holding member 151L in the direction of the arrow B5. When the separation holding member 151L rotates in the direction of arrow B5, the separation holding surface 151Lc separates from the contact surface 117*c*, and the developing unit 109 becomes capable of rotating from the separation position in the direction of arrow V2 about the swing axis K.

That is, the developing unit 109 rotates in the V2 direction from the separated position, and the developing roller 106 of the developing unit 109 comes into contact with the photosensitive drum 104. Here, the position of the developing unit 109 in which the developing roller 106 and the photosensitive drum 104 contact each other is referred to as a contact position (development position) (state of part (b) of FIG. 34. The position where the separation holding surface 151Lc of the separation holding member 151L is separated from the contact surface 117*c* is referred to as a separation permission position (permission position). When the developing unit 109 is placed at the contact position, by the second restriction surface 151Lk of the separation holding member 151L contacting the second restriction surface 117*d* of the driving side cartridge cover 116, the separation holding member 151L is maintained at the separation permission position.

Further, the non-driving side bearing 127 of this embodiment has a first pressed surface 127*h* which is a surface perpendicular to the swing axis K. Since the non-driving side bearing is fixed to the developing unit 109, the developing unit 109 presses the first force receiving portion 152Lk of the force applying member 152L in the direction of the arrow 41 while the developing unit 109 is in the contact position. Then, by the first pressing surface 152Lq coming into contact with the first pressed surface 127*h*, the developing unit is rotated about the swing axis K in the direction of arrow V1 and moves to a separated position (state shown in part (a) of FIG. 34). Here, when the developing unit 109 moves from the contact position to the separated position, the direction in which the first pressed surface 127*h* moves is indicated by an arrow W41 in part (a) of FIG. 34 and part (b) of FIG. 34. Further, the direction opposite to the arrow W41 is indicated by the arrow W42, and the directions of the arrow W41 and the arrow W42 are substantially horizontal directions (X1, X2 directions). The second force receiving surface 152Lp of the force applying member 152L assembled to the developing unit 109 as described above is placed on the upstream side of the first pressed surface 127*h* of the non-driving side bearing 127 in the direction of the arrow W41. In addition, the first pressed surface 127*h* and the second force receiving surface 151Le of the separation holding member 151L are arranged at positions where at least parts of them overlap in the W1 and W2 directions.

The operation of the separation contact mechanism 150L in the image forming apparatus main assembly 170 will be described below.

[Mounting of Process Cartridge to the Image Forming Apparatus Main Assembly]

Next, referring to FIGS. 35 and 36, the engagement between the separation contact mechanism 150R of the process cartridge 100 and the development separation control unit of the image forming apparatus main assembly 170 at the time when the process cartridge 100 is mounted on the image forming apparatus main assembly 170 will be described. For the sake of illustration, these Figures are sectional views in which a portion of the development cover member 128 and a portion of the non-driving side cartridge cover member 117 are partially omitted by the partial sectional line CS, respectively. FIG. 35 is a view as seen from the driving side of the process cartridge 100 when the process cartridge is mounted on the cartridge tray 171 (not shown) of the image forming apparatus M and the cartridge tray 171 is inserted into the first mounting position. In this Figure, the parts are omitted except for the process cartridge 100, the cartridge pressing unit 121, and the separation control member 196L.

As described above, the image forming apparatus main assembly 170 of this embodiment has separation control members 196L corresponding to respective process cartridges 100 as described above. The separation control member 196L is disposed on the lower surface side of the image forming apparatus main assembly 170 with respect to the separation holding member 151L when the process cartridge 100 is placed at the first inner position and the second inner position. The separation control member 196L has a first force applying surface 196La and a second force applying surface 196Lb which project toward the process cartridge and face each other across the space 196Rd. The first force applying surface 196Ra and the second force applying surface 196Rb are connected with each other by a connecting portion 196Rc on the lower surface side of the image forming apparatus main assembly 170. In addition, the separation control member 196R is supported by the control sheet metal 197 rotatably about rotation center 196Re as the center. The separating member 196R is normally urged in the E1 direction by the urging spring. In addition, the control sheet metal 197 is structured to be movable in the W41 and W42 directions by a control mechanism (not shown), so that the separation control member 196R is structured to be movable in the W41 and W42 directions.

As described above, in interrelation with the transition of the front door 11 of the image forming apparatus main assembly 170 from the open state to the closed state, the cartridge pressing unit 121 lowers in the direction of arrow ZA, and the first force applying portion 121*a* is brought into contact with the pressed surface 152Lf of the pressed surface 152Lf. Thereafter, when the cartridge pressing unit 121 is lowered to a predetermined position which is the second mounting position, the part 152Lh of the force applying member 152L moves to a projecting position where the process cartridge 100 projects downward in the Z2 direction (state in FIG. 36). When this operation is completed, as shown in FIG. 36, a gap T4 is formed between the first force applying surface 196La of the separation control member 196L and the first force receiving surface 152Lp of the force applying member 152L, and a gap T3 is formed between the second force receiving surface 152Lp and the second force applying surface 196Lb. Then, it is placed at the second mounting position where the separation control member 196L does not act on the force applying member 152L. This position of the separation control member 196L is referred to as a home position. At this time, the first force receiving surface 152Lp of the force applying member 152L and the first force applying surface 196La of the separation control member 196L are arranged so as to partially overlap in the W1 and W2 directions. Similarly, the second force receiving surface 152Lp of the force applying member 152L and the second force applying surface 196Lb of the separation control member 196L are arranged so as to partially overlap in the W1 and W2 directions.

[Contacting Operation of Developing Unit]

Next, referring to FIGS. 36 to 38, the operation of contacting the photosensitive drum 104 and the developing roller with each other by the separation contact mechanism 150L will be described in detail. For the sake of illustration, a part of the development cover member 128, a part of the non-driving side cartridge cover member 117, and a part of the non-driving side bearing 127 are partially omitted in the partial sectional line CS, respectively. It is a sectional view.

As described above, the development input coupling 32 receives a driving force from the image forming apparatus main assembly 170 in the direction of arrow V2 in FIG. 24, so that the developing roller 106 rotates. That is, the developing unit 109 including the developing input coupling 32 receives the torque in the arrow V2 direction about the swing axis K from the image forming apparatus main assembly 170. Further, the developing unit 109 also receives an urging force in the arrow V2 direction due to the urging force of the development pressure spring 134 described above.

Figure 36:
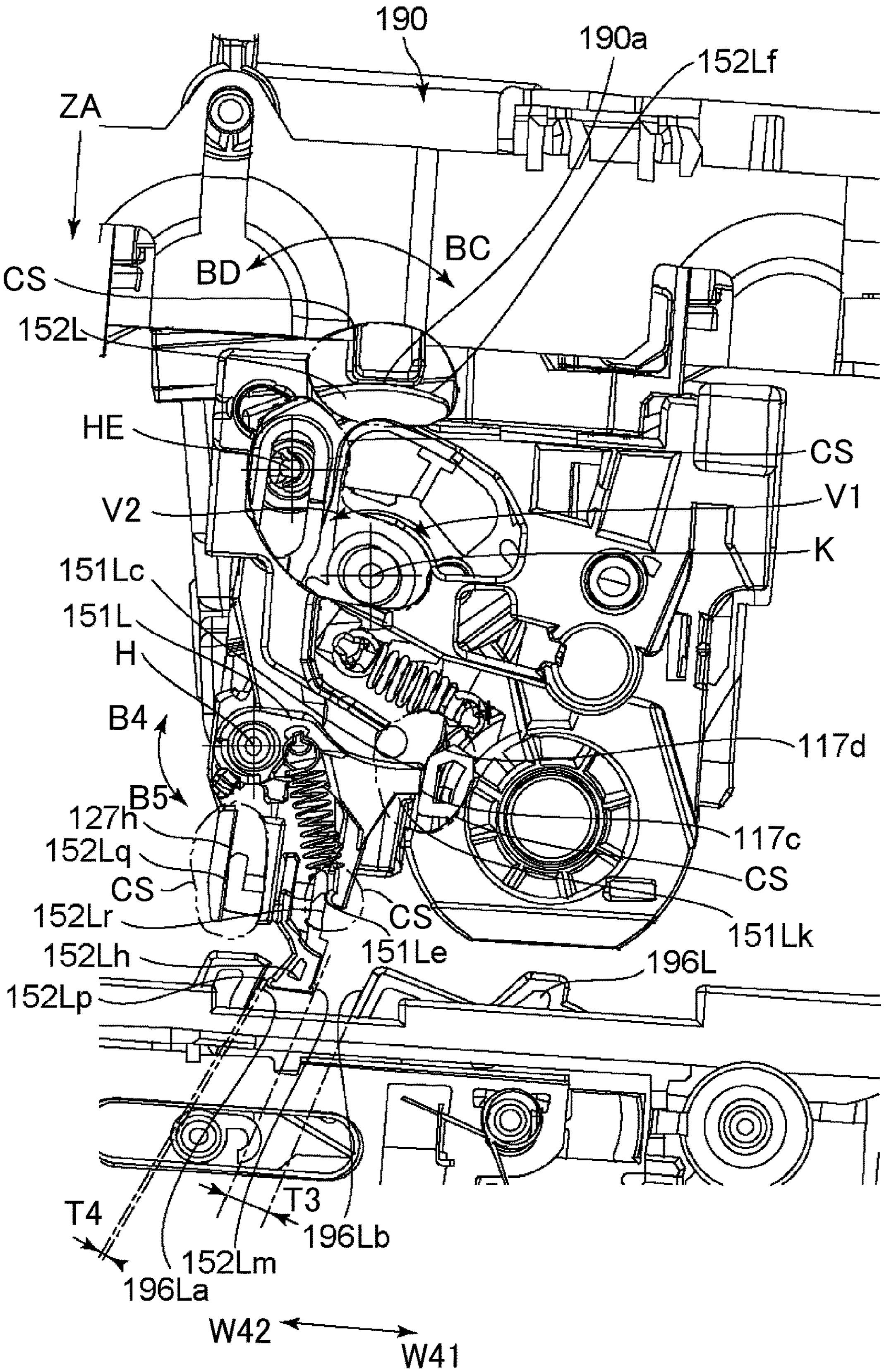
FIG. 36 is an illustration showing the operation of the developing unit in the main assembly of the image forming apparatus.
Figure 37:
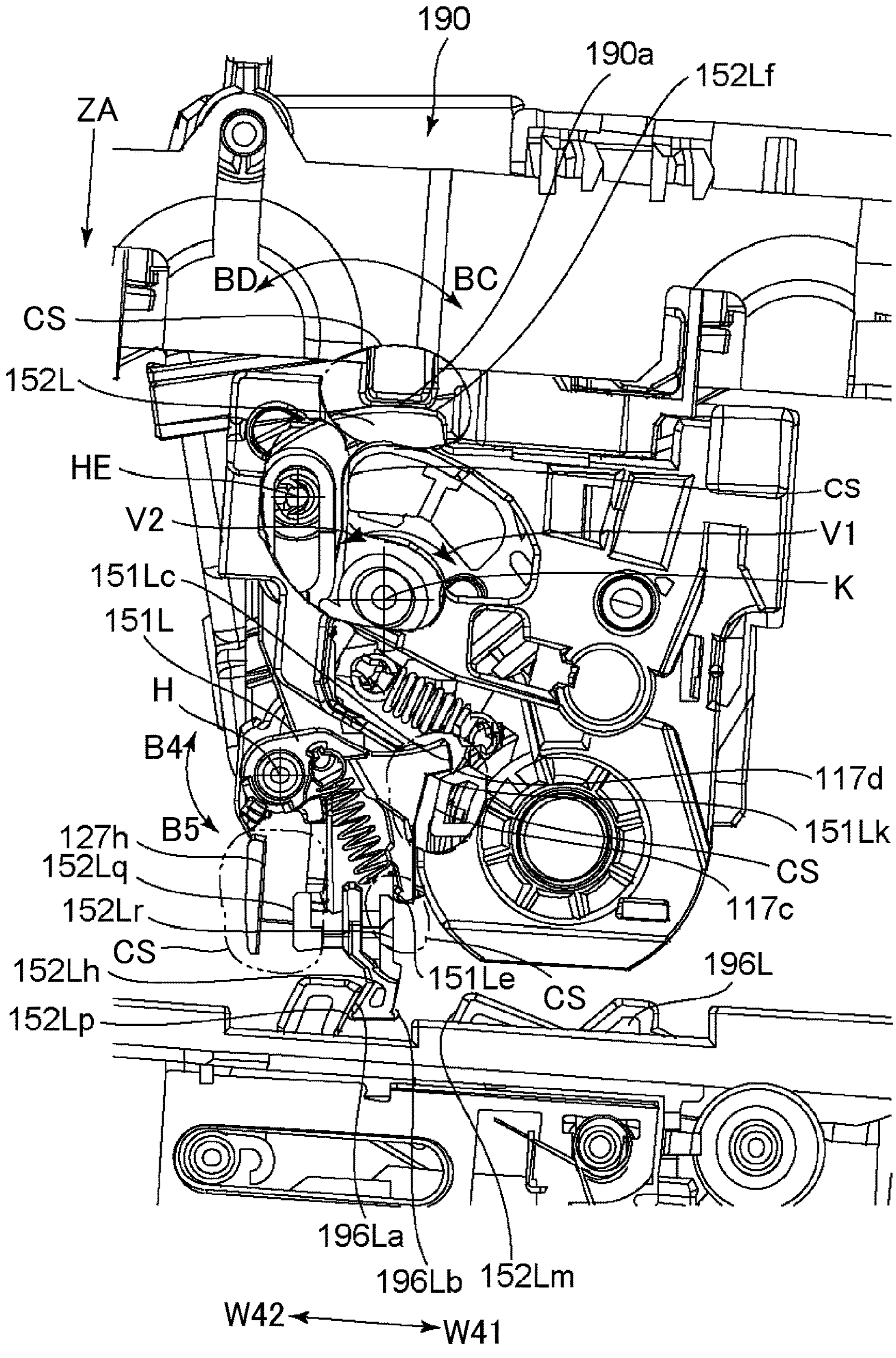
FIG. 37 is an illustration showing the operation of the developing unit in the main assembly of the image forming apparatus.

As shown in FIG. 36, when the developing unit 109 is in the separated position and the separation holding member 151L is in the separated holding position, the developing unit receives this torque and the urging force by the development pressure spring 134. Even in this case, the separation holding surface 151Lc of the separation holding member 151L contacts the contact surface 117*c* of the non-driving side cartridge cover member 117, and the attitude of the developing unit 109 is maintained at the separation position (state of FIG. 36).

The separation control member 196L of this embodiment is structured to be movable from the home position in the direction of arrow W41 in FIG. 36. When the separation control member 196L moves in the W41 direction, the second force applying surface 196Lb of the separation control member 196L and the second force receiving surface 152Lp of the force applying member 152L are brought into contact with each other, and the force applying member 152L is rotated in the BD direction about the force applying member swing axis HD. Further, with the rotation of the force applying member 152L, the separation holding member 151L is rotated in the B5 direction, while the second pressing surface 152Lr of the force applying member 152L is in contact with the second pressed surface 151Le of the separation holding member 151L. Then, the separation holding member 151L is rotated by the force applying member 152L to the separation permission position where the separation holding surface 151Lc and the contact surface 117*c* are separated from each other. Here, the position of the separation control member 196L for moving the separation holding member 151L to the separation permission position shown in FIG. 37 is referred to as a first position.

In this manner, the separation control member 196L moves the separation holding member 151L to the separation permission position. Then, the developing unit 109 rotates in the V2 direction by the torque received from the image forming apparatus main assembly 170 and the urging force of the development pressure spring 134, and moves to the contact position where the developing roller 106 and the photosensitive drum 104 are in contact with each other (state shown in FIG. 37). At this time, the separation holding member 151L urged in the direction of arrow B4 by the tension spring 153 is maintained at the separation permission position by the second regulated surface 151Lk contacting the second restriction surface 117*d* of the non-driving side cartridge cover member 117. Thereafter, the separation control member 196L moves in the direction of W42 and returns to the home position. At this time, the force applying member 152L is rotated in the BC direction by the tension spring 153, and the state changed toward the state in which the first pressing surface 152Lq of the force applying member 152L and the first pressed surface 127*h* of the non-driving side bearing 127 are in contact with each other (state shown in FIG. 38). By this, the above-mentioned gaps T3 and T4 are formed again, and the separation control member 196L is placed at a position where the force applying member 152L does not act. The transition from the state of FIG. 37 to the state of FIG. 38 is performed without a delay. The position of the separation control member 196L in FIG. 38 is the same as that in FIG. 36.

As described above, with the structure of this embodiment, by moving the separation control member 196L from the home position to the first position, the force applying member 152L is rotated to move the separation holding member 151L from the separation holding position to the separation permission position. By this, the developing unit 109 can be moved from the separated position to the contacting position where the developing roller 9 and the photosensitive drum 104 are in contact with each other.

[Separating Operation of Developing Unit]

Next, the operation of moving the developing unit 109 from the contact position to the separation position will be described in detail referring to FIGS. 38 and 39. Note that FIG. 39 is a cross-section in which a portion of the development cover member 128, a portion of the non-driving side cartridge cover member 117, and a portion of the non-driving side bearing are partially omitted by the partial cross-section line CS, respectively.

Figure 38:
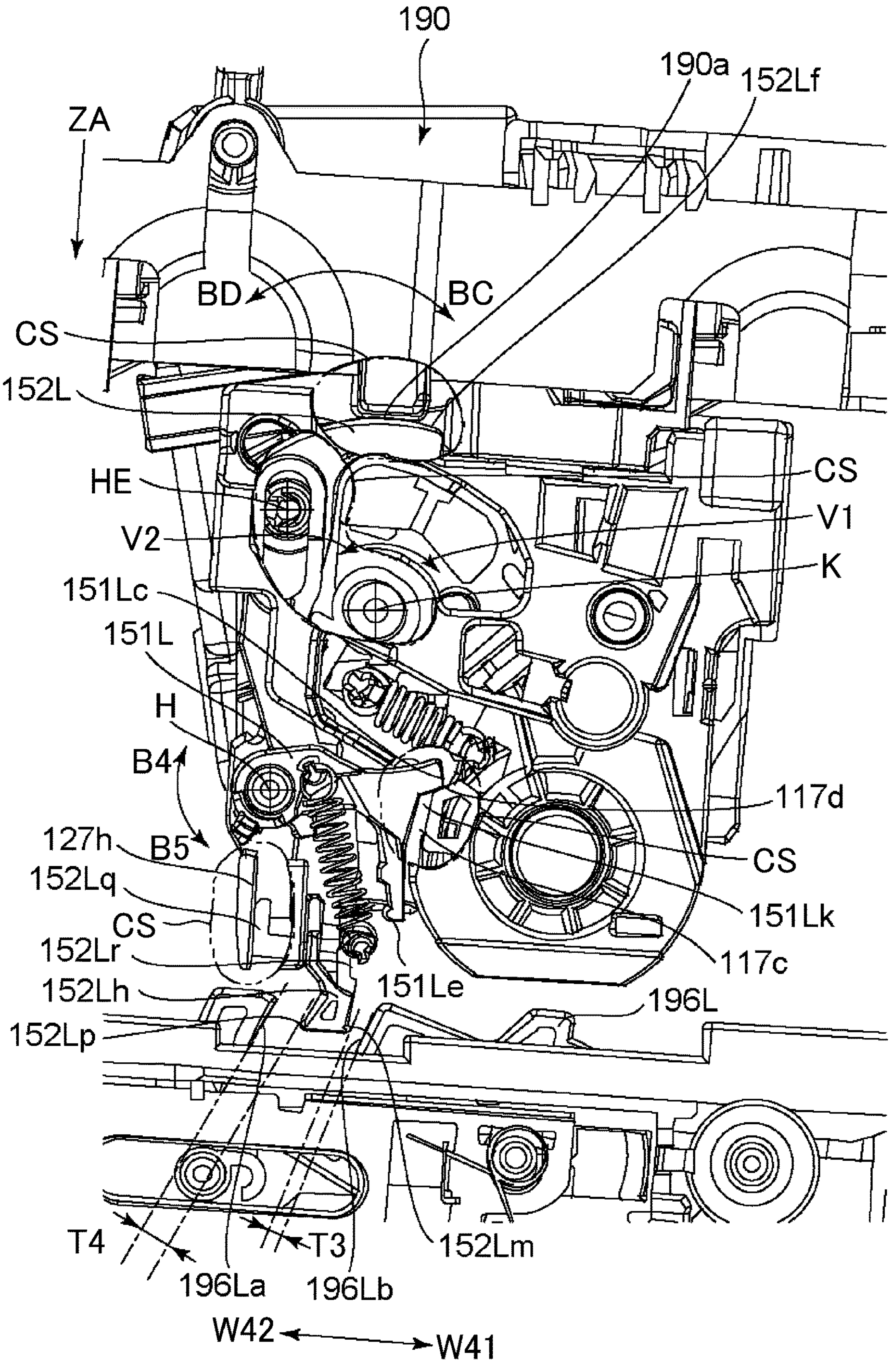
FIG. 38 is an illustration showing the operation of the developing unit in the main assembly of the image forming apparatus.
Figure 39:
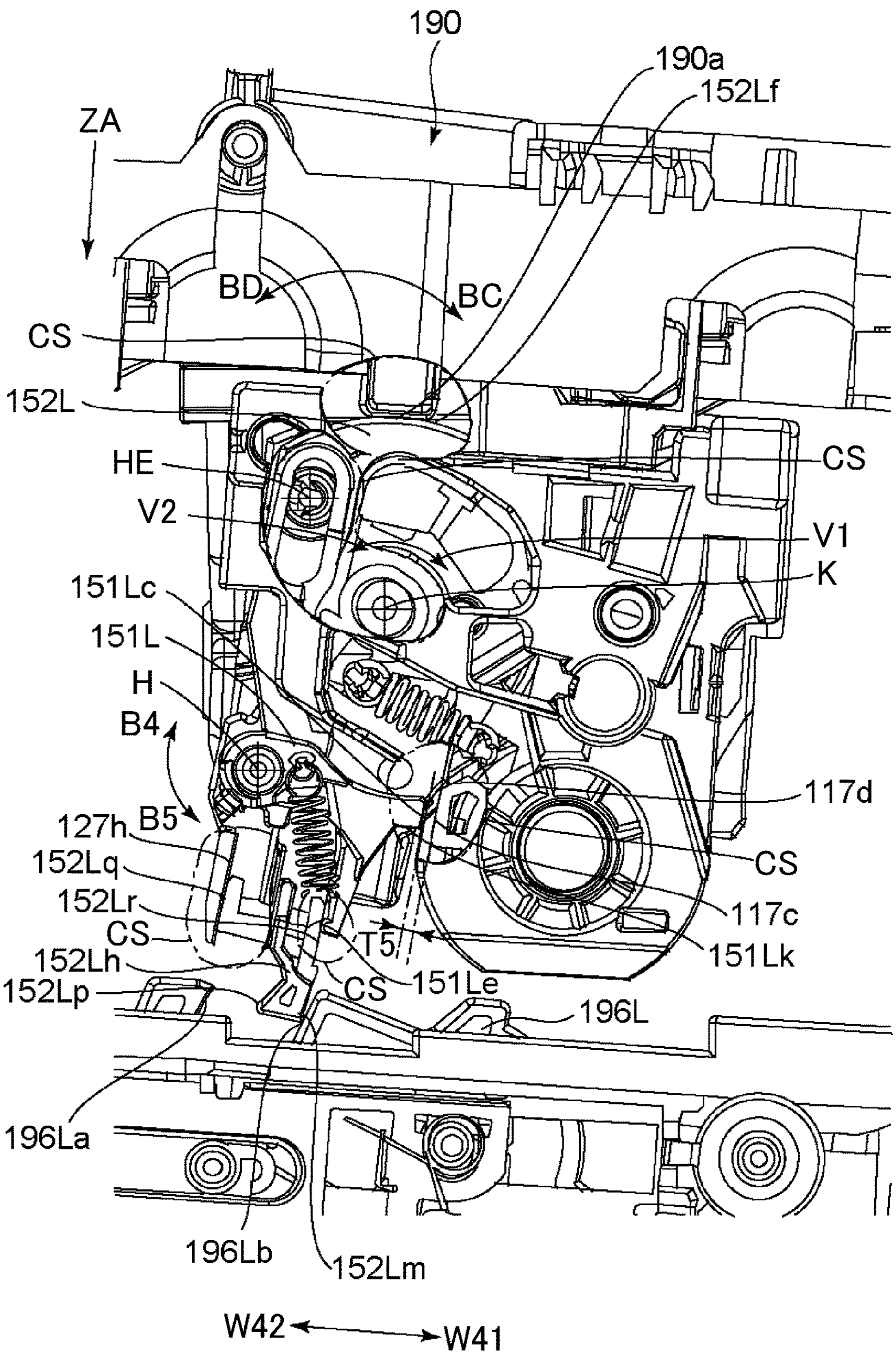
FIG. 39 is an illustration showing the operation of the developing unit in the main assembly of the image forming apparatus.

The separation control member 196L in this embodiment is structured to be movable from the home position in the direction of arrow W42 in FIG. 38. When the separation control member 196L moves in the W42 direction, the first force applying surface 196Lb and the first force receiving surface 152Lm of the force applying member 152L come into contact with each other, and the force applying member 152L is rotated in the arrow BC centering about the force applying member swing axis HD. Since the first pressing surface 152Lq of the force applying member 152L is in contact with the first pressed surface 127*h* of the non-driving side bearing 127, the developing unit 109 is rotated from the contact position in the direction of arrow V1 about the swing axis K (state in FIG. 39). Here, the pressed surface 152Lf of the force applying member 152L has an arc shape, and the center of the arc is placed so as to be aligned with the swing axis K. By this, when the developing unit 109 moves from the contact position to the separated position, the force received, from the cartridge pressing unit 121, by the pressed surface 152Lf of the force applying member 152L faces the swing axis K direction. Therefore, the developing unit 109 can be operated so as not to hinder the rotation in the arrow V1 direction. In the separation holding member 151L, the second regulated surface 151Lk of the separation holding member 151L and the second restriction surface 117*d* of the non-driving side cartridge cover member 117 are separated, and the separation holding member 151L is rotated in the arrow B4 direction by the urging force of the tension spring 153. By this, the separation holding member 151L rotates until the second pressed surface 151Le comes into contact with the second pressing surface 152LR of the force applying member 152L, and by the contact with the second pressing surface 152LR, the position shifts to the separation holding position. When the developing unit is moved from the contact position to the separation position by the separation control member 196L and the separation holding member 151L is placed at the separation holding position, A gap T5 is formed between the separation holding surface 151Lc and the contact surface 117*c* as shown in FIG. 39. Here, the position where the developing unit 109 is rotated from the contact position toward the separation position and the separation holding member 151 can be moved to the separation holding position is referred to as a second position of the separation control member 196L.

Thereafter, the separation control member 196L moves in the direction of the arrow W41 and returns from the second position to the home position. Then, while the separation holding member 151L is maintained at the separation holding position, the developing unit is rotated in the arrow V2 direction by the torque received from the image forming apparatus main assembly 170 and the urging force of the development pressure spring 134, and the separation holding surface 151Lc and the contact surface 117*c* are brought into contact with each other. That is, the developing unit 109 is in a state where the separation position is maintained by the separation holding member 151L, and the developing roller 106 and the photosensitive drum 104 are in a state where they are separated by a gap P1 (states in FIG. 36 and part (a) of FIG. 34. By this, the above-mentioned gaps T3 and T4 are formed again, and the separation control member 196L is placed at a position where the force applying member 152L does not act (state in FIG. 36). The transition from the state of FIG. 39 to the state of FIG. 36 is executed without a delay.

As described above, in the structure of this embodiment, by the movement of the separation control member 196L from the home position to the second position, the separation holding member 151L is moved from the separation permission position to the separation holding position. And, by the returning of the separation control member 196L from the second position to the home position, the developing unit 109 becomes in the state of maintaining the separation position by the separation holding member 151L.

So far, the operation of the separation mechanism placed on the driving side of the process cartridge 100 and the operation of the separation mechanism placed on the non-driving side have been described separately, but in this embodiment, they operate in interrelation with each other. That is, when the developing unit 109 is positioned at the separation position by the separation holding member R, the developing unit 109 is positioned at the separation position by the separation holding member L at substantially the same time, and the same applies to the contact position. Specifically, the movements of the separation control member 121R and the separation control member 121L described in FIGS. 23 to 27 and 35 to 39 are integrally carried out by a connecting mechanism (not shown). By this, the timing at which the separation holding member 151R provided on the driving side is placed at the separation holding position, and the timing at which the separation holding member 151L provided on the non-driving side is placed at the separation holding position are substantially the same, and the timing at which the separation holding member 151R is placed at the separation permission position, and the timing at which the separation holding member 151L is placed at the separation permission position, and the timing at which the separation holding member 151L is placed at the separation permission position are substantially the same. These timings may be different between the driving side and the non-driving side, but in order to shorten the time from the start of the print job by the user until the printed matter is discharged It is desirable that at least the timings of positioning at least the separation permission positions are the same. In this embodiment, the separation holding member swing axes H of the separation holding member 151R and the separation holding member 151L are common, but it is sufficient that the timings of the separation holding member 151L and the separation holding member 151L are substantially the same as described above, and therefore the above-described example is not restrictive. Similarly, the force applying member swinging axis HC of the force applying member 152R and the force applying member swinging axis HE of the force applying member 152L are axes that do not match, but it will suffice if the timings of being placed at the separation permission positions are substantially the same as described above, and therefore, the above-described example is not restrictive.

As described above, the driving side and the non-driving side are provided with the same separation contact mechanisms, respectively, and they operate substantially at the same time. By this, even when the process cartridge 100 is twisted or deformed in the longitudinal direction, the amount of separation between the photosensitive drum 104 and the developing roller 9 can be controlled at the respective end portions in the longitudinal direction. Therefore, it is possible to suppress variations in the amount of separation in the longitudinal direction.

Further, according to this embodiment, by moving the separation control member 196R (L) between the home position, the first position, and the second position in one direction (arrows W41 and W42 directions), it is possible to control the contact state and the separation state between the developing roller 106 and the photosensitive member. Therefore, it is possible that the developing roller 106 is brought into contact with the photosensitive drum 104 only when the image is formed, and the developing roller 4 is maintained in a state of being separated from the photosensitive drum 104 when the image is not formed. Therefore, even if the image formation is not carried out for a long term, the developing roller 106 and the photosensitive drum 104 are not deformed, and a stable image can be formed.

Further, according to this embodiment, the force applying member 152R (L) acting on the separation holding member 151R (L) to rotate and move can be positioned at the accommodation position by the urging force of the tension spring 153 or the like. Therefore, it does not project out of the outermost shape of the process cartridge 100, when the process cartridge 100 is outside the image forming apparatus main assembly 170, and the process cartridge 100 per se can be downsized.

Similarly, the force applying member 152R (L) can be positioned at the accommodation position by the urging force of the tension spring 153 or the like. Therefore, when the process cartridge 100 is to be mounted to the image forming apparatus main assembly 170, the mounting of the process cartridge 100 can be completed by moving only in one direction. For this reason, it is not necessary to move the process cartridge 100 (tray 171) in the vertical direction. Accordingly, the image forming apparatus main assembly 170 does not require an additional space, and the main assembly can be downsized.

Further, according to this embodiment, when the separation control member 196R (L) is placed at the home position, the separation control member 196R (L) is not loaded from the process cartridge 100. Therefore, the rigidity required for the mechanism for operating the separation control member 196R (L) and the separation control member 196R (L) can be reduced, and the size can be reduced. Further, since the load on the sliding portion of the mechanism for operating the separation control member 196R (L) is also reduced, wear of the sliding portion and production of abnormal noise can be suppressed.

Further, according to this embodiment, the developing unit 109 can maintain the separated position only by the separation holding member 151R (L) included in the process cartridge 100. Therefore, the component tolerance can be eased and the spacing amount can be minimized by reducing the number of parts resulting in variations in the spacing amount between the developing roller 106 and the photosensitive drum 104. Since the amount of spacing can be reduced, when the process cartridge 100 is arranged in the image forming apparatus main assembly 170, the area occupied by the developing unit 109 when the developing unit 109 moves to the contact position and to the separated position can be made smaller, so that the image forming apparatus can be downsized. In addition, the space for the developer accommodating portion 29 of the developing unit 109 which moves to the contact position and to the separation position can be increased, and therefore, the downsized and large-capacity process cartridge 100 can be placed in the image forming apparatus main assembly 170.

Further, according to this embodiment, the force applying member 152R (L) can also be positioned at the accommodation position when the process cartridge 100 is mounted, and the developing unit 109 Can maintain the separation position only by the separation holding member 151R (L) of the process cartridge 100. Therefore, when the process cartridge 100 is mounted to the image forming apparatus main assembly 170, the process cartridge 100 can be mounted by moving only in one direction. For this reason, it is not necessary to move the process cartridge 100 (tray 171) in the vertical direction. Accordingly, the image forming apparatus main assembly 170 does not require a space, and the main assembly can be downsized. Further, since the separation amount can be reduced, when the process cartridge 100 is placed in the image forming apparatus main assembly 170, the area occupied by the developing unit 109 when the developing unit 109 moves to the contact position and to the separation position can be made small, and therefore, the image forming apparatus can be downsized. In addition, since the space for the developer accommodating portion 29 of the developing unit 109 which moves to the contact position and to the separation position can be increased, the downsized and large-capacity process cartridge 100 can be placed in the image forming apparatus main assembly 170.

[Details of Arrangement of Separation Contact Mechanism]

Subsequently referring to FIGS. 40 and 41, the arrangement of the separation contact mechanisms R and L in this embodiment will be described in detail.

Figure 40:
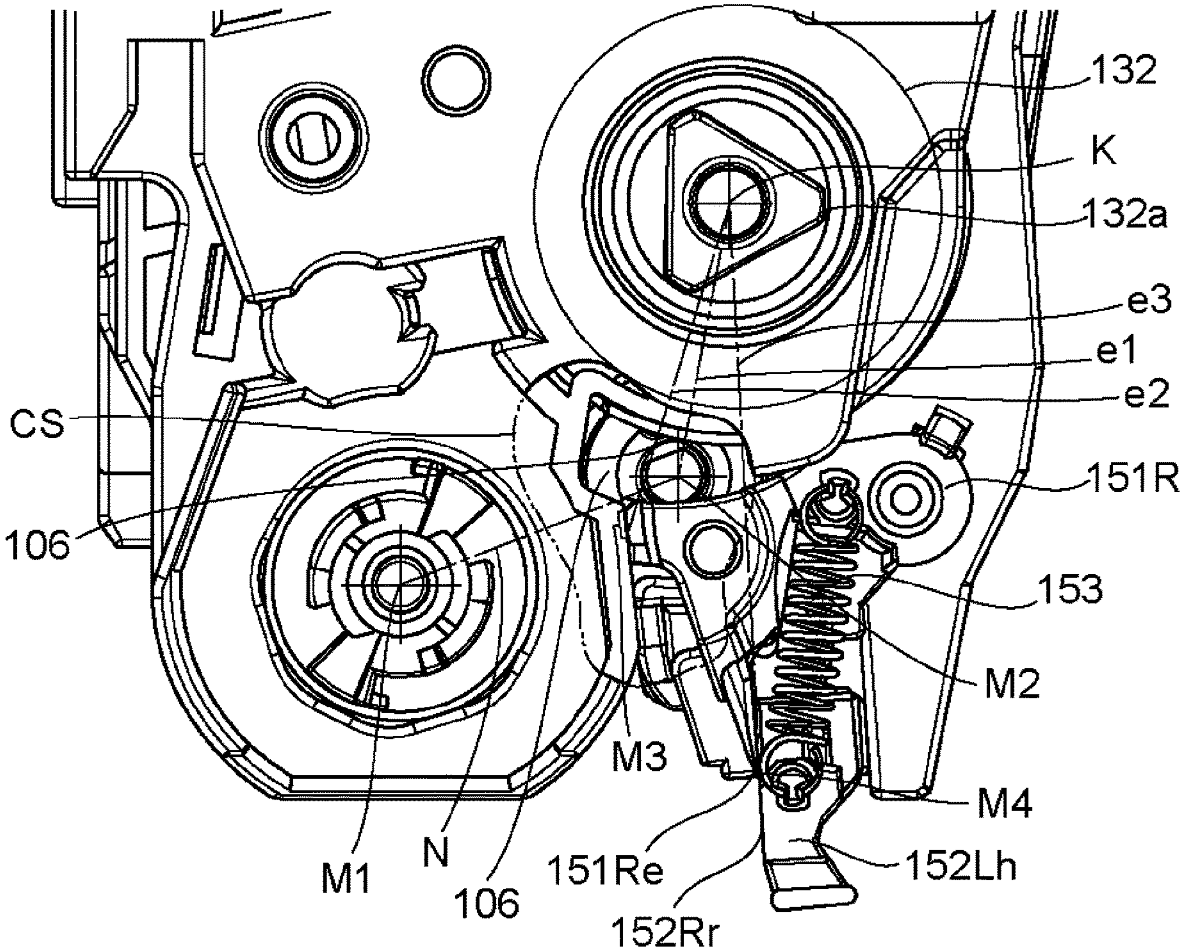
FIG. 40 is an illustration showing the arrangement of the separation holding member R and the force applying member.
Figure 41:
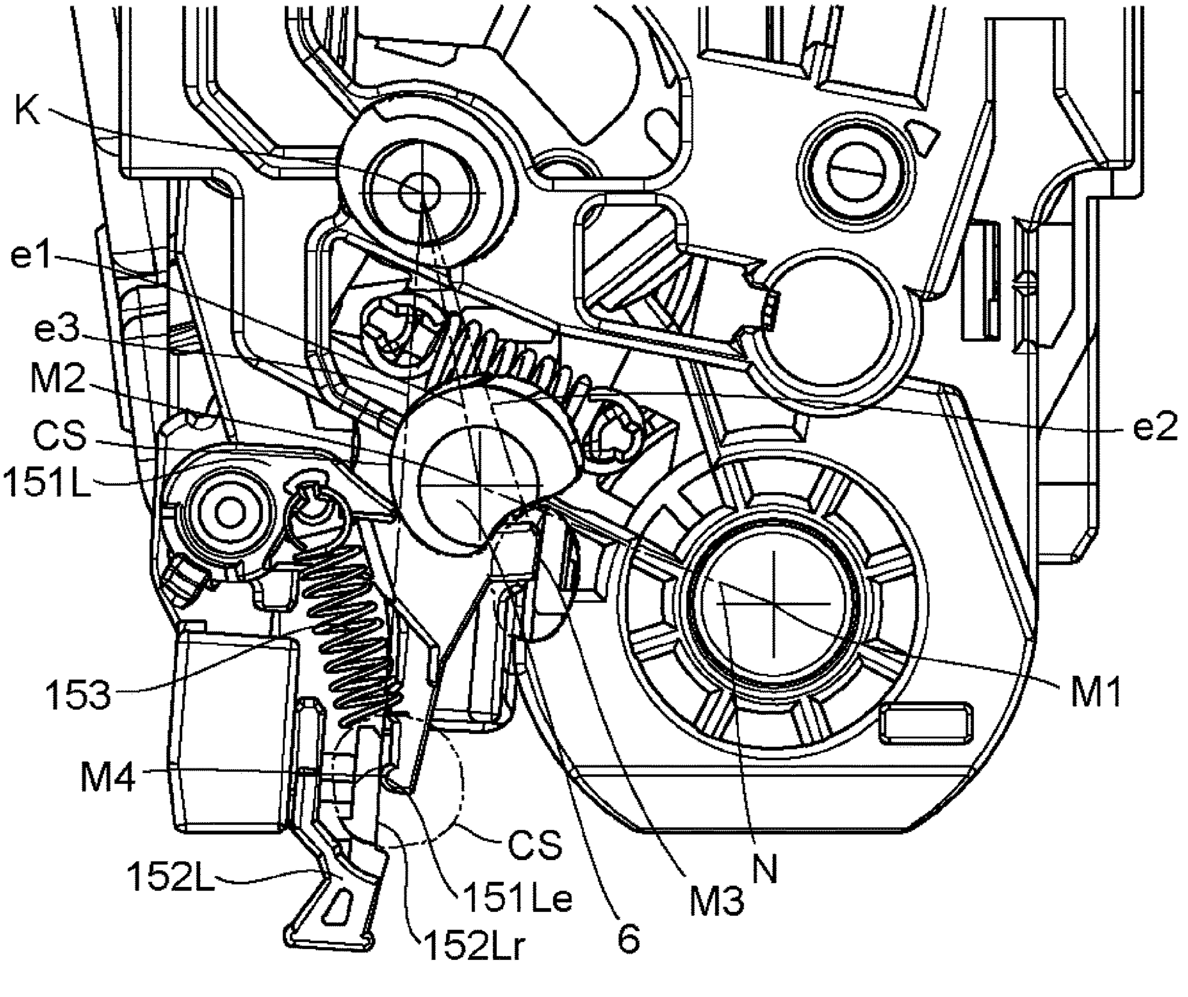
FIG. 41 is an illustration showing the arrangement of the separation holding member and the force applying member.

FIG. 40 is an enlarged view of the periphery of the separation holding member 151R as the process cartridge 100 is viewed from the driving side along the swing axis K (photosensitive drum axis direction) of the developing unit 109. In addition, for the sake of illustration, it is a sectional view in which a portion of the development cover member and a portion of the driving side cartridge cover member 116 are partially omitted by the partial sectional line CS. FIG. 41 is an enlarged view of the periphery of the separation holding member 151R as the process cartridge 100 is viewed from the non-driving side along the swing axis K of the developing unit 109 (along the axis in the photosensitive drum axis direction). In addition, for the sake of illustration, it is a sectional view in which a portion of the development cover member 128 and a portion of the driving side cartridge cover member 116 are partially omitted by the partial sectional line CS. Regarding the arrangement of the separation holding member and the force applying member described below, there is no distinction between the driving side and the non-driving side except for the part which will be described in detail hereinafter, and they are common, and therefore, the description will be made only for the driving side, the same applies to the non-driving side.

As shown in FIG. 40, the rotation center of the photosensitive drum 104 is a point M1, the rotation center of the developing roller 106 is a point M2, and the line passing through the points M1 and M2 is a line N. In addition, the contact region between the separation holding surface 151Rc of the separation holding member 151R and the contact surface 116*c* of the driving side cartridge cover member 116 is M3, and the contact region between the second pressed surface 151Re of the separation holding member 151R and the second pressing surface 152Rr of the second force applying member 152R is M4. Further, the distance between the swing axis K and the point M2 of the developing unit 109 is a distance e1, the distance between the swing axis K and the region M3 is e2, and the distance between the swing axis K and the point M4 is e3.

In the structure of this embodiment, the following positional is a relationship when the developing unit 109 is in the separated position and the force applying member 152R (L) is in the projecting position. As viewed along the axial direction of the swing axis K shown in FIG. 40 (the axial direction of the photosensitive drum), at least a part of the contact region M3 between the separation holding member 151R and the driving side cartridge cover member is placed on a side opposite from the side in which the development coupling 32 center (swing axis K) exists, with respect to the line N passing through the center of the photosensitive drum 104 and the center of the developing roller. That is, the separation holding surface 151Rc of the separation holding member 151R is arranged such that the distance e2 is longer than the distance e1.

By arranging the separation holding member 151R and the separation holding surface 151Rc in this manner, it is possible to suppress variations in the attitude of the spaced position of the developing unit 109 when the positions of the separation holding surface 151Rc vary due to component tolerances and the like. That is, the influence of the variation of the separation holding surface 151Rc on the separation amount (gap) P1 (see part (a) of FIG. 42) between the developing roller 106 and the photosensitive drum 104 can be minimized, and the developing roller 106 can be accurately spaced from the photosensitive member 104. Further, it is not necessary to provide an additional space for permitting retraction when the developing unit 109 is separated, which leads to the downsizing of the image forming apparatus main assembly 170.

Further, the first force receiving portion 152Rk (Lk) and the second force receiving portion 152Rn (Ln), which are the force receiving portions of the force applying member 152R (L), are placed on a side opposite from the rotation centers of the development coupling 32 with respect to the extension line of the line N.

As described above, the force receiving portions 152Rk (Lk) and 152Rn (Ln) are provided at the end portions in the longitudinal direction. Further, as shown in FIG. 15 (FIG. 16), a cylindrical portion 128*b* (127*a*), which is a support portion of the developing unit 109, is provided at the end portion in the longitudinal direction. Therefore, by disposing the force receiving portions 152Rk (Lk) and 152Rn (Ln) at positions opposite from the cylindrical portion 128*b* (127*a*) (that is, the swing axis K) of the developing unit 109 with respect to the line N the functional elements can be arranged efficiently. That is, it leads to downsizing of the process cartridge 100 and the image forming apparatus M.

In addition, the force receiving portions 152Rk and 152Rn are placed at the longitudinal driving side end portions. Further, as shown in FIG. 15, a development drive input gear 132 that receives a drive from the image forming apparatus main assembly 170 and drives the developing roller 106 is provided at the end portion on the driving side in the longitudinal direction. As shown in FIG. 40, the force applying members 152Rk and 152Rn are placed on the side opposite from the rotation center K of the development drive input gear 132 (development coupling portion 132*a*) shown by the broken lines with respect to the extension line of the line N. With this arrangement, the functional elements can be efficiently arranged. That is, it leads to downsizing of the process cartridge 100 and the image forming apparatus M.

Further, the contact portion between the separation holding member 151R and the force applying member 152R is arranged such that the distance e3 is longer than the distance e1. By this, the separation holding member 151R and the driving side cartridge cover member 116 can be brought into contact with each other with a lighter force. That is, the developing roller 106 and the photosensitive drum 104 can be stably separated from each other.

[Detailed Description of Drive Transmission Mechanism for Photosensitive Drum]

A structure for transmitting a driving force from the image forming apparatus main assembly to the drum unit 103 of the cartridge 100 (see part (a) of FIG. 1 to drive (rotate) the drum unit will be described.

The drum unit 103 shown in FIGS. 1, 13 and 55 to 58 is a unit including a photosensitive drum, a drum coupling (cartridge side coupling, coupling member) 143, and a drum flange 142 (see FIG. 13). The drum unit 103 is mountable to and dismountable from the image forming apparatus main assembly as a part of the cartridge 100. By mounting the drum unit 103 to the main assembly of the apparatus, it can be connected with a drive transmission unit 203 (see FIGS.

43 and 44, details will be described hereinafter) of the main assembly of the apparatus. The drum unit rotates in the direction of arrow A during image formation (see FIGS. 1, 55 to 57). In this embodiment, as the driving side of the drum unit 103 (the side where the drum coupling 143 is located) is viewed, that is, when the drum unit 103 is viewed along the arrow M1B direction, the rotational direction of the drum unit 103 corresponds to the clockwise direction (See FIG. 1). In other words, when the front surface of the drum coupling 143 is viewed, the rotational direction A of the drum coupling 143 corresponds to the clockwise direction.

The rotational direction A of the drum unit (drum coupling 143 and the photosensitive drum 104) will be described below using the movement of the surface of the photosensitive drum 104 (see FIGS. 2 and 3). In FIGS. 2 and 3, unlike FIG. 1, the cartridge is viewed from the non-driving side, and therefore, the rotational direction A of the drum unit 103 is counterclockwise.

As shown in FIG. 3, the surface of the photosensitive drum 104 is charged inside the cartridge at a position near the charging roller 105 (around the position where it contacts the charging roller). Thereafter, the surface of the photosensitive drum 104 moves to a position where it receives the laser beam U, by which an electrostatic latent image is formed on the surface. Then, the surface of the photosensitive drum 104 moves to a position near the developing roller 106 (a position in contact with the developing roller in this embodiment), and a latent image formed on the surface of the photosensitive drum 104 developed into a toner image. After that, the surface of the photosensitive drum moves to a position exposed below the cartridge and outside the casing of the cartridge. Then, as shown in FIG. 2, the surface of the photosensitive drum 104 exposed from the casing of the cartridge contacts the intermediary transfer belt 12*a* provided in the image forming apparatus main assembly. By this, the toner image is transferred from the surface of the photosensitive drum 104 to the transfer belt 12*a*. Thereafter, the surface of the photosensitive drum 104 returns, inside of the cartridge, to a position near the charging roller 105.

In summary, when the photosensitive drum 104 rotates due to the driving force of the coupling 143, a part of the surface of the photosensitive drum 104 moves from a position close to the charging roller 105 to a position close to the developing roller 106. Thereafter, the part of the surface of the photosensitive drum 104 is exposed to the outside of the casing of the cartridge, and then returns to the inside of the casing of the cartridge and approaches the charging roller 105 again.

As described above, the cartridge 100 of this embodiment does not have a cleaning means for contacting the photosensitive drum 104 and removing the toner on the surface of the photosensitive drum 104 (see FIG. 3). Therefore, the torque required to rotate the drum unit 103 (photosensitive drum 104) inside the cartridge 100 is relatively small. In the case of such a structure, the drum unit 103 is easily affected by the surroundings when it is driven, and as a result, the drum unit 103 may be externally affected by the outside with the result of unstable rotation speed. For example, in this embodiment, the developing roller 106, the charging roller 105, and the transfer belt 12*a* are in contact with the photosensitive drum 104. If the magnitude of the frictional force generated between these means and the photosensitive drum 104 fluctuates, the speed of the drum unit 103 may fluctuate.

Therefore, in this embodiment, the structure is such that a torque a predetermined level or higher is required, when the drum drive coupling 180 of the drive transmission unit 203 (see FIG. 43) provided in the main assembly of the apparatus rotates the drum unit (photosensitive drum 104) of the cartridge. By this, the rotation of the drum unit 103 is relatively less influenced by the external factors, and its rotation speed is stable.

First, referring to part (a) of FIG. 1, the drum coupling 143 of the process cartridge 100 will be described. Part (a) of FIG. 1 is a perspective view of the drum coupling.

The drum coupling 143 of this embodiment is manufactured by injection molding a polyacetal resin. As the material, a resin material such as a polycarbonate resin or polybutylene terephthalate resin, or a resin material provided by blending these with glass fiber, carbon fiber or the like may be used. Alternatively, a processing method such as die casting or cutting may be used with a metal material such as aluminum, iron, or stainless steel.

Next, referring to FIGS. 1, 55 to 58, the shape of the drum coupling 143 will be described.

In the following description of the drum coupling 143, the direction (direction of arrow M1A) from the photosensitive drum 104 toward the drive transmission unit 230 (drum drive coupling 180) along the axial direction is called outward (outward) in the axial direction. In addition, the direction opposite to the outward direction (the direction of the arrow M1B) is called inward direction in the axial direction.

In other words, in the drum coupling, the outward direction (M1A direction) in the axial direction is the direction from the non-driving side end portion 104*b* of the photosensitive drum toward the driving side end portion 104*a* (leftward in FIG. 80). Alternatively, the outward direction (M1A direction) in the axial direction is the direction from the non-driving side cartridge cover 117 of the cartridge 100 toward the driving side cartridge cover 116 in FIG. 14.

The inward direction in the axial direction (M1B direction) is the direction from the driving side end portion 104*a* of the photosensitive drum 104 toward the non-driving side end portion 104*b* (rightward in FIG. 80). Alternatively, the inward direction OMB direction) in the axial direction is the direction from the driving side cartridge cover 116 of the cartridge 100 toward the non-driving side cartridge cover 117 in Figure.

Figure 1:
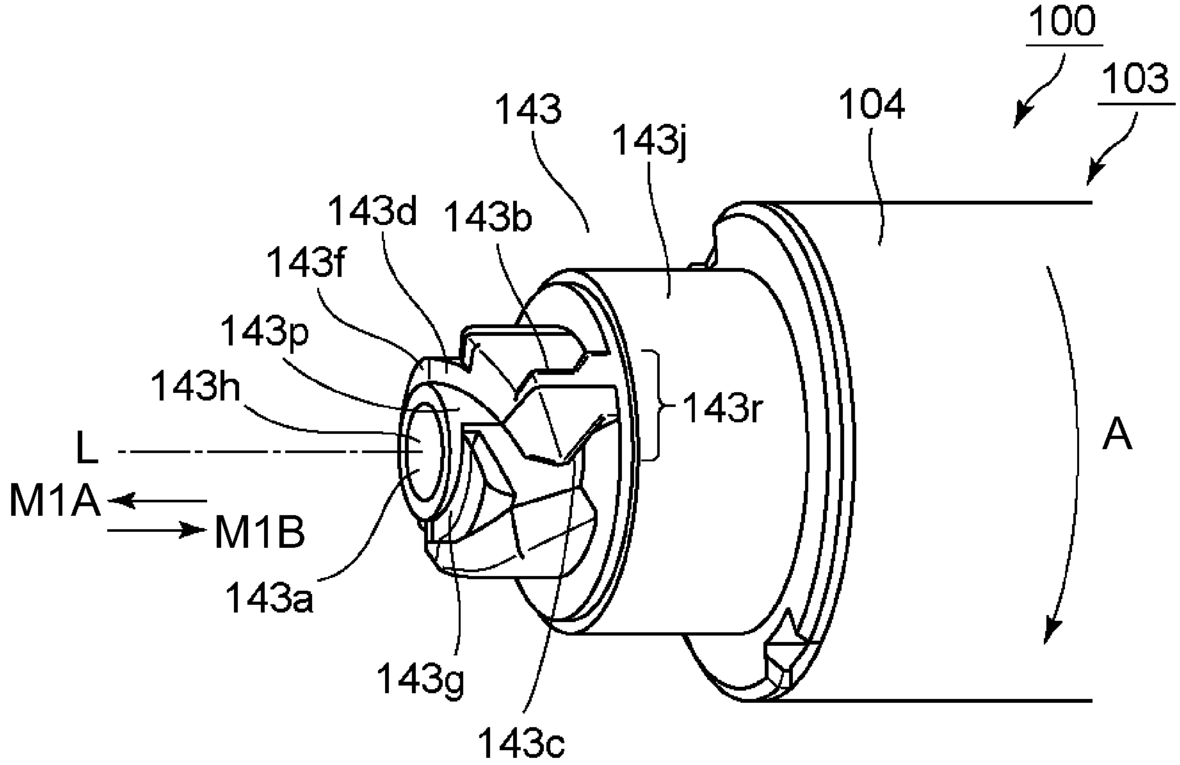
FIG. 1 is a perspective view of a drum coupling 143.
Figure 1:
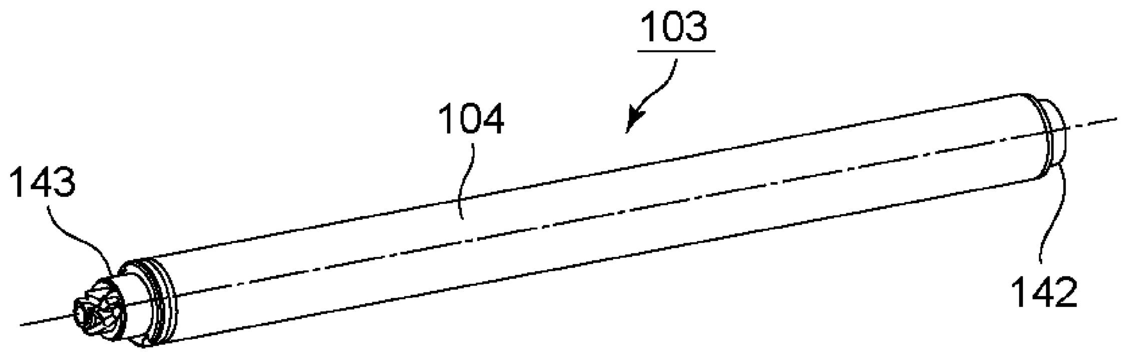

As shown in part (b) of FIG. 1, the drum coupling 143 is mounted to one longitudinal end (driving side end) of the photosensitive drum 104. As described above, the shaft portion 143*j* shown in FIG. 1 is rotatably supported by the driving side cartridge cover member 116 (see FIG. 15) which supports the photosensitive drum unit 103. The drum unit 103 is structured to be rotatable in a predetermined rotational direction (direction of arrow A) during the image forming operation in which the latent image on the surface of the photosensitive drum is developed.

The drum coupling 143 receives a driving force for rotating the photosensitive drum 104 from the main assembly drive transmission unit 203 of the main assembly of the apparatus, and also receives a braking force for applying a load against the rotation of the photosensitive drum 104, as well.

The drum coupling 143 is provided with a projections projecting outward in the axial direction from the surface of the end portion of the shaft portion 143*j* (see FIGS. 1, 52 to 57). This projection has a driving force receiving portion 143*b* as a first side surface (first side portion) for receiving the driving force from the driving transmission unit 203. Further, the projection of the drum coupling 143 includes a braking force receiving portion 143*c* as a second side surface (second side portion) for receiving the braking force from the drive transmission unit 203.

The driving force receiving portion 143*b* is a side surface (side portion) facing the upstream side in the rotational direction A of the drum unit. Further, the braking force receiving portion 143*c* is a side surface (side portion) facing the downstream side in the rotational direction A.

In other words, one of the driving force receiving portion 143*b* and the braking force receiving portion 143*c* faces one side in the circumferential direction of the drum unit, and the other faces the other side in the circumferential direction. That is, the driving force receiving portion 143*b* and the braking force receiving portion 143*c* are side surfaces (side portions) facing opposite to each other in the rotational direction and the circumferential direction.

Further, the projection of the drum coupling 143 has a helical slope (inclined portion, slope) 143*d* as a top surface (upper surface, upper portion, upper portion). The slope (top surface) 143*d* is a portion facing outward (arrow MA1 direction) in the axial direction. That is, the slope 143*d* is a portion facing toward the side opposite to the non-driving side end portion of the drum unit (that is, the end portion on the side where the drum flange 142 (FIG. 13) is arranged). In other words, the helical slope (top surface) 143*d* of the coupling 143 is a portion facing the side opposite to the side on which the photosensitive drum 104 exist.

The helical slope 143*d* is inclined so as to be outward in the axial direction (arrow MA1 direction) toward the upstream side in the rotational direction (upstream side in the arrow A direction). That is, the slope 143*d* goes away from the non-driving side of the drum unit 103 as goes toward the upstream side in the rotational direction. In other words, the slope 143*d* is inclined so as to go away from the photosensitive drum as goes toward the upstream side in the rotational direction.

In other words, the helical slope 143*d* extends toward the non-driving end of the drum unit and the cartridge from upstream to downstream in the rotational direction. Namely, when the distance of the helical slope 143*d* from the non-driving end of the cartridge is measured along the axial direction, the distance becomes shorter toward the downstream in the rotational direction.

The helical slope 143*d* includes a downstream portion (downstream top surface, downstream inclined slope, downstream inclined portion, downstream guide) 143*d*1 sandwiched between the driving force receiving portion 143*b* and the braking force receiving portion 143*c* in the rotational direction of the drum unit. Further, the slope 143*d* has an upstream portion (upstream side top surface, upstream side slope, upstream side inclined portion, upstream guide) 143*d*2. The upstream portion 143*d*2 of the helical slope 143*d* is provided upstream of the driving force receiving portion 143*b* and the downstream portion 143*d*1 of the helical slope 143*d* in the rotational direction (see FIGS. 55 to 58).

Further, as the length of the slope 143*d* is measured along the rotational direction of the drum unit, the length of the upstream side slope 143*d*2 is larger than the length of the downstream side slope 143*d*1.

The upstream side portion (upstream side slope) 143*d*2 of the slope 143*d* is provided inside (the side closer to the axis L) of the driving force receiving portion 143*b* in the radial direction. That is, the upstream side portion (upstream side top surface, upstream side slope) 143*d*2 of the slope 143*d* is provided closer to the axis L (part (a) of FIG. 1 than the driving force receiving portion 143*b*. The axis L (part (a) of FIG. 1) is the axis (rotation axis) which is the center of rotation of the coupling 143 and the photosensitive drum 104.

Further, the projection of the drum coupling 143 is provided with a circular hole portion 143*a* as an opening for engaging with the positioning boss (positioning portion) 180*i* of the drum drive coupling 180 and positioning each other's axes. The circular hole portion 143*a* has a circular opening having a cross-section perpendicular to the axis L of the drum coupling 143, and is extended along the axis L.

The projection of the drum coupling 143 includes a shaft portion 143*p* (see FIG. 1) formed along the axis L (see part (a) of FIG. 1, and the circular hole portion 143*a* is formed inside the shaft portion 143*p*. The shaft portion 143*p* is a portion for forming the circular hole portion 143*a*.

The shaft portion 143*p* and the circular hole portion 143*a* are extended aligned with the axis L. By forming the circular hole portion 143*a*, the space from the rotation axis L of the drum unit (see part (a) of FIG. 1 to the inner surface of the drum coupling 143 is an open space. The shaft portion 143*p* has a diameter smaller than the shaft portion 143*j* described above.

The drum coupling 143 described above has an axisymmetric shape (axisymmetric shape) with respect to the axis L (see part (a) of FIG. 1. The driving force receiving portion 143*b*, the braking force receiving portion 143*c*, and the helical slope 143*d* are arranged at two locations so as to be separated by 180° in the circumferential direction, respectively, thus providing a first coupling portion 143*r* and a second coupling portion 143*s* (see FIG. 58).

Each coupling portion includes one driving force receiving portion 143*b*, one braking force receiving portion 143*c*, and one helical slope 143*d*, and the first coupling portion 143*r* and the second coupling portion 143*s* are placed in position symmetrical with respect to the axis.

The driving force receiving portion 143*b*, the braking force receiving portion 143*c*, and the helical slope 143*d* are arranged around the above-mentioned circular hole portion 143*a* and the shaft portion 143*p*. The driving force receiving portion 143*b*, the braking force receiving portion 143*c*, and the helical slope 143*d* are located more remote than the circular hole portion 143*a* and the shaft portion 143*p* from the axis L of the drum unit.

Next, referring to FIGS. 43, 44, and 59, the structure of the main assembly side drive transmission unit 203 provided on the main assembly side of the apparatus will be described. The drive transmission unit 203 is a unit for rotationally driving the drum coupling 143 by connecting (engaging) with the drum coupling 143.

Figure 43:
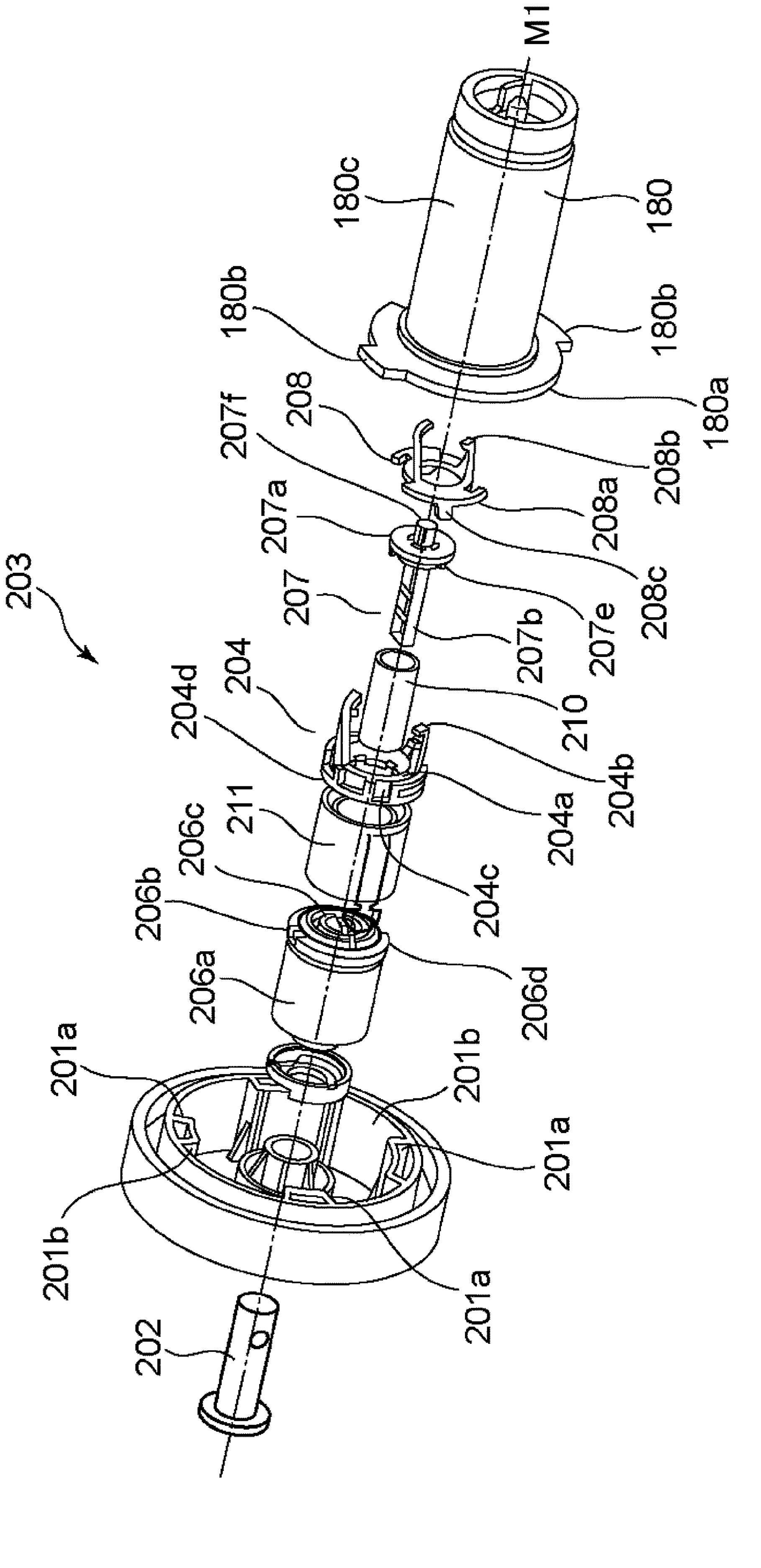
FIG. 43 is an exploded perspective view of the drive transmission unit 203.

FIG. 43 is an exploded perspective view of the main assembly side drive transmission unit 203. FIG. 59 is an enlarged perspective view of a portion shown in FIG. 43. FIG. 44 is a sectional view of the main assembly side drive transmission unit 203.

A drive gear 201 is rotatably supported by a support shaft 202 fixed to a frame (not shown) of the apparatus main assembly 170, and a driving force is transmitted from a motor (not shown) to rotate the drive gear 201. The drum drive coupling 180 includes a cylindrical portion 180*c* and a flange portion 180*a* provided at the end thereof, and the flange is fitted and supported by a fitting portion 201*a* of the drive gear 201. Further, the drum drive coupling 180 is provided with a rotation stop portion 180*b* projecting from the flange portion 180*a*, which receives a driving force when rotating in contact with the rotation stop portion 201*b* of the drive gear 201. The drive transmission unit 203 includes a plurality of components inside the cylindrical portion 180_c_ of the drum drive coupling 180.

The parts arranged inside the cylindrical portion 180_c_ are as follows. There are a brake members 206 which is supported and stopped by the support shaft 202, a brake transmission member 207 which is connected with the brake member 206 to transmit the braking force, and first and second braking engagement members 204 and 208 engaged with the braking force receiving surface 143_c_ of the drum coupling 143, and, a brake engagement spring 211 and a drum drive coupling spring 210 which are arranged along the axis M1 and which generate an urging force in the direction of the axis M1 (axis direction). The axis M1 is a rotation axis of the main assembly side drive transmission unit 203.

The shape of each of the parts arranged inside the main assembly drive transmission unit 203 will be described.

The first braking engagement member 204 comprises a cylindrical portion 204_d_, a flange portion 204_a_, and a coupling engaging portion 204_b_ which projects like a claw and engages with the drum coupling 143. A part of the cylindrical portion includes a rotation stop recess 204_c_ which engages with the rotation stop projection 208_c_ of the second braking engagement member 208, which will be described hereinafter.

The second braking engagement member 208 includes a flange portion 208_a_, a coupling engaging portion 208_b_ projecting in the form of a claw and engaging with the drum coupling 143, and the rotation stop projection 208_c_ engaged with the rotation stop recess 204_c_ of the first braking engagement member 204. Since the second braking engagement member 208 is stopped from rotating relative to the first braking engagement member 204, the first and second braking engagement members 204 and 208 rotate integrally with each other. Further, the first and second braking engagement members 204 and 208 are connected so as to move integrally also in the axial direction.

Therefore, the first and second braking engagement members 204 and 208 may be collectively referred to simply as braking engagement members (204, 208).

The first braking engagement member 204 is an outer braking engagement member disposed on the outer side in the radial direction, and the second braking engagement member 208 is an inner braking engagement member disposed on the inner side in the radial direction.

The brake transmission member 207 includes a flange portion 207_a_ and a shaft portion 207_b_. The flange portion 207_a_ is provided with a projection 207_e_ which engages with the projection 204_e_ provided on the flange portion 204_a_ of the first braking engagement member 204. The flange portion 207_a_ of the brake transmission member 207 is disposed between the flange portion 204_a_ of the first braking engagement member 204 and the flange portion 208_a_ of the second braking engagement member 208, with a play (gap) G therebetween in the axial direction (FIG. 44). In the axial direction M1A, when the brake transmission member 207 is in a position relative to the first brake engagement member 204 in which the projection 207_e_ of the brake transmission member 207 (see FIGS. 43 and 59) is engaged with the projection 204_e_ of the first brake engagement member 204, the first brake transmission member and the first and second braking engagement members 204 and 208 rotate integrally. On the other hand, when the brake transmission member 207 is in a position relative to the first braking engagement member 204 in the axial direction in which the projection 207_e_ does not engage with the projection 204_e_, the brake transmission member 207 does not limit the rotation of the first and second engagement members 204, 208. That is, the first and second braking engagement members 204 and 208 are rotatable relative to the brake transmission member 207. The shaft portion 207_b_ has a non-circular cross-section, and engages with the engagement hole 206_c_ of the brake member 206 which will be described hereinafter so that the brake transmission member 207 and the brake member 206 are integrally rotated.

The brake member 206 is divided into two portions, namely, a fixed side 206_a_ and a rotating side 206_b_, but they are integrated in the axial direction by a retainer (not shown). The fixed side 206_a_ is supported by the support shaft 202, and the rotation about the shaft is also fixed. On the other hand, the rotating side 206_b_ can rotate around the support shaft 202, but rotates while receiving a braking force (load) in the rotational direction from the fixed side 206_a_. The method of producing the braking force can be appropriately selected from those using friction and viscosity.

The braking engagement members (204, 208) are connected to the brake member 206 by way of the brake transmission member 207 as described above. Therefore, the rotational torque of the braking engagement members (204, 208) increases due to the influence of the load (braking force) generated by the brake member 206. The brake engagement spring 211 is a compression coil spring, and is provided so as to be sandwiched and compressed between the end surface 206_d_ of the brake member 206 and the flange portion 204_a_ of the first braking engagement member 204. As a result, the spring 211 applies a repulsive force (urging force, elastic force) to each of the end surface 206_d_ of the brake member 206 and the flange portion 204_a_ of the first braking engagement member 204.

The drum drive coupling spring 210 is a compression coil spring, and is provided so as to be sandwiched and compressed between the end surface 206_d_ of the brake member 206 and the flange portion 207_a_ of the brake transmission member 207. As a result, the spring 210 applies a repulsive force (urging force, elastic force) to each of the end surface 206_d_ of the brake member 206 and the flange portion 207_a_ of the brake transmission member 207.

The brake transmission member 207 directly receives the repulsive force of the drum drive coupling spring 210 while receiving the repulsive force of the brake engagement spring 211 by way of the flange portion 204_a_ of the first braking engagement member 204. The projection 207_f_ at the end of the brake transmission member 207 in the axial direction M1A abuts against the contact surface 180_f_ of the drum drive coupling 180 (see FIG. 44).

By this, the drum drive coupling 180 also receives the force of the drum drive coupling spring 210 and the brake engagement spring 211 by way of the brake transmission member 207. The drum drive coupling 180 tends to move due to the force of the springs 210 and 211. Therefore, the movement of the drum drive coupling 180 in the arrow M1B direction is regulated (restricted) by the axial direction restricting portion 212 (see FIG. 44) so that the drum drive coupling 180 does not drop off the main assembly side drive transmission unit 203. Specifically, when the drum drive coupling 180 moves to the arrow M1B by a certain distance, the flange portion 180_a_ (see FIG. 43) of the drum drive coupling 180 comes into contact with the restriction portion 212 (see FIG. 44). By this, the movement and drop-off of the drum drive coupling 180 can be suppressed.

When the drum drive coupling 180 receives a force in the arrow M1A direction from the outside in this state, the drum drive coupling 180 can move in the arrow M1A direction while compressing the springs 210 and 211.

Further, when the braking engagement members (204, 208) engage with the coupling 143, the coupling engaging portions 204*b*, 208*b* may interfere with the coupling 143 (see FIG. 60, details will be described hereinafter). In such a case, the braking engagement members (204, 208) can enter (retract) into the depth of the drive transmission unit 203 while compressing the springs 210 and 211 in the direction of the arrow M1A (see FIG. 61).

The braking engagement members (204, 208) are disposed with a gap G from the brake transmission member 207 as described above (see FIG. 44). Within a range of the width of the gap G, the braking engagement members (204, 208) can move and retract in the M1A direction relative to the brake transmission member 207. Similarly, the braking engagement members (204, 208) can move in the direction of the arrow M1A within the range of the width of the gap G relative to the drum drive coupling 180. When the braking engagement member (204, 208) moves in the direction of the arrow M1A relative to the brake transmitting member 207 and the drum drive coupling 180, the brake engagement spring 211 is compressed.

The brake transmitting member 207 is also moved in the direction of arrow M1A together with the braking engagement member (204, 208), by the braking engagement member (204, 208) contacting the brake transmitting member 207 which tends to move in the direction of the arrow M1A beyond the width of the gap G.

Figure 62:
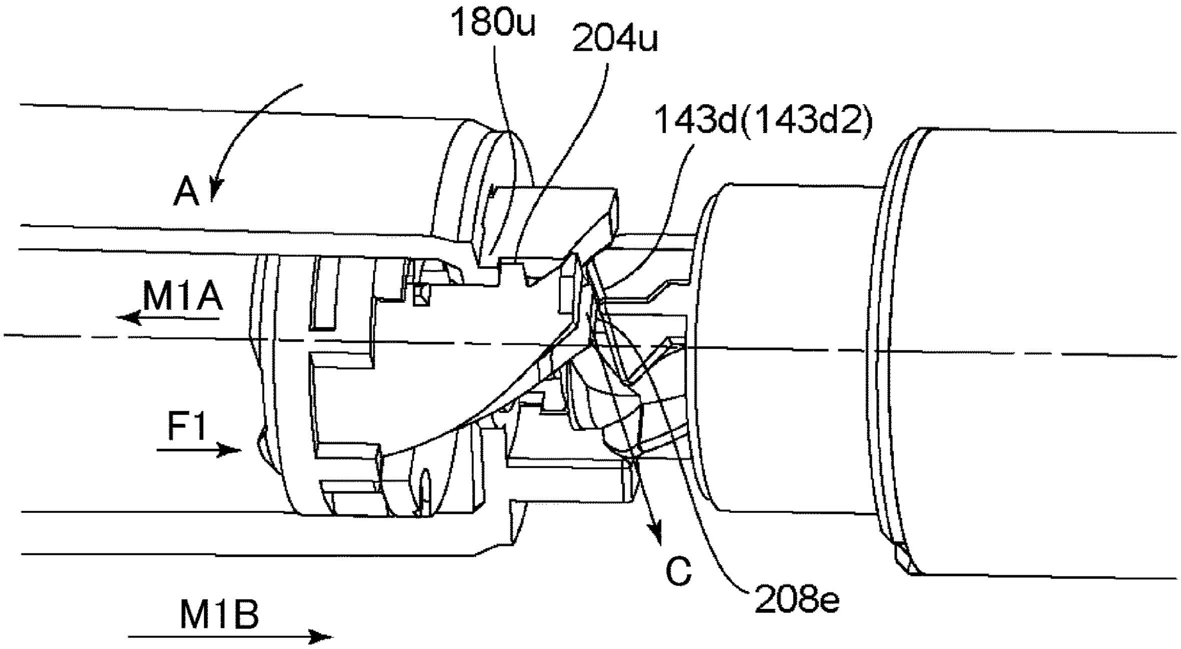
FIG. 62 is a perspective view of the drive transmission unit and the drum unit.

Together with the braking engagement members (204, 208), the drum drive coupling 180 also moves in the direction of arrow M1A. As shown in FIG. 62, the drum drive coupling 180 and the first braking engagement member 204 are provided with a projecting engaging portion 180*u* and an engaging portion 204*u*, respectively. Therefore, when the braking engagement member 204 moves in the direction of the arrow M1A relative to the drum drive coupling 180 for a predetermined distance or more, the engaging portion 204*u* pushes the engaging portion 180*u* to retract the drive coupling 180 in the M1A direction. At this time, not only the spring 211 but also the spring 210 is compressed.

When the braking engagement member (204, 208) moves in the direction of the arrow M1A relative to the brake transmission member 207, the projection 207*e* of the brake transmission member 207 and the projection 204*e* of the first braking engagement member are disengaged. That is, the braking engagement members (204, 208) are disconnected from the brake transmission member 207, and the braking force is not transmitted from the brake transmission member 207. The brake members (204, 208) can rotate relative to the brake transmission member 207 without receiving the rotational load produced by the brake member 206.

That is, by retracting the braking engagement members (204, 208) in the direction of arrow M1A, the braking engagement members are movable from the position in which the brake member 206 receives the rotational load (braking force) during rotation to the position in which the rotational load is not received during rotation. The braking engagement members (204, 208) are structured to reduce the own required torque by moving in the M1A direction relative to the brake transmission member 207 and to the drum drive coupling 180.

Figure 45:
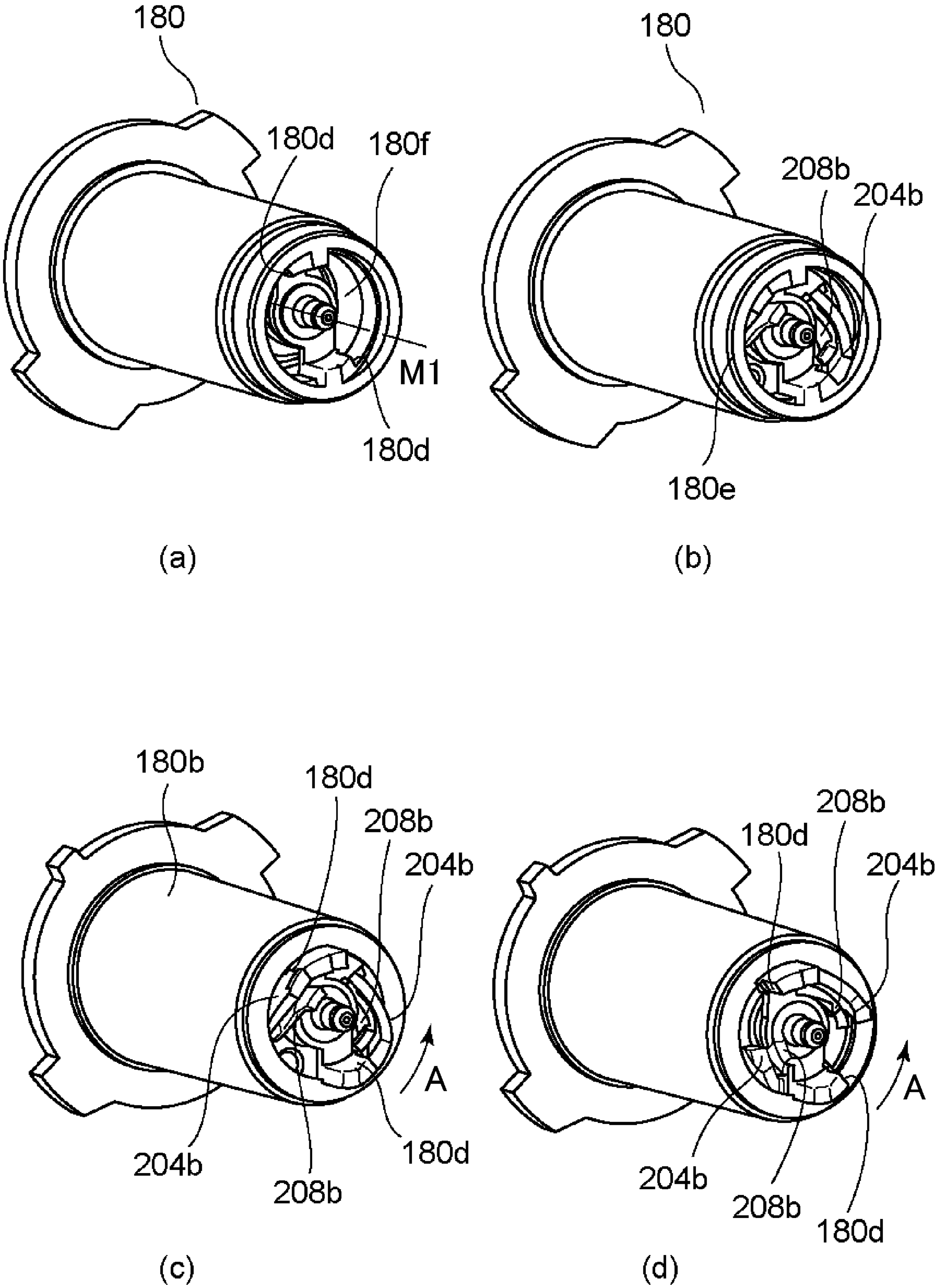
FIG. 45 is a perspective view of the drive transmission unit 203.

FIG. 45 is a perspective view illustrating the positional relationship between the drum drive coupling 180 and the braking engagement members (204, 208). Part (a) of FIG. 45 is a perspective view of only the drum drive coupling 180, and part (b) of FIG. 45 shows a perspective view in which both the drum drive coupling 180 and the braking engagement member (204, 208) are included. Parts (c) and (d) of FIG. 45 are illustrations in which the reinforcing cylindrical portion 180*e* of the drum drive coupling 180 is not shown (invisible) for the sake of better illustration. The phases of the braking engagement members (204, 208) differ between parts (c) and (d) of FIG. 45.

As shown in part (a) of FIG. 45, the drum drive coupling (driving force applying member) 180 includes a driving transmission surface 180*d* provided at each of two positions which are away from each other by 180 degrees in the circumferential direction as a surface (driving force applying portion) which engages with the coupling 143 to transmit the driving force. The drum drive coupling has an axisymmetric shape.

A through hole 180*f* communicating in the direction of the axis M1 is provided in a portion other than the drive transmission surface 180*d*. Through the through hole 180*f*, the coupling engaging portions 204*b* and 208*b* of the first braking engagement member 204 and the second braking engagement member 208 are exposed in the direction facing the coupling 143 (see FIG. 60).

Part (b) of FIG. 45 shows a state in which the coupling engaging portions 204*b* and 208*b* of the first braking engagement member 204 and the second braking engagement member 208 are exposed. The drum drive coupling 180 is provided with a reinforcing cylindrical portion 180*e* in order to increase the rigidity of the drive transmission surface 180*d*. Part (c) of FIG. 45 is an illustration in which the reinforcing cylindrical portion 180*e* is not shown for the sake of better illustration. Part (c) of FIG. 45 shows a state in which the coupling engaging portions 204*b* and 208*b* and the drive transmission surface 180*d* are in a close phase relationship in the rotational direction A. The size of the through hole 180*f* is selected to be wider than the widths of the coupling engaging portions 204*b* and 208*b* in the circumferential direction. Therefore, the coupling engaging portions 204*b* and 208*b* can move within a predetermined range in the rotational direction in the drum drive coupling 180.

Part (d) of FIG. 45 shows a state in which the coupling engaging portions 204*b* and 208*b* and the drive transmission surface 180*d* are in a distant phase relationship in the rotational direction A.

Next, referring to FIGS. 1 and 43 to 51, a method of connecting the main assembly side drive transmission unit 203 of the drive transmission mechanism and the photosensitive member coupling 143 on the process cartridge 100 side will be described.

[Coupling Engagement Operation]

Next, the process of coupling between the main assembly side drum drive coupling 180 of the image forming apparatus main assembly 170 and the drum coupling 143 of the process cartridge 100 will be described.

Figure 46:
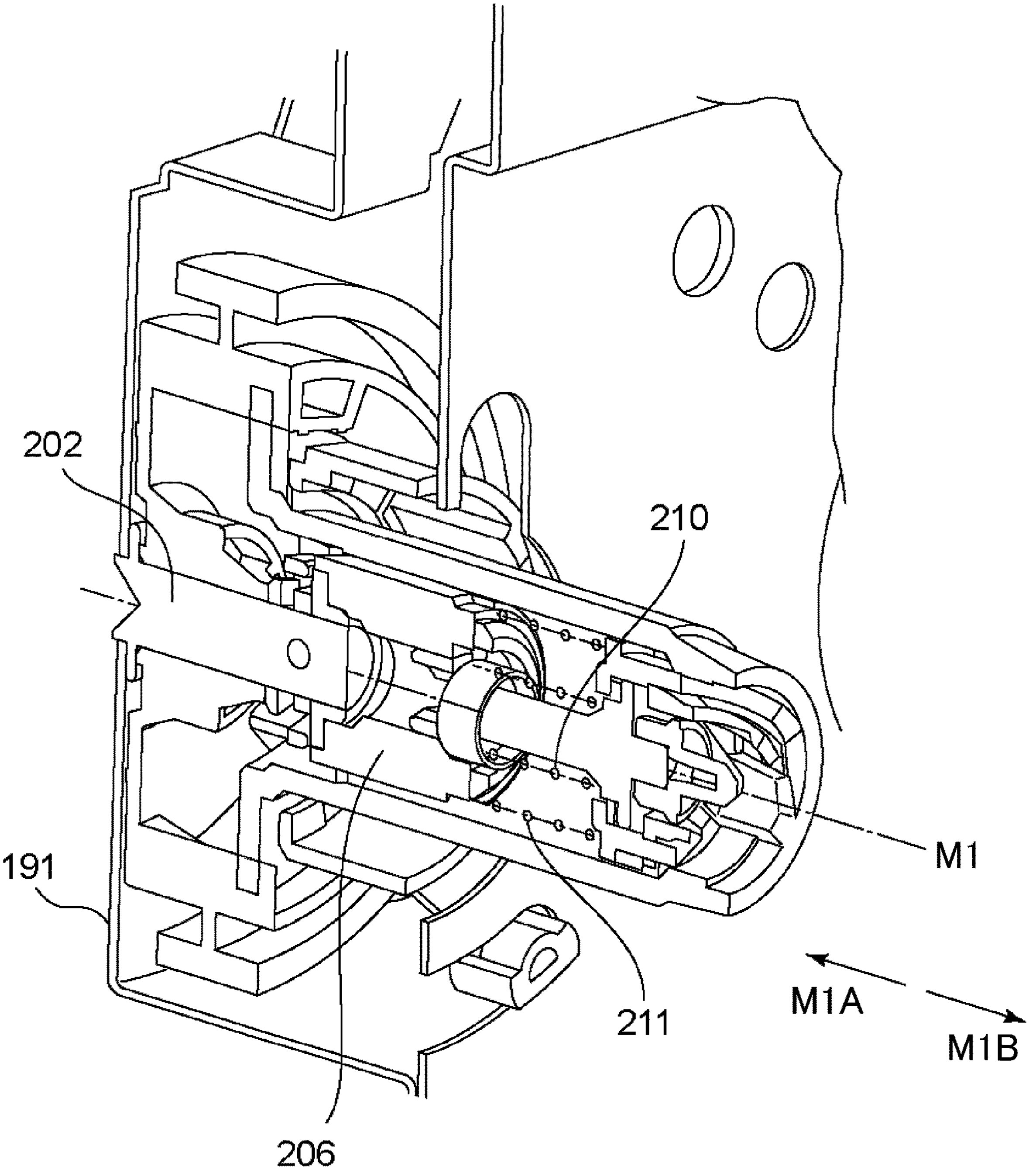
FIG. 46 is a sectional perspective view of the main assembly of the device including the drive transmission unit 203.

FIG. 46 shows a sectional view of the image forming apparatus main assembly 170 around the main assembly side drum drive coupling 180. Referring to FIG. 46, the outline of the movement of the drum drive coupling 180 on the main assembly side will be described.

When the user opens the front door 111 (FIG. 4) of the image forming apparatus main assembly to replace the process cartridge 100, the drive transmission unit 203 is moved in the direction of the arrow M1A along the axis M1 by a link mechanism (not shown) connected to the front door 111. That is, the drive transmission unit 203 is in a state of being moved away from the process cartridge 100 and the drum coupling 143 (see FIG. 60).

When the user mounts the process cartridge 100 and closes the front door 111, the action of the link described above disappears. Therefore, the drum drive coupling 180, the brake engagement members 204, 208, and the brake transmission member 207 tends to move again in the direction of arrow M1B by the urging forces of the drum drive coupling spring and the brake engagement spring 211. At this time, the drum coupling 143 of the process cartridge 100 stands by in the direction of the arrow M1B and interferes with the approaching drive transmission unit 203 (states shown in FIGS. 61, 65, and 69). The drum coupling 143 and the drive transmission unit 203 are pressed against each other.

In these states, the drum coupling 143 and the drum drive coupling 180 of the drive transmission unit 203 are normally not engaged.

In order for the drum coupling 143 and the main assembly side drum drive coupling 180 to be in a normal engaged state, the drive transmission unit 203 is required to be further rotated from the above-mentioned pressing state. That is, it is necessary to advance the drive process of the drive transmission unit 203 until the drum drive coupling 180 on the main assembly side engages with the drum coupling 143.

Further, the process until the engagement is completed may be carried out in different patterns, and therefore, the description will be made, dividing into a plurality of cases depending on the phase of the drum coupling 143 and the main assembly side drum drive coupling 180.

Figure 47:
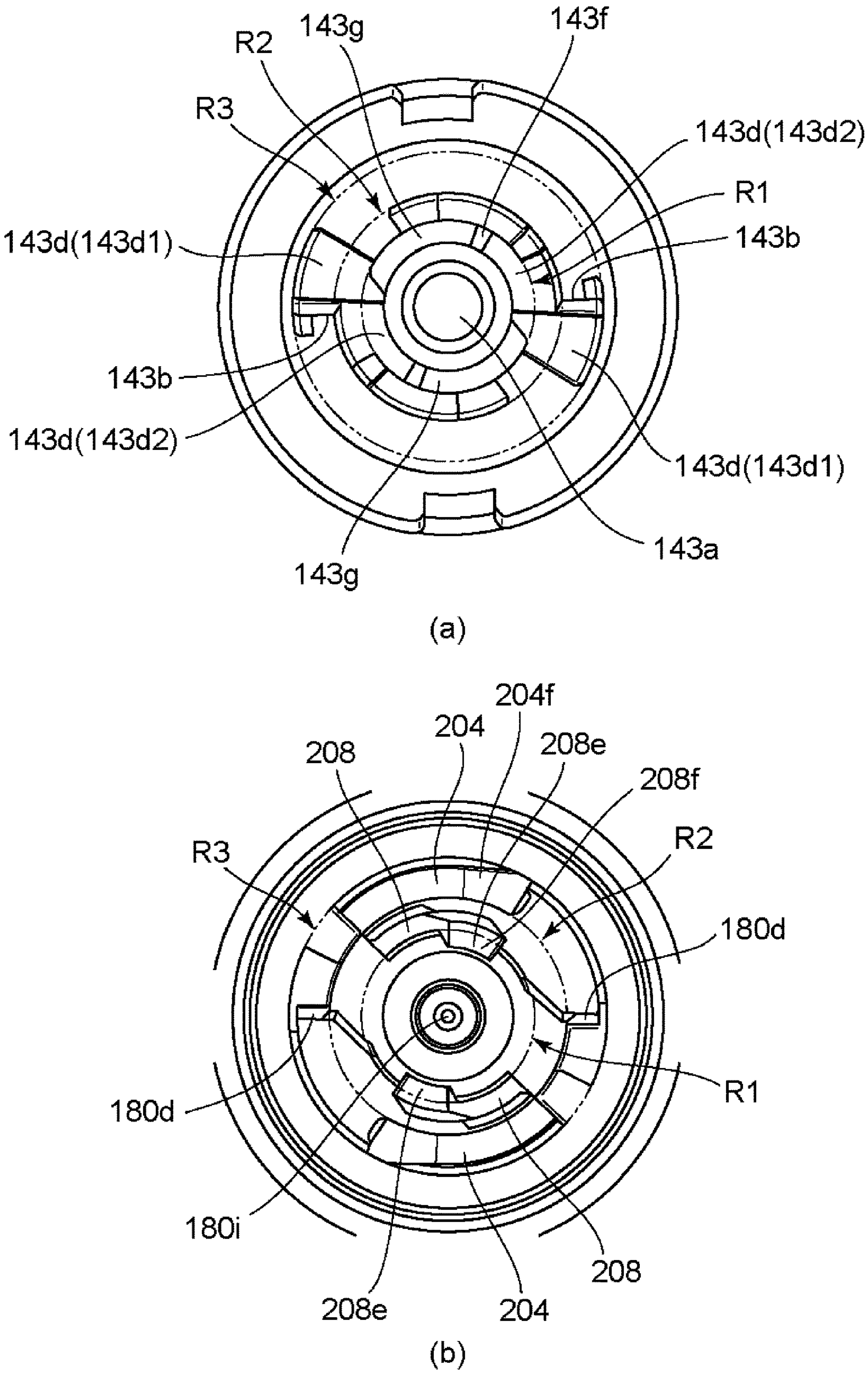
FIG. 47 is a front view of the drive transmission unit 203 and the drum coupling 143.

Part (a) of FIG. 47 shows the drum coupling 143, and part (b) of FIG. 47 shows the drive transmission unit, both as viewed in the axial direction.

Referring to part (a) of FIG. 47, the shape of the coupling 143 will be further described. As for the profile of the coupling, the shape differs in the radial direction, depending on the functions to perform. The following structures are provided within the range of the radius indicated by R1 in the Figure.

That is, the positioning hole (opening) 143*a* which engages with the positioning boss (positioning portion) 180*i* of the drive coupling 180, a visor (visor portion) 143*g* (see part (a) of FIG. 47 and FIG. 1) as a overhang portion for preventing the drive transmission unit 203 from entering in the axial direction and a part of the helical slope 143*d* are provided. A part of the helical slope 143*d* and a part of the braking force receiving surface 143*c* are provided in the range between R1 to R2. The braking force receiving surface 143*c* is not visible in the line-of-sight direction of part (a) of FIG. 47 and is shown in FIG. 1. In the range between R2 to R3, a part of the driving force receiving portion 143*b*, a part of the helical slope 143*d*, and a part of the braking force receiving surface 143*c* are provided.

On the other hand, since the shape of the drive transmission unit 203 is also arranged in a shape including a different role in the radial direction, the same range as the coupling 143 is shown in part (b) of FIG. 47 using the same symbols R1 to R3.

Within the range of the radius indicated by R1 in part (b) of FIG. 47, the positioning boss 180*i* that engages with the positioning hole 143*a* of the drum coupling 143 and the second brake that comes into contact with the visor portion 143*g* depending on the phase of the drum coupling 143. An inward projection 208*e*, which is a portion of the coupling engaging portion 208*b* of the engaging member 208, is arranged. Within the range indicated by R1 to R2, the coupling engaging portion 208*b* of the second braking engagement member 208 is arranged. The drive transmission surface 180*d* and the first braking engagement member 204 are arranged within the range indicated by R2 to R3.

Figure 48:
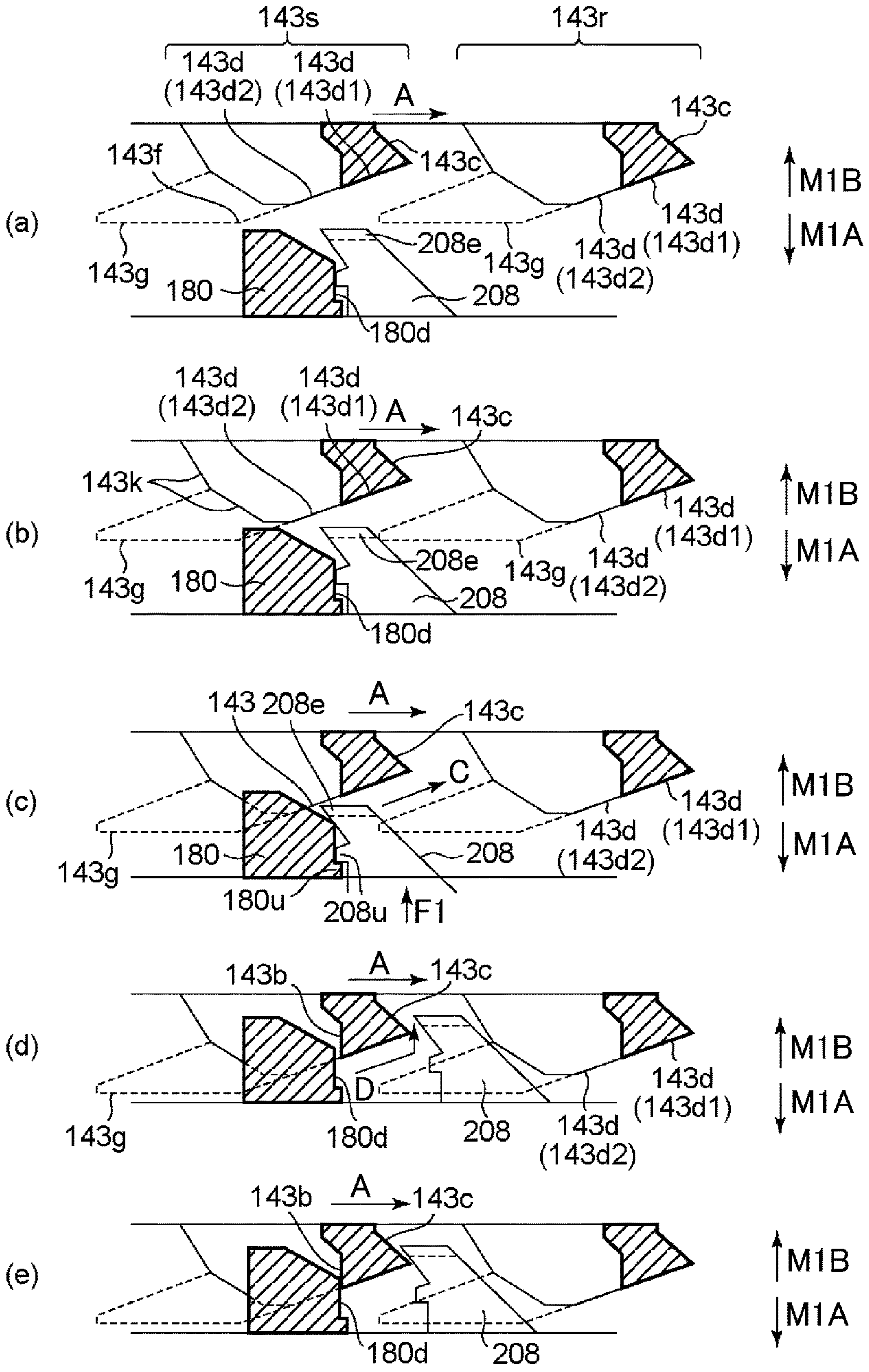
FIG. 48 is a developed view illustrating engagement of the drum coupling.

FIG. 48 is a developed view of these portions developed around the rotation axis M1. FIG. 48 The process until the drum coupling 143 and the drive transmission unit 203 are engaged with each other will be described.

FIG. 48 shows the drive transmission unit 203 on the lower side and shows the process of approaching the drum coupling 143 while moving in the direction of the arrow M1B until the engagement is established. In this Figure, the structures provided within the radius R1 shown in FIG. 47 are shown by broken lines, the structures provided within the range between the radius R1 and the radius R2 are shown by solid lines, and further, the structures provided in the range between the radius R2 to radius R3 are shown by solid lines and hatching lines.

The drum coupling 143 includes two coupling portions 143*s* and 143*r* arranged 180° apart from each other, but only the coupling portion 143*s* will be described below for the sake of simplicity. The description of the coupling portion 143*s* also applies to the coupling portion 143*r*.

Part (a) of FIG. 48 shows a state in which the drive transmission surface 180*d* of the drive transmission unit 203 and the second braking engagement member 208 are in close to each other. As shown in part (a) of FIG. 48, the phases of the inclination start portion 143*f* of the drum coupling 143 and the inward projection 208*e* of the second braking engagement member 208 have the following relationship. That is, the inclination start portion 143*f* of the drum coupling 143 is on the upstream side of the projection 208*e* in the rotational direction (arrow A).

Part (b) of FIG. 48 shows a state in which the drive transmission unit 203 is further moved in the direction of arrow M1B from the position shown in part (a) of FIG. 48. The helical slope 143*d* is opposed to and is in contact with the inward projection 208*e* of the approaching first braking engagement member 204.

Part (c) of FIG. 48 shows a state in which the drive transmission unit 203 is further moved in the direction of the arrow M1B. The helical slope 143*d* stops the approaching second braking engagement member 208. By this, the movement of the second braking engagement member 208 in the M1B direction is suppressed. On the other hand, the portion excluding the second braking engagement member 208 (that is, the drum drive coupling 180 of the drive transmission unit 203, and so on) is moving in the direction of arrow M1B. In the drive transmission unit 203, the second braking engagement member 208 is in a state of being relatively pushed in the direction of the arrow M1A.

Figure 44:
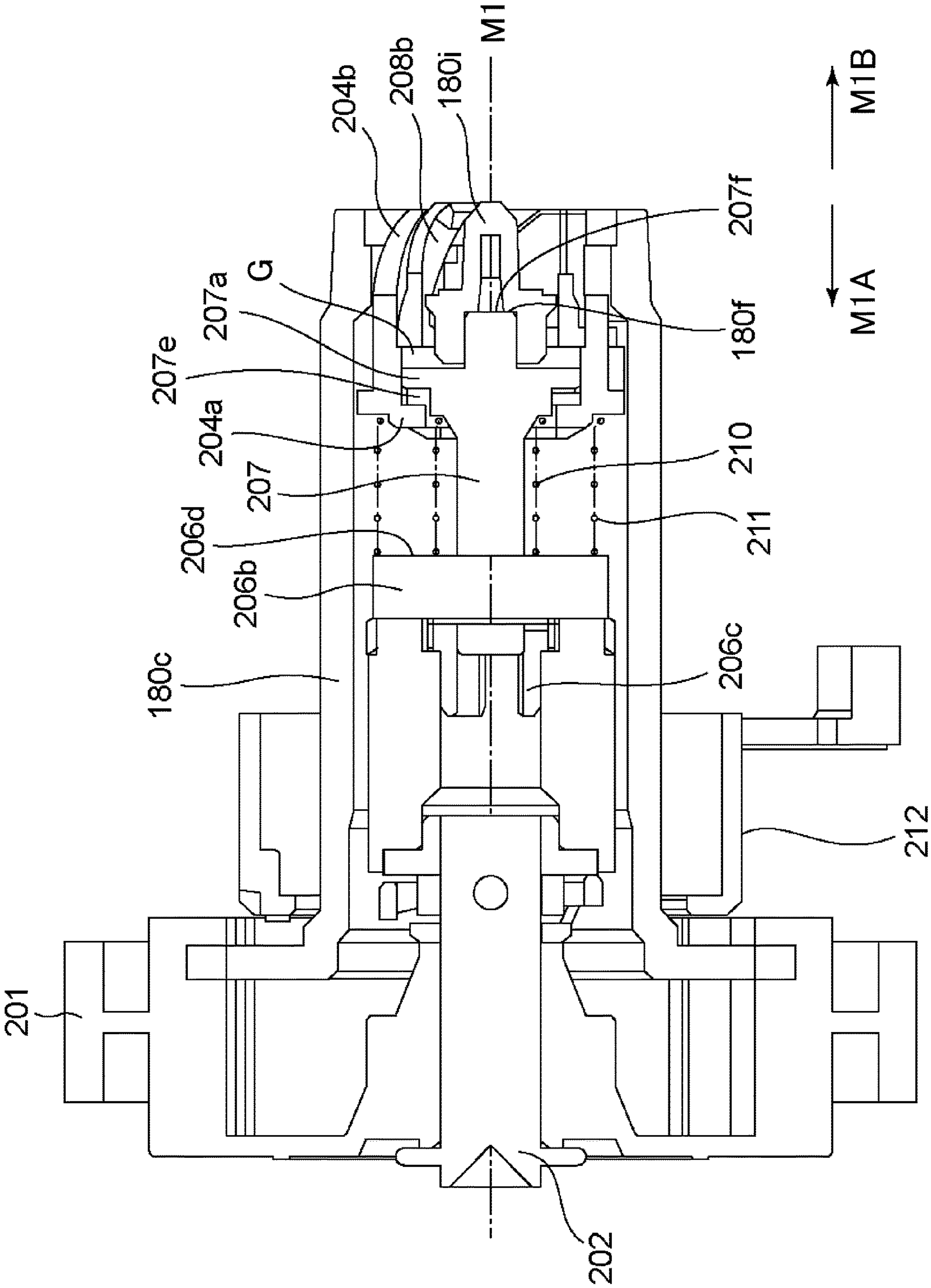
FIG. 44 is a sectional view of the drive transmission unit 203.

In this state reached, as described referring to FIG. 44, the second braking engagement member 208 can rotate without receiving a rotational load because of being disconnected from the brake member 206. At this time, the brake member 206 receives an elastic force F1 in the direction of the rotation axis M1 by the drum drive coupling spring 210 and the brake engagement spring 211 provided inside the drive transmission unit 203. The helical slope 143*d* moves the second braking engagement member 208, which becomes free of rotational load, in the direction of arrow C by the component force of the elastic force F1. That is, the second braking engagement member 208 moves to the downstream side in the rotational direction A along the helical slope 143*d*.

Part (d) of FIG. 48 shows a state immediately after the second braking engagement member 208 is moved to the downstream side in the rotational direction (direction of arrow A). The second braking engagement member 208 moves along the helical slope 143*d* of the drum coupling 143, and further moves in the M1B direction by the amount of the entire drive transmission unit 203 moving in the axial direction M1B, so that movement trace is as depicted by the arrow D. As a result, the second braking engagement member 208 moves away from the drive coupling 180 toward the downstream side in the rotational direction A to the position in which it is engageable with the braking force receiving portion 143*c* (second side surface, second side portion) of the drum coupling 143. That is, the helical slope 143*d* is a guide for guiding the braking engagement member toward the braking force receiving portion 143*c*. In this embodiment, the helical slope (top surface) 143*d*, which is a guide, has a downstream portion 143*d*1 and an upstream portion 143*d*2. The downstream portion (downstream side slope, downstream side top surface, downstream side inclined portion) 143*d*1 is placed between the braking force receiving portion 143*c* and the driving force receiving portion 143*b*. The upstream side portion (upstream side slope, upstream side top surface, upstream side inclined portion) 143*d*2 is on the upstream side in the rotational direction (A direction) with respect to the driving force receiving portion 143*b*. Therefore, the second braking engagement member 208 can be smoothly guided from the upstream side portion 143*d*2 of the slope 143*d* to the braking force receiving portion 143*c* by way of the downstream side portion 143*d*1.

Part (e) of FIG. 48 shows a state in which the drum coupling 143 moves (rotates) in the direction of arrow A by the rotating drive transmission surface 180*d*, and as a result, the braking force receiving portion 143*c* contacts the second braking engagement member 208.

When the drive transmission unit 203 rotates in the direction of arrow A, the drive transmission surface 180*d* comes into contact with the drive force receiving portion 143*b* to transmit the drive force. The drive transmission surface 180*d* is a drive force applying portion which applies a drive force to the drum coupling 143.

The drum coupling 143 being rotated by receiving the driving force from the driving transmission surface 180*d* also receives the braking force by the braking force receiving portion 143*c* contacting (engaging) the second braking engagement member 208.

Parts (a) to (e) of FIG. 48 show only the second braking engagement member 208 out of the first and second braking engagement members 204 and 208 which are the braking engagement members. However, the first braking engagement member 204 (see FIG. 43) is connected to the second brake member 208 so as to move integrally with the second brake member 208. Therefore, in the process shown in part (a) of FIG. 48 to part (e) of FIG. 48, the first braking engagement member 204 also moves along the same line as the second brake member 208. In the state shown in part (e) of FIG. 48, the first braking engagement member 204 also engages with the braking force receiving portion 143*c* together with the second braking engagement member 208.

In part (a) to (e) of FIG. 48, only the engagement process of the braking engagement member (204, 208) and the drum drive coupling 180 with the coupling portion 143*s* are shown for simplicity of the description. Similarly to the coupling portion 143*s*, the coupling 143*r* also engages with the braking engagement member (204, 208) and the drum drive coupling 180. The engagement state of the braking engagement members (204, 208) and the drum drive coupling with respect to the coupling 143*r* is shown in part (a) of FIG. 76.

Here, in order to help the recognition of the process described so far, the description will be made again using the perspective views of FIGS. 60 to 64. In FIGS. 60 to 64, a part of the drum drive coupling 180 is not shown for better illustration, and the internal shapes are uncovered.

Figure 60:
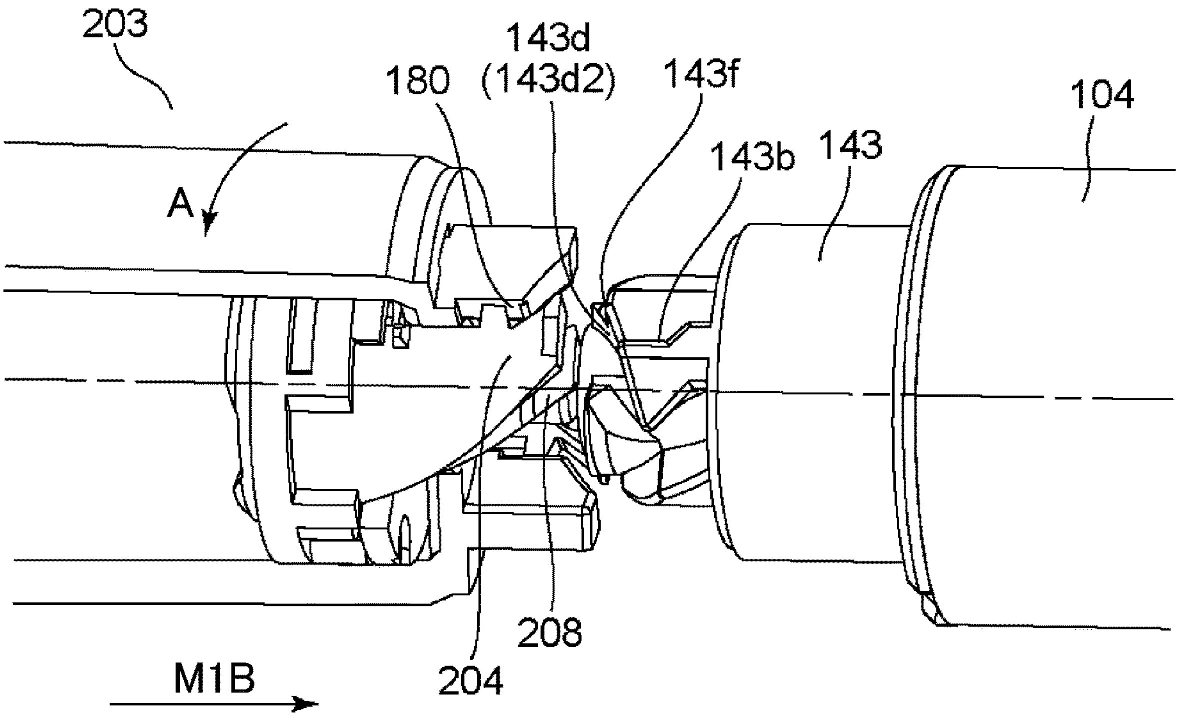
FIG. 60 is a perspective view of the drive transmission unit and the drum unit.
Figure 61:
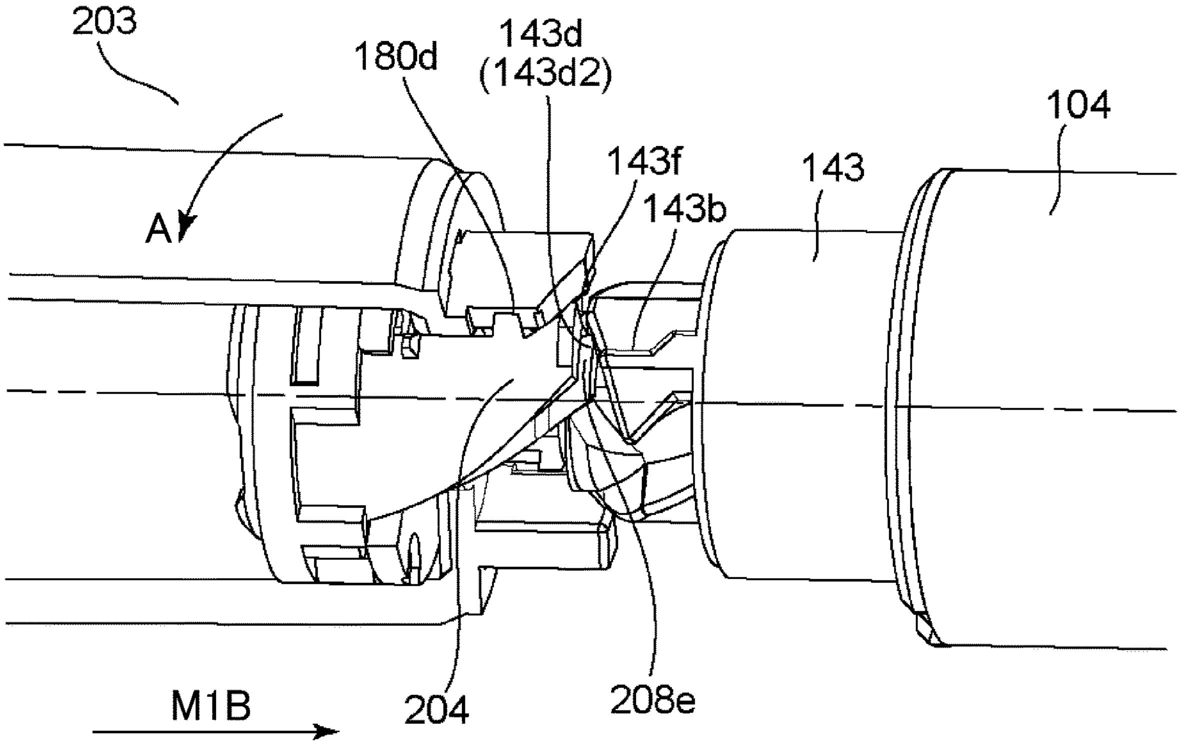
FIG. 61 is a perspective view of the drive transmission unit and the drum unit.

FIG. 60 is a perspective view illustrating the same state as in part (a) of FIG. 48 described above. That is, the inclination start portion 143*f* of the drum coupling 143 is on the upstream side of the projection 208*e* in the rotational direction (arrow A), and the drive transmission surface 180*d* of the drive transmission unit 203 and the second braking engagement member 208 are close to each other. FIG. 61 shows a state in which the drive transmission unit 203 has moved in the direction of arrow M1B from this state.

FIG. 61 shows a state corresponding to part (b) of FIG. 48, and the helical slope 143*d* is opposed to and is in contact with the inward projection 208*e* of the approaching second braking engagement member 208. The drive transmission unit 203 and the drum coupling 143 are relatively close to each other until they come into contact with each other, but the state inside the drive transmission unit 203 has not changed.

FIG. 62 shows a state in which the drive transmission unit 203 is further moved in the direction of arrow M1B from this state.

FIG. 62 shows a state corresponding to part (c) of FIG. 48, in which the helical slope 143*d* stops the approaching second braking engagement member 208. By this, in the drive transmission unit 203, the second braking engagement member 208 is pushed in the direction of the arrow M1A relative to the drum drive coupling 180.

In this state, as described referring to FIG. 44, the second braking engagement member 208 can rotate without receiving a rotational load because of being disconnected from the brake member 206. At this time, the brake member 206 receives an elastic force F1 in the direction of the rotation axis M1 by the drum drive coupling spring 210 and the brake engagement spring 211 arranged inside the drive transmission unit 203. The helical slope 143*d* moves the second braking engagement member 208, which becomes free of rotational load, in the direction of arrow C by the component force of the elastic force F1. That is, the second braking engagement member 208 rotationally moves to the downstream side in the rotational direction A along the helical slope 143*d*.

Figure 63:
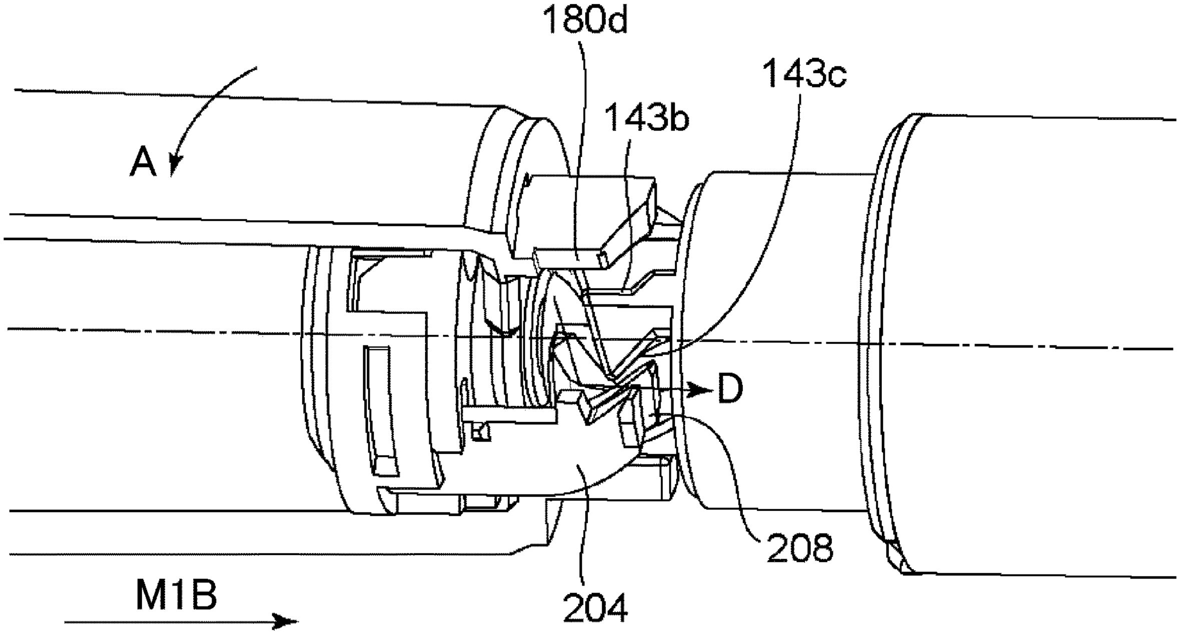
FIG. 63 is a perspective view of the drive transmission unit and the drum unit.

FIG. 63 shows a state immediately after the second braking engagement member 208 moves to the downstream side in the rotational direction (direction of arrow A), and corresponds to part (c) of FIG. 48. The second braking engagement member 208 moves along the helical slope 143*d* of the drum coupling 143, and further moves in the M1B direction by the amount of movement of the entire drive transmission unit 203 in the axial direction M1B direction, the trace of the movement is as indicated by the arrow D. As a result, the braking engagement members (204, 208) move away from the drive coupling 180 toward the downstream side in the rotational direction A to the position in which they can engage with the second side surface (braking force receiving portion 143*c*) of the drum coupling 143. At this position reached, the braking engagement members (204, 208) return to a state where braking force can be produced.

Figure 64:
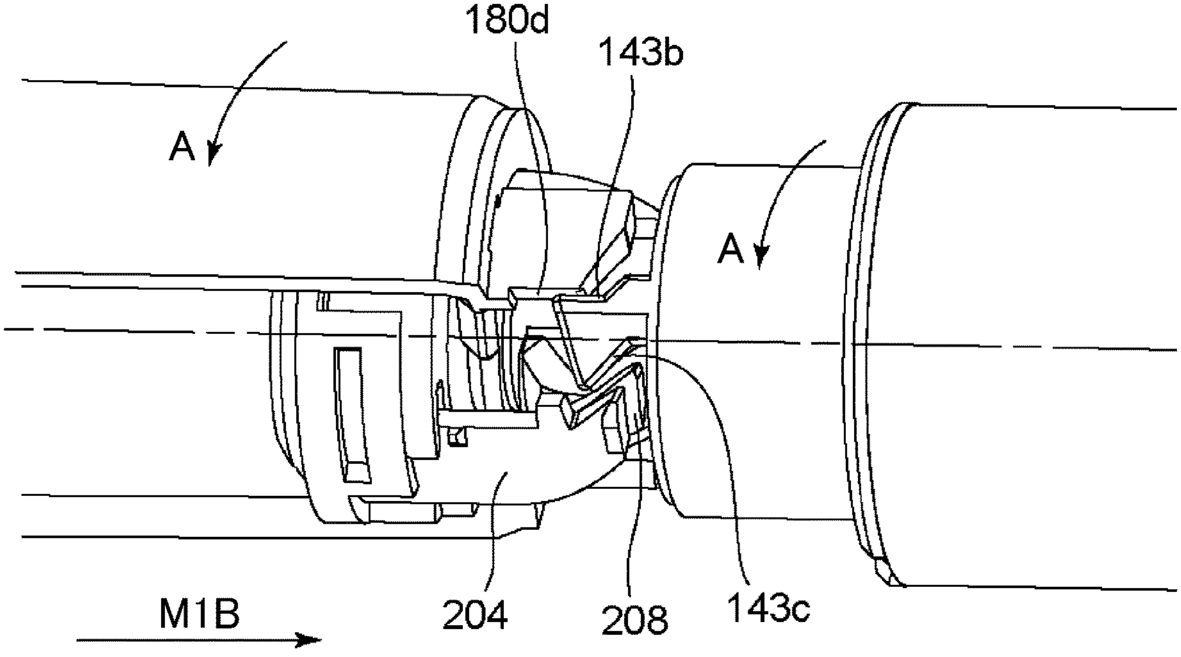
FIG. 64 is a perspective view of the drive transmission unit and the drum unit.

FIG. 64 shows a state in which the drum coupling 143 is moved (rotated) in the direction of arrow A by the rotating drive transmission surface 180*d*, and as a result, the braking force receiving portion 143*c* contacts the second braking engagement member 208. FIG. 64 corresponds to part (d) of FIG. 48.

When the drum drive coupling 180 of the drive transmission unit 203 rotates in the direction of arrow A from the state of FIG. 64, the drive transmission surface 180*d* comes into contact with the drive force receiving portion 143*b* to transmit the drive force. The drum coupling 143 being rotated by receiving the driving force from the driving transmission surface 180*d* also receives the braking force by the braking force receiving portion 143*c* contacting (engaging with) the second braking engagement member 208 (see part (e) of FIG. 48).

In summary, through the processes shown in parts (a) to (e) of FIG. 48 and FIGS. 60 to 64, the braking engagement members (204, 208) are moved relative to the drum drive coupling 180 and the drum coupling 143 as follows.

The braking engagement member (204, 208) is moved from the position (part (a) of FIGS. 48 and 60 in which it is close to the drive transmission surface 180*d* to the position (part (d) of FIGS. 48 and 64) in which the drum coupling 143 is sandwiched between the drive transmission surface 180*d* and the braking engagement member (204, 208).

When the drive transmission surface 180*d* rotates from the state shown in part (d) of FIG. 48 and FIG. 64, the drum coupling 143 also rotates together with the drive transmission surface 180*d* to reach the state shown in part (e) of FIG. 48. Then, the drum coupling 143 rotates in the direction of arrow A by the driving force received from the drum driving side coupling 180 while receiving an appropriate load (braking force) from the braking engagement member (204, 208). As a result, the torque required for the drum drive coupling 180 to rotate the drum unit is not too light and is appropriate, so that the rotational drive of the drum unit is stabilized.

Next, referring to part (a) to (e) of FIG. 49, another pattern of the engagement process of the drum drive coupling 180 and the braking engagement member (204, 208) with the drum coupling 143 will be described. The drum coupling 143 has two coupling portions 143*s* and 143*r*, but for the sake of simplicity, only the coupling portion 143*s* will be described.

As shown in part (a) of FIG. 49, a case where the phases of the inclination start portion 143*f* of the drum coupling 143 and the inward projection 208*e* of the second braking engagement member satisfy the following relationship will be described. That is, the case where the inclination start portion 143*f* of the drum coupling 143 is on the downstream side in the rotational direction (arrow A) with respect to the inward projection 208*e*.

Figure 49:
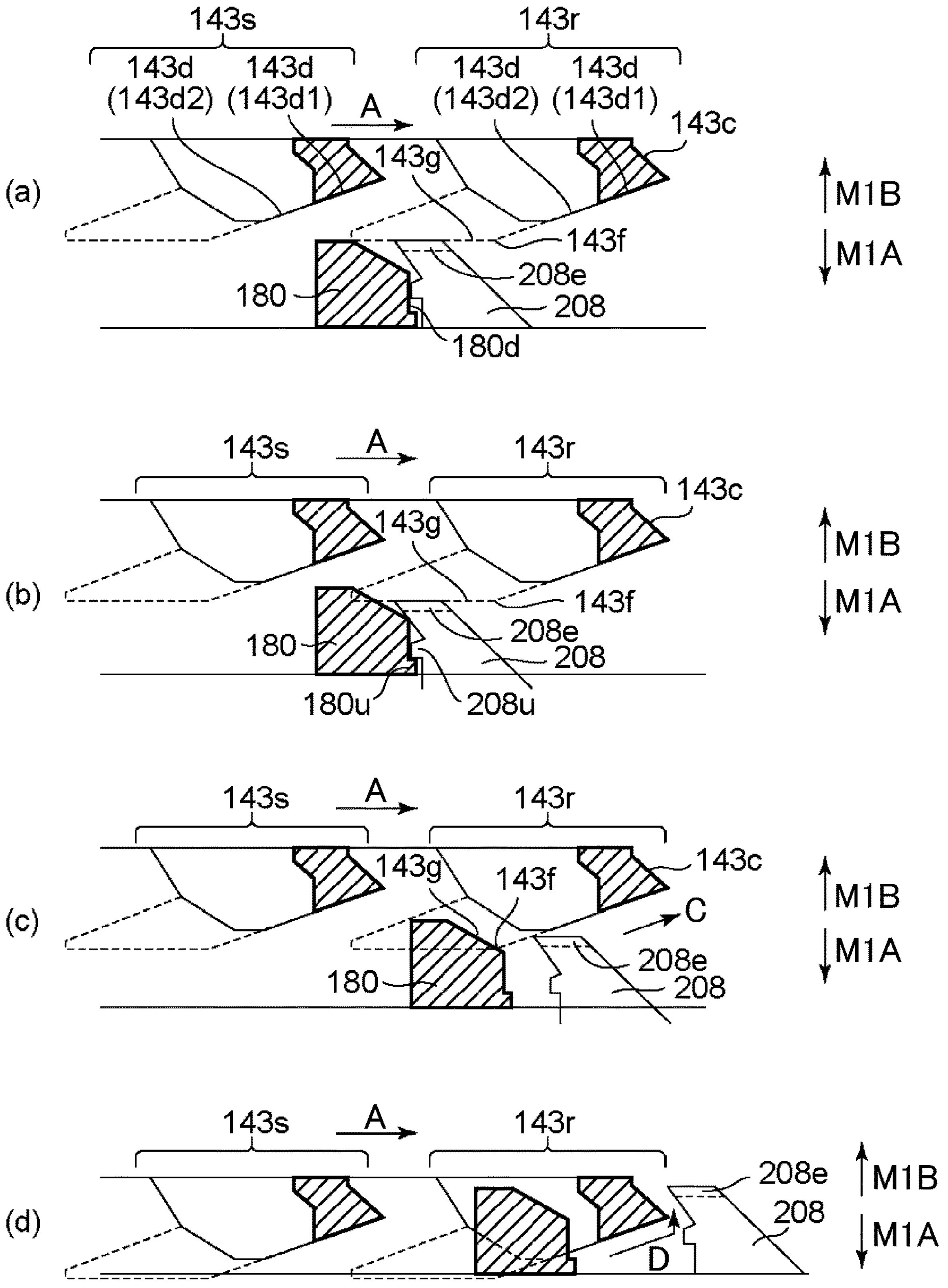
FIG. 49 is a developed view illustrating the engagement of the drum coupling.

Part (a) of FIG. 49 shows a state in which the drive transmission surface 180*d* of the drive transmission unit 203 and the second braking engagement member 208 are close to each other.

The visor portion 143*g* of the drum coupling 143 is in contact with the inward projection 208*e* of the second braking engagement member 208 approaching in the M1B direction.

Next, part (b) of FIG. 49 shows a state in which the visor portion 143*g* stops (blocks) the advancement of the approaching second braking engagement member 208. Here, the drum drive coupling 180, which is a component of the drive transmission unit 203, does not contact the visor portion 143*g*, and therefore, the advancement in the M1B direction cannot be stopped. That is, the visor portion 143*g* does not interfere with the shape of the drum drive coupling 180 because the position thereof is different in the radial direction. On the other hand, the second braking engagement member 208 has an inward projection 208*e* at the free end in the M1B direction. Since the inward projection 208*e* projects inward in the radial direction, it is in contact with the visor portion 143*g* of the drum coupling 143.

By the movement of only the drum drive coupling 180 in the M1B direction, the second braking engagement member 208 moves relative to the drum drive coupling 180 in the M1A direction. As described above, by this relative movement, the second braking engagement member 208 shifted to a state in which it can rotate without receiving a rotational load.

Then, part (c) of FIG. 49 shows a state in which the drive transmission unit 203 has started to rotate in the rotational direction A. First, when the drum drive coupling 180 starts rotating in the A direction, it is pushed by the drum drive coupling 180, and the second braking engagement member 208 also starts rotating in the A direction.

The helical slope 143*d* of the drum coupling 143 moves the second braking engagement member in the direction of arrow C from the point where the inward projection 208*e* of the second braking engagement member 208 passes the inclination start portion 143*f*. That is, the second braking engagement member 208 moves toward downstream side in the rotational direction A and in the M1B direction.

Part (d) of FIG. 49 shows a state after the second braking engagement member 208 moves along the helical slope 143*d* of the drum coupling 143 and passes the inclined surface 143*d* as in part (d) of FIG. 48. At this time, the entire drive transmission unit 203 further moves in the axial direction M1B. As a result, the second braking engagement member also moves in the M1B direction. The first braking engagement member 204 moves along the line of arrow D.

Subsequent engagement operation is the same as in the description of part (d) of FIG. 48, and the subsequent engagement completion state is as shown in part (e) of FIG. 48. In this embodiment, visor portion 143*g* is continuous with on the upstream side (upstream side slope, upstream side top surface) 143*d*2 of the helical slope 143*d*. The inclination start portion 143*f* is a boundary portion between the visor portion 143*g* and the helical slope 143*d*. Therefore, the second braking engagement member 208, the movement of which has been blocked by the visor portion 143*g*, can smoothly shift to a state of being in contact with the helical slope 143*d*, as the drive transmission unit 203 rotates. However, the structure is not necessarily limited to this example structure, and a space may be provided between the visor portion 143*g* and the slope 143*d*.

Also in part (a) of FIG. 49 to part (d) of FIG. 49, only the second braking engagement member 208 of the braking engagement members (204, 208) is shown. However, as described above, also in the process of part (a) of FIG. 49 to part (d) of FIG. 49, the first braking engagement member 204 (see FIG. 43) moves integrally with the second braking engagement member 208.

Here, in order to help the recognition of the process described referring to part (a) of FIG. 49 to part (d) of FIG. 49, the description will be made again with reference to the perspective views of FIGS. 65 to 68. In FIGS. 65 to 68, a part of the drum drive coupling 180 is not shown for better illustration, and the internal shape is uncovered.

Figure 65:
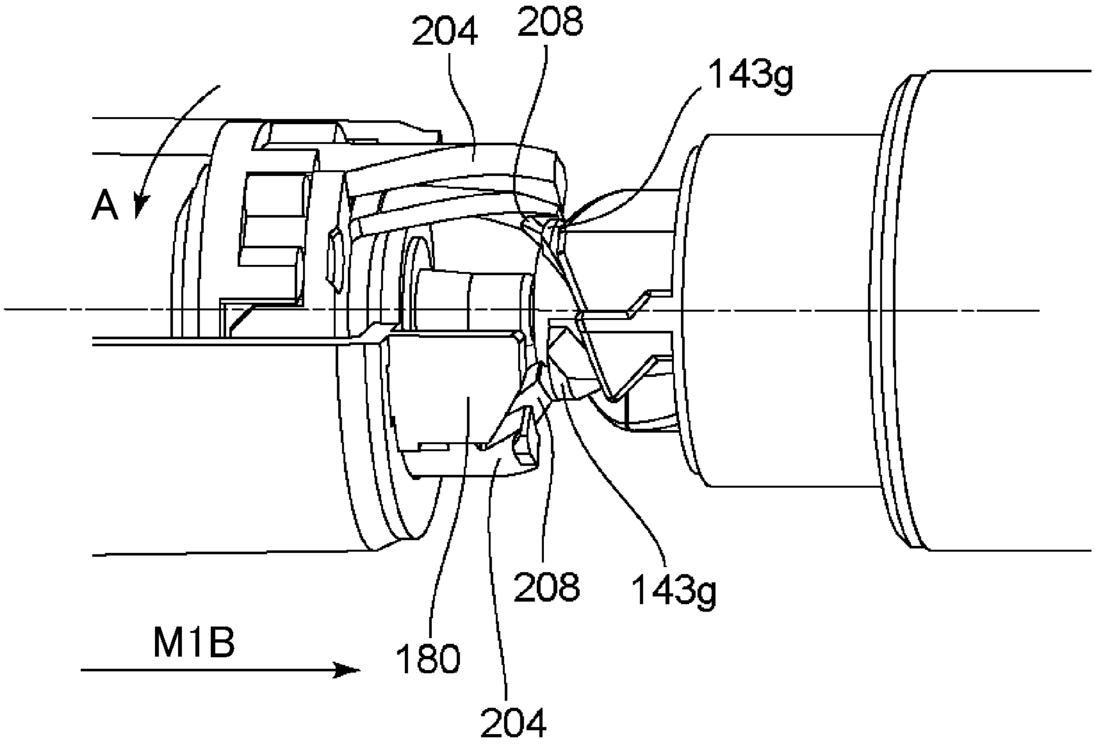
FIG. 65 is a perspective view of the drive transmission unit and the drum unit.

FIG. 65 shows a state in which the drive transmission surface 180*d* of the drive transmission unit 203 and the second braking engagement member 208 are close to each other. At this time, the visor 143*g* of the drum coupling 143 is in contact with the second braking engagement member 208 approaching in the M1B direction. FIG. 65 corresponds to part (a) of FIG. 49.

Figure 66:
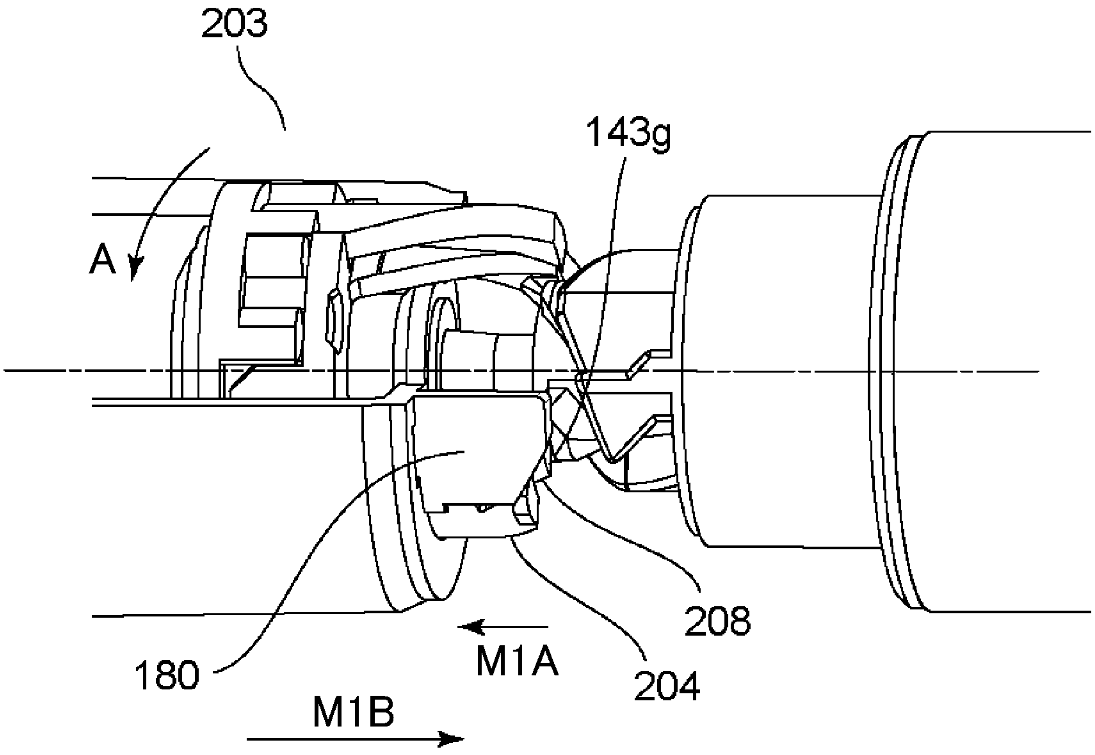
FIG. 66 is a perspective view of the drive transmission unit and the drum unit.

Next, FIG. 66 shows a state in which the drum drive coupling 180 has moved to the right side (M1B direction) along the axial direction relative to the second braking engagement member 208. In FIG. 66, the visor portion 143*g* is in a state of stopping (blocking) the advancement of the approaching second braking engagement member 208.

FIG. 66 corresponds to part (b) of FIG. 49. The second braking engagement member 208 moves relative to the drum drive coupling 180 to the left side (M1A direction) in the axial direction. As described above, by this relative movement, the second braking engagement member 208 is shifted to a state in which it can rotate without receiving a rotational load.

Figure 67:
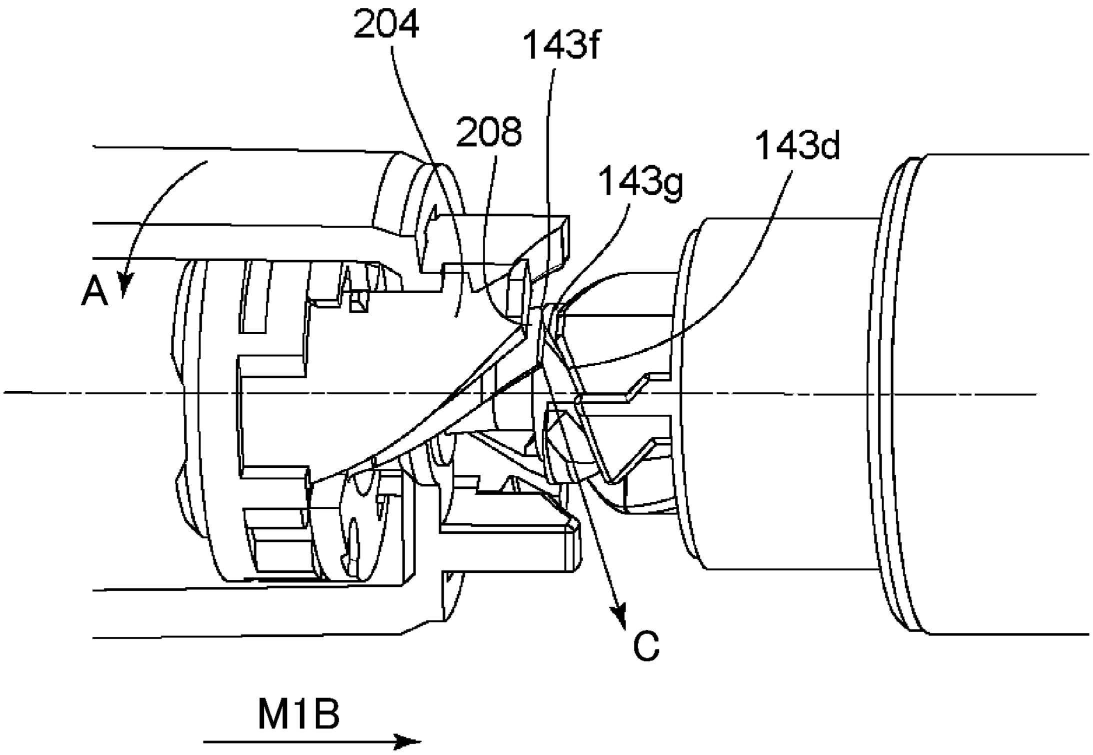
FIG. 67 is a perspective view of the drive transmission unit and the drum unit.
Figure 68:
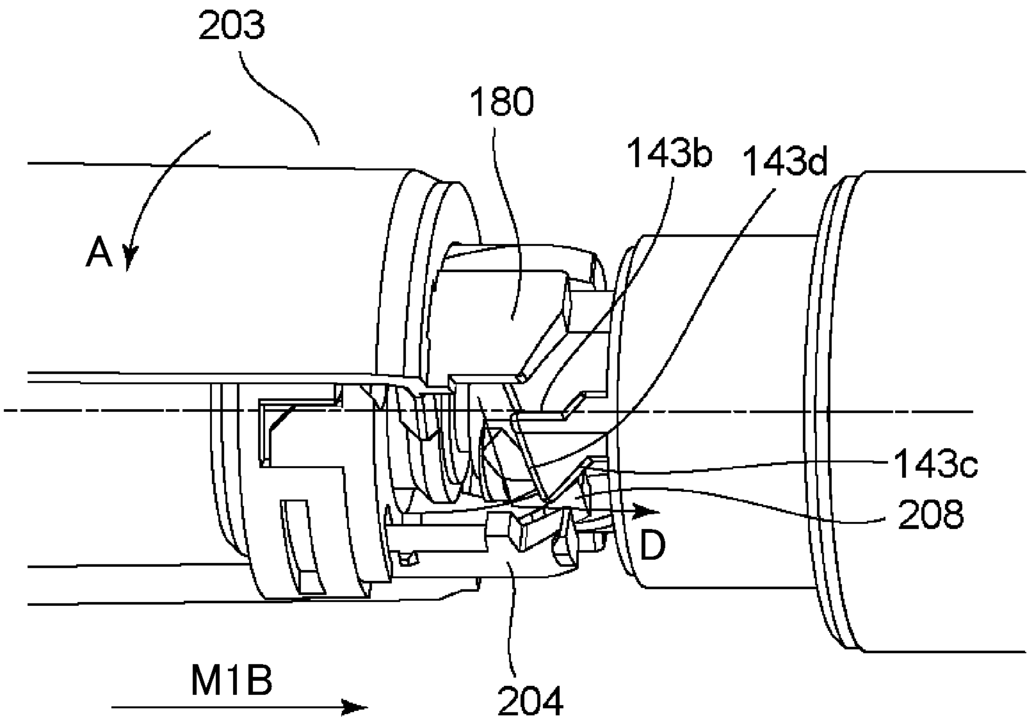
FIG. 68 is a perspective view of the drive transmission unit and the drum unit.

Subsequently, FIG. 67 shows a state in which the drive transmission unit 203 has started to rotate in the rotational direction A. FIG. 67 corresponds to part (c) of FIG. 49. The helical slope 143*d* of the drum coupling 143 moves the second braking engagement member 208 in the direction of arrow C from the point where the second braking engagement member 208 passes the inclination start portion 143*f*. FIG. 68 corresponds to part (d) of FIG. 49. In the state shown in FIG. 68, the first braking engagement member 204 moves along the helical slope 143*d* of the drum coupling 143, as in the state shown in part (d) of FIGS. 48 and 63. Further, the first braking engagement member 204 also moves in the M1B direction by the amount of the movement of the entire drive transmission unit 203 in the axial direction M1B direction. As a result, the first braking engagement member 204 moves along the trace of arrow D.

Then, as described above, the entire drive transmission unit 203 continues to rotate to complete the connection, resulting in the same state as in part (e) of FIG. 48.

Next, referring to part (a) of FIG. 50 to part (d) of FIG. 50, further pattern of the engagement process of the drum drive coupling 180 and the braking engagement member (204, 208) with the drum coupling 143 will be described. The drum coupling 143 includes two coupling portions 143*s* and 143*r*, but for the sake of simplicity, only the coupling portion 143*s* will be described.

As shown in part (a) of FIG. 50, a case where the phase of the inclination start portion 143*f* of the drum coupling 143 and the inward projection 208*e* of the second braking engagement member satisfy the following relationship will be described. That is, a case where the inclination start portion 143*f* of the drum coupling 143 is on the downstream side in the rotational direction (arrow A) will be described.

Figure 50:
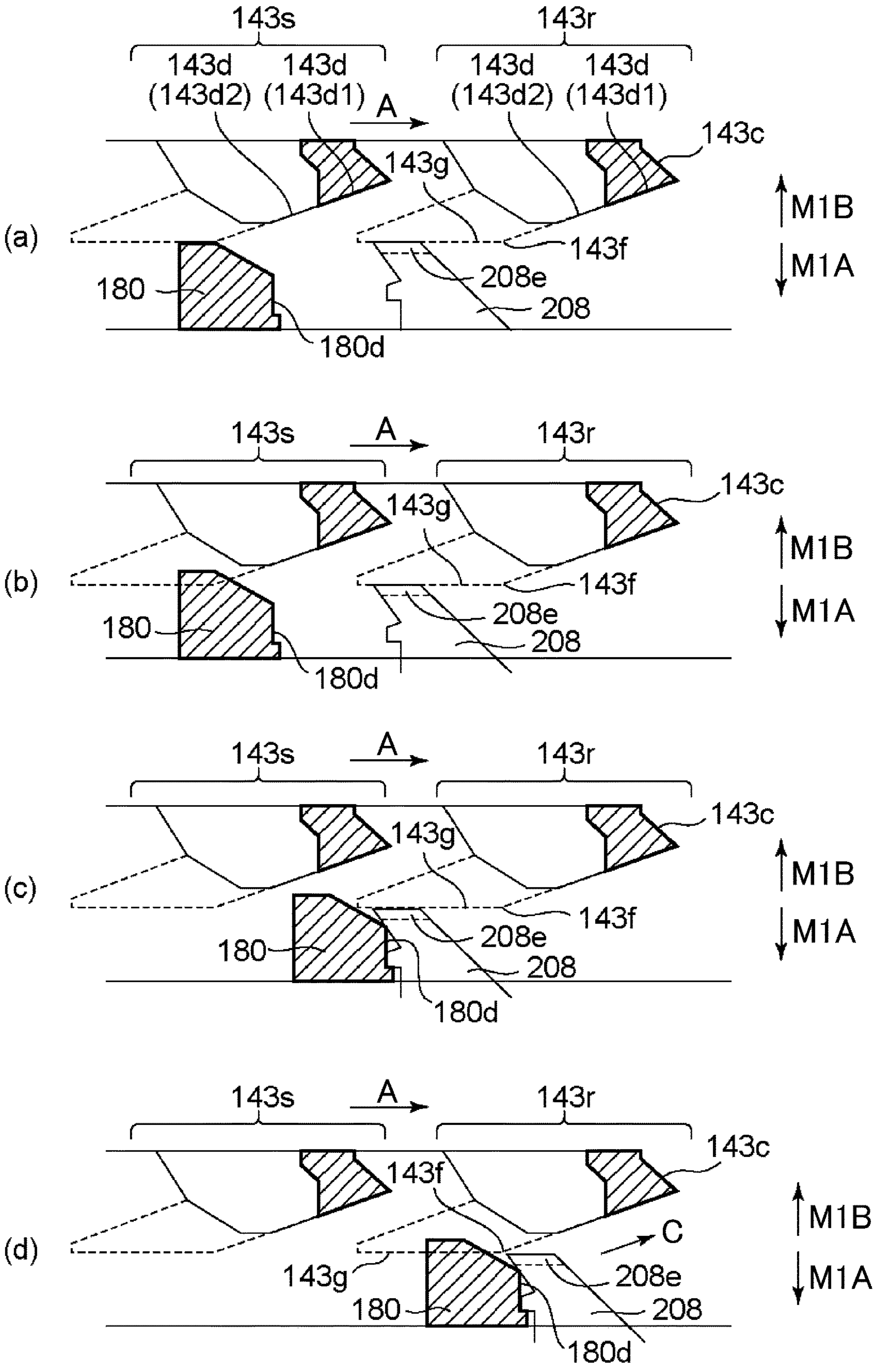
FIG. 50 is a developed view illustrating the engagement of the drum coupling.

Part (a) of FIG. 50 shows a state in which the drive transmission surface 180*d* of the drive transmission unit 203 and the second braking engagement member 208 are separated from each other.

Next, part (b) of FIG. 50 shows a state in which the visor portion 143*g* stops the advancement of the approaching second braking engagement member 208. Here, the drum drive coupling 180, which is a component of the drive transmission unit 203, does not contact the visor portion 143*g*, and therefore, the advancement cannot be stopped. By this, the second braking engagement member 208 moves relative to the drum drive coupling 180 in the M1A direction. As described above, by this relative movement, the second braking engagement member 208 is shifted to a state in which it can rotate without receiving a rotational load. Here, the visor portion 143*g* does not interfere with the shape of the drum drive coupling 180 because the position is different in the radial direction.

Then, part (c) of FIG. 50 shows a state in which the drive transmission unit 203 rotates in the rotational direction A and contacts the second braking engagement member. That is the state in which the second braking engagement member 208 does not start rotating by itself, so that it stops at that position, and the drum drive coupling 180 rotates and comes into contact with the second braking engagement member 208. Thereafter, by further rotation, the second braking engagement member 208 and the drum drive coupling 180 rotate integrally.

Part (d) of FIG. 50 shows a state in which the second braking engagement member 208 is further rotated and has passed the inclination start portion 143*f* of the drum coupling 143. In this state reached, the second braking engagement member 208 moves in the direction of arrow C as described referring to part (c) of FIG. 48. The operation after this is the same as described above, and therefore, the description is omitted.

Also in part (a) of FIG. 50 to part (d) of FIG. 50, only the second braking engagement member 208 of the braking engagement members (204, 208) is shown. However, as described above, also in the process of part (a) of FIG. 50 to part (d) of FIG. 50, the first braking engagement member 204 (see FIG. 43) moves integrally with the second braking engagement member 208.

Here, in order to help the recognition of the process described referring to part (a) of FIG. 50 to part (d) of FIG. 50, the description will be made again with reference to the perspective views of FIGS. 69 to 72. In FIGS. 69 to 72, a part of the drum drive coupling 180 is not shown for better illustration, and the internal shape is uncovered.

Figure 69:
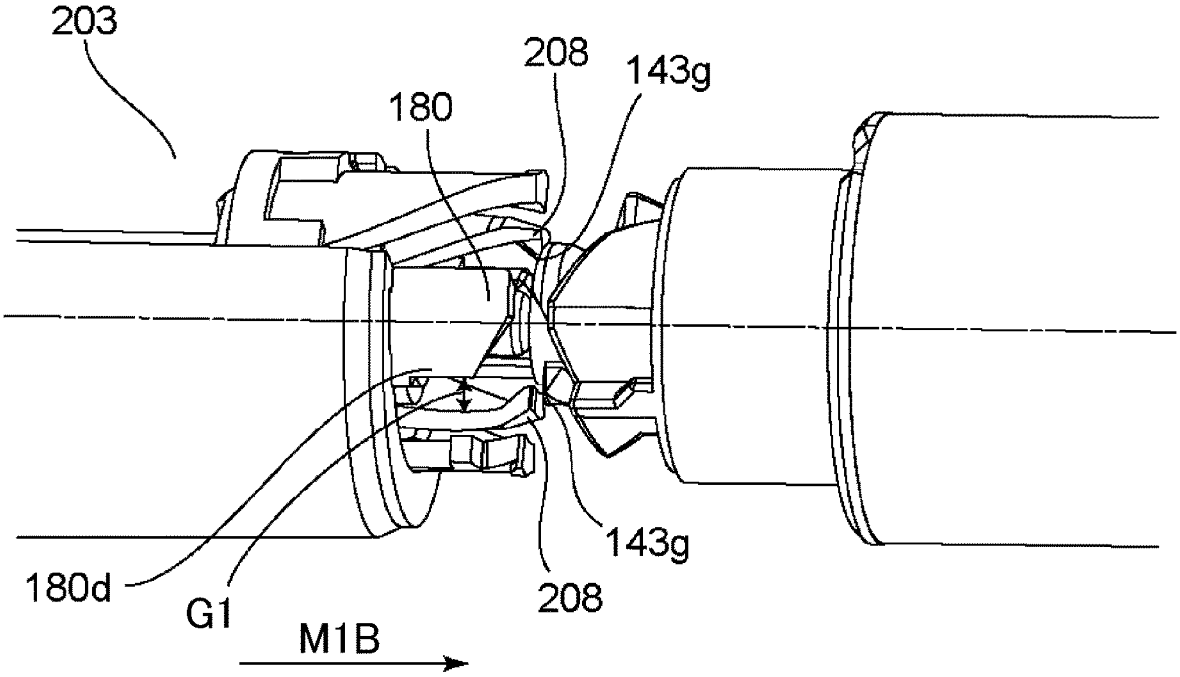
FIG. 69 is a perspective view of the drive transmission unit and the drum unit.

FIG. 69 corresponds to part (a) of FIG. 50, and shows a state in which the drive transmission surface 180*d* of the drive transmission unit 203 and the second braking engagement member 208 are separated by a gap G1.

Figure 70:
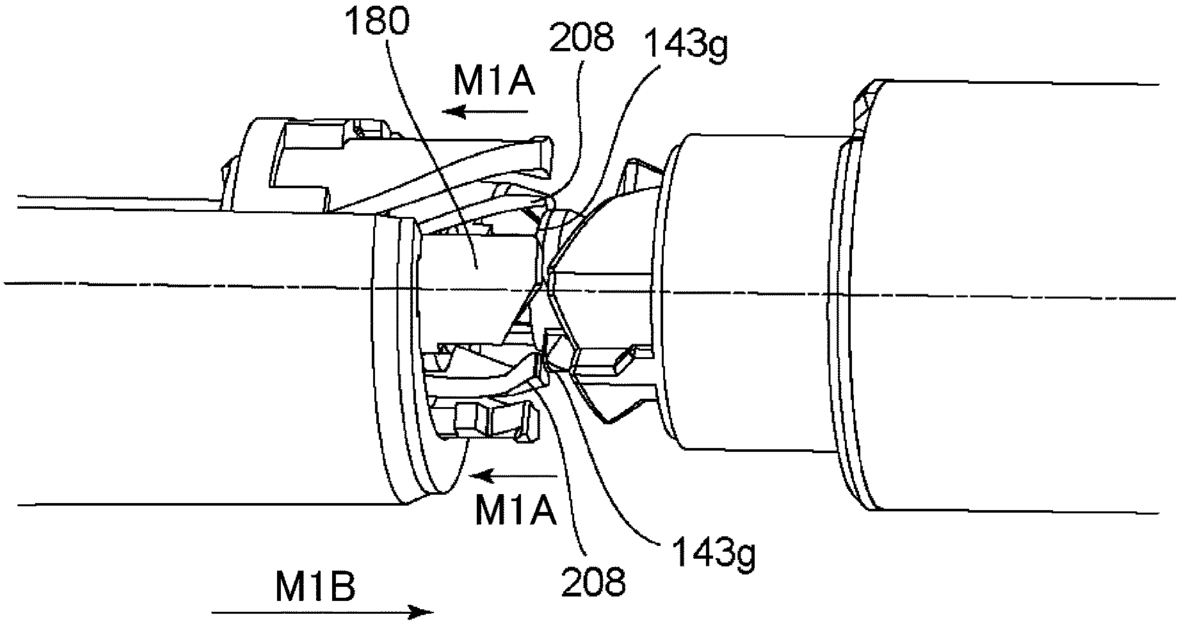
FIG. 70 is a perspective view of the drive transmission unit and the drum unit.

Next, FIG. 70 corresponds to part (b) of FIG. 50 and shows a state in which the entire drive transmission unit 203 has moved in the M1B direction. That is the state in which the visor portion 143*g* stops the advancement of the approaching second braking engagement member 208, and the drum drive coupling 180 has moved to the right side (M1B direction) in the axial direction beyond the second braking engagement member 208. At this time, the second braking engagement member 208 moves to the left side (M1A direction) relative to the drum drive coupling 180. As described above, by this relative movement, the second braking engagement member 208 is shifted to a state in which it can rotate without receiving a rotational load.

Figure 71:
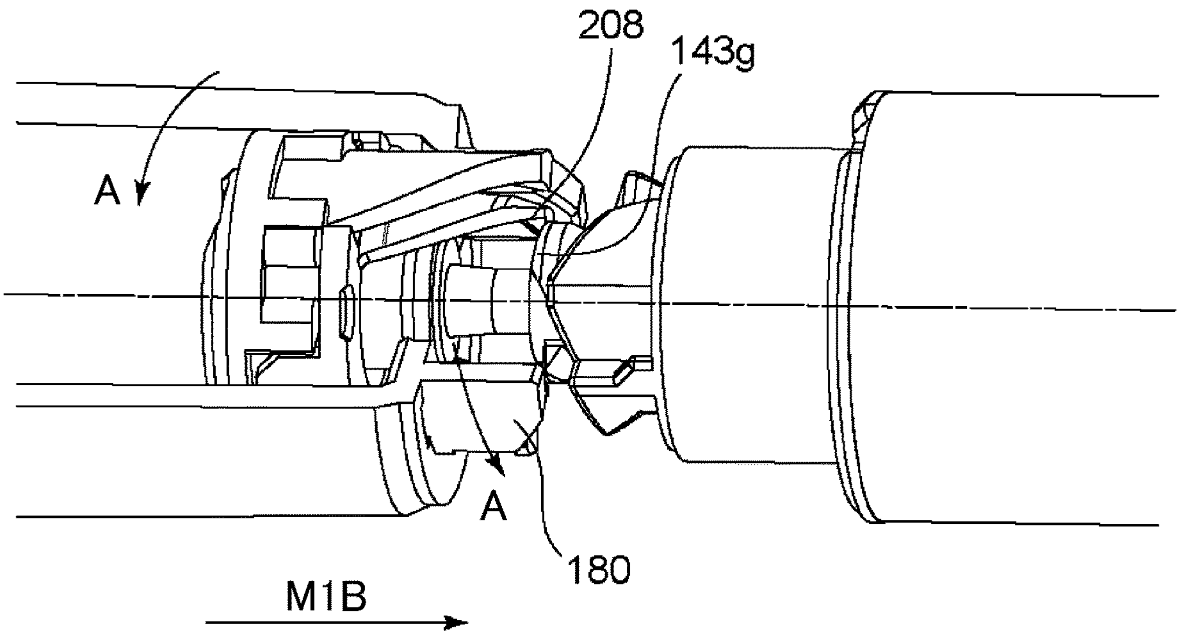
FIG. 71 is a perspective view of the drive transmission unit and the drum unit.

Then, FIG. 71 corresponds to part (c) of FIG. 50, and shows a state in which the drum drive coupling 180 of the drive transmission unit 203 is in contact with the second braking engagement member 208 by rotating in the rotational direction A.

Since the second braking engagement member 208 cannot rotate without receiving the rotational force from the drum drive coupling 180, the second braking engagement member 208 does not rotate immediately after the start of driving of the drive transmission unit 203 and remains at the initial position. That is, only the drum drive coupling 180 starts rotating in the A direction in advance. As a result, a state shown in FIG. 71 is reached in which the drum drive coupling 180 is in contact with the second braking engagement member 208.

Figure 72:
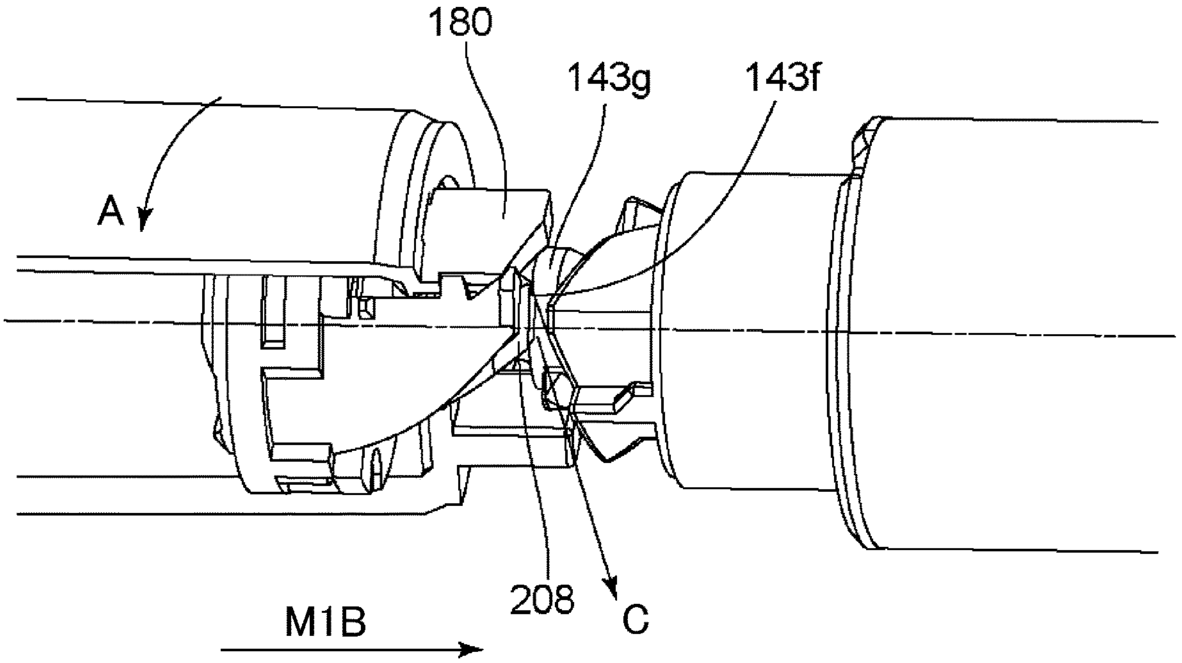
FIG. 72 is a perspective view of the drive transmission unit and the drum unit.

FIG. 72 corresponds to part (d) of FIG. 50, and shows a state in which by the engagement between the drum drive coupling 180 and the second braking engagement member 208, not only the drum drive coupling 180 but also the second braking engagement member 208 start to rotate in the direction A. More specifically, that is the state in which by the second braking engagement member 208 being pushed by the drum drive coupling 180 to rotate in the A direction, the second braking engagement member 208 passes the inclination start portion 143*f* of the drum coupling 143. In this state reached, the second braking engagement member 208 is guided by the slope 143*d* and moves in the direction along the slope 143*d* (direction of arrow C), as described in part (c) of FIG. 48 and FIG. 62.

Subsequent operations are the same as those described above referring to part (c) of FIG. 48 to part (e) of FIG. 48 and FIGS. 62 to 64, and therefore, the description thereof are omitted here.

As described above, when the cartridge 100 is mounted on the image forming apparatus main assembly, the phase (arrangement) of the drive transmission unit 203 with respect to the drum coupling 143 is not predetermined (part (a) of FIG. 48, FIG. 49 (*a*), part (a) of FIG. 50, FIG. 60, FIG. 65, FIG. 69). However, in any case, the drum coupling 143 can be connected to the drive transmission unit 203. The drive transmission unit 203 includes not only the drum drive coupling 180 but also the braking engagement members (204, 208), both of which the drum coupling 143 can be engaged with.

Figure 51:
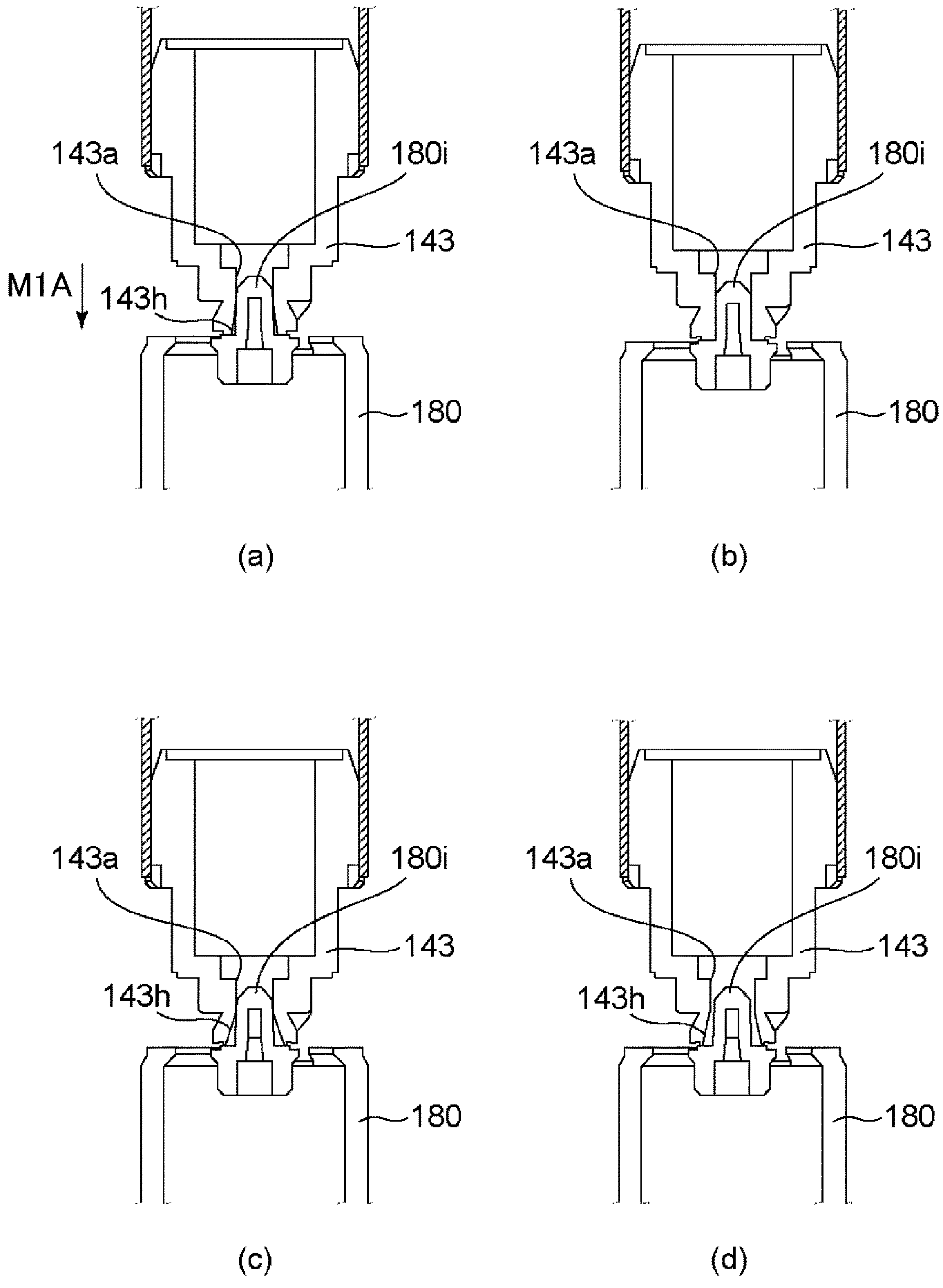
FIG. 51 is a sectional view illustrating the engagement of the drum coupling.

Next, referring to FIG. 51, the description will be made as to the structures for aligning the axes of the drive transmission unit 203 and the drum coupling 143, in the process of connecting them. FIG. 51 is a sectional view of the drive transmission unit 203 and the drum coupling 143, and part (a) of FIG. 51 shows the shapes in the connected state in this embodiment. The circular hole portion 143*a* of the drum coupling engages with the positioning boss 180*i* of the drum drive coupling 180 to align the axes with each other. Further, a conical guide surface 143*h* is provided at one end of the circular hole portion 143*a*. That is, the guide surface 143*h* has a conical shape as a part of the inner surface of the coupling 143. The guide surface 143*h* is provided so that when the drive transmission unit 203 is still separated in the axial direction M1B direction, the deviations from each other are eliminated upon starting engagement to align the axes with each other.

In addition to this embodiment, the circular hole portion 143*a* of the drum coupling 143 may be engaged with the positioning boss 180*i* without providing a guide surface, as shown in part (b) of FIG. 51. Further, as shown in part (c) of FIG. 6, the guide surface 143*h* can be enlarged to reduce the fitting between the circular hole portion 143*a* and the positioning boss 180*i*. Further, as shown in part (d) of FIG. 51, the diameter of the circular hole portion 143*a* can be increased. These arrangements can be selected depending on how to determine the relative position between the drive transmission unit 203 and the process cartridge 100 and the accuracy.

Figure 95:
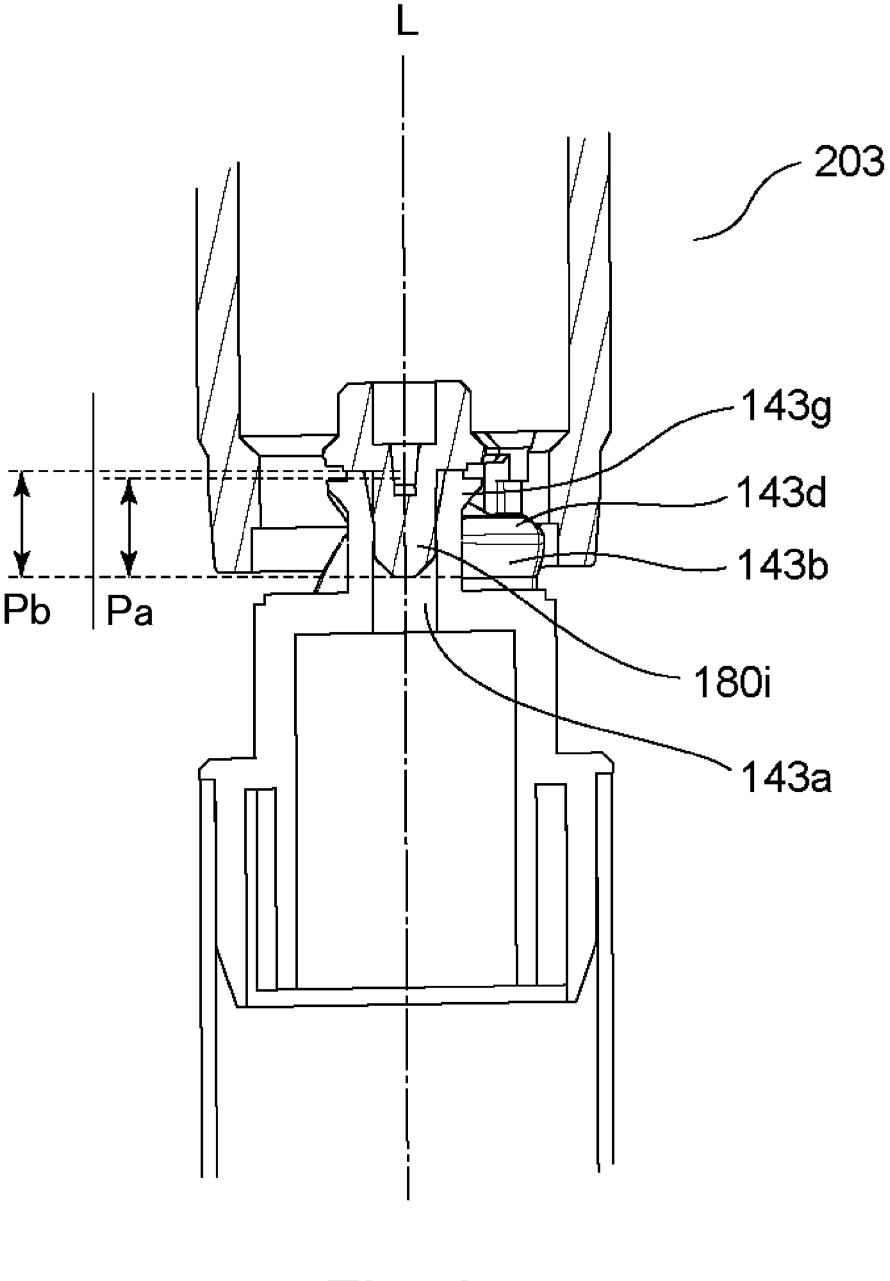
FIG. 95 is a sectional view of the drum unit.

It is desirable that the circular hole portion 143*a* has a sufficient length to accommodate the positioning boss 180*i*. That is, as shown in FIG. 95, the positioning boss 180*i* enters at least the range of the region Pb on the axis L of the drum unit. The circular hole portion 143*a* is formed so as to include the entire region Pb. That is, the periphery of the axis L is open in the region Pb.

In FIG. 95, in this embodiment, on the axis L, the range occupied by the braking force receiving portion 143*c*, the helical slope (top surface) 143*d*, the visor portion 143*g*, and the driving force receiving portion 143*b* (not shown) is Pa which is included inside the region Pb.

The structure is such that projection area Pa when the braking force receiving portion 143*c*, the slope 143*d*, the visor portion 143*g*, and the driving force receiving portion 143*b* are projected onto the axis L at least partially overlap the projection region Pb of the circular hole portion 143*a*.

As described above, according to this embodiment, the coupling 143 of the cartridge receives the driving force from the drive transmission unit 203 of the image forming apparatus main assembly. Further, the coupling 143 operates the brake mechanism (brake member 206) inside the drive transmission unit 203 in accordance with receiving the driving force from the drive transmission unit 203. The drum coupling 143 can receive the braking force by way of the braking engagement member (204, 208).

With this brake mechanism, the load required to drive the cartridge can be set in an appropriate range. As a result, the cartridge 100 can be driven stably.

It is also possible to use the drum coupling 104 and the drive transmission unit 203 of this embodiment to rotate members other than the photosensitive drum 104, such as a developing roller and a toner feeding roller. However, the drum coupling 104 and the drive transmission unit 203 of this embodiment are particularly suitable for rotation of the photosensitive drum 104, for the following reasons.

While the cartridge 100 of this embodiment includes the photosensitive drum 104, it is not provided with a cleaning means contacting the photosensitive drum 104. Therefore, the torque of the photosensitive drum 104 is relatively small, and the speed of the photosensitive drum 104 tends to fluctuate when it is affected by the surroundings during rotational driving thereof. For this reason, the drive transmission unit 203 rotates the photosensitive drum 104 with a constant load applied to the drum 104. That is, the coupling 143 not only receives the driving force for rotating the photosensitive drum, but also receives the braking force for suppressing the rotation of the photosensitive drum from the drive transmission unit 203. By simultaneously receiving two forces acting on the coupling in different rotational directions, the speed fluctuation of the photosensitive drum 104 (drum unit 103) is suppressed, and the rotation is stabilized.

The driving force can be inputted from the drive transmission unit 203 of this embodiment to the cartridge provided with the cleaning means by way of the coupling 143. When the cartridge 100 is provided with a cleaning means (, for example, a cleaning blade) which contacts the surface of the photosensitive drum to remove toner from the photosensitive drum, a frictional force is produced between the photosensitive drum and the cleaning means. This frictional force increases the torque required to rotate the photosensitive drum 104. However, even so, the torque required to rotate the photosensitive drum 104 may not be sufficiently large. At this time, as in this embodiment, if the coupling 143 can receive the driving force and the braking force from the drive transmission unit 203 at the same time, the torque required to rotate the photosensitive drum 104 increases, and therefore, the rotation of the photosensitive drum is stabilized. A cartridge provided with a cleaning means will be described in Embodiment 2 described hereinafter.

In this embodiment, the brake mechanism for applying an appropriate rotational load to the photosensitive drum is arranged not on the cartridge side but on the main assembly side of the image forming apparatus, more particularly, in the drive transmission unit 203. Therefore, it is not necessary to provide the brake mechanism on the process cartridge which is the object (dismountably mountable unit) to be replaced after use. It can contribute to the downsizing and cost reduction of the process cartridge.

Further, the coupling 143 has such a shape that it can smoothly engage with both the driving force applying member (drum drive coupling 180) and the braking force applying member (braking engagement member (204, 208)) provided in the drive transmission unit 203. For example, the coupling 143 is provided with a helical slope 143*d* (inclined portion, guide, upper surface, upper portion) and a visor portion 143*f*, so that it can be easily connected to the drive transmission unit 203 smoothly.

Hereinafter, the shape of the coupling 143 of this embodiment will be described in detail again referring to FIG. 79.

The coupling 143 includes two coupling portions 143*s* and 143*r*, and each coupling portion includes an engaging portion 143*i* and a guide forming portion 143*j*. The engaging portion 143*i* is a shaped portion for engaging with the driving force applying member (drum drive coupling 180) or the braking force applying member (braking engagement member (204, 208)). The engaging portion 143*i* forms a driving force receiving portion 143*b*, a braking force receiving portion 143*c*, and a downstream slope 143*d*1.

The driving force receiving portion 143*b* and the braking force receiving portion 143*c* engage with the drum drive coupling 180 and the brake members (204, 208), respectively. The driving force receiving portion (first side surface, first side portion) 143*b* and the braking force receiving portion (second side surface, second side portion) 143*c* are formed in a planar shape, but they are not limited to such a structure. They may be a curved surface-shaped portion or a portion having a small area, as long as they can receive a driving force and a braking force, respectively. For example, the edge (ridge line) formed by the engaging portion 143*i* may form the driving force receiving portion (first side surface, first side portion) 143*b* or the braking force receiving portion (second side surface, second side portion) 143*c*.

Alternatively, the driving force receiving portion 143*b* and the braking force receiving portion 143*c* may be a portion formed by a plurality of separate regions. That is, the engaging portion 143*i* may be a set of a plurality of shaped portions.

The driving force receiving portion 143*b* and the braking force receiving portion 143*c* are an upstream side portion and a downstream side portion of the engaging portion 143*i*, respectively. That is, the driving force receiving portion 143*b* is a side portion directed upstream in the rotational direction, and the braking force receiving portion 143*c* is a side portion directed downstream in the rotational direction.

Further, the guide forming portion 143*n* is a projection (extending portion) extending in the rotational direction toward the engaging portion 143*i*. The top surface (upper part) of the guide forming portion 143*n* is an upstream side slope (upstream side top surface, upstream side inclined portion) 143*d*2. The upstream slope 143*d*2 is a guide (upstream guide, upstream guide) and an inclined portion for guiding the braking force applying member (braking engagement member (204, 208)) toward the engaging portion 143*i*.

That is, the guide forming portion 143*n* is a projection for forming the upstream side slope 143*d*2 which is a guide (upstream side guide).

The guide forming portion 143*n* is adjacent to the engaging portion 143*i* and extends from the upstream to the downstream in the rotational direction toward the engaging portion 143*i*. Further, the upstream slope 143*d*2 of the guide forming portion 143*n* is inclined so as to approach the non-driving end of the photosensitive drum from the upstream to the downstream in the rotational direction (see FIG. 80).

In FIG. 80, the drum coupling 143 is placed in the neighborhood of the first end portion (driving side end portion) 104*a* of the photosensitive drum 104. That is, the first end portion 104*a* of the photosensitive drum 104 is the end portion on the side for receiving the driving force from the drum coupling 143.

The end on the opposite side of the photosensitive drum 104 with respect to the first end portion 104*a* is the non-driving side end (second end) 104*b*. The distances from the non-driving side end portion 104*b* to the upstream side slope 143*d*2 are indicated by D1 and D2. The distance D1 is a distance measured from the non-driving side end portion 104*b* of the photosensitive drum to the downstream end of the slope 143*d*2 along the axial direction parallel to the axis L. The distance D2 is a distance measured along the axial direction from the non-driving side end portion 104*b* of the photosensitive drum to the upstream side end portion of the upstream side slope 143*d*2.

Here, the distance D1 is shorter than the distance D2. That is, when the distance from the non-driving end portion 104*b* of the photosensitive drum to the upstream slope 143*d*2 is measured along the axial direction, the distance becomes shorter toward the downstream in the rotational direction.

That is, the upstream side slope 143*d*2 is inclined so as to approach the non-driving side end portion 104*b* of the photosensitive drum toward the downstream side in the rotational direction A. Not only the upstream slope 143*d*2 but also the downstream slope 143*d*1 is inclined in the same direction.

The distances D1 and D2 can also be regarded as the distances measured along the axial direction from the non-driving side end of the cartridge casing (that is, the non-driving side cartridge cover 117: see FIG. 14) to the upstream slope 143*d*2.

One of the guide forming portion 143*n* and the engaging portion 143*i* may be referred to as a first shape portion, and the other may be referred to as a second shape portion or the like.

In this embodiment, the first shape portion and the second shape portion (that is, the guide forming portion 143*n* and the engaging portion 143*i*) are adjacent to each other and are connected to each other. More specifically, the downstream side of the guide forming portion 143*n* in the rotational direction is connected to the engaging portion 143*i*. However, although the engaging portion 143*i* and the guide forming portion 143*n* are adjacent to each other, they may not be connected with a gap provided therebetween.

Further, in this embodiment, the top surface (downstream side slope) 143*d*1 of the engaging portion 143*i* is smoothly connected to the top surface (upstream side slope) 143*d*2 of the guide forming portion 143*n* to provide a one slope (top surface) 143*d*.

That is, the top surface (downstream side slope) 143*d*2 of the engaging portion 143*i* is a part of the guides having a function of guiding the braking engagement member (204, 208) to a position where it can engage with the braking force receiving portion 143*c*, similarly to the upstream side slope 143*d*1.

Figure 81:
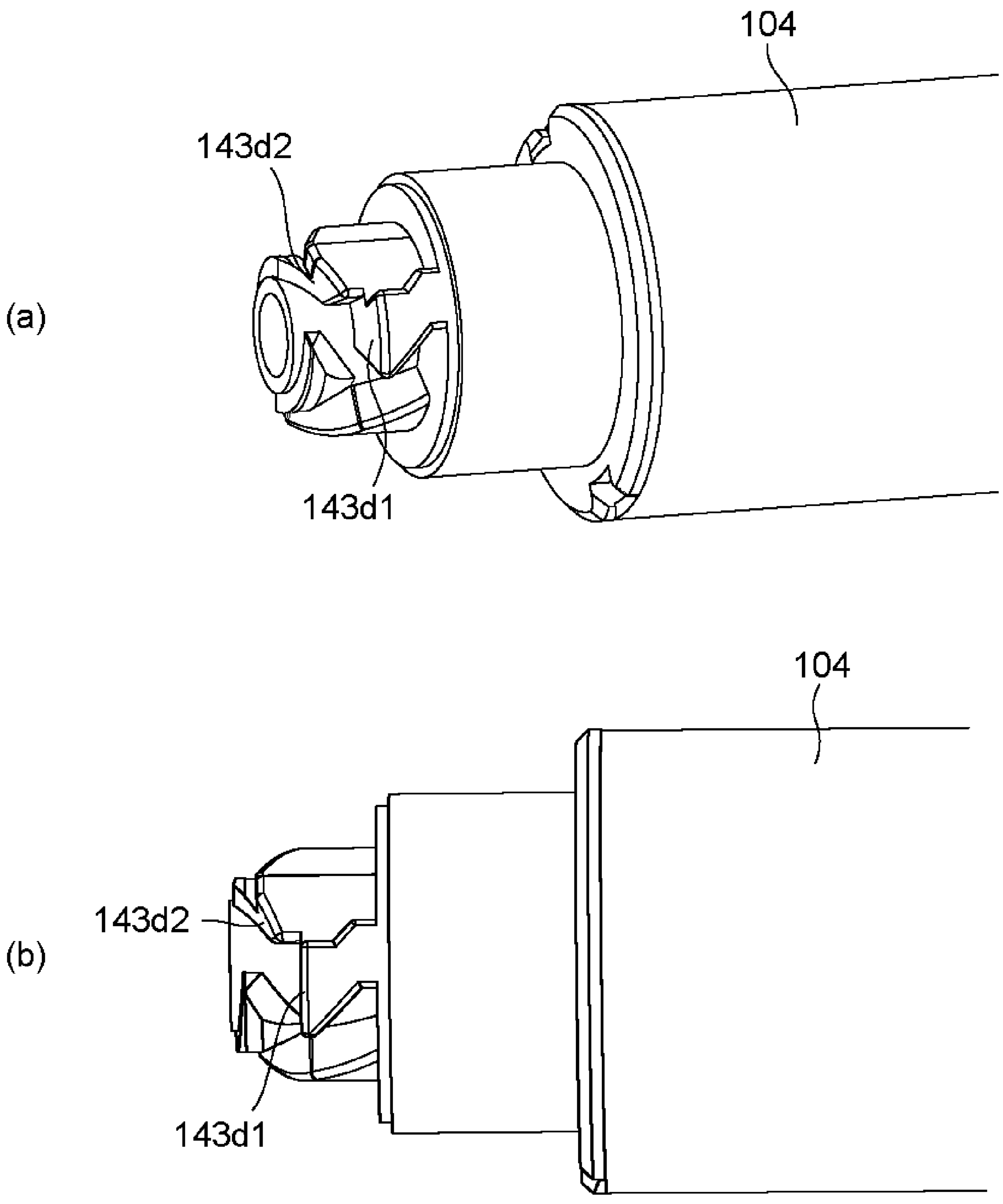
FIG. 81 is a side view and a perspective view of the coupling.

The downstream slope (downstream top surface) 143*d*2 does not necessarily have to be continuous with the upstream slope (upstream top surface) 143*d*1. Examples of the non-continuous form of the upstream slope 143*d*2 and the downstream slope 143*d*1 are as shown in part (a) of FIG. 81 and part (b) of FIG. 81. In part (a) of FIG. 81 and part (b) of FIG. 81, a modified example is shown in which the upstream slope 143*d*2 and the downstream slope 143*d*1 are provided with a step, and are separated in the axial direction, and the downstream slope 143*d*1 is changed to a flat surface. As described above, a part of the helical slope 143*d* which is a guide may be flat or may have a step.

As shown in part (c) of FIG. 48, part (c) of FIG. 49, part (d) of FIG. 50, FIG. 62, FIG. 67, and FIG. 72, the braking engagement members (204, 208) are brought into contact with the slope 143*d* to be guided in the direction of arrow C along the inclination direction of the slope 143. That is, the braking engagement member (204, 208) moves in the direction downstream in the rotational direction toward the non-driving side of the photosensitive drum (M1B direction).

After being guided by the slope 143*d*, the braking engagement member (204, 208) is further advanced in the axial direction (M1B) toward the space placed downstream of the braking force receiving portion (second side surface) 143*c* of the drum coupling 143 (See part (d) of FIG. 48, part (d) of FIG. 49, FIG. 63, FIG. 68). As a result, the braking engagement members (204, 208) are enabled to engage with the braking force receiving portion 143*c*.

The braking engagement member (204, 208) being guided by the slope 143*d*, the braking engagement member (204, 208) moves to the downstream side in the rotational direction A so as to be away from the drum drive coupling 180. As a result, the gap is produced between the drum drive coupling 180 and the braking engagement members (204, 208). The engaging portion 143*i* of the drum coupling 143 enters the gap, so that the driving force receiving portion (side surface) 143*b* is enabled to engage with the drum drive coupling 180 (see part (d) of FIG. 48, part (e) of FIG. 48, part (d) of FIG. 49, FIG. 63, FIG. 64, FIG. 68).

The helical slope 143*d* also has a function of keeping the braking engagement members (204, 208) away from the drum drive coupling 180 so that the drum drive coupling 180 and the drive force receiving portion 143*b* can engage with each other.

Figure 56:
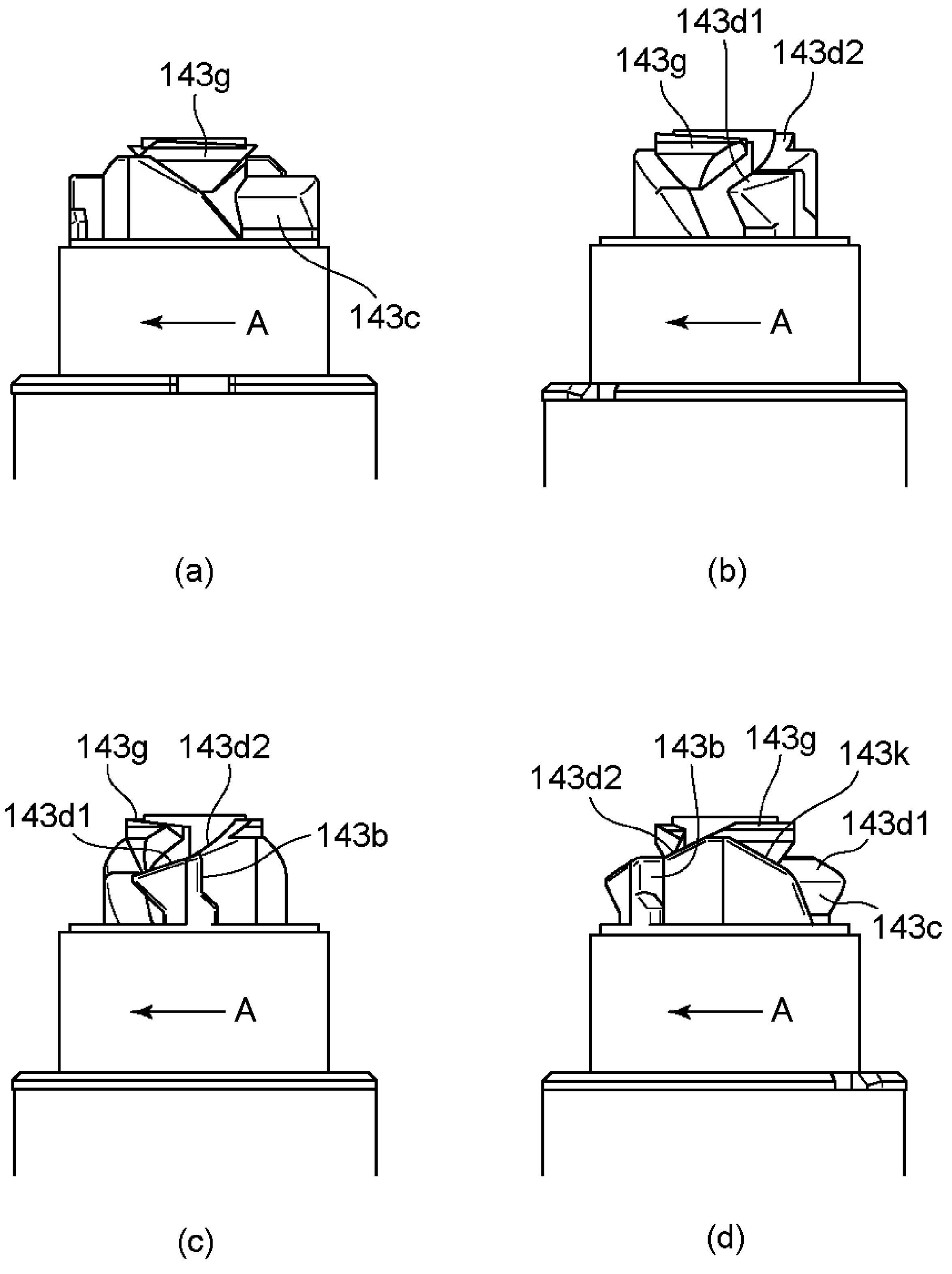
FIG. 56 is an illustration of a drum unit showing a drum coupling.

The helical slope (top surface) 143*d* has not only the portion (downstream side guide, downstream guide, downstream side top surface, downstream side inclined portion) 143*d*1 arranged between the braking force receiving portion 143*c* and the driving force receiving portion 143*b* but also has the portion (upstream guide, upstream top surface, upstream inclined portion) 143*d*2 on the upstream side of the driving force receiving portion 143*b* (see part (a) of FIG. 48, FIG. 47, FIG. 56, and so on). By enlarging the area where the slope 143*d* is provided, the top surface 143*d* can reliably guide the braking engagement members (204, 208).

That is, even when the braking engagement member (204, 208) is placed on the upstream side of the driving force receiving portion 143*b* (see part (a) of FIG. 49) the braking engagement members (204, 208) can be moved to the space on the downstream side of the braking force receiving portion 143*c* (see part (c) of FIGS. 49 and 49(*d*)), by passing the upstream slope 143*d*2.

In this embodiment, the entire slope 143*d* is the inclined portion. The downstream top surface 143*d*1 and the upstream side top surface 143*d*2 are both descending slopes which descend toward the downstream in the rotational direction.

However, it is also possible to incline only a part of the slope 143*d* which is the top surface. For example A structure is also conceivable (see part (a) of FIG. 81 and part (b) of FIG. 81) in which, the upstream side of the top surface is inclined as the upstream side slope 143*d*2, as described above, whereas the downstream side of the top surface (downstream side top surface 143*d*2) is not inclined and is a surface perpendicular to the axis of the drum unit. In the modified example of the drum coupling shown in part (a) of FIG. 81 and part (b) of FIG. 81, the braking engagement member (204, 208) is vigorously moved by the inclination of the upstream slope (upstream top surface) 143*d*2, and by utilizing the inertia (momentum) of the movement, it passes the flat downstream top surface 143*d*1.

Further, as a guide for guiding the braking engagement members (204, 208), it is conceivable that only the upstream side top surface (upstream side slope 143*d*2) is used and the downstream side top surface (downstream side slope 143*d*1) is not used. That is, it is conceivable that there is almost no portion corresponding to the downstream top surface, or that the portion is very short as compared with the upstream top surface. Such a structure will be described hereinafter referring to FIG. 74.

It is also conceivable that there is provided a partial ascending portion in the downhill helical slope 143*d*. Even in such a case, if the braking engagement member (204, 208) can be sufficiently guided downstream in the rotational direction by the slope 143*d*, the slope 143*d* can be deemed as a downhill slope. That is, even if the slope is partially ascending, the helical slope 143*d* can be regarded as a descending slope as a whole. In other words, the distance from the non-driving end of the cartridge to the helical slope 143*d* can be considered as decreasing as the helical slope 143*d* moves downstream in the rotational direction.

As an example of such, a structure is conceivable in which the ascending portion partially provided in the helical slope 143*d* is sufficiently shorter than the other descending portions, or the ascending slope is less steep, and therefore, the ascending portion has a small influence on the descending portion.

Further, there is a case in which the helical slope 143*d* has a curved surface shape or is divided into a plurality of sections. Furthermore, there is a case in which the width of at least a part of the slope 143*d* is so small that the helical slope 143*d* may be regarded as a ridge line (edge) rather than a surface. The helical slope 143*d* has had a sector shape (helical shape) as the drum coupling 143 is viewed from the front side. However, the shape of the guide (top surface, inclined portion) to be provided on the drum coupling 143 is not limited to such a shape. For example, instead of using a sector-shaped (helical) slope 143*d*, a linearly extending rectangular slope may be used. That is, as the inclined portion (guide, top surface) corresponding to the helical slope 143*d*, it is possible to use a structure having a changed shape, size, extending direction, and the like. Some of such examples will be described hereinafter referring to FIG. 54 and so on.

The upstream slope (upstream top surface) 143*d*2 is structured to have a region narrower than the downstream slope (downstream top surface) 143*d*1 (see FIGS. 47 and 56). Conversely, the downstream slope 143*d*1 has a region wider than the upstream slope 143*d*2.

Figure 79:
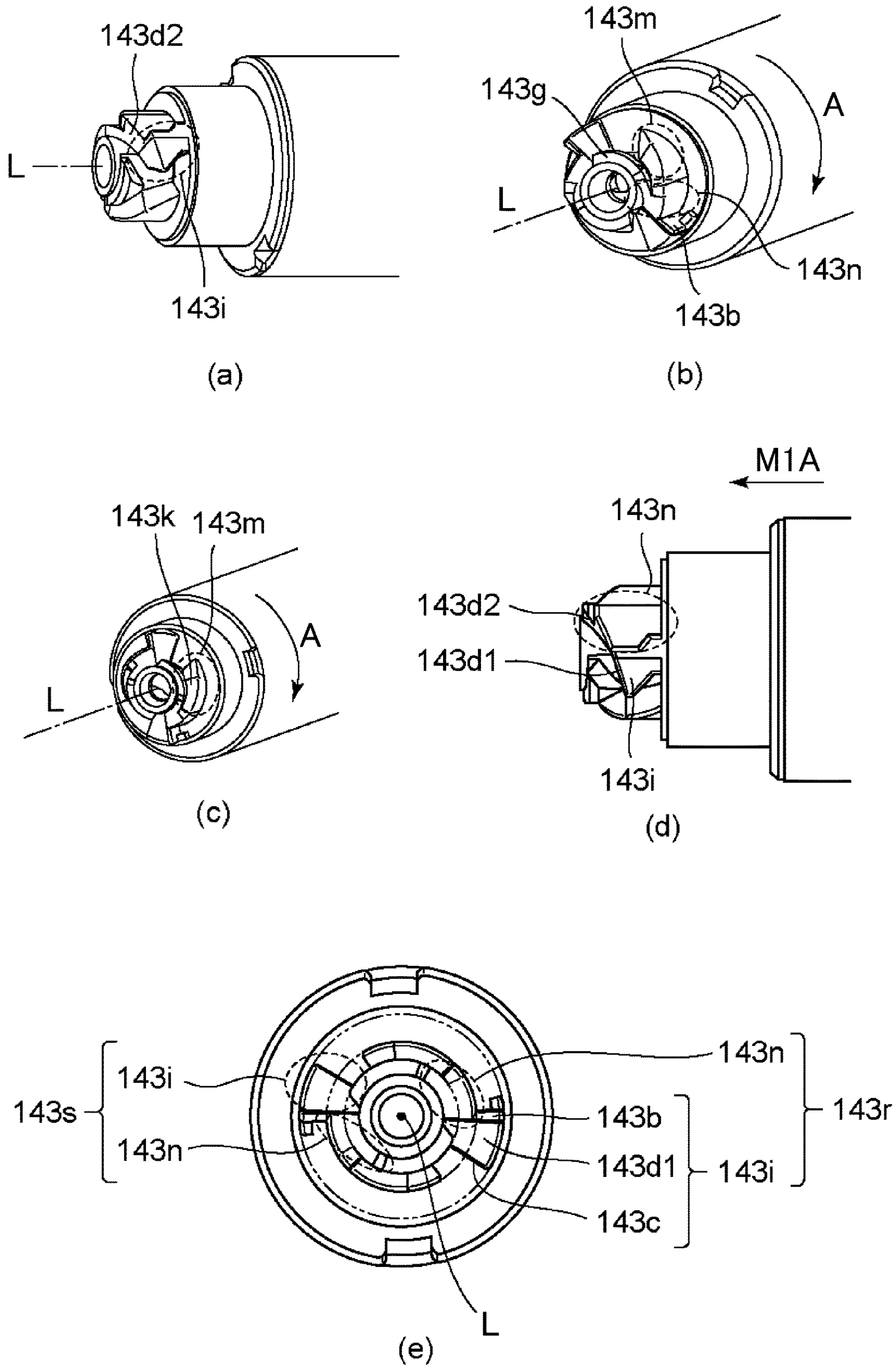
FIG. 79 is a side view, a perspective view, and a front view of the coupling.

Here, the width of each slope is a length measured along the radial direction. Further, as shown in FIG. 79, at least a part of the engaging portion 143*i* is placed more remote than the guide forming portion 143*n* with respect to the axis L of the drum unit in the radial direction of the drum unit. In other words, at least a part of the engaging portion 143*i* is placed radially outside the guide forming portion 143*n*.

The reason for such a dimensional relationship and such an arrangement relationship is that the driving force receiving portion 143*b* of the engaging portion 143*i* is disposed near the boundary between the guide forming portion 143*n* and the engaging portion 143*i*. That is, a part of the engaging portion 143*i* overhangs outward in the radial direction from the guide forming portion 143*n* so that the driving force receiving portion 143*b* is formed. By this, the width of the downstream portion 143*d*1 of the slope (top surface) 143*d* is larger than that of the upstream portion 143*d*2.

The driving force receiving portion 143*b* has a region placed radially outside (a position far from the axis L) with respect to the upstream slope 143*d*2. Further, in the axial direction of the drum unit, the driving force receiving portion 143*b* is disposed closer to the non-driving side end portion of the photosensitive drum than the upstream side slope 143*d*2. In FIG. 80, a state is shown in which the distance D3 measured along the axial direction from the non-driving side end portion 104*b* of the photosensitive drum to the driving force receiving portion 143*b* is shorter than the distance D1 measured along the same direction to the upstream top surface 143*d*2 from the non-driving side end portion 104*b* of the photosensitive drum.

Conversely, at least a part of the upstream slope 143*d*2 is placed at a distance from the driving force receiving portion 143*b* than the non-driving side end portion 104*b* of the photosensitive drum in the axial direction. The upstream slope 143*d*2 is a free end portion placed closer to the free end of the drum coupling 143 than the driving force receiving portion 143*b*.

The distances D1 and D3 can be regarded as being the distances measured from the non-driving side end of the cartridge (that is, the non-driving side cartridge cover 117: see FIG. 14) to the upstream slope 143*d*2 and the driving force receiving portion 143*b*, in the axial direction.

The visor portion 143*d* is a block portion (stopper) which suppresses (blocks) the movement of the braking engagement member (204, 208) in the axial direction. That is, the visor portion 143*d* blocks the braking engagement member (204, 208) from approaching the drum coupling 143 and entering the region where it cannot engage with the braking force receiving portion 143*c*. FIG. 66, part (b) of FIG. 49, FIG. 69, part (a) of FIG. 50 show the blocked state.

In this embodiment, the visor portion (block portion) 143*d* is further upstream in the rotational direction than the upstream slope 143*d*2, and the visor portion 143*d* is continuous with the top surface (upstream slope 143*d*2) of the guide forming portion 143*n* (See part (d) of FIG. 56).

When the braking engagement member (204, 208) enters the space upstream of the driving force receiving portion 143*b* or the space downstream of the braking force receiving portion 143*c* together with the drum drive coupling 180, the braking engagement member (204, 208) 208) cannot engage with the braking force receiving portion 143*c*. The visor portion 143g blocks the movement of the braking engagement members (204, 208) so as to prevent the occurrence of such a state.

In this embodiment, as the drum unit is viewed from the driving side along the axial direction (see part (a) of FIG. 47), the visor portion 143g of the first coupling portion 143*s* is disposed such that it covers the space upstream of the drive force receiving portion 143*b*. Further, the visor portion 143g is provided so as to cover the space downstream of the braking force receiving portion 143*c*.

Further, the visor portion 143*d* has a width sufficient to cover at least a part of the downstream side portion (downstream side slope 143*d*1) of the helical slope (top surface) 143*d*. By this, the visor portion 143*d* constrains the braking engagement member (204, 208) from non-preferably entering the space on the upstream side of the driving force receiving portion 143*b* and the space downstream of the braking force receiving portion 143*c* together with the drum drive coupling 180.

On the other hand, the visor portion 143g is disposed so as to permit the braking engagement member (204, 208) to enter the space on the downstream side of the braking force receiving portion independently of the drum drive coupling 180 (See part (d) of FIG. 50, part (c) of FIG. 49, part (c) of FIG. 48).

That is, the braking engagement member (204, 208) contacts the upstream slope 143*d*2 after passing the visor portion 143*g*, and is guided along the slope 143*d* toward the space on the downstream side of the braking force receiving portion 143*c* (See part (c) of FIG. 49 and part (d) of FIG. 50).

That is, when the braking engagement member (204, 208) is enabled to contact u portion (upstream side top surface) 143*d*2 of the slope (top surface) 143*d*, the visor portion 143*g* releases the braking engagement member (204, 208) from the blocked state.

The visor portion 143*g* is adjacent to the upstream slope 143*d*2 and is upstream of the upstream slope 143*d*2. In this embodiment, the top surface of the visor portion 143*g* and the upstream slope 143*d*2 are continuous, but there may be a case in which the visor portion 143*g* and the upstream slope 143*d*2 are adjacent to each other and a gap is formed between them.

Further, the top surface of the visor portion 143*g* has a plane perpendicular to the axis L of the drum unit, but the shape is not limited to this example. For example, it is conceivable that the top surface of the visor portion 143*g* is inclined in the same direction as with the upstream slope 143*d*2. In such case, it can be considered that the visor portion 143*g* forms a part of the upstream slope 143*d*2. Alternatively, it can be considered that a part of the guide forming portion 143*n* forms the visor portion 143*g*.

Further, in this embodiment, the coupling 143 comprises two of the helical slopes 143*d*, two of the visor portions 143*g*, two of the driving force receiving portions 143*b*, and two of the braking force receiving portions 143*c*. That is, the coupling 143 has a shape symmetrical with respect to its axis, and comprises two coupling portions 143*s* and 143*r* (see FIG. 58). The coupling portion 143*s* and the coupling portion 143*r* each have the helical slope (inclined portion) 143*d* or the like as the top surfaces. Then, the braking engagement member (204, 208) and the drum driving member 180 engage with the coupling portion 143*s* and the coupling portion 143*r* as shown in part (a) of FIG. 76.

An example (modified example) of another shape of the coupling 143 will be described hereinafter.

The drive transmission unit 203 includes the first braking engagement member 204 and the second brake engagement member 208 as the braking force applying members (braking engagement members) which apply a braking force for imparting a load to the rotation of the photosensitive drum to the coupling 143. There is a gap between the first braking engagement member and the second braking engagement member 208, and the second braking engagement member provided radially inward is flexible slightly to move outward so as to approach to the first braking engagement member 204. When the coupling and the drive transmission unit 203 are disengaged from each other, the second braking engagement member 208 can smoothly break the engagement with the coupling 143 by the flexing of the second braking engagement member 208. For example, the second braking engagement member 208 can move over the visor portion 143*g* by flexing and can be separated from the coupling 143.

Various Modifications of Coupling and Cartridge Shown in Embodiment 1

Modified examples (modified shape) in which the drum coupling 143 of the Embodiment 1 described above is partially modified will be described. Even when the above-described the visor portion 143*g* is not provided on the drum coupling 143, it can function properly, depending on the conditions.

Figure 52:
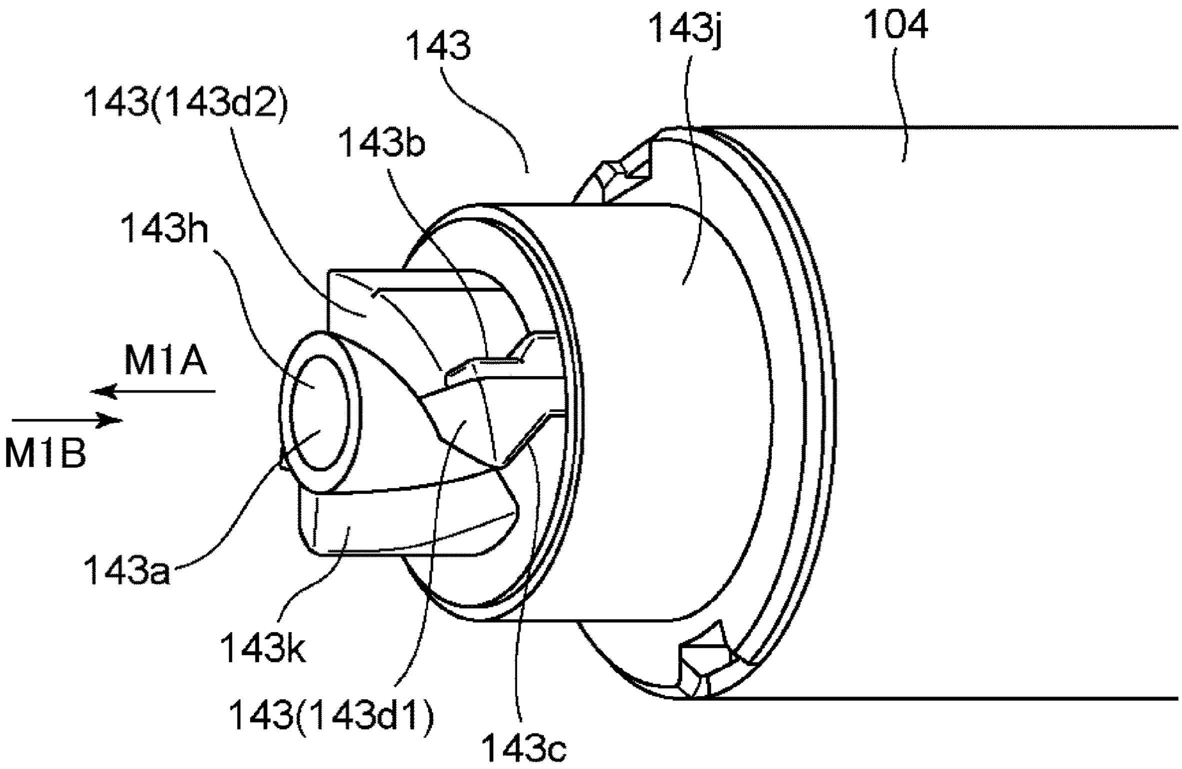
FIG. 52 is a perspective view illustrating a modified example of the drum coupling.
Figure 53:
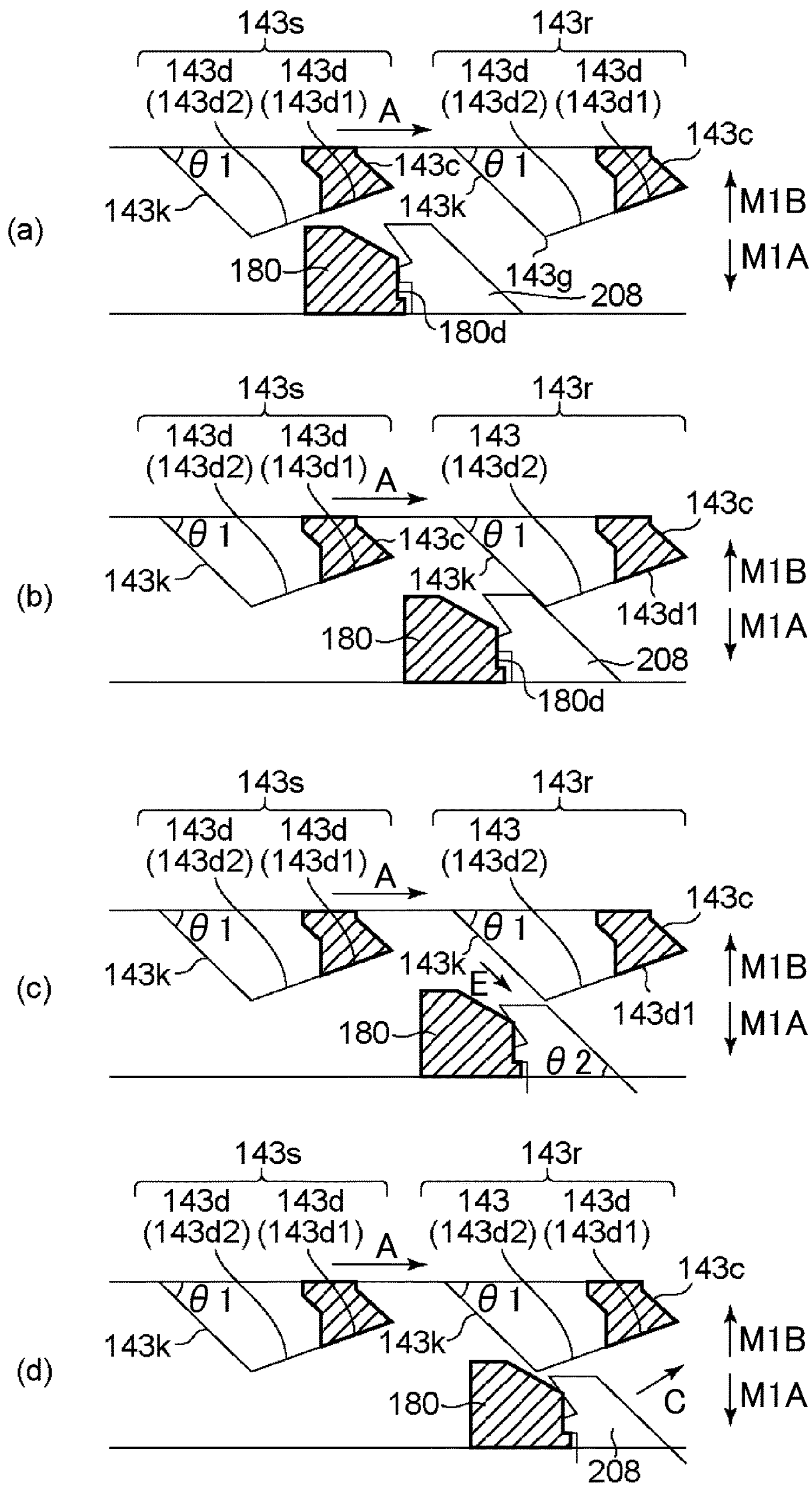
FIG. 53 is a developed view illustrating the engagement of the drum coupling.

FIG. 52 shows a perspective view of the drum coupling 143 in which the visor portion 143*g* is not provided, and FIG. 53 shows a developed view illustrating the process of engagement.

The shape will be described referring to FIG. 52. FIG. 52 is a view illustrating one end of the drum unit, and shows a state in which the coupling member (drum coupling) 143 is mounted to the end portion of the photosensitive drum 104. The drum coupling 143 includes the helical slope 143*d* and a push-back surface 143*k*, which will be described hereinafter, but does not have a visor shape.

Subsequently, the process of engaging with the drive transmission unit 203 will be described referring to FIG. 53.

The representation of the development view of FIG. 53 is the same as with the development view of FIG. 48. The drum coupling 143 comprises two coupling portions 143*s* and 143*r*, but only the coupling portion 143*s* will be described for the sake of simplicity of explanation. The description of the coupling portion 143*s* also applies to the coupling portion 143*r*.

The case where the phases of the inclination start portion 143*f* of the drum coupling 143 shown in part (a) of FIG. 53 and the inward projection 208*e* of the second braking engagement member satisfy the following relationship will be described. That is, a case where the inclination start portion 146*f* of the chum coupling 143 is on the downstream side in the rotational direction (arrow A) will be described.

Part (a) of FIG. 53 shows a state in which the drive transmission surface 180*d* of the drive transmission unit 203 and the second braking engagement member 208 are close to each other.

Next, in part (b) of FIG. 53, since there is no such visor portion as described in embodiment 1, in the drum coupling 143, the drum drive coupling and the second braking engagement member 208 advance into the space between the push-back surface 143*k* and the helical slope 143*d*3.

Part (c) of FIG. 53 shows a state in which the drive transmission unit 203 has started to rotate in the rotational direction A. When the drum drive coupling 180 and the second braking engagement member 208 rotate, the second braking engagement member 208 moves in the direction of arrow E along the slope by the function of the inclination θ1 of the push-back surface 143*k* or the function of the inclination θ2 of the second braking engagement member 208. As described referring to FIG. 48, the second braking engagement member 208 can rotate without receiving a rotational load.

As described above, when the braking engagement member (204, 208) enters the region where it cannot engage with the braking force receiving portion, the push-back surface (push-back portion) 143*k* applies a force to the second braking engagement member 208. By this, the push-back surface 143*k* pushes back the braking engagement members (204, 208) toward the inside of the drive transmission unit 203 and moves it in the direction of arrow E.

However, the second braking engagement member 208 is urged by the spring 211 shown in FIG. 43 in the M1B direction in the Figure, and if the component force of the inclination θ2 of the second braking engagement member 208 is smaller than the spring force F1, the second braking engagement member 208 cannot be moved in the direction of arrow E. The component force changes depending on the load torque of the drum holding unit 108 and the angle of each slope (θ1 or θ2). It is preferable to set the magnitude relation of the force within the range in which the above function is performed in consideration of the component force and the frictional force.

Part (d) of FIG. 53 shows the movement of the second braking engagement member 208 which is no longer subjected to the rotational load. The drive transmission unit 203 has further rotated, and the second braking engagement member 208 is in a state of passing the inclination start portion 146*f* of the drum coupling 146. In this state reached, the second braking engagement member 208 moves in the direction of arrow C as described referring to part (c) of FIG. 48. The operation after this is the same as described above, and therefore, the description thereof will be omitted.

Although not shown in part (a) of FIG. 50 to part (d) of FIG. 50, the first braking engagement member 204 also moves together with the second braking engagement member 208 in these processes.

In the drum coupling 143 shown in the Embodiment 1 (see part (a) of FIG. 1, the braking engagement member (204, 208) is blocked by the visor portion 143*g* from entering the region in which it cannot engage with the braking force receiving portion. On the other hand, in the drum coupling 143 of this modified example, when the braking engagement member (204, 208) enters the region where the braking force receiving portion 143*c* cannot be engaged with the drum drive coupling 180, the braking engagement member (204, 208) is pushed back by the push-back surface (push-back) 143*k*. The push-back surface 143*k* is an inclined portion inclined in a direction different from that of the helical slope 143. More particularly, the helical slope 143 is a portion which inclines toward the non-driving side of the drum unit as it goes downstream in the rotational direction, whereas the push-back surface 143*k* is a portion of the drum unit which inclines toward the outside, that is, away from the non-driving side end portion 104*b* (see FIG. 80) of the photosensitive drum, as it goes downstream in the rotational direction A. If the helical slope 143 is regarded as a descending slope, the push-back surface 143*k* is an ascending slope. The push-back surface 143*k* is placed on the upstream side in the rotational direction with respect to the helical slope 143*d*, and is adjacent to the helical slope 43*k*.

The push-back surface 143*k* is also a guide (second guide) for guiding the braking engagement member (204, 208) toward the helical slope 143*d*. Further, the push-back surface 134*k* is a helical slope (second helical slope, second inclined portion) having a direction of inclination opposite to that of the helical slope 143*d*.

Further, another modified shape of the drum coupling 143 will be described. The inclined portion and the top surface (helical slope 143*d*) as the guide described in the Embodiment 1 are formed as smooth slopes, and guide the braking engagement members (204, 208) along such slope surfaces (See FIG. 56 and the like). However, the drum coupling 143 can also function even if the inclined portion has other shapes. An example thereof is shown in FIG. 54 in a perspective view.

Figure 54:
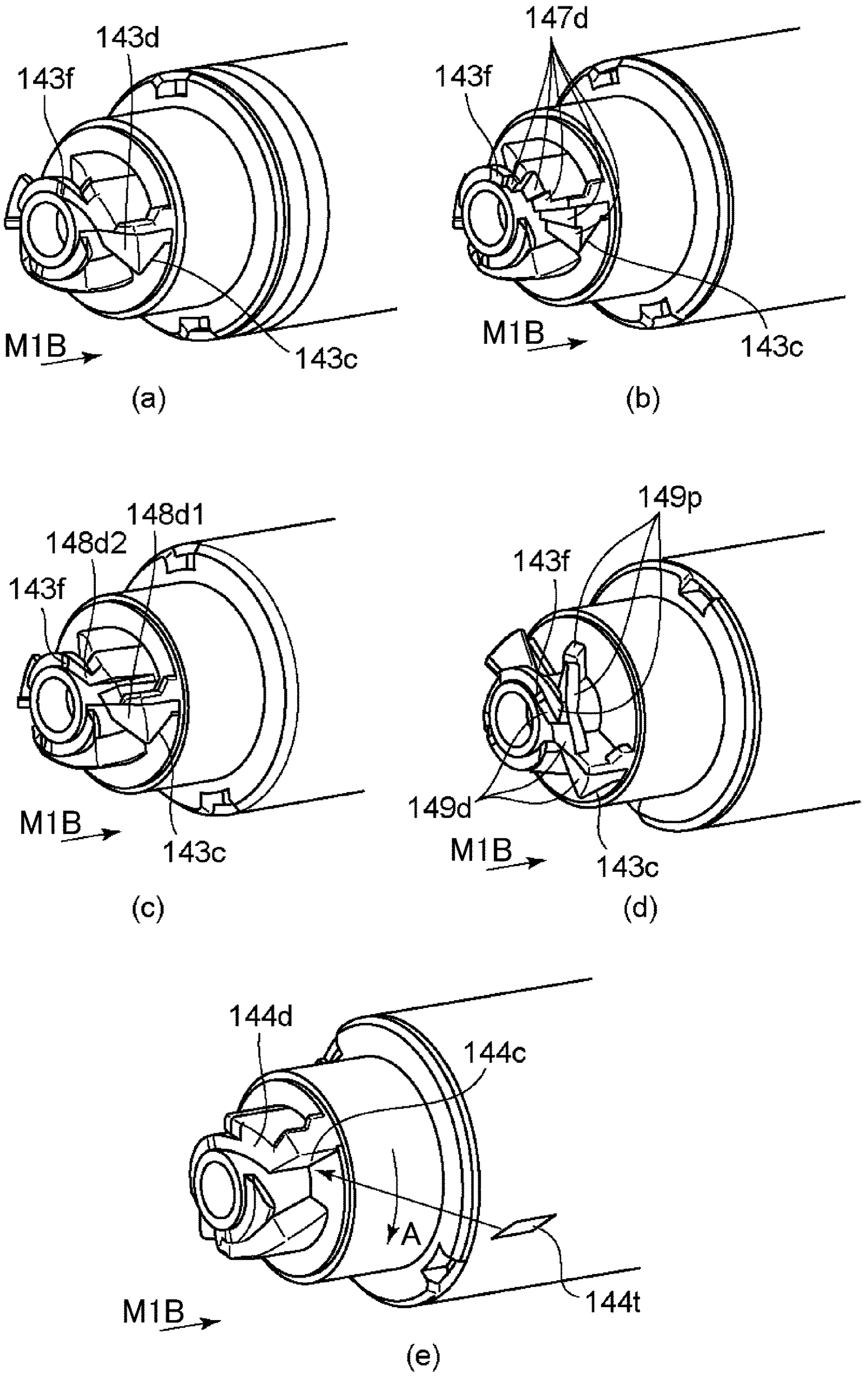
FIG. 54 is a development view illustrating the engagement of the drum coupling.
Figure 55:
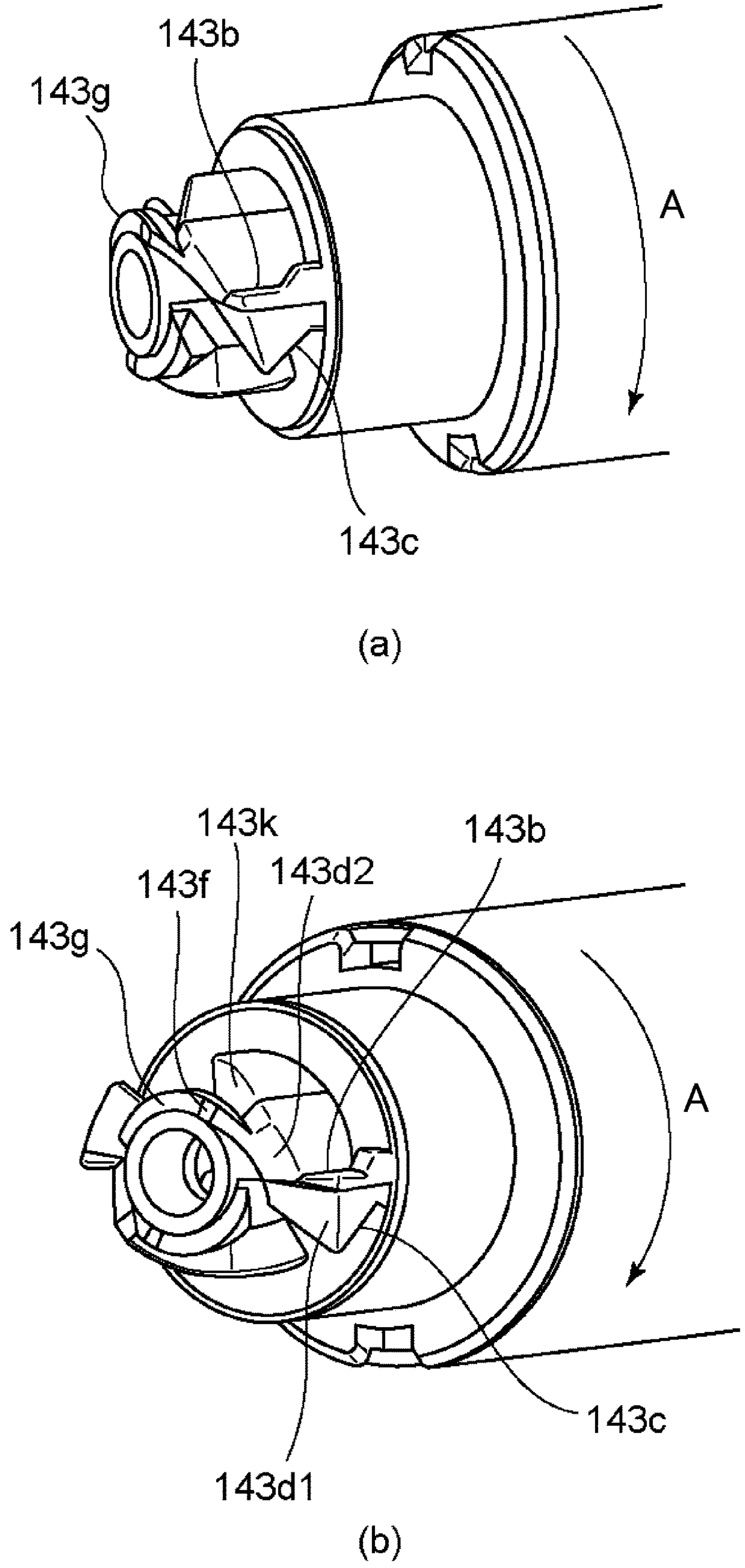
FIG. 55 is a perspective view of the drum unit showing the drum coupling.

First, the shape shown in part (a) of FIG. 54 is a reproduction of the shape described in the Embodiment 1. A gentle helical slope 143*d* is formed from the inclined starting portion 143*f* toward the braking force receiving portion 143*c*.

Figure 73:
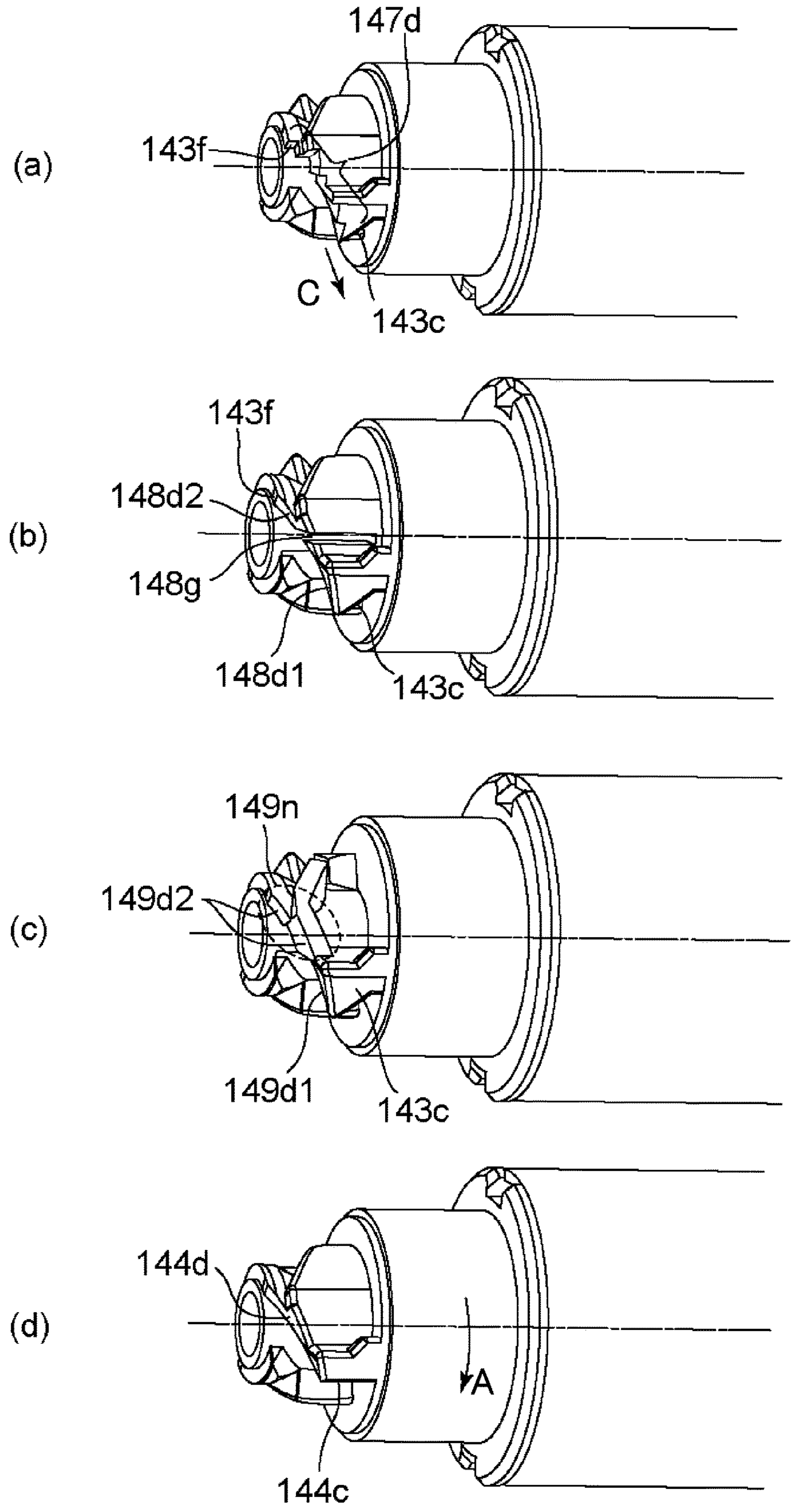
FIG. 73 is a perspective view illustrating a modified example of the drum coupling.

On the other hand, the shapes of part (b) of FIG. 54 and part (a) of FIG. 73 show modified examples. The height changes stepwise between the inclination start portion 147*f* and the braking force receiving portion 147*c*. That is, the top surface (inclined portion) has a stepped portion 147*d*, and the inclined portion is formed by the plurality of steps. Thus, the inclined portion (top surface) may not be a helical slope but may be a helical step shape providing an inclination which lowers in the direction of advancement of the second braking engagement member 208.

The stepped step portion 147*d* moves the second braking engagement member 208 by moving the stepped step portion 147*d* in the direction of the arrow C in part (a) of FIG. 73, whereby the same function as that of the helical slope 143*d* in part (a) of FIG. 54 is performed. While the inclined surface 143*d* is an inclined portion comprising continuously inclined surfaces, the stepped portion 147*d* can be regarded as an inclined portion provided by stepwise structure of a plurality of surfaces.

If it is difficult to form a helical slope 143*d* on the coupling 143 due to restrictions on the structure of the mold for manufacturing the coupling 143, a stepped portion 147*d* may be used instead of the inclined surface 143*d.*

At this time, it is preferable that when the stepped portion 147*d*, which is the top surface, and the second braking engagement member 208 come into contact with each other, the second braking engagement member 208 is structured to be smoothly guided without being caught by the stepped portion 147*d*. For example, it is conceivable to sufficiently narrow the width of each surface of the stepped portion 147*d*. Further, in part (a) of FIG. 73, the top surface (inclined portion, guide) is formed in a stepped shape by combining a plurality of surfaces, but the top surface (inclined portion, guide) may be formed by combining a plurality of curved surfaces, and a similar function can be performed with such a structure. Similarly to the inclined surface 143*d*, the stepped portion 147*d* is a guide (inclined portion) for guiding the braking engagement member (204, 208) toward the braking force receiving portion by its own inclination.

Further, as shown in part (c) of FIG. 54 and part (b) of FIG. 73, the top surface is divided into an inclined surface (upstream side top surface, downstream side top surface) 148*d*1 and an inclined surface (downstream side top surface, downstream side guide, downstream side) 148*d*2 with a gap 148*g* therebetween. Also in this case, if the second braking engagement member 208 has such a shape that does not cause catching when it comes into contact with the top surface (148*d*1, 148*d*2), the top surface (148*d*1, 148*d*2) can function as a guide. Such a coupling can be used when there is a restriction in the structure of the mold for molding the coupling.

Further, part (d) of FIG. 54 and part (c) of FIG. 73 show a modified example in which the shape of each portion of the coupling 143 is formed by ribs. The top surface (inclined surface 149*d*) comprises the surfaces of a plurality of ribs 149*p*, and the top surface is divided into a plurality of ribs, and in such a case, the same function can be provided as well. That is, as shown in part (c) of FIG. 73, the guide forming portion 149*n* forming the upstream side top surface (upstream side guide, upstream side inclined portion) 149*d*2 is a projection (rib) projecting in the radial direction.

Depending on the characteristics of the material used, it can be used when it is necessary to produce ribs without producing thick portions.

That is, with each structure of part (a) of FIG. 54 to part (d) of FIG. 54, each top surface (143*d*, 147*f*, 148*d*1, 148*d*2, 149*d*) guides the braking force of the braking engagement member (204, 208) toward the braking force receiving portion 143*c* regardless of its shape. In other words, each top surface is a guide (inclined portion) for guiding the braking engagement member (204, 208) toward the braking force receiving portion 143*c* regardless of its shape. At least a part of such a top surface (guide) is formed by the guide forming portion 143*n*.

Similar to the top surface, the push-back surface (push-back portion) 143*k* shown in FIG. 52 may have various shapes. For example, the push-back portion (push-back surface) 143*k* of this modification is a smoothly continuous helical slope, but the push-back portion may be inclined by a plurality of surfaces or steps. For example, the push-back portion 143*k* may be two surfaces including different inclinations, as in the push-back portion 143*k* of the Embodiment 1 shown in part (b) of FIG. 48 and part (d) of FIG. 56. Further, although the push-back surface 143*k* is ascending, a descending portion may be locally provided.

The drum coupling 143 may have either the visor portion 143*g* or the push-back surface (push-back portion) 143*k*, or may have both of them. As described above, the drum coupling 143 of the Embodiment 1 shown in part (b) of FIG. 48, part (b) of FIG. 55 and part (d) of FIG. 56 has a structure in which not only the visor portion 143*g* but also the push-back portion 143*k* is provided. Normally, the drum coupling 143 can block improper entry and access of the braking engagement member (204, 208) by the visor portion 143*g*, but in the unlikely event that it cannot be blocked, the push-back surface 143*k* can function to push back the braking engagement members (204, 208) away from the coupling 143.

The drum coupling 143 has a projection shape (push-back portion forming portion, second guide forming portion) 143*m* that constitutes the push-back surface 143*k* (see part (b) of FIG. 79 and part (c) of FIG. 79).

The engaging portion 143*i*, the guide forming portion 143*n*, the projection shape 143*m*, and the visor portion 143*g* (see FIG. 79) may be referred to as the first, second, third, and fourth shape portions in no particular order correspondence.

Referring to part (e) of FIG. 54 and part (d) of FIG. 73, a modified example of the braking force receiving portion (second side surface) will be shown.

The braking force receiving portion 143*c* described in Embodiment 1 shown in part (a) of FIG. 54 and part (a) of FIG. 1 and FIGS. 55 to 57, and the other modified examples shown in FIG. 52 and part (b) of FIG. 54 to part (d) of FIG. 54 has a shape overhanging downstream in the rotational direction. This is because by the braking force receiving portion 143*c* having a shape overhanging toward the downstream side in the rotational direction, the stability of engagement is increased when it is engaged with the braking engagement members (204, 208).

That is, because of this shape, when the braking force receiving portion 143*c* engages with the braking engagement member (204, 208), a force is generated so as to attract then toward each other. The braking force receiving portion 143*c* overhangs toward the downstream side in the rotational direction. Therefore, when the braking force engaging member (204, 208) contacts the braking force receiving portion 143*ca* force is produced so that the braking force engaging member (204, 208) is attracted inward in the axial direction toward the drum coupling 143 or the photosensitive drum 104. By this, the engaging state between the braking force receiving portion 143*c* and the braking force engaging member (204, 208) is stabilized, and the engagement is not easily broken.

As described above, the braking engagement member (204, 208) is structured to be movable in the axial direction relative to the drum drive coupling 180 (see FIGS. 67 and 68). However, if the braking engagement member (204, 208) moves in the axial direction while the drive transmission unit 203 is driving the drum coupling 143 there is a possibility that the engaged state with the braking force receiving portion 143*c* is broken or becomes unstable. Therefore, it is preferable that the braking force receiving portion 143*c* has a shape for stabilizing the engagement state with the braking engagement member (204, 208) to suppress the movement of the braking engagement member (204, 208) in the axial direction when the drum coupling 143 is driven.

However, when the braking force required to be applied to the braking force receiving portion is small, or when the friction coefficient of the braking force receiving portion is high, the engagement between the braking force receiving portion and the braking engagement member (204, 208) tends to be stable. Therefore, it is possible to eliminate the overhang portion of the braking force receiving portion. Such a braking force receiving portion 144*t* is shown in part (e) of FIG. 54 and part (d) of FIG. 73. In the modified drum coupling shown in part (e) of FIG. 54 Figure and 73(*d*), the braking force receiving portion 144*c* does not overhang toward the downstream side in the rotational direction (arrow A).

On the other hand, it is also conceivable to devise a device for stabilizing the engagement state with the braking engagement member (204, 208) even for the braking force receiving portion 144*c* including such a shape.

In order to stabilize the engagement between the braking force receiving portion 144*c* and the braking engagement member, It is also conceivable that an elastic member (elastic portion) 144*t*, for example such as rubber is attached to the braking force receiving portion 144*c*, or the elastic portion is integrally molded with to the braking force receiving portion 144*c*. By increasing the friction coefficient of the braking force receiving portion 144*t* or causing the braking engagement member (204, 208) to bite into the elastic portion of the braking force receiving portion 144*t*, the engagement with the braking engagement member (204, 208) is less likely to break so that the engagement can be stabilized.

As a method of increasing the frictional force of the braking force receiving portion 144*c*, it is conceivable to use an adhesive member (adhesive member) instead of using the elastic member 144*t*. For example, if a double-sided tape (adhesive member) is attached to the surface of the braking force receiving portion 144*c*, the frictional force between the braking force receiving portion 144*c* and the braking engagement member (204, 208) increases due to the viscosity of the double-sided tape (adhesive member). In addition, it is conceivable to increase the friction coefficient of the braking force receiving portion 144*c* by surface-treatment of braking force receiving portion 144*c* without using the elastic member 144*t*.

It is desirable that the helical slope 143*d* (see FIG. 67) for guiding the braking engagement member (204, 208) has a small friction coefficient in order to achieve smooth guiding. Therefore, even when a material having a high coefficient of friction is selected or surface treatment is applied to the braking force receiving portion 144*c*, it is desirable that such a means is not used for the entire coupling, but the use of such material or such surface treatment is not applied to the helical slope 143*d*. That is, it is desirable that the friction coefficient of the braking force receiving portion 144*c* is higher than the friction coefficient of the helical slope 143*d*.

The elastic portion 144*t* may be provided on the braking force receiving portion 143*c* of the drum coupling 143 as shown in part (a) of FIG. 54 to part (d) of FIG. 54.

Figure 101:
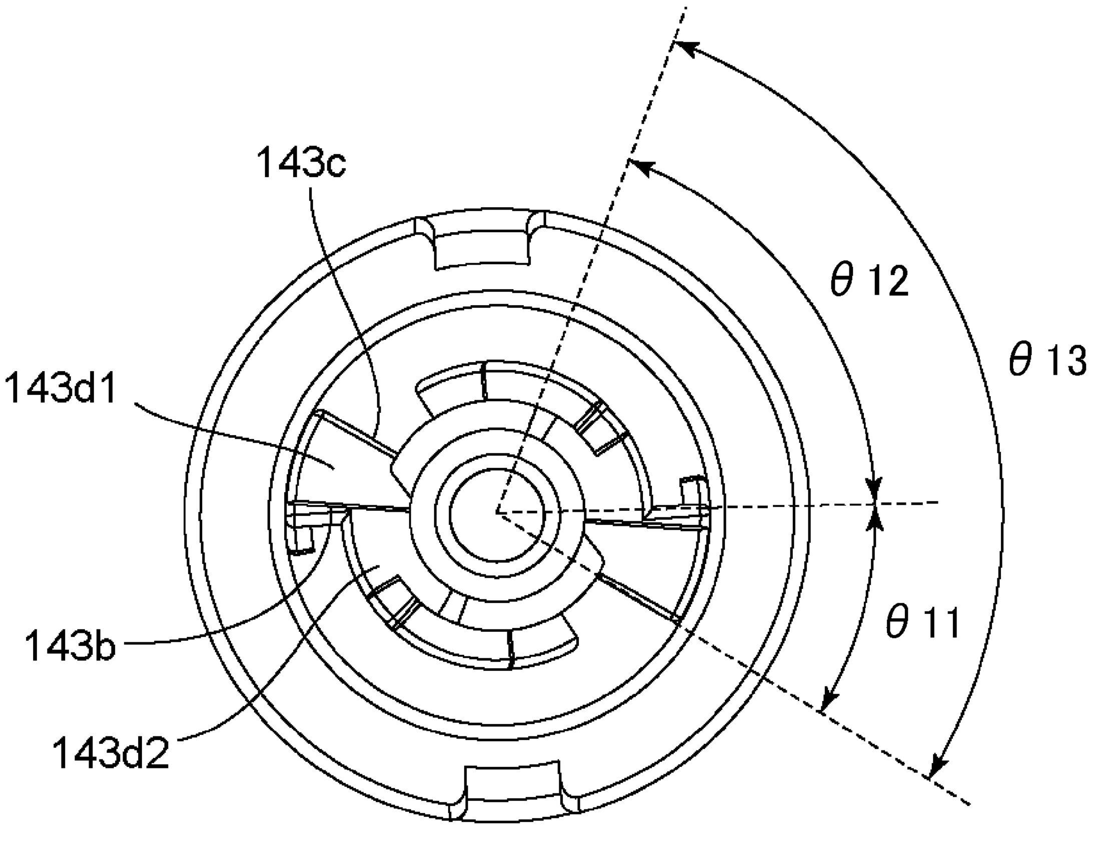
FIG. 101 is a front view of the coupling.

Next, referring to FIG. 101, a preferable arrangement relationship and dimensional relationship of the drum coupling 143 will be described. FIG. 101 is a front view of the drum coupling 143 of the Embodiment 1, in which θ (theta) 11 is a value indicating the dimension of the engaging portion 143*i* from the driving force receiving portion 143*b* to the braking force receiving portion 143*c* by an angle from the axis of the drum coupling. In other words, it is the angle of the region of the downstream inclined portion 143*d*1.

Regarding the upper limit of θ11, it is desirable that θ11 is 90° or less, more preferably 80° or less. The angle θ11 corresponds to the gap created between the drum drive coupling 180 and the braking engagement members (204, 208) when the drum coupling engages the drive transmission unit 203 (see FIG. 64). In order to securely sandwich the driving force receiving portion 143*b* and the braking force receiving portion 143*c* between the braking engagement members (204, 208) and the drum drive coupling 180 of the apparatus main assembly, It is desirable that θ11 is 90° or less, more preferably 80° or less.

On the other hand, regarding the lower limit of θ11, if the strength of the engaging portion 143*i* is increased by using metal as for the material of the engaging portion 143*i* constituting the driving force receiving portion 143*b* and the braking force receiving portion 143*c*, the θ11 can be reduced. Although the details will be described hereinafter, in the modified example of the drum coupling shown in FIG. 74, the thickness of the engaging portion 145*i* corresponding to the engaging portion 143*i* is made smaller then that in this embodiment, by forming the drum coupling 143 with metal. Considering such a structure, the preferable condition for the lower limit of θ11 (FIG. 101) is that θ11 is 1°, more preferably 2° or still more preferably 8° or more. In this embodiment, θ11 is set to 30° or more, and θ11 is set to about 35°.

In order to increase the strength of the driving force receiving portion 143*b* and the braking force receiving portion 143*c* so that the force can be stably received, the angle θ11 corresponding to the thickness of the engaging portion 143*i* is desirably in a certain range.

When θ11 is converted into a length, it becomes the thickness of the engaging portion 143*i*, that is, the distance measured from the driving force receiving portion 143*b* to the braking force receiving portion 143*c* along the rotational direction. The desired range of this distance is 0.3 mm or more, more preferably 1 mm or more.

Further, in FIG. 101, θ12 indicates a region occupied by the upstream slope (upstream guide, upstream slope) 143*d*2 by an angle. Regarding the lower limit of θ12, it is desirable that the value of θ12 is at least half the value of θ11, and more preferably the value of θ12 is not less than the value of θ11. This is because the upstream slope 143*d*2 needs to have a length in the rotational direction to the extent necessary for guiding the braking engagement member (204, 208) to the braking force receiving portion 143*c* by the upstream slope 143*d*2.

As θ11 is smaller and the inclination angle of the upstream slope 143*d*2 is larger, the lower limit of θ12 can be made smaller.

As described above, the lower limit of θ12 depends on the value of θ11 and the angle of the upstream slope 143 d2, but when expressed numerically, θ12 is ° or more, more preferably 2° or still more preferably 8° or more, even more preferably 30° or more. In this embodiment, θ12 is set to be 60° or more.

The upper limit of θ12 can be relatively large and can exceed 360°. However, preferably, θ12 is 360° or less, more preferably 270° or less, and it is 180° or less in this example. Specifically, θ12 is set to be approximately 67°.

Figure 102:
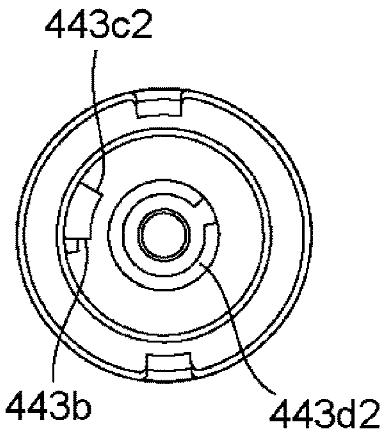
FIG. 102 is a front view, a perspective view, and a side view of the coupling.
Figure 102:
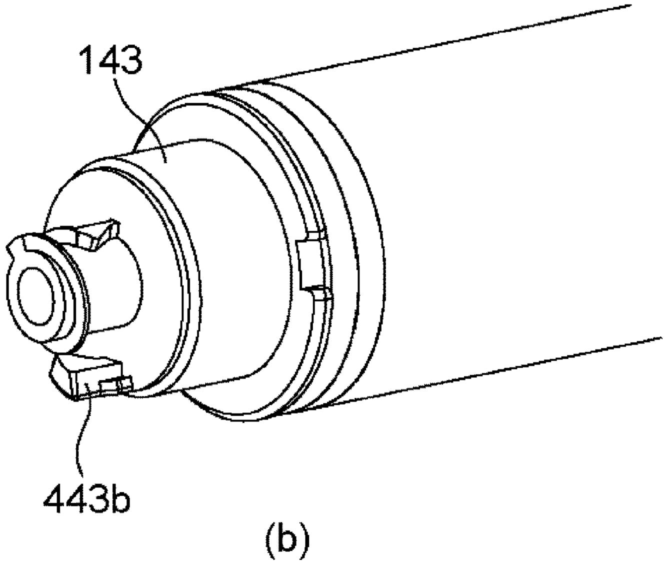
Figure 102:
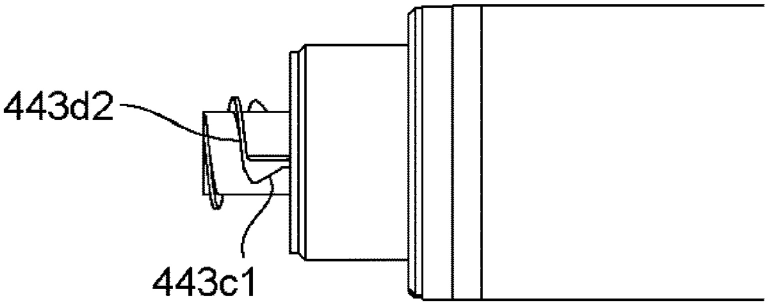
Figure 102:
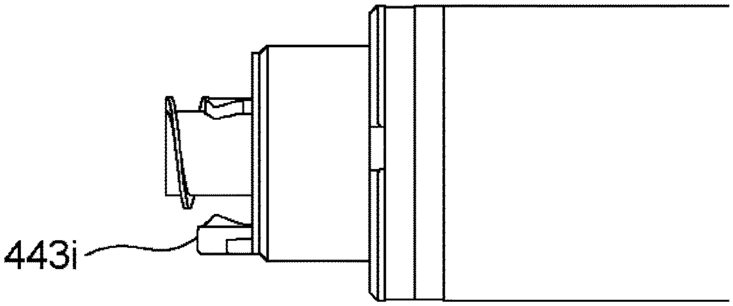

A structure in which θ12 is larger than that of this embodiment will be described hereinafter referring to FIGS. 102 and 103.

Angle θ13 is the sum of θ11 and θ12, and corresponds to the angle occupied by the entire helical slope 143*d*. When θ13 is expressed numerically, it is desirable that θ13 is 2° or more, and more preferably 8° or more. Further, θ13 is preferably 360° or less, and more preferably 270° or less. In this embodiment, θ13 is set to 180° or less. Specifically, θ13 set to be approximately 102°.

Figure 74:
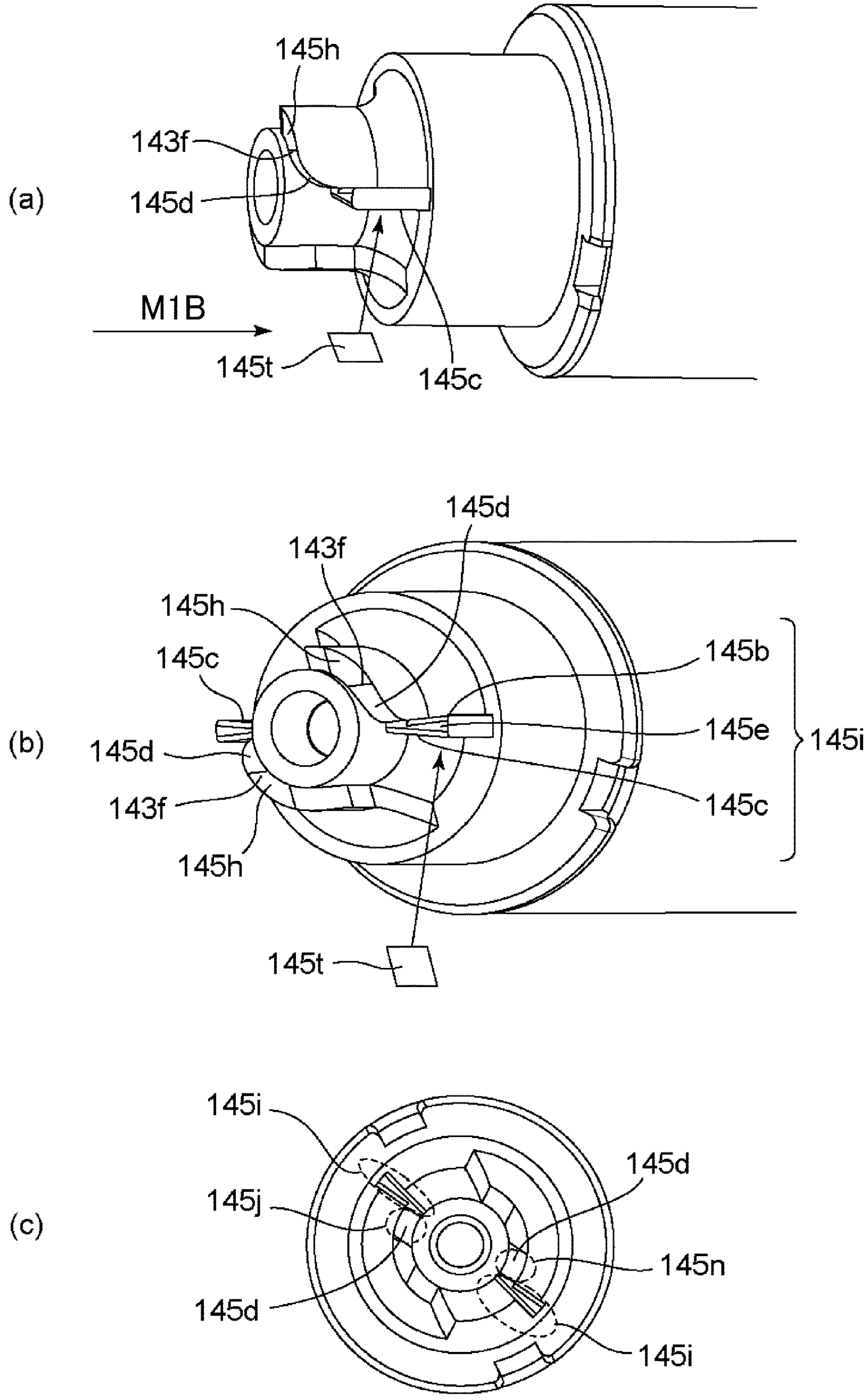
FIG. 74 is a perspective view and a front view illustrating a modified example of the drum coupling.

Referring to FIG. 74, the shape of another modification of the coupling 143 will be described.

FIG. 74 is a perspective view and a front view as seen in two line-of-sight directions of the coupling in the modified example.

The coupling 143 of this modification includes an engaging portion 145*i* including a driving force receiving portion 143*b* and a braking force receiving portion 145*b*, and a guide forming portion 145*n* having a helical slope 145*d*. The engaging portion 145*i* and the guide forming portion 145*n* correspond to the engaging portion 143*i* and the guide forming portion 143*n* of the coupling 143 shown in the Embodiment 1 (see FIG. 79), but their shapes are partially different.

The coupling 143 of this modification includes the visor portion 143*g* contacting the second braking engagement member 208 (not shown), and the helical slope 145*d* is formed by a curved surface. This curved surface has a substantially arc shape, and is shaped so as to connect the braking force receiving portion 145*c* from the inclination start point 143*f*. In this modified example, since the braking force receiving portion 145*c* does not have a shape overhanging to the downstream side in the rotational direction, the elastic member (elastic portion) 145*t* may be attached to the braking force receiving portion 145*c* as in the case of part (e) of FIG. 54.

Figure 57:
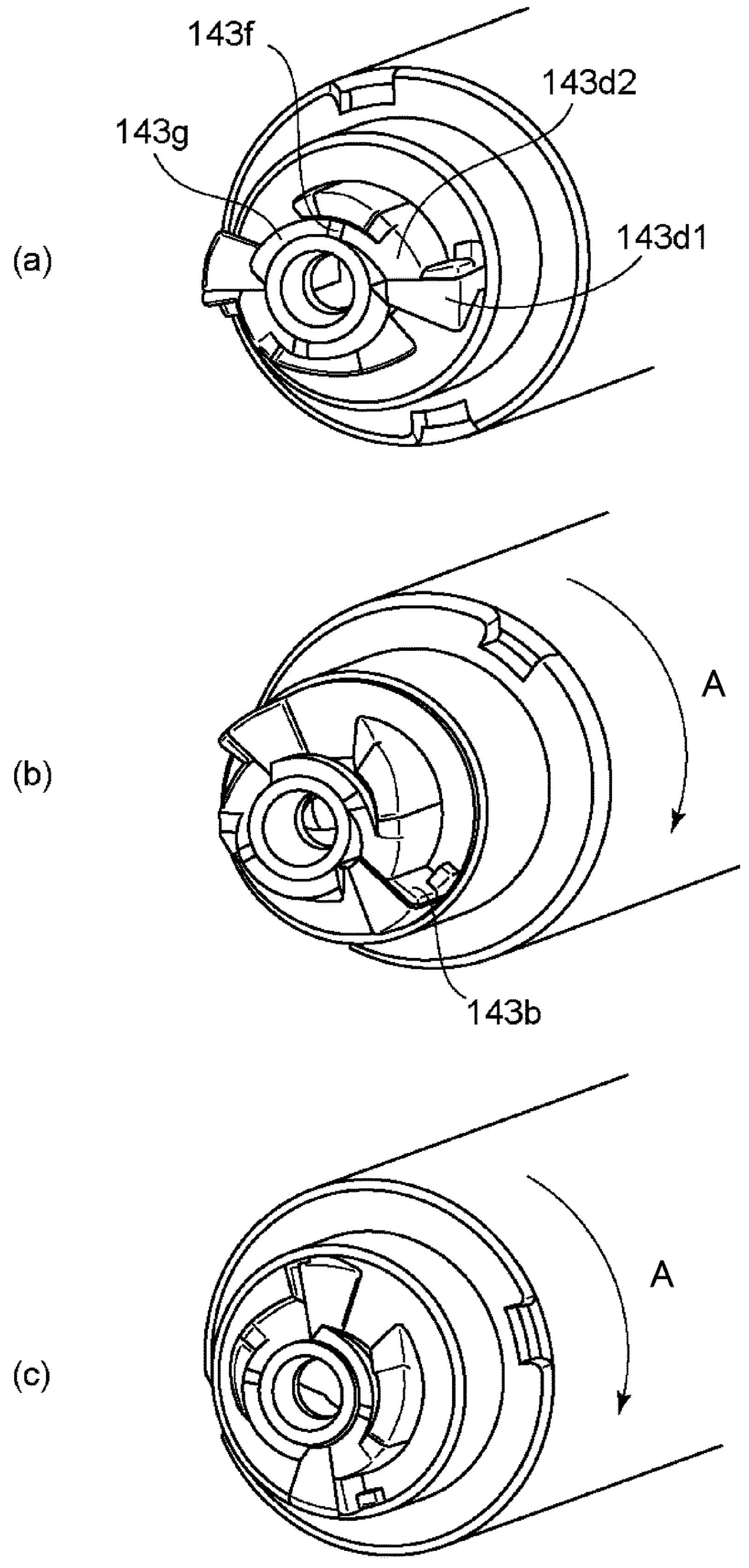
FIG. 57 is a perspective view of the drum unit showing the drum coupling.

The helical slope 145*d* in this modification (FIG. 74) is a top surface corresponding to the upstream slope 143*d*2 of Embodiment 1 (FIG. 57).

On the other hand, in this modification (FIG. 74), the top surface (upper part) 145*e* (part (b) of FIG. 74) of the engaging portion 145*i* corresponds to the downstream slope 143*d*1 of the Embodiment 1 (FIG. 57), but it is not inclined unlike the downstream side slope 143*d*1.

That is, the top surface 145*e* provided downstream is connected to the top surface (helical slope 145*d*) provided upstream, but the inclination angles of the surfaces thereof are different at the boundary. The top surface 145*e* and the helical slope 145*d* are not smoothly connected.

Further, since the distance between the driving force receiving portion 143*b* and the braking force receiving portion 145*c* is short, the length of the top surface 145*e* measured along the rotational direction is smaller (shorter) than the length of the downstream slope 143*d*1 in FIG. 57. Further, as described above, the top surface 145*e* is not inclined. In this modification, it can be considered that the top surface 145*e* is not used as a guide.

However, even with such a structure, the helical slope 145*d*, which is a guide (inclined portion), can guide the braking engagement member (204, 208) toward the braking force receiving portion 145*c*.

A plane 145*h* is adjacent to the upstream of the helical slope 145*d*, and the helical slope 145*d* and the plane 145*h* are connected to each other. The plane 145*h* can be inclined in the same direction as the helical slope 145*d* to form a part of the helical slope 145*d*. Further, the drum coupling of this modification may have the visor portion 143*g* of the push-back surface 143*k* described in embodiment 1 or another modification of the Embodiment 1 (see FIGS. 1, 52, and so on).

Figure 75:
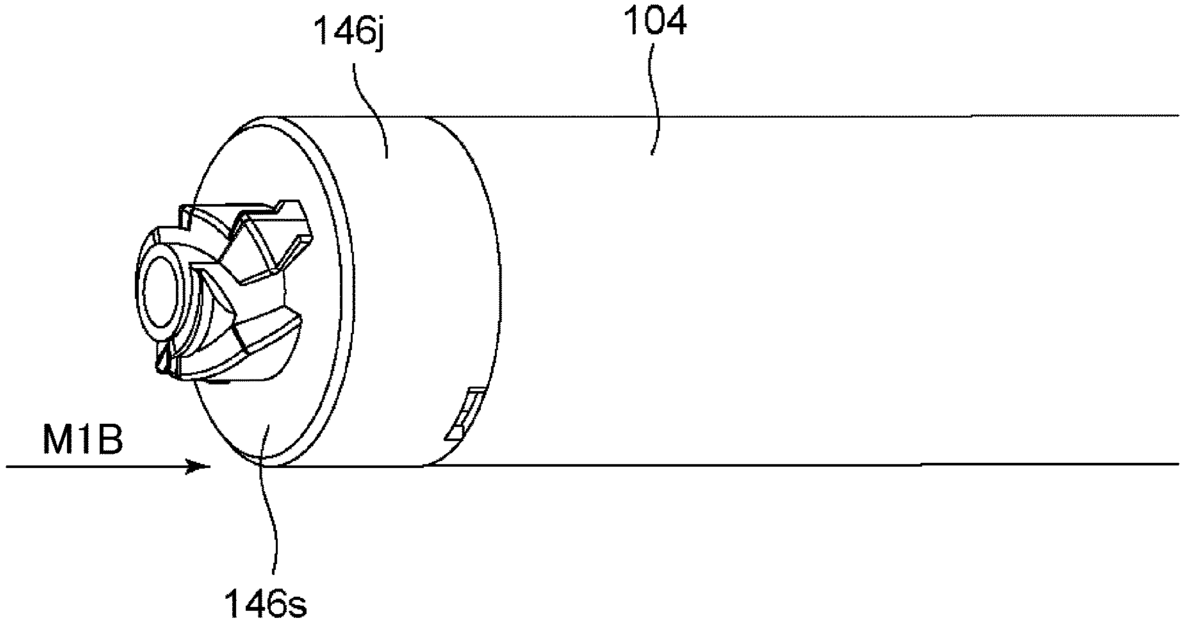
FIG. 75 is a perspective view of the drum unit.

Further, regarding the shape of the drum coupling, the shape of the shaft portion 143*j* shown in FIG. 1 can also be selected in view of design reasons. For example, FIG. 75 shows a shape of a modified example of the drum coupling. In the example of FIG. 75, the diameter of the shaft portion 146*j* is the same as the diameter of the photosensitive drum 104. The shaft portion 146*j* is rotatably supported by a driving side cartridge cover member 116 (see FIG. 15). The position restriction in the direction of the arrow MB1 can be performed using the shaft end surface 146*s*, for example. In this manner, the shape of the shaft portion 146*j* can be appropriately selected depending on the relationship with the peripheral portions and the manufacturing method.

Figure 76:
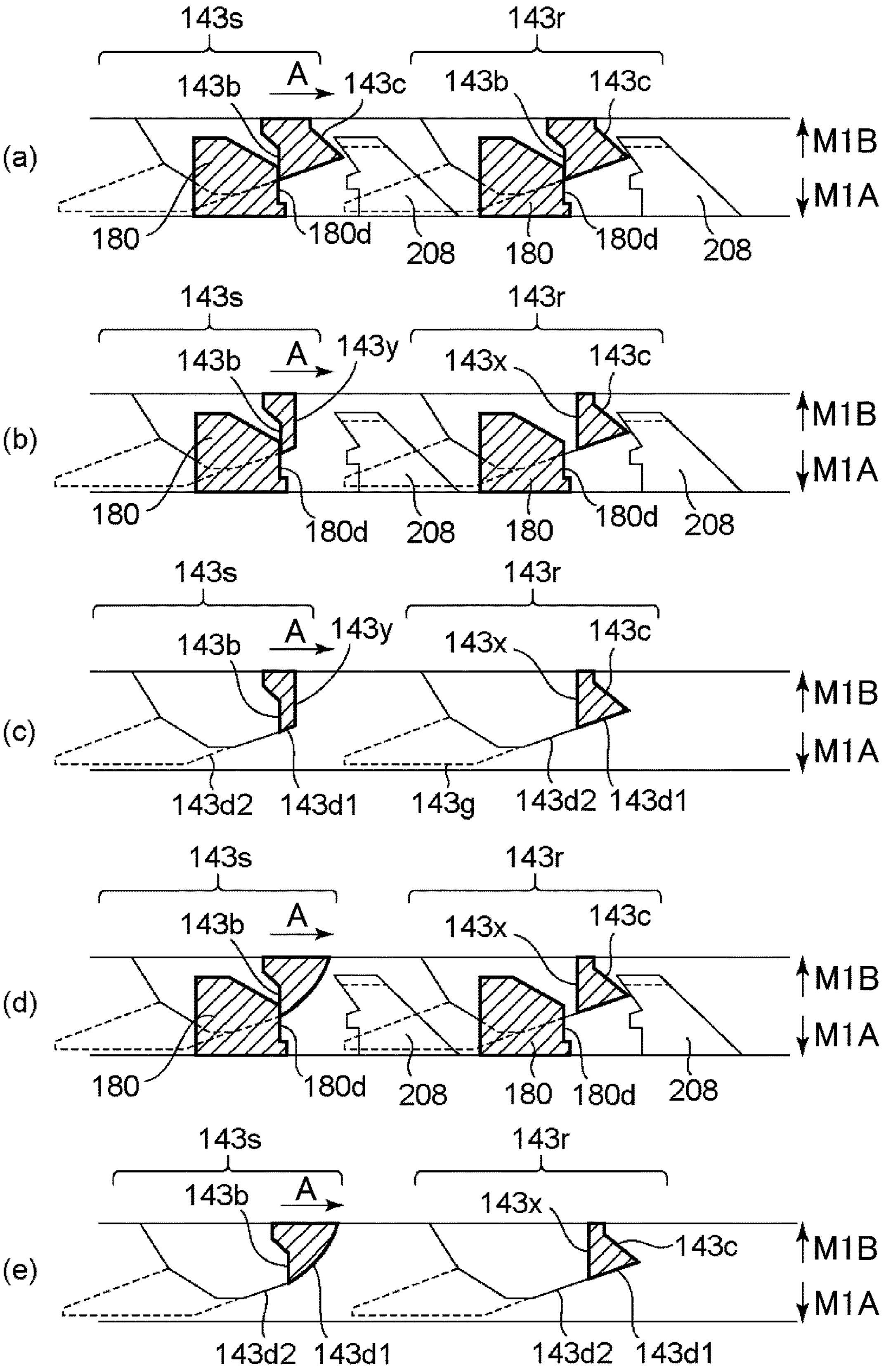
FIG. 76 is a developed view illustrating the engagement of the drum coupling.
Figure 78:
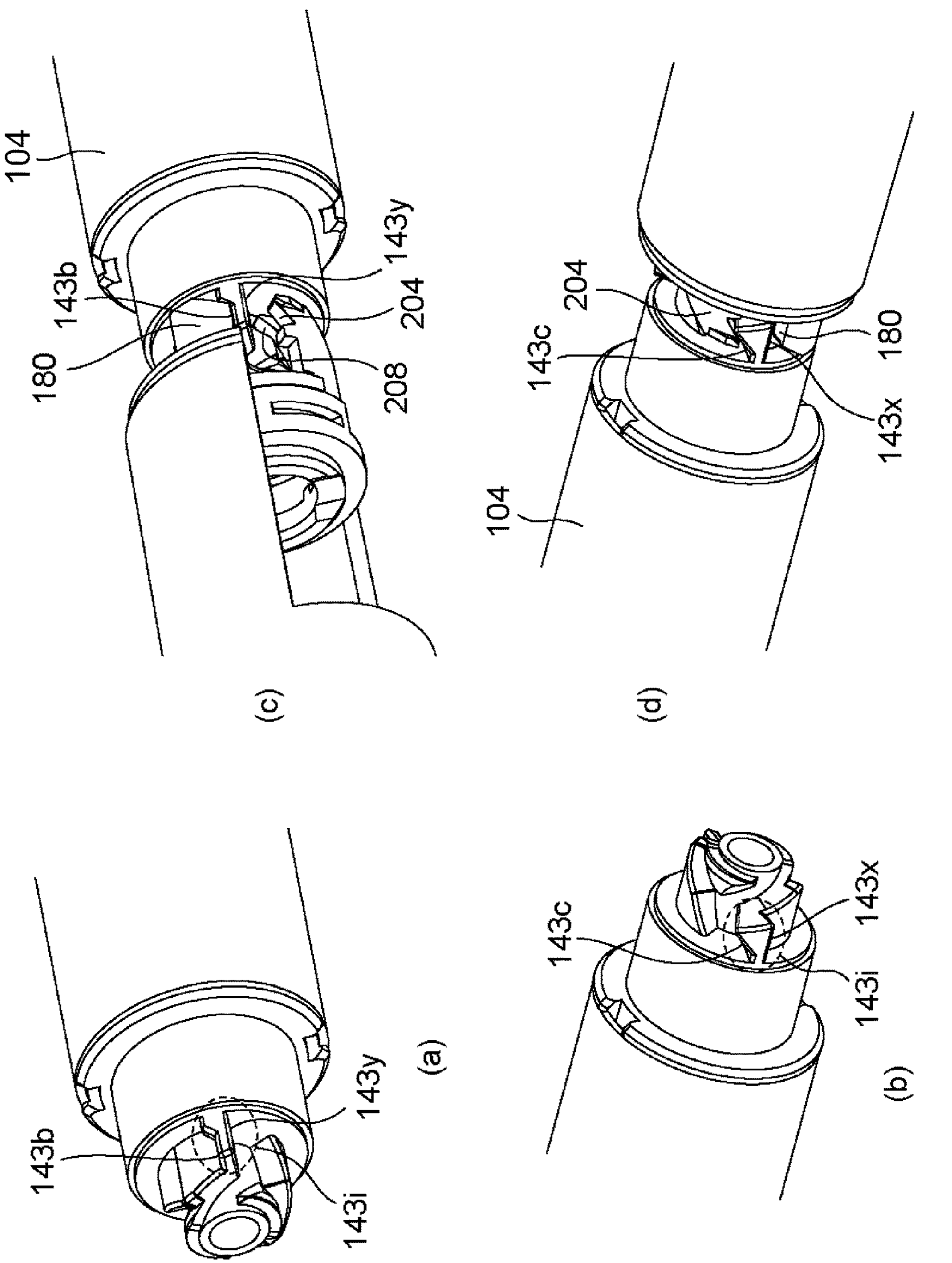
FIG. 78 is a perspective view of the drum unit and the drive transmission unit.

Another modification of the drum coupling 143 is shown in part (b) of FIG. 76, part (c) of FIG. 76, part (a) of FIG. 78, part (b) of FIG. 78, part (c) of FIG. 78, and part (d) of FIG. 78. These Figures show drum couplings in which two coupling portions 143*s* and 143*r* have different shapes. Part (b) and (c) FIG. 76 are development views of the coupling 143, and in part (c) of FIG. 76, the drum drive coupling 180 and the braking engagement member 208 provided in the device main assembly side are also shown in the development view. Part (a) of FIG. 78 and part (b) of FIG. 78 are perspective views of the drum coupling 143. Further, part (c) of FIG. 78 and part (d) of FIG. 78 show the engagement state of the braking engagement member (204, 208) and the drum drive coupling with respect to the drum coupling 143.

In the coupling 143 shown in these Figures, the engaging portion 143*i* of one coupling portion 143*s* is not provided with the braking force receiving portion 143*c*, but includes only the driving force receiving portion 143*b*. That is, the side surface 143*y* provided on the engaging portion 143*i* of the coupling portion 143*s* does not engage with the braking engagement member (204, 208). On the other hand, the engaging portion 143*i* of the other coupling portion 143*r* is provided only the braking force receiving portion 143*c* and is not provided with the driving force receiving portion 143*b*. The side surface 143*x* of the engaging portion 143*i* of the coupling portion 143*r* does not engage with the drum drive coupling 180.

An example of another asymmetrical coupling 143 is shown in part (d) of FIG. 76. This coupling portion 143*s* is an example in which the coupling portion 143*s* does not have any side surface corresponding to the driving force receiving portion 143*c*.

The modified example of the coupling 143 shown in part (b) of FIG. 76, part (c) of FIG. 76, part (a) of FIG. 78, part (b) of FIG. 78, part (c) of FIG. 78, and FIG. 7 is a(d) receives a driving force at only one place and receives the braking force at only one place. Therefore, in order for the drum coupling to stably receive the driving force and the braking force, it is preferable to improve the fitting accuracy between the circular hole portion 143*a* and the positioning boss 180*i* of the drum drive coupling 180 (see FIG. 51). That is, it is preferable to reduce the gap produced between them, thus improving, the positional accuracy of the drum coupling 143 relative to the drive transmission unit 203, to stably and surely engage the drive transmission unit 203 and the drum coupling 143.

Figure 77:
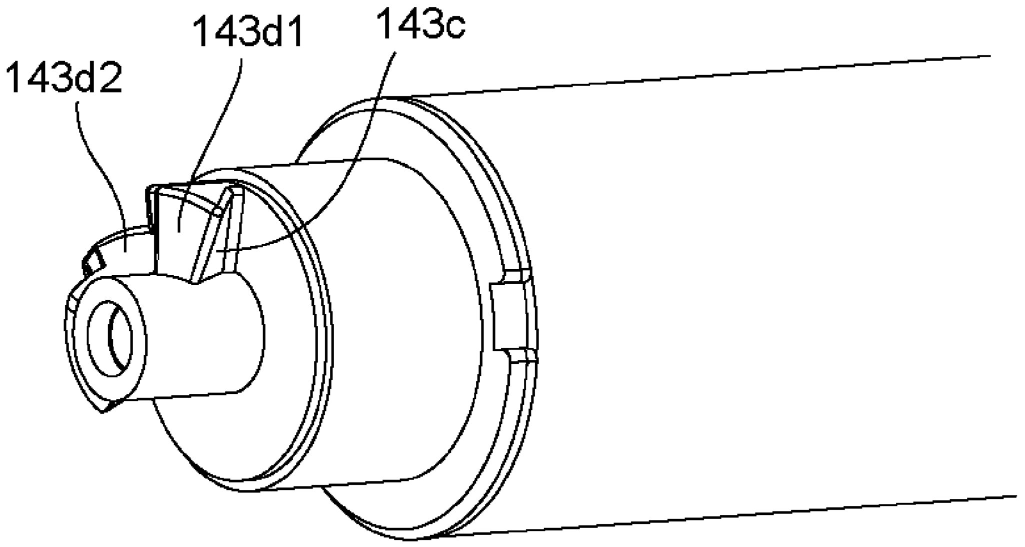
FIG. 77 is a perspective view of the drum unit and a front view of the coupling.
Figure 77:
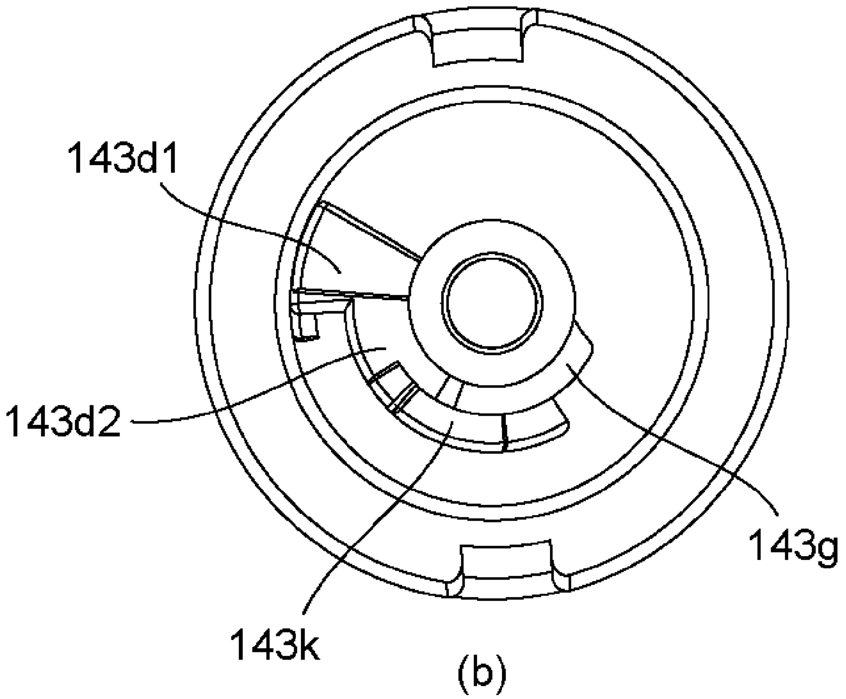

Further, FIG. 77 shows another modification of the drum coupling including one driving force receiving portion and one braking force receiving portion. The drum coupling 143 shown in FIG. 77 has only one upstream side slope 143*d*2, only one downstream side slope 143*d*1, only one visor portion 143*g* only one driving force receiving portion 143*b*, only one braking force receiving portion 143*c*, and only one extrusion surface 143*k*. Part (a) of FIG. 77 is a perspective view of the drum coupling, and part (b) of FIG. 77 is a front view thereof.

In the modified example of the drum coupling 143 as shown in FIG. 77, arbitrary portions of the slope 143*d*, the visor portion 143*g*, the driving force receiving portion 143*b*, the braking force receiving portion 143*c*, and the extrusion surface 143*k* may be placed at a 180° position or positions (axisymmetric).

Figure 96:
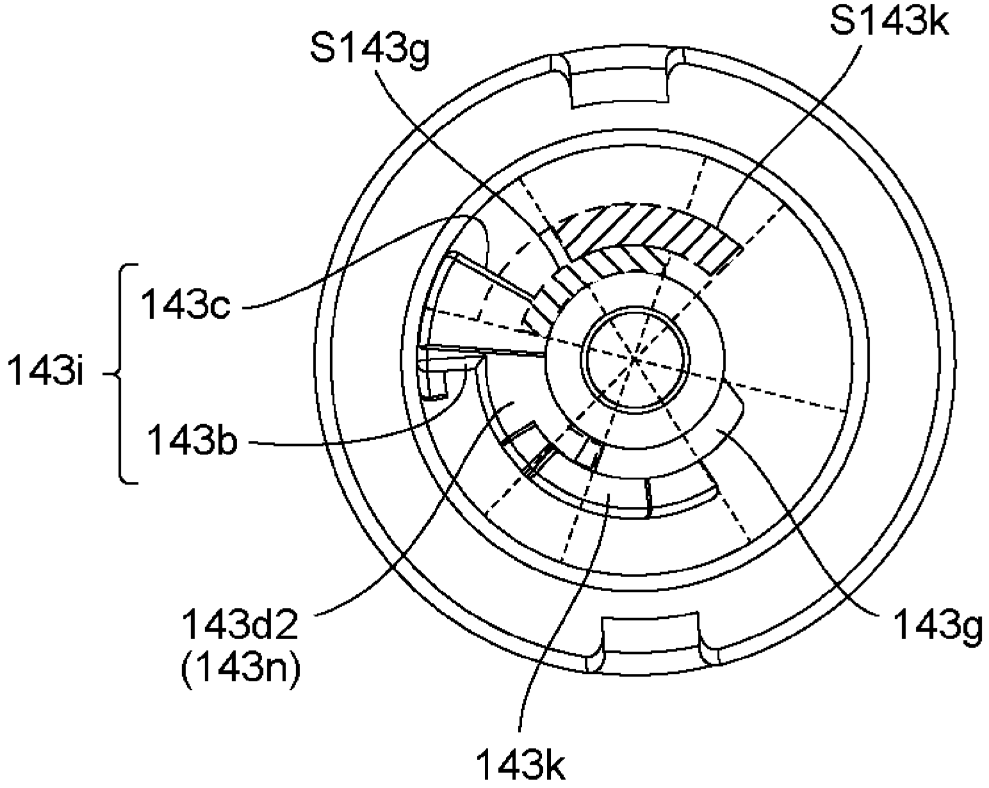
FIG. 96 is a front view of the coupling.

For example, as shown in FIG. 96, the drum coupling 143 visor portion 143*g* shown in FIG. 77 may be moved to the 180° symmetric region S143*g*, or the extrusion surface 143*k* may be moved to the symmetric region S143*k*.

This is because the drum drive coupling 180 and the braking engagement members (204, 208) both have 180° symmetrical shape.

Therefore, regardless of which one of the two 180° symmetrical places is the place where one helical slope 143*d* is disposed, the slope 143*d* can act on the entire braking engagement member (204, 208). Similarly, the extrusion surface 143*k* may be placed at either of the two places which are ° symmetrical with respect to each other. The same applies not only to the visor portion 143*g* and the extrusion surface 143*k*, but also to the braking force receiving portion 143*c*.

Further, the drum drive coupling 180 can engage with the drive force receiving portion 143*b* regardless of whether the drive force receiving portion 143*b* is placed at either of two 180° symmetrical positions.

The drum drive coupling 180 has two drive transmission surfaces 180*d*, but the two drive transmission surfaces 180*d* move integrally (part (a) of FIG. 45). Further, the braking engagement members (204, 208) have two coupling engaging portions 204*b* and two each, and all of these coupling engaging portions move integrally (see part (b) of FIG. 45).

As another modification in which the shape of the drum coupling 143 is made asymmetrical as described above, there is also a follow structure. That is, one coupling portion 143*s* has an engaging portion 143*i* but does not have a guide forming portion 143*n*, and the other coupling portion 143*r* has a guide forming portion 143*n* but does not have an engaging portion 143*i*. Such a structure is conceivable.

Figure 97:
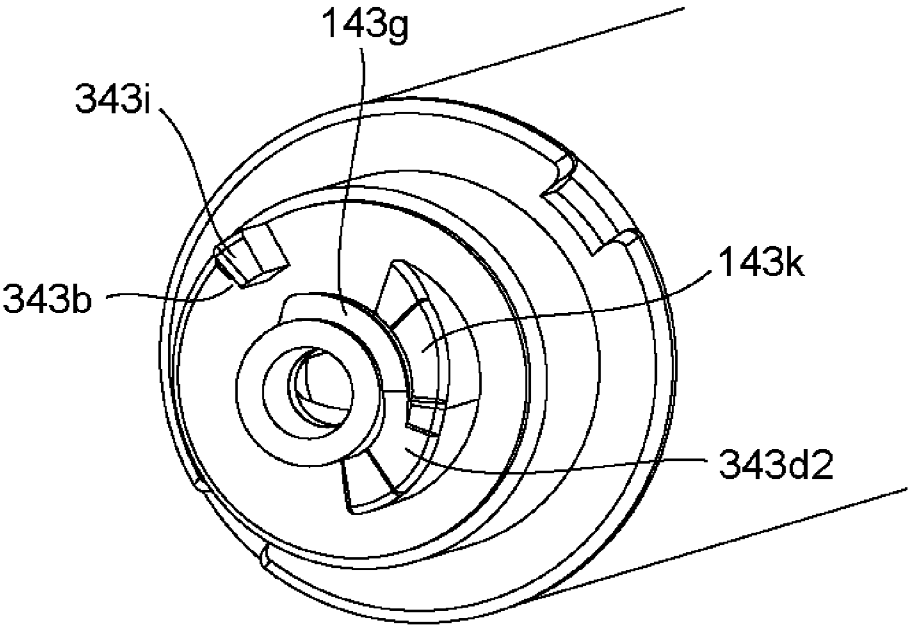
In FIG. 97, part (a) is a perspective view of the coupling, and part (b) is a front view.
Figure 97:
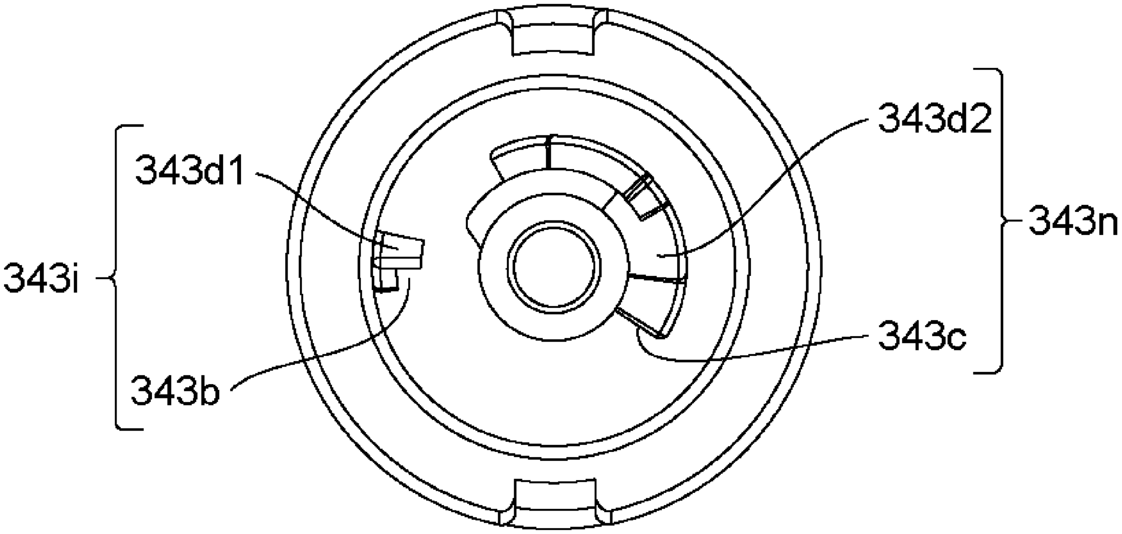

Examples of such a structure are shown in parts (a) and (b) of FIG. 97. Part (a) of FIG. 97 is a perspective view of a modified example of the drum coupling, and part (b) of FIG. 97 is a front view thereof.

In the modified example of the drum coupling shown in these Figures, the guide forming portion 343*n* and the engaging portion 343*i* have one. The guide forming portion 343*n* forms a helical slope (guide, top surface, inclined portion) 343*d*2. The engaging portion 343*i* forms a driving force receiving portion 343*b* and a helical slope (guide, top surface, inclined portion) 343*d*1. The guide forming portion 343*n* and the engaging portion 343*i* are located on opposite sides of the axis L. Further, in this modification, the braking force receiving portion 343*b* is not arranged at the engaging portion 343*i*, but is arranged at the end portion downstream of the guide forming portion 343*n* in the rotational direction. That is, the engaging portion 343*i* engages with the driving force applying member (drum drive coupling) 180, but does not engage with the braking force applying member (braking engagement members 204, 208).

Figure 99:
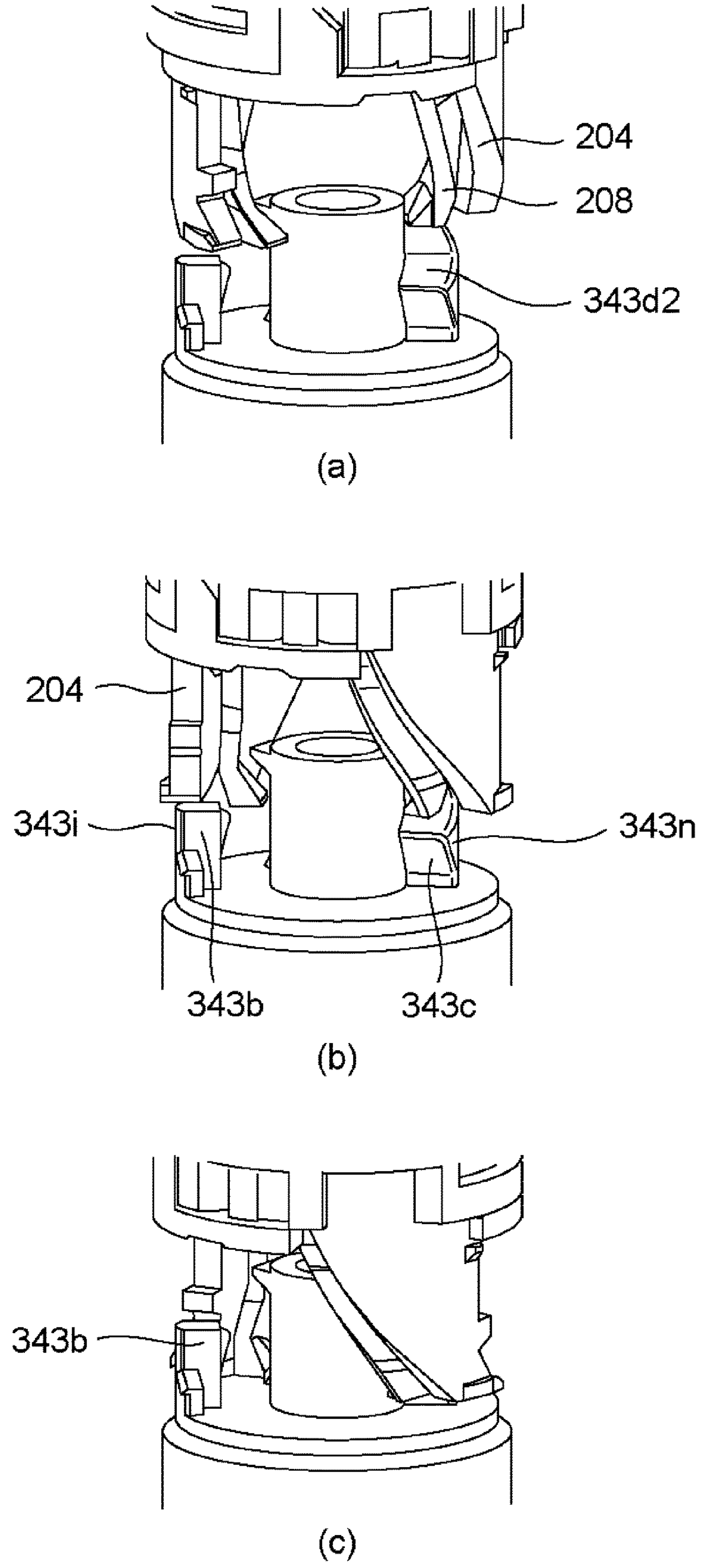
FIG. 99 is a perspective view illustrating an engaged state of the coupling and the braking engagement member.

Part (a) of FIGS. 99, (b), and (c) show the engagement process of the drum coupling and the braking engagement member (204, 208) of this modified example in this order. For the sake of explanation, the drum drive coupling 180 of the drive transmission unit 203 is not shown.

As shown in part (a) of FIG. 99, when the second braking engagement member 208 comes into contact with the slope 343*d*2 of the guide forming portion 343*n*, the second braking engagement member 208 is on the downstream side in the rotational direction and in the axial direction. The movement is started so as to approach the photosensitive drum 104.

As shown in part (b) of FIG. 99, when the second braking engagement member 208 reaches the neighborhood of the end of the upstream slope 343*d*2, the first braking engagement member 204 is brought into contact with the slope 343*d*1 which is the top surface of the engaging portion 343*i*. Thereafter, the braking engagement members (204, 208) continue to rotate, and, the free end of the first braking engagement member 204 enters the space downstream of the engaging portion 343*i*, as shown in part (c) of FIG. 99. The first braking engagement member 204 reaches a position where it can engage with the braking force receiving portion 343*c* (see part (b) of FIG. 97.

As described above, also in the drum coupling of the present modification shown in FIGS. 97 and 99, any portion thereof can be shifted to a 180° symmetrical position. For example, as shown in part (a) of FIG. 98, the engaging portion 343*i* and the driving force receiving portion 343*b* can be shifted to the positions S343*i* and S343*b* which are 180° symmetrical positions, respectively. The coupling in which the engaging portion 343*i* is shifted to S343*i*, is similar to the modified example of the drum coupling shown in FIG. 77. Conversely, when a portion of the drum coupling portion shown in FIG. 77 is shifted to a position symmetrical by 180°, the shape is similar to that of the drum coupling of this modification shown in FIG. 97.

Figure 98:
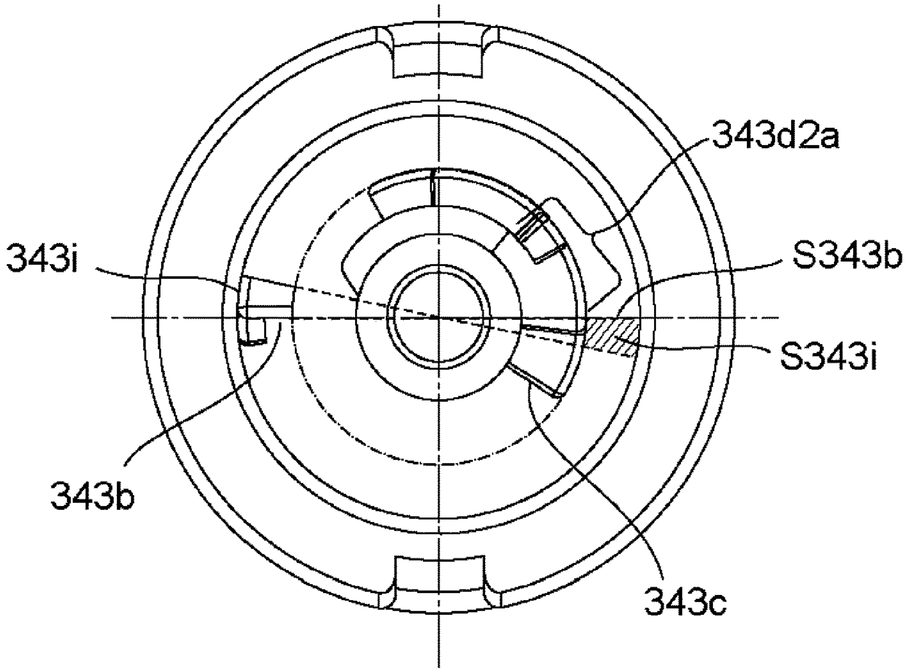
FIG. 98 is a front view of the coupling.
Figure 98:
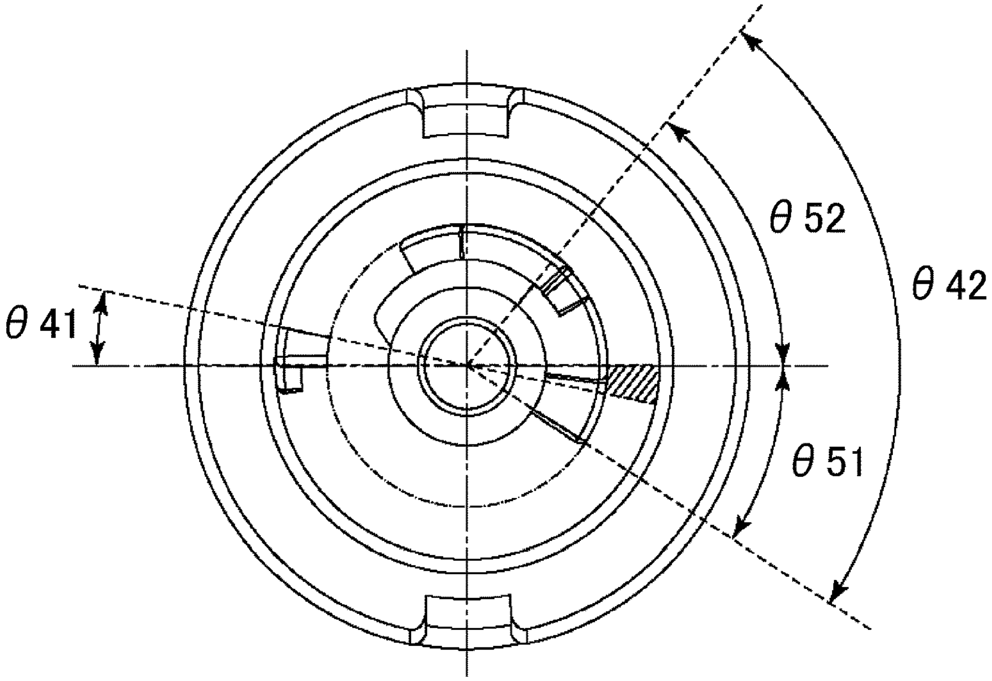

As shown in part (a) of FIG. 98, in this modification, when the engaging portion 343*i* is imaginarily placed at the 180° symmetrical position S343*i*, the slope 343*d*2 is adjacent to the imaginarily arranged engaging portion S343*i*. The upstream side portion 343*d*2*a* of the slope 343*d*2 extends from the upstream to the downstream in the rotational direction toward the imaginarily arranged engaging portion S343*i* and the imaginarily arranged driving force receiving portion S343*b*.

Part (b) of FIG. 98 shows the angles θ41, θ42, θ51, and θ52 regarding the dimensions of each portion in this modification.

Angle θ41 is the angle of the region where the engaging portion 343*i* is arranged. θ42 is the angle of the region occupied by the helical slope 343*d*2 of the guide forming portion 343*n*. θ51 is an angle indicating a region from S343*b* in which the driving force receiving portion 343*b* is imaginarily arranged at 180° symmetrical positions to the braking force receiving portion 343*c*. θ52 is the angle of the region occupied by the portion 343*d*2*a* located on the helical slope 343*d*2 on the upstream side in the rotational direction from the position S343*b* of the imaginarily arranged driving force receiving portion.

Angle θ41 is preferably not less than 1°, further preferably not less than 2°, and even further preferably not less than 8°, from the stand point of assuring the strength of the driving force receiving portion 343*b*.

Angle θ51 corresponds to the angle of the gap between the braking engagement member (204, 208) and the drum drive coupling 180. Therefore, it is desirably not more than 80° as described above.

Further, since θ51 is larger than θ41, θ51 is preferably 1° or more, further preferably 2° or more, and even further preferably 8° or more. Furthermore, it is desirable that θ41 is 80° or less.

Angle θ52 is an angle corresponding to θ12 in FIG. 101, and the preferred range of θ52 is the same as that of θ12. Further, since θ42 is an angle corresponding to θ13 in FIG. 101, the preferable range of θ42 is the same as that of θ13.

Figure 100:
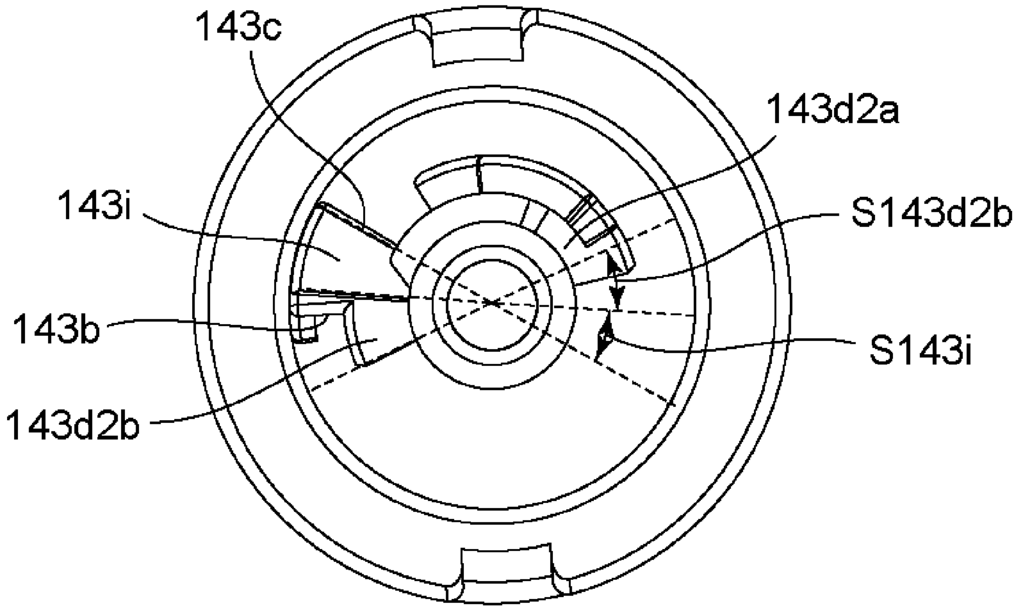
FIG. 100 is a front view of the coupling.
Figure 100:
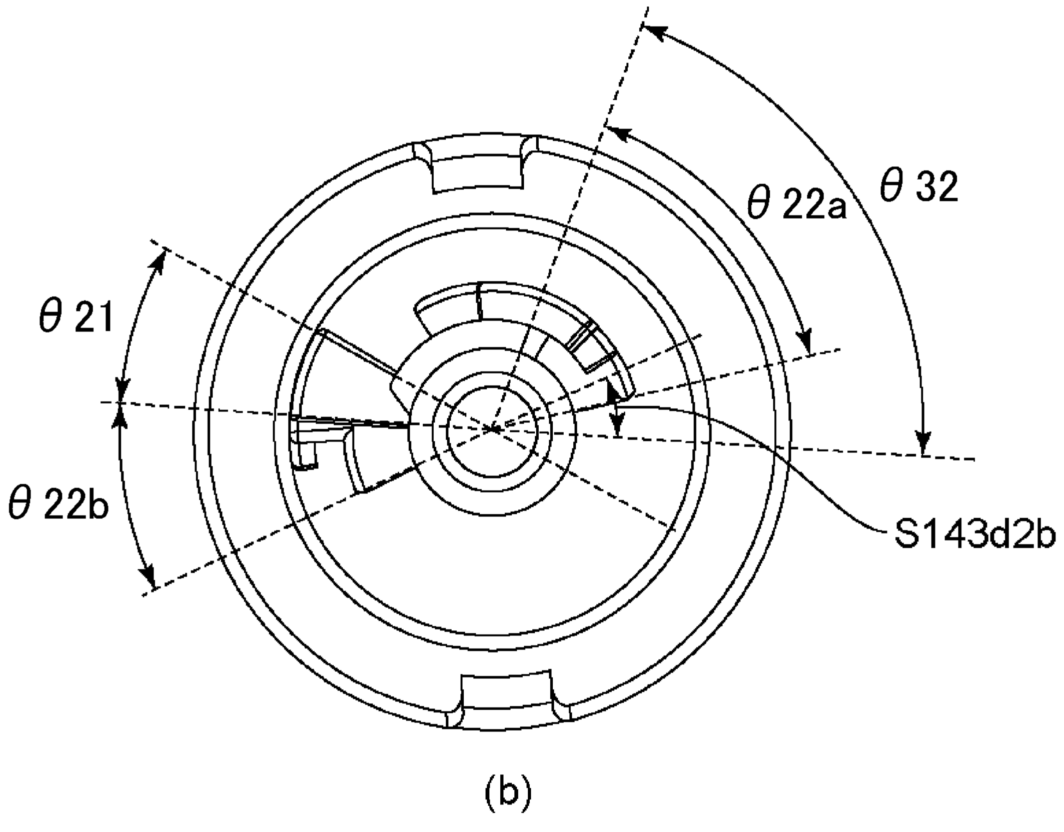

Further, another modification of the asymmetrically shaped drum coupling is shown in part (a) of FIG. 100 and part (b) of FIG. 100. The structure is such that the upstream slope 143*d*2 of the Embodiment 1 (see FIG. 58 and the like) is divided and arranged at two places. That is, the upstream slope 143*d*2 is divided into an upstream portion 143*d*2*a* and a downstream portion 143*d*2*b*. The engaging portion 143*i* is adjacent to the downstream portion 143*d*2*b* of the upstream side slope 143*d*2.

The dimensional relationship in this modified example is shown in part (b) of FIG. 100. The angle θ21 is the angle of the engaging portion 143*i* and corresponds to the angle θ11 in FIG. 101. The preferred angle of θ21 is the same as the angle θ11. θ22*b* is an angle of the range occupied by the downstream portion 143*d*2*b* of the upstream side slope 143*d*2, and θ22*b* is an angle occupied by the upstream portion 143*d*2*a* of the upstream side slope 143*d*2.

The region in which the downstream portion 143*d*2*b* of the upstream slope 143*d*2 is imaginarily moved to a position 180° symmetrical is the region S143*d*2*b*. At this time, the angle of the region occupied by the virtual region S143*d*2*b* and the upstream portion 143*d*2*a* is θ32. Since θ32 corresponds to the angle θ12 in FIG. 101, the preferred angle range of θ32 is equivalent to the preferred angle range of θ12.

The range of suitable angles of θ22*a* and θ22*b* is also based on θ12.

Further, a further modification of the drum coupling will be described. The helical slope 143*d* and the upstream slope 143*d*2 as the guide and the upstream guide can be changed to be longer than those the drum coupling of the Embodiment 1 (FIG. 1 and so on). Such an example is shown in FIGS. 102 and 103. In the drum couplings shown in these Figures, the helical slope 443*d*2 corresponding to the upstream slope 143*d*2 is extended to exceed 360°. That is, the helical slope 443*d*2 is extended more than one full circumference.

The engaging portion 443*i* corresponding to the engaging portion 143*i* of the Embodiment 1 is provided separately from the slope 443*d*2. The engaging portion 443*i* includes a braking force receiving portion 443*c*1 and a driving force receiving portion 443*b*. The braking force receiving portion 443*c*2 is also provided in the neighborhood of the end of the helical slope 443*d*2. The braking force receiving portion 443*c*1 and the braking force receiving portion 443*c*2 are arranged at positions 180° symmetrical.

Figure 103:
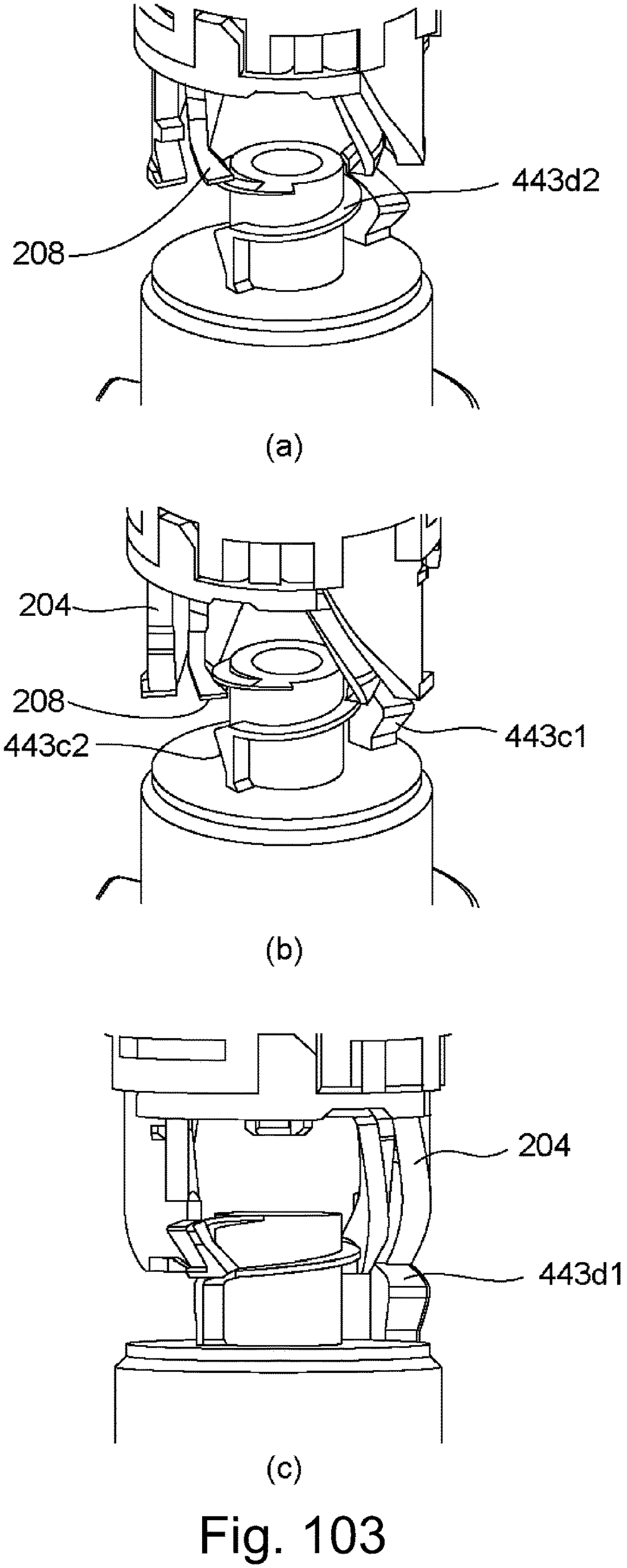
FIG. 103 is a perspective view illustrating an engaged state of the coupling and the braking engagement member.

In part (a) of FIG. 103, part (b) of FIG. 103, and part (c) of FIG. 103, the engagement process of the drum coupling and the braking engagement member in this modified example are shown in chronological order. The drum drive coupling 180 is not shown for the sake of illustration.

As illustrated in FIG. 103, the braking engagement members (204, 208) rotate one or more turns by being guided by the helical slope 443*d*2. In this manner, it is possible to increase the length of the helical slope 443*d*2, which is the guide and the inclined portion, beyond 360°. However, if the helical slope 443*d*2 is long, the time required for the braking engagement member (204, 208) to pass through the helical slope 443*d*2 is long, or the speed of the braking engagement member (204, 208) on the helical slope 443*d*2 is slow, as the case may be. In order to deal with this, when the drive transmission unit 203 and the coupling 143 are engaged with each other it may be necessary to take measures to secure sufficient time for the braking engagement member (204, 208) to pass the helical slope 443*d*2, by decreasing the rotation speed of the drive transmission 203, for example.

In order to smoothly engage the drive transmission unit 203 and the drum coupling 143 with each other while rotating the drive transmission unit 203 at high speed It is desirable to shorten the time required for the braking engagement members (204, 208) to pass in the helical slope 443*d*2. From that standpoint, it is further preferable that the length of the helical slope (inclined portion, guide) 443*d*2 is 360° or less, and it is further preferable that the length is 270° or less.

As described above, it is also possible to use a modified example in which the drum coupling of the Embodiment 1 is changed to an asymmetrical shape.

Figure 58:
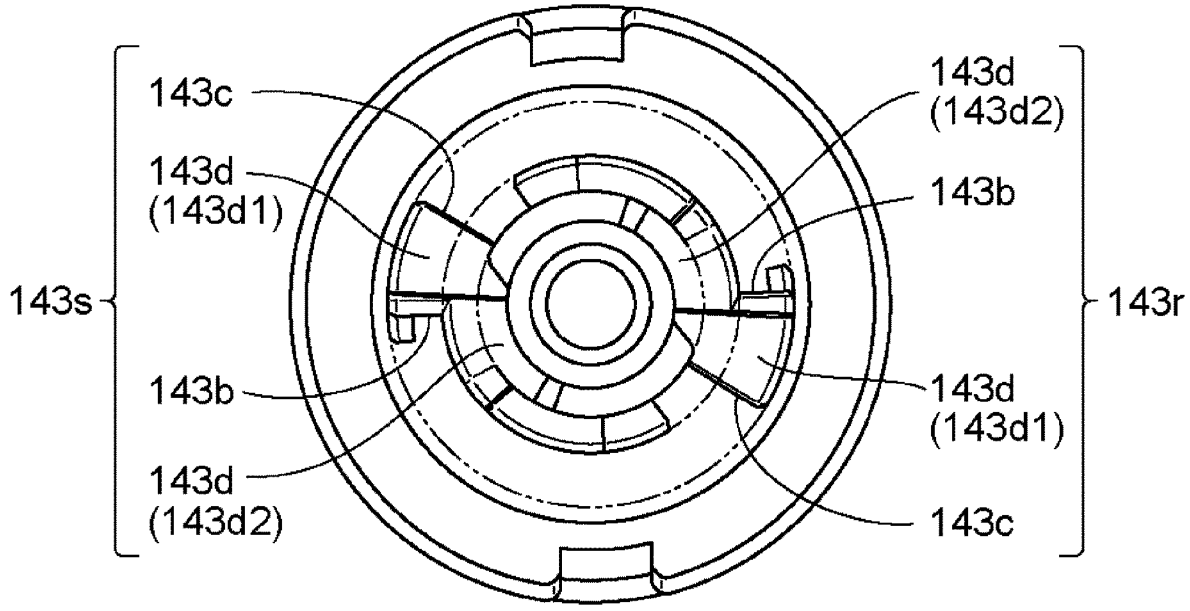
FIG. 58 is a top view of the drum coupling.

However, as in the drum coupling 143 of the Embodiment 1 shown in FIGS. 1 and 58, It is further preferable that the coupling 143 includes the driving force receiving portion 143*b* and the braking force receiving portion 183*c* at 180° apart two positions, because then the engagement state of the drive transmission unit 203 with the coupling 143 and the transmission state of the drive force are stabilized. The coupling 143 receives the driving force at two symmetrically arranged points, and the braking force is also received at two symmetrically arranged points. Therefore, it becomes easy to maintain the balance of the force applied to the coupling 143.

Further, in the drum coupling 143 (see FIG. 1) of the Embodiment 1 described above, each shaped portion (engagement portion, guide forming portion, visor portion, and so on) of the coupling has a specific arrangement relationship. However, it is also conceivable to change these arrangement relationships by making any portion of the coupling 143 movable.

Figure 104:
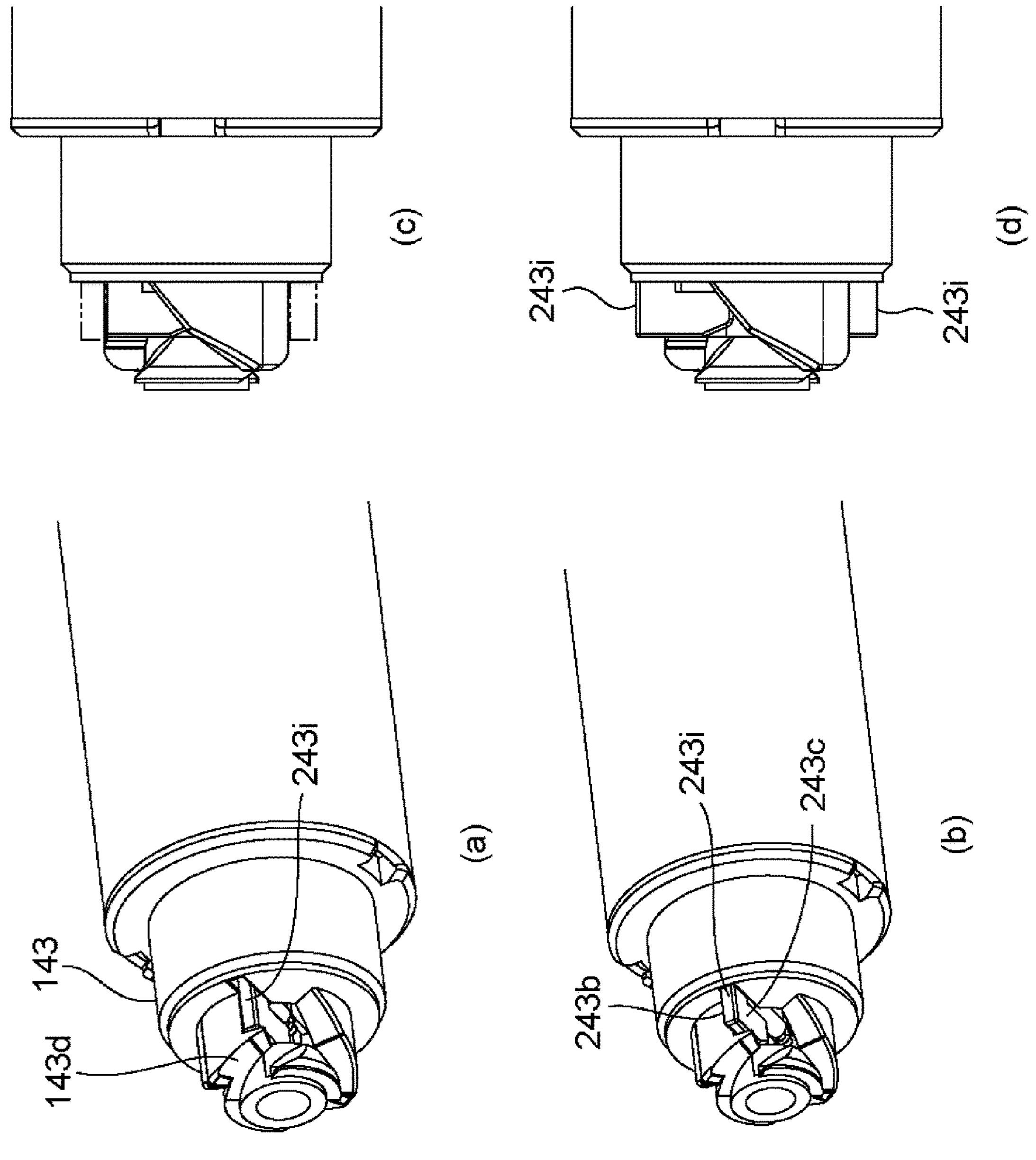
FIG. 104 is a perspective view and a side view of the drum unit.
Figure 105:
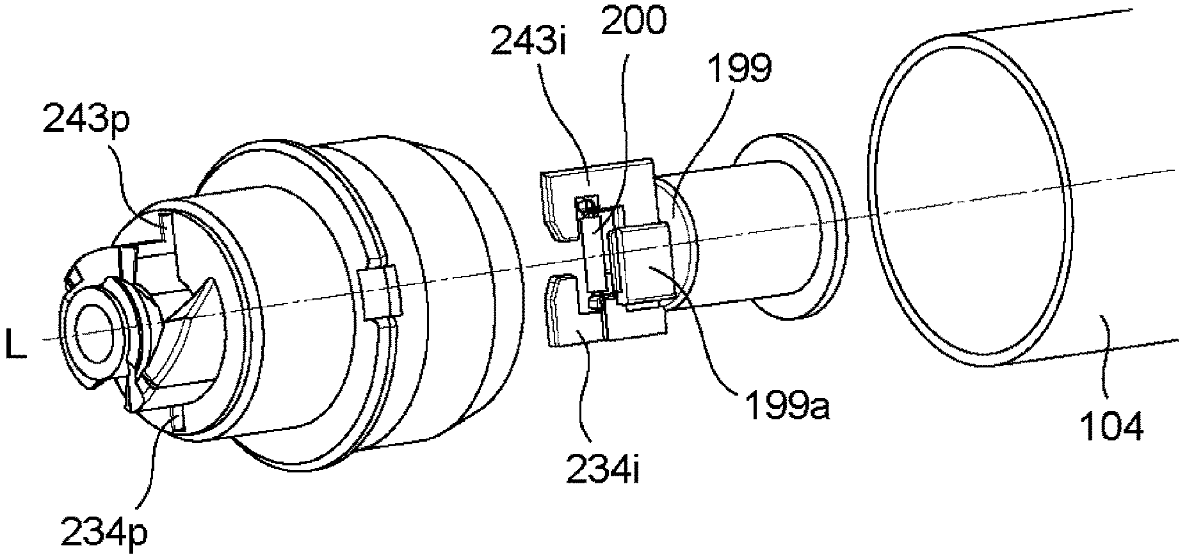
FIG. 105 is a perspective view of the drum unit and a front view of the coupling.
Figure 105:
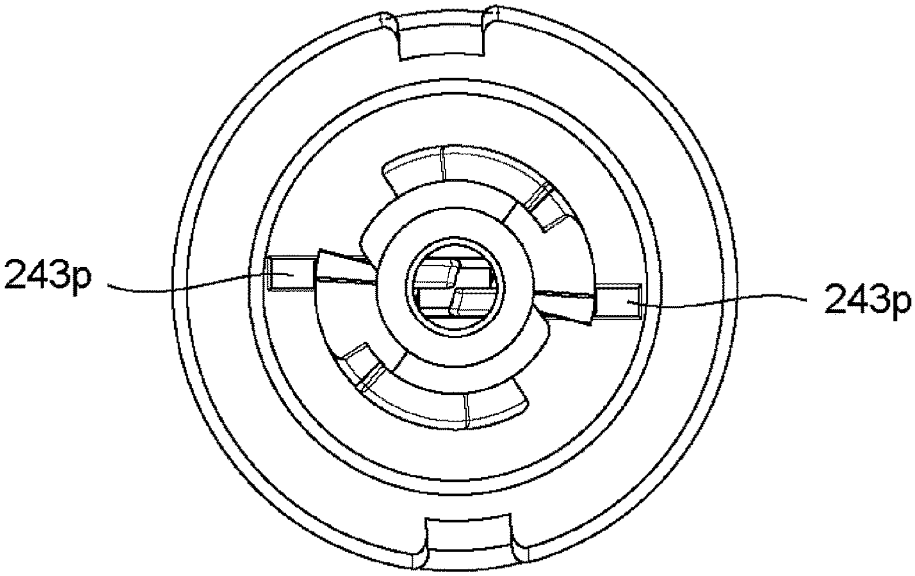
Figure 106:
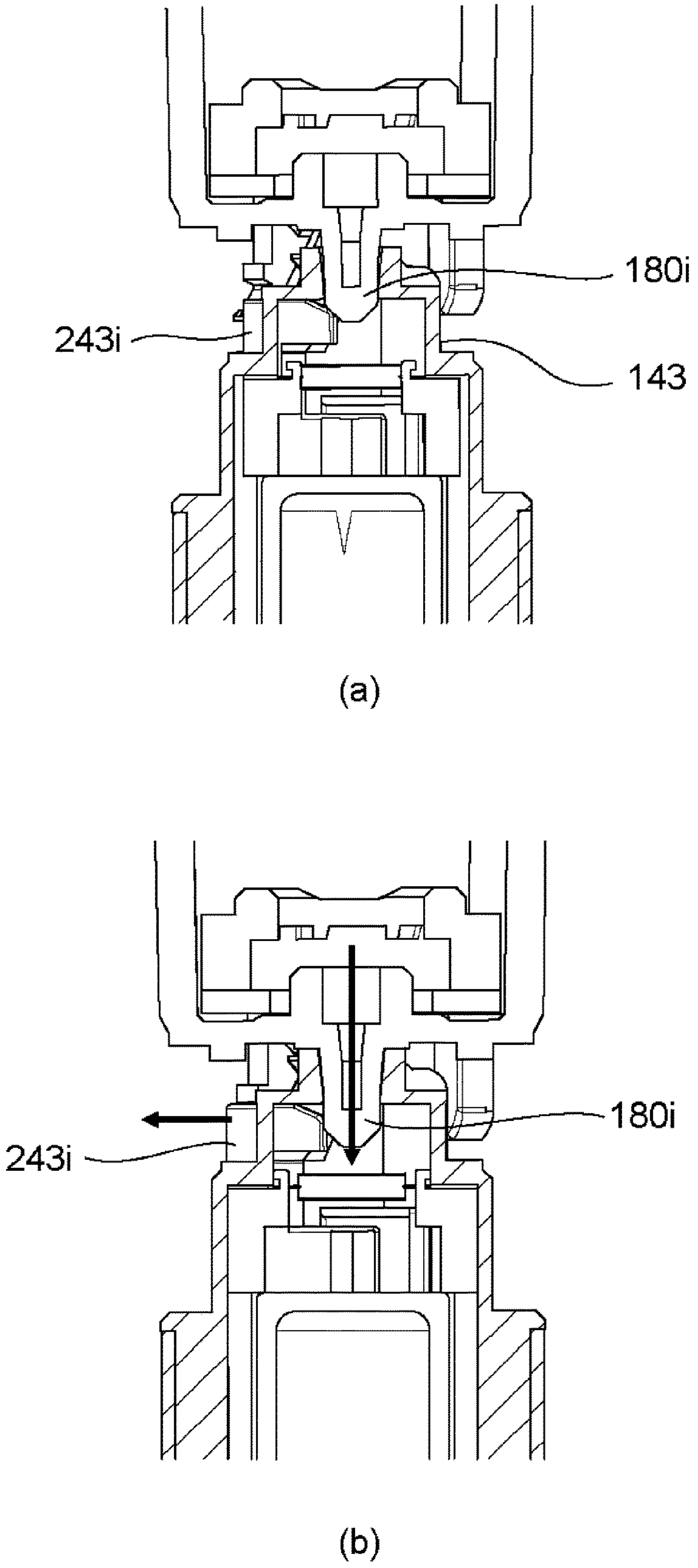
FIG. 106 is a sectional view of the drum unit.

As an example of such a structure, FIGS. 104 to 106 show a structure in which the engaging portion 243*i* is movable relative to other portions of the drum coupling 143, And specifically, a structure in which the engaging portion 243*i* can advance and retract in the radial direction. As shown in FIG. 105, the drum coupling 143 is provided with two openings 243*p*, and the engaging portion 243*i* is partially exposed from the inside of the drum coupling through these openings 243*p*.

As shown in part (a) of FIG. 105, the two engaging portions 243*i* are supported by a guide 199*a* of a support member 199 provided inside the drum coupling Further, In addition, the engaging portion 243*i* is structured to be movable in the radial direction along the guide 199*a*, but is urged inward in the radial direction by the tension spring 200.

Therefore, when the cartridge is not used, the two engaging portions 243*i* are retracted inside the drum coupling as shown in part (a) of FIG. 104 and part (c) of FIG. 104. On the other hand, when the cartridge is to be mounted to the image forming apparatus main assembly, the positioning boss 180*i* enters the inside of the drum coupling and comes into contact with the engaging portion 243*i* as shown in part (a) of FIG. 106. Further, when the positioning boss 180*i* enters the inside of the drum coupling 143, the engaging portion 243*i* is pushed outward in the radial direction by the positioning boss 180*i*. By this, as shown in part (b) of FIG. 104 and part (d) of FIG. 104, a part of the engaging portion 243*i* advances toward the outside of the drum coupling 143.

In this state, both side portions of the engaging portion 243*i*, that is, the driving force receiving portion 243*b* and the braking force receiving portion 243*c* are exposed, and the driving force and the braking force can be received from the image forming apparatus main assembly, respectively.

As described above, the arrangement relationship and shape of the coupling 143 are not constant and may vary or change. For example, it is conceivable the when the cartridge is not in use, the drum coupling portion which is vulnerable to external impact is retracted to be protected.

When a portion of the coupling 143 is movable, the state in which in which the coupling is actually used, that is, The state of the coupling 143 when the cartridge and the drum unit are mounted to the image forming apparatus main assembly and the coupling 143 engages with the drive transmission unit 203 may be regarded as a reference state, the shape of the coupling 143 and the arrangement relationship of each portion may be structured to satisfy the desired conditions as described above, in such a reference state.

Figure 107:
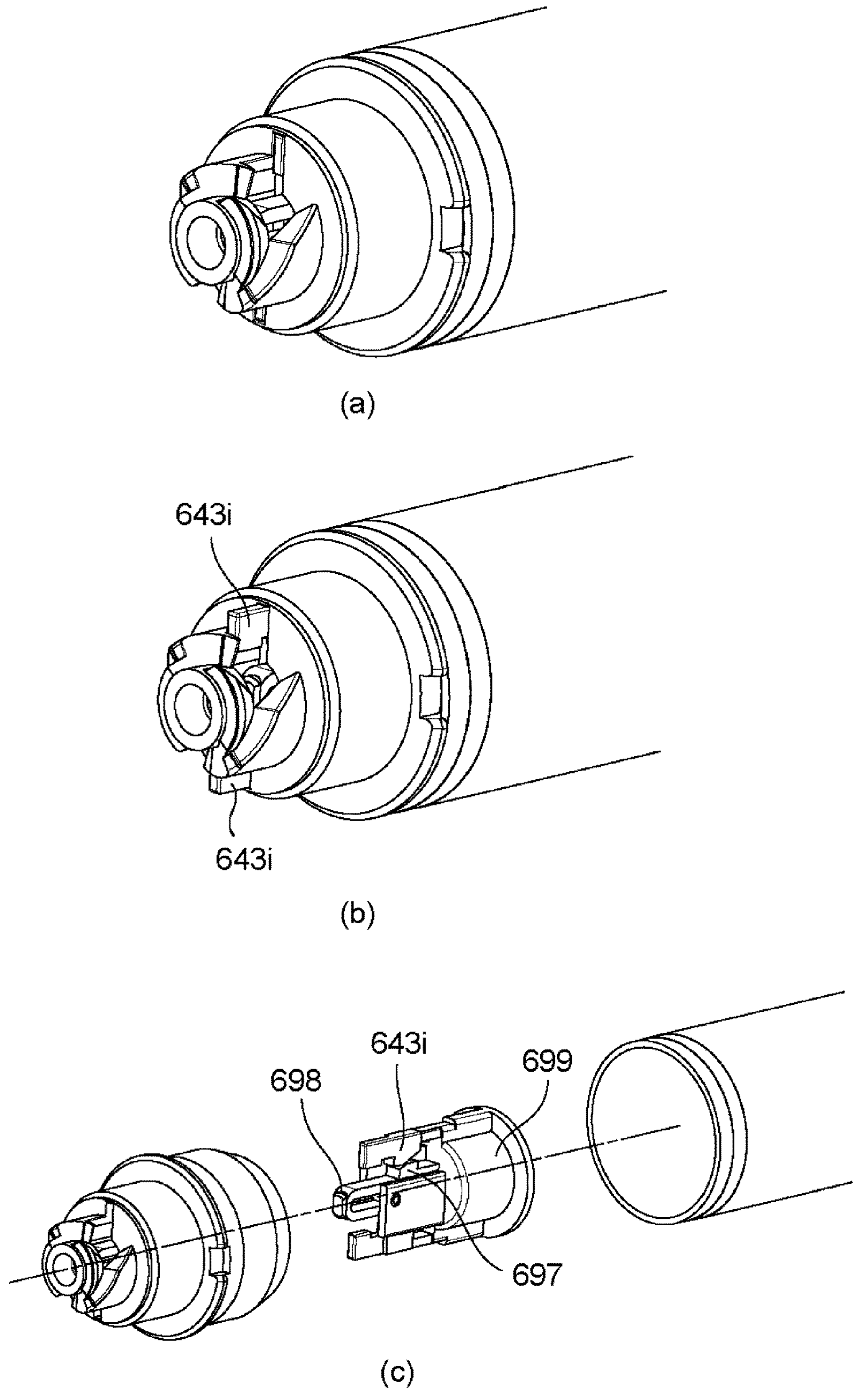
FIG. 107 is a perspective view of the drum unit.
Figure 108:
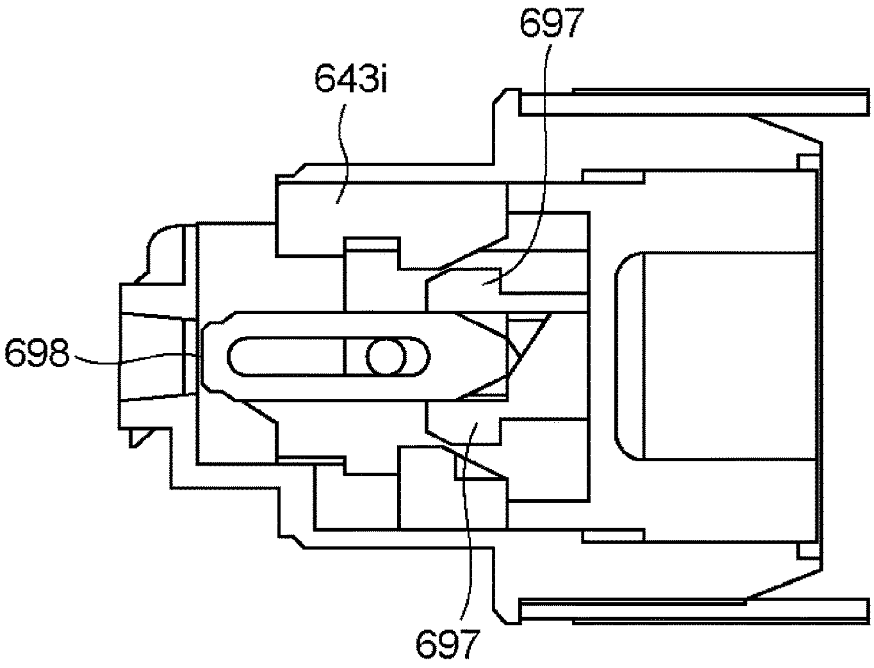
FIG. 108 is a sectional view of the coupling.
Figure 108:
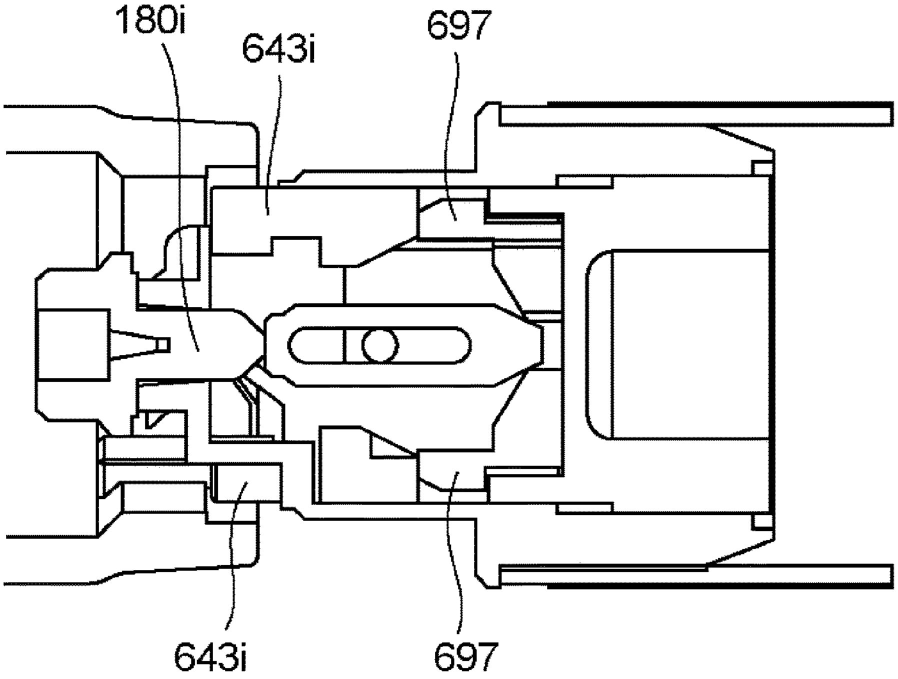

Further, FIGS. 107 and 108 show another modified example of the drum coupling 143 structured so that a part of the drum coupling 143 is deformed and moved. In the above described modified example (see FIG. 105), the engaging portion 243*i* is structured to move in the radial direction, but in this modified example, the engaging portion 643*i* is structured to move in the axial direction. Part (a) of FIG. 107 shows a state in which the engaging portion 643*i* is retracted inside the drum coupling, and part (b) of FIG. 107 shows the engaging portion 643*i* moving toward the outside of the drum coupling and away from the photosensitive drum. Part (c) of FIG. 107 is an exploded perspective view of the drum unit in this modified example.

Part (a) of FIGS. 108 and 108(*b*) show sectional views of the drum unit. Part (a) of FIG. 108 shows a state before the drum unit is mounted to the apparatus main assembly, and part (b) of FIG. 108 shows a state after the drum unit is mounted thereto.

When the drum unit is mounted to the main assembly of the apparatus, the positioning boss 180*i* provided on the drive transmission unit comes into contact with the working member of the drum coupling Then, as shown in part (b) of FIG. 108, the operating member 698 moves inward in the axial direction (on the right side in the drawing). As the operating member 698 moves, the interlocking member 698 is pushed outward in the radial direction inside the drum coupling. As the interlocking member 698 moves outward in the radial direction, the engaging portion 643*i* is pressed outward in the radial direction by the interlocking member 698. As a result, the state is changed to the engaging portion 643*i* being partly exposed to the outside (part (b) of FIGS. 107 and 108 (b)) from the state of being retracted inside the drum unit (part (a) of FIG. 107 and part (a) of FIG. 108).

When a part of the drum coupling is movably provided in this manner, the moving direction may be the radial direction or the axial direction. A part of the drum coupling may move in both the radial direction and the axial direction, or may move in the rotational direction.

Next, referring to Figures and 110 another modification of the drum coupling will be described. Similarly to the above two modifications, the drum coupling 1043 of this modification is also structured so that a part thereof is deformed and moved.

Figure 109:
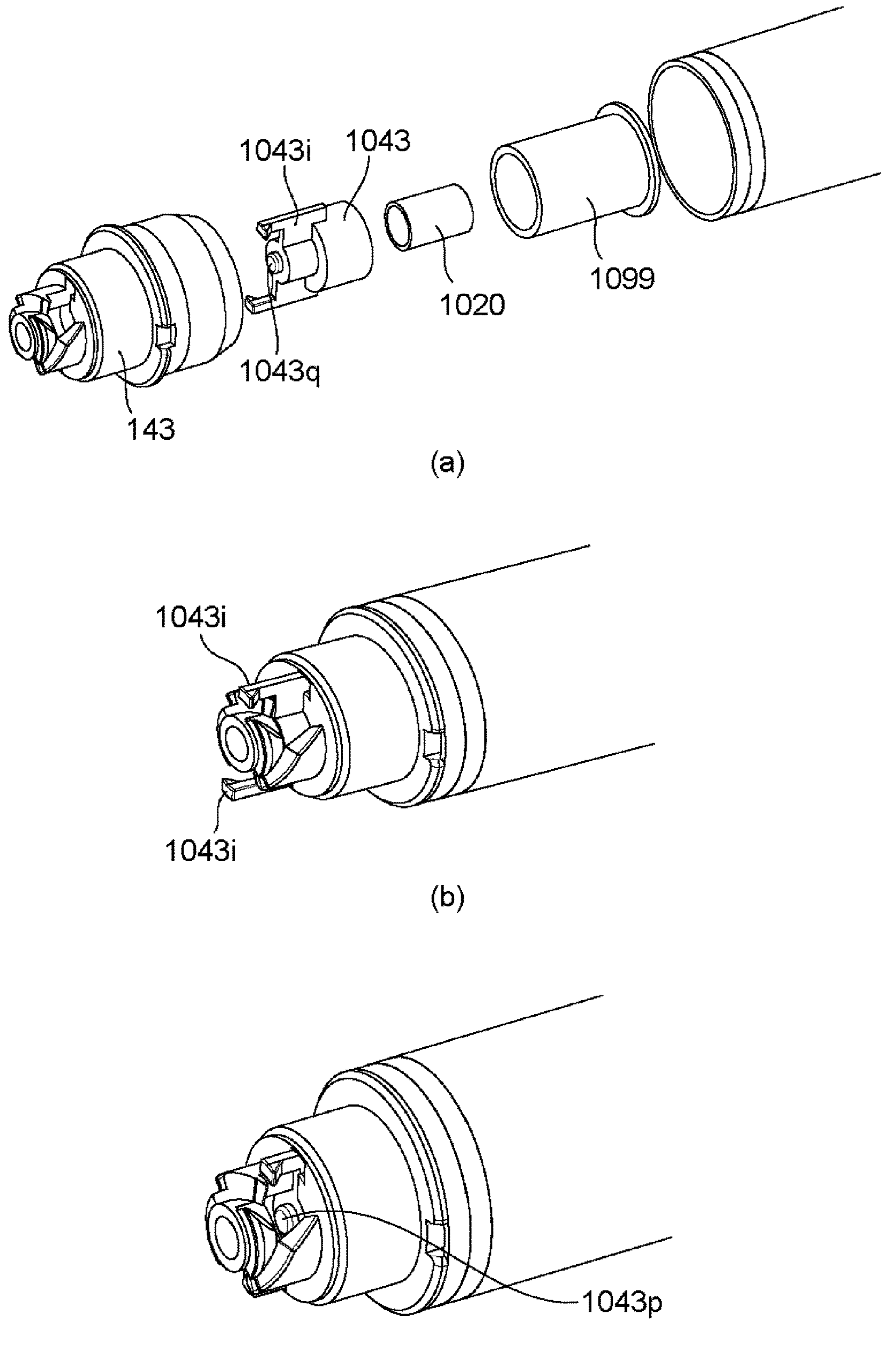
FIG. 109 is a perspective view of the drum unit.

Part (a) of FIG. 109 is an exploded perspective view of the drum unit of this modified example. Part (b) of FIG. 109 shows a state in which the engaging portion 1043*i* of the drum coupling has advanced toward the outside of the drum unit, and part (c) shows a state in which the engaging portion 1043*i* is partially retracted toward the inside.

In this modification, the engaging portion 1043*i* is in a projected (advanced) state as shown in part (b) of FIG. 109 before the drum unit is mounted on the apparatus main assembly. On the other hand, after the drum unit is mounted to the main assembly of the apparatus, the engaging portion 1043*i* changes to the retracted state as shown in part (c) of FIG. 109.

Figure 110:
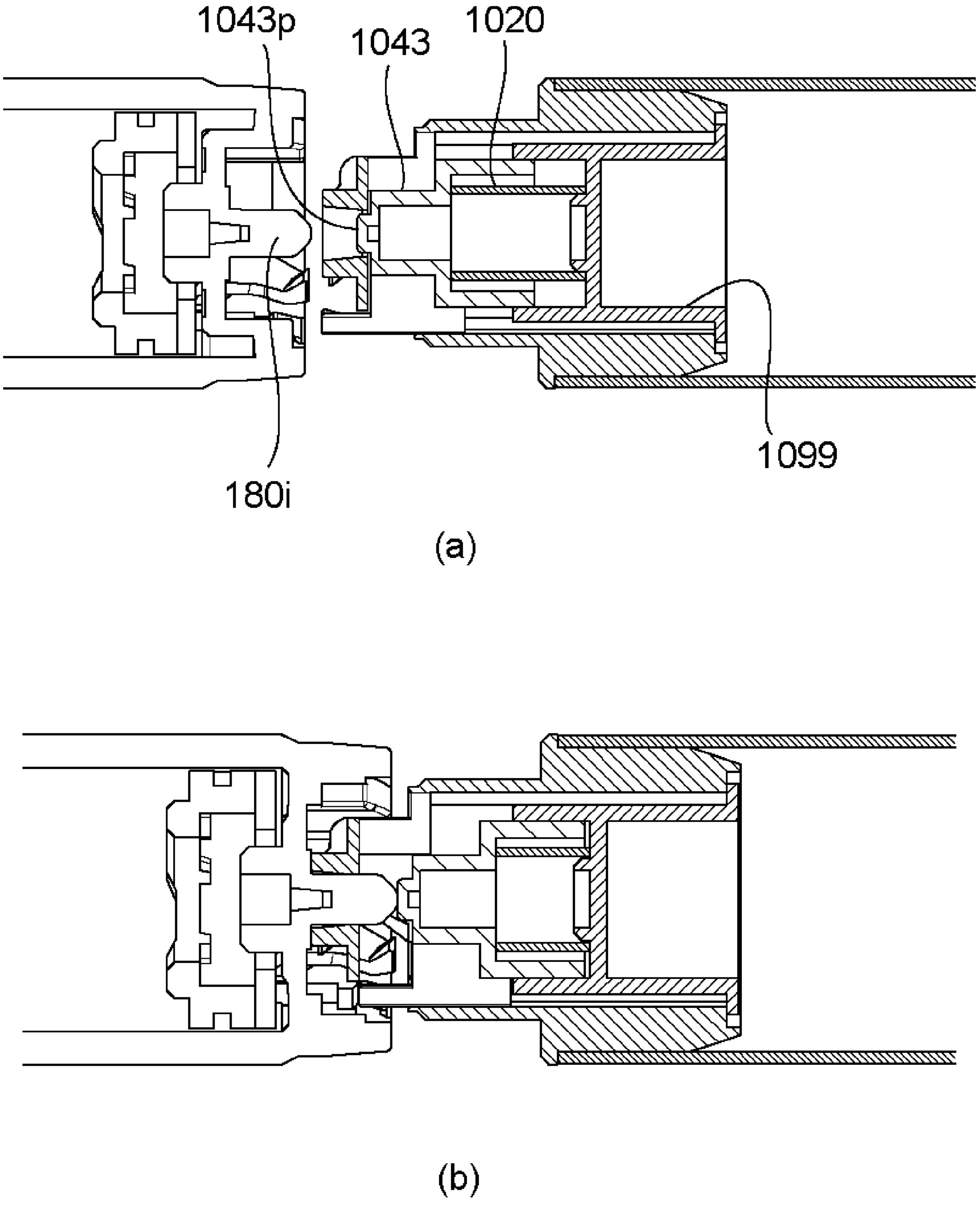
FIG. 110 is a sectional view of the drum unit and the drive transmission unit.

Part (a) of FIG. 110 and part (b) of FIG. 110 show sectional views of the drum unit. FIG. 110(A) shows the state before the drum unit is completely mounted on the apparatus main assembly, and part (b) shows the state after the mounting is completed.

As shown in part (a) of FIG. 109, the engaging member 1043 is provided inside the drum coupling so as to be movable in the axial direction. The engaging member 1043 is urged (pressed) to the outside in the axial direction by the pressing coil spring 1020 provided inside the drum coupling 143, and the engaging portion 1043*i*, which is a part of the engaging member 1043, is exposed to the outside of the drum coupling 143.

Then, the engaging member 1043 has an acting portion 1043*p* on its rotation axis. When the drum unit is mounted to the main assembly of the apparatus as shown in part (b) of FIG. 110, the engaging member 1043 and the engaging portion 1043*i* are retracted inward in the axial direction by the acting portion 1043*p* being pushed by the positioning boss 180*i*.

In the above three modified examples, an acting portion capable of receiving an action from the outside of the cartridge is provided inside the coupling 143, and this acting portion is operated by the positioning boss 180*i* to change the shape of the coupling 143. However, it is also conceivable to dispose an acting portion for changing the shape of the coupling 143 at a place other than the inside of the coupling 143.

As described above, the shape and pattern of the coupling can be selected depending on the design reason for arrangement, the manufacturing reason considering the mold for coupling production, and the purpose of protecting the coupling.

Further, in each of the three modified examples of the drum coupling described above, the engaging portion provided with the driving force receiving portion and the braking force receiving portion move relative to other portions. However, a portion such as a helical slope or a visor portion may be movable relative to the other portions.

Further, the cartridge 100 described above includes a photosensitive drum and a developing roller, but the structure of the cartridge 100 is not limited to such a structure. For example, the cartridge 100 may includes a photosensitive drum but no developing roller. As an example of such a structure, a structure in which the cartridge 100 includes only the drum holding unit 108 (see FIG. 19) can be considered.

Further, in the Embodiment 1 and various modified examples thereof, the drum coupling 143 is placed in the neighborhood of one end (the end on the driving side) of the photosensitive drum 104, and it is press-fitted into the photosensitive drum 104. As a result, the driving force can be transmitted from the drum coupling 143 to the end of the photosensitive drum 104. However, the method of connecting the drum coupling 143 and the photosensitive drum 104 is not limited to press-fitting. Further, in the above described example, the drum coupling 143 and the photosensitive drum 104 are integrated to form the drum unit 103, but the drum coupling 143 and the photosensitive drum 104 may be separated from each other without constituting a drum unit.

That is, if the drum coupling 143 is operatively connected to the photosensitive drum 104, that is, if it is connected in a drive-transmittable manner, another connection method can be employed, and the coupling 143 and the photosensitive drum 104 may not constitute the same unit.

For example, one or more relay members may be interposed between the coupling 143 and the photosensitive drum 104. In such a case, it can be deemed that the drum coupling is indirectly connected to the driving side end of the photosensitive drum 104 by way of the relay member. The drum coupling 143 operates the photosensitive drum 104 by way of the relay member by rotating itself.

For example, it is conceivable to mount a gear to the end of the photosensitive drum 104 and to form a gear portion on the outer peripheral surface of the drum coupling 143 as well. In this manner, the gear of the coupling 143 and the gear of the photosensitive drum 104 can be directly meshed with each other, or another idler gear can be interposed between the two gears to transmit the driving force to the photosensitive drum 104 from the drum coupling 143.

In addition to using the gear as a relay member, a method of connecting a drive transmission belt to the drum coupling 143 and the photosensitive drum 104 to use it as the relay member is also conceivable.

It is also conceivable to connect the end of the photosensitive drum 104 on the driving side and the drum coupling 143 by using an old dam coupling as a relay member. In this case, the drum unit 103 can be regarded as a unit including the photosensitive drum 104, the Oldham coupling (relay member), and the drum coupling 143.

As described above, the connection method between the photosensitive drum 104 and the drum coupling 143 may be a direct connection or an indirect connection. Further, the photosensitive drum 104 and the drum coupling 143 may be unitized to form the drum unit 103, or the photosensitive drum 104 and the drum coupling 143 may be provided apart from each other in the cartridge and may not constitute a unit.

However, if the coupling 143 and the photosensitive drum 104 form a drum unit 103 that can rotate integrally, or if the coupling 143 is directly connected to the end of the photosensitive drum 104, The driving (rotating) of the coupling 143 can be more accurately transmitted to the photosensitive drum 104, And therefore, doing so is further preferable.

In this embodiment, the axes of the drum coupling 143 and the photosensitive drum 104 are aligned. That is, the drum coupling 143 and the photosensitive drum 104 are aligned along the same rotation axis L (see FIG. 1). However, when the drum coupling 143 and the photosensitive drum 104 are indirectly connected, the positions of the axes may be different from each other.

In any case, the cartridge can be stably driven by engaging the coupling 143 with the drive transmission unit 203 provided in the main assembly of the apparatus.

An example in which the structure of the cartridge or the like is changed will be further described with reference to the Embodiment 2 in the following.

Embodiment 2

<Overall Structure of Image Forming Apparatus 800>

Figure 82:
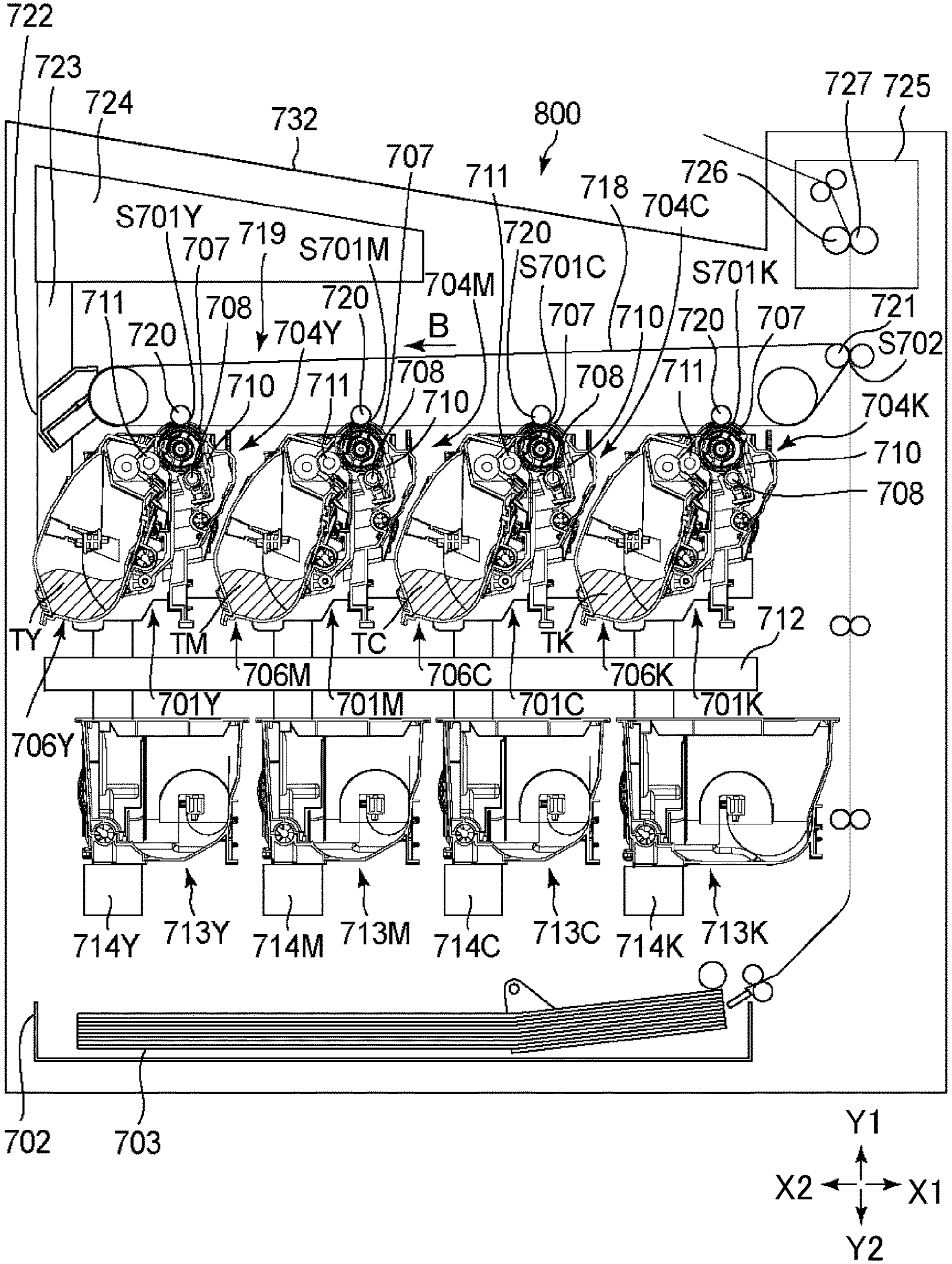
FIG. 82 is a schematic sectional view of the image forming apparatus.

Referring to FIG. 82, the overall structure of the electrophotographic image forming apparatus 800 (hereinafter, image forming apparatus 800) according to this embodiment will be described. FIG. 82 is a schematic view of the image forming apparatus 800 according to this embodiment. In this embodiment, the process cartridge 701 and the toner cartridge 713 are mountable to and dismountable from the main assembly of the image forming apparatus 800.

In this embodiment, the structures and operations of the first to fourth image forming portions are substantially the same except that the colors of the formed images are different. Therefore, in the following, if no particular distinction is required, the subscripts Y to K will be omitted for general explanation.

The first to fourth process cartridges 701 are arranged side by side in the horizontal direction. Each process cartridge 701 includes a cleaning unit 704 and a developing unit 706. The cleaning unit 704 includes a photosensitive drum 707 as an image bearing member, a charging roller 708 as a charging means for uniformly charging the surface of the photosensitive drum 707, and a cleaning blade 710 as a cleaning means. The developing unit 706 includes a developing roller 711 and accommodates a developer T (hereinafter, toner), and includes a developing means for developing an electrostatic latent image on the photosensitive drum 707. The cleaning unit 704 and the developing unit 706 are supported so as to be swingable relative to each other. The first process cartridge 701Y contains yellow (Y) toner in the developing unit 706. Similarly, the second process cartridge 701M contains magenta (M) toner, the third process cartridge 701C contains cyan (C) toner, and the fourth process cartridge 701K contains black (K) toner.

The process cartridge 701 can be mounted to and dismounted from the image forming apparatus 800 by way of mounting means such as a mounting guide and a positioning member provided on the image forming apparatus 800. Further, a scanner unit 712 for forming an electrostatic latent image is provided below the process cartridge 701. Further, in the image forming apparatus 800, the waste toner feeding unit 723 is provided behind the process cartridge 701 (downstream in the mounting/dismounting direction of the process cartridge 701).

The first to fourth toner cartridges 713 are arranged horizontally below the process cartridge 701 in an order corresponding to the color of the toner contained in the respective process cartridges 701. That is, the first toner cartridge 713Y contains the yellow (Y) toner, similarly, the second toner cartridge 713M contains the magenta (M) toner, the third toner cartridge 713C contains the cyan (C) to the, and the fourth Toner cartridge 713K contains the black (K) toner. Each toner cartridge 713 replenishes the process cartridge 701 containing the toner of the same color.

The replenishment operation of the toner cartridge 713 is carried out when a remaining amount detecting portion provided in the main assembly of the image forming apparatus 800 detects insufficient remaining amount of toner in the process cartridge 701. The toner cartridge 713 can be mounted to and dismounted from the image forming apparatus 800 by way of mounting means such as a mounting guide and a positioning member provided in the image forming apparatus 800. A detailed description of the process cartridge 701 and the toner cartridge 713 will be described hereinafter.

Below the toner cartridge 713, first to fourth toner feeding devices 714 are arranged corresponding to each toner cartridge 713. Each toner feeding device 714 transports the toner received from each toner cartridge 713 upward, and supplies the toner to each developing unit 706.

An intermediary transfer unit 719 as an intermediary transfer member is provided above the process cartridge 701. The intermediary transfer unit 719 is arranged substantially horizontally with the primary transfer unit (S1) side facing down. The intermediary transfer belt 718 facing each photosensitive drum 707 is a rotatable endless belt, which is stretched on a plurality of tension rollers. On the inner surface of the intermediary transfer belt 718, a primary transfer roller 720 is provided as a primary transfer member at a position where the corresponding photosensitive drum 707 and primary transfer portion S1 are provided by way of the intermediary transfer belt 718. Further, the secondary transfer roller 721, which is a secondary transfer member, contacts with the intermediary transfer belt 718, and forms a secondary transfer portion S2 in cooperation with a roller on the opposite side by way of the intermediary transfer belt 718. Further, in the left-right direction (the direction in which the secondary transfer portion S2 and the intermediary transfer belt are extended), the intermediary transfer belt cleaning unit 722 is provided on the side opposite to the secondary transfer portion S2.

A fixing unit 725 is provided above the intermediary transfer unit 719. The fixing unit comprises a heating unit 726 and a pressure roller 727 which is press-contacted with the heating unit 726. A discharge tray 732 is provided on the upper surface of the main assembly of the apparatus, and a waste toner collection container 724 is provided between the discharge tray 732 and the intermediary transfer unit 719. Further, a sheet feed tray 702 for accommodating the recording material 703 is provided at the lowermost portion of the main assembly of the apparatus.

The recording material 703 is for receiving and being subjected to a toner image fixing operation on the surface thereof by the apparatus main assembly, and an example of the recording material 703 is paper.

<Image Forming Process>

Next, referring to FIGS. 82 and 83, the image forming operation in the image forming apparatus 800 will be described.

Figure 83:
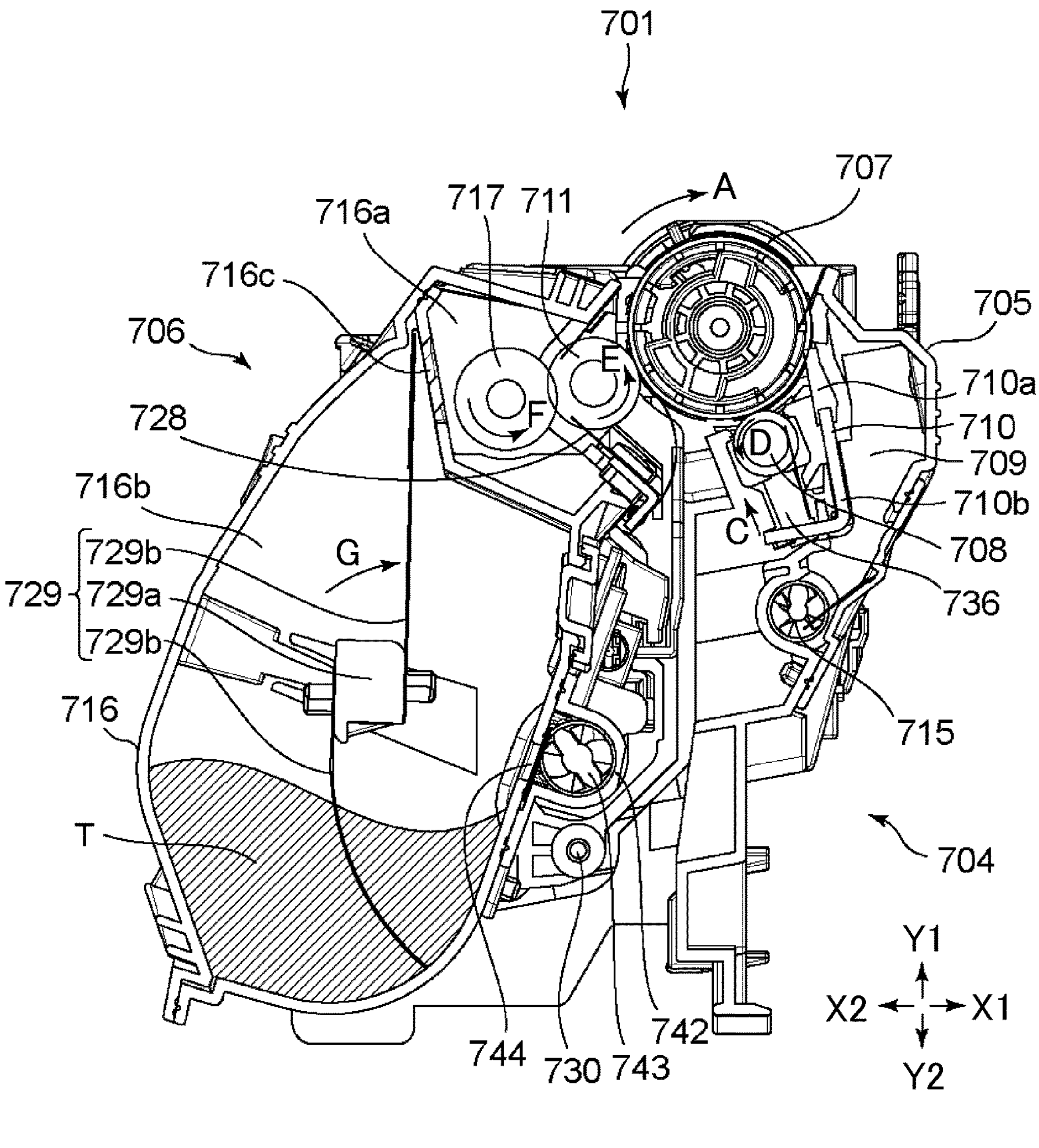
FIG. 83 is a schematic sectional view of the process cartridge.

During the image forming operation, the photosensitive drum 707 is rotationally driven at a predetermined speed in the direction of arrow A in FIG. 83. The intermediary transfer belt 718 is rotationally driven in the direction of arrow B in FIG. 82 (forward with respect to the direction of rotation of the photosensitive drum 707).

First, the surface of the photosensitive drum 707 is uniformly charged by the charging roller 708. Then, the surface of the photosensitive drum 707 is scanned while being exposed to the laser beam emitted from the scanner unit 712, so that an electrostatic latent image based on the image information is formed on the photosensitive drum 707. The electrostatic latent image formed on the photosensitive drum 707 is developed into a toner image by the developing unit 706. At this time, the developing unit 706 is pressed by a development pressure unit (not shown) provided in the main assembly of the image forming apparatus 800. Then, the toner image formed on the photosensitive drum 707 is primarily transferred onto the intermediary transfer belt 718 by the primary transfer roller 720.

For example, when forming a full-color image, the above-mentioned processes are sequentially performed in the image forming portions S701Y to S701K, which are the primary transfer units 1 to 4, so that the toner images of respective colors are sequentially superimposed on the intermediary transfer belt 718.

On the other hand, the recording material 703 stored in the sheet feed tray 702 is fed at a predetermined control timing, and is fed to the secondary transfer unit S702 in synchronization with the movement of the intermediary transfer belt 718. Then, the four color toner images on the intermediary transfer belt 718 are collectively secondarily transferred onto the recording material 703 by the secondary transfer roller 721 which is in contact with the intermediary transfer belt 718 by way of the recording material 703.

Thereafter, the recording material 703 now carrying the transferred toner image is fed to the fixing unit 725. The toner image is fixed on the recording material 703 by heating and pressing the recording material 703 in the fixing unit 725. After that, the recording material 703 is fed to the discharge tray 732 to complete the image forming operation.

Further, the primary untransferred residual toner (waste toner) remaining on the photosensitive drum 707 after the primary transfer step is removed by the cleaning blade 710. The secondary untransferred residual toner (waste toner) remaining on the intermediary transfer belt after the secondary transfer step is removed by the intermediary transfer belt cleaning unit 722. The waste toner removed by the cleaning blade 710 and the intermediary transfer belt cleaning unit 722 is fed by the waste toner feeding unit 723 provided in the main assembly of the apparatus and accumulated in the waste toner collection container 724. The image forming apparatus 800 can also form a monochromatic or multicolored image by using only a desired single or several image forming portions.

<Process Cartridge>

Figure 84:
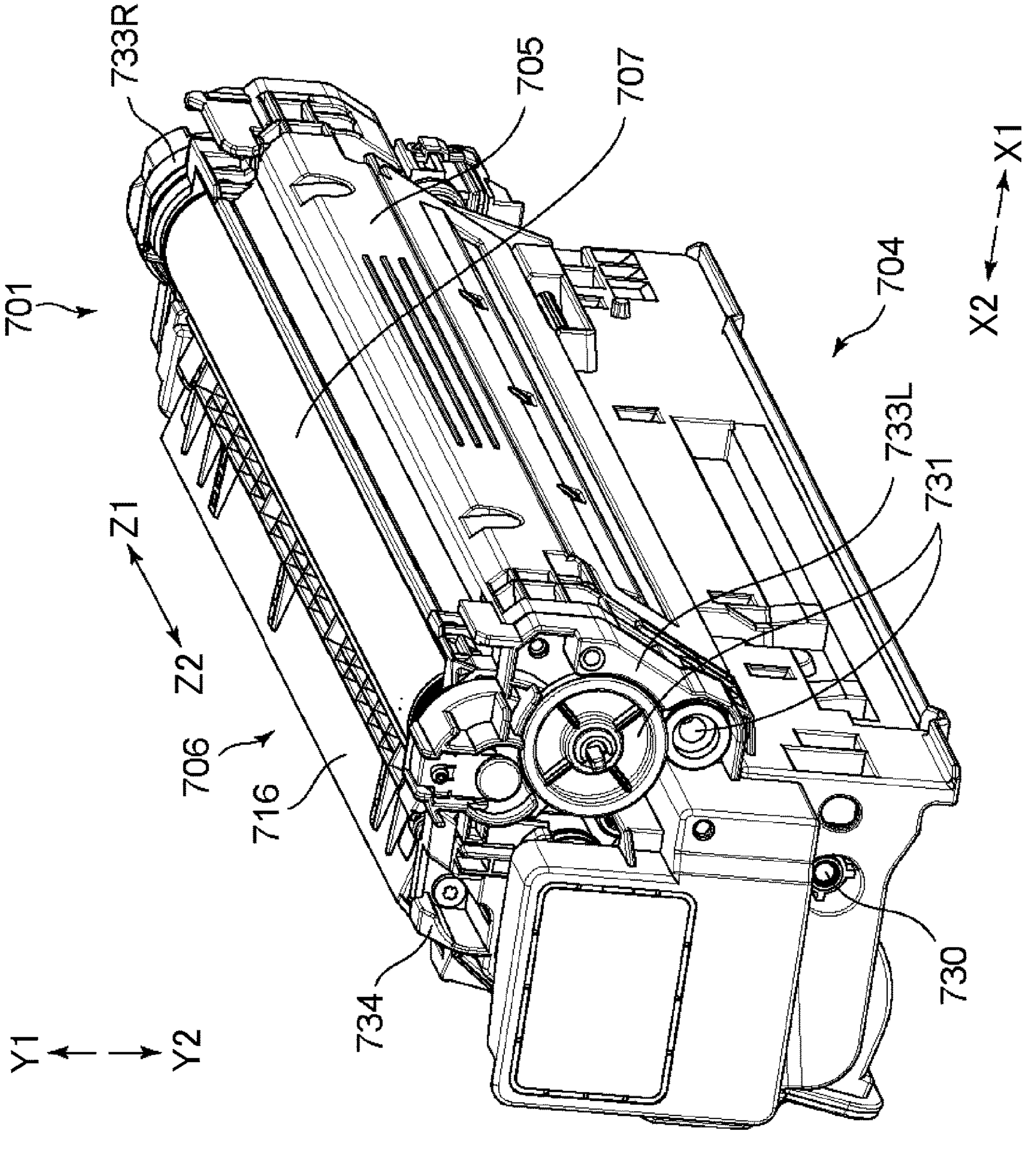
FIG. 84 is a schematic perspective view of the process cartridge.
Figure 85:
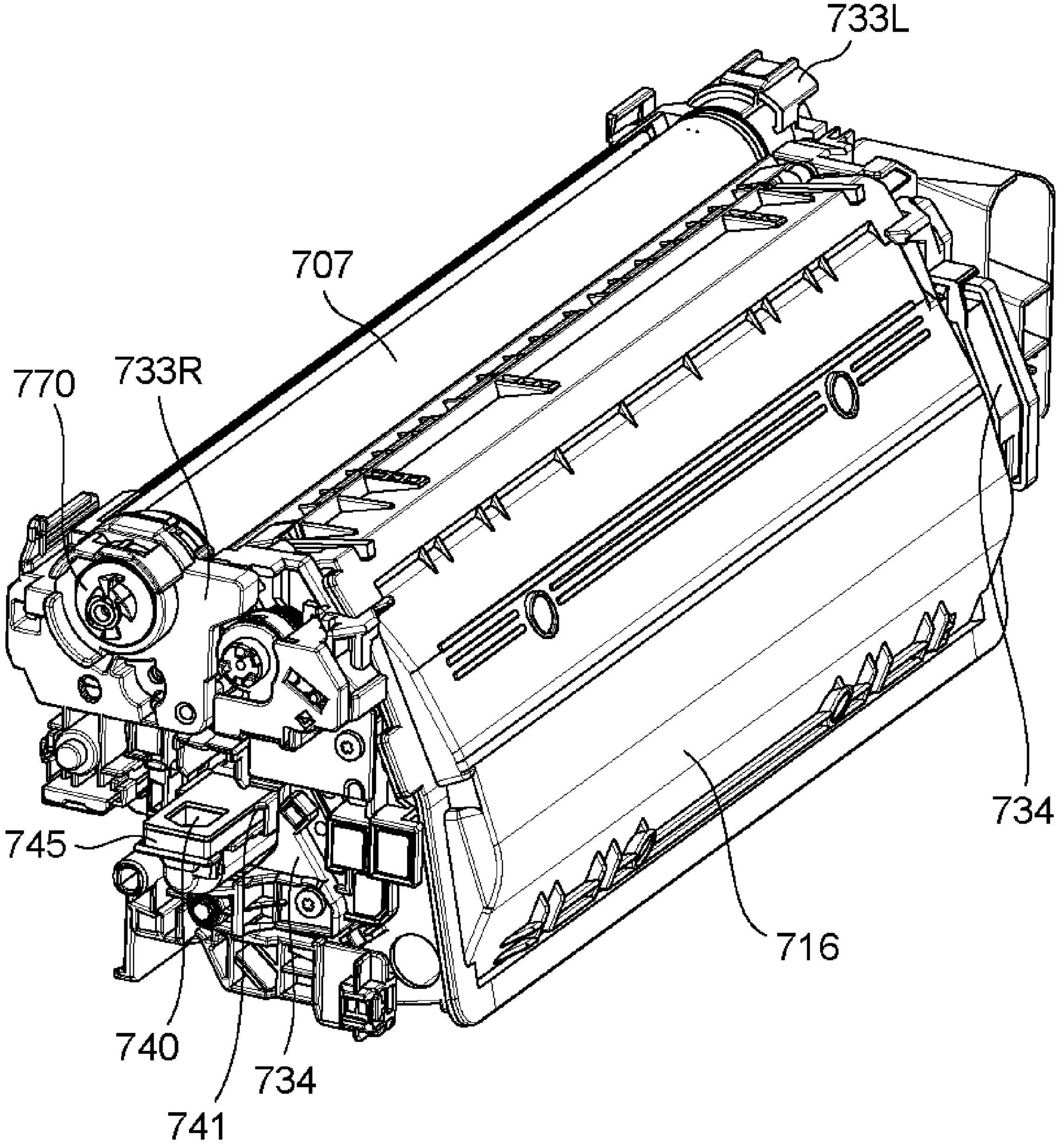
FIG. 85 is a schematic perspective view of the process cartridge.

Next, referring to FIGS. 83, 84 and 85, the overall structure of the process cartridge 701 mounted to the image forming apparatus 800 according to this embodiment will be described. FIG. 83 is a schematic sectional view of the process cartridge mounted on the image forming apparatus 800 and in a state (attitude) in which the photosensitive drum 707 and the developing roller 711 are in contact with each other, as viewed in the Z direction. FIG. 84 is a perspective view of the process cartridge 701 as viewed from the front (upstream side in the process cartridge mounting/dismounting direction). FIG. 85 is a perspective view of the process cartridge 701 as viewed from the rear (downstream side in the process cartridge mounting/dismounting direction).

The process cartridge 701 comprises the cleaning unit 704 and the developing unit 706. The cleaning unit 704 and the developing unit 706 are swingably coupled around the rotation support pin 730.

The cleaning unit 704 includes a cleaning frame 705 which supports various members in the cleaning unit 704. Further, in the cleaning unit 704, in addition to the photosensitive drum 707, the charging roller 708, and the cleaning blade 710, a waste toner screw 715 extending in a direction parallel to the rotation axis direction of the photosensitive drum are provided. The cleaning frame 705 includes a cleaning bearing unit 733 which rotatably supports the photosensitive drum 707 and which includes a cleaning gear train 731 for transmitting driving force from the photosensitive drum 707 to the waste toner screw 715, at both ends of the length.

The charging roller 708 provided in the cleaning unit 704 is urged toward the photosensitive drum 707 by a charging roller pressing springs 736 provided at both ends in the direction of arrow C. The charging roller 708 is provided so as to be driven by the photosensitive drum 707, and when the photosensitive drum 707 is rotationally driven in the direction of arrow A during image formation, the charging roller 708 is rotated in the direction of arrow D (forward with respect to the rotation of the photosensitive drum 707).

The cleaning blade 710 provided in the cleaning unit 704 comprises an elastic member 710*a* for removing untransferred residual toner (waste toner) remaining on the surface of the photosensitive drum 707 after the primary transfer, and a support member 710*b* for supporting the elastic member 710*a*. The waste toner removed from the surface of the photosensitive drum 707 by the cleaning blade 710 is stored in the waste toner storage chamber 709 formed by the cleaning blade 710 and the cleaning frame 705. The waste toner stored in the waste toner storage chamber 709 is fed toward the rear of the image forming apparatus 800 (downstream in the mounting/dismounting direction of the process cartridge 701) by a waste toner feeding screw 715 provided in the waste toner storage chamber 709. The fed waste toner is discharged through a waste toner discharge portion 735 and is delivered to the waste toner feeding unit 723 of the image forming apparatus 800.

The developing unit 706 includes a development frame 716 which supports various members in the developing unit 706. The development frame 716 is divided into a developing chamber 716*a* in which a developing roller 711 and a supply roller 717 are provided therein, and a toner storage chamber 716*b* in which a toner is accommodated and in which a stirring member is provided.

In the developing chamber 716*a*, the developing roller 711, the supply roller 717, and a developing blade 728 are provided. The developing roller 711 carries the toner, rotates in the direction of arrow E during image formation, and supplies the toner to the photosensitive drum 707 by contacting the photosensitive drum 707. Further, the developing roller 711 is rotatably supported by the development frame 716 by way of the development bearing unit 734 at both ends in the longitudinal direction (rotational axis direction). The supply roller 717 is rotatably supported by the development frame 716 by way of the development bearing unit 734 while being in contact with the developing roller 711, and rotates in the direction of arrow F during image forming operation. Further, a developing blade as a layer thickness regulating member which regulates the thickness of the toner layer formed on the developing roller 711 is provided so as to contact the surface of the developing roller 711.

The toner storage chamber 716*b* is provided therein with the stirring member 729 for stirring the accommodated toner T and for transporting the toner to the supply roller 717 through the developing chamber communication opening 716*c*. The stirring member 729 is provided with a rotating shaft 729*a* extending parallel to the rotation axis direction of the developing roller 711, and a stirring sheet 729*b* as a feeding member which is a flexible sheet. One end of the stirring sheet 729*b* is mounted to the rotating shaft 729*a*, and the other end of the stirring sheet 729*b* is a free end, and The rotating shaft 729*a* rotates and therefore the stirring sheet 729*b* rotates in the direction of arrow G, By which the stirring sheet 729*b* stirs the toner.

The developing unit 706 includes a developing chamber communication opening 716*c* which communicates the developing chamber 716*a* and the toner storage chamber 716*b* with each other. In this embodiment, the developing chamber 716*a* is placed above the toner storage chamber 716*b* in the attitude in which the developing unit 706 is normally used (the attitude at the time of use). The toner in the toner storage chamber 716*b* thrown up by the stirring member 729 is supplied to the developing chamber 716*a* through the developing chamber communication opening 716*c*.

Further, the developing unit 706 is provided with a toner receiving opening 740 at one end on the downstream side in the mounting/dismounting direction. Above the toner inlet 740, an inlet seal member 745 and a toner inlet shutter 741 which can move in the front-rear direction are provided. The toner inlet 740 is closed by the inlet shutter 741 when the process cartridge 701 is not mounted to the image forming apparatus 800. The reception shutter 741 is structured to be urged and opened by the image forming apparatus 800 in interrelation with the mounting/dismounting operation of the process cartridge 701.

A receiving and feeding path 742 is provided so as to communicate with the toner receiving opening 740, and a receiving and feeding screw 743 is provided therein. Further, a storage chamber communication opening 744 for supplying toner to the toner storage chamber 716*b* is provided in the neighborhood of the center of the length of the developing unit 706, and communicates the receiving and feeding path 742 and the toner storage chamber 716*b* with each other. The receiving and feeding screw extends in a direction parallel to the rotation axis directions of the developing roller and the supply roller 717, and feeds the toner received from the toner receiving opening 740 to the toner storage chamber 716*b* by way of the storage chamber communication opening 744.

<Cleaning Unit>

Here, referring to FIG. 86, the cleaning unit 704 will be described in detail.

As shown in FIG. 84, the rotation axis direction of the photosensitive drum 707 is the Z direction (arrow Z1, arrow Z2), the horizontal direction in FIG. 82 is the X direction (arrow X1, arrow X2), and the vertical direction is the Y direction (arrow Y1, arrow Y2).

The side (Z1 direction) on which the drum coupling (coupling member) 770 receives the driving force from the image forming apparatus main assembly is referred to as the driving side (back side), and the opposite side (Z2 direction) is called the non-driving side (front side). At the end opposite to the drum coupling 770, there is provided an electrode (electrode portion) which contacts the inner surface of the photosensitive drum 707, to function as a ground by contacting the image forming apparatus main assembly.

A drum coupling 770 is mounted to one end of the photosensitive chum 707, and a non-driving side flange member 769 is mounted to the other end to form the photosensitive drum unit 768. The photosensitive drum unit 768 receives the driving force from a drive transmission unit 811 provided in the image forming apparatus main assembly 800 by way of the drum coupling 770.

In the drum coupling 770, the outer peripheral surface 771*a* of the cylindrical portion 771 projecting from the photosensitive drum 707 as a supported portion is rotatably supported by the drum unit bearing member 733R. Similarly, the non-driving side flange member 769 is rotatably supported by the drum unit bearing member 733L at the outer peripheral surface 769*a* of the cylindrical portion projecting from the photosensitive drum 707. That is, the photosensitive drum 707 is rotatably supported by the casing of the cartridge (bearing members 733R, 733L) by way of the coupling 770 and the flange member 769.

Figure 86:
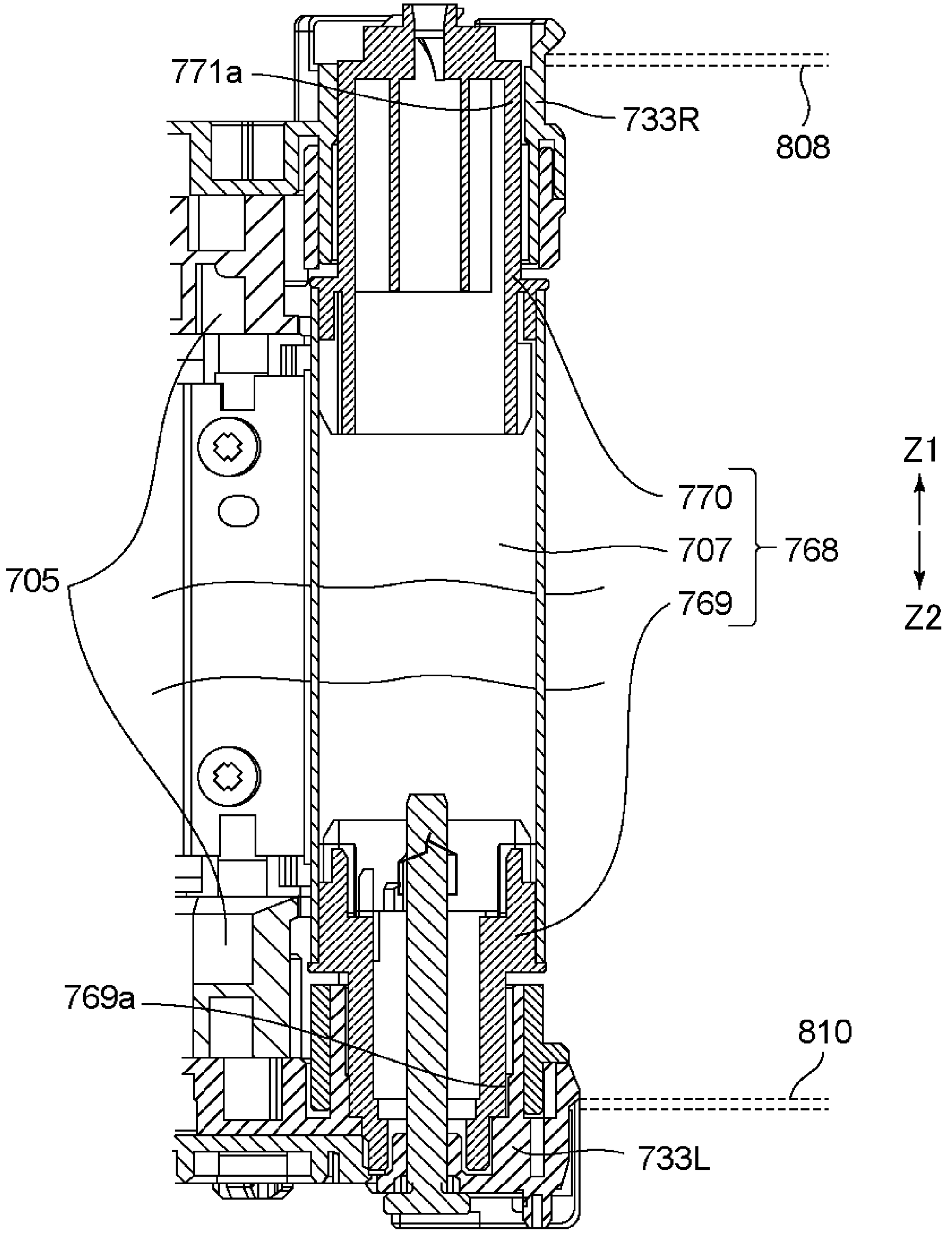
FIG. 86 is a schematic sectional view of the process cartridge taken along a rotational axis of the photosensitive drum.

As shown in FIG. 86, the drum unit bearing member 733R abuts on the rear cartridge positioning portion 808 provided in the image forming apparatus main assembly 800. Further, the drum unit bearing member 733L abuts on the front cartridge positioning portion 810 of the image forming apparatus main assembly 800. By this, the process cartridge 701 is positioned in the image forming apparatus 800.

In the Z direction of this embodiment, the position where the drum unit bearing member 733R supports the photosensitive drum unit 768 is close to the position where the drum unit bearing member 733R is position by to the back side cartridge positioning portion 808. Therefore, in this embodiment, the free end side (Z1 direction side) of the outer peripheral surface 771*a* of the cylindrical portion 771 of the drum coupling is rotatably supported by the drum unit bearing member 733R.

Similarly, in the Z direction, the position where the drum unit bearing member 733L rotatably supports the non-driving side flange member 769 is close to the position where the drum unit bearing member 733L is positioned by the front side cartridge positioning portion 810.

By mounting the drum unit bearing members 733R and 733L to the respective sides of the cleaning frame 705, the photosensitive drum unit 768 is rotatably supported by the cleaning frame 705.

<Structure of Drive Transmission Unit>

Figure 87:
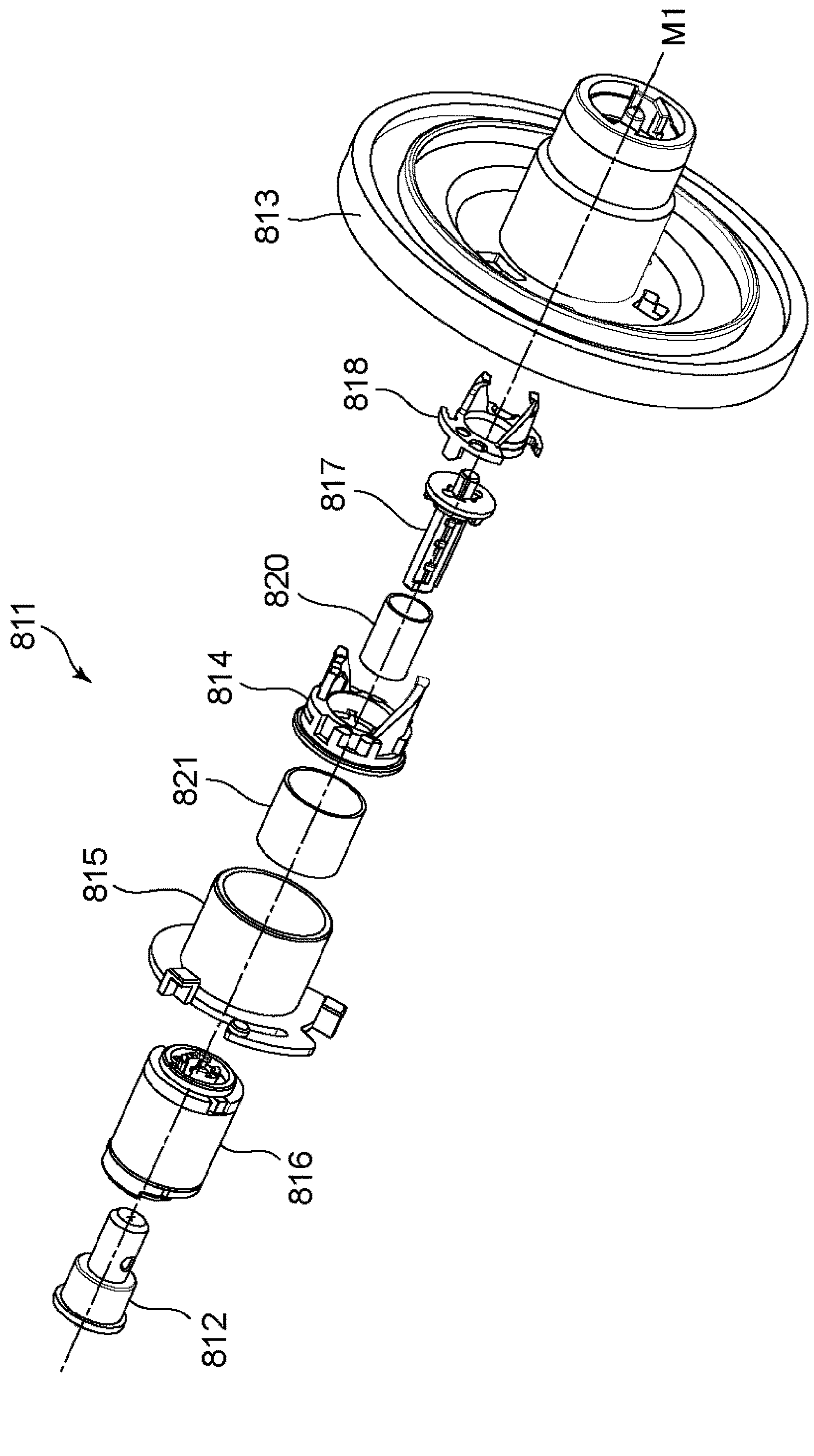
FIG. 87 is an exploded perspective view of a drive transmission unit 811.
Figure 88:
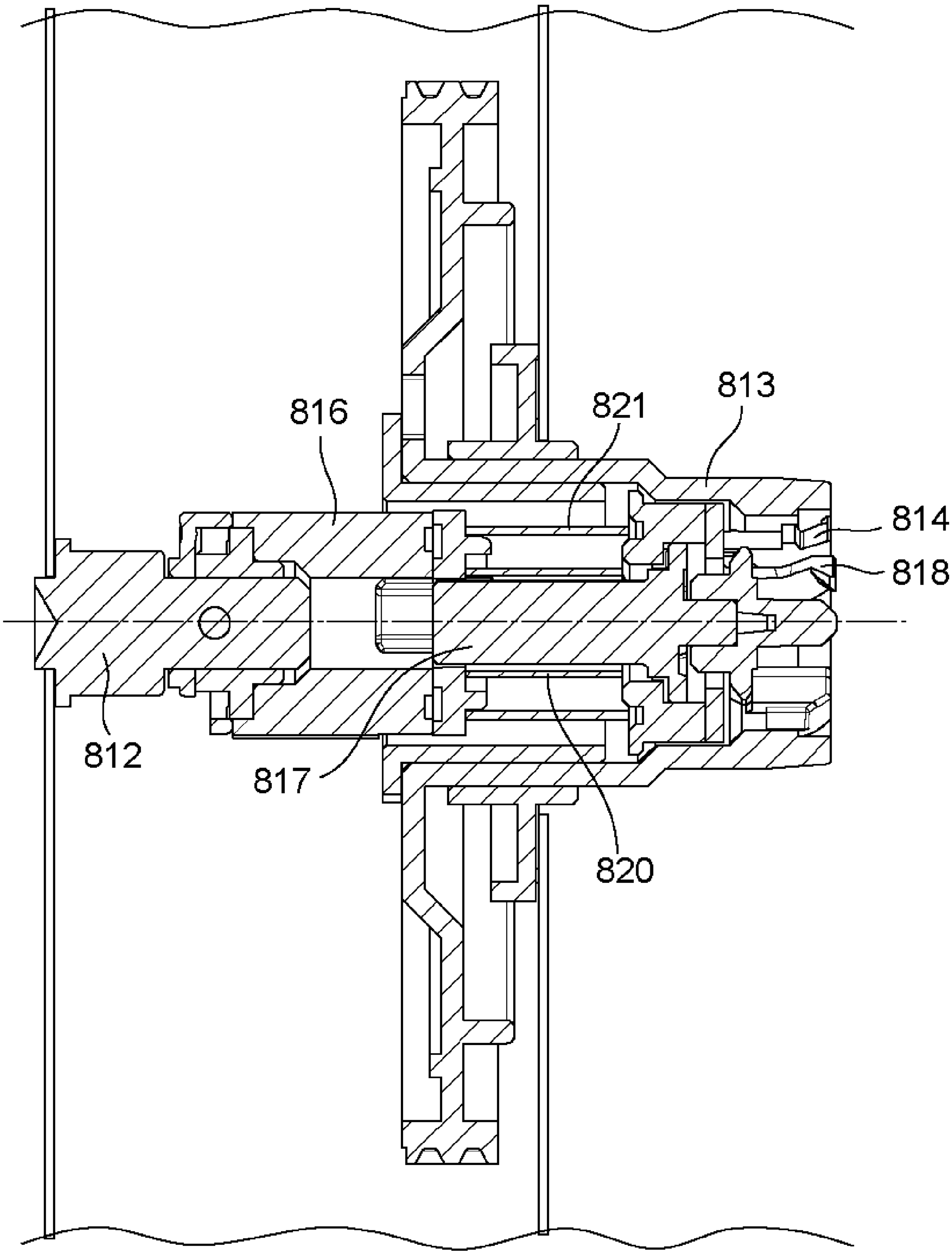
FIG. 88 is a sectional view taken along the rotation axis of the drive transmission unit 811 mounted to the main assembly of the image forming apparatus.

Referring to FIGS. 87 and 88, the structure of the drive transmission unit 811 provided in the image forming apparatus side will be described. FIG. 87 is an exploded perspective view of the drive transmission unit 811. FIG. 88 is a sectional view of the drive transmission unit 811.

A drum drive coupling gear 813 is rotatably supported by a supporting shaft 812 fixed to the frame of the image forming apparatus 800, and the driving force is transmitted from the motor to rotate the drum drive coupling gear 813. As is difference from the structure of the Embodiment 1, the drum drive coupling and the drive gear are integrated with each other in this embodiment. By integrating, the misalignment between the driving shaft axis on the main assembly side and the photosensitive drum shaft axis on the cartridge side is suppressed.

The drive transmission unit 811 includes a plurality of components inside a cylindrical portion of the drum drive coupling gear 813. They are a brake member 816 which is supported and stopped in the rotation by a supporting shaft 812, a brake transmission member 817 which is connected with the brake member 816 to transmit the braking force, a first and second braking engagement members 814, 818 which engage with the braking force receiving surface of the drum coupling 770, a brake engagement spring 821 and a drum drive coupling spring 820 which are extended along a axis M1 and generate an urging force in the direction of the axis M1. The axis M1 is the rotation axis of the drive transmission unit 811.

The drum drive coupling spring 820 is provided so as to be sandwiched between the end surface of the brake member 816 and the brake transmission member 817, and imparts a repulsive force to them. The brake transmission member 817 receives the repulsive force of the drum drive coupling spring 820 while receiving the repulsive force of the brake engagement spring 821 by way of the first braking engagement member 814. As is different from the structure of the Embodiment 1, the stopper 815 is provided in this embodiment. The stopper 815 is assembled to the drum drive coupling gear 813, and is fixed so as to move integrally with the drum drive coupling gear 813 in the axial direction. This prevents the drum coupling 770 from colliding with the first braking engagement member 814 and prevents the first braking engagement member 814 from disengaging out of the drum drive coupling gear 813 when the user mounts the cartridge with a strong force.

The other structures and functions are the same as those of the main assembly side drive transmission unit 203 shown in the Embodiment 1, And therefore the description thereof is omitted in this embodiment.

<Structure of Coupling Member>

The description will be made as to a structure for transmitting a driving force from the image forming apparatus main assembly to the drum unit 768 of the cartridge 701 to drive (rotate) the drum unit 768.

Figure 89:
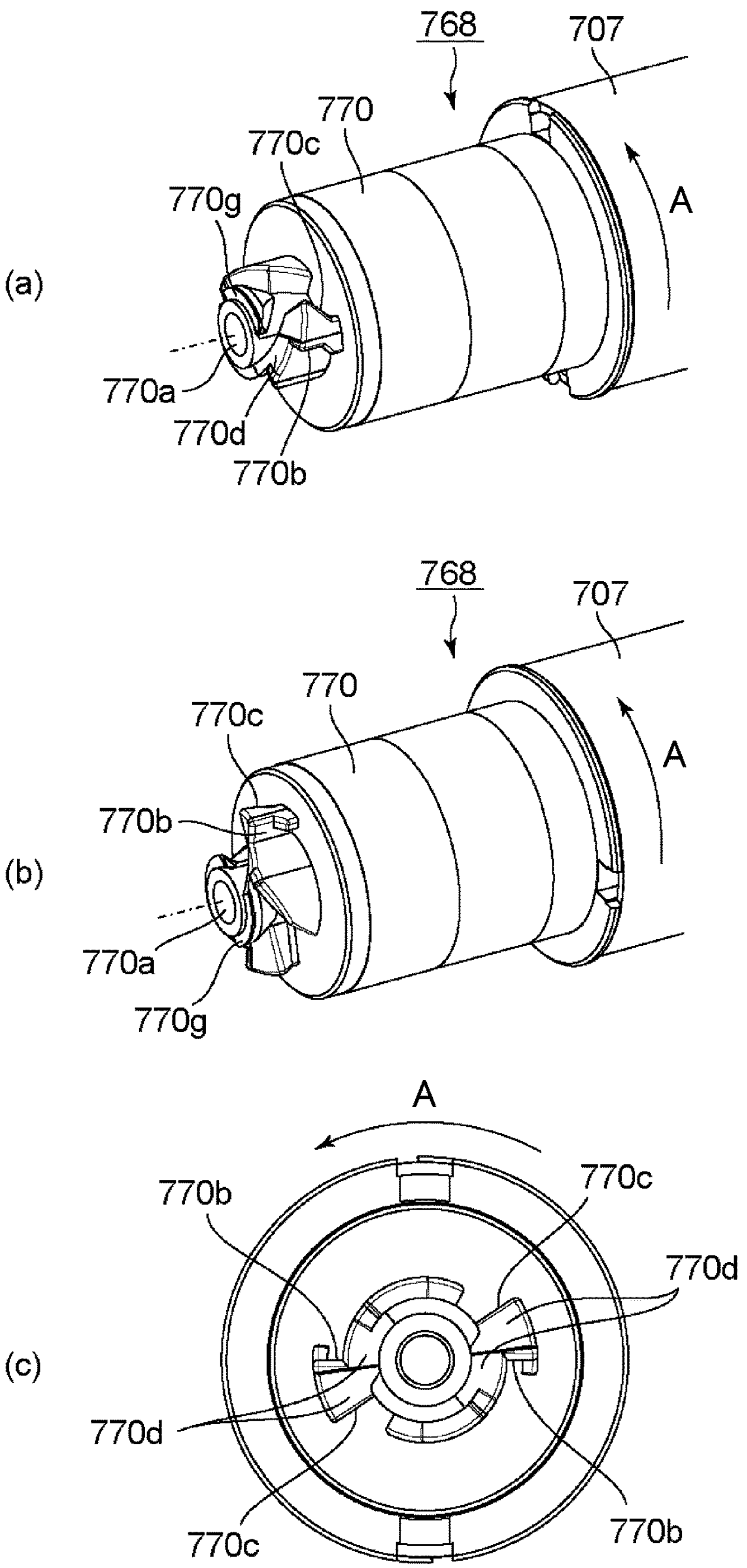
FIG. 89 is a schematic perspective view of another form of the drum coupling 770.

The drum unit 768 shown in part (a) of FIG. 89 to part (c) of FIG. 89 is a unit including a photosensitive drum 707, a drum coupling 770, and a non-driving side flange member 769. The drum unit 768 is structured to be connected to the drive transmission unit 811 provided in the main assembly by being mounted to the main assembly of the image forming apparatus.

During image formation, the drum unit 768 rotates in the direction of arrow A. In this embodiment, as the drum unit 768 is viewed from the driving side (the side where the drum coupling 770 is located), the rotational direction corresponds to the counterclockwise direction. That is, the rotational directions of the drum units of this embodiment and the Embodiment 1 are opposite to each other.

Therefore, the shape of the drum coupling 770 which engages with the drive transmission unit is a shape inverted (mirror shape) in the left-right with respect to the drum coupling 143 shown in the Embodiment 1. Similarly, the shape of the drive transmission unit 811 is also a left-right inverted shape of the drive transmission unit 203 in the Embodiment 1.

Referring to FIG. 83, the rotational direction of the drum unit 768 of this embodiment will be described. FIG. 83 corresponds to a view of the drum unit as seen from the non-driving side, And therefore, the rotational direction A corresponds to the clockwise direction. When the drum unit is rotated in the A direction by the driving force received by the coupling member, the surface of the photosensitive drum 707 is structured to move as follows. The surface of the photosensitive drum 707 approaches to and contacts with the cleaning blade 710 inside the casing of the cartridge. Thereafter, the surface of the photosensitive drum 707 approaches to and contacts with the charging roller 708. After that, the surface of the photosensitive drum 707 approaches to and contacts with the developing roller 711. The surface of the photosensitive drum 707 is then exposed out of the casing of the cartridge above the cartridge. The surface of the exposed photosensitive drum 707 comes into contact with the intermediary transfer belt 718 of the main assembly of the apparatus (see FIG. 82). Thereafter, the surface of the photosensitive drum 707 returns to the inside of the casing of the cartridge again and approaches to and contacts with the cleaning blade 710.

Next, the drum coupling 770 will be described in detail. part (a) of FIG. 89 to part (c) of FIG. 89 are illustrations for explaining the detailed shape of the drum coupling 770. Part (a) of FIG. 89 is a perspective view of the drum unit 768, part (b) of FIG. 89 is a perspective view of another phase of part (a) of FIG. 89, and part (c) of FIG. 89 is a front view of the drum unit 768 as viewed from the Z1 direction. The drum coupling 770 includes a positioning hole 770*a*, a driving force receiving portion 770*b*, a braking force receiving surface 770*c*, a helical slope 770*d*, and a visor portion 770*g*.

The positioning holes 770*a*, The driving force receiving portion 770*b*, The braking force receiving surface 770*c*, The helical slope 770*d*, and the visor portion 770*g* of this embodiment corresponding to the circular hole portion 143*a*, the driving force receiving portion 143*b*, the braking force receiving surface 143*c*, the helical slope 143*d*, and the visor portion 143*g*, of the coupling member 143 of the Embodiment 1 shown in FIG. 1 and so on, respectively. The corresponding portions of the coupling members of this embodiment perform the same functions as in Embodiment 1.

As described above, the drum coupling 770 and the drum coupling 143 of the Embodiment 1 (see FIG. 1) have a left-right symmetry (mirror symmetry) with each other except that the dimensions are partially different. Therefore, the shapes of the respective portions 770*a*, 770*b*, 770*c*, 770*d*, and 770*g* of the drum coupling 770 are the same as those provided by substantially reversing the shapes of the respective portions 143*a*, 143*b*, 143*c*, 143*d*, and 143*g* of the coupling member 143 (mirror image shapes). In this embodiment, the drum coupling 770 rotates in the direction of arrow A shown in FIGS. 83 and 89 (*a*) to 89(*c*) as described above. The rotational direction (arrow A direction) of the drum coupling 770 in this embodiment is a counter-clockwise direction when the drum coupling 770 is viewed from the front (see part (c) of FIG. 89).

The shape of the drum coupling 770 is not limited to this example. For example, the shape of the drum coupling 770 may have a left-right inverted shape (that is, a mirrored shape) of those of the modified example of the drum coupling 143 shown in FIG. 52, part (b) of FIG. 54 through part (e) of FIG. 54, FIGS. 74, 75, 77, 78, 81, 97, 100, 102 to 110, and so on.

<Mounting of Cartridge on Image Forming Apparatus Main Assembly>

Figure 90:
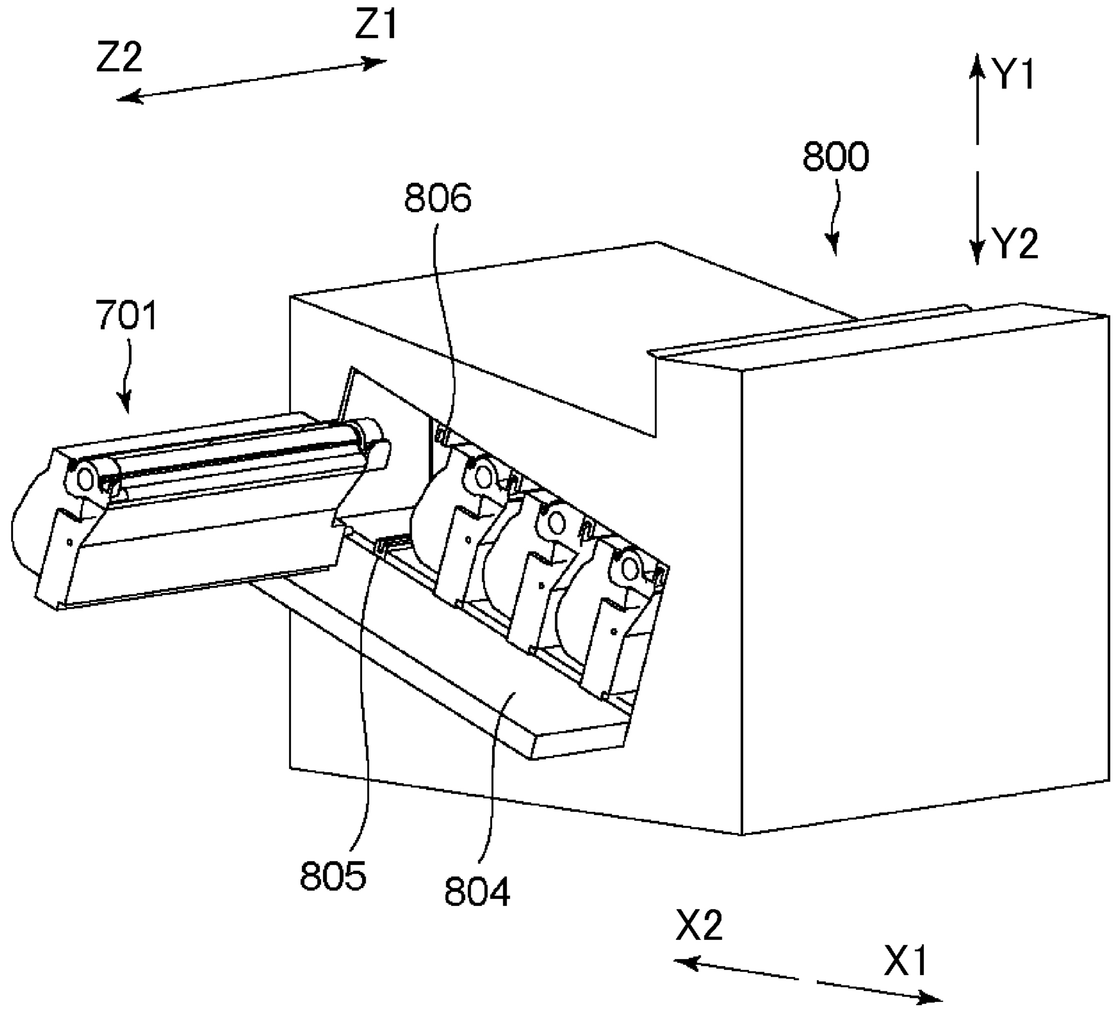
FIG. 90 is a schematic perspective view illustrating mounting of the cartridge 701 to the image forming apparatus main assembly 800.
Figure 91:
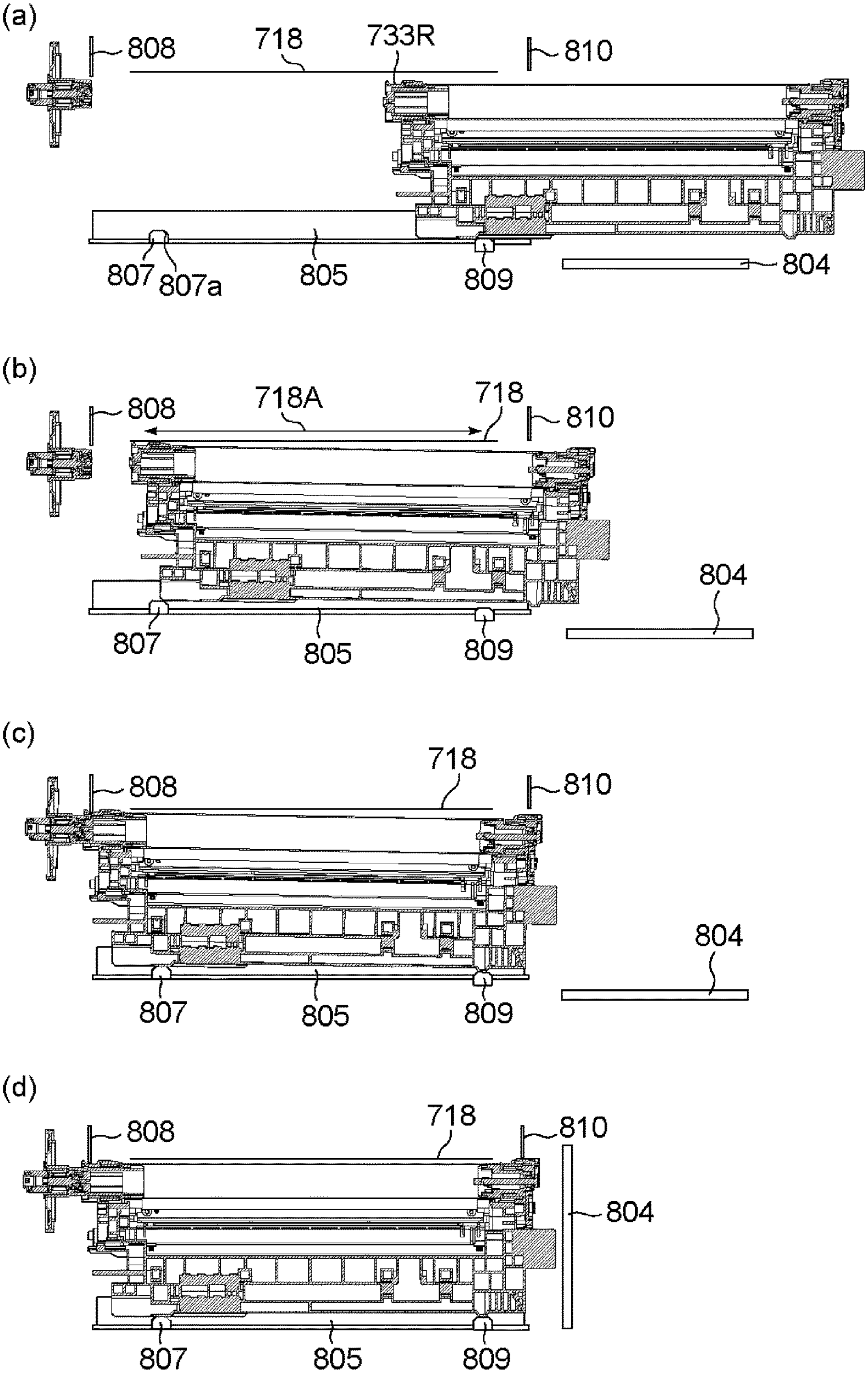
FIG. 91 is a schematic sectional view illustrating the mounting operation of the cartridge 701 to the image forming apparatus main assembly 800.

Referring to FIGS. 90 and 91, The mounting/dismounting of the process cartridge 701 relative to the image forming apparatus main assembly 800 will be described.

FIG. 90 is a perspective view illustrating mounting of the cartridge to the main assembly of the image forming apparatus. Further, FIG. 91 is a sectional view illustrating the operation of mounting the cartridge to the main assembly of the apparatus.

The image forming apparatus main assembly 800 of this embodiment employs a structure in which a cartridge can be mounted in a substantially horizontal direction. Specifically, the image forming apparatus main assembly 800 includes a space in which a cartridge can be mounted. A cartridge door 804 (front door) for inserting the cartridge into the above-mentioned space is provided on the front side (direction in which the user stands during use) of the image forming apparatus main assembly 800.

As shown in FIG. 90, the cartridge door 804 of the image forming apparatus main assembly 800 is provided so as to be openable and closable. When the cartridge door 804 is opened, the cartridge lower guide rail 805 which guides the cartridge 701 is provided on the bottom surface of the space, and the cartridge upper guide rail 806 is provided on the upper surface. The cartridge 701 is guided to the mounting position by the upper and lower guide rails (805, 806) provided above and below the space.

Referring to Figure, The operation of mounting and dismounting the cartridge to and from the image forming apparatus main assembly 800 will be described below.

As shown in part (a) of FIG. 91, the cleaning bearing unit 733R and the photosensitive drum 707 in the cartridge 701 do not come into contact with the intermediary transfer belt 718 at the start of insertion. In other words, The dimensions are selected such that the photosensitive drum 707 and the intermediary transfer belt 718 do not come into contact with each other in the state that the end of the cartridge on the back side in the inserting direction is supported by the guide rail 805 under the cartridge.

Next, as shown in part (b) of FIG. 91, the image forming apparatus main assembly 800 includes a rear side cartridge lower guide 807 projecting upward in the gravity direction from the cartridge lower guide rail 805 on the rear side in the inserting direction of the cartridge lower guide rail 805. The rear side cartridge lower guide 807 is provided with a tapered surface 807*a* on the front side in the inserting direction of the cartridge 701. Upon insertion, the cartridge 701 rides on the tapered surface 807*a* and is guided to the mounting position.

The position and shape of the back side cartridge lower guide 807 may be provided so that a portion of the cartridge does not rub against the image forming region 718A of the intermediary transfer belt 718 when the cartridge is inserted into the apparatus main assembly 800. Here, the image forming region 718A refers to a region on which the toner image transferred onto the recording material 703 of the intermediary transfer belt 718 is carried. Further, in this embodiment, among the cartridges which maintain the mounting attitude, the unit bearing member 733R provided on the back side in the inserting direction of the cartridge projects most upward in the gravity direction. Therefore, the arrangement and shape of each element may be appropriately selected such that the locus drawn by the innermost end of the drum unit bearing member 733R in the inserting direction at the time of insertion (hereinafter referred to as the insertion locus) and the image forming region 718A do not interfere with each other.

Thereafter, as shown in part (c) of FIG. 91, the cartridge 701 is further inserted into the back side of the image forming apparatus main assembly 800 from the state the cartridge 701 rides on the back side cartridge lower guide 807. Then, the drum unit bearing member 733R abuts on the rear side cartridge positioning portion 808 provided in the image forming apparatus main assembly 800. At this time, the cartridge 701 is tilted by about 0.5° to 2° with respect to the state in which the cartridge 701 is completely mounted to the image forming apparatus main assembly 800 (part (d) of FIG. 91).

Part (d) of FIG. 91 is an illustration of a state of the apparatus main assembly and the cartridge when the cartridge door 804 is closed. The image forming apparatus 800 includes a front side cartridge lower guide 809 on the front side of the cartridge lower guide rail 805 in the inserting direction. The front side cartridge lower guide 809 is structured to move up and down in interrelation with the opening and closing of the cartridge door (front door) 804.

When the cartridge door 804 is closed by the user, the front side cartridge lower guide 809 is raised. Then, the drum unit bearing member 733L and the front side cartridge positioning portion 810 of the image forming apparatus main assembly 800 come into contact with each other, and the cartridge 701 is positioned with respect to the image forming apparatus main assembly 800.

By the above-described operation, the cartridge 701 is completely mounted to the image forming apparatus main assembly 800.

Further, the removal operation of the cartridge 701 from the image forming apparatus main assembly 800 is in the reverse order in the above-mentioned insertion operation.

Since the oblique mounting structure is employed as described above, it is possible to suppress rubbing between the photosensitive drum 707 and the intermediary transfer belt when the cartridge 701 is mounted to the apparatus main assembly 800. Therefore, it is possible to suppress the occurrence of minute scratches (scratches) on the surface of the photosensitive drum 707 or on the surface of the intermediary transfer belt 718.

Further, with the structure disclosed in this embodiment, the structure of the image forming apparatus main assembly 800 can be simplified as compared with the structure in which the cartridge is horizontally moved and mounted on the apparatus main assembly and then the entire cartridge is lifted up.

<Process of Engaging Coupling Member with Main Assembly Driving Shaft>

Figure 92:
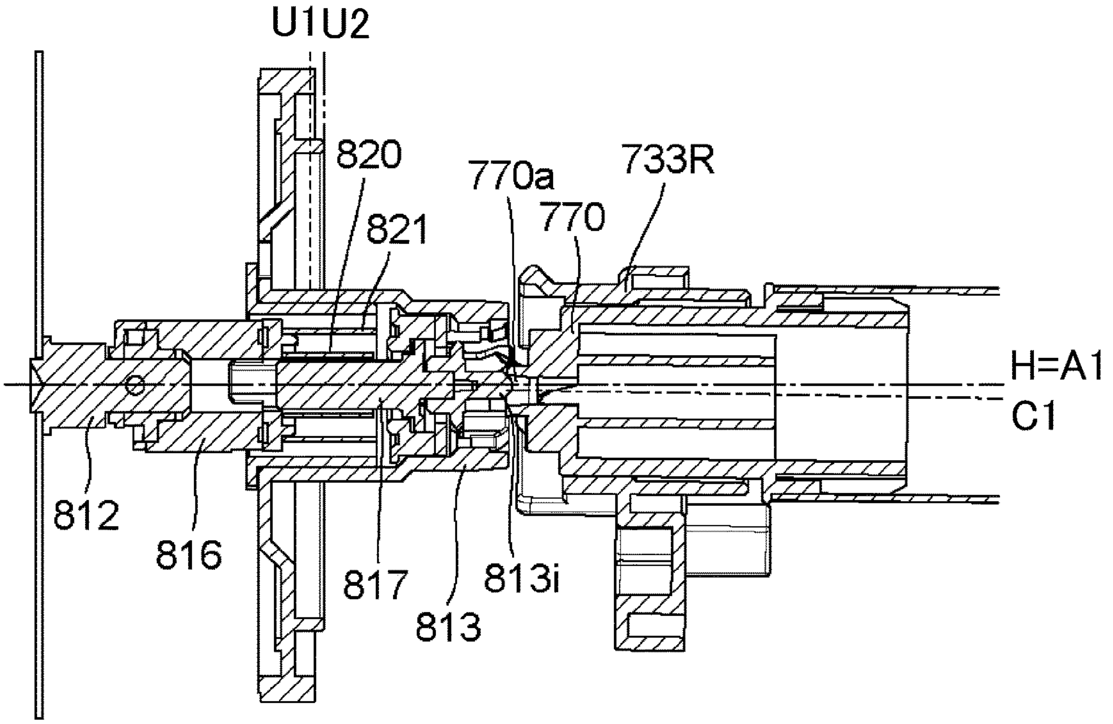
FIG. 92 is a schematic sectional view illustrating the mounting operation of the drum coupling 770 to the main assembly drive transmission unit 811.
Figure 92:
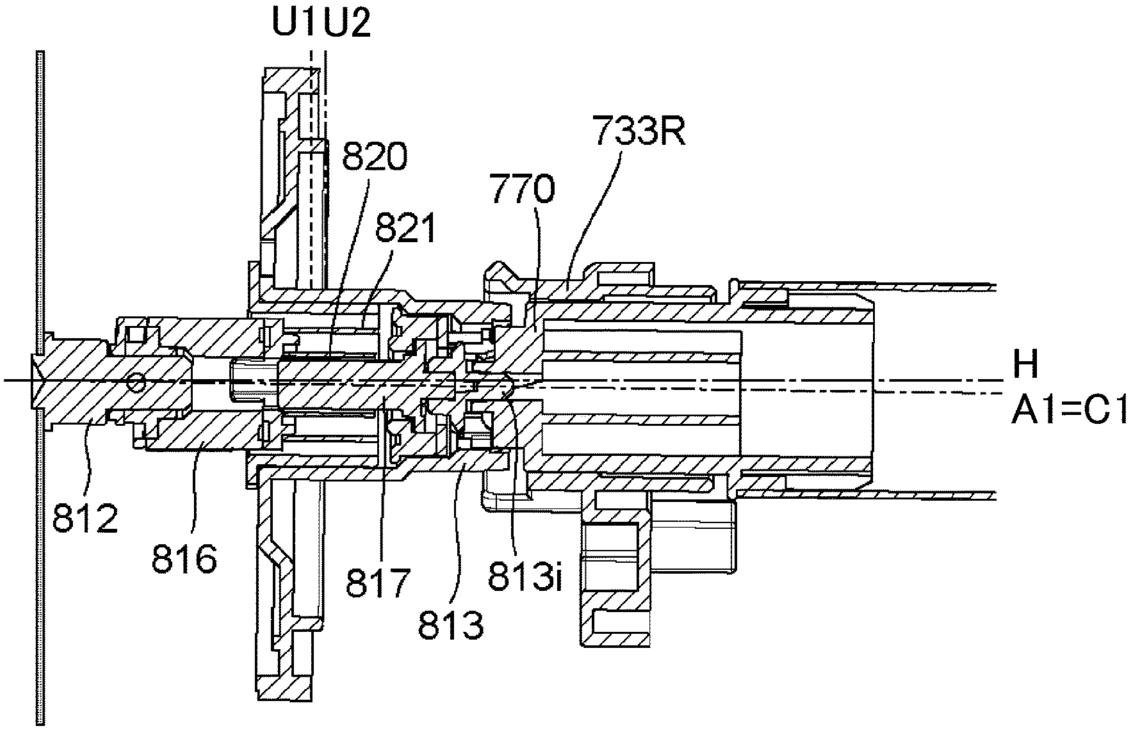
Figure 93:
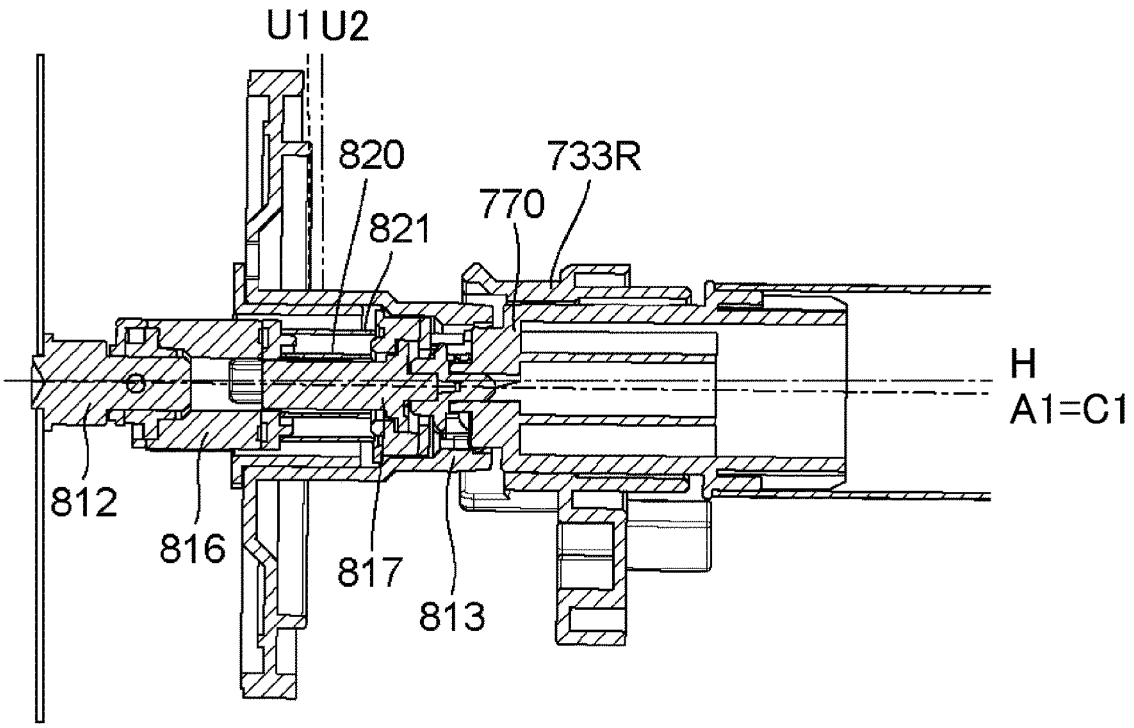
FIG. 93 is a schematic sectional view illustrating the mounting operation of the drum coupling 770 to the main assembly drive transmission unit 811.
Figure 93:
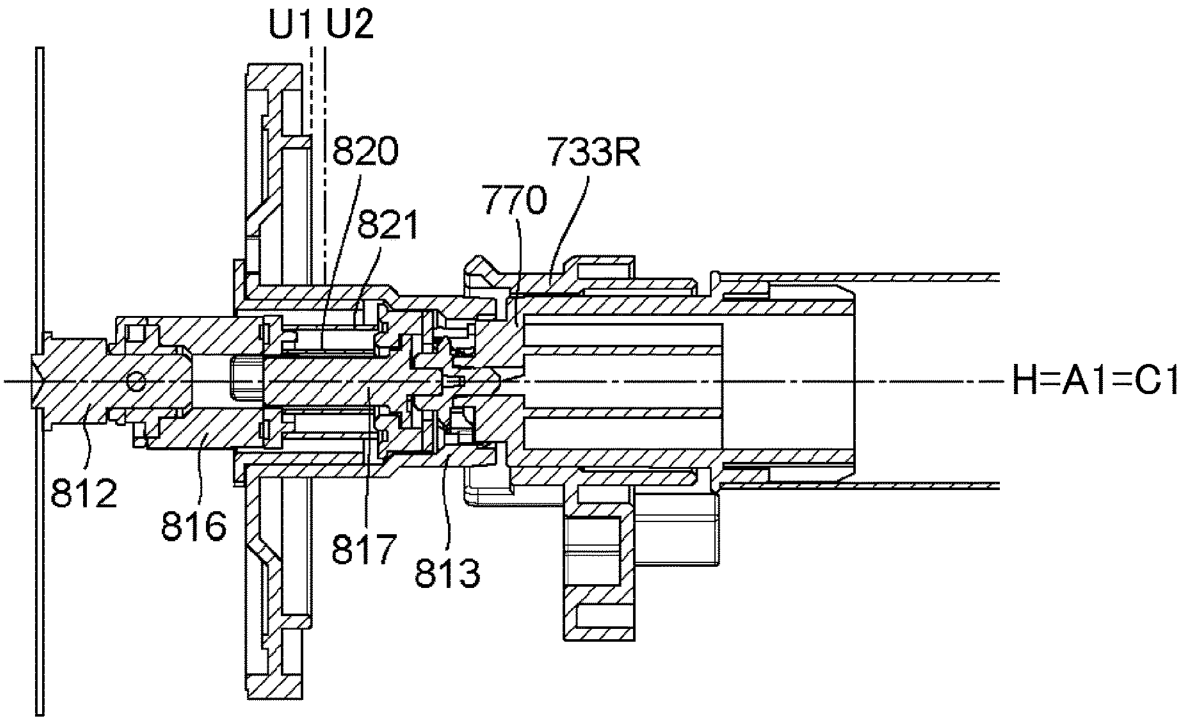

Subsequently, referring to FIGS. 92 and 93, the engagement process between the drum coupling 770 and the drive transmission unit 811 will be described in detail. FIGS. 92 and 93 are sectional views illustrating the mounting operation of the drum coupling to the drive transmission unit 811.

Part (a) of FIG. 92 is a illustration of a state in which the drum coupling 770 has started engaging with the drive transmission unit 811, part (a) of FIG. 92 is a illustration of a state in which the process cartridge 701 is abutted to the back of the main assembly, and part (b) of FIG. 93 is a illustration of a state in which the front door of the main assembly is closed and the cartridge is lifted up. Part (a) of FIG. 93 is an illustration of a state in the middle of mounting/dismounting between part (b) of FIG. 93 and part (b) of FIG. 92. That is, the process cartridge 701 is mounted through the steps in the order of part (a) of FIG. 92, part (b) of FIG. 92, part (a) of FIG. 93, and part (b) of FIG. 93.

As shown in part (a) of FIG. 92, when the process cartridge is mounted to the inner side of the main assembly, the positioning hole 770*a* of the drum coupling 770 and the positioning boss 813*i* of the drum drive coupling gear 813 start to contact each other. As described referring to FIG. 91, when the drum coupling 770 starts engaging with the drive transmission unit 811, the process cartridge 701 is inserted in the state (part (b) of FIG. 91 to (c)) that it is tilted by about 0.5° to 2° by riding on the back side cartridge lower guide 807.

Therefore, the drum drive coupling gear 813 is guided by the positioning boss 813*i* moving along the positioning hole 770*a* of the drum coupling 770, and the drum drive coupling gear 813 is also tilted (see part (b) of FIG. 92). The chain lines in FIGS. 92 and 93 depict the horizontal direction by H, the rotation axis direction of the drum drive coupling gear 813 by A1, and the rotation axis direction of the drum coupling 770 by C1.

When the process cartridge is further inserted toward the back side of the main assembly from part (b) of FIG. 92, the side surface of the drum coupling 770 comes into contact with the drum drive coupling gear 813. When the cartridge is pushed further from the contact state, the drum drive coupling gear 813, the first braking engagement member 814, the second braking engagement member 818, the stopper 815 and the brake transmission member 817 are pushed toward the back side of the main assembly, until the process cartridge moves to the position where it abuts to the rear side plate of the main assembly. As a result, the process cartridge, the drum drive coupling gear 813, the first braking engagement member 814, the second braking engagement member 818, the stopper 815, and the brake transmission member 817 move to the positions shown in part (a) of FIG. 93. That is, the position of the gear end of the drum drive coupling gear 813 moves from U2 to U1.

Thereafter, when the front door of the main assembly is closed, the lower rail in the main assembly is lifted up and the inclination of the process cartridge is eliminated That is, as shown in part (b) of FIG. 93, the inclinations of both the drum drive coupling gear 813 and the drum coupling 770 is eliminated, the axes thereof are aligned by the cooperation of the positioning boss 813*i* and the positioning hole 770*a*, and the mounting of the process cartridge 701 is completed.

After the axes of the drum drive coupling gear 813 and the drum coupling 770 are determined in the manner described above, the drive transmission unit 811 rotates so that the drum coupling 770 are brought into engagement with the drive transmission member, and the brake engaging member inside the drive transmission unit 811. The engagement operation is the same as the operation shown in the Embodiment 1 except that the rotational directions of the drive transmission unit 811 and the drum coupling 770 are reversed. Therefore, the description thereof is omitted in this embodiment.

In this embodiment and the above-mentioned Embodiment 1, the process cartridge includes a cleaning unit and a developing unit. That is, the process cartridge includes a photosensitive drum and a developing roller. However, the structure of the cartridge mounted to and dismounted from the image forming apparatus is not limited to such an example.

Figure 94:
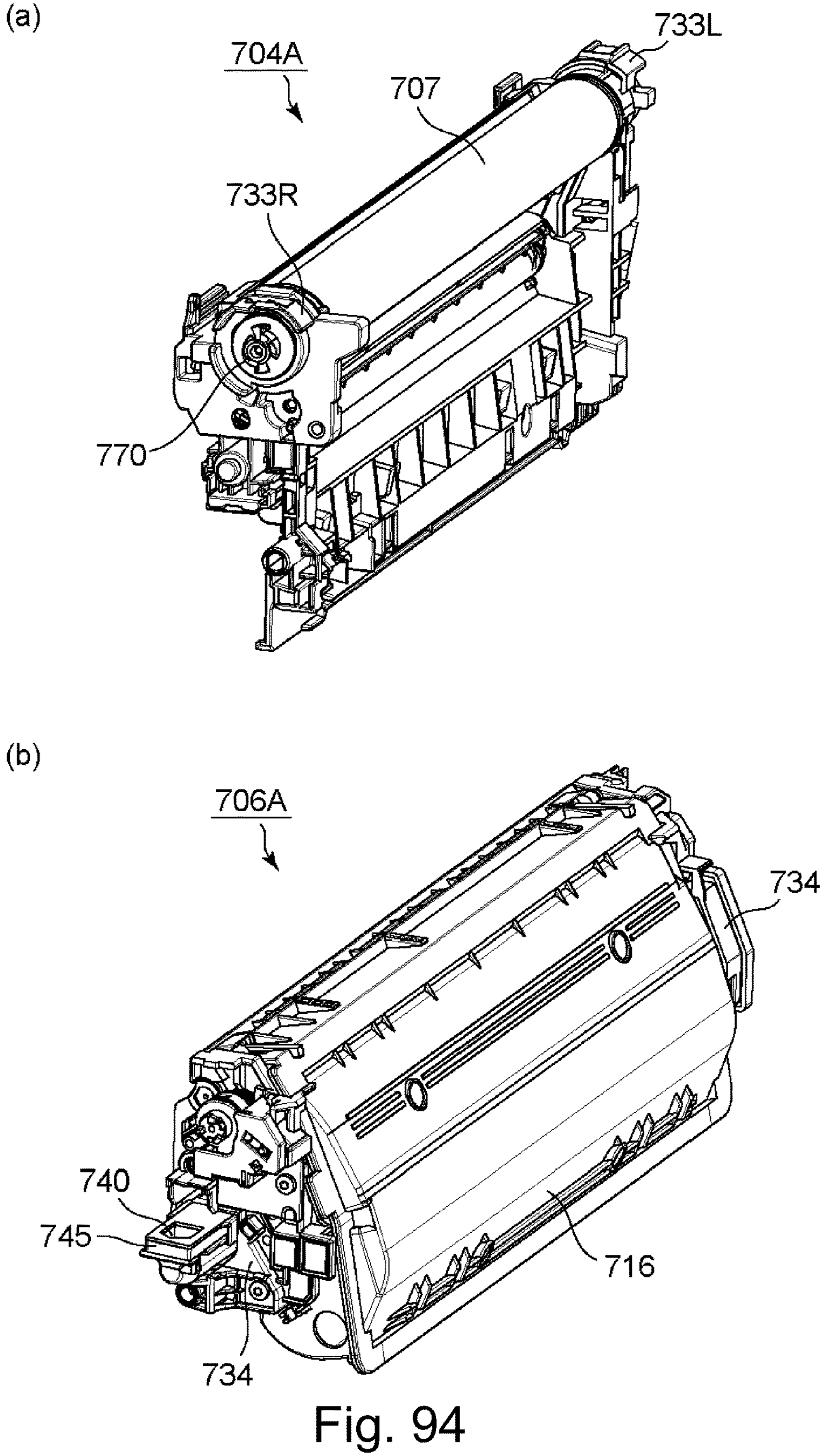
FIG. 94 is a perspective view illustrating another form of the process cartridge.

For example, as a modified example of this embodiment, a structure in which the cleaning unit 704 and the developing unit 706 are separately made into cartridges can be considered (see part (a) of FIGS. 94 and 94(*b*)).

The structure in which the cleaning unit 704 is in the form of a cartridge may be particularly referred to as a drum cartridge 704A, and the structure in which the developing unit 706 is in the form of a cartridge may be particularly referred to as a developing cartridge 706A.

In the case of such a modification, the drum cartridge 704A has a photosensitive drum 707 and a drum coupling 770. The drum cartridge 704A can be regarded as a process cartridge including no developing unit 706.

As described above, according to this embodiment, the drum coupling 770 of the process cartridge 701 receives the driving force from the drive transmission unit 811 of the image forming apparatus main assembly. Further, the drum coupling 770 receives a driving force from the drive transmission unit 811, and at the same time operates the brake mechanism inside the drive transmission unit 811. With this brake mechanism, the load required to drive the cartridge can be set in an appropriate range. By this, the process cartridge can be driven stably.

Embodiment 3

In this embodiment, a drum coupling in which the shape of the drum coupling 143 (see FIG. 1) of the cartridge described in Embodiment 1 and so on is partially modified will be described.

Figure 111:
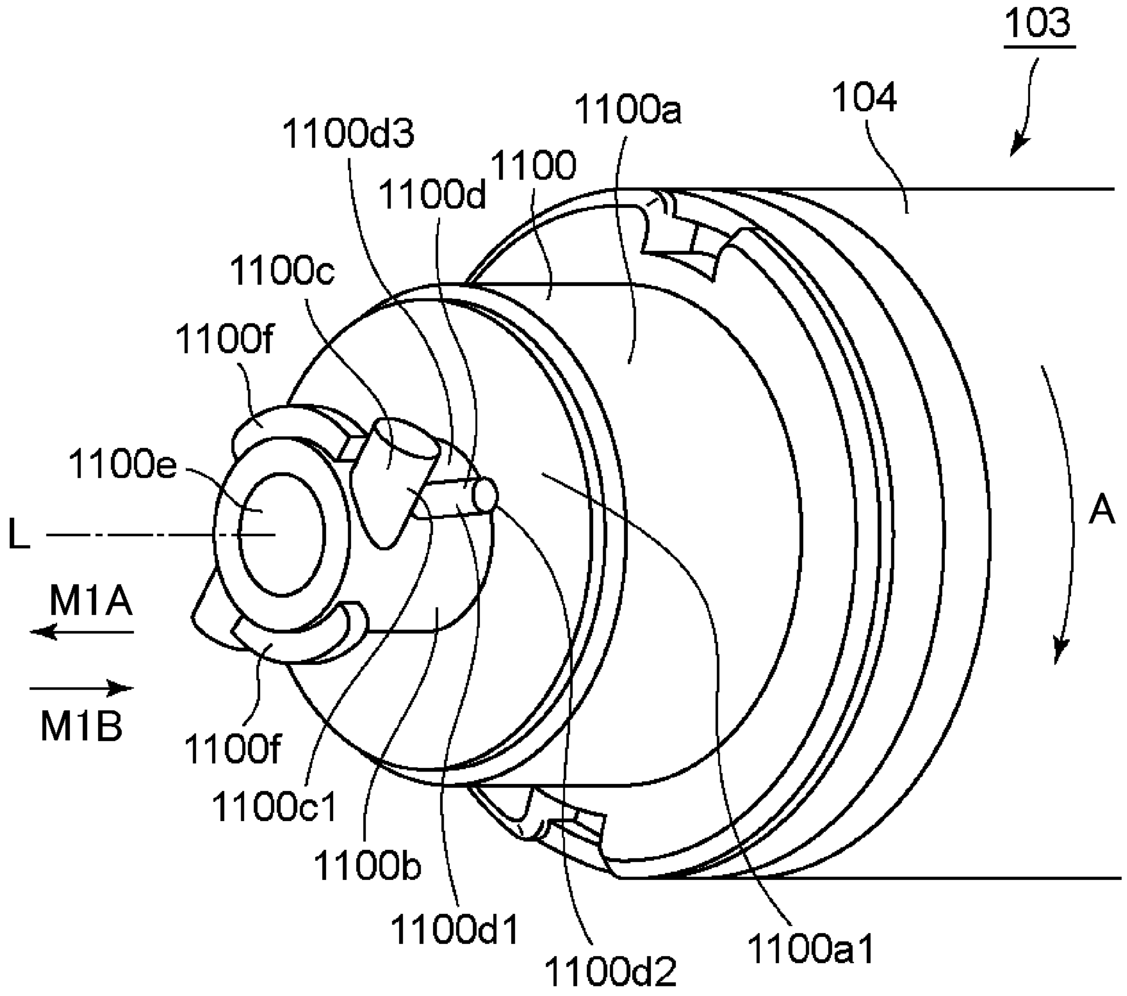
FIG. 111 is a perspective view of the drum coupling 1100.
Figure 112:
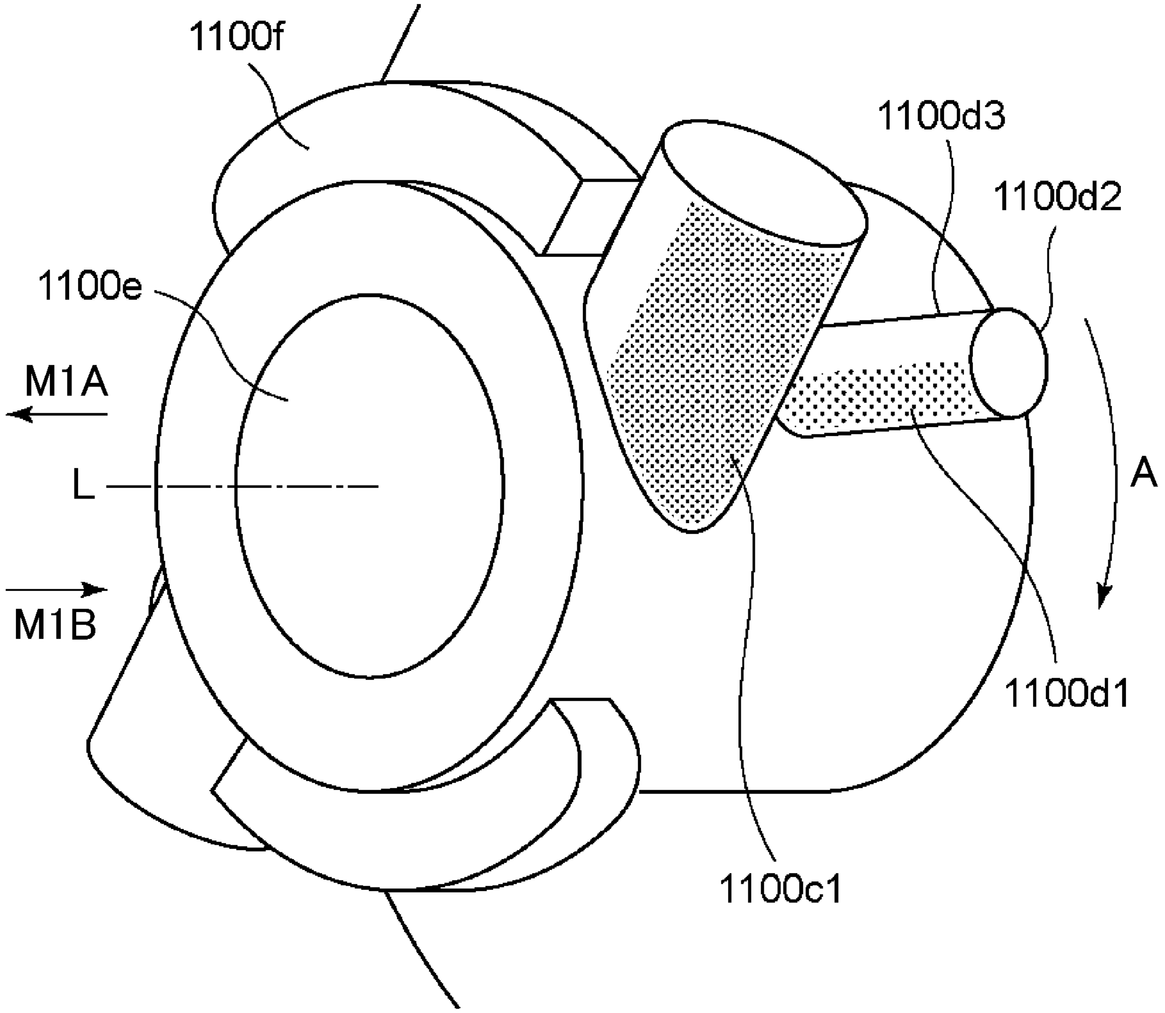
FIG. 112 is an enlarged perspective view of the drum coupling 1100.

FIGS. 111 and 112 are perspective views illustrating the structure of a drum coupling 1100. FIG. 112 is an enlarged view of FIG. 111.

The drum coupling 1100 of this embodiment has a shape different from that of the drum coupling 143 of the Embodiment 1 (see FIG. 1 and the like), but a brake engaging member can be guided in the same manner as the drum coupling 143 of the Embodiment 1, a braking force and a driving force can be received. That is, the drum coupling of this embodiment also has a portion (shape) having the same function as each portion of the drum coupling 143 of the Embodiment 1.

In the description of the drum coupling 1100 of this embodiment, as in the first and second embodiments, a direction from the photosensitive drum 104 toward a drive transmission unit 230 (drum drive coupling 180) along an axis L direction (arrow M1A) is referred to as an outward direction (outward) in an axial direction. That is, in the drum coupling 1100, outside in the axial direction means the side more remote from an end on a non-driving side of a cartridge 100 in the axial direction of the drum coupling 1, that is, the end on the non-driving side of a non-driving side cartridge cover member 117 or the photosensitive drum. In other words, in the drum coupling 1100, the outside in the axial direction is the direction away from a central portion of the cartridge 100 in the axial direction.

In addition, the direction opposite to the outward direction (the direction of the arrow M1B) is referred to as an inward direction in the axial direction. That is, in the drum coupling 1100, the inside in the axial direction means the side closer to the end on the non-driving side of the cartridge 100, that is, the end on the non-driving side of the non-driving side cartridge cover member 117 or the photosensitive drum in the axial direction of the drum coupling 1100. In other words, in the drum coupling 1100, the inside in the axial direction is the side approaching toward the central portion of the cartridge 100 in the axial direction. The same applies to the following embodiments.

In FIGS. 111 and 112, the drum coupling 1100 is mounted to the end of the photosensitive drum 104. By this, a drum unit 103 is structured as in the Embodiment 1. As the drum coupling 1100 is viewed from the driving side, that is, as the drum unit 103 is viewed along the arrow M1B direction, a rotational direction A of the drum unit 103 corresponds to a clockwise direction.

The drum coupling 1100 is provided with a projecting portion **1100*b* projecting outward in the axis L direction from the surface 1100*a*1 at an end of a shaft portion 1100*a***.

A base portion of the projecting portion **1100*b* has a cylindrical shape, and a first projection 1100*c* and a second projection 1100*d* project from the base portion of the projecting portion 1100*b* in a radial direction of the drum coupling 1100**.

The projecting portion **1100*b* is a base portion from which the first projection 1100*c* and the second projection 1100*d* project. In FIGS. 111 and 112, a cylindrical shape is shown as an example of the first projection 1100*c* and the second projection 1100*d*. The diameter of a circular cross-section of the first projection 1100*c* and the diameter of the circular cross-section of the second projection 1100*d* are smaller than the diameter of the circular cross-section of the projecting portion 1100*b***.

In the axis L direction, the first projection **1100*c* is disposed outside the second projection 1100*d* in the direction of the axis. In other words, the second projection 1100*d* is disposed closer to the non-driving side of the cartridge than the first projection 1100*c***.

Figure 113:
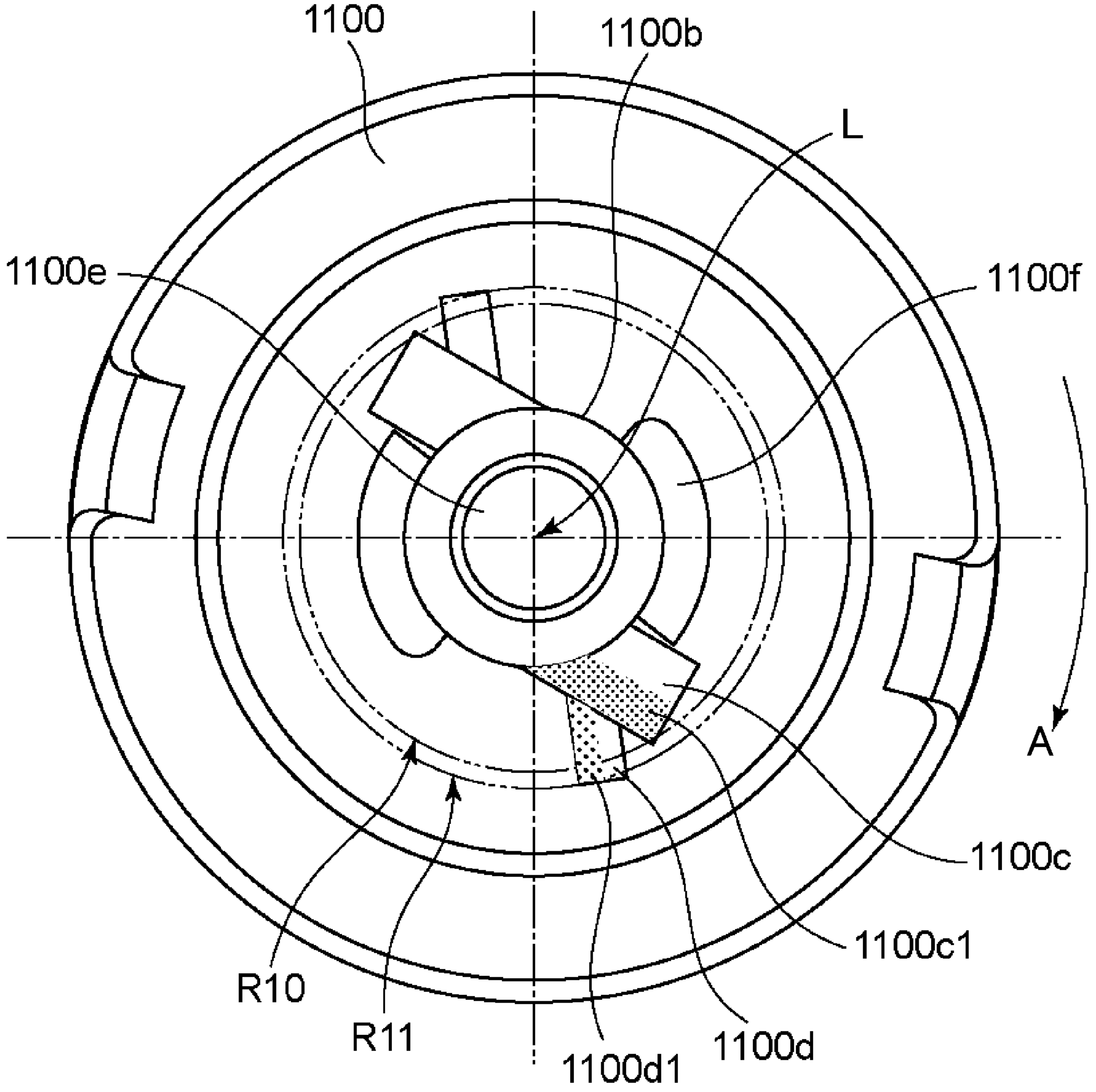
FIG. 113 is a front view of the drum coupling 1100.

FIG. 113 is a front view of the drum coupling 1100 as viewed from the driving side. As shown in FIG. 113, as the drum coupling 1100 is viewed from the driving side, the distance from the axis L to a free end portion located at an outermost edge of the first projection **1100*c* (radius of the circle R10 shown by a chain line) is smaller than the distance from the axis L to the second projection 1100*d* (radius of the circle R11** indicated by a chain line).

The projecting directions of the first projection **1100*c* and the second projection 1100*d*** are different from each other. That is, the projecting directions are not parallel to each other.

The direction in which the first projection **1100*c* extends from the projecting portion 1100*b* is upstream, in the rotational direction A, of the direction in which the second projection 1100*d* extends from the projecting portion 1100*b*. More particularly, the free end of the first projection 1100*c* is located in a range of 0 to 180 degrees toward the upstream side, in the rotational direction A of the drum coupling 1100, of the free end of the second projection 1100*d***.

In FIGS. 111 and 112, the drum coupling 1100 is provided with a positioning hole (opening) **1100*e* and a visor (visor portion) 1100*f*. The positioning hole (opening) 1100*e* is structured to engage with a positioning boss (positioning portion) 180*i* (FIG. 44, part (b) of FIG. 47) of a main assembly side drive coupling 180. The positioning hole (opening) 1100*e* is disposed on the axis L of the drum coupling 1100 and the photosensitive drum 104**.

The visor **1100*f* is a projecting portion (projecting portion) structured to prevent a brake engaging member 208 (FIG. 44 and part (b) of FIG. 47) on the main assembly side from entering in the axial direction. The visor 1100*f* is provided on the free end side of the projecting portion 1100*b* in the M1A direction, and projects radially outward of the projecting portion 1100*b*. In the L direction of the axis, the visor 1100*f* is disposed at a position overlapping with the first projection 1100*c*. That is, in a coordinate system parallel to the axis L, the visor 1100*f* and the first projection 1100*c* are at least partially overlapped with each other. In addition, the visor portion 1100*f* is disposed on the outward side in the axial direction (arrow M1A side) with respect to the second projection 1100*d*. In the rotational direction A of the drum coupling 1100, there is provided a space between the second projection 1100*d* and the downstream visor 1100*f***.

As mainly shown in FIG. 112, the first projection **1100*c* has an arc portion 1100*c*1 on the downstream side in the rotational direction A. The arc portion 1100*c*1 is an arc-shaped curved surface which forms a portion of the outer circumference of the first projection 1100*c*. The second projection 1100*d* has an arc portion 1100*d*1 and an arc portion 1100*d*2 on the downstream side in the rotational direction A. The arc portion 1100*d*1 and the arc portion 1100*d*2 are arc-shaped curved surfaces which form portions of the outer circumference of the second projection 1100*d***, respectively.

The arc portion **1100*d*1 is provided so as to face a surface of the second projection 1100*d*** which faces outward in the L direction.

The arc portion **1100*d*2 is provided so as to face a surface of the second projection 1100*d* which faces inward in the axial direction. A driving force receiving portion 1100*d*3 is provided on the upstream side, in the rotational direction A, of the second projection 1100**.

The first projection **1100*c*, the second projection 1100*d*, and the visor 1100*f*** are also provided at positions 180 degrees symmetrical with respect to the axis L.

The structures of this embodiment and the Embodiment 1 are compared. The arc portion **1100*c*1 of the first projection 1100*c* of this embodiment described above corresponds to an upstream slope (upstream guide) 143*d*2 of the drum coupling 143 (see FIG. 1 and part (a) of FIG. 47) of the Embodiment 1. In addition, the arc portion 1100*d*1 of the second projection 1100*d* corresponds to a downstream slope (downstream guide) 143*d*1 of the drum coupling 143 of the Embodiment 1. In addition, the arc portion 1100*d*2 of the second projection 1100*d* corresponds to the braking force receiving portion 143*c*. Further, the driving force receiving portion 1100*d*3 of the second projection 1100*d* corresponds to a driving force receiving portion 143*b* of the drum coupling 143 of the Embodiment 1. Furthermore, the visor (visor portion) 1100*f* corresponds to the visor (visor portion) 143*g* in Embodiment 1 (see FIG. 1 and part (a) of FIG. 47**).

As a result, the drum coupling 1100 of this embodiment are also engageable with the brake engaging member 204, 208 and drum drive coupling 180 on the main assembly side in the same manner as with the drum coupling 143 of embodiment 1, that is, through the same steps as those in FIGS. 60 to 72 and 48 to 50. In this embodiment, the description has been made on the premise of a structure in which the drum coupling 1100 of the cartridge is driven in the rotational direction A, which is the clockwise direction (see FIG. 111). However, as in the drum coupling 770 described in Embodiment 2 (see FIG. 89), the drum coupling 1100 may rotate counterclockwise. The drum coupling 770 of the Embodiment 2 has a shape as if the drum coupling 143 of the Embodiment 1 (see FIG. 1) were inverted left and right. Similarly, in this embodiment, it is possible to change the drum coupling 1100 so that it is rotated counterclockwise. In such a case, the shape of the drum coupling 1100 may be inverted left and right, that is, it is mirrored. The same applies to each embodiment which will be described hereinafter.

In addition, in this embodiment, the drum coupling 1100 of the cartridge has a shape which is 180 degrees symmetrical with respect to the rotation axis, but it is not inevitable. This is because the brake engaging members 204 and 208 and the drum drive coupling on the image forming apparatus main assembly side have a 180-degree symmetrical shape. For example, the drum coupling 1100 can receive the driving force from the drum driving coupling 180 as long as the driving force receiving portion **1100*d*3 of the drum coupling 1100** exists in only one of the two locations 180 degrees apart.

The same applies to any other portions of the drum coupling 1100 that act on the brake engaging members 204, 208, or the drum drive coupling 180. In Embodiment 1, a modified example in which the drum coupling 143 is changed to an asymmetrical shape has been described, referring to FIGS. 96 to 100 and so on. In the present it is also possible to employ a modified example using the same idea. That is, in the drum coupling 1100, the portions having the same function are located at each of the two 180 degrees symmetrical positions, but practically, the drum coupling 1100 operates if only one of them is provided. For example, it is possible to make a modification to the drum coupling 1100 to remove one of the two 180 degrees apart portions. The same applies to the examples which will be described hereinafter.

In this embodiment, in the drum coupling 1100, the first projection **1100*c* and the second projection 1100*d* are arranged so as to be adjacent to each other, and these projections constituting a pair are arranged at two positions which are 180 degrees symmetrical with each other. That is, the drum coupling 1100 has two first projections 1100*c* and two second projections 1100*d*. However, the drum coupling 1100 may have only one pair of the first projection 1100*c* and the second projection 1100*d*. In addition, when the drum coupling 1100 has only one first projection 1100*c* and one second projection 1100*d*, the first projection 1100*c* and the second projection 1100*d* do not have to be adjacent to each other. That is, these first projections 1100*c* and the second projections 1100*d* may be on opposite sides of the axis of the drum coupling 1100**.

The base portion from which the first projection **1100*c* and the second projection 1100*d* project does not necessarily have to be the projecting portion 1100*b*. For example, at least one of the first projection 1100*c* and the second projection 1100*d* may be structured to project from the surface 1100*a*1 at the end of the shaft portion 1100*a***.

Figure 114:
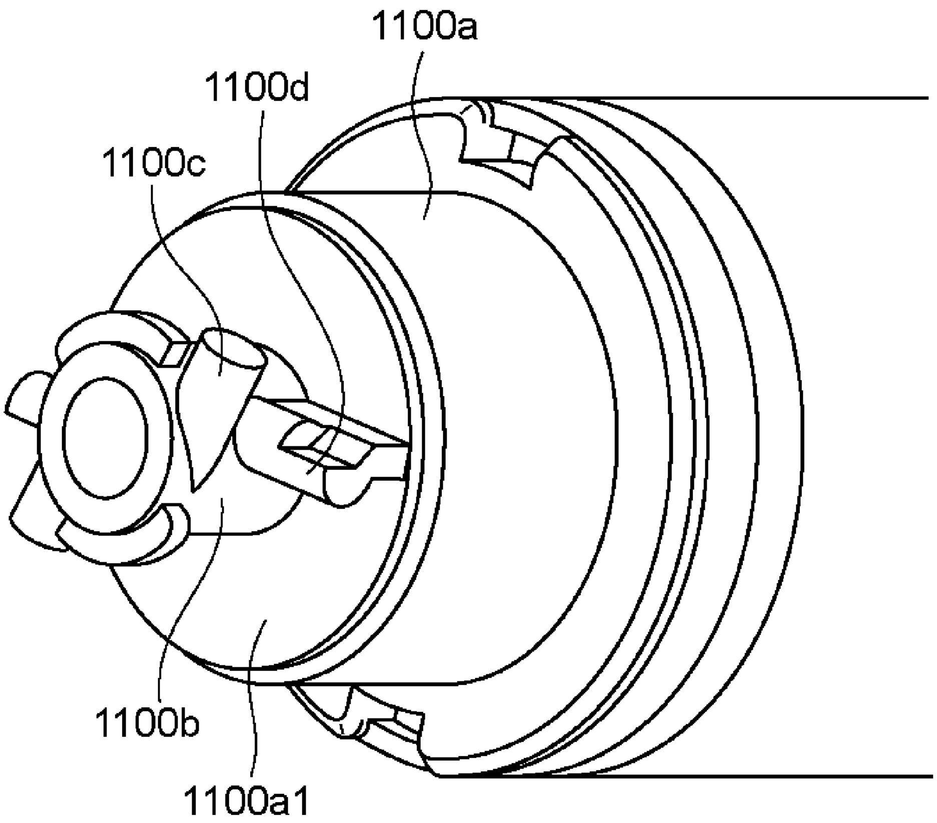
FIG. 114 is a perspective view illustrating a modified example of the drum coupling 1100.

FIG. 114 shows a modified example in which the second projection **1100*d* projects from the surface 1100*a*1 at the end of the shaft portion 1100*a*. In FIG. 114, the second projection 1100*d* is connected to both the surface 1100*a*1 and the projecting portion 1100*b*. The second projection 1100*d* can be regarded as projecting in the axial direction from the surface 1100*a*1 or in the radial direction from the projecting portion 1100*b***.

Further, the first projection **1100*c* and the second projection 1100*d* do not have to have a cylindrical shape. As an example, the second projection 1100*d* shown in FIG. 114** has a partly lacking cylindrical shape.

The coupling 1100 in this embodiment is coaxial with the photosensitive drum 104 adjacent to the end of the photosensitive drum 104 (see FIG. 1) and is directly connected to the photosensitive drum 104. However, as described above in Embodiment 1, the coupling 1100 may be placed at a position away from the end of the photosensitive drum 104, and the driving force is transmitted from the coupling 1100 to the photosensitive drum 104 by way of a gear or the like. In addition, while the coupling 1100 is disposed in the neighborhood of the end of the photosensitive drum 104, another transmission member for transmitting the driving force may be interposed between the coupling 1100 and the photosensitive drum 104.

That is, the coupling 1100 may be operatively connected to the photosensitive drum 104 so that the driving force can be transmitted toward the photosensitive drum 104, and the connecting method may be direct or indirect. Further, there is a latitude in the arrangement of the coupling 1100 with respect to the photosensitive drum 104.

However, it is preferable that the coupling 1100 is arranged coaxially in the neighborhood of the end portion of the photosensitive drum 104 in order to downsize the cartridge. Further, it is preferable that the coupling 1100 and the photosensitive drum 104 form one drum unit so that the coupling 1100 rotates integrally with the photosensitive drum 104 because then the structure of the cartridge is simple. Furthermore, it is preferable that the coupling 1100 is directly connected to the end portion of the photosensitive drum 104 in order to improve the accuracy of driving force transmission.

The above described also holds true for the connection between the photosensitive drum and the coupling in the other embodiments which will be described hereinafter.

Embodiment 4

In this embodiment, the drum coupling in which the shape of the drum coupling 143 (see FIG. 1) of the cartridge described in the Embodiment 1 and the like is partially modified will be described. In the drum coupling 143 of the Embodiment 1, the brake engaging member (204, 208) of the image forming apparatus main assembly is moved toward the downstream side in the rotational direction with respect to the main assembly side drum drive coupling 180 by the slope (guide) **143*d* (see FIG. 67, part (c) of FIG. 48, and so on). By this, the drum coupling 143 of the Embodiment 1 receives the braking force by engaging the braking force receiving portion 143*c* thereof with the brake engaging member (204, 208) (FIG. 68 and part (e) of FIG. 48**, and so on).

On the other hand, in this embodiment, the structure is such that the drum coupling of the cartridge is provided with a movable portion (moving portion), and the movable portion is operated to move the brake engaging member (204, 208) to a position for engagement with the braking force receiving portion.

In the following, this embodiment will be described in detail with reference to the drawings. The same structures as in the Embodiment 1 are assigned the same reference numbers as in the Embodiment 1, and the description thereof will be omitted.

[Drum Coupling Structure]

Figure 115:
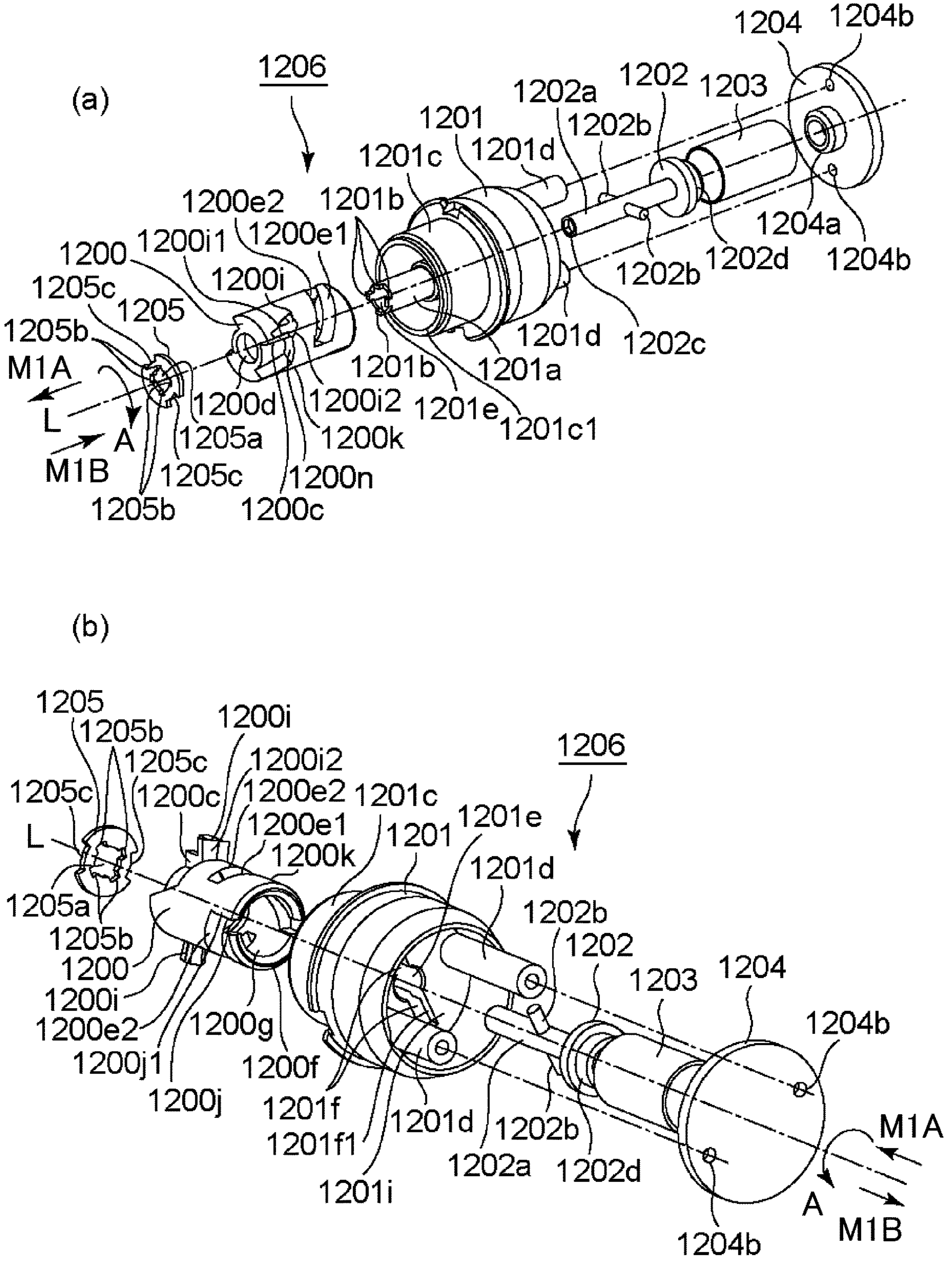
FIG. 115 is exploded perspective views of the drum coupling 1206.
Figure 116:
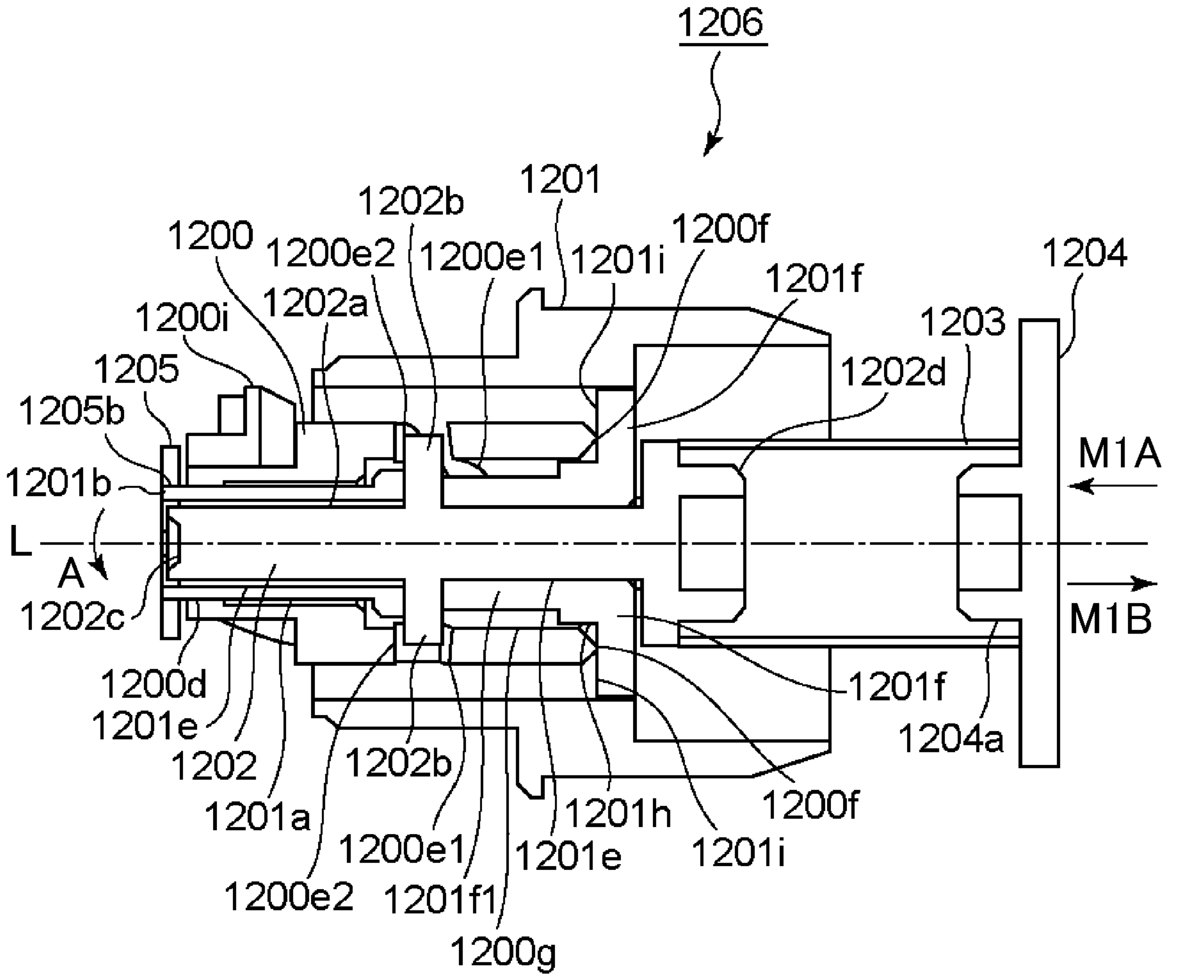
FIG. 116 is a sectional view of the drum coupling 1206.

Referring to FIGS. 115 and 116, a drum coupling 1206 will be described. FIG. 115 is an exploded perspective view of the drum coupling 1206, in which, part (a) of FIG. 115 is a view as seen in an axially inward direction (M1B direction) in the drum coupling, and part (b) of FIG. 115 is a view as seen in an axially outward direction (M1A). FIG. 116 is a sectional view of the drum coupling 1206. As shown in FIG. 115, the drum coupling 1206 includes a movable member (moving member) 1200 as a rotating member, a drum flange (coupling base, a coupling body) 1201, a pressed member 1202 as a movable member movable in the axial direction of the drum coupling 1206, an initialization spring 1203, a seat member 1204, and a top plate (visor plate, visor portion) 1205.

First, the components will be described.

The movable member 1200 has a substantially cylindrical shape, and a cylindrical support portion 1200*d* is provided at an end surface on the M1A side in the axial direction. The movable member 1200 has a projection 1200*i* projecting outward in the radial direction from an outer peripheral surface of a cylindrical portion 1200*k*.

The projection 1200*i* has a driving force receiving portion 1200*i*1 at the surface on the upstream side in the rotational direction A and a braking force receiving portion 1200*i*2 at the surface on the downstream side in the rotating direction A. The projection 1200*i* of the movable member 1200 has an acting surface 1200*c*. The acting surface 1200*c* is placed in the same phase as the downstream end of the braking force receiving portion 1200*i*2 in the rotational direction A and is placed radially inward of the outer peripheral surface of the cylindrical portion 1200*k*. The acting surface 1200*c* is formed up to the end surface on the M1A side in the axial direction.

Figure 117:
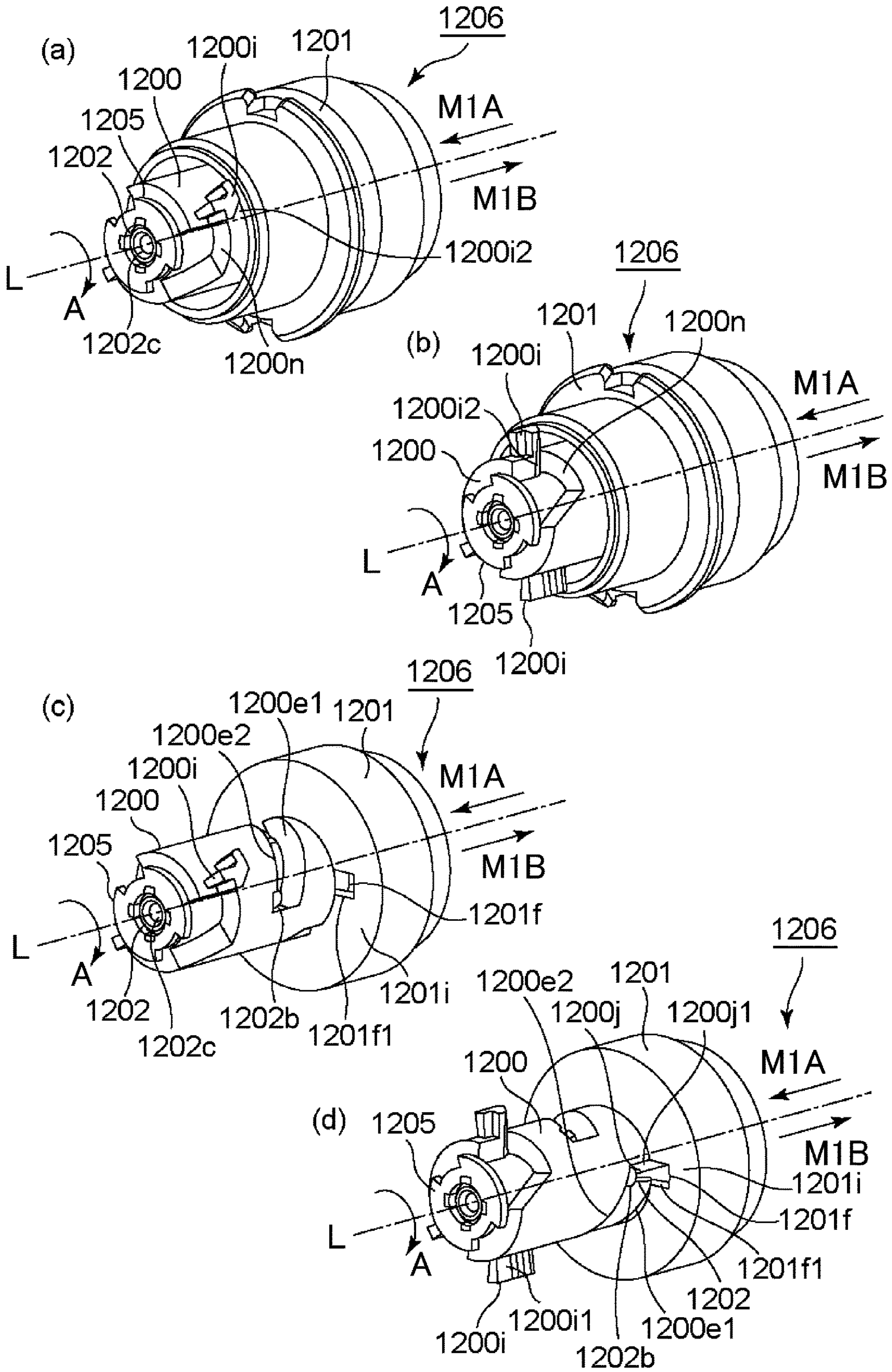
FIG. 117 is perspective views illustrating the operation of the drum coupling 1206.

The movable member 1200 has a brake facing surface 1200*n* perpendicular to the axis L, on the inner side, in the radial direction, of the outer peripheral surface of the cylindrical portion 1200*k* (part (a) of FIG. 117 and part (b) of FIG. 117. The brake facing surface 1200*n* extends toward the downstream side in the rotational direction, starting at the end of the upstream side in the rotational direction A of the braking force receiving portion 1200*i*2.

The braking force receiving portion 1200*i*2 is a surface inclined so that the inner side in the axial direction is upstream in the rotational direction A. The direction of inclination of the braking force receiving portion 1200*i*2 is the same as that of the braking force receiving portion 143*c* (see FIG. 1) described in the Embodiment 1.

The movable member 1200 is provided with a spiral slope (cam surface, inclined portion) 1200*e*1 inside the projection 1200*i* (the side indicated by the avow M1B direction) in the direction of the axis L. A slope (cam surface, inclined portion) 1200*e*2 having substantially the same shape as the slope 1200*e*1 is provided so as to face the slope 1200*e*1 on the M1A side in the axial direction with respect to the slope 1200*e*1. The respective slopes 1200*e*1 and 1200*e*2 have a phase difference of 120° between the start point (downstream side in the arrow A direction) and the end point (upstream side in the arrow A direction) of the spiral shape in the rotational direction of the movable member 1200.

This angle is an example and may be appropriately adjusted depending on the actual structure. A cut-away portion 1200*j* is provided in an end surface 1200*f* of the movable member 1200, and a cylindrical support portion 1200*g* centered on the axis L is provided. The cut-away portion 1200*j* is formed along the axial direction M1A, and is connected to the end points on the upstream side of the slope 1200*e*1 and the slope 1200*e*2 in the rotational direction A. In addition, the surface of the cut-away portion 1200*j* on the rotational direction A side is referred to as the cut-away portion 1200*j*1. In the movable member 1200, the projection 1200*i*, the acting surface 1200*c*, the slope 1200*e*1, the slope 1200*e*2, and the cut-away portion 1200*j* are provided in respective pairs symmetrically with respect to the axis L.

The drum flange (coupling base) 1201 has a substantially cylindrical shape, and is provided with a shaft portion 1201*a* extending a central axis L thereof. The shaft portion 1201*a* has a hollow shape provided with a circular hole portion 1201*e*. Four projections 1201*b* are provided at the free end of the shaft portion 1201*a* on the axial direction M1A side at 90° interval. The drum flange 1201 is provided with a support shaft portion 1201*c* supported by a driving side cartridge cover 116 (see FIG. 14) on the radially outer side of the shaft portion 1201*a*. That is, the photosensitive drum 104 (FIG. 1) is rotatably supported by the driving side cartridge cover 116 by way of the drum flange 1201 mounted to the end thereof.

Further, the end surface of the support shaft portion 1201*c* on the axial direction M1A side is a facing surface 1201*c*1 facing a drive transmission surface 180*d* (see FIG. 45 and the like) of the drum drive coupling 180. Inside the drum flange 1201, a wall portion 1201*i* perpendicular to or crossing with the axis L is provided. The above-described circular hole portion 1201*e* penetrates to the wall portion 1201*i*. The wall portion 1201*i* is provided with a pair of cut-away portions 1201*f* extending radially outward from the circular hole portion 1201*e*, and the pair of cut-away portions 1201*f* are arranged at 180-degree symmetrical positions with respect to the axis L.

Here, referring to FIG. 132, the cut-away portion 1201*f* will be described. FIG. 132 is a perspective view illustrating an assembled state of the drum flange 1201 and the pressed member 1202, and shows a state before engagement with the drive transmission unit (not shown). In addition, in FIG. 132, for the sake of better illustration, a portion of the drum flange 1201 on the M1A side in the axial direction from the wall portion 1201*i* is not shown. The structure of the pressed member 1202, the assembled state of the drum flange 1201 and the pressed member 1202, and the state before engagement with the drive transmission unit (not shown) will be described hereinafter.

In the state shown in FIG. 132, the cut-away portion 1201*f* in the wall portion 1201*i* is radially outside a pin 1202*b* of the pressed member 1202. The cut-away portion 1201*f* in the shaft portion 1201*a* is cut so as to be located on the axial direction M1A side with respect to the pin 1202*b*. In addition, the surface of the cut-away portion 1201*f* on the downstream side in the rotational direction A is referred to as a cut-away portion surface 1201*f*1.

Further, the drum flange 1201 is provided with a cylindrical support portion 1201*h* which projects from the wall portion 1201*i* in the axial direction M1A and which is centered on the axis L. Furthermore, as shown in FIG. 115, the drum flange 1201 is provided with a pair of cylindrical portions 1201*d* in the axial direction M1B side of the wall portion 1201*i*. These cylindrical portions 1201*d* have hollow shapes, respectively.

The pressed member 1202 is provided with a pair of pins 1202*b* symmetrically arranged so as to project outward in the radial direction from a shaft portion 1202*a* extending along the axis L. A pressed portion 1202*c* is provided at an end of the cylindrical portion 1202*a* on M1A side end in the axial direction. A support portion 1202*d* is provided at an end portion of the cylindrical portion 1202*a* on the M1B side end in the axial direction.

The initialization spring 1203 is formed of an elastic member (elastic member), and is a compression coil spring in this embodiment.

A seat member 1204 has a substantially disk shape, and a support portion 1204*a* is provided at the center thereof. The support portion 1204*a* projects from the seat member 1204. In addition, a pair of holes 1204*b* are provided in the outer side, in the radial direction, of the support portion 1204*a*.

The top plate 1205 has a substantially disk shape, and a hole 1205*a* is provided at the center. A groove 1205*b* is provided from the hole 1205*a* toward the outer side in the radial direction. The grooves 1205*b* are arranged at each of four positions at 90° interval. A pair of cut-away portions (openings) 1205*c* are provided on the outer peripheral surface of the top plate 1205. The cut-away portion 1205*c* is arranged so as to be point-symmetrical about the axis L. The cut-away portion 1205*c* of the top plate 1205 is a portion of a groove provided in the top plate 1205. Since the top plate 1205 is vacant inside the cut-away portion 1205*c*, an open space is provided.

The portion of the outer peripheral surface of the top plate 1205 (that is, the edge at the end portion in the radial direction) which forms the cut-away portion 1205*c* has a diameter smaller than that of the other portions. Therefore, in the outer peripheral surface of the top plate 1205, the portion forming the cut-away portion 1205*c* may be referred to as a small diameter portion, and the portion not provided with the other cut-away portion 1205*c* may be referred to as a large diameter portion. That is, the outer edge of the large diameter portion of the top plate 1205 is more remote from the axis L in the radial direction than the outer edge of the small diameter portion.

In other words, the cut-away portion 1205*c* of the top plate 1205 can be regarded as a recess (recess) in which the outer edge of the top plate 1205 is recessed inward in the radial direction. Conversely, the portion of the top plate 1205 not provided with the cut-away portion 1205*c* can be regarded as a projection (projection) projecting outward in the radial direction.

[Assembly of Drum Coupling]

Next, referring to FIG. 116, the assembly of the drum coupling 1206 will be described.

By inserting the movable member 1200 into the drum flange 1201 in the axial direction M1B, the cylindrical support portion 1200*d* is rotatably supported by the shaft portion 1201*a*, and the cylindrical support portion 1200*g* is rotatably supported by the cylindrical support portion 1201*h*. Further, in the engagement operation of the drum coupling 1206, which will be described hereinafter, the end surface 1200*f* of the movable member 1200 contacts the wall portion 1201*i* by which the position in the axis L direction is determined, and the movable member rotates and slides. The drum flange 1201 corresponds to the base (main body) of the coupling for supporting the movable member 1200.

The top plate 1205 is supported by a groove portion 1205*b* being fitted into the projection 1201*b* by being inserted into the axially inward (M1B) of the drum flange 1201. At this time, the top plate 1205 and the drum flange 1201 are integrally fixed by means such as press fitting or bonding. In addition, by fixing the top plate 1205 to the drum flange 1201, the top plate 1205 also functions as a retaining stopper for preventing the movable member 1200 from disengaging out outwardly (M1A) in the axial direction.

The pressed member 1202 is inserted into the drum flange 1201 outward (M1A) in the axial direction. The cylindrical portion 1202*a* of the pressed member 1202 is slidably supported by the circular hole portion 1201*e* of the drum flange 1201. When the pressed member 1202 is inserted into the drum flange 1201, the phase of the cut-away portion 1200*j* (see FIG. 115) and the phase of the cut-away portion 1201*f* are matched in advance. By this, the pin 1202*b* can pass through the wall portion 1201*i* of the drum flange 1201 and the end surface 1200*f* of the movable member 1200, and can be inserted between the slope 1200*e*1 and the slope 1200*e*2. In addition, the pin 1202*b* is restricted in the rotational direction by the cut-away portion 1201*f*, and therefore, the pin 1202*b* is in a state of being movable only relative to the axis L.

The initialization spring 1203 is supported at one end on the M1A side in the axial direction by the support portion 1202*d* of the pressed member 1202.

As shown in FIG. 115, the seat member 1204 is fixed to the cylindrical portion 1201*d* by a screw (not shown) penetrating through the hole 1204*b* in the axial direction M1A, with the other end of the initialization spring supported by the support portion 1204*a*. By this, the initialization spring 1203 can urge the pressed member 1202 in the axial direction M1A. The seat member 1204 may be fixed by any means such as adhesion or press fitting, as long as it can be integrally fixed to the drum flange.

Since the seat member 1204 and the top plate 1205 are integrated with the drum flange 1201, the seat member 1204, the top plate 1205, and the drum flange may be collectively regarded as a base (main body) of the coupling.

[Drum Coupling Operation]

Next, referring to FIG. 117, the operation of the drum coupling 1206 will be described.

FIG. 117 is a perspective view of the drum coupling 1206. Part (a) of FIG. 117 shows a state before engagement with the drive transmission unit 203 (see FIG. 44), and part (b) of FIG. 117 shows the state after engagement with the drive transmission unit 203, in which the pressed member 1202 retracts in the axial direction M1B after engaging with the drive transmission unit 203. Further, in part (c) of FIG. 117 and part (d) of FIG. 117, a portion of the drum flange 1201 on the axial direction M1A side from the wall portion 1201*i* is omitted for better illustration, and Figure (c) and part (d) of FIG. 117 illustrate the same state as with part (a) of FIG. 117 and part (b) of FIG. 117, respectively.

The operation of the drum coupling 1206 is an operation in which the movable member 1200 rotates in interrelation with the advancing/retracting operation of the pressed member 1202 along the axis L.

As shown in part (a) of FIG. 117, before engagement with the drive transmission unit 203 (see FIG. 44), the pressed member 1202 is urged axially outwardly (M1A) by the initialization spring 1203 (see FIGS. 115 and 116). By this, the pressed portion 1202*c* is in the neighborhood of the top plate 1205 (see part (b) of FIG. 118). The position of the pressed member 1202 at this time is referred to as an initial position of the pressed member 1202. In addition, the position of the movable member 1200 at this time is referred to as an initial position of the movable member 1200 (see part (a) of FIG. 117). The initialization spring 1203 urges the pressed member 1202 and the movable member toward the initial position.

When receiving an external force, the pressed member 1202 can move from this initial position to the inward (M1B) in the axial direction against an elastic force of the initialization spring 1203. The position of the pressed member 1202 after moving inwardly (M1B) in the axial direction is referred to as an acting position of the pressed member 1202 (see part (f) of FIG. 119).

As the pressed member 1202 moves from the initial position to the acting position, the movable member 1200 rotates 120° downstream in the rotational direction A, and becomes in the state shown in part (b) of FIG. 117. That is, in accordance with the movement of the pressed member 1202, the movable member also moves from the initial position thereof to an operating position thereof by 120 degrees in the circumferential direction of the coupling.

Figure 118:
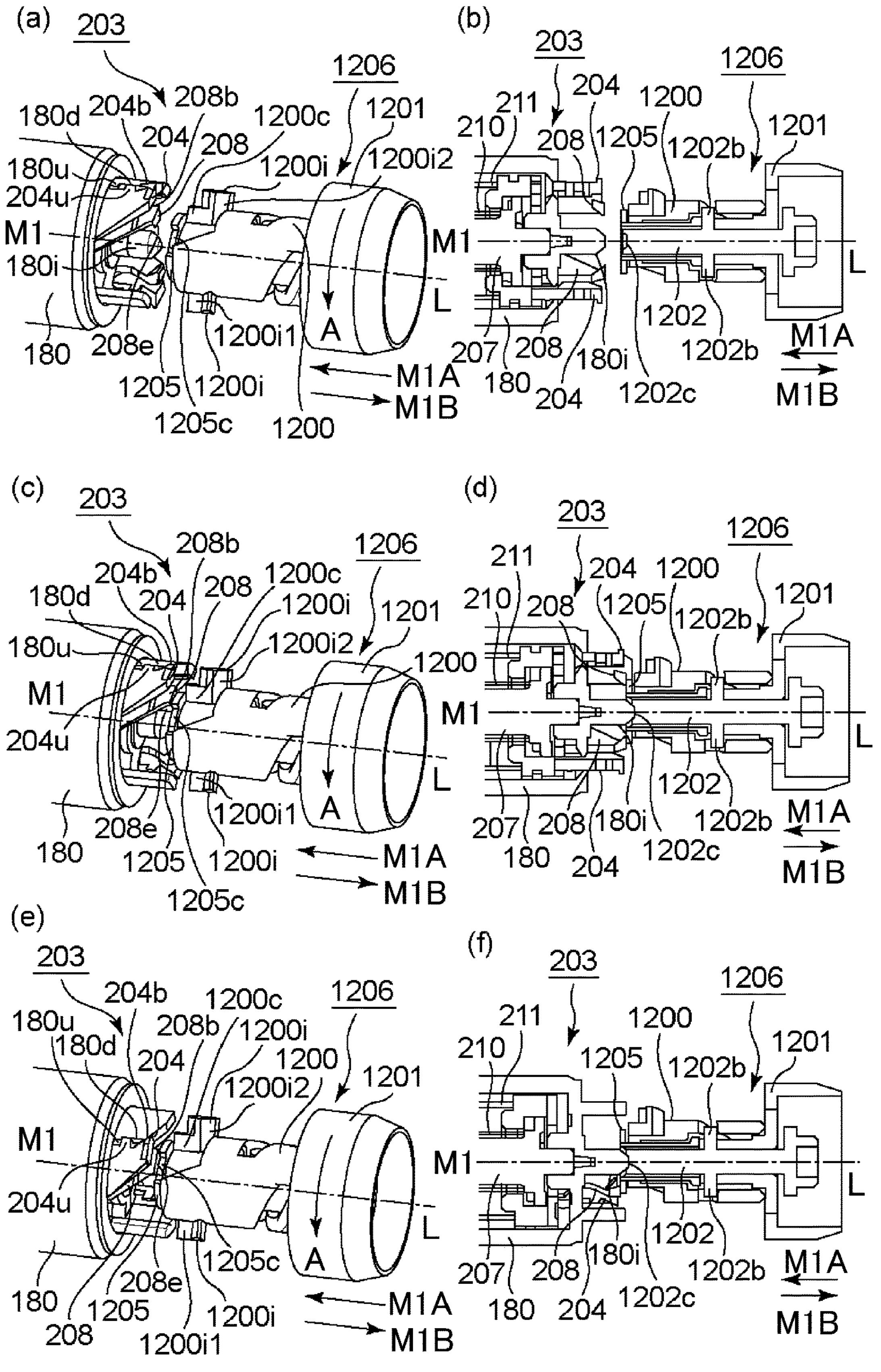
FIG. 118 is perspective views and sectional views illustrating the operation of the drum coupling 1206.
Figure 119:
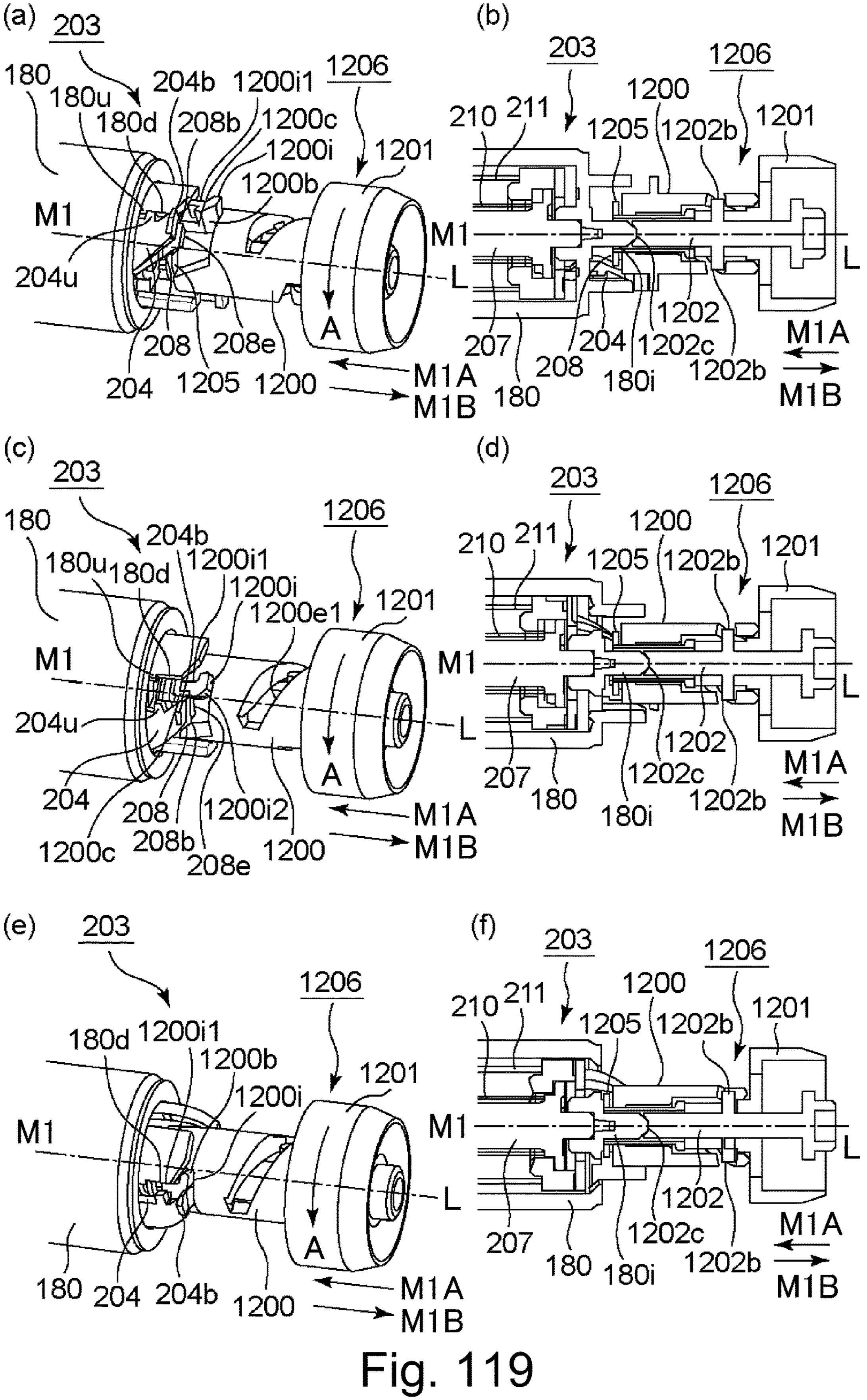
FIG. 119 is perspective views and sectional views illustrating the operation of the drum coupling 1206.

The pressed member 1202 is closer to the non-driving side of the cartridge in the axial direction when it is placed at the acting position (part (f) of FIG. 119) than when it is placed at the initial position (part (b) of FIG. 118). On the other hand, the movable member 1200 is placed downstream, in the rotational direction A, when it is placed at the acting position (part (b) of FIG. 117) than when it is placed at the initial position (part (a) of FIG. 117). That is, the acting position of the movable member 1200 is downstream, in the rotational direction A, by an angle larger than 0 degree and smaller than 180 degrees with respect to the initial position of the movable member 1200.

One of the initial position and the acting position of the pressed member 1202 may be referred to as a first position of the pressed member 1202, and the other may be referred to as a second position of the pressed member 1202. Similarly, regarding the initial position and the acting position of the movable member 1200, one may be referred to as a first position of the movable member 1200, the other may be referred to as a second position of the movable member 1200, or the like. Alternatively, the initial position of the pressed member 1202, the acting position of the pressed member 1202, the initial position of the movable member 1200, and the acting position of the movable member 1200 may be referred to as, first position, second position, third position, and fourth position, or the like, in no particular order.

Referring to part (c) of FIG. 117 and part (d) of FIG. 117, the above-described rotational operation between the initial position and the acting position of the movable member 1200 will be described in detail. As shown in part (c) of FIG. 117, when the pressed member 1202 moves in the axial direction M1B, the pin **1202*b* comes into contact with the slope 1200*e*1. When the pressed member further moves in the axial direction M1B from here, the pin 1202*b* tends to move along the slope 1200*e*1. However, the pressed member 1202 is constrained from rotation relative to the drum flange 1201 by the engagement between the pin 1202*b* and the cut-away portion 1201*f*. Therefore, the movable member 1200 rotates in the rotational direction A relative to the drum flange and the pressed member 1202 while the slope 1200*e*1 sliding on the pin 1202*b***.

Then, when the pressed member 1202 moves in the axial direction M1B and the movable member 1200 rotates 120 degrees in the rotational direction A, the state as shown in part (d) of FIG. 117 is reached. In this state, the pin **1202*b* and the cut-away portion 1200*j* overlap each other in the rotational direction of the movable member 1200. Further, the pin 1202*b* and the slope 1200*e*1 become out of contact with each other. Therefore, the pin 1202*b* cannot apply a force to the slope 1200*e*1, and the movable member 1200** cannot rotate further.

Next, the drive transmission of the drum coupling 1206 will be described. In the state of part (d) of FIG. 117, the movable member 1200 rotates in the rotational direction A by receiving the driving force from the driving force receiving portion **1200*i*1 in the rotational direction A. The cut-away surface 1200*j*1 of the movable member 1200 contacts the pin 1202*b*, and therefore, the pin 1202*b* receives a driving force and rotates in the rotational direction A. Then, the pin 1202*b* abuts on the surface 1201*f*1 of cut-away portion of the drum flange 1201 and transmits the driving force to the drum flange 1201. Then, the drum flange 1201** that receives the driving force rotates in the rotational direction A, and the driving is transmitted to the photosensitive drum (not shown).

Next, the operation when the pressed member 1202 moves in the axial direction M1A will be described. By the initialization spring 1204 (see FIGS. 115 and 116) the pin **1202*b* is moved in the axial direction M1A. By this, the pin 1202*b* is brought into contact with the slope 1200*e*2. By this, the movable member 1200 rotates in the direction opposite to the rotational direction A, and the operation at this time is the same as the above-described operation when the pressed member 1202** moves in the axial direction M1B, and therefore, the description thereof will be omitted.

[Engagement Operation Between Drive Transmission Unit and Drum Coupling]

Next, referring to FIGS. 118 and 119, the engagement operation between the drive transmission unit and the drum coupling will be described. FIG. 118 is a perspective view and a cross-sectional view illustrating a part of the engagement operation between the drive transmission unit 203 and the drum coupling 1206, in which part (a) of FIG. 118, part (c) of FIG. 118, and part (e) of FIG. 118 are perspective views, and FIG. 118 (B), part (d) of FIG. 118 and part (f) of FIG. 118 are sectional views. Part (a) of FIG. 118 and part (b) of FIG. 118 show a state in which the drive transmission unit 203 and the drum coupling 1206 are separated from each other. Part (c) of FIG. 118 and part (d) of FIG. 118 show a state in which the second brake engaging member 208 of the drive transmission unit 203 is in contact with the visor portion **1205*d* (see FIG. 145) of the top plate 1205**.

Part (e) of FIG. 118 and part (f) of FIG. 118 show a state in which the phase relationship between the second brake engaging member 208 and the cut-away portion **1205*c* is in phase alignment with each other. For better illustration, a part of the drum flange 1201 and a reinforcing cylindrical portion 180*e* of the drum drive coupling 180 (see FIG. 45) are not shown. FIG. 119 is perspective views and sectional views illustrating a part of the engagement operation between the drive transmission unit 203 and the drum coupling 1206, in which part (a) of FIG. 119, part (c) of FIG. 119, and part (e) of FIG. 119 are perspective views, and part (b) of FIG. 119, part (d) of FIG. 119, and part (f) of FIG. 119 are sectional views. Part (a) of FIG. 119 and part (b) of FIG. 119 show a state in which the acting surface 1200*c* of the movable member 1200 is in contact with the brake engaging member (204, 208). Part (c) of FIG. 119 and part (d) of FIG. 119 show a state in which the drum drive coupling 180 and the brake engaging member (204, FIG. 208) are separated by the movable member 1200. Part (e) of FIG. 119 and part (f) of FIG. 119 show a state in which the drive transmission unit 203 and the drum coupling 1206 are engaged with each other. For better illustration, a part of the drum flange 1201 and the reinforcing cylindrical portion 180*e* of the drum drive coupling 180 (see FIG. 45**) are not shown.

The engagement operation between the drive transmission unit and the drum coupling will be described. In the process of this engagement operation, there is a case in which the brake force acts on the brake engagement member (204, 208) and a case in which it does not act thereon. First, the description will be made as to a case in which the braking force acts on the brake engaging member (204, 208).

Referring to part (a) of FIG. 118 and part (b) of FIG. 118, the state in which the drive transmission unit 203 and the drum coupling 1206 are separated from each other will be described. As shown in part (a) of FIG. 118, in this state, the axis M1 of the drive transmission unit 203 and the axis L of the drum coupling 1206 are substantially aligned with each other. In addition, in the drive transmission unit 203, the coupling engaging portions (204*b*, 208*b*) and the drive transmission surface 180*d* are in a close phase relationship in the rotational direction A. As shown in part (b) of FIG. 118, in the drum coupling 1206, the pressed member 1202 is urged in the axial direction M1A, and therefore, the pressed portion 1202*c* is placed in the neighborhood of the top plate 1205. When the user closes a front door 111 (see FIG. 4) from this state, as has been described in the Embodiment 1, the drum drive coupling 180, the brake engaging member (204, 208) and the brake transmission member 207 are moved in the direction M1B. By this movement, the second brake engaging member is brought into contact with the top plate 1205 as shown in part (c) of FIG. 118.

Referring to part (d) of FIG. 118, the description will be made as to the state in which the second brake engaging member 208 and the top plate 1205 are in contact with each other. The drive transmission unit 203 is in a state that a positioning boss 180*i* is in contact with the pressed portion 1202*c*. In addition, in the drive transmission unit 203, the movement of the second brake engaging member 208 in the axial direction M1B is restricted by the top plate 1205. For this reason, the drum drive coupling spring 210 advances the brake transmission member 207 and the drum drive coupling 180 in the axial direction M1B relative to the brake engagement member (204, 208). Thereafter, as shown in part (c) of FIG. 118, an engaging portion 180*u* of the drum drive coupling 180 engages with an engaging portion 204*u* of the first brake engaging member 204. In addition, also when the first engaging portion 204*u* is not in the phase relationship of engaging with the engaging portion 180*u* in the rotational direction A, the second brake engaging member and the brake transmission member are maintained in contact with each other, as described in the Embodiment 1. In this state, the advancement of the brake transmission member 207 and the drum drive coupling 180 in the axial direction M1B is stopped, and the engagement operation is also stopped. Therefore, in order to carry on the engagement operation further, it is necessary to drive the drive transmission unit and rotate the drum drive coupling 180 in the rotational direction A. When the drum drive coupling 180 rotates in the rotational direction A, the drive transmission surface 180*d* abuts on the coupling engaging portion 204*b* to transmit the driving force, so that the brake engaging member (204, 208) also rotates in the rotational direction A. Then, the phase relationship between the inward projection 208*e* of the brake engaging member 208 and the cut-away portion 1205*c* of the top plate 1205 changes so that they are in phase with each other as shown in part (e) of FIG. 118.

As shown in part (e) of FIG. 118, when the inward projection 208*e* and the cut-away portion 1205*c* are in phase with each other, the movement restriction of the brake engaging member (204, 208) in the axial direction M1B ceases. That is, the brake engaging member (204, 208) becomes allowed to enter open space formed by the cut-away portion 1205*c*.

Therefore, as shown in part (f) of FIG. 118, the drum drive coupling 180, the brake engaging member (204, 208) and the brake transmission member 207 are moved in the axial direction M1B by the drum drive coupling spring 210 and the brake engaging spring 211. Then, the positioning boss 180*i* presses the pressed portion 1202*c* in the axial direction M1B, and therefore, the pressed member 1202 starts to move in the axial direction M1B. As described above, by the pressed member 1202 moving in the axial direction M1B, the movable member 1200 is rotated in the rotational direction A shown in part (e) of FIG. 118.

As the movable member 1200 rotates in the rotational direction A in accordance with the movement of the drum drive coupling member 180 in the axial direction M1B, the acting surface 1200*c* becomes in contact with the coupling engaging portion 208*b* having moved in the axial direction M1B, as shown in part (a) of FIG. 119.

From the state in which the acting surface 1200*c* is in contact with the coupling engaging portion 208*b* as shown in part (a) of FIG. 119, the drum drive coupling 180 further moves inward in the axial direction M1B, and the pressed member is moved inward in the axial direction M1B. In interrelation with the movement of the pressed member, the movable member 1200 further rotates in the rotational direction A. Then, the brake engaging member (204, 208) receives a force from the acting surface 1200*c*, so that the brake engaging member (204, 208) rotates in the rotational direction A.

In the case that the rotational speed of the brake engaging member (204, 208) at this time is higher than the rotational speed of the drum drive coupling 180, the brake engaging member (204, 208) is moved downstream in the rotational direction A relative to the drum drive coupling 180. Then, the coupling engaging portion (204*b*, 208*b*) and the drive transmission surface 180*d* begin to separate in the rotational direction A.

Then, as shown in part (c) of FIG. 119, the drum drive coupling 180 and the brake engaging member (204, 208) are separated from each other by the movable member 1200. The rotational speed of the movable member 1200 can be adjusted by adjusting the slope angle of the slope 1200*e*1.

As described above, the acting surface 1200*c* of the movable member 1200 is an abutting portion structured to abut to the brake engaging member (204, 208). In addition, the acting surface 1200*c* is an acting portion or an urging portion which apply a force for rotationally moving the brake engaging member (204, 208) toward the downstream side in the rotational direction A relative to the drum drive coupling member 180. In this embodiment, the acting surface 1200*c* has a planar shape, but it is not necessarily limited to such an example. The shape of the acting portion may be any as long as it can contact the brake engaging member (204, 208) and apply a force thereto.

As shown in part (c) of FIG. 119, when the drum drive coupling 180 and the brake engaging member (204, 208) are separated from each other, the driving force receiving portion 1200*i*1 is placed downstream of the drive transmission surface 180*d* in the rotation direction A. Therefore, the projection 1200*i* can enter between the coupling engaging portion (204*b*, 208*b*) and the drive transmission surface 180*d*. When the drum coupling member 180 further moves inward (M1B) from this state in the axial direction, the projection 1200*i* enters between the coupling engaging portions (204*b*, 208*b*) and the drive transmission surface 180*d*.

Then, the drum coupling 1206 becomes in a state that the movable member 1200 cannot rotate any further as shown in part (d) of FIG. 117. Since the movable member 1200 cannot rotate in the rotational direction A any further, the drive transmission surface 180*d* abuts on the driving force receiving portion 1200*i*1 to apply the driving force by the rotation of the drum drive coupling 180.

The movable member 1200 rotates in the rotational direction A by receiving a driving force from the drive transmission surface 180*d* at the driving force receiving portion 1200*i*1. By the rotation of the movable member 1200, the braking force receiving portion 1200*i*2 of the movable member 1200 is brought into contact with the coupling engaging portions (204*b*, 208*b* (see part (c) of FIG. 119)). By the above-described operation, the movable member 1200 and the brake engaging member (204, 208) of the drum coupling 206 brought into the engaged state as shown in part (e) of FIG. 119.

By the above-described operation, the engagement operation between the drive transmission unit 203 and the drum coupling 1206 is completed, so that the drive transmission from the drive transmission unit 203 to the drum coupling 1206 is enabled. That is, the driving force and the braking force can be transmitted from the drive transmission unit 203 to the photosensitive drum by way of the movable member 1200 and the drum flange 1201. Since the subsequent operations are the same as those in the Embodiment 1, the description thereof will be omitted.

The top plate 1205 of the drum coupling 1206 described above is a portion that blocks the brake engaging member (204, 208) from entering an inappropriate region. That is, the top plate 1205 is a portion corresponding to the visor portion 143*g* (see part (a) of FIG. 1) of the Embodiment 1.

When the movable member 1200 is located at the initial position shown in part (a) of FIG. 145, in the portion of the phase in which the projection 1200*i* is placed and the neighborhood thereof, or in the portion of the phase which is 180 degrees opposite to the projection 1200*i* and the neighborhood thereof, in the rotational direction A, the top plate 1205 projects outward in the radial direction. That is, in these phases, the top plate 1205 forms a visor portion (projection, projecting portion) 1205*d* (see part (a) of FIG. 145).

On the other hand, with respect to the rotational direction A, there is a region in which the top plate 1205 does not exist at least partially, in a phase other than the phase of the projection 1200*i*. That is, the top plate 1205 has a region in which a cut-away portion (open space) 1205*c* is formed.

That is, in the rotational direction A, the phase in which the cut-away portion (open space) 1205*c* exists is a region in which neither of the projection 1200*i* or the visor portion 1205*d* (see FIG. 145) formed by the top plate 1205 exists.

Here, it has been described that the engagement operation between the drive transmission unit 203 and the drum coupling 1206 described above is carried out in a state where the brake force does not act on the brake engagement members (204, 208). This is a state in which the projection 207*e* and the projection 204*e* shown in FIG. 59 are not engaged with each other. In this state, the brake engaging member (204, 208) is disengaged from the brake transmission member 207, and therefore, the brake member 206 (see FIG. 44) does not receive a load. For this reason, the force required for the movable member 1200 to rotate the brake engaging member (204, 208) is small, and the movable member 1200 can be easily rotated.

On the other hand, it is possible that the drive transmission unit 203 and the drum coupling 1206 are engaged with each other in a state that the projection 207*e* and the projection 204*e* (see FIG. 59) are in engagement with each other. In such a state, the brake engaging member (204, 208) is connected to the brake member 206 (see FIG. 44) by way of the brake transmission member 207, so that the rotational load of the brake engaging member (204, 208) is large. Therefore, the force required for rotating the brake engaging member (204, 208) of the movable member 1200 may not be sufficient. However, even when the projection 207*e* and the projection 204*e* are in engagement with each other, the drive transmission unit 203 and the drum coupling 1206 can be engaged with each other. Hereinafter, referring to FIG. 120, the engagement operation in the state that the projection 207*e* and the projection 204*e* are in engagement with each other will be described. The description of the same operation as the engagement operation at the time when the projection 207*e* and the projection 204*e* are not engaged will be omitted.

Figure 120:
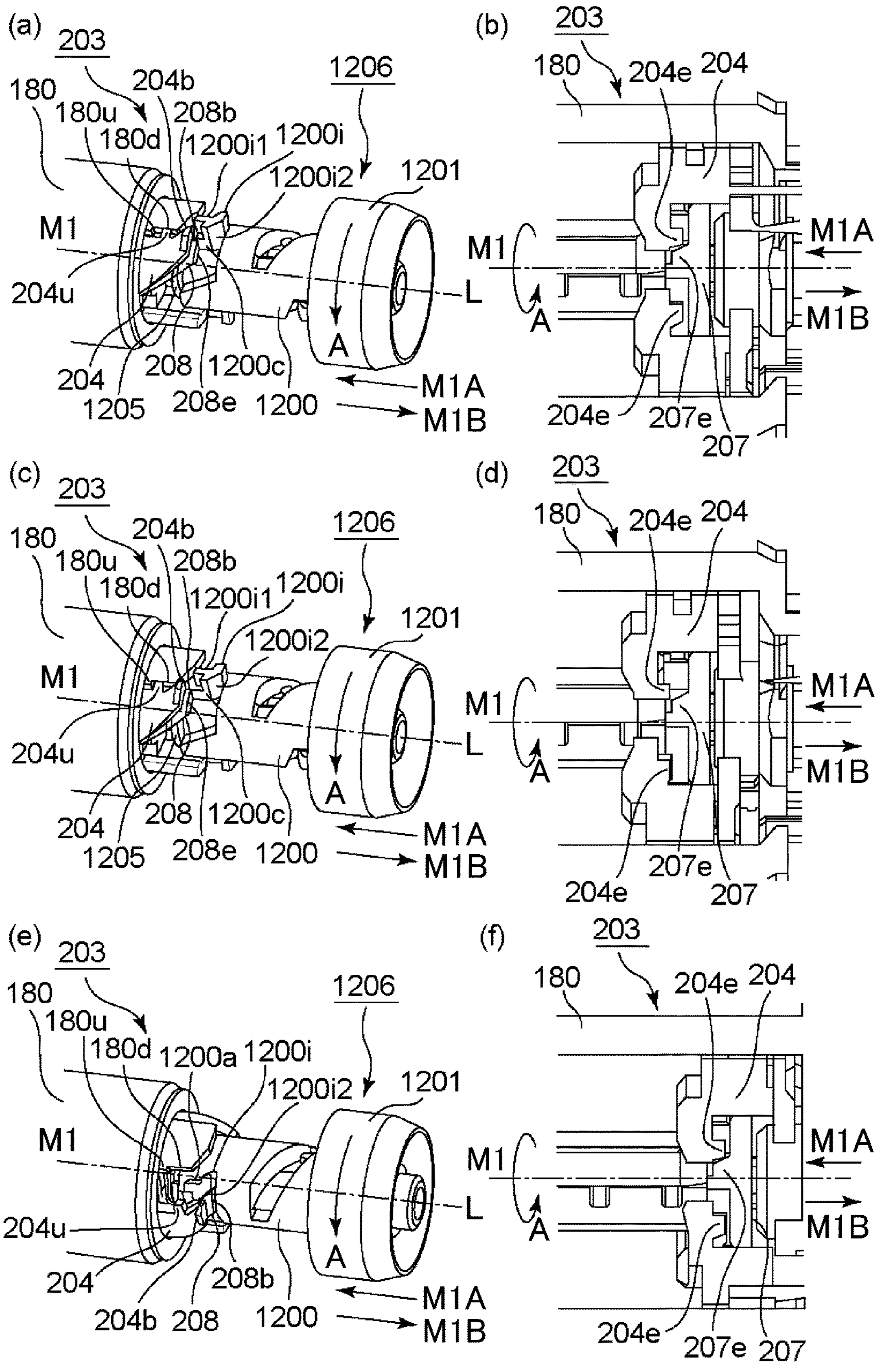

FIG. 120 is perspective views and sectional views illustrating a part of the engagement operation between the drive transmission unit 203 and the drum coupling 1206, wherein parts (a), (c) and (e) of FIG. 120 are perspective views, and parts (b), (d) and (f) of FIG. 120 are enlarged sectional views of the projection 207*e* and the projection 204*e*. Part (a) of FIG. 120 and part (b) of FIG. 120 show a state in which the projection 207*e* and the projection 204*e* are engaged with each other in a state that the acting surface 1200*c* and the coupling engaging portion 208*b* are in contact with each other. Part (c) of FIG. 120 and part (d) of FIG. 120 show a state in which the projection 207*e* and the projection 204*e* are disengaged from each other. Figure (e) and part (f) of FIG. 120 show a state in which the brake engaging member (204, FIG. 208) is rotated by the movable member 1200. For the sake of better illustration, a part of the drum flange 1201 and the reinforcing cylindrical portion 180*e* of the drum drive coupling 180 (see FIG. 45) are not shown.

In the state in which the projection 207*e* and the projection 204*e* are engaged with each other as shown in part (b) of FIG. 120, the load required for rotating the brake engaging member (204, 208) is large. For this reason, as shown in part (a) of FIG. 120, the movable member 1200 is in a state that the acting surface (acting portion) 1200*c* cannot rotate the brake engaging member (204, 208) in the rotational direction A. Further, since the movable member 1200 cannot rotate, the pressed member 1202 (see FIG. 116) cannot move inward in the axial direction M1B, and the drum drive coupling 180 also stops moving in the axial direction M1B.

From this state, the engagement between the projection 207*e* and the projection 204*e* is broken by utilizing the driving force for rotating the drum drive coupling 180 in the rotational direction A. Here, as shown in part (b) of FIG. 120, the projection 204*e* has such a slope shape that the contact surface relative to the projection 207*e* goes in the axial direction M1B as goes toward the upstream side in the rotational direction A. Due to this slope shape, when the brake engaging member (204, 208) rotates in the rotational direction A, a force tending to move in the axial direction M1A is produced. By this, the brake engaging member (204, 208) is moved in the axial direction M1A when the driving force is received in the rotational direction A by the drum drive coupling 180. This movement enables disengagement between the projection 207*e* and the projection 204*e*. Then, as shown in part (d) of FIG. 120, the projection 207*e* and the projection 204*e* are brought into disengagement from each other. By the disengagement between the projection 207*e* and the projection 204*e*, the brake engaging member (204, 208) is disengaged from the brake transmission member 207, and is no longer subjected to the load by the brake member 206 (see FIG. 44), with the result that the required rotational load becomes very small. Therefore, the movable member 1200 can rotate the brake engaging member (204,

208) in the rotational direction A. Then, as shown in part (e) of FIG. 120, the brake engaging member (204, 208) is rotated by the movable member 1200. Subsequent operations are the same as those when the projection 207*e* and the projection 204*e* are out of engagement with each other as described above, and therefore, the description thereof will be omitted.

The coupling 1206 of this embodiment described above can be summarized as follows.

The coupling 1206 of this embodiment is provided on the driving side of the cartridge or the drum unit in the axial direction of the photosensitive drum, similarly to the drum couplings of the above-described embodiments. That is, the coupling 1206 is provided in the neighborhood of the driving side cartridge cover 116 which constitutes the end portion of the casing of the cartridge. In addition, the coupling 1206 is provided in the neighborhood of the end portion on the driving side of the photosensitive drum 104 (see part (b) of FIG. 1).

Then, it is provided with a projection 1200*i* for moving the brake engaging member (brake force applying member: 204, 208) relative to the drum drive coupling (driving force applying member) 180 and for wedging between them.

Specifically, the projection 1200*i* is provided with an operating surface (operating portion) 1200*c* for moving the brake engaging member (brake force applying member: 204, 208) relative to the drum drive coupling (driving force applying member) 180. The acting surface (acting portion) 1200*c* moves the brake engaging member (204, 208) to the downstream side in the rotational direction A relative to the drum drive coupling 180 (see part (c) of FIG. 119, part (e) of FIG. 120, and so on). By this, the acting surface (acting portion) 1200*c* creates and widens a gap between the brake engaging member (204, 208) and the drum drive coupling 180.

The projection 1200*i* of the coupling 1206 enters this widened gap. Then, the projection 1200*i* is sandwiched between the brake engaging member (204, 208) and the drum drive coupling 180 (see part (e) of FIG. 119). By this, the braking force receiving portion 1200*i*2 of the projection 1200*i* is in a state of being capable of receiving the braking force from the brake engaging member (204, 208), and the driving force receiving portion 1200*i*1 of the projection 1200*i* is in a state of being capable of receiving the driving force from the drum drive coupling 180. The projection 1200*i* is an engaging portion which engages with the brake engaging member (204, 208) and with the drum drive coupling 180. In addition, the movable member including the projection 1200*i* is an engaging member.

The driving force and braking force received by the projection 1200*i* are transmitted from the movable member 1200 to the photosensitive drum by way of the drum flange (coupling base, coupling body) 1201 (see FIG. 115).

The movable member 1200 is a driving force receiving member for receiving a driving force and a braking force from the outside, and the drum flange 1201 is a transmission member for transmitting these forces toward the photosensitive drum.

The drum flange 1201 may also be referred to as body or base of the drum coupling 1206. The pressed portion 1202*c* and the projection 1200*i* move relative to the drum flange 1201.

In this embodiment, the acting surface (acting portion) 1200*c*, the braking force receiving portion 1200*i*2, and the driving force receiving portion 1200*i*1 are all parts of the projection 1200*i* projecting outward in the radial direction.

However, the present invention is not limited to such a structure. For example, it is not necessary that the same projection 1200*i* includes all of the acting surface (acting portion) 1200*c*, the braking force receiving portion 1200*i*2, and the driving force receiving portion 1200*i*1. For example, it is possible that the projection 1200*i* is separated into a plurality of projections, in which the acting surface (acting portion) 1200*c*, the braking force receiving portion 1200*i*2, and the driving force receiving portion 1200*i*1 are provided on different ones of the projections. Also, in such a case, it is desirable that the acting surface (acting portion) 1200*c*, the braking force receiving portion 1200*i*2, and the driving force receiving portion 1200*i*1 can move integrally downstream in the rotational direction A.

In addition, the drum coupling 1206 is provided with two projections 1200*i*, and these two projections 1200*i* placed on opposite sides with respect to the axis L. However, the present invention is not limited to such a structure. The drum coupling 1206 may have only one projection 1200*i*. That is, the drum coupling may have at least one projection 1200*i*.

When the drum coupling has two projections 1200*i*, the functions of the two projections 1200*i* may be different from each other. For example, the structure may be such that one of the projections 1200*i* has a driving force receiving portion 1200*i*1 but does not have a braking force receiving portion 1200*i*2, and the other projection 1200*i* does not have a driving force receiving portion 1200*i* but has a braking force receiving portion 1200*i*2. Similarly, the acting surface 1200*c* may be structured to be provided on only one of the two projections 1200*i*.

For example, one of the two projections 1200*i* has one of the acting surface (acting part) 1200*c*, the braking force receiving portion 1200*i*2, and the driving force receiving portion 1200*i*1, and the other of the two projections 1200*i* has the rest of the acting surface (acting portion) 1200*c*, the braking force receiving portion 1200*i*2 and the driving force receiving portion 1200*i*1.

The projection 1200*i* provided with the acting surface 1200*c* is operatively connected to the pressing portion 1202*c* (see part (c) of FIG. 117), and is structured to move the projection 1200*i* in interrelation with the movement of the pressing portion 1202*c*.

Specifically, the pressed portion 1202*c* is pressed by the positioning boss (pressing portion) 180*i* and moves inward (in the direction of the arrow M1B) in the axial direction so as to approach the end on the non-driving side of the cartridge. By this, the projection 1200*i* and the acting surface 1200*c* thereof move downstream in the rotational direction A (see part (c) of FIG. 119 and part (d) of FIG. 119).

As described above, in the direction of the axis L, the side where the drum coupling is provided on the cartridge (the side indicated by the arrow M1A) is referred to as a driving side, and the side opposite to the driving side (the side indicated by the arrow M1B) is referred to as a non-driving side of the cartridge. One of the driving side and the non-driving side may be referred to as a first side of the cartridge (the first side of the drum unit), and the other of the driving side and the non-driving side may be referred to as a second side of the cartridge (the second side of the drum unit).

One of the pressed portion 1202*c* and the projection 1200*i* may be referred to as a first moving portion (movable portion), and the other may be referred to as a second moving portion (movable portion).

The projection 1200*i* is a portion of the drum coupling 1206 which portion is movable relative to the drum flange 1206. Specifically, the projection 1200*i* is a rotating portion (circumferential moving portion, circumferentially movable portion) which can move in the circumferential direction of the coupling, that is, downstream of the rotational direction A of the coupling. The pressed portion 1202*c* is a translational portion (linear movement portion) capable of translational movement in the axial direction.

Since the pressed portion 1202*c* is placed on the axis L of the coupling 1206, the pressed portion 1202*c* is capable of being contacted and pressed by the positioning boss (pressing portion) 180*i* of the image forming apparatus main assembly.

The pressed portion 1202*c* can also be regarded as an operating portion operated to move the projection 1200*i*.

In addition, the drum coupling 1206 of this embodiment is provided with an initialization spring (see FIGS. 115 and 116) as an elastic member (spring, urging member). The initialization spring 1204 is a member for urging the pressed member 1202 (1202*c*) and the movable member (acting surface 1200*c*, braking force receiving portion 1200*i*2, and driving force receiving portion 1200*i*1) toward the initial positions (part (a) of FIG. 117 and part (c) of FIG. 117).

In a state that no external force is applied to the drum coupling 1206, the pressed member 1202 and the movable member 1200 are kept in the initial position shown in part (a) of FIG. 117, part (a) of FIG. 118, and part (b) of FIG. 118 and so on, by the elastic force of the initialization spring 1204.

On the other hand, when the pressed portion 1202*c* receives a force from the positioning boss (pressing portion) 180*i* of the image forming apparatus main assembly, the pressed member 1200 and the movable member 1200 move to the acting position against the elastic force of the initialization spring 1204. That is, the pressed member 1202, the pressed portion 1202*c* thereof, the movable member 1200 and the acting surface 1200*c* thereof, the braking force receiving portion 1200*i*2, and the driving force receiving portion 1200*i*1 are in the state of being in the acting position shown in part (b) of FIG. 117, part (d) of FIG. 117, and part (e) of FIG. 119 and part (f) of FIG. 119.

For reference, FIGS. 145 and 146 show front views of the drum coupling 1206. Part (a) of FIG. 145 and part (a) of FIG. 146 correspond to part (a) of FIG. 117, and are front views illustrating a state in which the projection 1200*i* or the like is in the initial position. On the other hand, part (b) of FIG. 145 and part (b) of FIG. 146 correspond to part (b) of FIG. 117 and are front views showing a state in which the projection 1200*i* is in the acting position.

The pressed portion 1202*c* is at a position closer to the non-driving side of the cartridge (arrow M1B side) when it is in the acting position (part (e) of FIG. 119 and part (f) of FIG. 119) than when it is in the initial position (part (a) of FIG. 118 and part (b) of FIG. 118). In addition, each portion (1200*c*, 1200*i*2, 1200*i*1) of the movable member 1200 moves downstream in the rotational direction A from the initial position (part (a) of FIG. 117, part (a) of FIG. 145, part (a) of FIG. 146) toward the acting position(part (b) of FIG. 117, part (d) of FIG. 117, part (b) of FIG. 145, and part (b) of FIG. 146).

The pressed portion 1202*c* is contacted by the positioning boss (pressing portion) 180*i* of the image forming apparatus main assembly and receives a force, and therefore, it is desirable that the pressed portion 1202*c* is placed coaxially with the drum coupling 1206. That is, it is desirable that the pressed portion 1202*c* is disposed on or near the axis of the drum coupling 1206.

The drum coupling 1206 is provided with the top plate 1205 including a visor portion 1205*d* (see FIG. 145). The visor portion 1205*d* of the top plate 1205 constrains the brake engaging member (204, 208) from approaching the cartridge or the drum unit in the axis L direction (see part (e) of FIG. 118). That is, the visor portion (block portion, projection, projecting portion) 1205*d* of the top plate 1205 blocks (suppresses) the brake engaging member (204, 208) from moving in the direction of the arrow M1B.

The top plate 1205 and the visor portion 1205*d* thereof are disposed on the downstream side in the arrow M1A direction with respect to the projection 1200*i* of the movable member 1200 in the direction of the axis L (see FIG. 115). That is, in the axial direction, the top plate 1205 is disposed more remote from the non-driving side of the cartridge than the projection 1200*i*.

On the other hand, the top plate 1205 has a cut-away portion (space) 1205*c* (see FIGS. 145 and 117). The cut-away portion 1205*c* can be regarded as a region in which the visor portion 1205*d* of the top plate 1205 is not provided. When the brake engaging member (204, 208) reaches the cut-away portion 1205*c*, it is allowed to move in the direction of arrow M1B (see part (a) of FIG. 119). That is, the brake engaging member (204, 208) passes through the cut-away portion 1205*c* and approaches to the cartridge or the drum unit. At this time, the acting surface 1200*c* of the projection 1200*i* moving in the rotational direction A acts on the brake engaging member (204, 208) (see part (c) of FIG. 119).

The cut-away portion 1205*c* is placed in the top plate 1205 so that the above-described steps can be smoothly carried out (see FIG. 146). The cut-away portion 1205*c* is provided such that at the timing when the brake engaging member (204, 208) passes through the cut-away portion 1205*c* and moves in the direction of the arrow M1B, the acting surface 1200*c* of the projection 1200*i* can come into contact with the brake engaging member (204, 208).

As shown in part (a) of FIG. 146, in this embodiment, in the rotational direction A, the upstream edge of the cut-away portion 1205*a* is placed at a position about 47.5 degrees downstream from the downstream end (braking force receiving portion 1200*i*2, acting surface 1200*c*) of the projection 1200*i*. With the position of the downstream end of the projection 1200*i* being 0 degree and the angle measured toward the downstream of the rotational direction A being $\alpha 2$, the upstream edge of the cut-away portion 1205*a* is at the position of "$\alpha 2=47.5°$".

Preferably, it is desirable that a part of the cut-away portion 1205*a* is in the range of 0° or more and 180° or less ($0° \leq \alpha 2 \leq 180°$) from the downstream end of the projection 1200*i* (braking force receiving portion 1200*i*2, acting surface 1200*c*) toward the downstream in the rotational direction A. More preferably, a part of the cut-away portion 1205*a* is within a range of 20° or more and 60° or less ($20° \leq \alpha 2 \leq 60°$) from the downstream end of the projection 1200*i* toward the downstream of the rotational direction A. This is because the brake engaging member (204, 208) which has passed through the cut-away portion 1205*c* and has moved in the direction of the arrow M1B is urged and pressed downstream of the rotational direction A by the projection 1200*i*.

On the other hand, as shown in part (a) of FIG. 146, it is desirable that, in the phase centered on the axis L of the drum coupling 1206, the visor portion 1205*d* of the top plate 1205 is placed inside the phase range R1200*i* in which the projections 1200*i* are provided. That is, it is preferable that, in the rotational direction A of the coupling (circumferential direction of the coupling), the range R1200*i* in which the projection 1200*i* is disposed and the range R1205*d* in which the visor portion 1205*d* is placed overlap at least partially. In this embodiment, the entire range R1200*i* in which the projections 1200*i* are provided overlaps with the range R1205*d* in which the visor portion 1205*a* is placed in the rotational direction A.

Part (b) of FIG. 146 shows an angle α1 through which the projection 1200*i* of the movable member rotates about the axis L from the initial position to the acting position. In this embodiment, as described above, "α1=120" holds for the rotation angle α1 of the movable member 1200. The preferred range for the rotation angle α1 of the movable member 1200 is as follows.

The projection 1200*i* moves the brake engaging member (204, 208) by the acting surface 1200*c* thereof, and creates a gap for the projection 1200*i* to enter between the brake engaging member (204, 208) and the drum drive coupling 180 (part (c) of FIG. 119). For this purpose, it is desirable that the rotation angle α1 of the movable member 1200 and the projection 1200*i* is 20° or more (α1≥20°).

Figure 59:
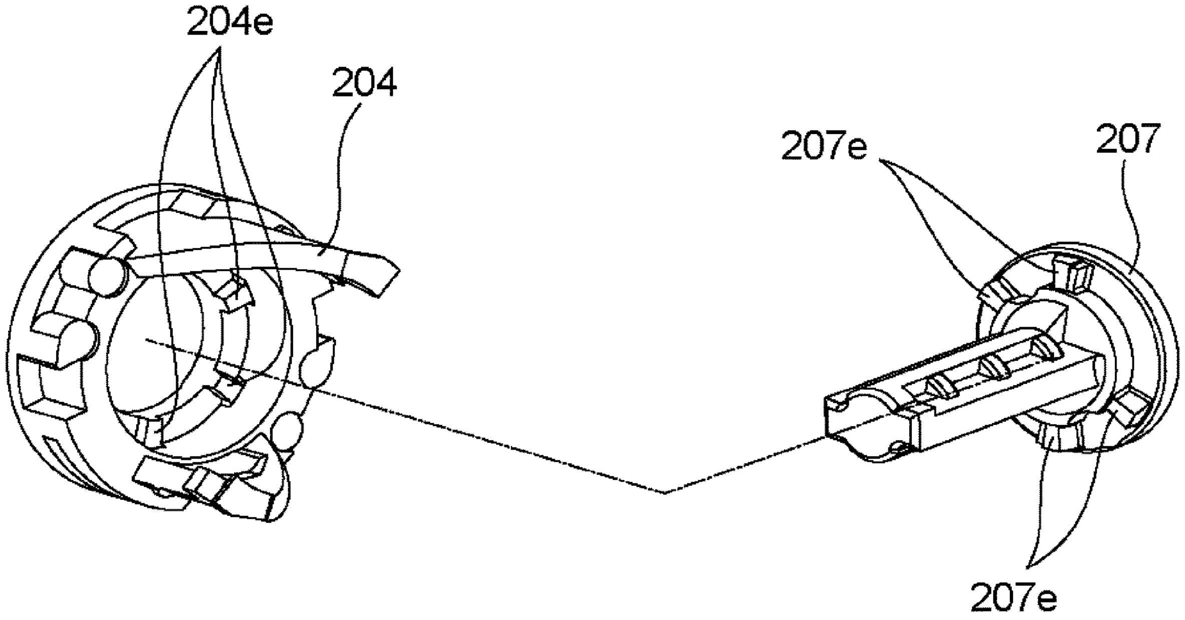
FIG. 59 is a perspective view illustrating parts of the drive transmission unit.

As shown in part (e) of FIG. 120, in order for the projection 1200*i* to smoothly move the brake engaging member (204, 208), it is necessary to break the engagement between the projection 207*e* and the projection 204*e* shown in FIG. 59. In order to more reliably break the engagement between the projection 207*e* and the projection 204*e*, it is necessary to sufficiently move the brake engaging member (204, 208) downstream in the rotational direction A relative to the drum drive coupling 180. From this standpoint, it is more desirable that the rotation angle α1 of the projection 1200*i* is 60° or more (α1≥60°).

Further, when the projection 1200*i* of the movable member 1200 moves the brake engaging member (204, 208) in the rotational direction A (part (c) of FIG. 119 and part (e) of FIG. 120), the drum drive coupling 180 also moves downstream in the rotational direction A. Therefore, the projection 1200*i* needs to move the brake engaging member (204, 208) in the rotational direction A faster than the drum drive coupling 180. Considering the case where the drum drive coupling 180 is driven at a high speed, it is further preferable that the rotation angle α1 of the projection 1200*i* of the movable member 1200 is 90° or more (α1≥90°).

Although there is no upper limit to the rotation angle α1 of the movable member 1200 in principle, the increasing the rotation angle α1 results in complication of the structure of the drum coupling 1206. In addition, the movable member 1200 is rotated by the pressed portion 1202*c* of the drum coupling 1206 being pressed by the positioning boss (pressing portion) 180*i*. If the rotation angle α1 of the movable member 1200 is increased, it becomes necessary for the positioning boss 180*i* to press the pressed portion 1202*c* with a stronger force.

Taking these points into account, it is preferable that the rotation angle α1 of the movable member 1200 is 180° or less (α1≤180°). More preferably, the rotation angle α1 is 150° or less (α1≤150°).

Also in this embodiment, as in the Embodiment 1, the braking force receiving portion 1200*i*2 of the drum coupling 1206 of the cartridge can engage with the brake engaging member and can receive the braking force, so that the rotational drive of the photosensitive drum 104 can be stabilized. That is, the drum coupling 1206 does not only receive the driving force for rotating the photosensitive drum 104 by the driving force receiving unit 1200*i*1. The coupling 1206 receives a braking force which applies a load to the rotation of the photosensitive drum and the drum coupling 1206 by the braking force receiving portion 1200*i*2. Both of these forces are effective to suppress rotational fluctuations of the drum coupling 1206 and the photosensitive drum 104.

Although the pressed member 1202 and the movable member 1200 have different moving directions, they are both movable members, and therefore, one of them may be referred to as a first moving member (first movable member), and the other may be referred to as a second moving member (second movable member) or the like. In particular, the pressed member 1202 is a translational movement member (linear movement member, linearly movable member) capable of translational movement (translational movement) in the axial direction, and the movable member 1200 is a rotatable member capable of rotational movement about the axis L. Alternatively, the movable member is a circumferential movement member (circumferential movable member) capable of moving in the circumferential direction about the axis L.

When the pressed member 1202 and the movable member 1200 are in the initial positions, the region where the pressed member 1202*c* is placed and the area where the movable member 1200 is placed overlap each other at least partially in the coordinate in the direction of the axis L (See part (b) of FIG. 118). Further, when the pressed member 1202 and the movable member 1200 are in the initial positions, they are placed at least partially inside the drum flange 1201 (see FIG. 116).

The pressed member 1202 and the movable member 1200 are structured to be capable of interrelated motion with each other. As a result, when the pressed member 1202 is in the initial position, the movable member is also in the initial position, and when the pressed member 1202 is in the acting position, the movable member 1200 is also in the acting position. The coupling of this embodiment is provided with a cam mechanism (cam) including the pressed member 1202 and the movable member 1200. The cam mechanism converts the movement direction, and converts the linear movement of the pressed member 1202 into the rotational direction (circumferential direction) of the movable member 1200. That is, the linear movement of the pressed member 1202 acts on the movable member 1200, whereby the movable member 1200 rotates by a certain angle.

More specifically, as shown in part (c) of FIG. 117 and part (d) of FIG. 117, the movable member 1200 is provided with a spiral groove (cam groove) formed by slopes (cam surface, inclined portion) 1200*e*1 and 1200*e*2. A pin (projection) 1202*b* of the pressed member 1202 is engaged with this groove. Therefore, when the pressed member 1202 moves in the direction of the axis L2, the pin 1202*b* moves relative to the spiral groove, and the movable member 1200 rotates accordingly.

The cam structure is not limited to that of such an example. For example, in this embodiment, the pressed member 1202 and the movable member are connected to each other so as to be in direct contact with each other, but they may be indirectly connected using another member interposed therebetween. That is, it will suffice if the pressed member 1202*c* and the movable member 1200 are functionally and operatively connected so that the operation of one of them acts on the other. It does not matter whether the method of connecting the pressed member 1202 and the movable member 1200 is direct or indirect. However, it is further preferable that the pressed member 1202 and the movable member 1200 are directly connected to each other because the operation mechanism of the drum coupling is simplified.

Further, a cam structure is also usable in which the pressed member 1202 moves in both the axial direction and the rotational direction. As such an example, the pressed member 1202 can move relative to the projection 1200*i* in the axial direction, and the pressed member 1202 moves integrally with the projection 1200*i* in the rotational direction.

Alternatively, the pressing portion 1202*c* and the projection 1200*i* can be interlocked with each other by using various cam structures.

Embodiment 5

In this embodiment, the drum coupling in which the shape of the drum coupling 143 (see FIG. 1) of the cartridge described in the Embodiment 1 and so on is changed will be described.

The drum coupling 143 of Embodiment 1 has a slope (guide portion) 143*d* (see FIG. 1). Then, the slope 143*d* causes the brake engaging member to move toward the downstream side in the rotational direction, so as to engage the brake engaging members 204 and 208 with the braking force receiving portion 143*c* of the drum coupling (FIGS. 67, 68, FIG. 48 and so on).

On the other hand, in this embodiment, the brake engaging members 204 and 208 are not moved relative to the drum drive coupling 108 or moved by a smaller distance. That is, a drum coupling capable of engaging with the brake engaging members 204 without guiding or moving the brake engaging members 204 and 208 toward the braking force receiving portion will be described.

Figure 121:
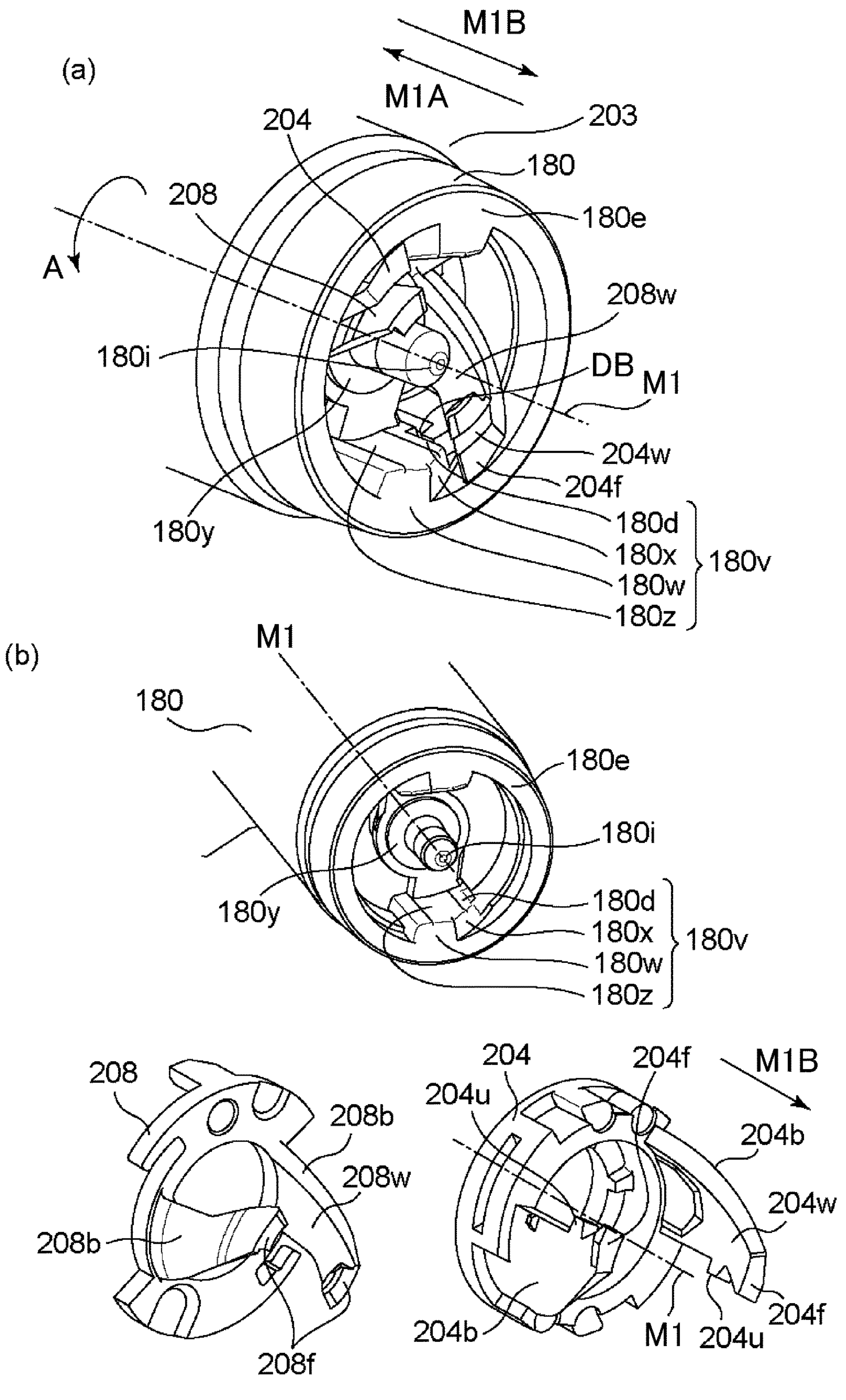

First, referring to FIG. 121, the shape of the drive transmission unit 203 of the image forming apparatus main assembly will be described. FIG. 121 is a perspective view illustrating the structure of the drive transmission unit 203.

Part (a) of FIG. 121 is a perspective view of the drive transmission unit 203 in the form of a unit, and part (b) of FIG. 121 is an exploded perspective view illustrating the shape of each component of the drive transmission unit 203. The structure and shapes of the drive transmission unit 203 are similar to those in Embodiment 1.

As described in the Embodiment 1, the main assembly side drum drive coupling 180 of the drive transmission unit 203 is provided with a drive transmission surface 180*d*. The drive transmission surface 180*d* is provided on a part downstream, in the rotational direction (arrow A direction), of the drive transmission portion 180*v* projecting in the radially inward direction with respect to the reinforcing cylindrical portion 180*e*.

In the drive transmission unit 180*v*, a drive transmission unit slope 180*x* having a slope shape which goes in the M1A direction as goes downstream in the rotational direction (arrow A direction) is provided. In addition, a drive transmission portion upper surface 180*w* is provided at the same position as the end surface of the reinforcing cylindrical portion 180*e* in the axial direction. Further, a cylindrical inner peripheral surface 180*z* is placed inside in the axial direction.

Furthermore, as in the Embodiment 1, a pair of the drive transmission units 180*v* are provided at rotational symmetrical positions with respect to the axis M1. Moreover, similarly to Embodiment 1, the main assembly side drum drive coupling 180 is provided with a positioning boss 180*i*, and a base portion 180*y* serving as an axial positioning (butting) portion is provided at the root thereof.

Next, the shape of the first brake engaging portion 204 will be described. As shown in part (b) of FIG. 121, the coupling engaging portion 204*b* is provided in the first brake engaging portion 204 as in the Embodiment 1. A free end portion 204*f* is at the free end of the coupling engaging portion 204*b* on the downstream side in the direction of the arrow M1B. In addition, the coupling engaging portion 204*b* is provided with an inner peripheral surface 204*w* which is a circumferential inner wall, and the engaging portion 204*u*.

Next, the shape of the second brake engaging portion 208 will be described. As shown in part (b) of FIG. 121, the second brake engaging portion 208 is provided with a coupling engaging portion 208*b*, and the coupling engaging portion 208*b* is provided with an inner peripheral surface 208*w* which is an inner wall having a circumferential shape. A free end portion 208*f* is at the free end of the coupling engaging portion 208*b* on a downstream side in the direction of the arrow M1B.

The first brake engaging portion 204 and the second brake engaging portion 208 have the same shapes as those of Embodiment 1, and the shapes are symmetrical with respect to the axis M1.

Figure 122:
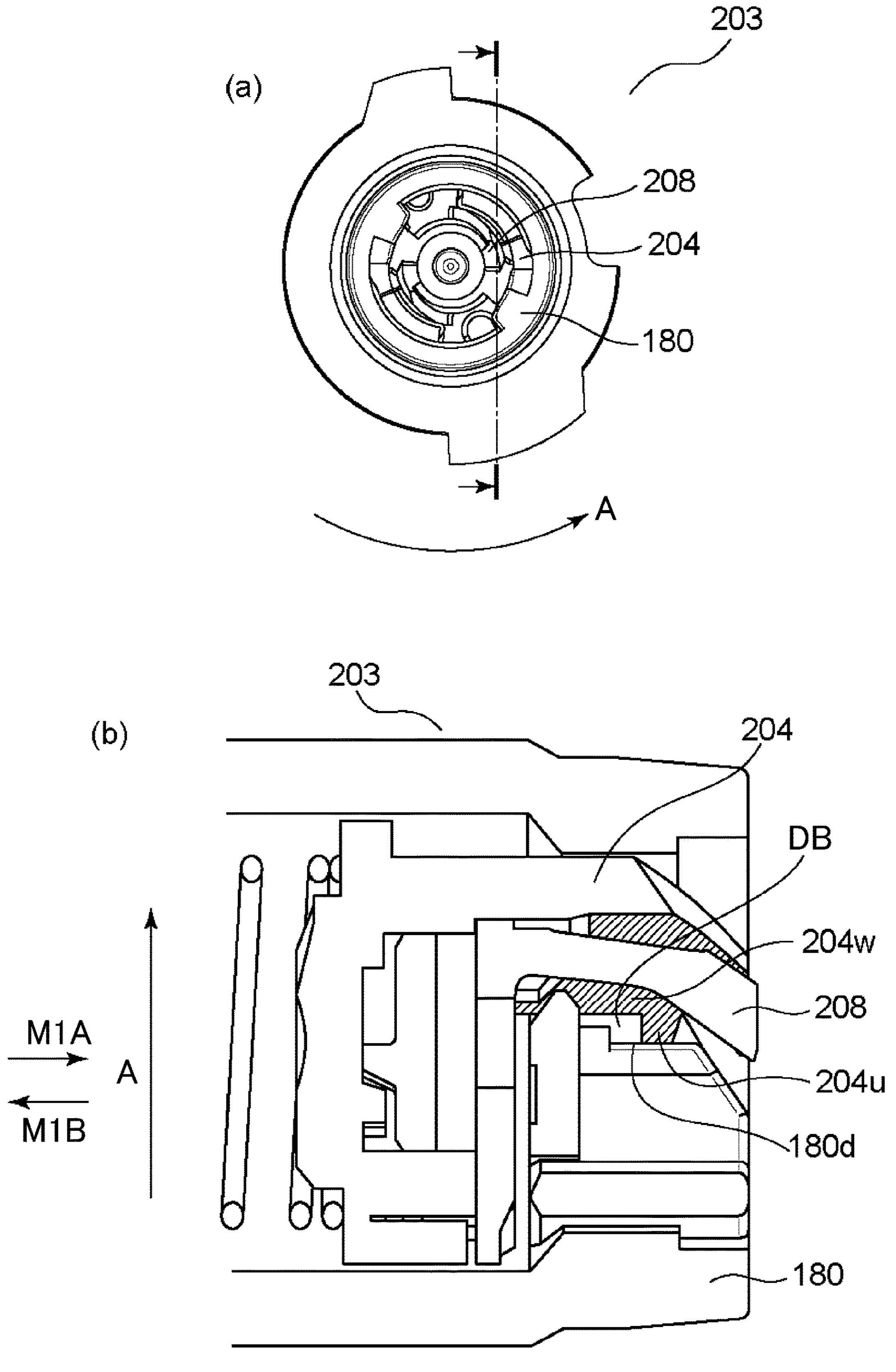

Next, referring to FIG. 122, a gap DB used as the engaging portion of the drive transmission unit 203 in this embodiment will be described. FIG. 122 is sectional views of the drive transmission unit 203 for illustrating the gap DB used as the engaging portion of the drive transmission unit 203 in this embodiment.

Part (a) of FIG. 122 is a front view as viewed from the driving side, and indicates a sectional line, and part (b) of FIG. 122 is a sectional view taken along the sectional line indicated in part (a) of FIG. 122.

In part (b) of FIG. 122, for convenience of illustration, the inner peripheral surface 204*w* (see part (b) of FIG. 121) of the first brake engaging member 204 is hatched. As shown in part (b) of FIG. 122, the drive transmission surface 180*d* of the main assembly drum drive coupling 180 of the drive transmission unit 203 and the engaging portion 204*u* of the first brake engaging member 204 (see part (b) of FIG. 121) are in contact with each other in the direction of rotation (direction of arrow A). At this time, the gap DB exists between the drive transmission surface 180*d* of the main assembly side drum drive coupling 180 and the engaging portion 204*u* of the first brake member 204.

As has been described in Embodiment 1, the gap DB is provided so that the engaging portion 204*u* and the main assembly side drum drive coupling 180 do not interfere with each other when the first brake engaging member 204 moves in the direction of the arrow M1A. In this embodiment, an engaging member 13445 engages with the drive transmission unit 203 by the engaging member 1344 of a drum coupling 1342 which will be described hereinafter entering the gap DB. By this, the driving force and the braking force are transmitted between the image forming apparatus main assembly and the cartridge.

Next, referring to FIG. 123, the structure of the drum coupling 1342 which can be engaged with the drive transmission unit 203 will be described. Part (a) of FIG. 123 and part (b) of FIG. 123 are exploded perspective views as viewed from different directions in order to illustrate the assembly of the drum coupling 1342, and part (c) of FIG. 123 is a perspective view of the engaging member 1344 as viewed in the DF direction indicated in part (a) of FIG. 123.

Figure 123:
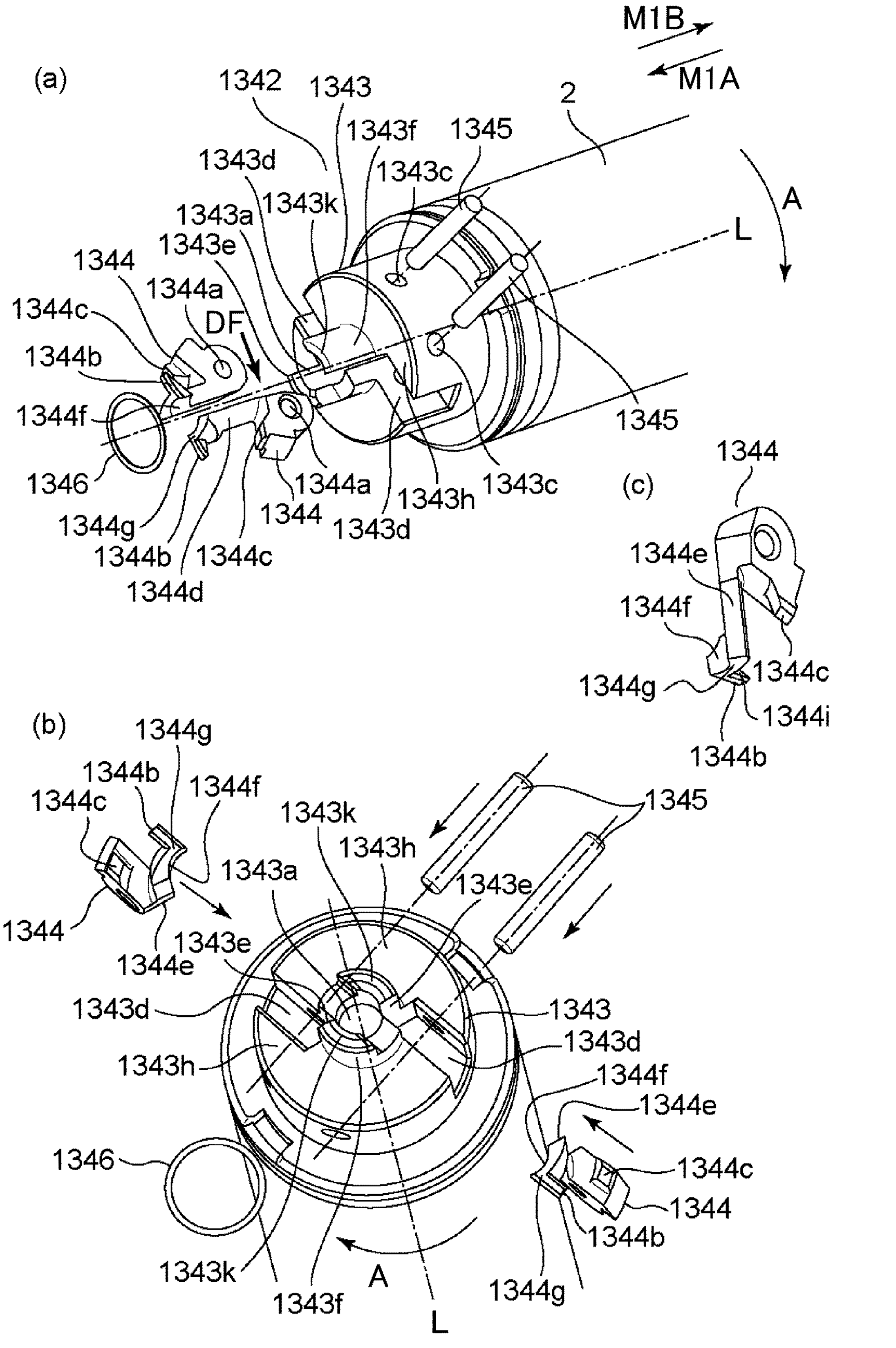

As shown in part (a) of FIG. 123, the drum coupling 1342 of this embodiment is a unit including a flange base (drum flange, coupling body) 1343 connected to the photosensitive drum 2, two engaging members 1344, two pins (shaft, shaft portion) 1345, and an elastic ring (ring spring, ring rubber, elastic member, urging member, initialization spring) 1346.

In addition, the flange base portion 1343 is provided with groove portions 1343*d* each having a recess shape, for mounting the two engaging members 1344, respectively.

Further, support holes 1343*c* for supporting the two pins 1345 are provided so as to penetrate the groove portion 1343*d* perpendicularly to the axis L.

Furthermore, the flange base portion 1343 has a cylindrical shape portion 1343*f* having a cut-away portion at a free end portion on the driving side coaxially with the axis L.

Similarly to the Embodiment 1, a positioning hole 1343*a* is provided in the inner peripheral portion of the cylindrical shape portion 1343*f* in order to engage with the positioning boss 180*i* (see part (a) of FIG. 121) of the main assembly drum drive coupling 180. In addition, the cut-away portion of the cylindrical shape portion 1343*f* is provided with a rotation restricting surface 1343*e* which is a surface parallel to the axis L. Further, an end surface 1343*k* is at the free end of the cylindrical shape portion 1343*f*.

Next, the shape of the engaging (movable) member 1344 will be described. As shown in FIG. 123, the engaging member 1344 has a support hole 1344*a* which is a rotation support portion, and two projections 1344*b* and 1344*c*. Of the two projections 1344*b* and 1344*c*, one may be referred to as a first projection (first projection) and the other may be referred to as a second projection (second projection). In the following, the projection 1344*b* will be referred to as a first projection and the projection (movable portion) 1344*c* will be referred to as a second projection, but this is just for convenience and may be reversed.

The first projecting portion 1344*b* projects in a direction perpendicular to the direction in which the support hole 1344*a* extends. The second projecting portion 1344*b* projects in the direction of arrow M1A.

The first projecting portion 1344*b* and the second projecting portion 1344*c* are connected by an engaging member base portion 1344*d*. Further, as shown in part (b) of FIG. 123, the first projecting portion 1344*b* is placed downstream of the second projecting portion 1344*c* in the rotational direction (direction of arrow A). Furthermore, as shown in part (c) of FIG. 123, the first projecting portion 1344*b* of the engaging member 1344 has an end surface 1344*i* on the upstream side in the rotational direction A.

Here, referring to FIG. 131, the positional relationship between the first projecting portion 1344*b* and the second projecting portion 1344*c* will be described. Part (a) of FIG. 131 is a front view of the drum coupling 1342 as viewed from the driving side, and Figure (b) is a front view of the main assembly drum drive coupling 180 as viewed from the non-driving side.

Figure 131:
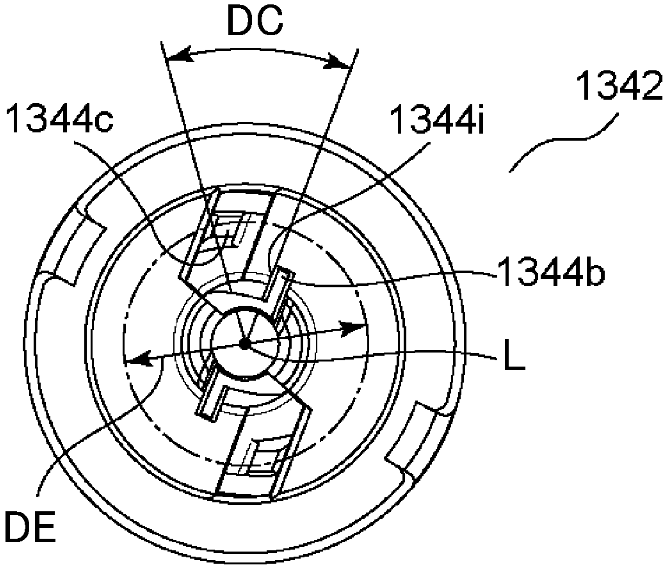
Figure 131:
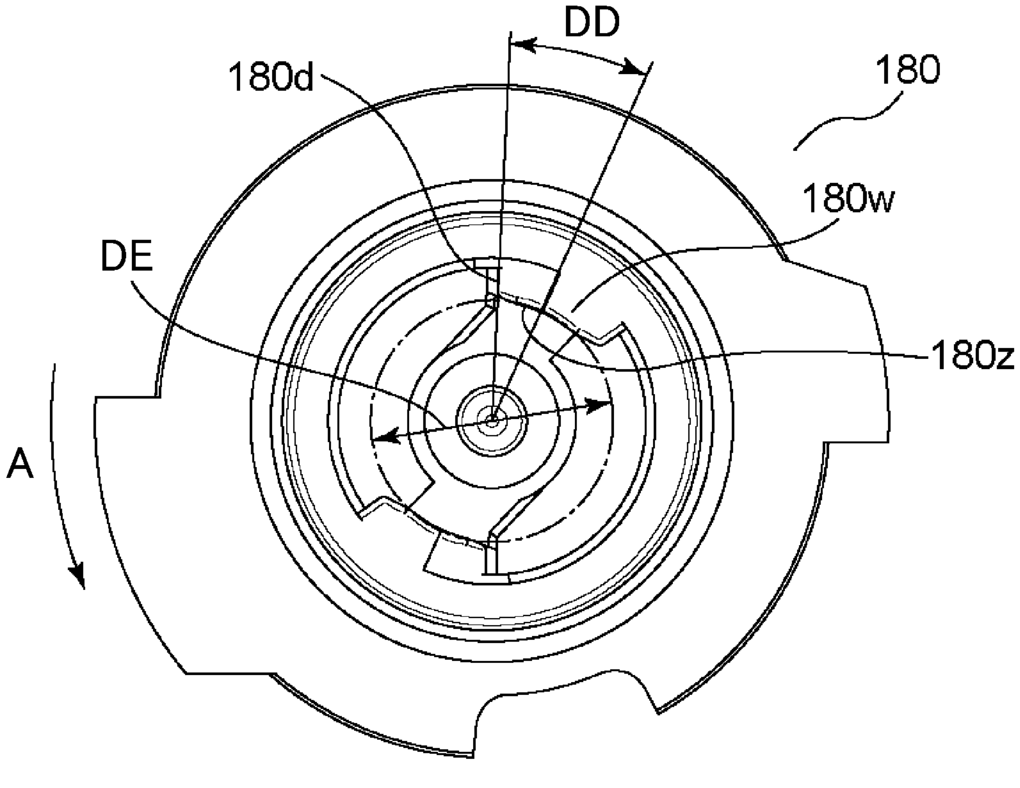

In part (b) of FIG. 131, the diametrical size of the inner peripheral surface 180*z* is defined as ΦDE. At this time, as shown in part (a) of FIG. 131 an angle from the end surface 1344*i* of the first projection 1344*b* to the upstream end in the rotational direction of the second projection 1344*c* at a position where the distance from the axis L of the drum coupling 1342 is ΦDE is DC. This angle DC may be equal to or greater than the angle DD. Here, the angle DD is an angle from the drive transmission surface 180*d* to the end portion on the upstream side, in the rotational direction, of the upper surface 180*w* of the drive transmission portion.

In this embodiment, the angle DC is about 35 degrees.

In addition, as shown in part (c) of FIG. 123, the engaging member 1344 is provided with a rotation restricting surface 1344*e* on the opposite side from the two projections (1344*b*, 1344*c*). A cylindrical surface 1344*f* is provided on the opposite side from the two projections (1344*b*, 1344*c*) of the engaging member 1344. The detailed explanation thereof will be made hereinafter.

In addition, as shown in part (a) of FIG. 123, a circumferential end surface 1344*g* (hatched portion/colored portion) having a circumferential shape coaxial with the support hole 1344*a* is provided on the end surface of the engaging member 1344 in the arrow M1A direction.

Next, the description will be made as to a structure in which the flange base portion (coupling base portion, coupling body, drum flange) 1343 supports the engaging member 1344.

Two engaging members 1344 are provided in the two groove portions 1343*d* provided in the flange base portion 1343, respectively. Here, the support hole 1343*c* of the flange base 1343 and the support hole 1344*a* of the engaging member 1344 are placed so as to be coaxial with each other.

Further, the two pins 1345 are placed so as to pass through the support hole 1343*c* and the support hole 1344*a* placed coaxially. The pin 1345 is supported by press fitting or the like into the support hole 1343*c* of the flange base portion 1343.

In this manner, the engaging member 1344 is rotatably supported by the flange base 1343 by way of the pin 1345. The engaging member 1344 is a rotatable member (movable member, moving member) which is partially rotatable about the pin 1345. On the other hand, the flange base (drum flange) 1343 can be regarded as the main body (base) of the drum coupling 1342 for movably supporting the engaging member 1344.

Next, referring to FIG. 124, the positioning of the engaging member 1344 with respect to the flange base portion in the rotational direction will be described.

Figure 124:
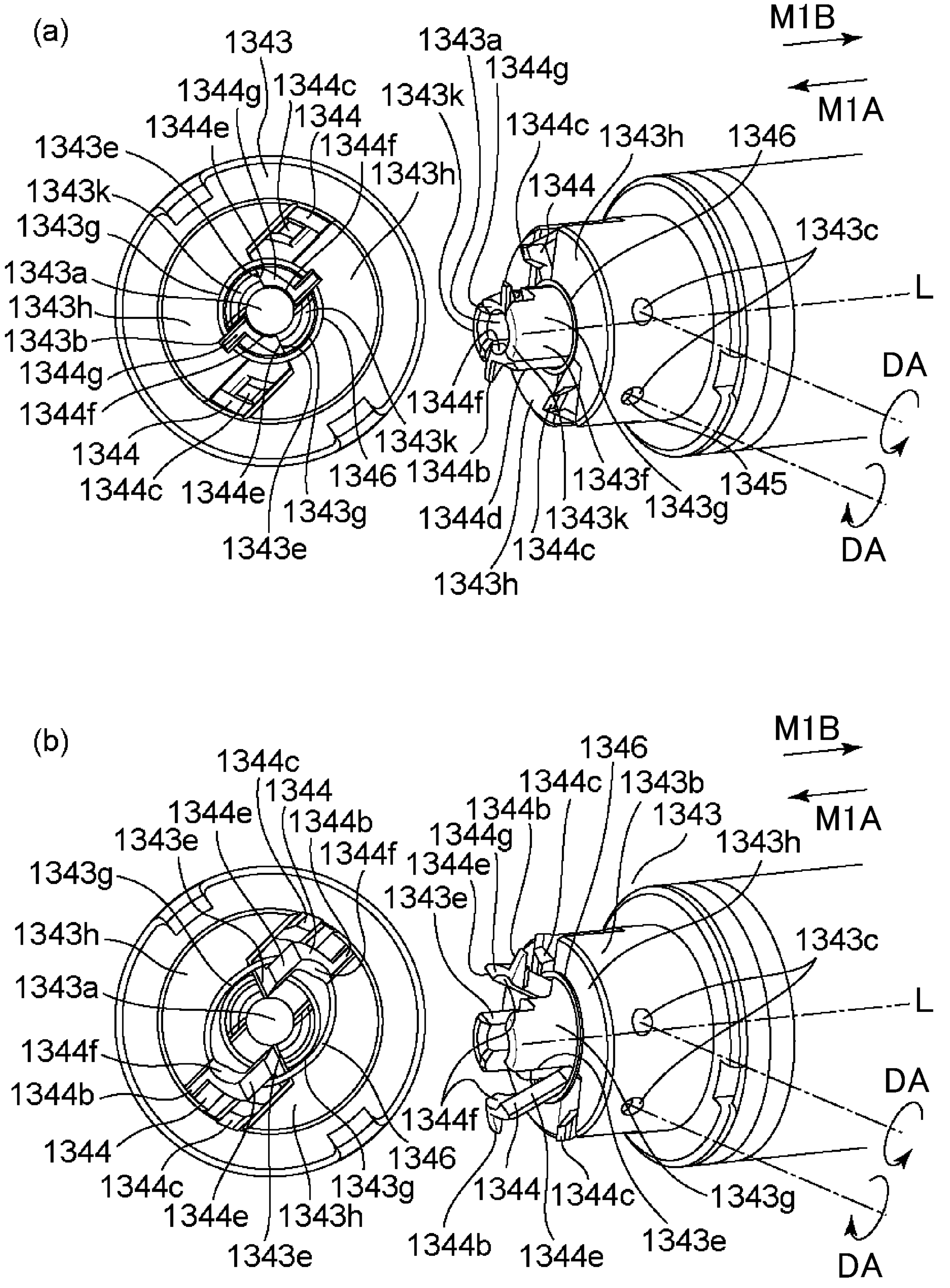

Part (a) of FIG. 124 is a side view and a perspective view of the drum coupling 1342 in the pre-engagement state as viewed from the driving side, and part (b) of FIG. 124 is a side view and a perspective view of the drum coupling 1342 in the engaged state as viewed from the driving side.

As shown in part (a) of FIG. 124 perspective view, the engaging member 1344 is rotatably supported by the flange base 1343 by way of the pin 1345. Thereafter, the elastic ring 1346 is fitted around the outer peripheral surface 1343*g* of the cylindrical shape portion 1343*f* together with the engaging member 1344 (see part (a) of FIG. 123). The elastic ring 1346 is a ring-shaped elastic member, and a rubber ring, for example, can be used therefor. The elastic ring 1346 is a type of spring.

The inner diameter of the elastic ring 1346 is smaller than that of the outer peripheral surface 1343*g*, and when it is fitted, so that a force acts in the direction of contracting the elastic ring.

Therefore, when the engaging member 1344 mounted to the flange base 1343 sticks out, in the axial direction, of the outer peripheral surface 1343*g*, a contraction force of the elastic ring 1346 urges it in the direction of rotation about the support hole 1343*c* in the direction of arrow DA. The engaging member 1344 receives an urging force in the direction of the arrow DA, so that the rotation restricting surface 1344*e* of the engaging member 1344 abuts on the rotation restricting surface 1343*e* of the flange base 1343 to be positioned in the rotational direction.

Next, referring to FIG. 124, the positional relationship between the engaging member 1344 and the flange base portion 1343 before engagement with the drive transmission unit 203 will be described. As shown in the side view of part (a) of FIG. 124, when the engaging member 1344 is positioned on the coupling base 1343, the cylindrical surface 1344*f* is coaxial with the positioning hole 1343*a*.

Further, the diametrical size of the cylindrical surface 1344*f* of the engaging member 1344 is larger than the diametrical size of the positioning hole 1343*a*.

Further, it is placed at a position so as not to project, in the M1A direction, beyond the end surface 1343*k* of the coupling base portion 1343 in the axial direction of the circumferential end surface 1344*g* of the engaging member 1344.

By doing so, the engaging member 1344 does not interfere with the positioning boss 180*i* or the base portion 180*y*, when the positioning hole 1343*a* of the flange base 1343 engages with the positioning boss 180*i* (see FIG. 121) of the main assembly drum drive coupling 180.

In addition, as shown in part (b) of FIG. 124, the engaging member 1344 does not penetrate into the radially inside of the positioning hole 1343*a* of the flange base 1343 even when it is rotated in the direction opposite to the arrow DA during engagement.

Next, referring to FIG. 124, movement of the engaging member 1344 when it is engaged with the drive transmission unit 203 will be described. As described above, the engaging member 1344 is rotatably supported by the coupling base and the pin 1345, and is positioned and supported in the rotational direction at the rotation restricting surface 1343*e* of the coupling base 1343 by the contractile force of the elastic ring 1346.

At this time, as shown in the perspective view of part (a) of FIG. 124, the second projecting portion 1344*c* of the engaging member 1344 projects in the direction of the arrow MIA relative to a driving side end surface 1343*h* of the coupling base portion 1343. The position of the engaging member 1344 shown in part (a) of FIG. 124 is referred to as an initial position (retracted position, non-engaged position, first position).

The second projecting portion 1344*c* of the engaging member 1344 is pushed in the direction of arrow M1B when it is engaged with the drive transmission unit 203 (see part (a) of FIG. 121). This structure will be described hereinafter.

The engaging member 1344 is moved by the second projecting portion 1344*c* being contacted by the drive transmission unit 203 and receiving a force therefrom. That is, the engaging member 1344 rotates about the support hole 1343*c* in the direction opposite to the arrow DA against the contraction force of the elastic ring 1346 (part (b) of FIG. 124).

By the rotation of the engaging member 1344, the first projecting portion 1344*b* projects outward in the radial direction relative to the axis L. By this, the first projecting portion 1344*b* of the engaging member 1344 is enabled to move to a position where it can engage with the drive transmission unit 203 (see FIG. 121). The position of the engaging member 1344 shown in part (b) of FIG. 124 is referred to as an acting position (engagement position, second position).

Figure 125:
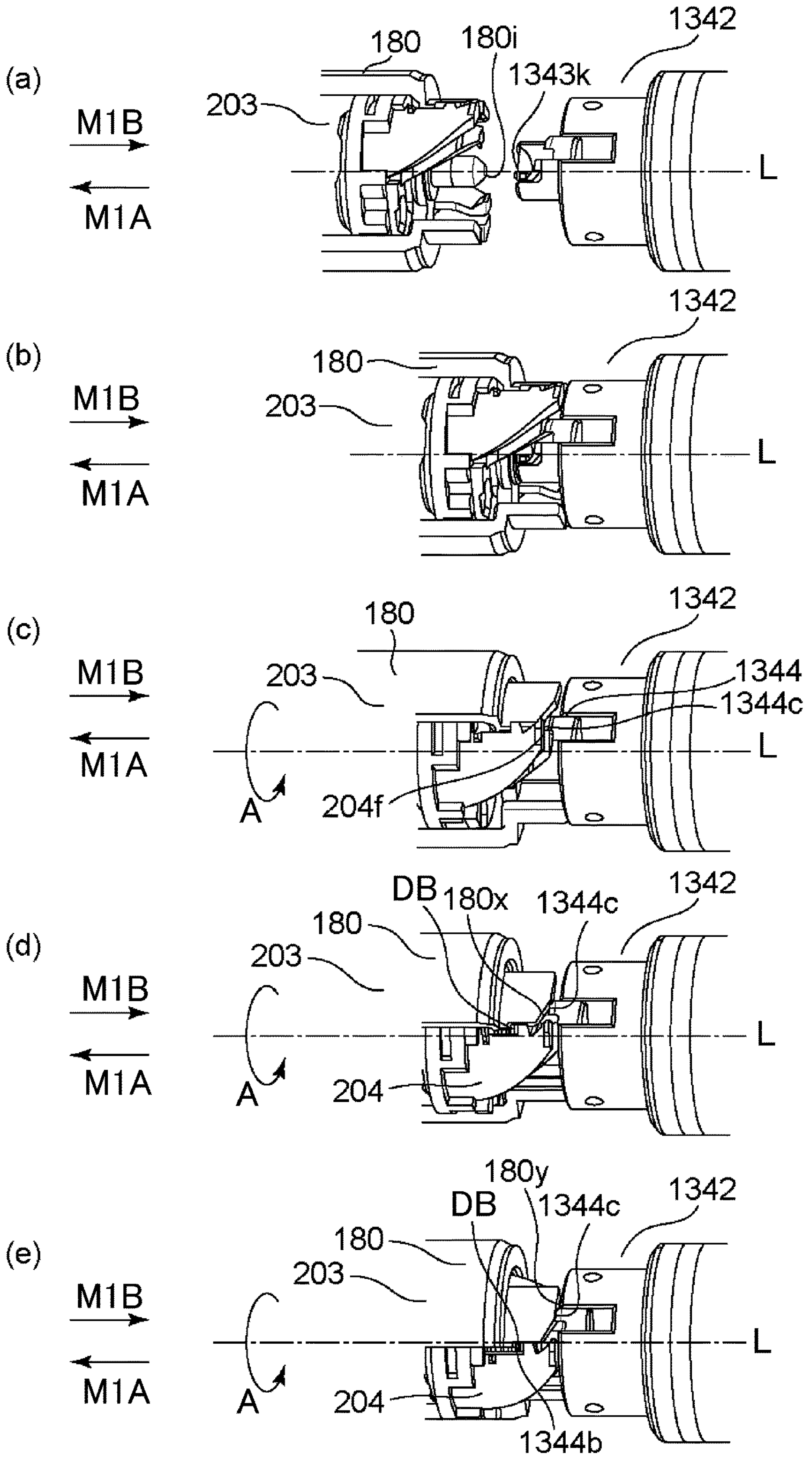
Figure 126:
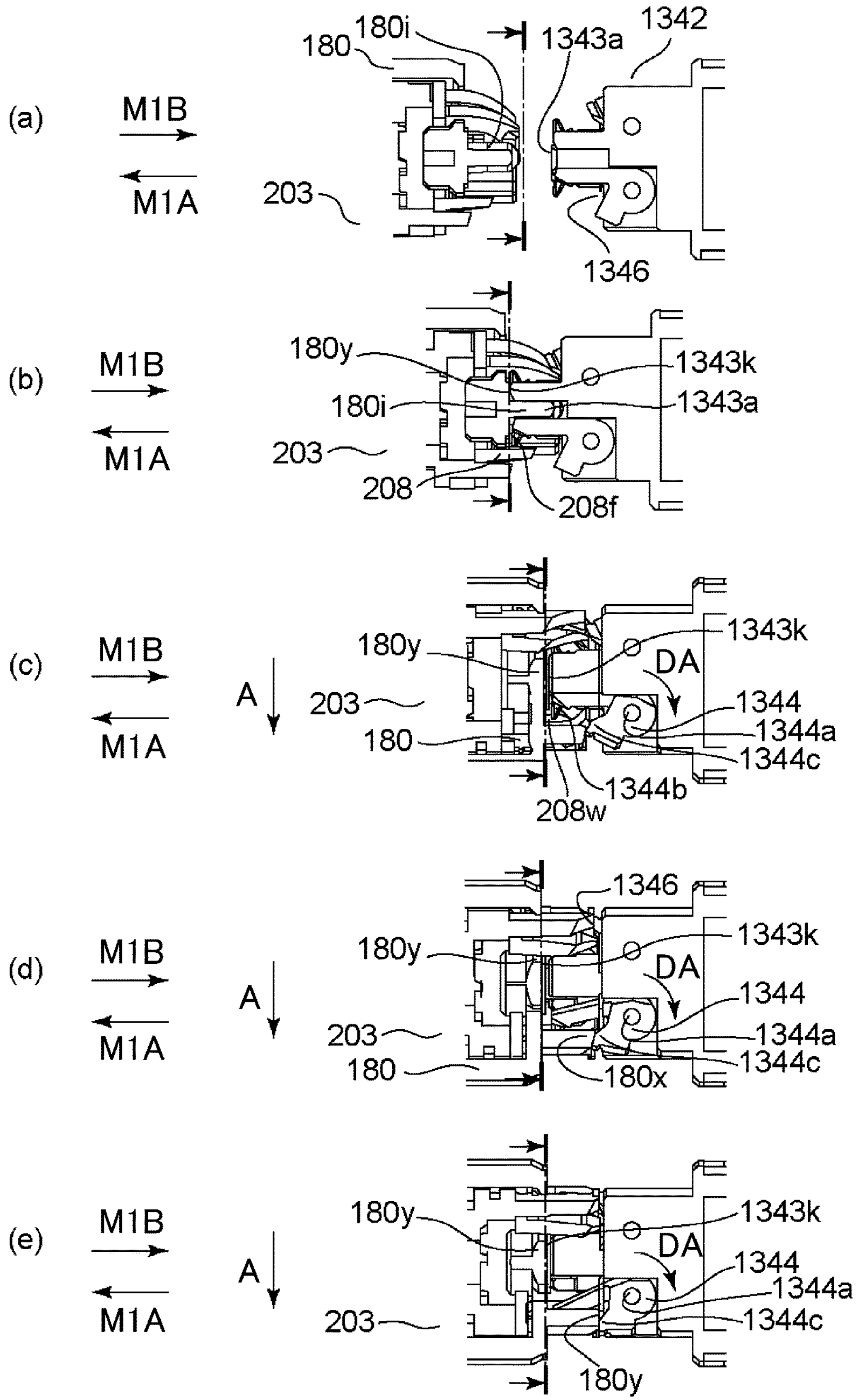
Figure 127:
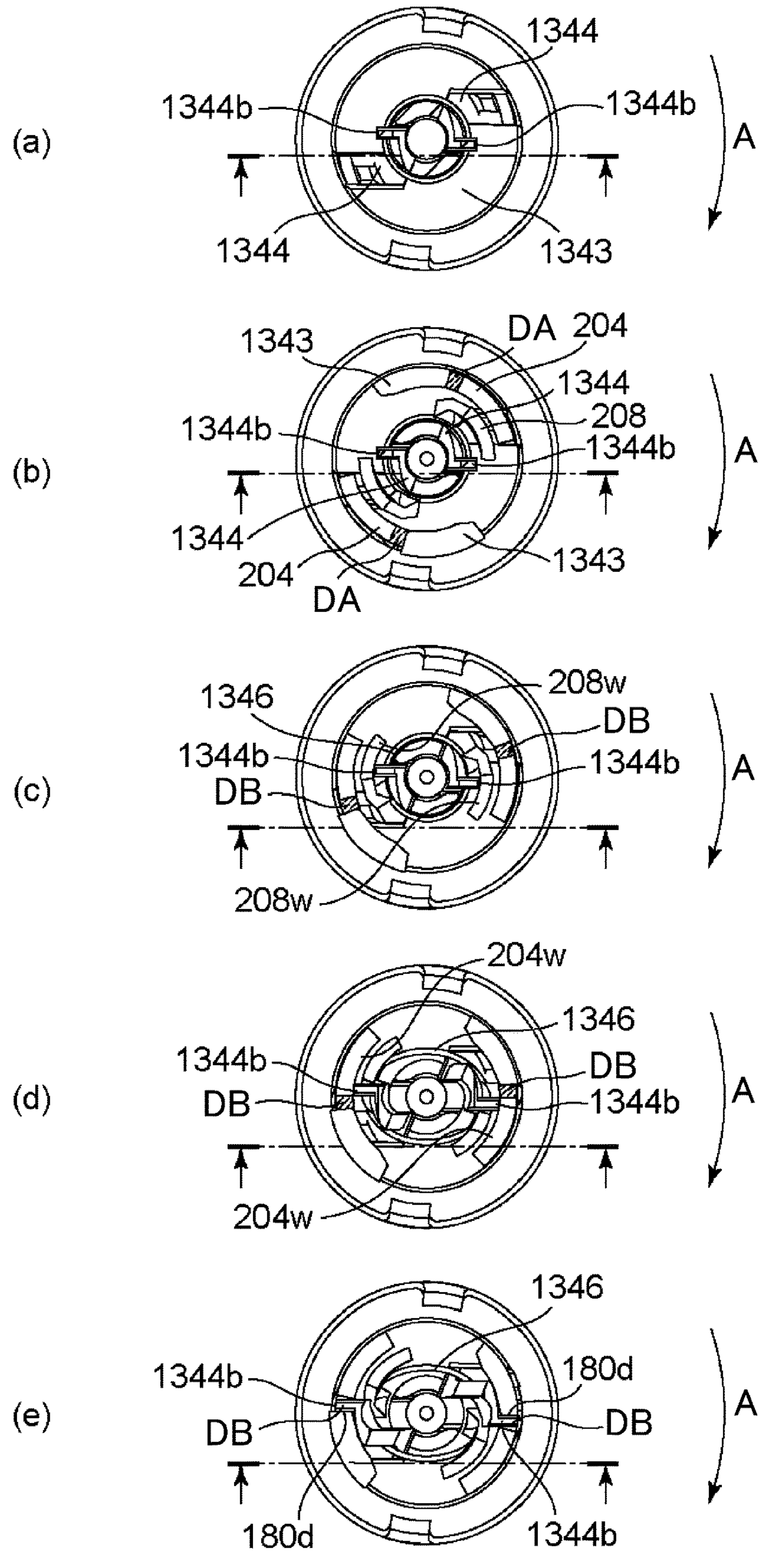

Next, referring to FIGS. 125, 126 and 127, a method of engaging the drum coupling 1342 with the drive transmission unit 203 will be described. FIG. 125 is a perspective view illustrating an engagement operation between the drum coupling 1342 and the main assembly drive transmission unit 203. Further, FIG. 126 is sectional views taken along a plane parallel to the axial direction corresponding to respective states shown in FIG. 125. The sectional plane of FIG. 126 is shown in FIG. 127. FIG. 127 is sectional views taken along a plane perpendicular to the axis, corresponding to the respective states shown in FIG. 125. The cross-sectional plane of FIG. 127 is shown in FIG. 126.

In FIGS. 125, 126 and 127, a part of the drum drive coupling 180 on the main assembly side is not shown for better illustration, so that internal shapes are uncovered.

Part (a) of FIG. 125, part (a) of FIG. 126, and part (a) of FIG. 127 show the state of the drive transmission unit 203 and the drum coupling 1342 before engagement. At this time, the engaging member 1344 of the drum coupling 1342 is in the initial position (retracted position, non-engaging position).

As shown in part (b) of FIG. 125 and part (b) of FIG. 126, the drive transmission unit 203 moves in the direction of the arrow M1B in interrelation with the closing operation of the front door 11 of the apparatus main assembly 170, as in the Embodiment 1.

As shown in part (b) of FIG. 126, when the drive transmission unit 203 moves in the direction of the arrow M1B, the positioning boss 180*i* of the drum drive coupling 180 and the positioning hole the coupling base 1343 of the drum coupling 1342 are engaged with each other, as in the Embodiment 1. By this, the drum drive coupling 180 and the drum coupling 1342 are aligned.

Further, as the drive transmission unit 203 moves in the direction of the arrow M1B, the base portion 180*y* of the positioning boss 180*i* of the drum drive coupling 180 and the end surface 1343*k* of the coupling base portion 1343 come into contact with each other. By this, the movement of the drive transmission unit 203 in the direction of the arrow M1B is stopped.

At this time, as shown in part (b) of FIG. 125, the first projecting portion 1344*c* of the engaging member 1344 does not contact the drive transmission unit 203 and maintains a state of being positioned on the coupling base 1343.

Then, as in the Embodiment 1, the drive transmission unit 203 is rotated in the direction of arrow A by the driving force from the apparatus main assembly 170. At this time, as shown in part (b) of FIG. 127, the first projection 1344*b* of the engaging member is placed radially inward with respect to the inner peripheral surface 208*w* of the second brake engaging member 208. As shown in part (c) of FIG. 127, the drive transmission unit 203 rotates in the direction of arrow A, and the inner peripheral surface 208*w* of the second brake engaging member 208 becomes in a state of covering the projection 1344*b* of the engaging member 1344.

At this time, as shown in part (c) of FIG. 125, when the drive transmission unit 203 rotates in the direction of arrow A, the second projection 1344*c* of the engagement member 1344 and the free end portion 204*f* of the first brake engaging member 204 of the drive transmission unit 203 abuts in the axis L direction. As shown in part (c) of FIG. 126, the contact force from the free end portion 204*f* causes the engaging member 1344 to rotate in the direction opposite to the arrow DA about the support hole 1344*a* against the contraction force of the elastic ring 1346.

As shown in part (c) of FIG. 126 and part (c) of FIG. 127, the engaging member 1344 rotates in the direction opposite to the arrow DA, and the first projecting portion 1344*b* is brought into contact with the inner peripheral surface 208*w* of the second brake engaging member 208 to be stopped.

On the other hand, as shown in part (c) of FIG. 125, the first brake engaging member 204 moves in the direction of arrow M1A by contacting the engaging member 1344. When the first brake engaging member 204 moves, the main assembly side drum drive coupling moves in the direction of arrow M1A together with the second brake engaging member 208. Further, as shown in part (d) of FIG. 125 and part (d) of FIG. 126, when the drive transmission unit 203 rotates in the direction of arrow A, the second projection 1344*c* of the engaging member abuts against the drive transmission portion slope 180*x* in the axial direction.

As shown in part (d) of FIG. 126, the engaging member 1344 is rotated by the contact force imparted by the drive transmission portion slope 180*x* against the contraction force (elastic force) of the elastic ring 1346, in the direction of the arrow DA about the support hole 1344*a*. At this time, as shown in part (d) of FIG. 127, the engaging member 1344 rotates in the direction opposite to the arrow DA (see part (d) of FIG. 126), and the first projecting portion 1344*b* comes into contact with the inner peripheral surface 204*w* of the first brake engaging member 204 so that the rotation is stopped.

At this time, as shown in part (d) of FIG. 125, the drive transmission unit 203 is moved in the direction of arrow M1A by the abutment between the drive transmission portion slope 180*x* of the drum drive coupling 180 and the second projection 1344*c* of the engagement member 1344.

Further, as shown in part (e) of FIG. 125, when the drive transmission unit 203 rotates in the direction of arrow A, the second projecting portion 1344*c* of the engaging member 1344 abuts against the upper surface 180*y* of the drive transmission portion of the drum drive coupling 180. By the second projecting portion 1344*c* being pushed from the upper surface 180*y* of the drive transmission portion, the engaging member 1344 is rotated toward the upstream side in the direction of arrow DA shown in FIG. 124.

As the engaging member 1344 rotates, as shown in part (e) of FIG. 127, the first projection 1344*b* enters the gap DB of the drive transmission unit 203. The position of the engaging member 1344 at this time is referred to as an acting position (engaging position).

Here, the width measured in the rotational direction indicated by the arrow A of the first projecting portion 1344*b* of the engaging member 1344 is larger than the width measured in the rotational direction of the gap portion DB. Therefore, the first projecting portion 1344*b* has a shape in which the free end portion is tapered in the approaching direction. That is, the width of the first projection 1344*b* measured in the rotational direction A is smaller at the free end of the first projection 1344*b* than at the rear end. With such a shape, the first projecting portion 1344*b* can enter the gap DB while expanding the size of the gap DB in the circumferential direction. That is, the first projection 1344*b* moves the first brake engaging member 204 downstream in the rotational direction with respect to the drum drive coupling 180, thereby widening and entering the gap DB.

On the other hand, as shown in part (e) of FIG. 126, the drive transmission unit 203 can move in the direction of the arrow M1B by rotating the engaging member 1344 in the direction opposite to the arrow DA. The drive transmission unit 203 moves in the direction of the arrow M1B until the boss base portion 180*y* of the main assembly side drum drive coupling 180 abuts against the end surface 1343*k* of the flange base portion 1343.

As shown in part (e) of FIG. 127, as the drum drive coupling 180 rotates in the direction of arrow A, the first projecting portion 1344*b* of the engaging member 1344 is pushed by the drive transmission surface 180*d*, so that the rotational driving force in the direction of arrow A is transmitted to the drum coupling 1342. That is, the driving force receiving portion 1344*b*1 (see FIG. 147) provided at the surface of the first projecting portion 1344*b* receives the driving force toward the downstream side in the rotational direction A by contact with the driving force transmitting surface 180*d*.

FIG. 147 is a perspective view of the drum coupling 1342, and part (a) of FIG. 147 shows a state in which the engaging member 1344 is in the initial position. Part (b) of FIG. 147 shows a state in which the engaging member 1344 is in the acting position. Part (c) of FIG. 147 is an illustration showing an engaged state between the drive transmission unit 203 and the engaging member 1344.

Further, as shown in part (e) of FIG. 125, the first projecting portion 1344*b* of the engaging member 1344 enters the gap DB of the drive transmission unit 203, so that the first brake engaging member 204 is prevented from retracting in the direction of the arrow M1A. Therefore, a braking force is applied to the drive transmission unit 203. In addition, as described above, the first projecting portion 1344*b* of the engaging member 1344 can engage with the first brake engaging member 204 and can receive the braking force. That is, the braking force receiving portion 1344*b*2 (see FIG. 147) provided on the surface of the first projecting portion 1344*b* receives the braking force toward the upstream in the rotational direction A by contact with the first brake engaging member 204.

By the above-described operation, the engaging member 1344 engages with the drive transmission unit 203 and can receive the driving force and the braking force. In this embodiment, the engaging member 1344 is a movable member which can move between the initial position and the acting position, and more specifically, a rotary member which is rotatable. In addition, as described above, the first projecting portion 1344*b* of the engaging member 1344 includes a driving force receiving portion 1344*b*1 and a braking force receiving portion 1344*b*2 (see FIG. 147). The driving force receiving portion and the engaging member 1344 which can receive the braking force may be referred to as a driving force receiving member. The driving force and braking force received by the engaging member 1344 are transmitted to the photosensitive drum by way of the flange base (drum flange) 1343.

Only one driving force receiving member (movable member 1200: see FIG. 117 and so on) described in the above-described embodiment is provided for the drum coupling. In this embodiment, two engaging members 1344, which are driving force receiving members, are provided on the drum coupling, and are arranged at positions opposite to each other with respect to the axis L.

The flange base (drum flange) 1343 is a transmission member which transmits the driving force and the braking force from the engaging member 1344 toward the photosensitive drum.

In the above description, the case of mounting in which the first projecting portion 1344*b* of the engaging member 1344 is in a different phase from that of the free end portion 208*f* of the second brake engaging member 208 has been described.

Next, referring to FIGS. 128, 129 and 130, the description will be made as to the engaging method in the case in which the first projecting portion 1344*b* of the engaging member 1344 is in a phase of contacting the free end portion 208*f* of the second brake engaging member 208.

Figure 128:
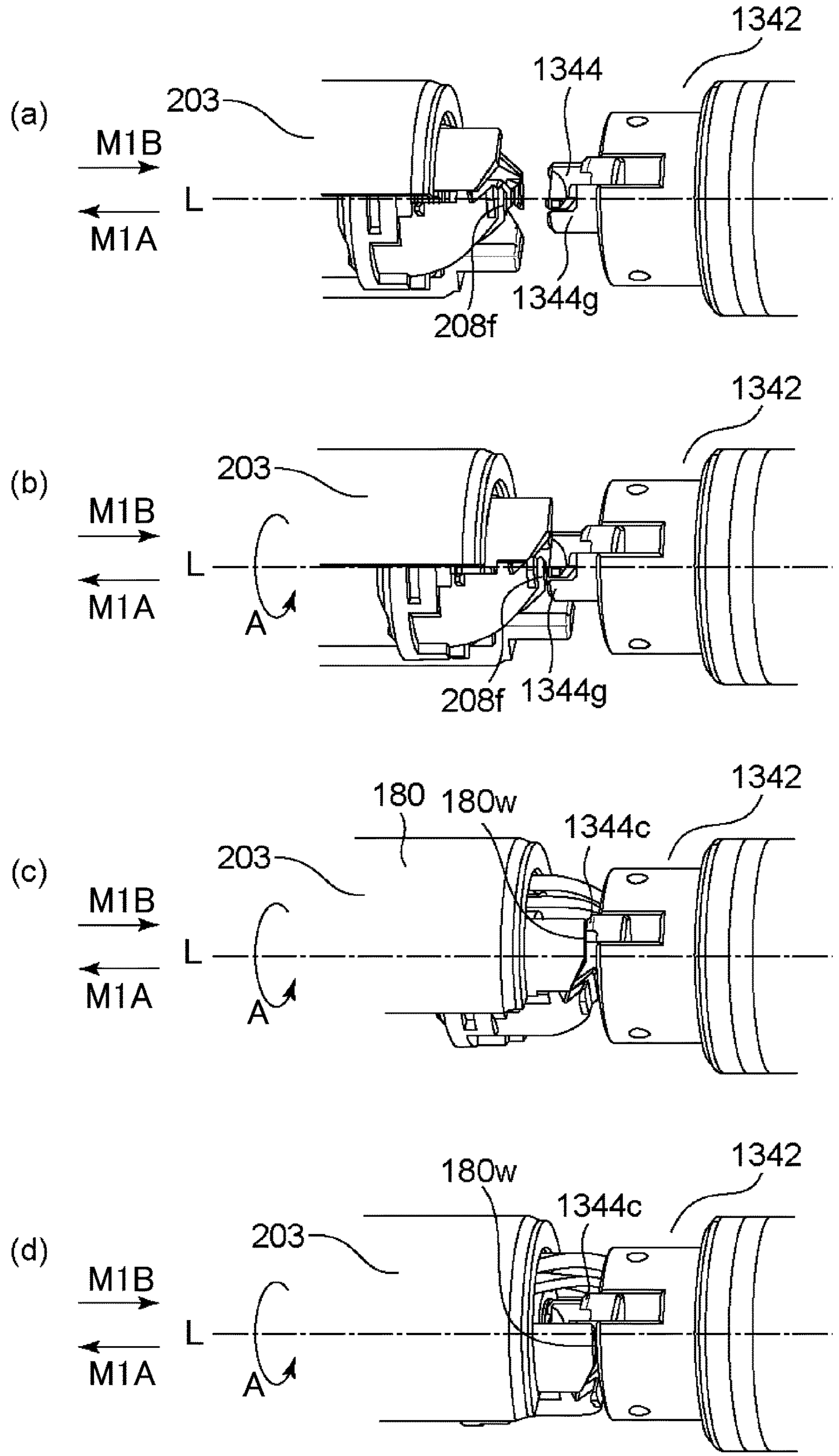

FIG. 128 is perspective views illustrating an engagement operation between the drum coupling 1342 and the main assembly drive transmission unit 203. In addition, FIG. 129 is sectional views taken along a plane parallel to the axial direction, corresponding to the respective states shown in FIG. 128. The sectional plane is indicated in FIG. 130.

Figure 130:
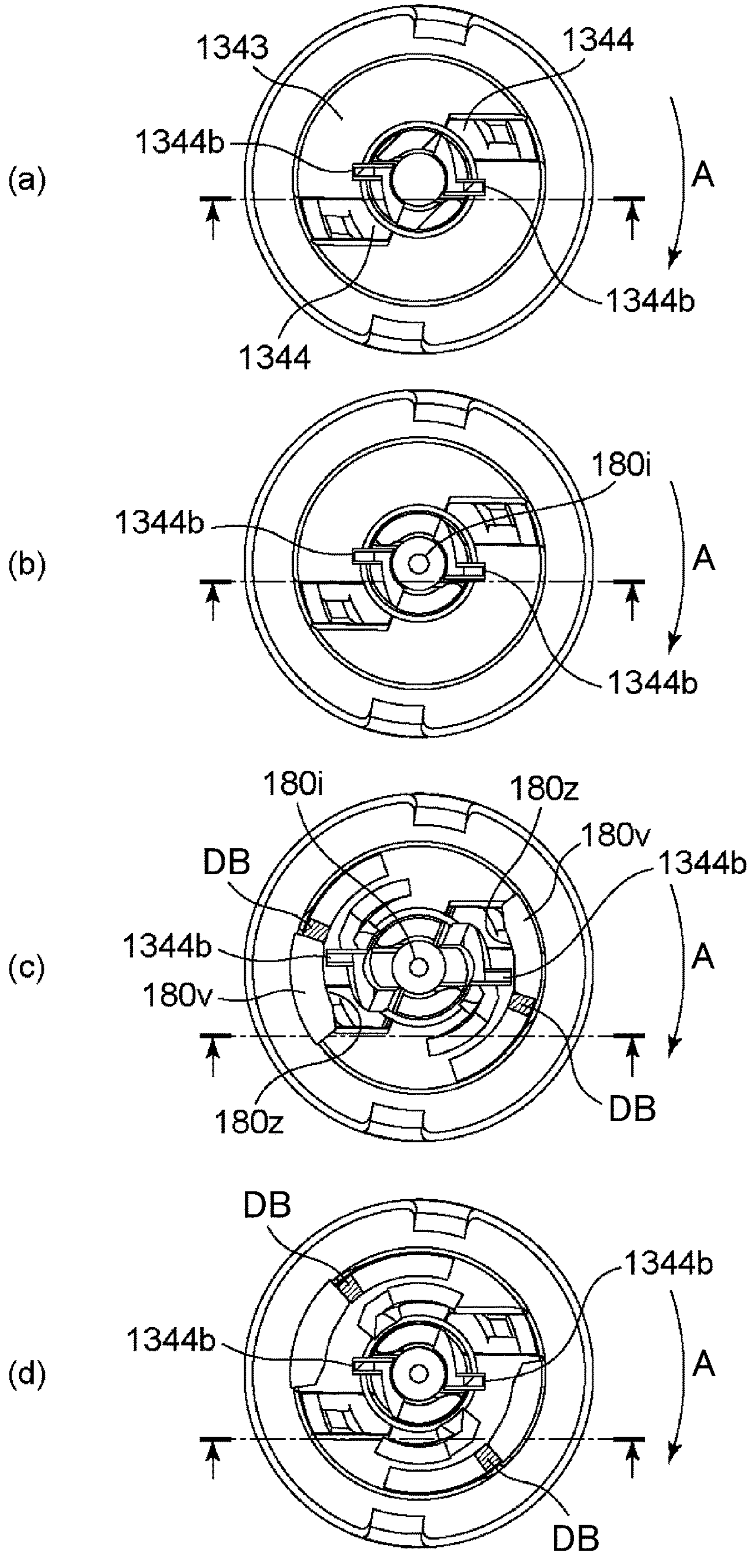

FIG. 130 is cross-sectional views taken along a plane perpendicular to the axis, corresponding to the respective states shown in FIG. 128. The cross-sectional plane of FIG.

Figure 129:
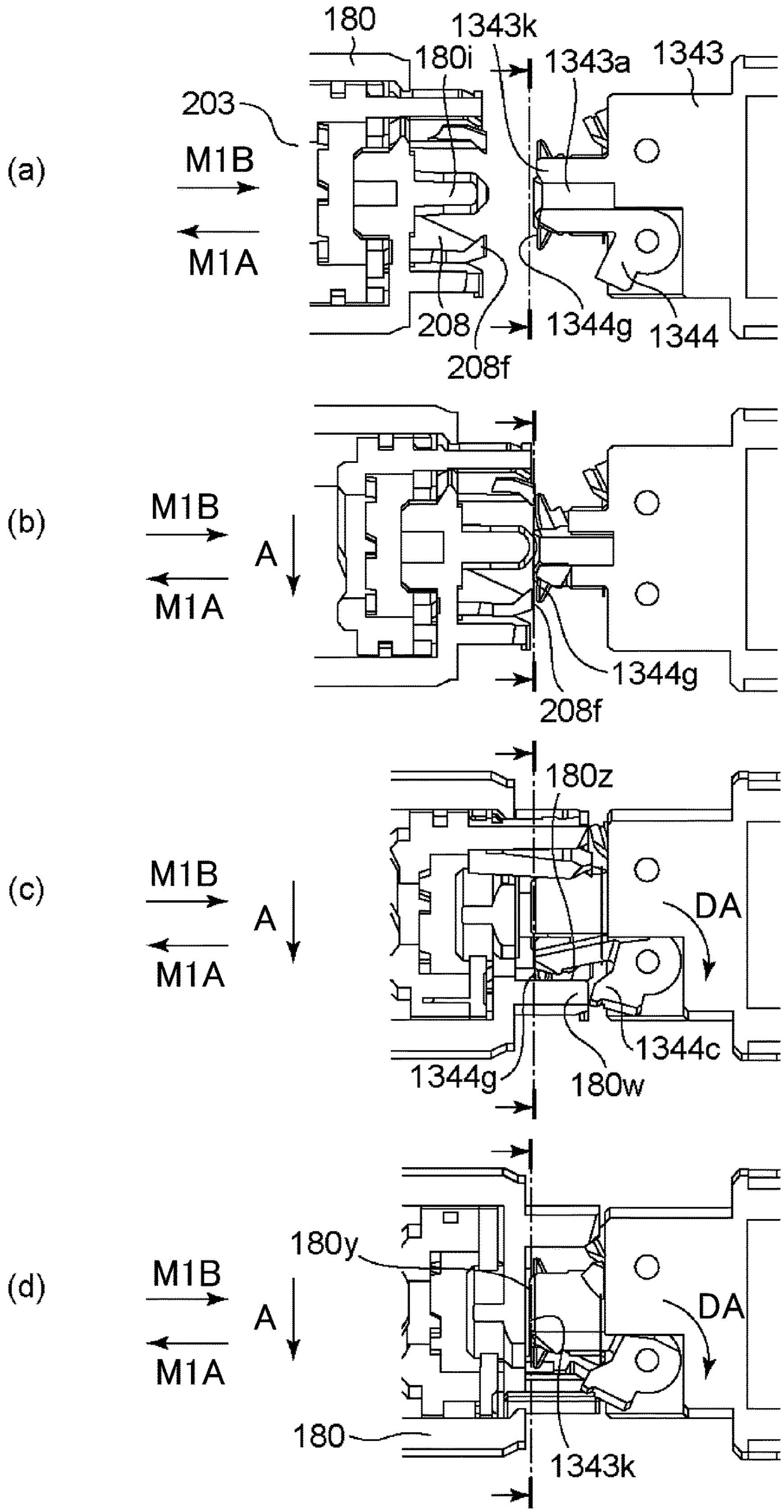

130 is indicated in FIG. 129. In FIGS. 128, 129 and 130, parts of the drum drive coupling 180 on the main assembly side are not shown for better illustration, so that the internal shape is uncovered. part (a) of FIGS. 128 and 129(*a*) are perspective views of the drive coupling 180 and the drum coupling before engagement.

Similarly to the Embodiment 1, the drive transmission unit 203 moves in the direction of the arrow M1B in interrelation with the closing operation of the front door 11 of the apparatus main assembly 170. As shown in part (b) of FIG. 129, by the drive transmission unit 203 moving in the direction of the arrow M1B, the positioning boss 180*i* and the positioning hole 1343*a* provided on the coupling base 1343 of the drum coupling 1342 are engaged with each other to effect alignment.

In addition, as shown in part (b) of FIG. 128, the drive transmission unit 203 moves in the direction of the arrow M1B. Then, the free end portion 208*f* of the second brake engaging member 208 and the circumferential end surface 1344*g* of the first projecting portion 1344*b* end portion of the engaging member 1344 abut against each other, so that the movement of the drive transmission unit 203 in the arrow M1B direction is stopped.

Next, as shown in part (c) of FIG. 128 and part (c) of FIG. 129, the drum drive coupling 180 rotates in the direction of arrow A. Then, the drive transmission unit 203 is released from the free end portion 208*f* of the second brake engaging member 208 and the circumferential end surface 1344*g* of the engaging member 1344, and moves in the direction of the arrow M1B.

As shown in part (c) of FIG. 128, the drive transmission unit 203 moves in the direction of the arrow M1B, and the upper surface 180*w* of the drive transmission portion of the drum drive coupling 180 abuts against the second projecting portion 1344*c* of the engaging member 1344.

At this time, as shown in part (c) of FIG. 130, the engaging member 1344 rotates in the direction opposite to the arrow DA, and the first projecting portion 1344*b* abuts against the inner peripheral surface 180*z* of the drive transmission portion 180*v* of the drum drive coupling 180 so that the rotation stops.

At this time, the movement of the drive transmission unit 203 in the direction of the arrow M1B is stopped by the upper surface 180*w* of the drive transmission portion of the drum drive coupling 180 abutting against the second projection 1344*c* of the engagement member 1344.

In addition, as shown in part (d) of FIG. 128 and part (d) of FIG. 129, the drum drive coupling 180 rotates in the direction of arrow A. Then, the abutment between the upper surface 180*w* of the drive transmission portion of the drum drive coupling 180 and the second projection 1344*c* of the engaging member is released, so that the drive transmission unit 203 moves in the direction of the arrow M1B.

As shown in part (d) of FIG. 129, By the drive transmission unit 203 moving in the direction of the arrow M1B, the base portion 180*y* of the positioning boss 180*i* and the end surface 1343*k* abut against each other, so that the movement of the drum drive coupling 180 in the direction of the arrow M1B stops.

At this time, as shown in part (d) of FIG. 128, the engaging member 1344 is not in contact with the drive transmission unit 203, and the engaging member 1344 is in a state of being positioned on the coupling base portion 1343.

Here, the state of part (d) of FIG. 127 is the same as that of part (b) of FIG. 125, and therefore, the subsequent movement is the same as those described above, and therefore, the description is omitted. Through the above operation, the engaging member 1344 can be engaged with the drive transmission unit 203 and can receive the driving force.

The drum coupling 1342 of this embodiment described above can be summarized as follows. The drum coupling 1342 is provided on the driving side of the cartridge and the drum unit in the direction of the axis L. That is, the coupling 1342 is placed in the neighborhood of the cartridge cover 116 provided at the end of the driving side of the cartridge and in the neighborhood of the end of the photosensitive drum on the driving side.

The drum coupling 1342 is provided with the engaging member 1344, and the first projecting portion 1344*b* of the engaging member 1344 enters the gap DB between the brake engaging member (204, 208) and the main assembly side drum drive coupling 180. The first projecting portion 1344*b* has a tapered shape, and therefore, it is possible to enter the gap while widening the gap between the brake engaging member (204, 208) and the main assembly side chum drive coupling 180. That is, the first projection 1344*b* itself moves outward in the radial direction, so that the brake engaging member (204, 208) can be moved downstream in the rotational direction relative to the drum drive coupling 180.

The first projecting portion 1344*b* can be regarded as an acting portion which contacts the brake engaging member (204, 208) and moves the brake engaging member (204, 208) relative to the main assembly side drum drive coupling 180.

By this, the engaging member 1344 is sandwiched between the brake engaging member (204, 208) and the main assembly side drum drive coupling 180 (see part (e) of FIG. 127 and part (c) of FIG. 147). The first projecting portion 1344*b* of the engaging member 1344 has both the driving force receiving portion 1344*b*1 and the braking force receiving portion 1344*b*2 (see FIG. 147), and it is structured to receive the braking force and the driving force from the brake engaging member (204, 208) and the main assembly side drum drive coupling 180, respectively.

Therefore, the drum coupling 1342 of this embodiment can also receive the braking force from the brake engaging member (204, 208) in the same manner as in the drum coupling 143 of the Embodiment 1 (see FIG. 1), and as a result, the rotation of the photosensitive drum 104 is stabilized.

The engaging member 1344 of the drum coupling 1342 is provided with a second projection 1344*c* in addition to the first projection 1344*b*.

The second projection 1344*c* is pushed by the drum drive coupling 180 of the drive transmission unit 203 to move in the direction of arrow M1B toward the non-driving side of the cartridge (see part (e) of FIG. 125). By this, the first projection 1344*b* moves in a direction away from the axis L (that is, outside in the radial direction) (part (b) of FIG. 124, part (e) of FIG. 125).

The positions of the engaging member 1344, the first projecting portion 1344*b* thereof, and the second projecting portion 1344*c* (see part (a) of FIG. 124) at the time when the drum coupling 1342 is not receiving a force from the outside are referred to as initial positions. The engaging member 1344 is held in the initial position thereof by an elastic ring 1346 as an elastic member.

On the other hand, the position after the second projection 1344*c* receives a force from the drum drive coupling 180 of the drive transmission unit 203 and the engaging member 1344, the first projection 1344*b* thereof and the second projection 1344*c* move (See part (b) of FIG. 124) is referred to as an acting position. One of the initial position and the acting position may be referred to as a first position, and the other may be referred to as a second position.

Both the first projecting portion 1344*b* and the second projecting portion 1344*c* of the engaging member 1344 are movable portions (moving portions). One of the first projecting portion 1344*b* and the second projecting portion 1344*c* may be referred to as a first movable portion (first moving portion), and the other may be referred to as a second movable portion (second moving portion).

The engaging member 1344 is rotatably mounted to the flange base 1343 by the pin 1345. That is, the pin 1345 is placed so as to be coincident with the rotation axis of the engaging member 1344.

Here, when the engaging member 1344 is in the initial position, both the first projecting portion 1344*b* and the second projecting portion 1344*c* are placed on the downstream side of the pin 1345 in the direction of the arrow M1A. That is, the pin 1345 is located closer to the non-driving side of the cartridge than the first projection 1344*b* and the second projection 1344*c*.

The first projecting portion 1344*b* is an engaging portion which is engageable with the brake engaging member (204, 208) and the drum drive coupling 180.

When the engaging member 1344 is in the initial position (see part (a) of FIG. 124), the second projection 1344*c* is placed more remote from the axis L than the first projection 1344*b*.

The projection 1200*i* (see FIG. 117) as the engaging portion of the drum coupling in the above-described Embodiment 4 is a movable portion movable in the circumferential direction (rotational direction) of the drum coupling. On the other hand, the first projecting portion 1344*b* as the engaging portion of the drum coupling in this embodiment is a movable portion (diametrically movable portion, radial moving portion) which can move in the radial direction of the drum coupling. The first projecting portion 1344*b* moves as the engaging member 1344 rotates about the pin 1345 (see FIG. 123), and therefore, it moves not only in the radial direction but also in the axial direction.

On the other hand, the second projecting portion 1344*c* as the pressed portion of the drum coupling is a movable portion which can be moved mainly in the direction of the axis L (the direction of the arrow M1A shown in FIG. 124 and the direction of the arrow M1B).

The first projection 1344*b* is placed more remote from the axis L when it is placed at the acting position (part (b) of FIG. 124) than when it is placed at the initial position (part (a) of FIG. 124).

Further, the first projecting portion 1344*b* projects outward in the radial direction of the drum coupling at least when it is in the acting position (part (b) of FIG. 124). In other words, the first projecting portion 1344*b* projects in a direction away from the axis L of the drum coupling. This is because the first projection 1344*b* enters the gap DB (part (e) of FIG. 125) formed between the drum drive coupling 180 and the brake engaging member (204, 208).

In this embodiment, the first projecting portion 1344*b* projects outward in the radial direction also when it is in the initial position (part (a) of FIG. 124).

The second projection 1344*c* is placed closer to the non-driving side of the cartridge when it is placed at the acting position (part (b) of FIG. 124) than when it is placed at the initial position (part (a) of FIG. 124). That is, the second projecting portion 1344*c* is at a position closer to the non-driving side cartridge cover 117 or to the photosensitive drum when it is placed at the acting position (part (b) of FIG. 124) than when it is placed at the initial position (part (a) of FIG. 124).

Further, at least a part of the second projecting portion 1344*c* projects beyond the driving side end surface 1343*h* of the coupling base portion 1343 at least when it is in the initial position (part (a) of FIG. 124). Specifically, the second projecting portion 1344*c* projects in the direction of the arrow M1A in the direction of the axis L at least when it is in the initial position (part (a) of FIG. 124). That is, the second projecting portion 1344*c* projects in a direction away from the non-driving end of the cartridge. Here, a driving side end surface 1434*h* is an end surface of the coupling base portion 1343 facing in the arrow M1A direction. In other words, the driving side end surface 1434*h* is an end surface facing in the direction opposite to the non-driving side end of the cartridge.

By the arrangement described above, the second projecting portion 1344*c* can contact the upper surface 180*y* of the drive transmission portion of the drum drive coupling 180 (see part (e) of FIG. 125).

The second projecting portion 1344*c* is a pressed portion structured to be pushed by the upper surface 180*y* (pressing portion) of the drive transmission portion. Further, the second projecting portion 1344*c* is an operating portion operated by the free end portion 204*f* in order to move the first projecting portion 1344*b* to engage it with the drive transmission unit 203. At least when the engaging member 1344 is in the initial position, the second projection 1344*c* is placed at a position downstream, in the arrow M1B direction, of the first projection 1344*b* in the direction of the axis L (see part (a) of FIG. 124). In other words, the second projection 1344*c* is closer to the cartridge cover 117 placed at the non-driving side end of the cartridge and the non-driving side end of the photosensitive drum than the first projection 1344*b*. Further, at least when the engaging member 1344 is at the initial position, the second projection 1344*c* is placed more remote from the axis L in the radial direction than the first projection 1344*b* (part (a) of FIG. 124).

In this embodiment, the second projecting portion 1344*c* projects beyond the driving side end surface 1434*h* in the direction of arrow M1A also when it is in the acting position (part (b) of FIG. 124).

In this embodiment, the structure in which the engaging member 1344 is provided at each of two 180-degree symmetrical positions with respect to the axis L in the drum coupling has been described. However, even when the engaging member 1344 is provided only in one place, the braking force and the driving force can be received by the one engaging member 1344 engaging with the drive transmission unit 203.

Further, in the drum coupling 1342, a structure in which two engaging members 1344 are arranged at two asymmetrical positions or a structure in which more than two engaging members 1344 are provided can be considered. In such cases, not all of the plurality of engaging members 1344 are engaged with the drive transmission unit 203, but a part of them is engaged with the drive transmission unit 203.

It will suffice if the drum coupling 1342 has at least one engaging member 1344. However, the structure in which the two engaging members 1344 arranged 180 degrees symmetrically are engaged with the drive transmission unit 203 as in the drum coupling 1342 of this embodiment is preferable, since then the driving force and the braking force received by the drum coupling 1342. In addition, the structure of this embodiment in which the two engaging members are arranged on the drum coupling 1342 is preferable since then the structure is simpler than the drum coupling 1342 including more than two engaging members.

In this embodiment, each of the two engaging members 1344 provided on the drum coupling 1342 has both a driving force receiving portion **1344*b*1 and a braking force receiving portion 1344*b*2 (see FIG. 147). That is, each of the two engaging members 1344 can receive both the driving force receiving portion and the braking force. However, when the drum coupling 1342 has two engaging members 1344, the functions of these engaging members 1344 may be different from each other. That is, a structure is also possible in which one of the two engaging members 1344 has a driving force receiving portion 1344*b*1 but does not have a braking force receiving portion 1344*b*2, and the other of the two engaging members 1344 has a braking force receiving portion 1344*b*2 but not the driving force receiving portion 1344*b*1. However, it is preferable that each of the two engaging members 1344 have a driving force receiving portion and a braking force receiving portion since then the resultant force applied to the drum coupling 1342** is stable.

In addition, in this embodiment, for example, as shown in part (c) of FIG. 125, the structure in which the engaging member 1344 may abut against the first projecting portion **1344*b* and the second brake engaging member 208 has been described. However, for example, it is conceivable to provide a rib on the coupling base portion 1343 and abut it against the drive transmission portion 180*v* of the main assembly drum drive coupling 180. By doing so, the cartridge can be mounted without the first projecting portion 1344*b* colliding with the main assembly drum drive coupling 180**.

Embodiment 6

In this embodiment, the drum coupling in which the shape of the drum coupling of the cartridge described in the Embodiment 1 is changed will be described.

In the drum coupling 143 of the Embodiment 1, the brake engaging members 204 are moved toward the downstream side in the rotational direction by the slope (guide portion, inclined portion) **143*d* (see FIGS. 62 and 63). In addition, the driving force receiving portion 143*b* receives the driving force by engaging with the drum drive coupling 180 on the main assembly side (see FIG. 64** and the like).

On the other hand, in this embodiment, the drum coupling 1545 does not directly engage with the main assembly side drum drive coupling 180 to receive the driving force. The drum coupling 1545 is structured to engage with the second brake engaging member 208, which is a braking force applying member, and indirectly receive the driving force from the main assembly side drum drive coupling 180 by way of the second brake engaging member 208.

Referring to FIG. 143, in this embodiment, the shape of the second brake engaging member 208 which engages with the drum coupling 1545 (FIG. 134), which is the driving force receiving portion, will be described.

Part (a) of FIG. 133 is a perspective view of the second brake engaging member 208, and part (b) of FIG. 133 is a front view as viewed along the axial direction.

The structure and shape of the second brake engaging member 208 are the same as those in the Embodiment 1. Similar to the Embodiment 1, the second brake engaging member 208 is provided with a pair of flange portions **208*a*, a pair of coupling engaging portions 208*b*, and a pair of rotation stop projections 208*c* at point-symmetrical positions with respect to the axis M1. On the downstream side of the coupling engaging portion 208*b* in the direction of arrow A, a slope 208*j*** is provided which goes upstream in the rotational direction as goes in the direction of arrow M1B.

In addition, a projection **208*e* projecting inward in the radial direction is provided at the end of the coupling engaging portion 208*b* in the direction of the arrow M1B. Further, a slope portion 208*k* is formed on the side of the projection 208*e*** in the direction of the arrow M1A.

The slope portion **208*k*** is a slope inclined in a direction approaching the axis M1 as goes in the direction of the arrow M1B and in a direction away from the axis M1 as goes in the rotational direction (direction of the arrow A).

Further, an end surface **208*g* is formed downstream of the projection 208*e* in the rotation direction (direction of arrow A). The end surface 208*g* is perpendicular to the rotational direction about the axis M1**.

Furthermore, an outer peripheral slope **208*h* is formed at the outer peripheral surface of the engaging portion 208*b* of the second brake engaging member 208**.

The outer peripheral slope **208*h* has a slope shape which is inclined in a direction approaching the axis M1** as it advances in the direction of the arrow M1B.

Next, referring to part (a) of FIG. 134 and part (b) of FIG. 134, the shape of the drum coupling 1545 in this embodiment will be described.

Part (a) of FIG. 134 and part (b) of FIG. 134 are exploded perspective views of the drum coupling 1545 of this embodiment as viewed from different directions.

As shown in part (a) of FIG. 134, the drum coupling 1545 is a unit comprising two portions, namely, the engaging member 1543 and the flange member (drum flange) 1544.

As shown in part (a) of FIG. 134, the engaging member 1543 has a substantially cylindrical shape centered on the axis L.

The engaging member 1543 includes a cylindrical portion **1543*f*, a cylindrical portion 1543*g* larger in the radial direction than the cylindrical portion 1543*f*, and a cylindrical portion 1543*h* smaller in the radial direction than the cylindrical portion 1543*g***, arranged coaxially with the axis L in the order named, from the end portion in the arrow M1B direction toward the arrow M1A direction.

Two snap-fits **1543*j* projecting in the radial direction are provided on the cylindrical portion 1543*f*** in a pair symmetrically with respect to the axis L.

The snap-fit **1543*j* has a flat surface 1543*m* which is perpendicular to the axis L and a slope 1543*n*** which is a slope shape which approaches the axis L as goes in the direction of the arrow M1B.

As shown in part (b) of FIG. 134, a plurality of sector-shaped projection portions **1543*p* are provided at the ends of the cylindrical portion 1543*g*** in the direction of the arrow M1B.

In addition, as shown in part (a) of FIG. 134, at the end of the cylindrical portion **1543*g*, the cylindrical portion 1543*h* extending along the axis L and the cylindrical portion 1543*s* inside the cylindrical portion 1543*h* in the direction of the axis L. A positioning hole 1543*a* is provided inside the cylindrical portion 1543*s*. The positioning hole 1543*a* is an opening placed concentric with the axis of the drum coupling. At the free end of the cylindrical portion 1543*s*, an end surface 1543*k*, which is a surface perpendicular to the axis L, is provided. In addition, the end portion of the inner peripheral surface (inner surface) of the cylindrical portion 1543*h* in the direction of arrow M1A has a conical shape portion 1543*c* (third inclined portion). The conical shape portion 1543*c* forms a partial conical depression. That is, the conical shape portion 1543*c*** is a slope shape (inclined surface, inclined portion) inclined in a direction away from the axis Las goes in the direction of the arrow M1A (the direction away from the non-driving side of the cartridge).

In other words, a diameter of the conical shape portion 1543*c* decreases toward the non-driving side of the cartridge (the side in the direction of the arrow M1B). That is, the distance from the inner surface of the conical shape portion 1543*c* to the axis L decreases toward the non-driving side (arrow M1B side) of the cartridge. The inner surface of the conical shape portion 1543*c* is inclined with respect to the axis L.

A part, in the axial direction, of the cylindrical portion 1543*s* overlaps the cylindrical portion 1543*h* in the L direction. That is, in a coordinate system parallel to the axis L, the range in which the cylindrical portion 1543*s* exists and the range in which the cylindrical portion 1543 exists overlap with each other at least partially. Therefore, a groove portion 1543*t* is provided between the cylindrical portion 1543*h* and the cylindrical portion 1543*s*. The groove portion 1543*t* is an arc-shaped (circular) groove defined by the inner peripheral surface of the cylindrical portion 1543*h* and the outer peripheral surface of the cylindrical portion 1543*s*. The inner peripheral surface of the cylindrical portion 1543*h* and the outer peripheral surface of the cylindrical portion 1543*s* provide respective side surfaces of the groove portion 1543*t*. The inner peripheral surface of the cylindrical portion 1543*h* is a side surface existing away from the axis L in the radial direction of the drum coupling, and the outer peripheral surface of the cylindrical portion 1543*s* is a side surface existing near the axis L.

Of the inner peripheral surface of the cylindrical portion 1543*h* and the outer peripheral surface of the cylindrical portion 1543*s* constituting the groove portion 1543*t*, one may be referred to as a first wall (first surface, first side portion) and the other may be referred to as a second wall (first surface). They are circular (arc-shaped) walls, respectively. The cylindrical portion 1543*h* is located more remote from the axis L than the cylindrical portion 1543*s*. That is, the inner diameter of the cylindrical portion 1543*h* is larger than the outer diameter of the cylindrical portion 1543*s*.

Referring to part (a) of FIG. 135, part (b) of FIG. 135, FIGS. 144, 148, 149 and 150, a shape of the periphery of the groove portion 1543*t* will be described. part (a) of FIG. 135 is a side view of the engaging member 1543 showing the cross-sectional position of part (b) of FIG. 135, as viewed from the driving direction, and part (b) of FIG. 135 is a sectional view of the engaging member 1543.

FIG. 144 is a perspective view of the drum coupling. FIG. 148 is also a perspective view of the drum coupling. In FIG. 148, the drum coupling is shown as being gradually rotated downstream in the rotational direction A in the order of (a) to (i). Part (a) of FIG. 149 is a side view of the drum coupling. However, in order to show the shape around the groove portion 1543*t*, a part of the cylindrical portion 1543*s* is omitted. Part (b) of FIG. 149 is a perspective view of the drum coupling.

Part (a) of FIG. 150 is a front view of the drum coupling, and part (b) of FIG. 150 is a perspective view of the drum coupling.

As shown in part (a) of FIG. 135 and FIG. 149, an arcuate groove portion 1543*t* is formed on the outside of the cylindrical portion 1543*s* in the radial direction. A slope portion (inclined portion) 1543*r* is provided downstream of the groove portion 1543*t* in the drum rotational direction (arrow A direction). At least a part of the slope portion 1543*r* is placed so as to be sandwiched between the cylindrical portion 1543*s* and the cylindrical portion 1543*h*. That is, it can be deemed that at least a part of the slope portion 1543*r* is placed inside the groove portion 1543*t*.

The slope portion 1543*r* is inclined so as to go in the arrow M1A direction as goes downstream in the rotational direction (arrow A direction). That is, the slope portion 1543*r* is inclined so as to be away from the end portion on the non-driving side of the cartridge as goes toward the downstream side in the rotational direction (arrow A direction) of the drum coupling.

A drive receiving portion 1543*b*, which is a surface perpendicular to the rotational direction (arrow A direction) of the drum coupling, is provided in the neighborhood of the upstream end portion of the slope portion 1543*r* in the direction of arrow A (rotational direction). In other words, the driving force receiving portion 1543*b* is a surface existing on the downstream side of the groove portion 1543*t* in the direction of arrow A.

On the other hand, in the direction of arrow A, a surface (wall) 1543*f* is provided at the upstream end of the groove portion 1543*t* (see FIG. 150). It occupies a range of the angle of $\alpha 3$ about the axis L from the driving force receiving portion 1543*b* to the surface 1543*f*.

As shown in part (b) of FIG. 135 and FIG. 144, there is a slope (inclined portion 1543*d*) at the end of the driving force receiving portion 1543*b* in the M1A direction. The slope 1543*d* is inclined in a direction away from the center of the axis Las goes in the direction of the arrow M1A. That is, the slope 1543*d* is inclined so as to go away from the non-driving side of the cartridge as goes away from the axis L.

The slope 1543*d* is also a surface inclined so as to go toward the non-driving side (arrow M1B direction) of the cartridge as goes downstream in the rotational direction (arrow A direction). That is, in the rotational direction of the drum coupling (direction of arrow A), the downstream side of the slope 1543*d* is closer to the non-driving side of the cartridge in the axial direction than the upstream side of the slope 1543*d*.

A recessed portion 1543*u* is provided in the outer peripheral surface of the cylindrical portion 1543*s*. At least a part of the recessed portion 1543*u* is a recessed portion (recessed portion, space) placed inside the grooved portion 1543*t*, and the radially outside part of the drum coupling is open. In other words, the recessed portion 1543*u* is a recessed portion placed in the side surface forming the groove portion 1543*u*, and is recessed inward in the radial direction of the drum coupling.

The slope 1543*d* and the driving force receiving portion 1543*b* provided on the cylindrical portion 1543*s* form the recessed portion 1543*u*. The slope 1543*d* faces in the arrow M1B direction in the axial direction (see part (b) of FIG. 135). That is, the slope 1543*d* faces toward the non-driving side of the cartridge. On the other hand, the driving force receiving portion 1543*b* faces upstream in the rotational direction A.

The end of the recess 1543*u* is at the same position as the bottom of the groove 1543*t* in the direction of the arrow M1B. In addition, the upstream side of the recessed portion 1543*u* in the rotational direction (direction of arrow A) is open. The details will be described hereinafter, but this is because the projection 208*e* of the second brake engaging member 208 projecting inward in the radial direction is permitted to enter the inside of the recess 1543*u* from the upstream of the recess 1543*u*.

In this embodiment, the cylindrical portion 1543*h* and the conical shape portion 1543*c* are provided substantially all around the axis L. It is preferable that a part of the cylindrical portion 1543_h_ and the conical shape portion 1543_c_ exists at least in the range of about 0 to 35 degrees, that is "$0° \leq \alpha 3 < 35°$" in FIG. 150 from the drive receiving portion 1543_b_ toward the upstream side in the rotational direction A.

Although details will be described hereinafter, the groove portion 1543_t_, the recessed portion 1543_u_, the slope 1543_r_, and so on described above are engaging portions which receive a driving force by engaging with the second brake engaging member 208.

Next, the shape of the flange member (drum flange) 1544 will be described. As shown in part (a) of FIG. 134, the flange member 1544 has a substantially cylindrical shape centered on the axis L.

The flange member 1544 includes a cylindrical portion 1544_a_, a flange portion 1544_b_ larger in the radial direction than the cylindrical portion 1544_a_, and a cylindrical portion 1544_c_ smaller in the radial direction than the cylindrical portion 1544_b_, arranged coaxially in the order named from the end portion toward the arrow M1A direction in the arrow M1B direction.

At the end of the cylindrical portion 1544_c_, there are provided a plurality of sector-shaped recess shape portions 1544_p_ corresponding to the projection shape portions 1543_p_ of the engaging member 1543. The projection shape portion 1543_p_ is a coupling portion provided on the engaging member 1543 for connecting with the flange member 1544. Similarly, the recess shape portion 1544_p_ is a coupling portion for connecting with the engaging member 1544.

In addition, as shown in part (b) of FIG. 134, a surface 1544_d_ perpendicular to the axis L is disposed inside the cylindrical portion 1544_a_.

The cylindrical portion 1544_a_ engages with the driving side end of the photosensitive drum (see FIG. 13) (not shown) and rotates integrally therewith.

Next, referring to FIG. 136, the engagement relationship between the engaging member 1543 and the flange member 1544 will be described.

FIG. 136 shows the engagement between the engaging member 1543 and the flange member 1544.

Part (a) of FIG. 136 is a perspective view of the engaged state of the engaging member 1543 and the flange member 1544 as viewed from the driving side, part (b) of FIG. 136 is a side view as viewed from the driving side, and part (c) of FIG. 136 is a sectional view taken along a line shown in part (b) of FIG. 136.

As shown in part (c) of FIG. 136, the cylindrical portion 1543_f_ of the engaging member 1543 is inserted into an inner peripheral surface 1544_e_ of the cylindrical portion 1544_c_ of the flange member 1544 in the direction of the arrow M1B.

At the time of assembling, the slope 1543_n_ of the snap-fit 1543_j_ installed on the cylindrical portion 1543_f_ is inserted into the inner peripheral surface 1544_e_, by which it is deformed in the direction approaching the axis L and enters the inner peripheral surface 1544_e_. Further, by mounting in the direction of the arrow M1B, as shown in part (c) of FIG. 136, the surface 1543_m_ of the snap fit 1543_j_ passes the inner peripheral surface 1544_e_, and the deformation thereof is released. By this, the surface 1543_m_ of the snap fit 1543_j_ faces the surface 1544_d_ of the flange member 1544, so that the engaging member 1543 is rotatably supported by the flange member 1544 with a gap X.

In this embodiment, the gap X between the surface 1543_m_ and the surface 1544_d_ is about 1 mm, but it will suffice if it is larger than an engagement amount between the projection shape portion 1543_p_ and the recess shape portion 1544_p_ shown in part (a) of FIG. 136. The engaging member 1543 is movable the direction of the axis L by the distance of the gap X with respect to the flange member 1544. Although the details will be described hereinafter, by this movement in the axial direction, the engaging member 1543 switches between a state in which the driving force can be transmitted to the flange member 1544 and a state in which the driving force is not transmitted.

In addition, part (a) of FIG. 136 shows a state in which the projection shape portion 1543_p_ and the recess shape portions 1544_p_ are in a phase of engaging in the axial direction when the engaging member 1543 and the flange member 1544 are engaged. However, as will be described hereinafter (see part (c) of FIG. 137), the projection shape portion 1543_p_ and the recess shape portion 1544_p_ may be in positions with which they do not engage with each other in the axial direction.

In the state (engaged state) of part (a) of FIG. 136, the projection shape portion 1543_p_ and the recess shape portion 1544_p_ are engaged in the axis L direction, so that the projection shape portion 1543_p_ and the recess shape portion 1544_p_ are engaged in the direction of arrow A, which is the rotational direction.

Next, referring to FIGS. 143, 137 and 138, a method of engaging the drum coupling 1545 with the drive transmission unit 203 will be described.

FIG. 137 is a perspective view of a state before and after engagement between the drum coupling 1545 and the drive transmission unit 203. Part (a) of FIG. 137 is perspective views illustrating the shapes of the drive transmission unit 203 and the drum coupling 1545, part (b) of FIG. 137 is a perspective view illustrating the shapes of the drum coupling 1545 and the drive transmission unit 203 before engagement, part (c) of FIG. 137 is a perspective view illustrating a state in which the drum coupling 1545 and the drive transmission unit 203 abut against each other in the axis L direction, and part (d) of FIG. 137 is a perspective view illustrating a state after engagement.

In addition, FIG. 138 is sectional views of states before and after engagement between the drum coupling 1545 and the drive transmission unit 203. Part (a) of FIG. 138 is a sectional view illustrating the shapes of the drum coupling 1545 and the drive transmission unit 203 before engagement, and part (b) of FIG. 138 is a sectional view illustrating the state after engagement.

Here, in FIGS. 137 and 138, for the sake of better illustration, a part of the drum drive coupling on the main assembly side of the drive transmission unit 203 is not shown to uncover the internal shape.

As described above, the engaging member 1543 and the flange member 1544 are supported with a gap in the axis L direction. As shown in part (b) of FIG. 137, the engaging member 1543 can freely move within the range of play in the axis L direction relative to the flange member 1544, there is a case that a gap is between the surface 1543_q_ and the surface 1544_q_.

At this time, the projection shape portion 1543_p_ and the recess shape portion 1544_p_ are not engaged with each other in the axis L direction. As shown in part (c) of FIG. 137, when the drive transmission unit 203 moves in the direction of the arrow M1B and the drum coupling 1545 and the drive transmission unit 203 abut against each other in the axis L direction, the engaging member 1543 and the flange member 1544 abut against each other in the L direction of the axis.

At this time, in part (c) of FIG. 137, the surface 1543_q_ of the engaging member 1543 and the surface 1544_q_ of the flange member 1544 are in contact with each other. However, the projection shape portion 1543_p_ and the recess shape portion 1544_p_ are not engaged.

Further, from the state of part (c) of FIG. 137, the drive transmission unit 203 rotates in the direction of arrow A, by which the free end portion 208*f* of the second brake engaging member 208 shown in part (a) of FIG. 137 enters the recessed portion 1543*u* in the engaging member 1543. By this, engagement between the engaging member 1543 and the second brake engaging member 208 in the rotational direction is accomplished. As described above, the recessed portion 1543*u* is a recess (space) formed in the cylindrical portion 1543*s* by the drive receiving portion 1543*b* and the slope 1543*d*, and is an engaging portion for engaging with the free end portion 208*f* of the second brake engaging member 208 to receive the driving force.

The shape of the recessed portion 1543*u* follows the shape of the free end portion 208*f* of the second brake engaging member 208. This is to stabilize the engagement state therebetween by matching the shapes of the recessed portion 1543*u* with the free end portion 208*f* of the second brake engaging member 208. Similarly, the shape of the conical shape portion 1543*c* provided on the inner surface of the engaging member 1543 also follows the shape of the slope 208*h* provided on the outer peripheral surface of the second brake engaging member 208. By making the shapes correspond to each other, when the conical shape portion 1543*c* and the slope 208*h* come into contact with each other, the contact state is stabilized, the deformation and so on of the second brake engaging member 208 are suppressed, so that the engagement between the engaging member 1543 and the second brake engaging member 208 is stabilized.

When the free end portion 208*f* of the second brake engaging member 208 enters the recessed portion 1543*u* of the engaging member 1543, the slope 1543*r* opposes and brought into contact with the slope 208*r* of the second brake engaging member 208 as shown in part (d) of FIG. 137. Since the slope 1543*r* also has a shape corresponding to the slope 208*r*, the contact state of the slope 1543*r* with the slope 208*r* is stable.

Further, the second brake engaging member 208 and the engaging member 1543 engage with each other in the rotational direction. By this, as shown in part (d) of FIG. 137, the engaging member 1543 is rotated in the arrow A direction by the second brake engaging member 208 in a state that the surface 1543*q* and the surface 1544*q* of the flange member are in contact with each other. By this, the engaging member 1543 moves to the phase in which the projection shape portion 1543*p* and the recess shape portion 1544*p* are engaged with each other.

Next, a cross-section in a state where the engaging member 1543 and the drive transmission unit 203 are engaged will be described.

As shown in part (b) of FIG. 138, in the state after the drum coupling 1545 and the drive transmission unit 203 are engaged, the positioning hole (alignment portion) 1543*a* of the engagement member 1543 and the positioning shaft 180*i* of the drive transmission unit 203 are engaged with each other as with embodiment 1. This effects alignment therebetween. The positioning hole 1543*a* is an opening coaxial with the axis of the drum coupling 1545.

In addition, the end surface 1543*k* of the engaging member 1543 and the root portion 180*y* of the positioning shaft 180*i* of the main assembly side drum drive coupling 180 abut against each other to perform positioning in the axis L direction.

Further, the driving force receiving portion 1543*b* of the engaging member 1543 and the end surface 208*g* (see FIG. 143 and part (a) of FIG. 137) of the second brake engaging member 208 of the drive transmission unit 203 abut against each other in the rotational direction, so that the driving force receiving portion 1543*b* receives the rotational driving force from the drive transmission unit 203.

At this time, as shown in part (d) of FIG. 137, the slope 1543*r* of the engaging portion 1543 contacts the slope 208*r* of the second brake engaging member 208 in the rotational direction and receives a part of the rotational driving force of the drive transmission unit 203. Therefore, the slope 1543*r* can also be regarded as a part of the driving force receiving portion. That is, the engaging member 1543 includes the first driving force receiving portion 1543*b* and the second driving force receiving portion (slope 1543*r*), and the first and second driving force receiving portions have surface angles different from each other.

The first driving force receiving portion 1543*b* is a portion provided inside the recessed portion 1543*u*, and is a surface substantially perpendicular to the rotational direction A and parallel to the axis L. On the other hand, the second driving force receiving portion (slope 1543*r*) is placed downstream of the first driving force receiving portion 1543*b* and the recessed portion 1543*u* in the rotational direction A. The second driving force receiving portion (slope 1543*r*) is an inclined portion which inclines so as to go away from the non-driving side of the cartridge in the axial direction as goes away from the recessed portion 1543*u* in the rotational direction. That is, the slope 1543*r* is inclined with respect to the axis L of the coupling and with respect to the circumferential direction (rotational direction A) of the coupling.

The slope 1543*r* of the engaging member 1543 is inclined in substantially the same direction as the slope 208*r* so that the contact state of the second brake engaging member with the slope 208*r* is stable. That is, the slope 1543*r* and the slope 208*r* are the surfaces substantially parallel to each other.

In this embodiment, the end surface 208*g* and the slope 208*r* of the second brake engaging member 208 serve as a driving force applying portion of the drive transmission unit 203. Further, in this embodiment, the second brake engaging member 208 functions as the driving force applying member.

Here, as shown in part (b) of FIG. 143, the end surface 208*g* of the second brake engaging member 208 is perpendicular to the rotational direction about the axis L. Further, a pair of such end surfaces 208*g* are arranged rotation-symmetrically with the axis M1 as the center.

Further, as shown in FIG. 136, the driving force receiving portion 1543*b* of the engaging member 1543 is preferably a surface perpendicular to the rotational direction about the axis L. This is because the end surface 208*g* and the driving force receiving portion 1543*b* are arranged substantially in parallel with each other to stabilize the contact state therebetween. Further, a pair of such driving force receiving portions 1543*b* are preferably installed rotation-symmetrically with the axis Las the center. This is because the pair of driving force receiving portions 1543*b* engage with the pair of end surfaces 208*g*.

Therefore, as shown in part (b) of FIG. 143, when the end surface 208*g* of the second brake engaging member 208 engages with the driving force receiving portion 1543*b* of the engaging member 1543 in the rotational direction, no component force other than the rotational direction is produced with respect to the axis M1. In this state, the driving force EB1 from the second brake engaging member 208 can be transmitted to the drum coupling 1545.

However, the driving force receiving portion 1543*b* may not necessarily be a surface perpendicular to the rotational direction about the axis L, and the driving force receiving portion 1543*b* is not necessary provided at each of the two point-symmetrical (180° symmetric) positions about the axis L.

As described above, the groove portion 1543*t* is a space for the second brake engaging member (208) to enter, and therefore, the groove portion 1543*t* has a size enough to allow the second brake engaging member (208) to enter. As shown in FIG. 150, in the circumferential direction (rotational direction A) about the axis L angle α3 is an angle from an upstream end portion (surface 1543*f*) of the grooved portion 1543*t* to the driving force receiving portion 1543*b* of the recessed portion 1543*u* provided downstream of the grooved portion 1543*t* In this embodiment, α3 is about 116°.

In order for the second brake engaging member (208) to enter the groove portion 1543*t*, it is desirable that the groove portion 1543*t* is provided over a range of 45° or more. That is, "α3≥45°" is desirable.

In order to make the engaging member 1543 of the drum coupling 180° symmetrical, it is desirable that the angle at which the groove portion 1543*t* is provided is 180° or less. That is, "α3≤180°" is desirable.

Similarly to the drum coupling described above, the engaging members 1543 of the drum coupling of this embodiment do not have a 180° symmetrical shape. For example, in this embodiment, the engaging member 1543 has a pair of groove portions 1543*t* and so on. However, it is conceivable that the drum coupling has only one groove portion 1543*t*, or that the drum coupling has two groove portions 1543*t*, but the shapes of the two groove portions 1543*t* are different from each other. The same is applied to the other parts such as the slopes 1543*d*, the driving force receiving portion 1543*b*, the recessed portion 1543*u*, the slope 1543*r*.

However, it is further preferable that the engaging members 1543 of the drum coupling have 180° symmetrical shapes since then the transmission of the driving force from the brake engaging member (204, 208) to the drum coupling is stable.

Next, referring to FIG. 139, a state in which the second brake engaging member 208 rotates relative to the brake transmission member 207 will be described.

FIG. 139 is a simplified view illustrating the structure for the driving force (rotational force) of the main assembly side drum drive coupling 180 to be transmitted toward the second brake engaging member 208 in the rotational direction (arrow A direction), in a state in which the drum coupling 1545 and the drive transmission unit 203 are engaged.

In FIG. 139, a part of the main assembly side drum drive coupling 180 is not shown for better illustration, and the internal shape is uncovered.

Similarly to the Embodiment 1, when the drum drive coupling 180 rotates in the direction of the arrow A, the drive transmission surface 180*d* of the main assembly side drum drive coupling 180 pushes the engaging portion 204*u* of the first brake engaging member 204. By this, the main assembly side drum drive coupling 180 and the first brake engaging member 204 rotate integrally. Further, when the first brake engaging member 204 rotates in the direction of the arrow A, a rotation stop recess 204*c* of the first brake engaging member 204 and the rotation stop projection 208*c* of the second brake engaging member 208 engage with each other. By this, the first brake engaging member 204 and the second brake engaging member rotate integrally. In this manner, the rotational driving force from the drum drive coupling 180 is transmitted to the second brake engaging member 208 by way of the first brake member 204.

Next, referring to FIGS. 140 and 141, a deformation direction when the second brake engaging member 208 transmits the rotational driving force will be described.

FIG. 140 is sectional views illustrating the engagement position between the drum coupling and the drive transmission unit 203 in the rotational direction.

Part (a) of FIG. 140 is a side view of the drive transmission unit 203 and the drum coupling 1545, and part (b) of FIG. 140 is a cross-sectional view taken along a line shown in part (a) of FIG. 140. Further, FIG. 141 is an illustration showing deformation of the second brake engaging member before and after deformation, part (a) of FIG. 141 is a side view, and part (b) of FIG. 141 is a sectional view of a drive transmitting portion 208*g*. In FIG. 141, the shape before deformation is depicted by a broken line, and the shape after deformation is depicted by a solid line.

When the second brake engaging member 208 engages with the drum coupling 1545, the force EB1 (see part (b) of FIG. 143) is transmitted in the direction of arrow A, which is the driving direction, as shown in part (b) of FIG. 140. By this, the second brake engaging member 208 receives a reaction force EB2 of the same magnitude from the drum coupling 1545.

Here, as shown in FIG. 143, since the second brake engaging members 208 have rotation symmetrical shapes about the axis M1, it receives reaction force EB2 from each of the two positions so that the coupling engaging portions 208*b* are twisted with respect to the flange portion 208*a* (FIG. 141).

At this time, the twisting direction is opposite to the moving direction of the second brake engaging member 208 (direction opposite to the arrow A direction), so that, the end surface 208*g* is deformed in the direction of moving in the axis M1A direction (part (b) of FIG. 141).

Next, referring to FIG. 142, the relationship of the forces applied to the second brake engaging member 208 when the drive transmission unit 203 and the drum coupling 1545 are engaged will be described. FIG. 142 is a sectional view illustrating the directions of the forces on the brake engaging member 208 and the drum coupling 1545 in the engaged state.

As described above, when the second brake engaging member 208 is twisted upstream in the rotational direction A and begins to deform, the end surface 208*g* of the coupling engaging portion 208*b* is deformed in the arrow M1A direction. As shown in FIG. 142, the slope 208*k* of the second brake engaging member 208 and the slope 1543*d* of the engaging member 1543 abut against each other. At this time, a component force ED from the slope 1543*d* in the direction of the arrow M1B is produced on the slope 208*k* of the second brake engaging member 208.

Further, the second brake engaging member 208 is twisted upstream in the rotational direction (arrow A direction). By this, when the slope 208*k* and the slope 1543*d* of the engaging member 1543 collide with each other, a force EC is produced onto the slope 208*k* in the outward direction in the radial direction (direction away from the axis L). Therefore, a force acts on the coupling engaging portion 208*b* of the second brake engaging member 208 in the direction away from the axis L.

Therefore, the engaging member 1543 is provided with the conical shape portion 1543*c* for producing a force in a direction facing the force EC in a direction away from the axis L (see part (a) of FIG. 134).

The conical shape portion 1543*c* has a slope shape formed to be away from the axis Las goes in the direction M1A so that it faces the slope 208*h* provided on the outer side, in the axis L, of the slope 208*k* of the second brake engaging member.

Here, the conical shape portion 1543*c* is formed on a part of the inner peripheral surface of the cylindrical portion 1543*h*. The free end of the cylindrical portion 1543*h* is structured to enter the gap between the coupling engaging portion 204*b* of the first brake engaging member 204 and the coupling engaging portion 208*b* of the second brake engaging member 208. The conical shape portion 1543*c* faces the slope 208*h*.

When the second brake engaging member 208 begins to twist, the slope 208*k* of the second brake engaging member 208 and the slope 1543*d* of the engaging member 1543 are brought into contact with each other, and at the same time, the slope 208*h* and the conical shape portion 1543*c* are brought into contact with each other.

The slope 208*k* of the second brake engaging member 208 receives the force EC in a direction away from the slope 1543*d* of the engaging member 1543 along the axis L direction (arrow M1A direction). At this time, the slope 208*h* simultaneously receives a force EE from the conical shape portion 1543*c* in the direction approaching the axis L (inward in the radial direction).

Further, as described above, a part of the rotational driving force is transmitted from the slope 208*r* of the second brake engaging member 208 shown in part (d) of FIG. 137 to the slope 1543*r*. At this time, a component force in the direction of the arrow M1A (not shown) is produced on the second brake engaging member 208, but is cancelled by the component force ED described above.

The force tending to move the end surface 208*g* produced by twisting the second brake engaging member 208 toward the upstream side in the rotational direction A in the direction of the arrow M1A, and the component force ED that the slope 208*k* receives from the slope 1543*d* of the engaging member 1543 are balanced. By this balance, the position of the second brake engaging member 208 is determined in the axial direction.

In addition, the position of the second brake engaging member 208 in the radial direction is determined by balancing the force EC received by the slope 208*k* of the second brake engaging member 208 in the direction away from the axis L and the component force EE, in the direction approaching the axis L, received by the slope 208*h*.

Further, as shown in part (b) of FIG. 140, the end surface 208*g* of the second brake engaging member engages with the driving force receiving portion 1543*b* of the engaging member in the rotational direction, and the force EB1 (FIG. 143) which is the driving force is applied to effect the drive transmission. At this time, the second brake engaging member 208 is also positioned with respect to the engaging member 1543 also in the rotational direction.

In this manner, the second brake engaging member 208 is positioned with respect to the engaging member 1543, and the engagement and connection states between the second brake engaging member 208 and the engagement member 1543 are stabilized, when the drive is transmitted from the second brake engaging member 208 to the engaging member 1543.

In this embodiment, the shape of the engaging member 1543 is made to match the shape of the second brake engaging member 208 so as to suppress the deformation of the second brake engaging member 208 and the movement resulting from the deformation.

Next, referring to FIG. 142, a structure for disengaging the drum flange 1545 and the drive transmission unit will be described.

Similarly to the Embodiment 1, the drive transmission unit 203 moves in the direction of the arrow M1A upon engagement and disengagement with respect to the drum coupling 1545. At this time, in this embodiment, in order to release the engagement with the drum coupling 1545, it is necessary that the contact between the conical shape portion 1543*c* and the slope 1543*d* and the contact between the slope 208*h* and the slope 208*k* of the second brake engaging member 208 are released.

As described above, the second brake engaging member 208 engages with the drum coupling by the free end portion 208*f* thereof enters the recessed portion 1543*u* of the drum coupling.

In addition, in the engaged state, as shown in FIG. 142, when the drive transmission unit 203 tries to move in the direction of the arrow M1A, the slope portion 208*k* of the second brake engaging member 208 and the slope portion 1543*d* of the engaging member 1543 come into contact with each other to be interfered.

Therefore, in order to release the engagement, it is necessary to rotate the drum coupling in the direction of arrow A to take the free end 208*f* of the second brake coupling out of the gap (recessed portion 1543*u*) of the drum coupling 1545. Alternatively, it is necessary to disengage the second brake engaging member 208 while deforming it.

Here, as described above, the slope 1543*d* is a slope (inclined portion) inclined so as to go in the direction of arrow M1B as goes in the direction of arrow A which is the rotational direction. Therefore, when the drive transmission unit 203 moves in the direction of the arrow M1A, a force is applied to the slope 1543*d* to rotate in the direction of the arrow A, from the slope 208*k* of the second brake engaging member 208.

Therefore, if the engaging member 1543 is in a state of being freely movable in the rotational direction, it can be rotated in the direction of arrow A by the force applied to the slope 1543*d* to release the engagement.

Next, referring to FIG. 143, a structure for breaking the connection state between the second brake engaging member 208 of the drive transmission unit 203 and the drum coupling 1545 will be described.

FIG. 143 is a sectional view illustrating, in order, the movement of the drive transmission unit 203 when the drive transmission unit 203 is disengaged.

Part (a) of FIG. 143 is a sectional view illustrating the drum coupling 1545 and the drive transmission unit 203 at the time of engagement, and part (b) of FIG. 143 is a sectional view illustrating a state during the disengagement operation.

Similarly to the Embodiment 1, when the drive transmission unit 203 moves in the direction of the arrow M1A from the engaged state of part (a) of FIG. 143, the engaging member 1542 in the state of engagement with the drive transmission unit 203 as shown in part (b) of FIG. 143 moves integrally until the surface 1543*m* of the snap fit 1543*j* and the surface 1544*d* of the flange member 1544 abut to each other.

As described above, the gap X between the snap fit 1543*j* and the surface 1544*d* is formed to be larger than the engagement amount between the projection 1543*p* and the recess portion 1544*p*. For this reason, by movement of the engaging member 1543 relative to the flange member in the direction of the arrow M1A, the engagement between the recess portion 1543*p* and the projection 1544*p* in the rotational direction (arrow A direction) is released.

In this manner, the engaging member 1543 can rotate with respect to the flange member 1544 without engaging in the arrow A direction (rotational direction).

When the drive transmission unit 203 moves in the direction of the arrow M1A because the engaging member 1543 becomes free in the rotational direction, the surface 1543*d* shown in FIG. 142 receives a force from the slope portion 208*k* of the second brake engaging member.

By this, the engaging member 1543 moves along the inclination of the slope portion 208*k*. Thus, the engaging member 1543 rotates in the direction of arrow A. In this manner, the engagement can be released while suppressing the deformation of the second brake engaging member 208.

In this embodiment, the drum flange 1545 comprises two parts, namely, the engaging member and the flange member 1544, so that the connection between the second brake engaging member 208 and the drum coupling 1545 can be smoothly released.

That is, the engaging member 1543 and the flange member 1544 constitute a clutch mechanism. The clutch can switch between a state in which the driving force can be transmitted between the engaging member 1543 and the flange member 1544 (see part (d) of FIG. 137) and a state in which the driving force cannot be transmitted therebetween (see part (b) of FIG. 137).

When the connected state of the second brake engaging member 208 and the drum coupling 1545 is to be released, the clutch position in which the driving force is not transmitted from the engaging member to the flange member 1544 is taken. Then, the engaging member 1543 can rotate downstream in the direction of arrow A with respect to the flange member 1544. Therefore, it is easy to break the connected state between the second brake engaging member 208 and the engaging member 1543.

However, as shown in FIG. 144, it is also possible to use the drum coupling 1546 in which the engaging member 1543 and the flange member 1544 are not separated and are integral with each other. In such a case, the deformation of the second brake engaging member 208 is used to break the connection between the second brake engaging member 208 and the drum coupling 1546. Alternatively, the entire drum unit is rotated downstream in the rotational direction A to break the connection between the second brake engaging member 208 and the drum coupling 1546.

In addition, in this embodiment, the engaging member 1543 and the flange member 1544 are in the state that they can move relatively freely within a certain range in the axial direction. However, it is also possible to assemble the engaging member 1543 to the flange member in a state of being urged so as to approach each other by using a spring (elastic member, urging member) or the like, for example. The engagement between the coupling portion (convex shape portion 1543*p*) of the engaging member and the coupling portion (recess shape portion 1544*p*) of the flange member 1544 is maintained by the spring. That is, the connected state of the engaging member 1543 and the flange member 1544 is maintained by the spring.

Also with such a structure, when the connection between the second brake engaging member 208 and the drum coupling 1545 is released, the engaging member 1543 is moved away from the flange member 1544 against the elastic force of the spring.

Further, in this embodiment, the clutch comprising the engaging member 1543 and the flange member 1544 is an engagement clutch (dog clutch). The engaging member 1543 and the flange member 1544 have projections or recess portions, respectively, and transmit the driving force by contact between the projections or engagement between the projections and the recess portions. In this embodiment, the coupling portion (convex shape portion 1543*p*) provided on the end surface of the engaging member 1543 and the coupling portion (recess shape portion 1544*p*) provided on the end surface of the flange member 1544 are structured to mesh with each other (See FIG. 134).

As an example of another type of clutch, the following meshing clutch (gear clutch) can be considered. One of the engaging member 1543 and the flange member 1544 has an internal tooth gear on the inner peripheral surface thereof, and the other has an external tooth gear on the outer peripheral surface thereof. When the engaging member 1543 and the flange member 1544 move relatively to each other in the axial direction, the meshed state of the internal tooth gear and the external tooth gear is switched between the meshed state and the disengaged state, and therefore, between the enabled transmission state and the disabled transmission state.

The clutch structure provided in the drum coupling is not limited to these examples, and a known different type of clutch can be satisfactorily usable instead.

The engaging member 1543 is a driving force receiving member for receiving a driving force from the outside of the cartridge, and is a rotating member (movable member, moving member) which can rotate relative to the flange member 1544. The flange member (drum flange) 1544 is a transmission member which receives the driving force from the engagement member 1544 and transmits the driving force toward the photosensitive drum. Further, the flange member 1544 can be regarded as the main body the base portion of the cartridge.

Further, one of the engaging member 1543 and the flange member 1544 may be referred to as a first coupling member, the other may be referred to as a second coupling member, and so on.

The engaging member 1543 is structured to engage with the brake engaging member (204, 208) to receive a driving force. Specifically, it has an engaging member 1543 having a shape corresponding to the shape of the second brake engaging member 208. The second brake engaging member 208 is easily deformable so as to be able to smoothly break the connection state with the drum coupling. However, the shape of the engaging member 1543 is defined so as to correspond to the shape of the second brake engaging member 208. Therefore, when the second brake engaging member 208 transmits the driving force to the engaging member 1543, the deformation or movement of the second brake engaging member 208 can be suppressed by the engaging member 1543. Therefore, the transmission of the driving force from the drive transmission unit 203 to the drum coupling 1545 by way of the brake engaging member (204, 208) is stabilized.

In this embodiment, the structure in which the rotational drive transmission to the drum coupling 1545 is performed by using the second brake engaging member 208 has been described, but it is also possible to receive the rotational drive transmission from the first brake engaging member 204. Further, in this embodiment, the structure in which the drum coupling 1545 has a point-symmetrical shape with respect to the axis L has been described, but the same effect can be provided when the drum coupling 1545 has a one side shape.

As described above, as is different from the drum coupling 143 of the Embodiment 1 it is not through engagement with the driving drum coupling 180 that the drum coupling 1545 of this embodiment receives the driving force. Instead, the drum coupling 1545 is structured to receive the driving force through engagement with the second brake engaging member 208 (see part (d) of FIG. 137). More specifically, the drum coupling 1543 is provided with the recessed portion 1543*u* (see FIG. 144) which can engage with the second brake engaging member 208 to receive a driving force from the second brake engaging member 208.

The recessed portion 1543*u* is provided with a driving force receiving portion 1543*b*, and by the driving force receiving portion 1543*b* contacting the second brake engaging member 208, it can receive the driving force indirectly from the drum drive coupling 180 of the main assembly side by way of the second brake engaging member 208 (see part (d) of FIG. 137). At this time, the drum coupling 180 on the main assembly side is rotationally driven while receiving a load (braking force) from the brake engaging member (204, 208).

The recessed portion 1543*u* is open at the upstream side thereof in the rotational direction A and at the outer side thereof in the radial direction. The driving force receiving portion 1543*b* is a portion at the downstream end portion of the recessed portion 1543*u* in the rotational direction A (see FIG. 144).

A slope 1543*r* is provided in the neighborhood of the recessed portion 1543*u* (see FIG. 149). The slope 1543*r* may also receive a part of the driving force from the second brake engaging member 208. As described above, at least a part of the slope 1543*r* is disposed downstream of the recessed portion 1543*u* in the rotational direction A, and is an inclined portion adjacent to the recessed portion 1543*u* (see FIGS. 144 and 149). In the radial direction of the coupling at least a part of the slope 1543*r* is outside the recessed portion 1543*u*. That is, at least a part of the slope 1543*r* is located more remote from the axis L of the coupling than the recessed portion 1543*u*.

In summary, the drum coupling of this embodiment is provided with the recessed portion 1543*u* and the slope 1543*r* in order to receive the driving force from the brake engaging member (204, 208). One side of the recess 1543*u* in the circumferential direction of the coupling is open, and at least a part of the slope 1543*r* is provided at the other side of the recess 1543*u* in the circumferential direction. The slope 1543*r* is an inclined portion which is inclined so as to go away from the non-driving side of the cartridge as goes away from the recessed portion 1543*u* toward the downstream side in the rotational direction A. In addition, the slope 1543*r* faces downstream in the direction of the arrow M1A in the direction of the axis L (see Figure (b)). That is, the slope 1543*r* faces the side opposite to the non-driving side of the cartridge.

In order to receive the driving force from the brake engaging member (204, 208), the drum coupling is preferably provided with at least one of the recessed portion 1543*u* and the slope 1543*r*, and is more preferably provided with both of them.

Although it is possible to make the slope 1543*r* a substantial inclined portion provided by a plurality of steps, it is further preferable that the inclined portion has a smooth surface as in this embodiment.

As is different from the drum couplings described in the above-described Embodiments 1 to 5, the drum coupling 1545 of this embodiment is not structured so to receive the braking force from the brake engaging member (204, 208) of the drive transmission unit. It is preferable to use the drum coupling of this embodiment in the case that the load (torque) for rotating the photosensitive drum or drum coupling is already large and it is not necessary to apply a braking force to the photosensitive drum or drum coupling.

For example, different types of cartridges can be mounted on the same image forming apparatus main assembly, and the load (torque) required to rotate the photosensitive drum or drum coupling may differ in individual types of the cartridge.

For the photosensitive drum and the cartridge having a small load for rotating the coupling, it is preferable to employ the drum coupling as shown in Embodiments 1 to 5. By this, the rotation of the photosensitive drum may be stabilized by applying a braking force to the photosensitive drum from the brake engaging member (204, 208) of the image forming apparatus main assembly.

On the other hand, if the cartridge already has a large load required for rotating the photosensitive drum or the like, it is preferable to use the drum coupling 1545 of this embodiment. By this, the photosensitive drum does not receive the braking force from the brake engaging member (204, 208) of the image forming apparatus main assembly.

One of the reasons why the rotational load of the photosensitive drum is different for each type of the cartridges is the presence or absence of the cleaning blade 710 (see FIG. 82) and/or the difference in the installation mode thereof. For example, in a case, the cleaning blade 710 is provided on the cartridge and the frictional force produced between the cleaning blade 710 and the photosensitive drum is sufficiently large. In such a case, it is not problematic that the drum coupling is rotated without receiving a driving force from the brake engaging member (204, 208), and therefore, it is preferable to use the drum coupling as in this embodiment. This is merely an example, and the coupling 1545 of this embodiment can be used even when the torque of the photosensitive drum is large for other reasons.

That is, by selecting a suitable coupling according to the characteristics of the cartridge, the rotational state of the photosensitive drum (driving state of the cartridge) can be stabilized.

In each of the above-described embodiments and modifications thereof, the description has been made as to the image forming apparatuses, the cartridges, and the drum couplings (cartridge-side couplings, couplings) having different structures. The structures disclosed in these embodiments and the like may be appropriately combined and used.

INDUSTRIAL APPLICABILITY

According to the present invention, there is provided an image forming apparatus and a cartridge and a drum unit capable of transmitting a driving force to a rotatable member of the cartridge and the drum unit.

The present invention is not limited to the above embodiments, and various modifications and modifications can be made without departing from the spirit and scope of the present invention. Therefore, the following claims are attached to make the scope of the present invention public.

This application claims priority based on Japanese Patent Application No. 2020-156549 filed on Sep. 17, 2020, and all the contents thereof are incorporated herein by reference.

The invention claimed is:

1. A cartridge comprising:

a photosensitive drum;

a casing having a first end portion and a second end portion opposite the first end portion in an axial direction of the photosensitive drum, the casing rotatably supporting the photosensitive drum; and a coupling positioned adjacent to the first end portion of the casing, the coupling being operatively connected to the photosensitive drum so as to be capable of transmitting a driving force toward the photosensitive drum, wherein the coupling includes:

a main body, a movable portion movable relative to the main body of the coupling between a first position and a second position, with the movable portion being closer to the second end portion of the casing in the axial direction of the photosensitive drum when the movable portion is in the second position than when the movable portion is in the first position, and a projection configured to move away from an axis of the coupling and relative to the main body of the coupling in response to movement of the movable portion from the first position to the second position.

2. A cartridge according to claim 1, wherein, when the movable portion is in the first position, the movable portion is positioned more remote from the axis of the coupling than the projection is from the axis of the coupling, and wherein, when the movable portion is in the first position, the movable portion is positioned closer to the second end portion of the casing in the axial direction of the photosensitive drum than the projection is to the second end portion of the casing in the axial direction of the photosensitive drum.

3. A cartridge according to claim 1, further comprising an elastic member for urging the movable portion toward the first position.

4. A cartridge according to claim 1, wherein the projection is configured to receive the driving force from outside of the cartridge.

5. A cartridge according to claim 1, wherein, when the movable portion is in the second position, the projection projects outwardly in a radial direction of the coupling.

6. A cartridge according to claim 1, wherein, when the movable portion is in the first position, the movable portion projects away from the second end portion of the casing.

7. A cartridge according to claim 1, wherein the main body of the coupling has an end surface facing away from the second end portion of the casing, and, when the movable portion is in the first position, at least a part of the movable portion projects beyond the end surface.

8. A cartridge according to claim 1, wherein the coupling includes two of the movable portions, the movable portions being provided at diametrically opposite positions with respect to the axis of the coupling.

9. A cartridge according to claim 1, wherein the coupling includes a movable member having the movable portion and the projection, and the movable member is rotatable relative to the main body of the coupling.

10. A cartridge according to claim 9, wherein, when the movable portion is in the first position, the movable portion is more remote from the second end portion of the casing in the axial direction of the photosensitive drum than a rotational axis of the movable member is from the second end portion of the casing.

11. A cartridge according to claim 9, wherein, in a rotational movement direction at the time when the coupling is rotated by the driving force received by coupling, at least part of the movable portion is upstream of the projection.

12. A cartridge according to claim 9, wherein the main body of the coupling is provided with an opening on the axis of the coupling.

13. A drum unit usable for a cartridge, the drum unit comprising:

a photosensitive drum having a first end portion and a second end portion opposite the first end portion; and a coupling positioned adjacent to the first end portion of the casing, the coupling being operatively connected to the photosensitive drum so as to be capable of transmitting a driving force toward the photosensitive drum, wherein the coupling includes:

a main body, a movable portion movable relative to the main body of the coupling between a first position and a second position, with the movable portion being closer to the second end portion of the photosensitive drum in an axial direction of the photosensitive drum when the movable portion is in the second position than when the movable portion is in the first position, and a projection configured to move away from an axis of the coupling and relative to the main body of the coupling in response to movement of the movable portion from the first position to the second position.

14. A drum unit according to claim 13, wherein, when the movable portion is in the first position, the movable portion is positioned more remote from the axis of the coupling than the projection is from the axis of the coupling, and wherein, when the movable portion is in the first position, the movable portion is positioned closer to the second end portion of the photosensitive drum in the axial direction of the photosensitive drum than the projection is from the second end portion of the photosensitive drum in the axial direction of the photosensitive drum.

15. A drum unit according to claim 13, further comprising an elastic member for urging the movable portion toward the first position.

16. A drum unit according to claim 13, wherein the projection is configured to receive the driving force from outside of the cartridge.

17. A drum unit according to claim 13, wherein, when the movable portion is in the second position, the projection projects outwardly in a radial direction of the coupling.

18. A drum unit according to claim 13, wherein, when the movable portion is in the first position, the movable portion projects away from the second end portion of the photosensitive drum.

19. A drum unit according to claim 13, wherein the main body of the coupling has an end surface facing away from the second end portion of the photosensitive drum, and, when the movable portion is in the first position, at least a part of the movable portion projects beyond the end surface.

20. A drum unit according to claim 13, wherein the coupling includes two of the movable portions, the two movable portions being provided diametrically opposite positions with respect to the axis of the coupling.

21. A drum unit according to claim 13, wherein the coupling includes a movable member having the movable portion and the projection, and the movable member is rotatable relative to the main body of the coupling.

22. A drum unit according to claim 21, wherein, when the movable portion is in the first position, the movable portion is more remote from the second end portion of the photosensitive drum in the axial direction of the photosensitive drum than a rotational axis of the movable member is from the second end portion of photosensitive drum.

23. A drum unit according to claim 21, wherein, in a rotational movement direction at the time when the coupling is rotated by the driving force received by the coupling, at least part of the movable portion is upstream of the projection.

24. A drum unit according to claim 13, wherein the main body of the coupling is provided with an opening on the axis of the coupling.

* * * * *